(12) United States Patent

Manzari et al.

(10) Patent No.:     US 12,659,569 B2

(45) Date of Patent:        Jun. 16, 2026

(54) USER INTERFACES FOR CONTROLLING MEDIA CAPTURE SETTINGS

(71) Applicant: Apple Inc., Cupertino, CA (US)

(72) Inventors: Johnnie B. Manzari, San Francisco, CA (US); William A. Sorrentino, III, Mill Valley, CA (US); Andre Souza Dos Santos, San Jose, CA (US)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 18/373,168

(22) Filed: Sep. 26, 2023

(65) Prior Publication Data

US 2024/0373121 A1      Nov. 7, 2024

Related U.S. Application Data

(60) Provisional application No. 63/537,800, filed on Sep. 11, 2023, provisional application No. 63/470,539, (Continued)

(51) Int. Cl.
H04N 23/63         (2023.01)
H04N 5/272         (2006.01)
(Continued)

(52) U.S. Cl.
CPC ........... H04N 23/632 (2023.01); H04N 5/272 (2013.01); H04N 23/62 (2023.01); H04N 23/633 (2023.01);
(Continued)

(58) Field of Classification Search
CPC ...... H04N 23/632; H04N 5/272; H04N 23/62; H04N 23/633; H04N 23/635; H04N 23/64;
(Continued)

(56) References Cited

U.S. PATENT DOCUMENTS 4,518,237 A     5/1985  Mizokami
4,823,283 A     4/1989  Diehm et al.
(Continued)

FOREIGN PATENT DOCUMENTS

AU       2013368443  B2      3/2016
AU       2020203489  A1      6/2020
(Continued)

OTHER PUBLICATIONS

Board Decision received for Chinese Patent Application No. 201811446867.4, mailed on Apr. 26, 2023, 21 pages (5 pages of English Translation and 16 pages of Official copy).
(Continued)

*Primary Examiner* — Hung H Lam

(74) *Attorney, Agent, or Firm* — YHE Law LLP

(57)                ABSTRACT

User interfaces for controlling media capture settings are described, including user interfaces for controlling capture of media with associated depth information (e.g., for applying simulated depth-of-field effects), controlling media capture settings with multiple input types, controlling zoom settings for media capture (e.g., conditionally displaying a secondary preview at a different zoom level), capturing and viewing media using internal and external media storage, and controlling an indicator for level capture guidance.

32 Claims, 125 Drawing Sheets

Related U.S. Application Data filed on Jun. 2, 2023, provisional application No. 63/464,528, filed on May 5, 2023.

(51) Int. Cl.

| | |
|---|---|
| *H04N 23/60* | (2023.01) |
| *H04N 23/62* | (2023.01) |
| *H04N 23/667* | (2023.01) |
| *H04N 23/67* | (2023.01) |
| *H04N 23/69* | (2023.01) |
| *H04N 23/959* | (2023.01) |

(52) U.S. Cl.
CPC ........... *H04N 23/635* (2023.01); *H04N 23/64* (2023.01); *H04N 23/667* (2023.01); *H04N 23/675* (2023.01); *H04N 23/69* (2023.01); *H04N 23/959* (2023.01)

(58) Field of Classification Search
CPC .... H04N 23/667; H04N 23/675; H04N 23/69; H04N 23/959; H04N 23/631; H04N 23/90
See application file for complete search history.

(56) References Cited

U.S. PATENT DOCUMENTS

| | | | |
|---|---|---|---|
| 4,933,702 A | | 6/1990 | Komatsuzaki et al. |
| 5,463,443 A | | 10/1995 | Tanaka et al. |
| 5,557,358 A | | 9/1996 | Mukai et al. |
| 5,615,384 A | | 3/1997 | Allard et al. |
| 5,825,353 A | | 10/1998 | Will |
| 6,148,113 A | * | 11/2000 | Wolverton ................ G06T 5/94 |
| | | | 382/254 |
| 6,262,769 B1 | | 7/2001 | Anderson et al. |
| 6,268,864 B1 | | 7/2001 | Chen et al. |
| 6,278,466 B1 | | 8/2001 | Chen |
| 6,359,837 B1 | | 3/2002 | Tsukamoto |
| 6,429,896 B1 | | 8/2002 | Aruga et al. |
| 6,448,987 B1 | | 9/2002 | Easty et al. |
| 6,483,878 B1 | | 11/2002 | Yonezawa et al. |
| 6,522,347 B1 | | 2/2003 | Sakai et al. |
| 6,677,981 B1 | | 1/2004 | Mancuso et al. |
| 6,809,724 B1 | | 10/2004 | Shiraishi et al. |
| 6,809,759 B1 | | 10/2004 | Chiang |
| 6,819,867 B2 | | 11/2004 | Mayer et al. |
| 6,900,840 B1 | | 5/2005 | Schinner et al. |
| 6,901,561 B1 | | 5/2005 | Kirkpatrick et al. |
| 7,036,091 B1 | | 4/2006 | Nguyen |
| 7,417,680 B2 | | 8/2008 | Aoki et al. |
| 7,463,304 B2 | | 12/2008 | Murray |
| 7,515,178 B1 | | 4/2009 | Fleischman et al. |
| 7,516,419 B2 | | 4/2009 | Petro et al. |
| 7,551,899 B1 | | 6/2009 | Nicolas et al. |
| 7,583,892 B2 | | 9/2009 | Okumura |
| 8,073,207 B2 | | 12/2011 | Ayaki et al. |
| 8,102,429 B2 | | 1/2012 | Molgaard |
| 8,185,839 B2 | | 5/2012 | Jalon et al. |
| 8,189,087 B2 | | 5/2012 | Misawa et al. |
| 8,203,640 B2 | | 6/2012 | Kim et al. |
| 8,350,945 B2 | | 1/2013 | Yumiki |
| 8,379,098 B2 | | 2/2013 | Rottler et al. |
| 8,405,680 B1 | | 3/2013 | Gomes et al. |
| 8,493,408 B2 | | 7/2013 | Williamson et al. |
| 8,576,304 B2 | | 11/2013 | Ishibashi |
| 8,624,836 B1 | | 1/2014 | Miller et al. |
| 8,638,371 B2 | | 1/2014 | Laberge et al. |
| 8,675,084 B2 | | 3/2014 | Bolton et al. |
| 8,723,988 B2 | | 5/2014 | Thorn |
| 8,736,704 B2 | | 5/2014 | Jasinski et al. |
| 8,736,716 B2 | | 5/2014 | Prentice |
| 8,742,890 B2 | | 6/2014 | Gocho et al. |
| 8,762,895 B2 | | 6/2014 | Mehta et al. |
| 8,817,158 B2 | | 8/2014 | Saito |
| 8,848,097 B2 | | 9/2014 | Makii |
| 8,854,452 B1 | | 10/2014 | Raffle |
| 8,885,978 B2 | | 11/2014 | Cote et al. |
| 8,922,588 B2 | | 12/2014 | Makino et al. |
| 9,001,226 B1 | | 4/2015 | Ng et al. |
| 9,077,896 B2 | | 7/2015 | Park et al. |
| 9,143,692 B2 | | 9/2015 | Hayashi |
| 9,158,974 B1 | | 10/2015 | Laska et al. |
| 9,160,869 B2 | | 10/2015 | Schult |
| 9,172,866 B2 | | 10/2015 | Ito et al. |
| 9,185,291 B1 | | 11/2015 | Shabtay et al. |
| 9,223,486 B2 | | 12/2015 | Shin et al. |
| 9,250,797 B2 | | 2/2016 | Roberts et al. |
| 9,264,660 B1 | | 2/2016 | Petterson et al. |
| 9,288,476 B2 | | 3/2016 | Sandrew et al. |
| 9,313,397 B2 | | 4/2016 | Harris et al. |
| 9,313,401 B2 | | 4/2016 | Frey et al. |
| 9,325,970 B2 | | 4/2016 | Sakayori |
| 9,342,230 B2 | | 5/2016 | Bastien et al. |
| 9,360,671 B1 | | 6/2016 | Zhou |
| 9,423,868 B2 | | 8/2016 | Iwasaki |
| 9,451,144 B2 | | 9/2016 | Dye |
| 9,462,169 B2 | | 10/2016 | Xie et al. |
| 9,467,812 B2 | | 10/2016 | Jung et al. |
| 9,507,420 B2 | | 11/2016 | Tartz et al. |
| 9,544,563 B1 | | 1/2017 | Cheng et al. |
| 9,592,428 B2 | | 3/2017 | Binder |
| 9,600,178 B2 | | 3/2017 | Yun et al. |
| 9,602,796 B2 | | 3/2017 | Chandra et al. |
| 9,609,221 B2 | | 3/2017 | Kim et al. |
| 9,626,589 B1 | | 4/2017 | Graham et al. |
| 9,639,945 B2 | | 5/2017 | Oberheu et al. |
| 9,667,881 B2 | | 5/2017 | Harris et al. |
| 9,692,964 B2 | | 6/2017 | Steinberg et al. |
| 9,704,250 B1 | | 7/2017 | Gilmour et al. |
| 9,716,825 B1 | | 7/2017 | Manzari et al. |
| 9,747,504 B2 | | 8/2017 | Ma et al. |
| 9,749,543 B2 | | 8/2017 | Kim et al. |
| 9,767,613 B1 | | 9/2017 | Bedikian et al. |
| 9,774,778 B2 | | 9/2017 | Miyakawa et al. |
| 9,785,323 B2 | | 10/2017 | Lu et al. |
| 9,819,912 B2 | | 11/2017 | Maruta |
| 9,852,768 B1 | | 12/2017 | Oh et al. |
| 9,874,933 B1 | | 1/2018 | Carryer |
| 9,913,246 B1 | | 3/2018 | Carey et al. |
| 9,928,411 B2 | | 3/2018 | Sugita et al. |
| 9,942,463 B2 | | 4/2018 | Kuo et al. |
| 9,967,467 B2 | | 5/2018 | Gao et al. |
| 9,973,674 B2 | | 5/2018 | Dye et al. |
| 9,990,727 B2 | | 6/2018 | Yoon et al. |
| 10,015,298 B2 | | 7/2018 | Yang et al. |
| 10,021,294 B2 | | 7/2018 | Kwon et al. |
| 10,025,462 B1 | | 7/2018 | Ledet |
| 10,027,903 B2 | | 7/2018 | Yim |
| 10,038,838 B2 | | 7/2018 | Castillo et al. |
| 10,055,887 B1 | | 8/2018 | Gil et al. |
| 10,091,411 B2 | | 10/2018 | Ha et al. |
| 10,104,282 B2 | | 10/2018 | Graham et al. |
| 10,127,639 B2 | | 11/2018 | Miura et al. |
| 10,148,886 B2 | | 12/2018 | Kim et al. |
| 10,152,222 B2 | | 12/2018 | Ozawa et al. |
| 10,176,622 B1 | | 1/2019 | Waggoner et al. |
| 10,187,587 B2 | | 1/2019 | Hasinoff et al. |
| 10,198,148 B2 | | 2/2019 | Shaw |
| 10,225,463 B2 | | 3/2019 | Yun et al. |
| 10,225,471 B2 | | 3/2019 | Poindexter, Jr. |
| 10,230,901 B2 | | 3/2019 | Harris et al. |
| 10,270,983 B1 | | 4/2019 | Van et al. |
| 10,277,829 B1 | | 4/2019 | Garrido et al. |
| 10,297,034 B2 | | 5/2019 | Nash et al. |
| 10,303,973 B2 | | 5/2019 | Nakada et al. |
| 10,304,231 B2 | | 5/2019 | Saito |
| 10,313,652 B1 | | 6/2019 | Falstrup et al. |
| 10,325,417 B1 | | 6/2019 | Scapel et al. |
| 10,326,942 B2 | | 6/2019 | Shabtay et al. |
| 10,372,765 B2 | | 8/2019 | Knaapen et al. |
| 10,397,469 B1 | | 8/2019 | Yan et al. |
| 10,397,500 B1 | | 8/2019 | Xu et al. |
| 10,447,908 B2 | | 10/2019 | Lee et al. |
| 10,467,729 B1 | | 11/2019 | Perera et al. |

(56) References Cited

U.S. PATENT DOCUMENTS

| 10,467,775 | B1 | 11/2019 | Waggoner et al. |
| 10,496,260 | B2 | 12/2019 | Zambetti et al. |
| 10,523,879 | B2 | 12/2019 | Dye et al. |
| 10,528,128 | B1 | 1/2020 | Yoon et al. |
| 10,528,243 | B2 | 1/2020 | Manzari et al. |
| 10,574,882 | B2 | 2/2020 | Chen |
| 10,574,895 | B2 | 2/2020 | Lee et al. |
| 10,585,551 | B2 | 3/2020 | Lee et al. |
| 10,614,139 | B2 | 4/2020 | Fujioka et al. |
| 10,638,058 | B2 | 4/2020 | Matsunaga |
| 10,645,294 | B1 | 5/2020 | Manzari et al. |
| 10,652,470 | B1 | 5/2020 | Manzari et al. |
| 10,666,856 | B1 | 5/2020 | Rueckner |
| 10,674,072 | B1 | 6/2020 | Manzari et al. |
| 10,681,282 | B1 | 6/2020 | Manzari et al. |
| 10,681,341 | B2 | 6/2020 | Lutter et al. |
| 10,735,642 | B1 | 8/2020 | Manzari et al. |
| 10,735,643 | B1 | 8/2020 | Manzari et al. |
| 10,791,273 | B1 | 9/2020 | Manzari et al. |
| 10,831,337 | B2 | 11/2020 | Agnoli et al. |
| 10,938,758 | B2 | 3/2021 | Allen et al. |
| 10,958,850 | B2 | 3/2021 | Kwak et al. |
| 11,032,535 | B2 | 6/2021 | Lutter et al. |
| 11,032,536 | B2 | 6/2021 | Lutter et al. |
| 11,039,074 | B1 | 6/2021 | Manzari et al. |
| 11,049,527 | B2 | 6/2021 | Zhang |
| 11,054,973 | B1 | 7/2021 | Manzari et al. |
| 11,070,717 | B2 | 7/2021 | Cragg et al. |
| 11,120,528 | B1 | 9/2021 | Seely et al. |
| 11,140,313 | B1 | 10/2021 | Knott |
| 11,204,692 | B2 | 12/2021 | Manzari et al. |
| 11,212,449 | B1 | 12/2021 | Manzari et al. |
| 11,350,026 | B1 | 5/2022 | Manzari et al. |
| 11,399,155 | B2 | 7/2022 | Van Os et al. |
| 11,418,699 | B1 | 8/2022 | Manzari et al. |
| 11,431,891 | B2 | 8/2022 | O'Leary et al. |
| 11,468,625 | B2 | 10/2022 | Manzari et al. |
| 11,490,017 | B2 | 11/2022 | Bernstein et al. |
| 11,539,876 | B2 | 12/2022 | Manzari et al. |
| 11,550,420 | B2 | 1/2023 | Bovet et al. |
| 11,568,517 | B2 | 1/2023 | Kaida |
| 11,570,359 | B2 | 1/2023 | Lee et al. |
| 11,606,496 | B2 | 3/2023 | Watanabe et al. |
| 11,687,224 | B2 | 6/2023 | Manzari et al. |
| 11,747,969 | B1 | 9/2023 | Karunamuni |
| 11,770,600 | B2 | 9/2023 | O'Leary et al. |
| 11,778,339 | B2 | 10/2023 | Manzari et al. |
| 11,811,961 | B2 | 11/2023 | Zhang et al. |
| 12,267,622 | B2 | 4/2025 | O'Leary et al. |
| 2002/0070945 | A1 | 6/2002 | Kage |
| 2002/0122031 | A1 | 9/2002 | Maglio et al. |
| 2002/0140803 | A1 | 10/2002 | Gutta et al. |
| 2002/0167604 | A1 | 11/2002 | Ban et al. |
| 2002/0171737 | A1 | 11/2002 | Tullis et al. |
| 2003/0001827 | A1 | 1/2003 | Gould et al. |
| 2003/0025802 | A1 | 2/2003 | Mayer et al. |
| 2003/0025812 | A1 | 2/2003 | Slatter et al. |
| 2003/0107664 | A1 | 6/2003 | Suzuki |
| 2003/0122930 | A1 | 7/2003 | Schofield et al. |
| 2003/0174216 | A1 | 9/2003 | Iguchi et al. |
| 2004/0041924 | A1 | 3/2004 | White et al. |
| 2004/0061796 | A1 | 4/2004 | Honda et al. |
| 2004/0090469 | A1 | 5/2004 | Moon et al. |
| 2004/0090546 | A1 | 5/2004 | Doron |
| 2004/0095473 | A1 | 5/2004 | Park |
| 2004/0201699 | A1 | 10/2004 | Parulski et al. |
| 2004/0207635 | A1 | 10/2004 | Miller et al. |
| 2004/0250217 | A1 | 12/2004 | Tojo et al. |
| 2005/0024517 | A1 | 2/2005 | Luciano |
| 2005/0027515 | A1 | 2/2005 | Huang et al. |
| 2005/0134695 | A1 | 6/2005 | Deshpande et al. |
| 2005/0189419 | A1 | 9/2005 | Igarashi et al. |
| 2005/0206981 | A1 | 9/2005 | Hung |
| 2005/0248660 | A1 | 11/2005 | Stavely et al. |
| 2005/0270397 | A1 | 12/2005 | Battles |
| 2006/0026521 | A1 | 2/2006 | Hotelling et al. |
| 2006/0033831 | A1 | 2/2006 | Ejima et al. |
| 2006/0132482 | A1 | 6/2006 | Oh et al. |
| 2006/0170781 | A1 | 8/2006 | Sobol |
| 2006/0170791 | A1 | 8/2006 | Porter et al. |
| 2006/0187322 | A1 | 8/2006 | Janson et al. |
| 2006/0209067 | A1 | 9/2006 | Pellacini et al. |
| 2006/0228040 | A1 | 10/2006 | Simon et al. |
| 2006/0233192 | A1 | 10/2006 | Mihara |
| 2006/0275025 | A1 | 12/2006 | Labaziewicz et al. |
| 2007/0025711 | A1 | 2/2007 | Marcus et al. |
| 2007/0025714 | A1 | 2/2007 | Shiraki |
| 2007/0025723 | A1 | 2/2007 | Baudisch et al. |
| 2007/0031062 | A1 | 2/2007 | Pal et al. |
| 2007/0040810 | A1 | 2/2007 | Dowe et al. |
| 2007/0097088 | A1 | 5/2007 | Battles |
| 2007/0109417 | A1 | 5/2007 | Hyttfors et al. |
| 2007/0113099 | A1 | 5/2007 | Takikawa et al. |
| 2007/0140675 | A1 | 6/2007 | Yanagi et al. |
| 2007/0146503 | A1 | 6/2007 | Shiraki |
| 2007/0153112 | A1 | 7/2007 | Ueda et al. |
| 2007/0165103 | A1 | 7/2007 | Arima et al. |
| 2007/0228259 | A1 | 10/2007 | Hohenberger |
| 2007/0254640 | A1 | 11/2007 | Bliss |
| 2007/0256029 | A1 | 11/2007 | Maxwell |
| 2007/0257992 | A1 | 11/2007 | Kato |
| 2007/0271528 | A1 | 11/2007 | Park et al. |
| 2007/0273769 | A1 | 11/2007 | Takahashi |
| 2007/0291152 | A1 | 12/2007 | Suekane et al. |
| 2008/0030592 | A1 | 2/2008 | Border et al. |
| 2008/0084484 | A1 | 4/2008 | Ochi et al. |
| 2008/0106601 | A1 | 5/2008 | Matsuda |
| 2008/0129759 | A1 | 6/2008 | Jeon et al. |
| 2008/0129825 | A1 | 6/2008 | Deangelis et al. |
| 2008/0143840 | A1 | 6/2008 | Corkum et al. |
| 2008/0146275 | A1 | 6/2008 | Tofflinger |
| 2008/0192020 | A1 | 8/2008 | Kang et al. |
| 2008/0215978 | A1 | 9/2008 | Bamba |
| 2008/0218611 | A1 | 9/2008 | Parulski et al. |
| 2008/0219654 | A1 | 9/2008 | Border et al. |
| 2008/0222558 | A1 | 9/2008 | Cho et al. |
| 2008/0259154 | A1 | 10/2008 | Garrison et al. |
| 2008/0284855 | A1 | 11/2008 | Umeyama et al. |
| 2008/0297587 | A1 | 12/2008 | Kurtz et al. |
| 2008/0309811 | A1 | 12/2008 | Fujinawa et al. |
| 2009/0007012 | A1 | 1/2009 | Mandic et al. |
| 2009/0009612 | A1 | 1/2009 | Tico et al. |
| 2009/0021576 | A1 | 1/2009 | Linder et al. |
| 2009/0021600 | A1 | 1/2009 | Watanabe |
| 2009/0022422 | A1 | 1/2009 | Sorek et al. |
| 2009/0027515 | A1 | 1/2009 | Maruyama et al. |
| 2009/0027539 | A1 | 1/2009 | Kunou |
| 2009/0040332 | A1 | 2/2009 | Yoshino et al. |
| 2009/0046097 | A1 | 2/2009 | Franklin |
| 2009/0051783 | A1 | 2/2009 | Kim et al. |
| 2009/0073285 | A1 | 3/2009 | Terashima |
| 2009/0102918 | A1 | 4/2009 | Sakamoto et al. |
| 2009/0102933 | A1 | 4/2009 | Harris et al. |
| 2009/0109316 | A1 | 4/2009 | Matsui |
| 2009/0132963 | A1 | 5/2009 | Mahesh et al. |
| 2009/0160778 | A1 | 6/2009 | Nurmi et al. |
| 2009/0167671 | A1 | 7/2009 | Kerofsky |
| 2009/0167672 | A1 | 7/2009 | Kerofsky |
| 2009/0167890 | A1 | 7/2009 | Nakagomi et al. |
| 2009/0175511 | A1 | 7/2009 | Lee et al. |
| 2009/0244318 | A1 | 10/2009 | Makii |
| 2009/0263044 | A1 | 10/2009 | Imagawa et al. |
| 2009/0268076 | A1 | 10/2009 | Kawamura et al. |
| 2009/0276700 | A1 | 11/2009 | Anderson et al. |
| 2009/0315671 | A1 | 12/2009 | Gocho et al. |
| 2009/0322901 | A1 | 12/2009 | Subbotin et al. |
| 2010/0020221 | A1 | 1/2010 | Tupman et al. |
| 2010/0020222 | A1 | 1/2010 | Jones et al. |
| 2010/0026637 | A1 | 2/2010 | Lai |
| 2010/0033615 | A1 | 2/2010 | Mori |
| 2010/0039394 | A1 | 2/2010 | Moussavi |
| 2010/0039522 | A1 | 2/2010 | Huang |
| 2010/0066853 | A1 | 3/2010 | Aoki et al. |
| 2010/0066889 | A1 | 3/2010 | Ueda et al. |

(56) References Cited

U.S. PATENT DOCUMENTS

| | | |
|---|---|---|
| 2010/0066890 A1 | 3/2010 | Ueda et al. |
| 2010/0066895 A1 | 3/2010 | Ueda et al. |
| 2010/0093400 A1 | 4/2010 | Ju et al. |
| 2010/0097322 A1 | 4/2010 | Hu et al. |
| 2010/0123737 A1 | 5/2010 | Williamson et al. |
| 2010/0141609 A1 | 6/2010 | Frisbee |
| 2010/0141786 A1 | 6/2010 | Bigioi et al. |
| 2010/0141787 A1 | 6/2010 | Bigioi et al. |
| 2010/0162160 A1 | 6/2010 | Stallings et al. |
| 2010/0164893 A1 | 7/2010 | Shin et al. |
| 2010/0173678 A1 | 7/2010 | Kim et al. |
| 2010/0185970 A1 | 7/2010 | Benenson |
| 2010/0194931 A1 | 8/2010 | Kawaguchi et al. |
| 2010/0208122 A1 | 8/2010 | Yumiki |
| 2010/0231777 A1 | 9/2010 | Shintani et al. |
| 2010/0232703 A1 | 9/2010 | Aiso |
| 2010/0232704 A1 | 9/2010 | Thorn |
| 2010/0238327 A1 | 9/2010 | Griffith et al. |
| 2010/0245287 A1 | 9/2010 | Thorn |
| 2010/0259645 A1 | 10/2010 | Kaplan et al. |
| 2010/0281374 A1 | 11/2010 | Schulz et al. |
| 2010/0283743 A1 | 11/2010 | Coddington |
| 2010/0289825 A1 | 11/2010 | Shin et al. |
| 2010/0289910 A1 | 11/2010 | Kamshilin et al. |
| 2010/0302280 A1 | 12/2010 | Szeliski et al. |
| 2010/0306702 A1 | 12/2010 | Warner et al. |
| 2010/0328513 A1* | 12/2010 | Ryu ..................... H04N 23/62 |
| | | 348/E5.022 |
| 2011/0008033 A1 | 1/2011 | Ichimiya et al. |
| 2011/0013049 A1 | 1/2011 | Thörn |
| 2011/0018970 A1 | 1/2011 | Wakabayashi |
| 2011/0019058 A1 | 1/2011 | Sakai et al. |
| 2011/0019655 A1 | 1/2011 | Hakola |
| 2011/0032377 A1 | 2/2011 | Kim et al. |
| 2011/0043662 A1 | 2/2011 | Kim |
| 2011/0058052 A1 | 3/2011 | Bolton et al. |
| 2011/0074710 A1 | 3/2011 | Weeldreyer et al. |
| 2011/0074830 A1 | 3/2011 | Rapp et al. |
| 2011/0085016 A1 | 4/2011 | Kristiansen et al. |
| 2011/0090155 A1 | 4/2011 | Caskey et al. |
| 2011/0109581 A1 | 5/2011 | Ozawa et al. |
| 2011/0115932 A1 | 5/2011 | Shin et al. |
| 2011/0138332 A1 | 6/2011 | Miyagawa |
| 2011/0157379 A1 | 6/2011 | Kimura |
| 2011/0176039 A1 | 7/2011 | Lo |
| 2011/0187879 A1 | 8/2011 | Ochial |
| 2011/0199495 A1 | 8/2011 | Laberge et al. |
| 2011/0234853 A1 | 9/2011 | Hayashi et al. |
| 2011/0242369 A1 | 10/2011 | Misawa et al. |
| 2011/0249078 A1 | 10/2011 | Abuan et al. |
| 2011/0254977 A1 | 10/2011 | Ozaki |
| 2011/0258537 A1 | 10/2011 | Rives et al. |
| 2012/0002098 A1 | 1/2012 | Ueda |
| 2012/0002898 A1 | 1/2012 | Côté et al. |
| 2012/0026378 A1 | 2/2012 | Pang et al. |
| 2012/0056997 A1 | 3/2012 | Jang |
| 2012/0069206 A1 | 3/2012 | Hsieh |
| 2012/0105579 A1 | 5/2012 | Jeon et al. |
| 2012/0106790 A1 | 5/2012 | Sultana et al. |
| 2012/0120277 A1 | 5/2012 | Tsai et al. |
| 2012/0127189 A1 | 5/2012 | Park et al. |
| 2012/0127346 A1 | 5/2012 | Sato et al. |
| 2012/0133797 A1 | 5/2012 | Sato et al. |
| 2012/0162242 A1 | 6/2012 | Amano et al. |
| 2012/0162455 A1 | 6/2012 | Kim et al. |
| 2012/0169776 A1 | 7/2012 | Rissa et al. |
| 2012/0194559 A1 | 8/2012 | Lim |
| 2012/0206619 A1 | 8/2012 | Nitta et al. |
| 2012/0206621 A1 | 8/2012 | Chen et al. |
| 2012/0218305 A1 | 8/2012 | Patterson et al. |
| 2012/0226978 A1 | 9/2012 | Harberts et al. |
| 2012/0235990 A1 | 9/2012 | Yamaji |
| 2012/0243802 A1 | 9/2012 | Fintel et al. |
| 2012/0249853 A1 | 10/2012 | Krolczyk et al. |
| 2012/0272144 A1 | 10/2012 | Radakovitz et al. |
| 2012/0274830 A1 | 11/2012 | Kameyama et al. |
| 2012/0293611 A1 | 11/2012 | Lee |
| 2012/0306788 A1 | 12/2012 | Chen et al. |
| 2012/0308209 A1 | 12/2012 | Zaletel |
| 2012/0313973 A1 | 12/2012 | Li et al. |
| 2012/0320141 A1 | 12/2012 | Bowen et al. |
| 2013/0010170 A1 | 1/2013 | Matsuzawa et al. |
| 2013/0019173 A1 | 1/2013 | Kotler et al. |
| 2013/0019174 A1 | 1/2013 | Gil et al. |
| 2013/0019182 A1 | 1/2013 | Gil et al. |
| 2013/0038546 A1 | 2/2013 | Mineo |
| 2013/0038771 A1 | 2/2013 | Brunner et al. |
| 2013/0055119 A1 | 2/2013 | Luong |
| 2013/0057472 A1 | 3/2013 | Dizac et al. |
| 2013/0076908 A1 | 3/2013 | Bratton et al. |
| 2013/0083222 A1 | 4/2013 | Matsuzawa et al. |
| 2013/0088614 A1 | 4/2013 | Lee |
| 2013/0093904 A1 | 4/2013 | Wagner et al. |
| 2013/0120386 A1 | 5/2013 | Wilensky et al. |
| 2013/0135315 A1 | 5/2013 | Bares et al. |
| 2013/0141362 A1 | 6/2013 | Asanuma et al. |
| 2013/0141524 A1 | 6/2013 | Karunamuni et al. |
| 2013/0155308 A1 | 6/2013 | Wu et al. |
| 2013/0155474 A1 | 6/2013 | Roach et al. |
| 2013/0179831 A1 | 7/2013 | Izaki |
| 2013/0194378 A1 | 8/2013 | Brown |
| 2013/0201307 A1 | 8/2013 | Schloter et al. |
| 2013/0201354 A1 | 8/2013 | Lascolea et al. |
| 2013/0208136 A1 | 8/2013 | Takatsuka et al. |
| 2013/0210563 A1 | 8/2013 | Hollinger |
| 2013/0219340 A1 | 8/2013 | Linge |
| 2013/0222663 A1 | 8/2013 | Rydenhag et al. |
| 2013/0222671 A1 | 8/2013 | Tseng et al. |
| 2013/0235222 A1 | 9/2013 | Karn et al. |
| 2013/0235226 A1 | 9/2013 | Karn et al. |
| 2013/0235234 A1 | 9/2013 | Cucci et al. |
| 2013/0239057 A1 | 9/2013 | Ubillos et al. |
| 2013/0246948 A1 | 9/2013 | Chen et al. |
| 2013/0265311 A1 | 10/2013 | Na et al. |
| 2013/0265467 A1 | 10/2013 | Matsuzawa et al. |
| 2013/0278710 A1 | 10/2013 | Mock |
| 2013/0286251 A1 | 10/2013 | Wood et al. |
| 2013/0311186 A1 | 11/2013 | Lee et al. |
| 2013/0321340 A1 | 12/2013 | Seo et al. |
| 2013/0329074 A1 | 12/2013 | Zhang et al. |
| 2013/0336545 A1 | 12/2013 | Pritikin et al. |
| 2013/0346916 A1 | 12/2013 | Williamson et al. |
| 2014/0007019 A1 | 1/2014 | Saukko et al. |
| 2014/0007021 A1 | 1/2014 | Akiyama et al. |
| 2014/0009639 A1 | 1/2014 | Lee |
| 2014/0022399 A1 | 1/2014 | Rashid et al. |
| 2014/0026099 A1 | 1/2014 | Andersson Reimer et al. |
| 2014/0028872 A1 | 1/2014 | Lee et al. |
| 2014/0028885 A1 | 1/2014 | Ma et al. |
| 2014/0033043 A1 | 1/2014 | Kashima |
| 2014/0033100 A1 | 1/2014 | Noda et al. |
| 2014/0043368 A1 | 2/2014 | Yu |
| 2014/0043517 A1 | 2/2014 | Yim et al. |
| 2014/0047389 A1 | 2/2014 | Aarabi |
| 2014/0049536 A1 | 2/2014 | Neuman et al. |
| 2014/0063313 A1 | 3/2014 | Choi et al. |
| 2014/0071061 A1 | 3/2014 | Lin et al. |
| 2014/0071325 A1 | 3/2014 | Kawahara et al. |
| 2014/0078371 A1 | 3/2014 | Kinoshita |
| 2014/0092100 A1 | 4/2014 | Chen |
| 2014/0092272 A1 | 4/2014 | Choi |
| 2014/0095122 A1 | 4/2014 | Appleman et al. |
| 2014/0104449 A1 | 4/2014 | Masarik et al. |
| 2014/0118560 A1 | 5/2014 | Bala et al. |
| 2014/0118563 A1 | 5/2014 | Mehta et al. |
| 2014/0123063 A1 | 5/2014 | Hwang et al. |
| 2014/0132735 A1 | 5/2014 | Lee et al. |
| 2014/0143678 A1 | 5/2014 | Mistry et al. |
| 2014/0152886 A1 | 6/2014 | Morgan-Mar et al. |
| 2014/0157200 A1 | 6/2014 | Jeon |
| 2014/0160231 A1 | 6/2014 | Middleton et al. |
| 2014/0160304 A1 | 6/2014 | Galor et al. |
| 2014/0160316 A1 | 6/2014 | Hwang |
| 2014/0176469 A1 | 6/2014 | Lim |

(56)  References Cited

U.S. PATENT DOCUMENTS

| | | |
|---|---|---|
| 2014/0176565 A1 | 6/2014 | Adeyoola et al. |
| 2014/0184524 A1 | 7/2014 | Schiefer et al. |
| 2014/0192212 A1 | 7/2014 | He et al. |
| 2014/0192217 A1 | 7/2014 | Kim et al. |
| 2014/0192232 A1 | 7/2014 | Park et al. |
| 2014/0192233 A1 | 7/2014 | Kakkori et al. |
| 2014/0198242 A1* | 7/2014 | Weng ................... H04N 23/743 348/333.09 |
| 2014/0201672 A1 | 7/2014 | Borzello et al. |
| 2014/0204229 A1 | 7/2014 | Leung et al. |
| 2014/0218599 A1 | 8/2014 | Nakamura et al. |
| 2014/0226052 A1 | 8/2014 | Kang et al. |
| 2014/0232838 A1 | 8/2014 | Jorgensen et al. |
| 2014/0232921 A1 | 8/2014 | Kim et al. |
| 2014/0240471 A1 | 8/2014 | Srinivasa et al. |
| 2014/0240531 A1 | 8/2014 | Nakai et al. |
| 2014/0240551 A1 | 8/2014 | Kim et al. |
| 2014/0240577 A1 | 8/2014 | Masugi |
| 2014/0267126 A1 | 9/2014 | Åberg et al. |
| 2014/0267867 A1 | 9/2014 | Lee et al. |
| 2014/0281966 A1 | 9/2014 | Kajiyama et al. |
| 2014/0281983 A1 | 9/2014 | Xian et al. |
| 2014/0282223 A1 | 9/2014 | Bastien et al. |
| 2014/0285698 A1 | 9/2014 | Geiss |
| 2014/0300722 A1 | 10/2014 | Garcia |
| 2014/0300779 A1 | 10/2014 | Yeo et al. |
| 2014/0307147 A1 | 10/2014 | Hanzawa et al. |
| 2014/0310598 A1 | 10/2014 | Sprague et al. |
| 2014/0327639 A1 | 11/2014 | Papakipos et al. |
| 2014/0333671 A1 | 11/2014 | Phang et al. |
| 2014/0333790 A1 | 11/2014 | Wakazono |
| 2014/0333824 A1 | 11/2014 | Xiu |
| 2014/0337748 A1 | 11/2014 | Lee |
| 2014/0351753 A1 | 11/2014 | Shin et al. |
| 2014/0354845 A1 | 12/2014 | Mølgaard et al. |
| 2014/0359438 A1 | 12/2014 | Matsuki |
| 2014/0362105 A1 | 12/2014 | Kocienda et al. |
| 2014/0362274 A1 | 12/2014 | Christie et al. |
| 2014/0364228 A1 | 12/2014 | Rimon |
| 2014/0368601 A1 | 12/2014 | Decharms |
| 2014/0368719 A1 | 12/2014 | Kaneko et al. |
| 2014/0372856 A1 | 12/2014 | Radakovitz et al. |
| 2014/0375862 A1 | 12/2014 | Kim et al. |
| 2015/0002724 A1* | 1/2015 | Chuang ................ H04N 23/631 348/346 |
| 2015/0022649 A1 | 1/2015 | Koppal |
| 2015/0022674 A1 | 1/2015 | Koss et al. |
| 2015/0033129 A1 | 1/2015 | Cho et al. |
| 2015/0033188 A1 | 1/2015 | Devi |
| 2015/0042852 A1 | 2/2015 | Lee et al. |
| 2015/0043806 A1 | 2/2015 | Sunkavalli et al. |
| 2015/0049233 A1 | 2/2015 | Choi |
| 2015/0067513 A1 | 3/2015 | Zambetti et al. |
| 2015/0070362 A1 | 3/2015 | Hirai |
| 2015/0078726 A1 | 3/2015 | Shakib et al. |
| 2015/0085174 A1 | 3/2015 | Shabtay et al. |
| 2015/0092077 A1 | 4/2015 | Feder et al. |
| 2015/0103149 A1 | 4/2015 | Mcnamer et al. |
| 2015/0109417 A1 | 4/2015 | Zirnheld |
| 2015/0116353 A1 | 4/2015 | Miura et al. |
| 2015/0116448 A1 | 4/2015 | Gottlieb |
| 2015/0116546 A1 | 4/2015 | Tanaka |
| 2015/0135109 A1 | 5/2015 | Zambetti et al. |
| 2015/0135234 A1 | 5/2015 | Hall |
| 2015/0138079 A1 | 5/2015 | Lannsjö |
| 2015/0145950 A1 | 5/2015 | Murphy et al. |
| 2015/0146079 A1 | 5/2015 | Kim |
| 2015/0150141 A1 | 5/2015 | Szymanski et al. |
| 2015/0172534 A1 | 6/2015 | Miyakawa et al. |
| 2015/0181135 A1 | 6/2015 | Shimosato |
| 2015/0189138 A1 | 7/2015 | Xie et al. |
| 2015/0189162 A1 | 7/2015 | Kuo et al. |
| 2015/0194186 A1 | 7/2015 | Lee et al. |
| 2015/0201130 A1 | 7/2015 | Cho et al. |
| 2015/0207924 A1 | 7/2015 | Kim et al. |
| 2015/0208001 A1 | 7/2015 | Nonaka et al. |
| 2015/0220249 A1 | 8/2015 | Snibbe et al. |
| 2015/0229838 A1 | 8/2015 | Hakim et al. |
| 2015/0242982 A1 | 8/2015 | Choi et al. |
| 2015/0248198 A1 | 9/2015 | Somlai et al. |
| 2015/0248583 A1 | 9/2015 | Sekine et al. |
| 2015/0249775 A1 | 9/2015 | Jacum |
| 2015/0249785 A1 | 9/2015 | Mehta et al. |
| 2015/0254855 A1 | 9/2015 | Patankar et al. |
| 2015/0254868 A1 | 9/2015 | Srikanth et al. |
| 2015/0256749 A1 | 9/2015 | Frey et al. |
| 2015/0256757 A1 | 9/2015 | Marriott et al. |
| 2015/0264202 A1 | 9/2015 | Pawlowski |
| 2015/0277686 A1 | 10/2015 | Laforge et al. |
| 2015/0281585 A1 | 10/2015 | Guldogan |
| 2015/0286724 A1 | 10/2015 | Knaapen et al. |
| 2015/0289104 A1 | 10/2015 | Jung et al. |
| 2015/0297185 A1 | 10/2015 | McCormack et al. |
| 2015/0301731 A1 | 10/2015 | Okamoto et al. |
| 2015/0302116 A1 | 10/2015 | Howell |
| 2015/0310583 A1 | 10/2015 | Hume et al. |
| 2015/0312185 A1 | 10/2015 | Langholz et al. |
| 2015/0334291 A1 | 11/2015 | Cho et al. |
| 2015/0334292 A1 | 11/2015 | Tartz et al. |
| 2015/0334293 A1 | 11/2015 | Jeung |
| 2015/0341536 A1 | 11/2015 | Huang et al. |
| 2015/0346994 A1 | 12/2015 | Chanyontpatanakul |
| 2015/0350141 A1 | 12/2015 | Yang et al. |
| 2015/0350523 A1 | 12/2015 | Kinoshita |
| 2015/0350533 A1 | 12/2015 | Harris et al. |
| 2015/0350535 A1 | 12/2015 | Voss |
| 2015/0362729 A1 | 12/2015 | Jang et al. |
| 2015/0362998 A1 | 12/2015 | Park et al. |
| 2015/0365587 A1 | 12/2015 | Ha et al. |
| 2015/0370458 A1 | 12/2015 | Chen |
| 2015/0373257 A1* | 12/2015 | Shirakawa ........... H04N 23/959 348/333.12 |
| 2015/0378600 A1 | 12/2015 | Sloan et al. |
| 2016/0012567 A1 | 1/2016 | Siddiqui et al. |
| 2016/0026371 A1 | 1/2016 | Lu et al. |
| 2016/0037056 A1 | 2/2016 | Takahashi et al. |
| 2016/0044236 A1 | 2/2016 | Matsuzawa et al. |
| 2016/0048598 A1 | 2/2016 | Fujioka et al. |
| 2016/0048599 A1 | 2/2016 | Fujioka et al. |
| 2016/0048725 A1 | 2/2016 | Holz et al. |
| 2016/0048903 A1 | 2/2016 | Fujioka et al. |
| 2016/0050351 A1 | 2/2016 | Lee et al. |
| 2016/0050446 A1 | 2/2016 | Fujioka et al. |
| 2016/0065832 A1 | 3/2016 | Kim et al. |
| 2016/0065861 A1 | 3/2016 | Steinberg et al. |
| 2016/0065930 A1 | 3/2016 | Chandra et al. |
| 2016/0080639 A1 | 3/2016 | Choi et al. |
| 2016/0080657 A1 | 3/2016 | Chuang et al. |
| 2016/0088280 A1 | 3/2016 | Sadi et al. |
| 2016/0098094 A1 | 4/2016 | Minkkinen |
| 2016/0117829 A1 | 4/2016 | Yoon et al. |
| 2016/0119552 A1 | 4/2016 | Oh et al. |
| 2016/0127638 A1 | 5/2016 | Guo et al. |
| 2016/0127645 A1 | 5/2016 | Sudo |
| 2016/0132201 A1 | 5/2016 | Shaw et al. |
| 2016/0142649 A1 | 5/2016 | Yim |
| 2016/0148384 A1 | 5/2016 | Bud et al. |
| 2016/0162039 A1 | 6/2016 | Eilat et al. |
| 2016/0173869 A1 | 6/2016 | Srikanth et al. |
| 2016/0188181 A1 | 6/2016 | Smith |
| 2016/0212319 A1 | 7/2016 | Harris et al. |
| 2016/0219212 A1 | 7/2016 | Shoji |
| 2016/0219217 A1 | 7/2016 | Williams et al. |
| 2016/0225175 A1 | 8/2016 | Kim et al. |
| 2016/0227016 A1 | 8/2016 | Kim et al. |
| 2016/0241767 A1 | 8/2016 | Cho et al. |
| 2016/0241793 A1 | 8/2016 | Shanmugavadivelu et al. |
| 2016/0246457 A1 | 8/2016 | Goldenberg |
| 2016/0247288 A1 | 8/2016 | Omori et al. |
| 2016/0255268 A1 | 9/2016 | Kang et al. |
| 2016/0259413 A1 | 9/2016 | Anzures et al. |
| 2016/0259518 A1 | 9/2016 | King et al. |
| 2016/0283097 A1 | 9/2016 | Voss et al. |
| 2016/0283586 A1 | 9/2016 | Thapliyal et al. |

(56) References Cited

U.S. PATENT DOCUMENTS

| | | |
|---|---|---|
| 2016/0284123 A1 | 9/2016 | Hare et al. |
| 2016/0287067 A1 | 10/2016 | Fan |
| 2016/0301861 A1* | 10/2016 | Miao .................... H04N 23/743 |
| 2016/0307045 A1 | 10/2016 | Ma et al. |
| 2016/0307324 A1 | 10/2016 | Higuchi et al. |
| 2016/0316147 A1 | 10/2016 | Bernstein et al. |
| 2016/0320923 A1 | 11/2016 | Hossain et al. |
| 2016/0330384 A1 | 11/2016 | Park et al. |
| 2016/0337570 A1 | 11/2016 | Tan et al. |
| 2016/0337582 A1 | 11/2016 | Shimauchi et al. |
| 2016/0353030 A1 | 12/2016 | Tang et al. |
| 2016/0357353 A1 | 12/2016 | Miura et al. |
| 2016/0357387 A1 | 12/2016 | Bovet et al. |
| 2016/0360097 A1 | 12/2016 | Penha et al. |
| 2016/0360116 A1 | 12/2016 | Penha et al. |
| 2016/0364089 A1 | 12/2016 | Blackman et al. |
| 2016/0366323 A1 | 12/2016 | Chen et al. |
| 2016/0366344 A1 | 12/2016 | Pan et al. |
| 2016/0373650 A1 | 12/2016 | Kim et al. |
| 2017/0006210 A1 | 1/2017 | Dye et al. |
| 2017/0011773 A1 | 1/2017 | Lee |
| 2017/0013179 A1 | 1/2017 | Kang et al. |
| 2017/0019604 A1 | 1/2017 | Kim et al. |
| 2017/0024872 A1 | 1/2017 | Olsson et al. |
| 2017/0026565 A1 | 1/2017 | Hong et al. |
| 2017/0032269 A1 | 2/2017 | Portilla et al. |
| 2017/0034449 A1 | 2/2017 | Eum et al. |
| 2017/0038852 A1 | 2/2017 | Hildreth et al. |
| 2017/0039686 A1 | 2/2017 | Miura et al. |
| 2017/0041677 A1 | 2/2017 | Anderson et al. |
| 2017/0048450 A1 | 2/2017 | Lee et al. |
| 2017/0048461 A1 | 2/2017 | Lee et al. |
| 2017/0048494 A1 | 2/2017 | Boyle et al. |
| 2017/0054960 A1 | 2/2017 | Chien et al. |
| 2017/0061635 A1 | 3/2017 | Petrovich et al. |
| 2017/0061953 A1 | 3/2017 | An et al. |
| 2017/0064200 A1 | 3/2017 | Castillo et al. |
| 2017/0064205 A1 | 3/2017 | Choi et al. |
| 2017/0064213 A1 | 3/2017 | Windmark et al. |
| 2017/0091906 A1* | 3/2017 | Liang ........................ G06T 7/11 |
| 2017/0092329 A1 | 3/2017 | Kim et al. |
| 2017/0094132 A1 | 3/2017 | Miyata |
| 2017/0094161 A1 | 3/2017 | Graham et al. |
| 2017/0109604 A1 | 4/2017 | Graham et al. |
| 2017/0109912 A1 | 4/2017 | Lee et al. |
| 2017/0111567 A1 | 4/2017 | Pila |
| 2017/0134605 A1 | 5/2017 | Ju et al. |
| 2017/0134807 A1 | 5/2017 | Shaw et al. |
| 2017/0139572 A1 | 5/2017 | Sunkavalli et al. |
| 2017/0186162 A1 | 6/2017 | Mihic et al. |
| 2017/0192627 A1 | 7/2017 | Agnoli et al. |
| 2017/0220212 A1 | 8/2017 | Yang et al. |
| 2017/0230576 A1 | 8/2017 | Sparks et al. |
| 2017/0230585 A1 | 8/2017 | Nash et al. |
| 2017/0237888 A1 | 8/2017 | Harris et al. |
| 2017/0243389 A1 | 8/2017 | Wild et al. |
| 2017/0244896 A1 | 8/2017 | Chien et al. |
| 2017/0244897 A1 | 8/2017 | Jung et al. |
| 2017/0257559 A1 | 9/2017 | Stricker |
| 2017/0257596 A1 | 9/2017 | Murata et al. |
| 2017/0264817 A1 | 9/2017 | Yan et al. |
| 2017/0272654 A1 | 9/2017 | Poindexter, Jr. |
| 2017/0285764 A1 | 10/2017 | Kim et al. |
| 2017/0287220 A1 | 10/2017 | Khalid et al. |
| 2017/0289462 A1 | 10/2017 | Eum et al. |
| 2017/0302840 A1 | 10/2017 | Hasinoff et al. |
| 2017/0315772 A1 | 11/2017 | Lee et al. |
| 2017/0336961 A1 | 11/2017 | Heo et al. |
| 2017/0352379 A1 | 12/2017 | Oh et al. |
| 2017/0354888 A1 | 12/2017 | Benedetto et al. |
| 2017/0358071 A1 | 12/2017 | Yamaoka et al. |
| 2017/0359504 A1 | 12/2017 | Manzari et al. |
| 2017/0359505 A1 | 12/2017 | Manzari et al. |
| 2017/0359506 A1 | 12/2017 | Manzari et al. |
| 2017/0366729 A1 | 12/2017 | Itoh |
| 2017/0371844 A1 | 12/2017 | Yao |
| 2018/0001198 A1 | 1/2018 | Frappiea |
| 2018/0007315 A1 | 1/2018 | Kim et al. |
| 2018/0013949 A1 | 1/2018 | Han |
| 2018/0021684 A1 | 1/2018 | Benedetto |
| 2018/0035031 A1 | 2/2018 | Kwak et al. |
| 2018/0047200 A1 | 2/2018 | O'Hara et al. |
| 2018/0052571 A1 | 2/2018 | Seol et al. |
| 2018/0077332 A1 | 3/2018 | Shimura et al. |
| 2018/0081502 A1 | 3/2018 | Sangco et al. |
| 2018/0088787 A1 | 3/2018 | Bereza et al. |
| 2018/0091728 A1 | 3/2018 | Brown et al. |
| 2018/0096202 A1 | 4/2018 | Stathacopoulos et al. |
| 2018/0096487 A1 | 4/2018 | Nash et al. |
| 2018/0109722 A1 | 4/2018 | Laroia et al. |
| 2018/0113577 A1 | 4/2018 | Burns et al. |
| 2018/0114543 A1 | 4/2018 | Novikoff |
| 2018/0120661 A1 | 5/2018 | Kilgore et al. |
| 2018/0124299 A1 | 5/2018 | Brook |
| 2018/0129224 A1 | 5/2018 | Hur |
| 2018/0131876 A1 | 5/2018 | Bernstein et al. |
| 2018/0144776 A1 | 5/2018 | Zhang |
| 2018/0146132 A1 | 5/2018 | Manzari et al. |
| 2018/0152611 A1 | 5/2018 | Li et al. |
| 2018/0184008 A1 | 6/2018 | Kondo |
| 2018/0184061 A1 | 6/2018 | Kitsunal et al. |
| 2018/0198985 A1 | 7/2018 | Ishitsuka |
| 2018/0199025 A1 | 7/2018 | Holzer et al. |
| 2018/0213144 A1 | 7/2018 | Kim et al. |
| 2018/0227479 A1 | 8/2018 | Parameswaran et al. |
| 2018/0227482 A1 | 8/2018 | Holzer et al. |
| 2018/0227505 A1 | 8/2018 | Baltz et al. |
| 2018/0234608 A1 | 8/2018 | Sudo et al. |
| 2018/0239930 A1 | 8/2018 | Lai et al. |
| 2018/0262677 A1 | 9/2018 | Dye et al. |
| 2018/0270420 A1 | 9/2018 | Lee et al. |
| 2018/0278823 A1 | 9/2018 | Horesh |
| 2018/0278837 A1 | 9/2018 | Lee et al. |
| 2018/0284979 A1 | 10/2018 | Choi et al. |
| 2018/0288310 A1 | 10/2018 | Goldenberg |
| 2018/0302551 A1 | 10/2018 | Yamajo et al. |
| 2018/0302568 A1 | 10/2018 | Kim et al. |
| 2018/0308282 A1 | 10/2018 | Yokoi |
| 2018/0335901 A1 | 11/2018 | Manzari et al. |
| 2018/0343383 A1 | 11/2018 | Ito et al. |
| 2018/0349008 A1 | 12/2018 | Manzari et al. |
| 2018/0349659 A1 | 12/2018 | Manzari et al. |
| 2018/0352165 A1 | 12/2018 | Zhen et al. |
| 2018/0376122 A1 | 12/2018 | Park et al. |
| 2019/0007589 A1 | 1/2019 | Kadambala et al. |
| 2019/0028650 A1 | 1/2019 | Bernstein et al. |
| 2019/0029513 A1 | 1/2019 | Gunnerson et al. |
| 2019/0051032 A1 | 2/2019 | Chu et al. |
| 2019/0082097 A1 | 3/2019 | Manzari et al. |
| 2019/0089873 A1 | 3/2019 | Misawa et al. |
| 2019/0108684 A1 | 4/2019 | Callaghan |
| 2019/0109979 A1 | 4/2019 | Chien et al. |
| 2019/0114740 A1 | 4/2019 | Ogino et al. |
| 2019/0121216 A1 | 4/2019 | Shabtay et al. |
| 2019/0138259 A1 | 5/2019 | Bagaria et al. |
| 2019/0141030 A1 | 5/2019 | Cockerill et al. |
| 2019/0149706 A1 | 5/2019 | Rivard et al. |
| 2019/0174054 A1 | 6/2019 | Srivastava et al. |
| 2019/0199926 A1 | 6/2019 | An et al. |
| 2019/0206031 A1 | 7/2019 | Kim et al. |
| 2019/0215452 A1 | 7/2019 | Chen |
| 2019/0222769 A1 | 7/2019 | Srivastava et al. |
| 2019/0235743 A1 | 8/2019 | Ono |
| 2019/0286406 A1 | 9/2019 | Chen |
| 2019/0289201 A1 | 9/2019 | Nishimura et al. |
| 2019/0289271 A1 | 9/2019 | Paulus et al. |
| 2019/0318538 A1 | 10/2019 | Li et al. |
| 2019/0378423 A1 | 12/2019 | Bachrach et al. |
| 2019/0379821 A1 | 12/2019 | Kobayashi et al. |
| 2019/0379837 A1 | 12/2019 | Kim et al. |
| 2020/0053288 A1 | 2/2020 | Kim et al. |
| 2020/0059605 A1 | 2/2020 | Liu et al. |
| 2020/0068121 A1 | 2/2020 | Wang |
| 2020/0082599 A1* | 3/2020 | Manzari .............. G06F 3/04847 |

(56) References Cited

U.S. PATENT DOCUMENTS

| | | | |
|---|---|---|---|
| 2020/0105003 A1 | 4/2020 | Stauber et al. | |
| 2020/0105041 A1 | 4/2020 | Garofalo et al. | |
| 2020/0106965 A1 | 4/2020 | Malia et al. | |
| 2020/0112692 A1 | 4/2020 | Ling et al. | |
| 2020/0128191 A1 | 4/2020 | Sun et al. | |
| 2020/0142577 A1 | 5/2020 | Manzari et al. | |
| 2020/0174552 A1 | 6/2020 | Stafford et al. | |
| 2020/0204725 A1 | 6/2020 | Li | |
| 2020/0221020 A1 | 7/2020 | Manzari et al. | |
| 2020/0236278 A1 | 7/2020 | Yeung et al. | |
| 2020/0244879 A1 | 7/2020 | Hohjoh | |
| 2020/0250874 A1 | 8/2020 | Assouline et al. | |
| 2020/0267318 A1 | 8/2020 | Lee et al. | |
| 2020/0285806 A1 | 9/2020 | Radakovitz et al. | |
| 2020/0336660 A1 | 10/2020 | Dong et al. | |
| 2020/0336674 A1 | 10/2020 | Bernstein et al. | |
| 2020/0342613 A1 | 10/2020 | Altuev et al. | |
| 2020/0358963 A1 | 11/2020 | Manzari et al. | |
| 2020/0382723 A1 | 12/2020 | Pena et al. | |
| 2020/0410763 A1 | 12/2020 | Hare et al. | |
| 2021/0003847 A1 | 1/2021 | Tanaka et al. | |
| 2021/0051275 A1 | 2/2021 | Brown et al. | |
| 2021/0067749 A1 | 3/2021 | Yadav et al. | |
| 2021/0081093 A1 | 3/2021 | Yun et al. | |
| 2021/0097695 A1 | 4/2021 | Lundberg et al. | |
| 2021/0141227 A1 | 5/2021 | Iwasa | |
| 2021/0146838 A1 | 5/2021 | Goseberg et al. | |
| 2021/0160431 A1 | 5/2021 | Chen et al. | |
| 2021/0168300 A1 | 6/2021 | Wang et al. | |
| 2021/0191582 A1 | 6/2021 | Agnoli et al. | |
| 2021/0195093 A1 | 6/2021 | Manzari et al. | |
| 2021/0201953 A1 | 7/2021 | Takahashi et al. | |
| 2021/0266447 A1 | 8/2021 | Ding et al. | |
| 2021/0281746 A1 | 9/2021 | Fleizach et al. | |
| 2021/0286510 A1 | 9/2021 | Tyler et al. | |
| 2021/0287343 A1 | 9/2021 | Kaida | |
| 2021/0318798 A1 | 10/2021 | Manzari et al. | |
| 2021/0344845 A1 | 11/2021 | Li et al. | |
| 2021/0373750 A1 | 12/2021 | Manzari et al. | |
| 2021/0382559 A1 | 12/2021 | Segev et al. | |
| 2021/0389850 A1 | 12/2021 | Charlton et al. | |
| 2021/0397338 A1 | 12/2021 | Davydov et al. | |
| 2022/0006946 A1 | 1/2022 | Missig et al. | |
| 2022/0044459 A1 | 2/2022 | Zacharia et al. | |
| 2022/0047377 A1 | 2/2022 | Seedhom et al. | |
| 2022/0053126 A1 | 2/2022 | Zhao et al. | |
| 2022/0053142 A1 | 2/2022 | Manzari et al. | |
| 2022/0057984 A1 | 2/2022 | Yang et al. | |
| 2022/0070380 A1 | 3/2022 | Bernstein et al. | |
| 2022/0070385 A1 | 3/2022 | Van Os et al. | |
| 2022/0086336 A1 | 3/2022 | Zhang | |
| 2022/0103758 A1 | 3/2022 | Manzari et al. | |
| 2022/0124241 A1 | 4/2022 | Manzari et al. | |
| 2022/0134226 A1 | 5/2022 | Takura et al. | |
| 2022/0150345 A1 | 5/2022 | Woo et al. | |
| 2022/0207838 A1 | 6/2022 | Anvaripour et al. | |
| 2022/0210328 A1 | 6/2022 | Anvaripour et al. | |
| 2022/0210337 A1 | 6/2022 | Anvaripour et al. | |
| 2022/0217253 A1 | 7/2022 | Tian et al. | |
| 2022/0217275 A1 | 7/2022 | Fan | |
| 2022/0224828 A1 | 7/2022 | Lim et al. | |
| 2022/0245900 A1 | 8/2022 | Tan et al. | |
| 2022/0256068 A1 | 8/2022 | Geiss et al. | |
| 2022/0264028 A1 | 8/2022 | Manzari et al. | |
| 2022/0276041 A1 | 9/2022 | Dryer et al. | |
| 2022/0279116 A1 | 9/2022 | Zhou | |
| 2022/0294992 A1 | 9/2022 | Manzari et al. | |
| 2022/0319100 A1 | 10/2022 | Manzari et al. | |
| 2022/0321797 A1 | 10/2022 | Bian et al. | |
| 2022/0353425 A1 | 11/2022 | Manzari et al. | |
| 2022/0382440 A1 | 12/2022 | Manzari et al. | |
| 2022/0382443 A1 | 12/2022 | Clarke et al. | |
| 2022/0394190 A1 | 12/2022 | Cui et al. | |
| 2022/0397759 A1 | 12/2022 | Vignau | |
| 2022/0408020 A1 | 12/2022 | Zhang | |
| 2022/0417416 A1 | 12/2022 | Li et al. | |
| 2022/0417440 A1 | 12/2022 | Bernstein et al. | |
| 2023/0007186 A1 | 1/2023 | Li et al. | |
| 2023/0016178 A1 | 1/2023 | Ma et al. | |
| 2023/0018557 A1 | 1/2023 | Jiang | |
| 2023/0020616 A1 | 1/2023 | Manzari et al. | |
| 2023/0081664 A1 | 3/2023 | Li | |
| 2023/0087879 A1 | 3/2023 | An et al. | |
| 2023/0098395 A1 | 3/2023 | O'Leary et al. | |
| 2023/0115929 A1 | 4/2023 | Bian et al. | |
| 2023/0116044 A1 | 4/2023 | Han | |
| 2023/0118567 A1 | 4/2023 | Manzari et al. | |
| 2023/0156144 A1 | 5/2023 | Cui | |
| 2023/0156316 A1 | 5/2023 | Kang et al. | |
| 2023/0164427 A1 | 5/2023 | Lu et al. | |
| 2023/0179856 A1 | 6/2023 | Shin | |
| 2023/0188831 A1 | 6/2023 | Hyun et al. | |
| 2023/0188861 A1 | 6/2023 | Bian | |
| 2023/0209179 A1 | 6/2023 | Manzari et al. | |
| 2023/0217097 A1 | 7/2023 | Wu et al. | |
| 2023/0217098 A1 | 7/2023 | Wang et al. | |
| 2023/0224575 A1 | 7/2023 | Ding et al. | |
| 2023/0229297 A1 | 7/2023 | Manzari et al. | |
| 2023/0254573 A1 | 8/2023 | Manzari et al. | |
| 2023/0262317 A1 | 8/2023 | O'Leary et al. | |
| 2023/0308742 A1 | 9/2023 | Lin et al. | |
| 2023/0308743 A1 | 9/2023 | Ku et al. | |
| 2023/0308778 A1 | 9/2023 | Yang | |
| 2023/0319394 A1 | 10/2023 | Manzari et al. | |
| 2023/0325989 A1 | 10/2023 | Zhao | |
| 2023/0328379 A1 | 10/2023 | Bernstein et al. | |
| 2023/0328429 A1 | 10/2023 | Bian | |
| 2023/0333704 A1 | 10/2023 | Chen | |
| 2023/0336865 A1 | 10/2023 | Da Veiga et al. | |
| 2023/0343450 A1 | 10/2023 | Aragones et al. | |
| 2023/0345110 A1 | 10/2023 | Yi et al. | |
| 2023/0345113 A1 | 10/2023 | Liu | |
| 2023/0353862 A1 | 11/2023 | Yi et al. | |
| 2023/0359314 A1 | 11/2023 | Karunamuni | |
| 2023/0359315 A1 | 11/2023 | Karunamuni et al. | |
| 2023/0359316 A1 | 11/2023 | Karunamuni | |
| 2023/0367472 A1 | 11/2023 | Clarke et al. | |
| 2023/0370507 A1 | 11/2023 | Chang et al. | |
| 2023/0388665 A1 | 11/2023 | Manzari et al. | |
| 2023/0393705 A1 | 12/2023 | Krenn | |
| 2023/0418426 A1 | 12/2023 | Karunamuni | |
| 2024/0080543 A1 | 3/2024 | Manzari et al. | |
| 2024/0104871 A1 | 3/2024 | Brewer et al. | |
| 2024/0198177 A1 | 6/2024 | Kruger et al. | |
| 2024/0259670 A1 | 8/2024 | Manzari et al. | |
| 2024/0284037 A1 | 8/2024 | Manzari et al. | |
| 2024/0303779 A1* | 9/2024 | Feng .......................... G06T 7/11 | |
| 2024/0320930 A1 | 9/2024 | Ravasz et al. | |
| 2024/0340371 A1 | 10/2024 | Hua et al. | |
| 2024/0373120 A1 | 11/2024 | Manzari et al. | |
| 2024/0373122 A1 | 11/2024 | Manzari et al. | |
| 2024/0373124 A1 | 11/2024 | Manzari et al. | |
| 2024/0377877 A1 | 11/2024 | Kasar et al. | |
| 2024/0404075 A1 | 12/2024 | Lu et al. | |
| 2024/0406368 A1 | 12/2024 | Lemay et al. | |
| 2024/0430564 A1 | 12/2024 | Manzari et al. | |
| 2025/0024133 A1 | 1/2025 | Manzari et al. | |
| 2025/0047987 A1 | 2/2025 | Manzari et al. | |
| 2025/0080851 A1 | 3/2025 | Bernstein et al. | |
| 2025/0088734 A1 | 3/2025 | Manzari et al. | |
| 2025/0147651 A1 | 5/2025 | Manzari et al. | |
| 2025/0330699 A1 | 10/2025 | Manzari et al. | |
| 2025/0356608 A1 | 11/2025 | Brewer et al. | |

FOREIGN PATENT DOCUMENTS

| | | | |
|---|---|---|---|
| CA | 2729392 A1 | 8/2011 | |
| CA | 2965700 A1 | 5/2016 | |
| CA | 2729392 C | 5/2017 | |
| CN | 1437365 A | 8/2003 | |
| CN | 1499878 A | 5/2004 | |
| CN | 1705346 A | 12/2005 | |
| CN | 1901717 A | 1/2007 | |
| CN | 101068311 A | 11/2007 | |

(56) References Cited

FOREIGN PATENT DOCUMENTS

| CN | 101243383 A | 8/2008 |
| CN | 101282422 A | 10/2008 |
| CN | 101300830 A | 11/2008 |
| CN | 101310519 A | 11/2008 |
| CN | 101355655 A | 1/2009 |
| CN | 101364031 A | 2/2009 |
| CN | 101388965 A | 3/2009 |
| CN | 101427574 A | 5/2009 |
| CN | 101576996 A | 11/2009 |
| CN | 101681462 A | 3/2010 |
| CN | 101778220 A | 7/2010 |
| CN | 101821707 A | 9/2010 |
| CN | 101883213 A | 11/2010 |
| CN | 101931691 A | 12/2010 |
| CN | 201788344 U | 4/2011 |
| CN | 102084327 A | 6/2011 |
| CN | 102088554 A | 6/2011 |
| CN | 102202208 A | 9/2011 |
| CN | 102272700 A | 12/2011 |
| CN | 102369723 A | 3/2012 |
| CN | 102428655 A | 4/2012 |
| CN | 102457661 A | 5/2012 |
| CN | 102474560 A | 5/2012 |
| CN | 102541537 A | 7/2012 |
| CN | 102567953 A | 7/2012 |
| CN | 202309894 U | 7/2012 |
| CN | 202330968 U | 7/2012 |
| CN | 102625036 A | 8/2012 |
| CN | 102855079 A | 1/2013 |
| CN | 103037075 A | 4/2013 |
| CN | 103051837 A | 4/2013 |
| CN | 103051841 A | 4/2013 |
| CN | 103052961 A | 4/2013 |
| CN | 103297719 A | 9/2013 |
| CN | 103309602 A | 9/2013 |
| CN | 103324329 A | 9/2013 |
| CN | 103491298 A | 1/2014 |
| CN | 103685925 A | 3/2014 |
| CN | 103702029 A | 4/2014 |
| CN | 103702039 A | 4/2014 |
| CN | 103777742 A | 5/2014 |
| CN | 103916582 A | 7/2014 |
| CN | 103970472 A | 8/2014 |
| CN | 104247392 A | 12/2014 |
| CN | 104346080 A | 2/2015 |
| CN | 104346099 A | 2/2015 |
| CN | 104423946 A | 3/2015 |
| CN | 104461288 A | 3/2015 |
| CN | 104487928 A | 4/2015 |
| CN | 104754203 A | 7/2015 |
| CN | 104781773 A | 7/2015 |
| CN | 104813322 A | 7/2015 |
| CN | 104836947 A | 8/2015 |
| CN | 104903834 A | 9/2015 |
| CN | 105049726 A | 11/2015 |
| CN | 105138259 A | 12/2015 |
| CN | 105144057 A | 12/2015 |
| CN | 105183442 A | 12/2015 |
| CN | 105190511 A | 12/2015 |
| CN | 105210018 A | 12/2015 |
| CN | 105229571 A | 1/2016 |
| CN | 105245774 A | 1/2016 |
| CN | 105264480 A | 1/2016 |
| CN | 105338256 A | 2/2016 |
| CN | 105474163 A | 4/2016 |
| CN | 105493138 A | 4/2016 |
| CN | 105589637 A | 5/2016 |
| CN | 105620393 A | 6/2016 |
| CN | 105630290 A | 6/2016 |
| CN | 105637855 A | 6/2016 |
| CN | 105765967 A | 7/2016 |
| CN | 105794196 A | 7/2016 |
| CN | 105981372 A | 9/2016 |
| CN | 105991915 A | 10/2016 |
| CN | 106067947 A | 11/2016 |
| CN | 106161956 A | 11/2016 |
| CN | 106210184 A | 12/2016 |
| CN | 106210550 A | 12/2016 |
| CN | 106257540 A | 12/2016 |
| CN | 106257909 A | 12/2016 |
| CN | 106303280 A | 1/2017 |
| CN | 106341611 A | 1/2017 |
| CN | 106375662 A | 2/2017 |
| CN | 106412214 A | 2/2017 |
| CN | 106412412 A | 2/2017 |
| CN | 106412445 A | 2/2017 |
| CN | 106412706 A | 2/2017 |
| CN | 106445219 A | 2/2017 |
| CN | 106534619 A | 3/2017 |
| CN | 106575149 A | 4/2017 |
| CN | 106791357 A | 5/2017 |
| CN | 106791377 A | 5/2017 |
| CN | 106791420 A | 5/2017 |
| CN | 106921829 A | 7/2017 |
| CN | 107077274 A | 8/2017 |
| CN | 107079141 A | 8/2017 |
| CN | 107566721 A | 1/2018 |
| CN | 107580693 A | 1/2018 |
| CN | 107613283 A | 1/2018 |
| CN | 107770448 A | 3/2018 |
| CN | 107800945 A | 3/2018 |
| CN | 107820011 A | 3/2018 |
| CN | 107924113 A | 4/2018 |
| CN | 108174096 A | 6/2018 |
| CN | 108353126 A | 7/2018 |
| CN | 108391053 A | 8/2018 |
| CN | 108419019 A | 8/2018 |
| CN | 108513070 A | 9/2018 |
| CN | 108549522 A | 9/2018 |
| CN | 108600610 A | 9/2018 |
| CN | 108668083 A | 10/2018 |
| CN | 108712609 A | 10/2018 |
| CN | 108769562 A | 11/2018 |
| CN | 108848308 A | 11/2018 |
| CN | 108888569 A | 11/2018 |
| CN | 109005366 A | 12/2018 |
| CN | 109061985 A | 12/2018 |
| CN | 109313530 A | 2/2019 |
| CN | 109496425 A | 3/2019 |
| CN | 109639970 A | 4/2019 |
| CN | 109644217 A | 4/2019 |
| CN | 109644229 A | 4/2019 |
| CN | 109769396 A | 5/2019 |
| CN | 110678832 A | 1/2020 |
| CN | 110784615 A | 2/2020 |
| CN | 111034164 A | 4/2020 |
| CN | 111061372 A | 4/2020 |
| CN | 111142724 A | 5/2020 |
| CN | 111580671 A | 8/2020 |
| CN | 111784615 A | 10/2020 |
| CN | 111901475 A | 11/2020 |
| CN | 111901476 A | 11/2020 |
| CN | 111917980 A | 11/2020 |
| CN | 112004136 A | 11/2020 |
| CN | 112154658 A | 12/2020 |
| CN | 112291627 A | 1/2021 |
| CN | 112598677 A | 4/2021 |
| CN | 112637477 A | 4/2021 |
| CN | 115914824 A | 4/2023 |
| DK | 201670753 A1 | 1/2018 |
| DK | 201670755 A1 | 1/2018 |
| DK | 201670627 A1 | 2/2018 |
| EP | 0257972 A2 | 3/1988 |
| EP | 651543 A2 | 5/1995 |
| EP | 651543 A3 | 12/1997 |
| EP | 1278099 A1 | 1/2003 |
| EP | 1953663 A1 | 8/2008 |
| EP | 651543 B1 | 9/2008 |
| EP | 1981262 A1 | 10/2008 |
| EP | 2194508 A1 | 6/2010 |
| EP | 2430766 A2 | 3/2012 |
| EP | 2454872 A1 | 5/2012 |
| EP | 2482179 A2 | 8/2012 |
| EP | 2487613 A1 | 8/2012 |

(56) References Cited

FOREIGN PATENT DOCUMENTS

| | | | |
|----|----|----|----|
| EP | 2487913 | A2 | 8/2012 |
| EP | 2430766 | A4 | 12/2012 |
| EP | 2579572 | A1 | 4/2013 |
| EP | 2627073 | A1 | 8/2013 |
| EP | 2640060 | A1 | 9/2013 |
| EP | 2682855 | A2 | 1/2014 |
| EP | 2950198 | A1 | 12/2015 |
| EP | 2966855 | A2 | 1/2016 |
| EP | 2972677 | A1 | 1/2016 |
| EP | 2430766 | B1 | 3/2016 |
| EP | 3008575 | A1 | 4/2016 |
| EP | 3012732 | A1 | 4/2016 |
| EP | 3033837 | A1 | 6/2016 |
| EP | 3046070 | A1 | 7/2016 |
| EP | 3107065 | A1 | 12/2016 |
| EP | 3120217 | A1 | 1/2017 |
| EP | 3033837 | A4 | 3/2017 |
| EP | 3209012 | A1 | 8/2017 |
| EP | 2194508 | B1 | 12/2017 |
| EP | 3333544 | A1 | 6/2018 |
| EP | 3033837 | B1 | 10/2018 |
| EP | 3393119 | A1 | 10/2018 |
| EP | 3135028 | B1 | 1/2019 |
| EP | 2482179 | B1 | 3/2019 |
| EP | 3457680 | A1 | 3/2019 |
| EP | 3012732 | B1 | 5/2019 |
| EP | 3008575 | B1 | 7/2019 |
| EP | 3598737 | A1 | 1/2020 |
| EP | 3120217 | B1 | 4/2020 |
| EP | 3633975 | A1 | 4/2020 |
| EP | 3046070 | B1 | 10/2020 |
| EP | 2682855 | B1 | 2/2021 |
| EP | 3787285 | A1 | 3/2021 |
| EP | 4089521 | A1 | 11/2022 |
| EP | 3633975 | B1 | 5/2023 |
| GB | 2515797 | A | 1/2015 |
| GB | 2519363 | A | 4/2015 |
| GB | 2523670 | A | 9/2015 |
| HK | 40022327 | A | 11/2020 |
| JP | 2-179078 | A | 7/1990 |
| JP | 9-116792 | A | 5/1997 |
| JP | 11-355617 | A | 12/1999 |
| JP | 2000-207549 | A | 7/2000 |
| JP | 2000-244905 | A | 9/2000 |
| JP | 2001-245204 | A | 9/2001 |
| JP | 2001-298649 | A | 10/2001 |
| JP | 2003-8964 | A | 1/2003 |
| JP | 2003-18438 | A | 1/2003 |
| JP | 2003-32597 | A | 1/2003 |
| JP | 2003-241293 | A | 8/2003 |
| JP | 2003-338975 | A | 11/2003 |
| JP | 2004-15595 | A | 1/2004 |
| JP | 2004-135074 | A | 4/2004 |
| JP | 2005-31466 | A | 2/2005 |
| JP | 2005-191641 | A | 7/2005 |
| JP | 2005-191985 | A | 7/2005 |
| JP | 2005-311699 | A | 11/2005 |
| JP | 2006-332809 | A | 12/2006 |
| JP | 3872041 | B2 | 1/2007 |
| JP | 2007-28211 | A | 2/2007 |
| JP | 2007-124279 | A | 5/2007 |
| JP | 2007-124398 | A | 5/2007 |
| JP | 2007-258869 | A | 10/2007 |
| JP | 2007-274017 | A | 10/2007 |
| JP | 2008-66978 | A | 3/2008 |
| JP | 2008-236534 | A | 10/2008 |
| JP | 2009-105919 | A | 5/2009 |
| JP | 2009-212899 | A | 9/2009 |
| JP | 2009-246468 | A | 10/2009 |
| JP | 2009-273023 | A | 11/2009 |
| JP | 2009-290782 | A | 12/2009 |
| JP | 2009-545256 | A | 12/2009 |
| JP | 2010-117444 | A | 5/2010 |
| JP | 2010-119147 | A | 5/2010 |
| JP | 2010-160581 | A | 7/2010 |
| JP | 2010-182023 | A | 8/2010 |
| JP | 2010-211166 | A | 9/2010 |
| JP | 2010-211497 | A | 9/2010 |
| JP | 2010-268052 | A | 11/2010 |
| JP | 2011-41092 | A | 2/2011 |
| JP | 2011-87167 | A | 4/2011 |
| JP | 2011-91570 | A | 5/2011 |
| JP | 2011-124864 | A | 6/2011 |
| JP | 2011-211552 | A | 10/2011 |
| JP | 2011-249887 | A | 12/2011 |
| JP | 2012-15978 | A | 1/2012 |
| JP | 2012-44564 | A | 3/2012 |
| JP | 2012-79302 | A | 4/2012 |
| JP | 2012-89973 | A | 5/2012 |
| JP | 2012-124608 | A | 6/2012 |
| JP | 2012-147379 | A | 8/2012 |
| JP | 2012-186743 | A | 9/2012 |
| JP | 2013-70303 | A | 4/2013 |
| JP | 2013-106289 | A | 5/2013 |
| JP | 2013-546238 | A | 12/2013 |
| JP | 2014-23083 | A | 2/2014 |
| JP | 2014-123069 | A | 7/2014 |
| JP | 2014-212415 | A | 11/2014 |
| JP | 2014-225797 | A | 12/2014 |
| JP | 2015-1716 | A | 1/2015 |
| JP | 2015-5255 | A | 1/2015 |
| JP | 2015-22716 | A | 2/2015 |
| JP | 2015-25897 | A | 2/2015 |
| JP | 2015-50713 | A | 3/2015 |
| JP | 2015-76717 | A | 4/2015 |
| JP | 2015-104031 | A | 6/2015 |
| JP | 2015-146619 | A | 8/2015 |
| JP | 2015-149095 | A | 8/2015 |
| JP | 2015-180987 | A | 10/2015 |
| JP | 2015-201839 | A | 11/2015 |
| JP | 2015-534742 | A | 12/2015 |
| JP | 2016-5224 | A | 1/2016 |
| JP | 2016-66978 | A | 4/2016 |
| JP | 2016-72965 | A | 5/2016 |
| JP | 2016-129315 | A | 7/2016 |
| JP | 2016-175175 | A | 10/2016 |
| JP | 2017-34474 | A | 2/2017 |
| JP | 2017-69776 | A | 4/2017 |
| JP | 2017-521737 | A | 8/2017 |
| JP | 2018-107711 | A | 7/2018 |
| JP | 2019-62556 | A | 4/2019 |
| JP | 2019-203399 | A | 11/2019 |
| JP | 2020-42602 | A | 3/2020 |
| JP | 2020-52400 | A | 4/2020 |
| JP | 2021-27572 | A | 2/2021 |
| JP | 6982047 | B2 | 11/2021 |
| KR | 10-2009-0066319 | A | 6/2009 |
| KR | 10-2012-0025872 | A | 3/2012 |
| KR | 10-2012-0048397 | A | 5/2012 |
| KR | 10-2012-0054406 | A | 5/2012 |
| KR | 10-2012-0057696 | A | 6/2012 |
| KR | 10-2012-0093322 | A | 8/2012 |
| KR | 10-2013-0033445 | A | 4/2013 |
| KR | 10-1341095 | 81 | 12/2013 |
| KR | 10-2014-0049850 | A | 4/2014 |
| KR | 10-2014-0062801 | A | 5/2014 |
| KR | 10-2014-0138346 | A | 12/2014 |
| KR | 10-2015-0014290 | A | 2/2015 |
| KR | 10-2015-0144543 | A | 12/2015 |
| KR | 10-2016-0016910 | A | 2/2016 |
| KR | 10-2016-0019145 | A | 2/2016 |
| KR | 10-2016-0020791 | A | 2/2016 |
| KR | US 20160127638 | A | 2/2016 |
| KR | 10-2016-0035050 | A | 3/2016 |
| KR | 10-2016-0075583 | A | 6/2016 |
| KR | 10-1674959 | B1 | 11/2016 |
| KR | 10-2017-0123125 | A | 11/2017 |
| KR | 10-1799223 | B1 | 11/2017 |
| KR | 10-2017-0135975 | A | 12/2017 |
| KR | 10-2018-0024761 | A | 3/2018 |
| KR | 10-2018-0037076 | A | 4/2018 |
| KR | 10-2018-0095331 | A | 8/2018 |
| KR | 10-2018-0108847 | A | 10/2018 |
| KR | 10-2018-0116574 | A | 10/2018 |

(56)                References Cited

FOREIGN PATENT DOCUMENTS

| | | | |
|---|---|---|---|
| KR | 10-2018-0137610 | A | 12/2018 |
| KR | 10-1939253 | B1 | 1/2019 |
| KR | 10-2019-0034248 | A | 4/2019 |
| KR | 10-2019-0142397 | A | 12/2019 |
| SU | 1610470 | A1 | 11/1990 |
| WO | 2005/043892 | A1 | 5/2005 |
| WO | 2007/126707 | A1 | 11/2007 |
| WO | 2008/014301 | A2 | 1/2008 |
| WO | 2008/020655 | A1 | 2/2008 |
| WO | 2008/025120 | A1 | 3/2008 |
| WO | 2008/030779 | A2 | 3/2008 |
| WO | 2008/109644 | A2 | 9/2008 |
| WO | 2009/032638 | A2 | 3/2009 |
| WO | 2009/078091 | A1 | 6/2009 |
| WO | 2010/059426 | A2 | 5/2010 |
| WO | 2010/077048 | A2 | 7/2010 |
| WO | 2010/102678 | A1 | 9/2010 |
| WO | 2010/077048 | A3 | 10/2010 |
| WO | 2010/131869 | A2 | 11/2010 |
| WO | 2010/134275 | A1 | 11/2010 |
| WO | 2011/007264 | A1 | 1/2011 |
| WO | 2010/131869 | A3 | 2/2011 |
| WO | 2010/059426 | A3 | 5/2011 |
| WO | 2011/078913 | A1 | 6/2011 |
| WO | 2012/001947 | A1 | 1/2012 |
| WO | 2012/006251 | A1 | 1/2012 |
| WO | 2012/019163 | A2 | 2/2012 |
| WO | 2012/051720 | A2 | 4/2012 |
| WO | 2013/133895 | A1 | 9/2013 |
| WO | 2013/169870 | A1 | 11/2013 |
| WO | 2014/066115 | A1 | 5/2014 |
| WO | 2014/105276 | A1 | 7/2014 |
| WO | 2014/105277 | A2 | 7/2014 |
| WO | 2014/109125 | A1 | 7/2014 |
| WO | 2014/159779 | A1 | 10/2014 |
| WO | 2014/160819 | A1 | 10/2014 |
| WO | 2014/165141 | A1 | 10/2014 |
| WO | 2014/185028 | A1 | 11/2014 |
| WO | 2014/200734 | A1 | 12/2014 |
| WO | 2014/200798 | A1 | 12/2014 |
| WO | 2015/017312 | A1 | 2/2015 |
| WO | 2015/023044 | A1 | 2/2015 |
| WO | 2015/026864 | A1 | 2/2015 |
| WO | 2015/037211 | A1 | 3/2015 |
| WO | 2015/059349 | A1 | 4/2015 |
| WO | 2015/080744 | A1 | 6/2015 |
| WO | 2015/085042 | A1 | 6/2015 |
| WO | 2015/112868 | A1 | 7/2015 |
| WO | 2014/200798 | A8 | 8/2015 |
| WO | 2015/152953 | A1 | 10/2015 |
| WO | 2015/166684 | A1 | 11/2015 |
| WO | 2015/183438 | A1 | 12/2015 |
| WO | 2015/187494 | A1 | 12/2015 |
| WO | 2015/190666 | A1 | 12/2015 |
| WO | 2016/028806 | A1 | 2/2016 |
| WO | 2016/028807 | A1 | 2/2016 |
| WO | 2016/028808 | A1 | 2/2016 |
| WO | 2016/028809 | A1 | 2/2016 |
| WO | 2016/072538 | A1 | 5/2016 |
| WO | 2016/073804 | A2 | 5/2016 |
| WO | 2016/073804 | A3 | 7/2016 |
| WO | 2016/172619 | A1 | 10/2016 |
| WO | 2016/203282 | A1 | 12/2016 |
| WO | 2016/204936 | A1 | 12/2016 |
| WO | 2017/051605 | A1 | 3/2017 |
| WO | 2017/058834 | A1 | 4/2017 |
| WO | 2017/071559 | A1 | 5/2017 |
| WO | 2017/164716 | A1 | 9/2017 |
| WO | 2017/218193 | A1 | 12/2017 |
| WO | 2018/012831 | A1 | 1/2018 |
| WO | 2018/048838 | A1 | 3/2018 |
| WO | 2018/057267 | A1 | 3/2018 |
| WO | 2018/057268 | A1 | 3/2018 |
| WO | 2018/099037 | A1 | 6/2018 |
| WO | 2018/144339 | A2 | 8/2018 |
| WO | 2018/159864 | A1 | 9/2018 |
| WO | 2018/222244 | A1 | 12/2018 |
| WO | 2018/226264 | A1 | 12/2018 |
| WO | 2019/050562 | A1 | 3/2019 |
| WO | 2019/118933 | A1 | 6/2019 |
| WO | 2019/172678 | A1 | 9/2019 |
| WO | 2020/227388 | A2 | 11/2020 |
| WO | 2022/047377 | A1 | 3/2022 |
| WO | 2022/231869 | A1 | 11/2022 |
| WO | 2023/049418 | A2 | 3/2023 |
| WO | 2023/116418 | A1 | 6/2023 |

OTHER PUBLICATIONS

Board Opinion received for Chinese Patent Application No. 201811446867.4, mailed on Feb. 14, 2023, 11 pages (4 pages of English Translation and 7 pages of Official Copy).

Decision of Refusal received for Japanese Patent Application No. 2018-545502, mailed on Feb. 25, 2019, 11 pages (7 pages of English Translation and 4 pages of Official Copy).

Decision on Appeal received for Japanese Patent Application No. 2018-225131, mailed on Mar. 11, 2021, 5 pages (4 pages of English Translation and 1 page of Official Copy).

Decision on Appeal received for Japanese Patent Application No. 2018-545502, mailed on Mar. 25, 2021, 3 pages (1 page of English Translation and 2 pages of Official Copy).

Decision to Grant received for European Patent Application No. 18176890.4, mailed on Jul. 9, 2020, 3 pages.

Decision to Grant received for European Patent Application No. 18183054.8, mailed on Jan. 21, 2021, 3 pages.

Decision to Grant received for European Patent Application No. 18209460.7, mailed on Apr. 9, 2021, 2 pages.

Decision to Grant received for European Patent Application No. 18214698.5, mailed on Sep. 10, 2020, 3 pages.

Decision to Refuse received for Japanese Patent Application No. 2018-225131, mailed on Jul. 8, 2019, 6 pages (4 pages of English Translation and 2 pages of Official Copy).

Decision to Refuse received for Japanese Patent Application No. 2018-545502, mailed on Jul. 8, 2019, 5 pages (3 pages of English Translation and 2 pages of Official Copy).

European Search Report received for European Patent Application No. 18209460.7, mailed on Mar. 15, 2019, 4 pages.

European Search Report received for European Patent Application No. 18214698.5, mailed on Mar. 21, 2019, 5 pages.

Intention to Grant received for European Patent Application No. 18176890.4, mailed on Feb. 28, 2020, 8 pages.

Intention to Grant received for European Patent Application No. 18183054.8, mailed on Nov. 5, 2020, 6 pages.

Intention to Grant received for European Patent Application No. 18209460.7, mailed on Jan. 15, 2021, 8 pages.

Intention to Grant received for European Patent Application No. 18214698.5, mailed on Apr. 21, 2020, 8 pages.

Notice of Acceptance received for Australian Patent Application No. 2017286130, mailed on Apr. 26, 2019, 3 pages.

Notice of Allowance received for Brazilian Patent Application No. 112018074765-3, mailed on Oct. 8, 2019, 2 pages (1 page of English Translation and 1 page of Official Copy).

Notice of Allowance received for Brazilian Patent Application No. BR122018076550-0, mailed on Jan. 3, 2022, 3 pages (1 page of English Translation and 2 pages of Official Copy).

Notice of Allowance received for Chinese Patent Application No. 201811512767.7, mailed on Jul. 27, 2020, 4 pages (1 page of English Translation and 3 pages of Official Copy).

Notice of Allowance received for Chinese Patent Application No. 202010600197.8, mailed on Feb. 9, 2022, 5 pages (1 page of English Translation and 4 pages of Official Copy).

Notice of Allowance received for Japanese Patent Application No. 2018-171188, mailed on Jul. 16, 2019, 3 pages (1 page of English Translation and 2 pages of Official Copy).

Notice of Allowance received for Korean Patent Application No. 10-2018-7026743, mailed on Mar. 20, 2019, 7 pages (1 page of English Translation and 6 pages of Official Copy).

(56)          References Cited

OTHER PUBLICATIONS

Notice of Allowance received for Korean Patent Application No. 10-2018-7028849, mailed on Feb. 1, 2019, 4 pages (1 page of English Translation and 3 pages of Official Copy).

Notice of Hearing received for Indian Patent Application No. 201818045872, mailed on Nov. 16, 2023, 2 pages.

Notice of Hearing received for Indian Patent Application No. 201818046896, mailed on Jul. 11, 2023, 2 pages.

Office Action Received for Australian Patent Application No. 2017286130, mailed on Jan. 21, 2019, 4 pages.

Office Action received for Brazilian Patent Application No. BR122018076550-0, mailed on Sep. 28, 2022, 7 pages (1 page of English Translation and 6 pages of Official Copy).

Office Action received for Chinese Patent Application No. 201811446867.4, mailed on Dec. 31, 2019, 12 pages (5 pages of English Translation and 7 pages of Official Copy).

Office Action received for Chinese Patent Application No. 201811446867.4, mailed on May 6, 2020, 10 pages (5 pages of English Translation and 5 pages of Official Copy).

Office Action received for Chinese Patent Application No. 201811446867.4, mailed on Sep. 8, 2020, 9 pages (4 pages of English Translation and 5 pages of Official Copy).

Office Action received for Chinese Patent Application No. 201811512767.7, mailed on Dec. 20, 2019, 14 pages (7 pages of English Translation and 7 pages of Official Copy).

Office Action received for Chinese Patent Application No. 201811512767.7, mailed on Jun. 4, 2020, 6 pages (3 pages of English Translation and 3 pages of Official Copy).

Office Action received for Chinese Patent Application No. 202010600197.8, mailed on Jul. 2, 2021, 14 pages (6 pages of English Translation and 8 pages of Official Copy).

Office Action received for European Patent Application No. 18176890.4, mailed on Oct. 16, 2018, 8 pages.

Office Action received for European Patent Application No. 18183054.8, mailed on Feb. 24, 2020, 6 pages.

Office Action received for European Patent Application No. 18183054.8, mailed on Nov. 16, 2018, 8 pages.

Office Action received for European Patent Application No. 18209460.7, mailed on Apr. 10, 2019, 7 pages.

Office Action received for European Patent Application No. 18209460.7, mailed on Apr. 21, 2020, 5 pages.

Office Action received for European Patent Application No. 18214698.5, mailed on Apr. 2, 2019, 8 pages.

Office Action received for Indian Patent Application No. 201818025015, mailed on Feb. 4, 2022, 7 pages.

Office Action received for Indian Patent Application No. 201818045872, mailed on Oct. 13, 2021, 7 pages.

Office Action received for Indian Patent Application No. 201818046896, mailed on Feb. 2, 2022, 7 pages.

Office Action received for Japanese Patent Application No. 2018-225131, mailed on Aug. 17, 2020, 21 pages (6 pages of English Translation and 15 pages of Official Copy).

Office Action received for Japanese Patent Application No. 2018-225131, mailed on Mar. 4, 2019, 10 pages (6 pages of English Translation and 4 pages of Official Copy).

Office Action received for Japanese Patent Application No. 2018-545502, mailed on Aug. 17, 2020, 14 pages (6 pages of English Translation and 8 pages of Official Copy).

Office Action received for Korean Patent Application No. 10-2018-7026743, mailed on Jan. 17, 2019, 5 pages (2 pages of English Translation and 3 pages of Official Copy).

Pre-Appeal Review Report received for Japanese Patent Application No. 2018-225131, mailed on Jan. 24, 2020, 8 pages (4 pages of English Translation and 4 pages of Official Copy).

Pre-Appeal Review Report received for Japanese Patent Application No. 2018-545502, mailed on Jan. 24, 2020, 8 pages (3 pages of English Translation and 5 pages of Official Copy).

Supplementary European Search Report received for European Patent Application No. 18176890.4, mailed on Sep. 20, 2018, 4 pages.

Supplementary European Search Report received for European Patent Application No. 18183054.8, mailed on Oct. 11, 2018, 4 pages.

Yuan Ye, "Iphone 4s Original Secrets", China Railway Press, 2012, 15 pages (Official Copy Only) (See Communication Under Rule 37 CFR § 1.98(a) (3)).

Intention to Grant received for European Patent Application No. 22184844.3, mailed on Mar. 3, 2025, 8 pages.

Intention to Grant received for European Patent Application No. 23204776.1, mailed on Feb. 25, 2025, 8 pages.

Notice of Allowance received for Japanese Patent Application No. 2023-560225, mailed on Mar. 3, 2025, 4 pages (1 page of English Translation and 3 pages of Official Copy).

Notice of Hearing received for Indian Patent Application No. 202118021941, mailed on Feb. 21, 2025, 2 pages.

Office Action received for European Patent Application No. 21157252.4, mailed on Feb. 24, 2025, 6 pages.

Notice of Allowance received for Korean Patent Application No. 10-2023-7002360, mailed on Feb. 5, 2025, 8 pages (2 pages of English Translation and 6 pages of Official Copy).

Notice of Hearing received for Indian Patent Application No. 202215010325, mailed on Feb. 18, 2025, 3 pages.

Non-Final Office Action received for U.S. Appl. No. 19/017,062, mailed on Jun. 12, 2025, 21 pages.

Office Action received for European Patent Application No. 20728854.9, mailed on Jun. 20, 2025, 6 pages.

Corrected Notice of Allowance received for U.S. Appl. No. 18/370,363, mailed on Aug. 26, 2025, 2 pages.

Non-Final Office Action received for U.S. Appl. No. 18/373,163, mailed on Aug. 26, 2025, 14 pages.

Intention to Grant received for European Patent Application No. 20206196.6, mailed on Jul. 14, 2025, 10 pages.

Intention to Grant received for European Patent Application No. 23173036.7, mailed on Jun. 30, 2025, 9 pages.

Non-Final Office Action received for U.S. Appl. No. 18/611,281, mailed on Jul. 14, 2025, 30 pages.

Notice of Acceptance received for Australian Patent Application No. 2024200819, mailed on Jun. 30, 2025, 3 pages.

Office Action received for Australian Patent Application No. 2023285892, mailed on Jul. 21, 2025, 5 pages.

Office Action received for Chinese Patent Application No. 202010235395.9, mailed on May 31, 2025, 15 pages (7 pages of English Translation and 8 pages of Official Copy).

Corrected Notice of Allowance received for U.S. Appl. No. 18/123,878, mailed on May 5, 2025, 2 pages.

Decision to Grant received for European Patent Application No. 22184844.3, mailed on May 2, 2025, 4 pages.

Extended European Search Report received for European Patent Application No. 24202041.0, mailed on Dec. 16, 2024, 9 pages.

International Preliminary Report on Patentability received for PCT Patent Application No. PCT/US2023/024344, mailed on Dec. 19, 2024, 18 pages.

Manogajapathi et al., "Detecting Camera Based Traitor and Fraudulent Apps on Smartphone", World Conference on Futuristic Trends in Research and Innovation for Social Welfare (Startup Conclave), IEEE, Feb. 29, 2016, 5 pages.

Office Action received for Australian Patent Application No. 2023285892, mailed on Dec. 16, 2024, 5 pages.

Office Action received for Japanese Patent Application No. 2024-073909, mailed on Dec. 19, 2024, 5 pages (2 pages of English Translation and 3 pages of Official copy).

Wanjale et al., "AAPS: Android Based System for Camera Based Attacks", International Journal of Emerging Technologies and Engineering (IJETE) vol. 1 Issue 10, Nov. 2014, pp. 246-247.

Wu et al., "Analyzing Mobile Phone Vulnerabilities Caused by Camera", IEEE Global Communications Conference, Dec. 8, 2014, 5 pages.

Applicant-Initiated Interview Summary received for U.S. Appl. No. 16/584,100, mailed on Feb. 19, 2020, 3 pages.

Applicant-Initiated Interview Summary received for U.S. Appl. No. 16/586,344, mailed on Feb. 27, 2020, 3 pages.

Applicant-Initiated Interview Summary received for U.S. Appl. No. 17/041,412, mailed on Jan. 31, 2023, 7 pages.

(56)     References Cited

OTHER PUBLICATIONS

Corrected Notice of Allowance received for U.S. Appl. No. 16/582,595, mailed on Apr. 7, 2020, 5 pages.
Corrected Notice of Allowance received for U.S. Appl. No. 16/582,595, mailed on Apr. 22, 2020, 5 pages.
Corrected Notice of Allowance received for U.S. Appl. No. 16/583,020, mailed on Mar. 24, 2020, 2 pages.
Corrected Notice of Allowance received for U.S. Appl. No. 16/584,044, mailed on Apr. 16, 2020, 3 pages.
Corrected Notice of Allowance received for U.S. Appl. No. 16/584,044, mailed on Jan. 29, 2020, 3 pages.
Corrected Notice of Allowance received for U.S. Appl. No. 16/584,044, mailed on Mar. 4, 2020, 2 pages.
Corrected Notice of Allowance received for U.S. Appl. No. 16/584,100, mailed on Feb. 21, 2020, 9 pages.
Corrected Notice of Allowance received for U.S. Appl. No. 16/584,693, mailed on Feb. 21, 2020, 15 pages.
Corrected Notice of Allowance received for U.S. Appl. No. 16/584,693, mailed on Mar. 4, 2020, 2 pages.
Corrected Notice of Allowance received for U.S. Appl. No. 16/584,693, mailed on Mar. 20, 2020, 2 pages.
Corrected Notice of Allowance received for U.S. Appl. No. 16/586,314, mailed on Apr. 8, 2020, 5 pages.
Corrected Notice of Allowance received for U.S. Appl. No. 16/586,314, mailed on Mar. 4, 2020, 3 pages.
Corrected Notice of Allowance received for U.S. Appl. No. 16/586,344, mailed on Apr. 7, 2020, 4 pages.
Corrected Notice of Allowance received for U.S. Appl. No. 16/586,344, mailed on Jan. 23, 2020, 4 pages.
Corrected Notice of Allowance received for U.S. Appl. No. 16/586,344, mailed on Mar. 17, 2020, 4 pages.
Corrected Notice of Allowance received for U.S. Appl. No. 16/835,651, mailed on Aug. 10, 2021, 4 pages.
Corrected Notice of Allowance received for U.S. Appl. No. 16/835,651, mailed on Aug. 13, 2021, 2 pages.
Corrected Notice of Allowance received for U.S. Appl. No. 16/835,651, mailed on Jul. 28, 2021, 4 pages.
Corrected Notice of Allowance received for U.S. Appl. No. 16/835,651, mailed on Jun. 14, 2021, 2 pages.
Corrected Notice of Allowance received for U.S. Appl. No. 17/041,412, mailed on Aug. 12, 2021, 2 pages.
Corrected Notice of Allowance received for U.S. Appl. No. 17/041,412, mailed on Mar. 23, 2023, 7 pages.
Corrected Notice of Allowance received for U.S. Appl. No. 17/041,412, mailed on Mar. 31, 2023, 6 pages.
Corrected Notice of Allowance received for U.S. Appl. No. 17/041,412, mailed on May 17, 2023, 2 pages.
Corrected Notice of Allowance received for U.S. Appl. No. 17/510,168, mailed on Mar. 16, 2023, 2 pages.
Corrected Notice of Allowance received for U.S. Appl. No. 17/510,168, mailed on Mar. 29, 2023, 2 pages.
Decision to Grant received for European Patent Application No. 20168009.7, mailed on Jun. 22, 2023, 4 pages.
Extended European Search Report received for European Patent Application No. 20168009.7, mailed on Sep. 11, 2020, 12 pages.
Intention to Grant received for European Patent Application No. 20168009.7, mailed on Feb. 28, 2023, 10 pages.
Intention to Grant received for European Patent Application No. 20168009.7, mailed on May 17, 2022, 9 pages.
Intention to Grant received for European Patent Application No. 20168009.7, mailed on Oct. 31, 2022, 9 pages.
Non-Final Office Action received for U.S. Appl. No. 16/582,595, mailed on Nov. 26, 2019, 17 pages.
Non-Final Office Action received for U.S. Appl. No. 16/583,020, mailed on Nov. 14, 2019, 9 pages.
Non-Final Office Action received for U.S. Appl. No. 17/041,412, mailed on Dec. 5, 2022, 13 pages.
Non-Final Office Action received for U.S. Appl. No. 17/510,168, mailed on Dec. 6, 2022, 11 pages.

Notice of Allowance received for U.S. Appl. No. 16/582,595, mailed on Mar. 20, 2020, 9 pages.
Notice of Allowance received for U.S. Appl. No. 16/583,020, mailed on Apr. 1, 2020, 5 pages.
Notice of Allowance received for U.S. Appl. No. 16/583,020, mailed on Feb. 28, 2020, 5 pages.
Notice of Allowance received for U.S. Appl. No. 16/584,044, mailed on Dec. 11, 2019, 15 pages.
Notice of Allowance received for U.S. Appl. No. 16/584,044, mailed on Mar. 30, 2020, 16 pages.
Notice of Allowance received for U.S. Appl. No. 16/584,044, mailed on Nov. 14, 2019, 13 pages,.
Notice of Allowance received for U.S. Appl. No. 16/584,100, mailed on Apr. 8, 2020, 12 pages.
Notice of Allowance received for U.S. Appl. No. 16/584,100, mailed on Jan. 14, 2020, 13 pages.
Notice of Allowance received for U.S. Appl. No. 16/584,693, mailed on Jan. 15, 2020, 15 pages.
Notice of Allowance received for U.S. Appl. No. 16/584,693, mailed on May 4, 2020, 12 pages.
Notice of Allowance received for U.S. Appl. No. 16/586,314, mailed on Apr. 1, 2020, 8 pages.
Notice of Allowance received for U.S. Appl. No. 16/586,314, mailed on Jan. 9, 2020, 10 pages.
Notice of Allowance received for U.S. Appl. No. 16/586,344, mailed on Dec. 16, 2019, 12 pages.
Notice of Allowance received for U.S. Appl. No. 16/586,344, mailed on Mar. 27, 2020, 12 pages.
Notice of Allowance received for U.S. Appl. No. 16/835,651, mailed on Jul. 23, 2021, 8 pages.
Notice of Allowance received for U.S. Appl. No. 16/835,651, mailed on Jun. 1, 2021, 10 pages.
Notice of Allowance received for U.S. Appl. No. 16/835,651, mailed on Nov. 10, 2021, 9 pages.
Notice of Allowance received for U.S. Appl. No. 17/041,412, mailed on Apr. 26, 2023, 11 pages.
Notice of Allowance received for U.S. Appl. No. 17/041,412, mailed on Mar. 15, 2023, 13 pages.
Notice of Allowance received for U.S. Appl. No. 17/510,168, mailed on Feb. 13, 2023, 10 pages.
Notice of Allowance received for U.S. Appl. No. 17/510,168, mailed on May 3, 2023, 10 pages.
Office Action received for European Patent Application No. 20168009.7, mailed on Apr. 20, 2021, 6 pages.
Office Action received for European Patent Application No. 20168009.7, mailed on Sep. 13, 2021, 8 pages.
Telleen et al., "Synthetic Shutter Speed Imaging", University of California, Santa Cruz, vol. 26, No. 3, 2007, 8 pages.
Tico et al., "Robust method of digital image stabilization", Nokia Research Center, ISCCSP, Malta, Mar. 12-14, 2008, pp. 316-321.
Final Office Action received for U.S. Appl. No. 17/088,790, mailed on Apr. 03. 2025, 59 pages.
International Preliminary Report on Patentability received for PCT Patent Application No. PCT/US2023/033501, mailed on Apr. 3, 2025, 16 pages.
International Search Report and Written Opinion received for PCT Patent Application No. PCT/US2024/048985, mailed on Feb. 13, 2025, 19 pages.
Invitation to Pay Additional Fees and Partial International Search Report received for PCT Patent Application No. PCT/US2024/048985, mailed on Dec. 23, 2024, 13 pages.
Office Action received for Australian Patent Application No. 2024200819, mailed on Mar. 24, 2025, 4 pages.
Office Action received for Chinese Patent Application No. 202010235395.9, mailed on Mar. 1, 2025, 16 pages (9 pages of English Translation and 7 pages of Official Copy).
Office Action received for European Patent Application No. 21773186.8, mailed on Mar. 20, 2025, 7 pages.
Office Action received for Indian Patent Application No. 202318031344, mailed on Apr. 1, 2025, 7 pages.
Applicant-Initiated Interview Summary received for U.S. Appl. No. 19/017,062, mailed on May 28, 2025, 4 pages.

(56)                    References Cited

OTHER PUBLICATIONS

Decision to Grant received for European Patent Application No. 22184853.4, mailed on Jun. 5, 2025, 4 pages.
Decision to Grant received for Japanese Patent Application No. 2024-073909, mailed on May 29, 2025, 3 pages (1 page of English Translation and 2 pages of Official Copy).
Notice of Allowance received for U.S. Appl. No. 18/370,363, mailed on May 29, 2025, 14 pages.
Office Action received for European Patent Application No. 24155758. 6, mailed on May 28, 2025, 8 pages.
Office Action received for Korean Patent Application No. 10-2023-0125143, mailed on May 19, 2025, 9 pages (4 pages of English Translation and 5 pages of Official Copy).
Decision to Grant received for Japanese Patent Application No. 2024-001951, mailed on Jan. 7, 2025, 4 pages (2 pages of English Translation and 2 pages of Official Copy).
Applicant-Initiated Interview Summary received for U.S. Appl. No. 17/220,596, mailed on Aug. 18, 2021, 3 pages.
Corrected Notice of Allowance received for U.S. Appl. No. 17/220,596, mailed on Nov. 4, 2021, 3 pages.
Corrected Notice of Allowance received for U.S. Appl. No. 17/220,596, mailed on Nov. 18, 2021, 27 pages.
Examiner-Initiated Interview Summary received for U.S. Appl. No. 17/220,596, mailed on Oct. 7, 2021, 2 pages.
Non-Final Office Action received for U.S. Appl. No. 17/220,596, mailed on Jun. 10, 2021, 31 pages.
Notice of Allowance received for U.S. Appl. No. 17/220,596, mailed on Oct. 21, 2021, 43 pages.
Applicant-Initiated Interview Summary received for U.S. Appl. No. 16/733,718, mailed on Nov. 2, 2020, 4 pages.
Applicant-Initiated Interview Summary received for U.S. Appl. No. 17/356,322, mailed on Dec. 27, 2022, 4 pages.
Channel Highway, "Virtual Makeover in Real-time and in full 3D", Available online at: https://www.youtube.com/watch?v=NgUbBzb5qZg, Feb. 16, 2016, 1 page.
Corrected Notice of Allowance received for U.S. Appl. No. 16/733,718, mailed on Aug. 18, 2021, 2 pages.
Corrected Notice of Allowance received for U.S. Appl. No. 16/733,718, mailed on Nov. 17, 2021, 2 pages.
Corrected Notice of Allowance received for U.S. Appl. No. 17/356,322, mailed on Feb. 15, 2023, 2 pages.
Corrected Notice of Allowance received for U.S. Appl. No. 17/356,322, mailed on Mar. 8, 2023, 2 pages.
Decision to Grant received for Danish Patent Application No. PA201770719, mailed on Feb. 3, 2022, 2 pages.
Decision to Grant received for European Patent Application No. 18704732.9, mailed on Aug. 18, 2023, 3 pages.
Decision to Grant received for Japanese Patent Application No. 2019-566087, mailed on Jan. 26, 2022, 2 pages (1 page of English Translation and 1 page of Official Copy).
Digital Trends, "ModiFace Partners with Samsung to Bring AR Makeup to the Galaxy S9", Available online at: https://www.digitaltrends.com/mobile/modiface-samsung-partnership-ar-makeup-galaxy-s9/, 2018, 16 pages.
Examiner-Initiated Interview Summary received for U.S. Appl. No. 17/356,322, mailed on Sep. 29, 2022, 4 pages.
Extended European Search Report received for European Patent Application No. 22151131.4, mailed on Mar. 24, 2022, 6 pages.
Final Office Action received for U.S. Appl. No. 15/728,147, mailed on Aug. 29, 2018, 39 pages.
Final Office Action received for U.S. Appl. No. 15/728,147, mailed on May 28, 2019, 45 pages.
Final Office Action received for U.S. Appl. No. 17/356,322, mailed on Nov. 29, 2022, 19 pages.
Gadgets Portal, "Galaxy J5 Prime Camera Review! (Vs J7 Prime) 4K", Available Online at: https://www.youtube.com/watch?v=Rf2Gy8QmDqc, Oct. 24, 2016, 3 pages.
Helpvideostv, "How to Use Snap Filters on Snapchat", Retrieved from <https://www.youtube.com/watch?v=oR-7clWPszU&feature=youtu.be>, Mar. 22, 2017, pp. 1-2.

Intention to Grant received for European Patent Application No. 18704732.9, mailed on Dec. 6, 2022, 10 pages.
Intention to Grant received for European Patent Application No. 22151131.4, mailed on Aug. 4, 2023, 10 pages.
International Preliminary Report on Patentability received for PCT Patent Application No. PCT/US2018/015591, mailed on Dec. 19, 2019, 10 pages.
International Search Report and Written Opinion received for PCT Patent Application No. PCT/US2018/015591, mailed on Jun. 14, 2018, 14 pages.
International Search Report and Written Opinion received for PCT Patent Application No. PCT/US2022/046752, mailed on Feb. 2, 2023, 19 pages.
Invitation to Pay Search Fees received for European Patent Application No. 18704732.9, mailed on Jun. 2, 2021, 3 pages.
Messelodi et al., "A Kalman filter based background updating algorithm robust to sharp illumination changes.", International Conference on Image Analysis and Processing. Springer, Berlin, Heidelberg, 2005, pp. 163-170.
Mobiscrub, "Galaxy S4 mini camera review", Available Online at: https://www.youtube.com/watch?v=KYKOydw8QT8, Aug. 10, 2013, 3 pages.
Mobiscrub, "Samsung Galaxy S5 Camera Review—HD Video", Available Online on: https://www.youtube.com/watch?v=BFgwDtNKMjg, Mar. 27, 2014, 3 pages.
Modifacechannel, "Sephora 3D Augmented Reality Mirror", Available Online at: https://www.youtube.com/watch?v=wwBO4PU9EXI, May 15, 2014, 1 page.
Non-Final Office Action received for U.S. Appl. No. 17/728,147, mailed on Feb. 22, 2018, 20 pages.
Non-Final Office Action received for U.S. Appl. No. 15/728,147, mailed on Jan. 31, 2019, 41 pages.
Non-Final Office Action received for U.S. Appl. No. 16/733,718, mailed on Sep. 16, 2020, 25 pages.
Non-Final Office Action received for U.S. Appl. No. 17/356,322, mailed on Aug. 11, 2022, 17 pages.
Notice of Acceptance received for Australian Patent Application No. 2018279787, mailed on Dec. 10, 2019, 3 pages.
Notice of Acceptance received for Australian Patent Application No. 2020201969, mailed on Mar. 26, 2021, 3 pages.
Notice of Acceptance received for Australian Patent Application No. 2021203177, mailed on Jul. 14, 2022, 3 pages.
Notice of Acceptance received for Australian Patent Application No. 2022218463, mailed on Apr. 18, 2023, 3 pages.
Notice of Allowance received for Chinese Patent Application No. 202010218168.5, mailed on Aug. 25, 2021, 6 pages (3 pages of English Translation and 3 pages of Official Copy).
Notice of Allowance received for Chinese Patent Application No. 202111323807.5, mailed on Jan. 10, 2023, 4 pages (1 page of English Translation and 3 pages of Official Copy).
Notice of Allowance received for Chinese Patent Application No. 202210063070.6, mailed on May 2, 2023, 2 pages (1 page of English Translation and 1 page of Official Copy).
Notice of Allowance received for Japanese Patent Application No. 2022-027861, mailed on Feb. 13, 2023, 3 pages (1 page of English Translation and 2 pages of Official Copy).
Notice of Allowance received for Korean Patent Application No. 10-2019-7035478, mailed on Apr. 24, 2020, 4 pages (1 page of English Translation and 3 pages of Official Copy).
Notice of Allowance received for Korean Patent Application No. 10-2020-7021870, mailed on Apr. 26, 2021, 4 pages (1 page of English Translation and 3 pages of Official Copy).
Notice of Allowance received for Korean Patent Application No. 10-2021-7020693, mailed on Dec. 27, 2021, 5 pages (1 page of English Translation and 4 pages of Official Copy).
Notice of Allowance received for Korean Patent Application No. 10-2022-7006310, mailed on Sep. 20, 2022, 8 pages (2 pages of English Translation and 6 pages of Official Copy).
Notice of Allowance received for Korean Patent Application No. 10-2022-7043663, mailed on Jul. 25, 2023, 8 pages (2 pages of English Translation and 6 pages of Official Copy).
Notice of Allowance received for U.S. Appl. No. 15/728,147, mailed on Aug. 19, 2019, 13 pages.

(56)          References Cited

OTHER PUBLICATIONS

Notice of Allowance received for U.S. Appl. No. 16/733,718, mailed on Feb. 5, 2021, 14 pages.
Notice of Allowance received for U.S. Appl. No. 16/733,718, mailed on Jul. 29, 2021, 26 pages.
Notice of Allowance received for U.S. Appl. No. 16/733,718, mailed on Oct. 20, 2021, 24 pages.
Notice of Allowance received for U.S. Appl. No. 17/356,322, mailed on Feb. 2, 2023, 11 pages.
Notice of Allowance received for U.S. Appl. No. 17/356,322, mailed on May 8, 2023, 10 pages.
Office Action received for Australian Patent Application No. 2020201969, mailed on Sep. 25, 2020, 5 pages.
Office Action received for Australian Patent Application No. 2021203177, mailed on May 4, 2022, 7 pages.
Office Action received for Australian Patent Application No. 2022218463, mailed on Mar. 17, 2023, 2 pages.
Office Action received for Chinese Patent Application No. 202010218168.5, mailed on Feb. 9, 2021, 21 pages (9 pages of English Translation and 12 pages of Official Copy).
Office Action received for Chinese Patent Application No. 202111323807.5, mailed on Jul. 15, 2022, 12 pages (6 pages of English Translation and 6 pages of Official Copy).
Office Action received for Chinese Patent Application No. 202210063070.6, mailed on Jan. 5, 2023, 12 pages (6 pages of English Translation and 6 pages of Official Copy).
Office Action received for Danish Patent Application No. PA201770563, mailed on Aug. 13, 2018, 5 pages.
Office Action received for Danish Patent Application No. PA201770563, mailed on Jan. 28, 2020, 3 pages.
Office Action received for Danish Patent Application No. PA201770563, mailed on Jun. 28, 2019, 5 pages.
Office Action received for Danish Patent Application No. PA201770719, mailed on Aug. 14, 2018, 6 pages.
Office Action received for Danish Patent Application No. PA201770719, mailed on Feb. 19, 2019, 4 pages.
Office Action received for Danish Patent Application No. PA201770719, mailed on Jan. 17, 2020, 4 pages.
Office Action received for Danish Patent Application No. PA201770719, mailed on Jun. 30, 2021, 3 pages.
Office Action received for Danish Patent Application No. PA201770719, mailed on Nov. 16, 2020, 5 pages.
Office Action received for Danish Patent Application No. PA201770719, mailed on Nov. 16, 2021, 2 pages.
Office Action received for European Patent Application No. 18704732.9, mailed on Sep. 7, 2021, 10 pages.
Office Action received for Indian Patent Application No. 201917053025, mailed on Mar. 19, 2021, 7 pages.
Office Action received for Indian Patent Application No. 202018006172, mailed on May 5, 2021, 6 pages.
Office Action received for Indian Patent Application No. 202118046032, mailed on Apr. 25, 2022, 6 pages.
Office Action received for Indian Patent Application No. 202118046033, mailed on Apr. 25, 2022, 7 pages.
Office Action received for Indian Patent Application No. 202118046044, mailed on Apr. 25, 2022, 6 pages.
Office Action received for Japanese Patent Application No. 2019-566087, mailed on Oct. 18, 2021, 10 pages (6 pages of English Translation and 4 pages of Official Copy).
Office Action received for Japanese Patent Application No. 2022-027861, mailed on Nov. 21, 2022, 4 pages (2 pages of English Translation and 2 pages of Official Copy).
Office Action received for Korean Patent Application No. 10-2019-7035478, mailed on Jan. 17, 2020, 17 pages (9 pages of English Translation and 8 pages of Official Copy).
Office Action received for Korean Patent Application No. 10-2020-7021870, mailed on Nov. 11, 2020, 11 pages (5 pages of English Translation and 6 pages of Official Copy).

Office Action received for Korean Patent Application No. 10-2021-7020693, mailed on Jul. 14, 2021, 7 pages (3 pages of English Translation and 4 pages of Official Copy).
Office Action received for Korean Patent Application No. 10-2022-7006310, mailed on Mar. 8, 2022, 6 pages (2 pages of English Translation and 4 pages of Official Copy).
Office Action received for Korean Patent Application No. 10-2022-7043663, mailed on Jan. 6, 2023, 12 pages (5 pages of English Translation and 7 pages of Official Copy).
Paine Steve, "Samsung Galaxy Camera Detailed Overview—User Interface", Retrieved from: <https://www.youtube.com/watch?v=td8UYSySulo&feature=youtu.be>, Sep. 18, 2012, pp. 1-2.
Phonearena, "Sony Xperia Z5 camera app and UI overview", Retrieved from <https://www.youtube.com/watch?v=UtDzdTsmkfU&feature=youtu.be>, Sep. 8, 2015, pp. 1-3.
Search Report and Opinion received for Danish Patent Application No. PA201770563, mailed on Oct. 10, 2017, 9 pages.
Search Report received for Danish Patent Application No. PA201770719, mailed on Oct. 17, 2017, 9 pages.
Snapchat Lenses, "How to Get All Snapchat Lenses Face Effect Filter on Android", Retrieved from: <https://www.youtube.com/watch?v=0PfnF1RInfw&feature=youtu.be>, Sep. 21, 2015, pp. 1-2.
Supplemental Notice of Allowance received for U.S. Appl. No. 16/733,718, mailed on Mar. 9, 2021, 21 pages.
Supplemental Notice of Allowance received for U.S. Appl. No. 16/733,718, mailed on Mar. 29, 2021, 2 pages.
Techtag, "Samsung J5 Prime Camera Review | True Review", Available online at: https://www.youtube.com/watch?v=a_p906ai6PQ, Oct. 26, 2016, 3 pages.
Techtag, "Samsung J7 Prime Camera Review (Technical Camera)", Available Online at: https://www.youtube.com/watch?v=AJPcLP8GpFQ, Oct. 4, 2016, 3 pages.
Vickgeek, "Canon 80D Live View Tutorial | Enhance your image quality", Available online at: https://www.youtube.com/watch?v=JGNCiy6Wt9c, Sep. 27, 2016, 3 pages.
X-Tech, "Test Make up via Slick Augmented Reality Mirror Without Putting It on", Available Online at: http://x-tech.am/test-make-up-via-slick-augmented-reality-mirror-without-putting-it-on/, Nov. 29, 2014, 5 pages.
Applicant Initiated Interview Summary received for U.S. Appl. No. 17/190,879, mailed on Oct. 26, 2021, 3 pages.
Certificate of Examination received for Australian Patent Application No. 2017100683. mailed on Jan. 16, 2018, 2 pages.
Corrected Notice of Allowance received for U.S. Appl. No. 15/273,503, mailed on Nov. 2, 2017, 2 pages.
Corrected Notice of Allowance received for U.S. Appl. No. 15/273,503, mailed on Nov. 24, 2017, 2 pages.
Corrected Notice of Allowance received for U.S. Appl. No. 15/858,175, mailed on Sep. 21, 2018, 2 pages.
Corrected Notice of Allowance received for U.S. Appl. No. 16/191,117, mailed on Dec. 9, 2019, 2 pages.
Corrected Notice of Allowance received for U.S. Appl. No. 16/191,117, mailed on Feb. 28, 2020, 2 pages.
Corrected Notice of Allowance received for U.S. Appl. No. 16/191,117, mailed on Nov. 20, 2019, 2 pages.
Corrected Notice of Allowance received for U.S. Appl. No. 16/825,879, mailed on Aug. 13, 2021, 2 pages.
Corrected Notice of Allowance received for U.S. Appl. No. 16/825,879, mailed on Jul. 23, 2021, 2 pages.
Corrected Notice of Allowance received for U.S. Appl. No. 16/825,879, mailed on Sep. 15, 2021, 2 pages.
Corrected Notice of Allowance received for U.S. Appl. No. 17/190,879, mailed on Nov. 19, 2021, 2 pages.
Corrected Notice of Allowance received for U.S. Appl. No. 17/566,094, mailed on Feb. 8, 2023, 2 pages.
Corrected Notice of Allowance received for U.S. Appl. No. 17/566,094, mailed on Jan. 5, 2023, 2 pages.
Corrected Notice of Allowance received for U.S. Appl. No. 17/566,094, mailed on Jan. 23, 2023, 2 pages.
Corrected Notice of Allowance received for U.S. Appl. No. 17/566,094, mailed on Mar. 7, 2023, 2 pages.
Corrected Notice of Allowance received for U.S. Appl. No. 18/121,458, mailed on Jan. 18, 2024, 2 pages.

(56) References Cited

OTHER PUBLICATIONS

Decision to Grant received for Danish Patent Application No. PA201670627, mailed on Nov. 29, 2018, 2 pages.

Decision to Grant received for Danish Patent Application No. PA201670753, mailed on Mar. 6, 2019, 2 pages.

Decision to Grant received for Danish Patent Application No. PA201670755, mailed on Mar. 6, 2019, 2 pages.

Decision to Grant received for European Patent Application No. 17809168.2, mailed on Oct. 21, 2021, 3 pages.

Extended Search Report received for European Patent Application 17809168.2, mailed on Jun. 28, 2018, 9 pages.

Intention to Grant received for Danish Patent Application No. PA201670627, mailed on Jun. 11, 2018, 2 pages.

Intention to Grant received for Danish Patent Application No. PA201670753, mailed on Oct. 29, 2018, 2 pages.

Intention to Grant received for Danish Patent Application No. PA201670755, mailed on Nov. 13, 2018, 2 pages.

Intention to Grant received for European Patent Application No. 17809168.2, mailed on Jun. 25, 2021, 8 pages.

International Preliminary Report on Patentability received for PCT Patent Application No. PCT/US2017/035321, mailed on Dec. 27, 2018, 11 pages.

International Search Report and Written Opinion received for PCT Patent Application No. PCT/US2017/035321, mailed on Oct. 6, 2017, 15 pages.

Invitation to Pay Addition Fees received for PCT Patent Application No. PCT/US2017/035321, mailed on Aug. 17, 2017, 3 pages.

Non-Final Office Action received for U.S. Appl. No. 15/273,522, mailed on Nov. 30, 2016, 15 pages.

Non-Final Office Action received for U.S. Appl. No. 15/273,544, mailed on May 25, 2017, 18 pages.

Non-Final Office Action received for U.S. Appl. No. 16/825,879, mailed on May 5, 2021, 12 pages.

Non-Final Office Action received for U.S. Appl. No. 17/190,879, mailed on Oct. 13, 2021, 10 pages.

Notice of Allowance received for Chinese Patent Application No. 201780002533.5, mailed on Apr. 14, 2020, 2 pages (1 page of English Translation and 1 page of Official Copy).

Notice of Allowance received for U.S. Appl. No. 15/273,503, mailed on Aug. 14, 2017, 9 pages.

Notice of Allowance received for U.S. Appl. No. 15/273,522, mailed on Mar. 28, 2017, 9 pages.

Notice of Allowance received for U.S. Appl. No. 15/273,522, mailed on May 19, 2017, 2 pages.

Notice of Allowance received for U.S. Appl. No. 15/273,522, mailed on May 23, 2017, 2 pages.

Notice of Allowance received for U.S. Appl. No. 15/273,544, mailed on Mar. 13, 2018, 8 pages.

Notice of Allowance received for U.S. Appl. No. 15/273,544, mailed on Oct. 27, 2017, 8 pages.

Notice of Allowance received for U.S. Appl. No. 15/858,175, mailed on Jun. 1, 2018, 8 pages.

Notice of Allowance received for U.S. Appl. No. 15/858,175, mailed on Sep. 12, 2018, 8 pages.

Notice of Allowance received for U.S. Appl. No. 16/191,117, mailed on Oct. 29, 2019, 9 pages.

Notice of Allowance received for U.S. Appl. No. 16/825,879, mailed on Jul. 13, 2021, 9 pages.

Notice of Allowance received for U.S. Appl. No. 16/825,879, mailed on Sep. 28, 2021, 8 pages.

Notice of Allowance received for U.S. Appl. No. 17/190,879, mailed on Nov. 10, 2021, 8 pages.

Notice of Allowance received for U.S. Appl. No. 17/566,094, mailed on Feb. 23, 2023, 8 pages.

Notice of Allowance received for U.S. Appl. No. 17/566,094, mailed on Nov. 22, 2022, 10 pages.

Notice of Allowance received for U.S. Appl. No. 18/121,458, mailed on Dec. 6, 2023, 9 pages.

Notice of Allowance received for U.S. Appl. No. 18/121,458, mailed on Mar. 12, 2024, 9 pages.

Notice of Allowance received for U.S. Appl. No. 18/628,021, mailed on Jun. 5, 2024, 9 pages.

Office Action received for Australian Patent Application No. 2017100683, mailed on Sep. 20, 2017, 3 pages.

Office Action received for Australian Patent Application No. 2017100684, mailed on Jan. 24, 2018, 4 pages.

Office Action received for Australian Patent Application No. 2017100684, mailed on Oct. 5, 2017, 4 pages.

Office Action received for Chinese Patent Application No. 201780002533.5, mailed on Apr. 25, 2019, 17 pages (7 pages of English Translation and 10 pages of Official Copy).

Office Action received for Chinese Patent Application No. 201780002533.5, mailed on Feb. 3, 2020, 6 pages (3 pages of English Translation and 3 pages of Official Copy).

Office Action received for Chinese Patent Application No. 201780002533.5, mailed on Sep. 26, 2019, 21 pages (9 pages of English Translation and 12 pages of Official Copy).

Office Action received for Danish Patent Application No. PA201670627, mailed on Apr. 5, 2017, 3 pages.

Office Action received for Danish Patent Application No. PA201670627, mailed on Nov. 6, 2017, 2 pages.

Office Action received for Danish Patent Application No. PA201670627, mailed on Oct. 11, 2016, 8 pages.

Office Action received for Danish Patent Application No. PA201670753, mailed on Dec. 20, 2016, 7 pages.

Office Action received for Danish Patent Application No. PA201670753, mailed on Jul. 5, 2017, 4 pages.

Office Action received for Danish Patent Application No. PA201670753, mailed on Mar. 23, 2018, 5 pages.

Office Action received for Danish Patent Application No. PA201670755, mailed on Apr. 6, 2017, 5 pages.

Office Action received for Danish Patent Application No. PA201670755, mailed on Apr. 20, 2018, 2 pages.

Office Action received for Danish Patent Application No. PA201670755, mailed on Dec. 22, 2016, 6 pages.

Office Action received for Danish Patent Application No. PA201670755, mailed on Oct. 20, 2017, 4 pages.

Office Action received for European Patent Application No. 17809168.2, mailed on Jan. 7, 2020, 5 pages.

Office Action received for European Patent Application No. 17809168.2, mailed on Oct. 8, 2020, 4 pages.

Shaw et al., "Skills for Closeups Photography", Watson-Guptill Publications, Nov. 1999, 5 pages (Official Copy Only) (See Communication Under Rule 37 CFR § 1.98(a) (3)).

Corrected Notice of Allowance received for U.S. Appl. No. 18/373,158, mailed on Apr. 29, 2025, 2 pages.

Non-Final Office Action received for U.S. Appl. No. 19/017,062, mailed on Apr. 23, 2025, 20 pages.

Notice of Allowance received for U.S. Appl. No. 18/123,878, mailed on Apr. 16, 2025, 11 pages.

Notice of Allowance received for U.S. Appl. No. 18/373,158, mailed on Apr. 15, 2025, 14 pages.

Office Action received for Australian Patent Application No. 2023285892, mailed on Apr. 11, 2025, 4 pages.

Applicant-Initiated Interview Summary received for U.S. Appl. No. 17/088,790, mailed on Nov. 8, 2024, 4 pages.

Corrected Notice of Allowance received for U.S. Appl. No. 18/123,878, mailed on Nov. 5, 2024, 3 pages.

Corrected Notice of Allowance received for U.S. Appl. No. 18/196,997, mailed on Nov. 15, 2024, 2 pages.

Intention to Grant received for European Patent Application No. 22184844.3, mailed on Oct. 29, 2024, 9 pages.

Non-Final Office Action received for U.S. Appl. No. 17/960,695, mailed on Nov. 1, 2024, 14 pages.

Notice of Acceptance received for Australian Patent Application No. 2024213126, mailed on Oct. 30, 2024, 3 pages.

Notice of Allowance received for Chinese Patent Application No. 201880036400.4, mailed on Nov. 8, 2024, 2 pages (1 page of English Translation and 1 page of Official Copy).

Notice of Allowance received for U.S. Appl. No. 18/196,997, mailed on Nov. 4, 2024, 11 pages.

(56) References Cited

OTHER PUBLICATIONS

Office Action received for Chinese Patent Application No. 202010235395.9, mailed on Oct. 19, 2024, 12 pages (7 pages of English Translation and 5 pages of Official Copy).

Office Action received for European Patent Application No. 23173036.7, mailed on Nov. 8, 2024, 5 pages.

Egg Flakes, "Use Slow Shutter to capture night scenes and light trails", Online available at :https://www.jianshu.com/p/6c742da00d3c, Mar. 8, 2018, 5 pages (1 page of English Translation and 4 pages of Official Copy).

Corrected Notice of Allowance received for U.S. Appl. No. 18/123,878, mailed on Oct. 18, 2024, 2 pages.

Decision to Grant received for Japanese Patent Application No. 2024-060293, mailed on Oct. 15, 2024, 3 pages (1 page of English Translation and 2 pages of Official Copy).

Intention to Grant received for European Patent Application No. 23204776.1, mailed on Oct. 4, 2024, 8 pages.

Notice of Allowance received for Korean Patent Application No. 10-2024-7032875, mailed on Oct. 10, 2024, 8 pages (2 pages of English Translation and 6 pages of Official Copy).

Notice of Hearing received for Indian Patent Application No. 202118046032, mailed on Oct. 8, 2024, 2 pages.

Notice of Hearing received for Indian Patent Application No. 202118046033, mailed on Oct. 8, 2024, 3 pages.

Notice of Hearing received for Indian Patent Application No. 202118046044, mailed on Oct. 8, 2024, 2 pages.

Office Action received for Australian Patent Application No. 2024213126, mailed on Sep. 26, 2024, 3 pages.

Office Action received for Indian Patent Application No. 202218054598, mailed on Oct. 3, 2024, 5 pages.

Office Action received for Korean Patent Application No. 10-2023-0125143, mailed on Sep. 24, 2024, 9 pages (4 pages of English Translation and 5 pages of Official Copy).

Result of Consultation received for European Patent Application No. 22184844.3, mailed on Oct. 9, 2024, 3 pages.

Brief Communication Regarding Oral Proceedings received for European Patent Application No. 21163791.3, mailed on Nov. 7, 2023, 4 pages.

Decision of Refusal received for Japanese Patent Application No. 2018-243463, mailed on Feb. 25, 2019, 8 pages (5 pages of English Translation and 3 pages of Official Copy).

Decision to Grant received for Japanese Patent Application No. 2018-243463, mailed on Aug. 17, 2020, 2 pages (1 page of English Translation and 1 page of Official Copy).

Decision to Grant received for Japanese Patent Application No. 2019-203399, mailed on Oct. 20, 2021, 3 pages (1 page of English Translation and 2 pages of Official Copy).

Decision to Grant received for Japanese Patent Application No. 2021-187533, mailed on Sep. 28, 2023, 3 pages (1 page of English Translation and 2 pages of Official Copy).

Decision to Refuse received for European Patent Application No. 21163791.3, mailed on Dec. 4, 2023, 16 pages.

Decision to Refuse received for Japanese Patent Application No. 2018-243463, mailed on Jul. 8, 2019, 5 pages (3 pages of English Translation and 2 pages of Official Copy).

European Search Report received for European Patent Application No. 21163791.3, mailed on May 6, 2021, 5 pages.

Extended European Search Report received for European Patent Application No. 24155758.6, mailed on Mar. 20, 2024, 11 pages.

Feng et al., "3D Direct Human-Computer Interface Paradigm Based on Free Hand Tracking", Chinese Journal of Computers, vol. 37, No. 6, Jun. 30, 2014, 15 pages (Official copy only) (See Communication Under Rule 37 CFR § 1.98(a) (3)).

Minutes of the Oral Proceedings received for European Patent Application No. 21163791.3, mailed on Dec. 1, 2023, 6 pages.

Notice of Acceptance received for Australian Patent Application No. 2019213341, mailed on Aug. 25, 2020, 3 pages.

Notice of Acceptance received for Australian Patent Application No. 2020260413, mailed on Oct. 14, 2021, 3 pages.

Notice of Acceptance received for Australian Patent Application No. 2021290292, mailed on Jan. 23, 2023, 3 pages.

Notice of Acceptance received for Australian Patent Application No. 2023200607, mailed on May 9, 2024, 3 pages.

Notice of Allowance received for Chinese Patent Application No. 202010600151.6, mailed on Aug. 13, 2021, 2 pages (1 page of English Translation and 1 page of Official Copy).

Notice of Allowance received for Chinese Patent Application No. 202010601484.0, mailed on Nov. 23, 2021, 2 pages (1 page of English Translation and 1 page of Official Copy).

Notice of Allowance received for Korean Patent Application No. 10-2018-7034780, mailed on Jun. 19, 2019, 4 pages (1 page of English Translation and 3 pages of Official Copy).

Notice of Allowance received for Korean Patent Application No. 10-2018-7036893, mailed on Jun. 12, 2019, 4 pages (1 page of English Translation and 3 pages of Official Copy).

Notice of Allowance received for Korean Patent Application No. 10-2019-7027042, mailed on Nov. 26, 2020, 4 pages (1 page of English Translation and 3 pages of Official Copy).

Notice of Allowance received for Korean Patent Application No. 10-2021-7000954, mailed on Aug. 18, 2021, 5 pages (2 pages of English Translation and 3 pages of Official Copy).

Notice of Allowance received for Korean Patent Application No. 10-2021-7035687, mailed on Dec. 30, 2021, 5 pages (1 page of English Translation and 4 pages of Official Copy).

Notice of Allowance received for Korean Patent Application No. 10-2022-7010505, mailed on Dec. 26, 2022, 7 pages (2 pages of English Translation and 5 pages of Official Copy).

Notice of Allowance received for Korean Patent Application No. 10-2023-7009943, mailed on Aug. 31, 2023, 7 pages (2 pages of English Translation and 5 pages of Official Copy).

Office Action received for Australian Patent Application No. 2019213341, mailed on Jun. 30, 2020, 6 pages.

Office Action received for Australian Patent Application No. 2020260413, mailed on Jun. 24, 2021, 2 pages.

Office Action received for Australian Patent Application No. 2021290292, mailed on Nov. 24, 2022, 2 pages.

Office Action received for Australian Patent Application No. 2023200607, mailed on Dec. 20, 2023, 3 pages.

Office Action received for Australian Patent Application No. 2023200607, mailed on Feb. 22, 2024, 2 pages.

Office Action received for Chinese Patent Application No. 202010600151.6, mailed on Apr. 29, 2021, 11 pages (5 pages of English Translation and 6 pages of Official copy).

Office Action received for Chinese Patent Application No. 202010601484.0, mailed on Jun. 3, 2021, 13 pages (6 pages of English Translation and 7 pages of Official Copy).

Office Action received for European Patent Application No. 21163791.3, mailed on Jun. 2, 2021, 8 pages.

Office Action received for European Patent Application No. 21163791.3, mailed on Sep. 20, 2022, 6 pages.

Office Action received for Japanese Patent Application No. 2019-203399, mailed on Aug. 10, 2021, 4 pages (2 pages of English Translation and 2 pages of Official Copy).

Office Action received for Japanese Patent Application No. 2021-187533, mailed on Feb. 6, 2023, 7 pages (4 pages of English Translation and 3 pages of Official Copy).

Office Action received for Japanese Patent Application No. 2021-187533, mailed on Jun. 26, 2023, 6 pages (3 pages of English Translation and 3 pages of Official Copy).

Office Action received for Korean Patent Application No. 10-2018-7034780, mailed on Apr. 4, 2019, 11 pages (5 pages of English Translation and 6 pages of Official Copy).

Office Action received for Korean Patent Application No. 10-2018-7036893, mailed on Apr. 9, 2019, 6 pages (2 pages of English Translation and 4 pages of Official Copy),.

Office Action received for Korean Patent Application No. 10-2019-7027042, mailed on May 13, 2020, 6 pages (2 pages of English Translation and 4 pages of Official Copy).

Office Action received for Korean Patent Application No. 10-2021-7000954, mailed on Jan. 28, 2021, 5 pages (2 pages of English Translation and 3 pages of Official Copy).

(56)                 References Cited

OTHER PUBLICATIONS

Office Action received for Korean Patent Application No. 10-2022-7010505, mailed on Jun. 14, 2022, 5 pages (2 pages of English Translation and 3 pages of Official Copy).
Osxdaily, "How to Zoom the Camera on iPhone", Available Online at: https://osxdaily.com/2012/04/18/zoom-camera-iphone/, Apr. 18, 2012, 6 pages.
Summons to Attend Oral Proceedings received for European Patent Application No. 21163791.3, mailed on May 3, 2023, 6 pages.
Brief Communication Regarding Oral Proceedings received for European Patent Application No. 22184844.3, mailed on Oct. 2, 2024, 15 pages.
Intention to Grant received for European Patent Application No. 22184853.4, mailed on Oct. 4, 2024, 9 pages.
Intention to Grant received for European Patent Application No. 22722604.0, mailed on Sep. 26, 2024, 9 pages.
International Search Report and Written Opinion received for PCT Patent Application No. PCT/US2024/020880, mailed on Aug. 26, 2024, 22 pages.
Office Action received for Chinese Patent Application No. 202210849316.2, mailed on Aug. 30, 2024, 7 pages (4 pages of English Translation and 3 pages of Official Copy).
Supplemental Notice of Allowance received for U.S. Appl. No. 17/546,968, mailed on Sep. 25, 2024, 2 pages.
Astrovideo, "Astro Video enables you to use a low-cost, low-light video camera to capture astronomical images.", Available online at: https://www.coaa.co.uk/astrovideo.htm, Retrieved on: Nov. 18, 2019, 5 pages.
Corrected Notice of Allowance received for U.S. Appl. No. 18/196,997, mailed on Apr. 18, 2024, 2 pages.
Corrected Notice of Allowance received for U.S. Appl. No. 18/196,997, mailed on Apr. 25, 2024, 2 pages.
Corrected Notice of Allowance received for U.S. Appl. No. 18/196,997, mailed on Jun. 3, 2024, 2 pages.
Corrected Notice of Allowance received for U.S. Appl. No. 18/196,997, mailed on May 23, 2024, 2 pages.
Decision to Grant received for Danish Patent Application No. PA201970593, mailed on Sep. 7, 2021, 2 pages.
Decision to Grant received for Danish Patent Application No. PA201970601, mailed on Feb. 3, 2021, 2 pages.
Decision to Grant received for Danish Patent Application No. PA201970603, mailed on May 21, 2021, 2 pages.
Decision to Grant received for Japanese Patent Application No. 2020-070418, mailed on Feb. 8, 2021, 3 pages (1 page of English Translation and 2 pages of Official Copy).
Drunk Beauty Flower Digital Technology, "iPhone Xs Max Camera Tips, Tricks, Features and Complete Tutorial", Available online at: https://www.ixigua.com/6606874981844386308?wid_try=1, Oct. 2, 2018, 2 pages (Official Copy Only) (See Communication Under Rule 37 CFR § 1.98(a) (3)).
Gibson Andrews., "Aspect Ratio: What it is and Why it Matters", Retrieved from <https://web.archive.org/web/20190331225429/https:/digital-photography-school.com/aspect-ratio-what-it-is-and-why-it-matters/>, Paragraphs: "Adjusting aspect ratio in-camera", "Cropping in post-processing", Mar. 31, 2019, 10 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S1O vs Huawei P30 Pro (Review/How to/Explained)", Online Available at: https://www.youtube.com/watch?v=d4r3PWioY4Y, Apr. 26, 2019, 4 pages.
Intention to Grant received for Danish Patent Application No. PA201970593, mailed on Apr. 13, 2021, 2 pages.
Intention to Grant received for Danish Patent Application No. PA201970601, mailed on Sep. 21, 2020, 2 pages.
Intention to Grant received for Danish Patent Application No. PA201970603, mailed on Jan. 13, 2021, 2 pages.

KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.
Non-Final Office Action received for U.S. Appl. No. 18/196,997, mailed on Nov. 20, 2023, 12 pages.
Notice of Acceptance received for Australian Patent Application No. 2020277216, mailed on Mar. 15, 2021, 3 pages.
Notice of Allowance received for U.S. Appl. No. 18/196,997, mailed on Mar. 28, 2024, 11 pages.
Office Action received for Australian Patent Application No. 2020277216, mailed on Dec. 17, 2020, 5 pages.
Office Action received for Chinese Patent Application No. 202010235395.9, mailed on Mar. 16, 2024, 18 pages (9 pages of English Translation and 9 pages of Official Copy).
Office Action received for Chinese Patent Application No. 202110766668.7, mailed on Feb. 16, 2022, 12 pages (6 pages of English Translation and 6 pages of Official Copy).
Office Action received for Chinese Patent Application No. 202110766668.7, mailed on Jan. 20, 2023, 11 pages (6 pages of English Translation and 5 pages of Official Copy).
Office Action received for Chinese Patent Application No. 202110766668.7, mailed on Jun. 7, 2023, 13 pages (9 pages of English Translation and 4 pages of Official Copy).
Office Action received for Chinese Patent Application No. 202110766668.7, mailed on Sep. 15, 2022, 18 pages (9 pages of English Translation and 9 pages of Official Copy).
Office Action received for Danish Patent Application No. PA201970592, mailed on Mar. 2, 2020, 5 pages.
Office Action received for Danish Patent Application No. PA201970592, mailed on Oct. 26, 2020, 5 pages.
Office Action received for Danish Patent Application No. PA201970593, mailed on Apr. 16, 2020, 2 pages.
Office Action received for Danish Patent Application No. PA201970593, mailed on Feb. 2, 2021, 2 pages.
Office Action received for Danish Patent Application No. PA201970593, mailed on Mar. 10, 2020, 4 pages.
Office Action received for Danish Patent Application No. PA201970595, mailed on Mar. 10, 2020, 4 pages.
Office Action received for Danish Patent Application No. PA201970600, mailed on Mar. 9, 2020, 5 pages.
Office Action received for Danish Patent Application No. PA201970601, mailed on Aug. 13, 2020, 3 pages.
Office Action received for Danish Patent Application No. PA201970601, mailed on Jan. 31, 2020, 3 pages.
Office Action received for Danish Patent Application No. PA201970601, mailed on Nov. 11, 2019, 8 pages.
Office Action received for Danish Patent Application No. PA201970603, mailed on Nov. 4, 2020, 3 pages.
Office Action received for Danish Patent Application No. PA201970605, mailed on Mar. 10, 2020, 5 pages.
Office Action received for Japanese Patent Application No. 2020-070418, mailed on Aug. 3, 2020, 22 pages (14 pages of English Translation and 8 pages of Official Copy).
Search Report and Opinion received for Danish Patent Application No. PA201970592, mailed on Nov. 7, 2019, 8 pages.
Search Report and Opinion received for Danish Patent Application No. PA201970593, mailed on Oct. 29, 2019, 10 pages.
Search Report and Opinion received for Danish Patent Application No. PA201970595, mailed on Nov. 8, 2019, 16 pages.
Search Report and Opinion received for Danish Patent Application No. PA201970600, mailed on Nov. 5, 2019, 11 pages.
Search Report and Opinion received for Danish Patent Application No. PA201970603, mailed on Nov. 15, 2019, 9 pages.
Search Report and Opinion received for Danish Patent Application No. PA201970605, mailed on Nov. 12, 2019, 10 pages.
shiftdelete.net, "Oppo Reno 10x Zoom Ön Inceleme—Huawei P30 Pro'ya rakip mi geliyor?", Available online at: https://www.youtube.com/watch?v=ev2wlUztdrg, See especially 5:34-6:05., Apr. 24, 2019, 2 pages.
"Sony Xperia XZ3 Camera Review—The Colors, Duke, The Colors!, Android Headlines—Android News & Tech News", Available online at: https://www.youtube.com/watch?v=mwpYXzWVOgw, See especially 1:02-1:27, 2:28-2:30, Nov. 3, 2018, 3 pages.

(56) References Cited

OTHER PUBLICATIONS

Sony, "User Guide, Xperia XZ3, H8416/H9436/H9493", Sony Mobile Communications Inc., Retrieved from: https://www-support-downloads.sonymobile.com/h8416/userguide_EN_H8416-H9436-H9493_2_Android9.0.pdf>, See pp. 86-102, 2018, 121 pages.

The Nitpicker, "Sony Xperia XZ3 | in-depth Preview", Available online at: https://www.youtube.com/watch?v=TGCKxBuiO5c>, See especially 12:40-17:25, Oct. 7, 2018, 3 pages.

Xeetechcare, "Samsung Galaxy S10—Super Night Mode & Ultra-Fast Charging!", online available at: https://www.youtube.com/watch?v=3bguV4FX6aA, Mar. 28, 2019, 4 pages.

Certificate of Examination received for Australian Patent Application No. 2020100720, mailed on Nov. 11, 2020, 2 pages.

Decision to Grant received for Japanese Patent Application No. 2020-184470, mailed on Jul. 1, 2021, 3 pages (1 page of English Translation and 2 pages of Official Copy).

Decision to Grant received for Japanese Patent Application No. 2020-184471, mailed on Jul. 1, 2021, 3 pages (1 page of English Translation and 2 pages of Official Copy).

European Search Report received for European Patent Application No. 20206196.6, mailed on Dec. 8, 2020, 4 pages.

Intention to Grant received for European Patent Application No. 20206196.6, mailed on Nov. 10, 2023, 10 pages.

International Preliminary Report on Patentability received for PCT Patent Application No. PCT/US2020/031843, mailed on November 18, 2021, 27 pages.

International Search Report and Written Opinion received for PCT Patent Application No. PCT/US2020/031643, mailed on Dec. 2, 2020, 33 pages.

International Search Report and Written Opinion received for PCT Patent Application No. PCT/US2020/031643, mailed on Nov. 2, 2020, 33 pages.

Invitation to Pay Additicmal Fees received for PCT Patent Application No. PCT/US2020/031643, mailed on Sep. 9, 2020, 30 pages.

Notice of Allowance received for Chinese Patent Application No. 202010287950.2, mailed on Mar. 22, 2022, 7 pages (3 pages of English Translation and 4 pages of Official Copy).

Notice of Allowance received for Chinese Patent Application No. 202010287953.6, mailed on Mar. 18, 2021, 7 pages (3 pages of English Translation and 4 pages of Official Copy).

Notice of Allowance received for Chinese Patent Application No. 202010287958.9, mailed on Aug. 27, 2022, 6 pages (3 pages of English Translation and 3 pages of Official Copy).

Notice of Allowance received for Chinese Patent Application No. 202010287961.0, mailed on Mar. 9, 2021, 8 pages (4 pages of English Translation and 4 pages of Official Copy).

Notice of Allowance received for Chinese Patent Application No. 202010287975.2, mailed on Mar. 1, 2021, 7 pages (3 pages of English Translation and 4 pages of Official Copy).

Notice of Allowance received for Chinese Patent Application No. 202011480411.7, mailed on Feb. 18, 2022, 6 pages (3 pages of English Translation and 3 pages of Official Copy).

Notice of Allowance received for Korean Patent Application No. 10-2020-0052618, mailed on Mar. 23, 2021, 5 pages (2 page of English Translation and 3 pages of Official Copy).

Office Action received for Australian Patent Application No. 2020100720, mailed on Jul. 9, 2020, 7 pages.

Office Action received for Australian Patent Application No. 2020100720, mailed on Sep. 1, 2020, 5 pages.

Office Action received for Chinese Patent Application No. 202010287950.2, mailed on Aug. 10, 2021, 12 pages (6 pages of English Translation and 6 pages of Official Copy).

Office Action received for Chinese Patent Application No. 202010287950.2, mailed on Feb. 20, 2021, 22 pages (10 pages of English Translation and 12 pages of Official Copy).

Office Action received for Chinese Patent Application No. 202010287950.2, mailed on Nov. 19, 2021, 8 pages (5 pages of English Translation and 6 pages of Official Copy).

Office Action received for Chinese Patent Application No. 202010287953.6, mailed on Jan. 14, 2021, 14 pages (7 pages of English Translation and 7 pages of Official Copy).

Office Action received for Chinese Patent Application No. 202010287958.9, mailed on Jan. 5, 2021, 16 pages (8 pages of English Translation and 8 pages of Official Copy).

Office Action received for Chinese Patent Application No. 202010287961.0, mailed on Dec. 30, 2020, 16 pages (8 pages of English Translation and 8 pages of Official Copy).

Office Action received for Chinese Patent Application No. 202010287975.2, mailed on Dec. 30, 2020, 17 pages (9 pages of English Translation and 8 pages of Official Copy).

Office Action received for Chinese Patent Application No. 202011480411.7, mailed on Aug. 2, 2021, 12 pages (6 pages of English Translation and 6 pages of Official Copy).

Office Action received for Chinese Patent Application No. 202011480411.7, mailed on Jan. 12, 2022, 7 pages (4 pages of English Translation and 3 pages of Official Copy).

Office Action received for European Patent Application No. 20206196.6, mailed on Aug. 10, 2022, 13 pages.

Office Action received for European Patent Application No. 20206196.6, mailed on Jan. 13, 2021, 10 pages.

Office Action received for Japanese Patent Application No. 2020-184470, mailed on May 10, 2021, 3 pages (1 page of English Translation and 2 pages of Official Copy).

Office Action received for Japanese Patent Application No. 2020-184471, mailed on May 10, 2021, 3 pages (1 page of English Translation and 2 pages of Official Copy).

Office Action received for Korean Patent Application No. 10-2020-0052618, mailed on Aug. 18, 2020, 11 pages (5 pages of English Translation and 6 pages of Official Copy).

Result of Consultation received for European Patent Application No. 20206196.6, mailed on Mar. 27, 2024, 4 pages.

Schiffhauer, Alexander, "See the Light with Night Sight", Available online at: https://www.blog.google/products/pixel/see-light-night-sight. Nov. 14, 2018, 6 pages.

Applicant-Initiated Interview Summary received for U.S. Appl. No. 17/027,317, mailed on Dec. 21, 2020, 4 pages.

Certificate of Examination received for Australian Patent Application No. 2021103004, mailed on Sep. 13, 2021, 2 pages.

Certificate of Examination received for Australian Patent Application No. 2021107587, mailed on Apr. 29, 2022, 2 pages.

Clover Juli, "Moment Pro Camera App for iOS Gains Zebra Striping for Displaying Over and Underexposed Areas", Online Available at: https://web.archive.org/web/20190502081353/https://www.macrumors.com/2019/05/01/momentcamera-app-zebra-striping-and-more/, May 1, 2019, 8 pages.

Corrected Notice of Allowance received for U.S. Appl. No. 17/027,484, mailed on May 14, 2021, 5 pages.

Corrected Notice of Allowance received for U.S. Appl. No. 17/027,484, mailed on May 28, 2021, 5 pages.

Corrected Notice of Allowance received for U.S. Appl. No. 17/354,376, mailed on Apr. 11, 2022, 5 pages.

Corrected Notice of Allowance received for U.S. Appl. No. 17/354,376, mailed on Feb. 16, 2022, 5 pages,.

Corrected Notice of Allowance received for U.S. Appl. No. 17/354,376, mailed on Mar. 23, 2022, 6 pages.

Corrected Notice of Allowance received for U.S. Appl. No. 17/740,032, mailed on Feb. 15, 2023, 6 pages.

Corrected Notice of Allowance received for U.S. Appl. No. 17/740,032, mailed on Nov. 3, 2022, 6 pages.

Decision to Grant received for European Patent Application No. 21733324.4, mailed on Jun. 2, 2023, 3 pages.

Decision to Grant received for Japanese Patent Application No. 2022-130725, mailed on Dec. 11, 2023, 2 pages (1 page of English Translation and 1 page of Official Copy).

Demetriou Soteris, "Analyzing & Designing the Security of Shared Resources on Smartphone Operating Systems", Dissertation, University of Illinois at Urbana-Champaign Online available at: https://www.ideals.illinois.edu/bitstream/handle/2142/100907/DEMETRIOU-DISSERTATION-2018.pdf?sequence=1&isAllowed=n, 2018, 211 pages.

(56) References Cited

OTHER PUBLICATIONS

Dutta Tushars, "Warning! IOS Apps with Camera Access Permission Can Spy on You", Online available at: https://web.archive.org/web/20180219092123/https://techviral.net/ios-apps-camera-can-spy/, Feb. 19, 2018, 3 pages.

Extended European Search Report received for European Patent Application No. 23173036.7, mailed on Jul. 24, 2023, 13 pages.

Imagespacetv, "Olympus OM-D E-M1 Mark II—Highlights & Shadows with Gavin Hoey", Online available at: https://www.youtube.com/watch?v=goEhh1n--hQ, Aug. 3, 2018, 3 pages.

Intention to Grant received for Danish Patent Application No. PA202070611, mailed on May 5, 2021, 2 pages.

Intention to Grant received for European Patent Application No. 21733324.4, mailed on Jan. 9, 2023, 9 pages.

Intention to Grant received for European Patent Application No. 21733324.4, mailed on Sep. 13, 2022, 7 pages.

International Preliminary Report on Patentability received for PCT Patent Application No. PCT/US2021/034304, mailed on Dec. 15, 2022, 19 pages.

International Search Report and Written Opinion received for PCT Patent Application No. PCT/US2021/034304, mailed on Oct. 11, 2021, 24 pages.

Invitation to Pay Additional Fees received for PCT Patent Application No. PCT/US2021/034304, mailed on Aug. 20, 2021, 16 pages.

King Juliea, "How to Check the Exposure Meter on Your Nikon D5500", Online available at: https://www.dummies.com/article/home-auto-hobbies/photography/how-to-check-the-exposuremeter-on-your-nikon-d5500-142677, Mar. 26, 2016, 6 pages.

"Nikon Digital Camera D7200 User's Manual", online available at: https://download.nikonimglib.com/archive3/dbHI400jWws903mGr6q98a4k8F90/D7200UM_SG(En)05.pdf, 2005, 416 pages.

Non-Final Office Action received for U.S. Appl. No. 17/027,317, mailed on Nov. 17, 2020, 17 pages.

Non-Final Office Action received for U.S. Appl. No. 18/114,880, mailed on Aug. 29, 2023, 10 pages.

Notice of Acceptance received for Australian Patent Application No. 2020239717, mailed on Jun. 1, 2022, 3 pages.

Notice of Acceptance received for Australian Patent Application No. 2022228191, mailed on Oct. 10, 2023, 3 pages.

Notice of Allowance received for Japanese Patent Application No. 2020-159338, mailed on Jul. 19, 2022, 3 pages (1 page of English Translation and 2 pages of Official Copy).

Notice of Allowance received for Korean Patent Application No. 10-2020-0124139, mailed on Jun. 19, 2023, 7 pages (2 pages of English Translation and 5 pages of Official Copy).

Notice of Allowance received for U.S. Appl. No. 17/027,317, mailed on Apr. 12, 2021, 7 pages.

Notice of Allowance received for U.S. Appl. No. 17/027,317, mailed on Jan. 13, 2021, 10 pages.

Notice of Allowance received for U.S. Appl. No. 17/027,484, mailed on May 3, 2021, 11 pages.

Notice of Allowance received for U.S. Appl. No. 17/354,376, mailed on Jan. 27, 2022, 10 pages.

Notice of Allowance received for U.S. Appl. No. 17/354,376, mailed on Mar. 4, 2022, 5 pages.

Notice of Allowance received for U.S. Appl. No. 17/354,376, mailed on Mar. 30, 2022, 5 pages.

Notice of Allowance received for U.S. Appl. No. 17/740,032, mailed on Feb. 1, 2023, 9 pages.

Notice of Allowance received for U.S. Appl. No. 17/740,032, mailed on Oct. 13, 2022, 11 pages.

Notice of Allowance received for U.S. Appl. No. 18/114,880, mailed on Feb. 15, 2024, 17 pages.

Notice of Allowance received for U.S. Appl. No. 18/114,880, mailed on Nov. 15, 2023, 11 pages.

Office Action received for Australian Patent Application No. 2020239717, mailed on Dec. 15, 2021, 6 pages.

Office Action received for Australian Patent Application No. 2020239717, mailed on Jun. 23, 2021, 7 pages.

Office Action received for Australian Patent Application No. 2020239717, mailed on Mar. 16, 2022, 4 pages.

Office Action received for Australian Patent Application No. 2020239717, mailed on Sep. 28, 2021, 6 pages.

Office Action received for Australian Patent Application No. 2021103004, mailed on Aug. 12, 2021, 5 pages.

Office Action received for Australian Patent Application No. 2021107587, mailed on Feb. 1, 2022, 6 pages.

Office Action received for Australian Patent Application No. 2022228191, mailed on Aug. 16, 2023, 4 pages.

Office Action received for Chinese Patent Application No. 202210849242.2, mailed on Jan. 20, 2023, 12 pages (6 pages of English Translation and 6 pages of Official Copy).

Office Action received for Chinese Patent Application No. 202210849316.2, mailed on Jan. 18, 2024, 12 pages (6 pages of English Translation and 6 pages of Official Copy).

Office Action received for Danish Patent Application No. PA202070611, mailed on Dec. 22, 2020, 7 pages.

Office Action received for Indian Patent Application No. 202014041530, mailed on Dec. 8, 2021, 7 pages.

Office Action received for Indian Patent Application No. 202215010325, mailed on Oct. 10, 2022, 7 pages.

Office Action received for Japanese Patent Application No. 2020-159338, mailed on Dec. 8, 2021, 9 pages (5 pages of English Translation and 4 pages of Official Copy).

Office Action received for Japanese Patent Application No. 2022-130725, mailed on Sep. 4, 2023, 2 pages (1 page of English Translation and 1 page of Official Copy).

Office Action received for Korean Patent Application No. 10-2020-0124139, mailed on Jan. 17, 2023, 10 pages (5 pages of English Translation and 5 pages of Official Copy).

"Procamera Capture the Moment", Online Available at: http://www.procamera-app.com/procamera_manual/ProCamera_Manual_EN.pdf, Apr. 21, 2016, 63 pages.

Whitacre Michele, "Photography 101 | Exposure Meter", Online available at: https://web.archive.org/web/20160223055834/http://www.michelewhitacrephotographyblog.com, Feb. 23, 2016, 4 pages.

Wu et al., "Security Threats to Mobile Multimedia Applications: Camera-Based Attacks on Mobile Phones", IEEE Communications Magazine, Available online at: http://www.ieeeprojectmadurai.in/BASE/ANDROID/Security%20Threats%20to%20Mobile.pdf, Mar. 2014, pp. 80-87.

Intention to Grant received for European Patent Application No. 20206196.6, mailed on Mar. 10, 2025, 10 pages.

Notice of Hearing received for Indian Patent Application No. 202215010325, mailed on Mar. 10, 2025, 3 pages.

Advisory Action received for U.S. Appl. No. 17/088,790, mailed on Nov. 28, 2023, 4 pages.

Applicant-Initiated Interview Summary received for U.S. Appl. No. 17/088,790, mailed on Jan. 14, 2022, 5 pages.

Applicant-Initiated Interview Summary received for U.S. Appl. No. 17/088,790, mailed on Jul. 7, 2022, 4 pages.

Applicant-Initiated Interview Summary received for U.S. Appl. No. 17/088,790, mailed on May 25, 2023, 4 pages.

Applicant-Initiated Interview Summary received for U.S. Appl. No. 17/088,790, mailed on Oct. 12, 2023, 4 pages.

Applicant-Initiated Interview Summary received for U.S. Appl. No. 17/546,968, mailed on Apr. 26, 2024, 2 pages.

Applicant-Initiated Interview Summary received for U.S. Appl. No. 17/546,968, mailed on Jan. 16, 2024, 3 pages.

Final Office Action received for U.S. Appl. No. 17/088,790, mailed on Aug. 17, 2023, 47 pages.

Final Office Action received for U.S. Appl. No. 17/088,790, mailed on May 17, 2022, 37 pages.

Final Office Action received for U.S. Appl. No. 17/546,968, mailed on Mar. 19, 2024, 43 pages.

Hearing Notice received for Indian Patent Application No. 201817024430, mailed on Apr. 6, 2023, 2 pages.

International Preliminary Report on Patentability received for PCT Patent Application No. PCT/US2021/046877, mailed on Apr. 6, 2023, 12 pages.

(56) References Cited

OTHER PUBLICATIONS

International Search Report and Written Opinion received for PCT Patent Application No. PCT/US2021/046877, mailed on Mar. 1, 2022, 17 pages.
Invitation to Pay Additional Fees received for PCT Patent Application No. PCT/US2021/046877, mailed on Jan. 5, 2022, 10 pages.
Non-Final Office Action received for U.S. Appl. No. 17/088,790, mailed on Feb. 21, 2023, 39 pages.
Non-Final Office Action received for U.S. Appl. No. 17/088,790, mailed on Sep. 17, 2021, 31 pages.
Non-Final Office Action received for U.S. Appl. No. 17/546,968, mailed on Nov. 24, 2023, 34 pages.
Notice of Allowance received for U.S. Appl. No. 17/546,968, mailed on May 31, 2024, 24 pages.
Office Action received for Indian Patent Application No. 201817024430, mailed on Sep. 27, 2021, 8 pages.
Extended European Search Report received for European Patent Application No. 25178454.2, mailed on Aug. 11, 2025, 11 pages.
Non-Final Office Action received for U.S. Appl. No. 18/204,881, mailed on Aug. 7, 2025, 7 pages.
Office Action received for Korean Patent Application No. 10-2023-7033714, mailed on Jul. 21, 2025, 17 pages (8 pages of English Translation and 9 pages of Official Copy).
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages.
Communication for Board of Appeal received for European Patent Application No. 17184710.6, mailed on Feb. 29, 2024, 13 pages.
Corrected Notice of Allowance received for U.S. Appl. No. 14/641,251, mailed on Jun. 17, 2016, 2 pages.
Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Decision to grant received for Danish Patent Application No. PA201570788, mailed on Jul. 10, 2017, 2 pages.
Decision to Grant received for Danish Patent Application No. PA201570791, mailed on Jun. 7, 2017, 2 pages.
Decision to Grant received for European Patent Application No. 15712218.5, mailed on Jun. 7, 2018, 2 pages.
Decision to Refuse received for European Patent Application No. 17184710.6, mailed on Jun. 16, 2020, 9 pages.
Final Office Action received for U.S. Appl. No. 15/268,115, mailed on Oct. 11, 2017, 48 pages.
Franks Tech Help, "DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Intention to Grant received for Danish Patent Application No. PA201570788, mailed on Mar. 27, 2017, 2 pages.
Intention to Grant received for Danish Patent Application No. PA201570791, mailed on Mar. 7, 2017, 2 pages.
Intention to Grant received for European Patent Application No. 15712218.5, mailed on Jan. 24, 2018, 7 pages.
International Preliminary Report on Patentability received for PCT Patent Application No. PCT/US2015/019298, mailed on Mar. 16, 2017, 12 pages.
International Preliminary Report on Patentability received for PCT Patent Application No. PCT/US2022/046752, mailed on Apr. 25, 2024, 16 pages.
International Search Report and Written Opinion received for PCT Patent Application No. PCT/US2023/024344, mailed on Oct. 30, 2023, 24 pages.

International Search Report and Written Opinion received for PCT Patent Application No. PCT/US2023/033501, mailed on Feb. 26, 2024, 21 pages.
Invitation to Pay Additional Fees and Partial International Search Report received for PCT Patent Application No. PCT/US2023/024344, mailed on Sep. 8, 2023, 16 pages.
Invitation to Pay Additional Fees and Partial International Search Report received for PCT Patent Application No. PCT/US2023/033501, mailed on Jan. 5, 2024, 15 pages.
International Search Report and Written Opinion received for PCT Patent Application No. PCT/US2015/019298, mailed on Jul. 13, 2015, 17 pages.
Minutes of the Oral Proceedings received for European Patent Application No. 17184710.6, mailed on May 22, 2024, 4 pages.
Non-Final Office Action received for U.S. Appl. No. 15/268,115, mailed on Apr. 13, 2017, 44 pages.
Notice of Allowance received for Chinese Patent Application No. 201580046237.6, mailed on Aug. 29, 2018, 4 pages (1 page of English Translation and 3 pages of Official copy).
Notice of Allowance received for Chinese Patent Application No. 201710657424.9, mailed on May 8, 2020, 2 pages (1 page of English Translation and 1 page of Official Copy).
Notice of Allowance received for Taiwanese Patent Application No. 104107328, mailed on Jun. 12, 2017, 3 pages (Official Copy Only) {(See Communication Under Rule 37 CFR § 1.98(a) (3)}.
Notice of Allowance received for U.S. Appl. No. 14/641,251, mailed on May 18, 2016, 13 pages.
Notice of Allowance received for U.S. Appl. No. 15/268,115, mailed on Mar. 7, 2018, 15 pages.
Notice of Allowance received for U.S. Appl. No. 15/975,581, mailed on Oct. 3, 2018, 25 pages.
Office Action received for Chinese Patent Application No. 201580046237.6, mailed on Feb. 6, 2018, 10 pages (5 pages of English Translation and 5 pages of Official Copy).
Office Action received for Chinese Patent Application No. 201710657424.9, mailed on Sep. 17, 2019, 23 pages (11 pages of English Translation and 12 pages of Official Copy).
Office Action received for Danish Patent Application No. PA201570788, mailed on Apr. 8, 2016, 11 pages.
Office Action received for Danish Patent Application No. PA201570788, mailed on Sep. 13, 2016, 3 pages.
Office action received for Danish Patent Application No. PA201570791, mailed on Sep. 6, 2016, 4 pages.
Office action received for Danish Patent Application No. PA201570791, mailed on Apr. 6, 2016, 12 pages.
Office Action received for European Patent Application No. 15712218.5, mailed on Aug. 3, 2017, 4 pages.
Office Action received for European Patent Application No. 17184710.6, mailed on Dec. 21, 2018, 7 pages.
Office Action received for Taiwanese Patent Application No. 104107328, mailed on Dec. 28, 2016, 4 pages (1 page of Search Report and 3 pages of Official Copy).
PlayMemories Camera Apps, "PlayMemories Camera Apps Help Guide", available at: https://www.playmemoriescameraapps.com/portal/manual/IS9104-NPIA09014_00-F00002/en/index.html, 2012, 3 pages.
"Remote Shot for SmartWatch 2", Available online at: https://play.google.com/store/apps/details?id=net.watea.sw2.rshot&hl=en, Nov. 21, 2017, 3 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Summons to Attend Oral Proceedings received for European Patent Application No. 17184710.6, mailed on Sep. 17, 2019, 7 pages.
Summons to Oral Proceedings received for European Patent Application No. 17184710.6, mailed on May 10, 2023, 3 pages.
Techsmith, "Snagit® 11 Snagit 11.4 Help", Online available at: http://assets.techsmith.com/Downloads/ua-tutorials-snagit-11/Snagit_11.pdf>, Jan. 2014, 146 pages.

(56) References Cited

OTHER PUBLICATIONS

Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.

Xperia Blog, "Action Camera Extension Gives Smartwatch/Smartband Owners Ability to Control Sony Wireless Cameras", Available at: http://www.xperiablog.net/2014/06/13/action-camera-extension-gives-smartwatchsmartband-owners-ability-to-control-sony-wireless-cameras/, Jun. 13, 2014, 10 pages.

Advisory Action received for U.S. Appl. No. 18/123,878, mailed on Jun. 24, 2024, 4 pages.

Applicant-Initiated Interview Summary received for U.S. Appl. No. 18/628,021, mailed on Aug. 5, 2024, 4 pages.

Corrected Notice of Allowance received for U.S. Appl. No. 18/196,997, mailed on Aug. 19, 2024, 2 pages.

Corrected Notice of Allowance received for U.S. Appl. No. 18/196,997, mailed on Jun. 13, 2024, 2 pages.

Corrected Notice of Allowance received for U.S. Appl. No. 18/207,293, mailed on Sep. 12, 2024, 2 pages.

Corrected Notice of Allowance received for U.S. Appl. No. 18/207,293, mailed on Sep. 20, 2024, 2 pages.

Corrected Notice of Allowance received for U.S. Appl. No. 18/228,591, mailed on Aug. 5, 2024, 5 pages.

Corrected Notice of Allowance received for U.S. Appl. No. 18/228,591, mailed on Jun. 13, 2024, 5 pages.

Corrected Notice of Allowance received for U.S. Appl. No. 18/628,021, mailed on Jun. 24, 2024, 2 pages.

Corrected Notice of Allowance received for U.S. Appl. No. 18/628,021, mailed on Sep. 12, 2024, 2 pages.

Decision to Grant received for European Patent Application No. 21202358.4, mailed on Aug. 29, 2024, 2 pages.

International Search Report and Written Opinion received for PCT Patent Application No. PCT/US2024/026652, mailed on Sep. 3, 2024, 15 pages.

Non-Final Office Action received for U.S. Appl. No. 17/088,790, mailed on Sep. 9, 2024, 51 pages.

Notice of Allowance received for Korean Patent Application No. 10-2023-7037005, mailed on Jul. 2, 2024, 10 pages (2 pages of English Translation and 8 pages of Official Copy).

Notice of Allowance received for U.S. Appl. No. 17/546,968, mailed on Sep. 13, 2024, 25 pages.

Notice of Allowance received for U.S. Appl. No. 18/123,878, mailed on Sep. 5, 2024, 11 pages.

Notice of Allowance received for U.S. Appl. No. 18/196,997, mailed on Jul. 15, 2024, 11 pages.

Notice of Allowance received for U.S. Appl. No. 18/207,293, mailed on Aug. 7, 2024, 12 pages.

Notice of Allowance received for U.S. Appl. No. 18/228,591, mailed on Jul. 29, 2024, 8 pages.

Notice of Allowance received for U.S. Appl. No. 18/628,021, mailed on Aug. 28, 2024, 9 pages.

Office Action received for Chinese Patent Application No. 201880036400.4, mailed on Aug. 24, 2024, 16 pages (9 pages of English Translation and 7 pages of Official Copy).

Office Action received for Indian Patent Application No. 202218016788, mailed on Sep. 4, 2024, 5 pages.

Office Action received for Japanese Patent Application No. 2024-060293, mailed on Jul. 29, 2024, 6 pages (3 pages of English Translation and 3 pages of Official Copy).

Office Action received for Japanese Patent Application No. 2024-073909, mailed on Aug. 1, 2024, 4 pages (2 pages of English Translation and 2 pages of Official Copy).

Office Action received for Korean Patent Application No. 10-2023-7002360, mailed on Jun. 5, 2024, 6 pages (2 pages of English Translation and 4 pages of Official Copy).

Supplemental Notice of Allowance received for U.S. Appl. No. 17/546,968, mailed on Jun. 14, 2024, 2 pages.

Applicant-Initiated Interview Summary received for U.S. Appl. No. 17/960,695, mailed on Nov. 25, 2024, 2 pages.

International Search Report and Written Opinion received for PCT Patent Application No. PCT/US2024/024016, mailed on Jul. 30, 2024, 10 pages.

International Search Report and Written Opinion received for PCT Patent Application No. PCT/US2024/031468, mailed on Nov. 20, 2024, 17 pages.

Invitation to Pay Additional Fees and Partial International Search Report received for PCT Patent Application No. PCT/US2024/031468, mailed on Sep. 30, 2024, 9 pages.

Notice of Allowance received for Chinese Patent Application No. 202210849316.2, mailed on Nov. 9, 2024, 4 pages (1 page of English Translation and 3 pages of Official Copy).

Office Action received for Japanese Patent Application No. 2023-560225, mailed on Nov. 15, 2024, 11 pages (5 pages of English Translation and 6 pages of Official Copy).

Decision to Grant received for European Patent Application No. 23204776.1, mailed on Jul. 3, 2025, 4 pages.

Notice of Allowance received for U.S. Appl. No. 18/373,158, mailed on Jul. 1, 2025, 15 pages.

Office Action received for Japanese Patent Application No. 2023-158354, mailed on Jun. 3, 2025, 6 pages (3 pages of English Translation and 3 pages of Official Copy).

Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.

AT&T, "Pantech C3b User Guide", At&T, Feb. 10, 2007, 14 pages.

Corrected Notice of Allowance received for U.S. Appl. No. 17/483,684, mailed on Aug. 24, 2022, 6 pages.

Corrected Notice of Allowance received for U.S. Appl. No. 17/484,279, mailed on Feb. 15, 2022, 2 pages.

Corrected Notice of Allowance received for U.S. Appl. No. 17/484,279, mailed on Feb. 28, 2022, 2 pages.

Corrected Notice of Allowance received for U.S. Appl. No. 17/484,307, mailed on Apr. 20, 2022, 2 pages.

Corrected Notice of Allowance received for U.S. Appl. No. 17/484,307, mailed on Feb. 10, 2022, 7 pages.

Corrected Notice of Allowance received for U.S. Appl. No. 17/484,321, mailed on Mar. 24, 2022, 2 pages.

Corrected Notice of Allowance received for U.S. Appl. No. 17/944,765, mailed on Jul. 27, 2023, 5 pages.

Corrected Notice of Allowance received for U.S. Appl. No. 17/944,765, mailed on Jun. 1, 2023, 5 pages.

Corrected Notice of Allowance received for U.S. Appl. No. 18/228,591, mailed on Apr. 16, 2024, 5 pages.

Corrected Notice of Allowance received for U.S. Appl. No. 18/228,591, mailed on May 28, 2024, 5 pages.

European Search Report received for European Patent Application No. 22184844.3, mailed on Nov. 4, 2022, 4 pages.

European Search Report received for European Patent Application No. 22184853.4, mailed on Nov. 14, 2022, 5 pages.

Intention to Grant received for European Patent Application No. 22722604.0, mailed on May 14, 2024, 9 pages.

International Preliminary Report on Patentability received for PCT Patent Application No. PCT/US2022/024964, mailed on Nov. 9, 2023, 11 pages.

International Search Report and Written Opinion received for PCT Patent Application No. PCT/US2022/024964, mailed on Aug. 4, 2022, 17 pages.

Non-Final Office Action received for U.S. Appl. No. 12/508,534, mailed on Dec. 30, 2011, 11 pages.

Non-Final Office Action received for U.S. Appl. No. 17/944,765, mailed on Jan. 18, 2023, 9 pages.

Notice of Allowance received for Chinese Patent Application No. 202180002106.3, mailed on May 5, 2022, 6 pages (3 pages of English Translation and 3 pages of Official Copy).

Notice of Allowance received for U.S. Appl. No. 17/483,684, mailed on Apr. 27, 2022, 10 pages.

Notice of Allowance received for U.S. Appl. No. 17/483,684, mailed on Aug. 16, 2022, 9 pages.

Notice of Allowance received for U.S. Appl. No. 17/483,684, mailed on Oct. 24, 2022, 9 pages.

Notice of Allowance received for U.S. Appl. No. 17/484,279, mailed on Jan. 26, 2022, 12 pages.

(56)          References Cited

OTHER PUBLICATIONS

Notice of Allowance received for U.S. Appl. No. 17/484,279, mailed on May 13, 2022, 9 pages.
Notice of Allowance received for U.S. Appl. No. 17/484,307, mailed on Mar. 8, 2022, 11 pages.
Notice of Allowance received for U.S. Appl. No. 17/484,307, mailed on Nov. 30, 2021, 11 pages.
Notice of Allowance received for U.S. Appl. No. 17/484,321, mailed on Nov. 30, 2021, 10 pages.
Notice of Allowance received for U.S. Appl. No. 17/944,765, mailed on Apr. 5, 2023, 9 pages.
Notice of Allowance received for U.S. Appl. No. 18/228,591, mailed on Apr. 5, 2024, 10 pages.
Notice of Allowance received for U.S. Appl. No. 18/228,591, mailed on May 16, 2024, 5 pages.
Office Action received for Chinese Patent Application No. 202180002106.3, mailed on Feb. 16, 2022, 12 pages (6 pages of English Translation and 6 pages of Official Copy).
Office Action received for Chinese Patent Application No. 202211072261.5, mailed on Apr. 28, 2024, 19 pages (13 pages of English Translation and 6 pages of Official Copy).
Office Action received for Chinese Patent Application No. 202211072261.5, mailed on Apr. 29, 2023, 17 pages (9 pages of English Translation and 8 pages of Official Copy).
Office Action received for Chinese Patent Application No. 202211072261.5, mailed on Dec. 28, 2023, 22 pages (14 pages of English Translation and 8 pages of Official Copy).
Office Action received for Chinese Patent Application No. 202211072958.2, mailed on Apr. 5, 2023, 11 pages (6 pages of English Translation and 5 pages of Official Copy).
Office Action received for Chinese Patent Application No. 202211072958.2, mailed on Jan. 27, 2024, 19 pages (8 pages of English Translation and 11 pages of Official Copy).
Office Action received for Chinese Patent Application No. 202211072958.2, mailed on Jun. 20, 2023, 48 pages (24 pages of English Translation and 24 pages of Official Copy).
Office Action received for Chinese Patent Application No. 202211073034.4, mailed on Mar. 26, 2024, 14 pages (9 pages of English Translation and 5 pages of Official Copy).
Office Action received for Chinese Patent Application No. 202211073034.4, mailed on May 30, 2023, 21 pages (10 pages of English Translation and 11 pages of Official Copy).
Office Action received for Chinese Patent Application No. 202211073034.4, mailed on Nov. 22, 2023, 14 pages (9 pages of English Translation and 5 pages of Official Copy).
Office Action received for European Patent Application No. 22184844.3, mailed on Apr. 26, 2023, 5 pages.
Office Action received for European Patent Application No. 22184844.3, mailed on Nov. 16, 2022, 7 pages.
Office Action received for European Patent Application No. 22184853.4, mailed on Apr. 26, 2023, 4 pages.
Office Action received for European Patent Application No. 22184853.4, mailed on Apr. 29, 2024, 5 pages.
Office Action received for European Patent Application No. 22184853.4, mailed on Dec. 11, 2023, 4 pages.
Office Action received for European Patent Application No. 22184853.4, mailed on Nov. 25, 2022, 7 pages.
Office Action received for European Patent Application No. 22722604.0, mailed on Oct. 13, 2023, 11 pages.
Peters, "Long-Awaited iPhone Goes on Sale", nytimes.com, Jun. 29, 2007, 3 pages.
Result of Consultation received for European Patent Application No. 22184844.3, mailed on Aug. 28, 2023, 3 pages.
Result of Consultation received for European Patent Application No. 22184844.3, mailed on Feb. 1, 2023, 3 pages.
Summons to Attend Oral Proceedings received for European Patent Application No. 22184844.3, mailed on Dec. 11, 2023, 9 pages.
Supplemental Notice of Allowance received for U.S. Appl. No. 17/484,321, mailed on Mar. 1, 2022, 6 pages.

Applicant-Initiated Interview Summary received for U.S. Appl. No. 18/123,878, mailed on Apr. 15, 2024, 4 pages.
Applicant-Initiated Interview Summary received for U.S. Appl. No. 18/123,878, mailed on Jun. 3, 2024, 3 pages.
Applicant-Initiated Interview Summary received for U.S. Appl. No. 18/207,293, mailed on Apr. 19, 2024, 3 pages.
Corrected Notice of Allowance received for U.S. Appl. No. 16/143,396, mailed on Jan. 30, 2020, 2 pages.
Corrected Notice of Allowance received for U.S. Appl. No. 16/840,719, mailed on Jul. 8, 2021, 8 pages.
Corrected Notice of Allowance received for U.S. Appl. No. 16/840,719, mailed on May 14, 2021, 4 pages.
Corrected Notice of Allowance received for U.S. Appl. No. 17/409,598, mailed on Jul. 7, 2022, 2 pages.
Corrected Notice of Allowance received for U.S. Appl. No. 17/409,598, mailed on Jul. 18, 2022, 3 pages.
Corrected Notice of Allowance received for U.S. Appl. No. 17/409,598, mailed on Sep. 30, 2022, 2 pages.
Decision to Grant received for European Patent Application No. 16784025.5, mailed on Nov. 11, 2021, 2 pages.
Decision to Grant received for European Patent Application No. 22151131.4, mailed on Nov. 16, 2023, 3 pages.
Decision to Grant received for Japanese Patent Application No. 2023-041079, mailed on Mar. 28, 2024, 3 pages (1 page of English Translation and 2 pages of Official Copy).
Extended European Search Report received for European Patent Application No. 16784025.5, mailed on Apr. 16, 2018, 11 pages.
Extended European Search Report received for European Patent Application No. 21202358.4, mailed on Dec. 6, 2021, 8 pages.
Extended European Search Report received for European Patent Application No. 23204776.1, mailed on May 6, 2024, 8 pages.
Final Office Action received for U.S. Appl. No. 16/143,396, mailed on Jun. 20, 2019, 14 pages.
Final Office Action received for U.S. Appl. No. 18/123,878, mailed on Apr. 26, 2024, 23 pages.
Intention to Grant received for European Patent Application No. 16784025.5, mailed on Jul. 15, 2021, 8 pages.
Intention to Grant received for European Patent Application No. 21202358.4, mailed on Apr. 15, 2024, 9 pages.
International Preliminary Report on Patentability and Written Opinion received for PCT Application No. PCT/US2016/029030, mailed on Nov. 2, 2017, 35 pages.
International Search Report & Written Opinion received for PCT Patent Application No. PCT/US2016/029030, mailed on Aug. 5, 2016, 37 pages.
Non-Final Office Action received for U.S. Appl. No. 12/764,360, mailed on May 3, 2012, 19 pages.
Non-Final Office Action received for U.S. Appl. No. 15/136,323, mailed on Apr. 6, 2017, 27 pages.
Non-Final Office Action received for U.S. Appl. No. 15/863,369, mailed on Apr. 4, 2018, 15 pages.
Non-Final Office Action received for U.S. Appl. No. 16/143,396, mailed on Jan. 7, 2019, 13 pages.
Non-Final Office Action received for U.S. Appl. No. 17/940,672, mailed on Mar. 16, 2023, 15 pages.
Non-Final Office Action received for U.S. Appl. No. 18/123,878, mailed on Jan. 31, 2024, 19 pages.
Non-Final Office Action received for U.S. Appl. No. 18/207,293, mailed on Feb. 29, 2024, 11 pages.
Notice of Acceptance received for Australian Patent Application No. 2016252993, mailed on Dec. 19, 2017, 3 pages.
Notice of Acceptance received for Australian Patent Application No. 2023204616, mailed on Oct. 31, 2023, 3 pages.
Notice of Allowance received for Chinese Patent Application No. 201680023520.1, mailed on Jun. 28, 2019, 2 pages (1 page of English Translation and 1 page of Official Copy).
Notice of Allowance received for Chinese Patent Application No. 201910864074.2, mailed on Mar. 10, 2021, 2 pages (1 page of English Translation and 1 page of Official Copy).
Notice of Allowance received for U.S. Appl. No. 12/764,360, mailed on Oct. 1, 2012, 13 pages.
Notice of Allowance received for U.S. Appl. No. 15/136,323, mailed on Feb. 28, 2018, 9 pages.

(56)          References Cited

OTHER PUBLICATIONS

Notice of Allowance received for U.S. Appl. No. 15/136,323, mailed on Oct. 12, 2017, 8 pages.
Notice of Allowance received for U.S. Appl. No. 15/863,369, mailed on Jun. 28, 2018, 8 pages.
Notice of Allowance received for U.S. Appl. No. 16/143,396, mailed on Nov. 27, 2019, 8 pages.
Notice of Allowance received for U.S. Appl. No. 16/840,719, mailed on Apr. 30, 2021, 13 pages.
Notice of Allowance received for U.S. Appl. No. 17/409,598, mailed on Jun. 21, 2022, 12 pages.
Notice of Allowance received for U.S. Appl. No. 17/409,598, mailed on Sep. 14, 2022, 9 pages.
Notice of Allowance received for U.S. Appl. No. 17/940,672, mailed on Apr. 27, 2023, 9 pages.
Office Action received for Chinese Patent Application No. 201680023520.1, mailed on Jan. 3, 2019, 10 pages (5 pages of English translation and 5 pages of Official Copy).
Office Action received for Chinese Patent Application No. 201880036400.4, mailed on Jan. 20, 2024, 14 pages (6 pages of English Translation and 8 pages of Official Copy).
Office Action received for Chinese Patent Application No. 201910864074.2, mailed on Sep. 23, 2020, 11 pages (5 pages of English Translation and 6 pages of Official Copy).
Office Action received for European Patent Application No. 16784025.5, mailed on Jul. 17, 2020, 6 pages.
Office Action received for European Patent Application No. 21202358.4, mailed on Jun. 9, 2023, 7 pages.
Office Action received for Japanese Patent Application No. 2023-041079, mailed on Nov. 21, 2023, 6 pages (3 pages of English Translation and 3 pages of Official Copy).
Office Action received for Korean Patent Application No. 10-2023-7037005, mailed on Nov. 13, 2023, 13 pages (6 pages of English Translation and 7 pages of Official Copy).
Supplemental Notice of Allowance received for U.S. Appl. No. 15/136,323, mailed on Jan. 31, 2018, 6 pages.
Supplemental Notice of Allowance received for U.S. Appl. No. 15/863,369, mailed on Aug. 8, 2018, 4 pages.
NAVJOT81, "My depth control is not showing up on my iphone x", Available online at: https://discussions.apple.com/thread/253719706?sortBy=rank, Mar. 5, 2022, 5 pages.
Non-Final Office Action received for U.S. Appl. No. 18/373,171, mailed on Jul. 24, 2025, 27 pages.
Notice of Allowance received for U.S. Appl. No. 18/370,363, mailed on Jul. 29, 2025, 9 pages.
Wesson, Kate, "How to Edit Photos on iPhone Using the Built-In Photos App", Available online at: https://web.archive.org/web/20181116025151/https://iphonephotographyschool.com/how-to-edit-photos-on-iphone/, Aug. 22, 2018, 21 pages.
Wesson, Kate, "How to Use iPhone Portrait Mode to Shoot Stunning Portrait Photos", Available online at: https://web.archive.org/web/20200920073342/https://iphonephotographyschool.com/portrait-mode/, Oct. 22, 2019, 19 pages.
Applicant-Initiated Interview Summary received for U.S. Appl. No. 15/094,238, mailed on Apr. 24, 2020, 3 pages.
Applicant-Initiated Interview Summary received for U.S. Appl. No. 15/094,238, mailed on Feb. 28, 2019, 3 pages.
Applicant-Initiated Interview Summary received for U.S. Appl. No. 15/094,238, mailed on Jan. 22, 2020, 3 pages.
Applicant-Initiated Interview Summary received for U.S. Appl. No. 15/094,238, mailed on Sep. 3, 2019, 3 pages.
Certificate of Examination received for Australian Patent Application No. 2020104220, mailed on Apr. 1, 2021, 2 pages.
Corrected Notice of Allowance received for U.S. Appl. No. 15/273,453, mailed on Dec. 21, 2017, 3 pages.
Corrected Notice of Allowance received for U.S. Appl. No. 15/273,453, mailed on Feb. 8, 2018, 2 pages.
Corrected Notice of Allowance received for U.S. Appl. No. 15/273,453. mailed on Nov. 27, 2017. 2 pages.

Decision to Grant received for European Patent Application No. 20206197.4, mailed on Oct. 6, 2023, 4 pages.
Decision to Grant received for European Patent Application No. 20210373.5, mailed on May 19, 2023, 4 pages.
Decision to Grant received for Japanese Patent Application No. 2021-051385, mailed on Jul. 8, 2021, 3 pages (1 page of English Translation and 2 pages of Official Copy).
Decision to Grant received for Japanese Patent Application No. 2022-145387, mailed on Mar. 4, 2024, 3 pages (1 page of English Translation and 2 pages of Official Copy).
European Search Report received for European Patent Application No. 20206197.4, mailed on Nov. 30, 2020, 4 pages.
European Search Report received for European Patent Application No. 20210373.5, mailed on Apr. 13, 2021, 4 pages.
European Search Report received for European Patent Application No. 21157252.4, mailed on Apr. 16, 2021, 4 pages.
Final Office Action received for U.S. Appl. No. 15/094,238, mailed on Feb. 6, 2020, 38 pages.
Final Office Action received for U.S. Appl. No. 15/094,238, mailed on Jul. 1, 2019, 29 pages.
Intention to Grant received for European Patent Application No. 20206197.4, mailed on Dec. 15, 2022, 10 pages.
Intention to Grant received for European Patent Application No. 20206197.4, mailed on May 25, 2023, 9 pages.
Intention to Grant received for European Patent Application No. 20210373.5, mailed on Jan. 10, 2023, 12 pages.
Invitation to Pay Search Fees received for European Patent Application No. 20728854.9, mailed on Feb. 23, 2024, 3 pages.
Non-Final Office Action received for U.S. Appl. No. 15/094,238, mailed on Nov. 29, 2018, 24 pages.
Non-Final Office Action received for U.S. Appl. No. 15/094,238, mailed on Oct. 1, 2019, 32 pages.
Notice of Acceptance received for Australian Patent Application No. 2020267151, mailed on Dec. 9, 2020, 3 pages.
Notice of Acceptance received for Australian Patent Application No. 2021201167, mailed on Mar. 15, 2021, 3 pages.
Notice of Acceptance received for Australian Patent Application No. 2021203210, mailed on Jul. 9, 2021, 3 pages.
Notice of Acceptance received for Australian Patent Application No. 2021254567, mailed on Nov. 17, 2021, 3 pages.
Notice of Acceptance received for Australian Patent Application No. 2022200966, mailed on Feb. 25, 2022, 3 pages.
Notice of Acceptance received for Australian Patent Application No. 2022202377, mailed on May 11, 2022, 3 pages.
Notice of Acceptance received for Australian Patent Application No. 2022221466, mailed on Aug. 31, 2023, 3 pages.
Notice of Allowance received for Chinese Patent Application No. 201810566134.8, mailed on Apr. 7, 2020, 3 pages (1 page of English Translation and 2 pages of Official Copy).
Notice of Allowance received for Chinese Patent Application No. 201810664927.3, mailed on Jul. 19, 2019, 2 pages (1 page of English Translation and 1 page of Official Copy).
Notice of Allowance received for Japanese Patent Application No. 2021-565919, mailed on Oct. 3, 2022, 3 pages (1 page of English Translation and 2 pages of Official Copy).
Notice of Allowance received for Korean Patent Application No. 10-2020-0143726, mailed on Nov. 10, 2020, 5 pages (2 pages of English Translation and 3 pages of Official Copy).
Notice of Allowance received for Korean Patent Application No. 10-2020-0155924, mailed on Nov. 23, 2020, 7 pages (2 pages of English Translation and 5 pages of Official Copy).
Notice of Allowance received for Korean Patent Application No. 10-2021-0022053, mailed on Nov. 23, 2021, 5 pages (2 pages of English Translation and 3 pages of Official Copy).
Notice of Allowance received for Korean Patent Application No. 10-2021-7036337, mailed on Apr. 5, 2022, 4 pages (1 page of English Translation and 3 pages of Official Copy).
Notice of Allowance received for Korean Patent Application No. 10-2022-7023077, mailed on Nov. 1, 2022, 8 pages (2 pages of English Translation and 6 pages of Official Copy).
Notice of Allowance received for U.S. Appl. No. 15/094,238, mailed on Jul. 9, 2020, 19 pages.

(56) References Cited

OTHER PUBLICATIONS

Notice of Allowance received for U.S. Appl. No. 15/273,453, mailed on Oct. 12, 2017, 11 pages.

Notice of Hearing received for Indian Patent Application No. 202118028159, mailed on Nov. 22, 2023, 2 pages.

Office Action received for Australian Patent Application No. 2022221466, mailed on Jun. 16, 2023, 2 pages.

Office Action received for Chinese Patent Application No. 201810566134.8, mailed on Aug. 13, 2019, 14 pages (8 pages of English Translation and 6 pages of Official Copy).

Office Action received for Chinese Patent Application No. 201810664927.3, mailed on Mar. 28, 2019, 11 pages (5 pages of English Translation and 6 pages of Official Copy).

Office Action received for European Patent Application No. 20206197.4, mailed on Aug. 27, 2021, 6 pages.

Office Action received for European Patent Application No. 20206197.4, mailed on Jan. 12, 2021, 9 pages.

Office Action received for European Patent Application No. 20206197.4, mailed on Mar. 18, 2022, 7 pages.

Office Action received for European Patent Application No. 20210373.5, mailed on Dec. 9, 2021, 7 pages.

Office Action received for European Patent Application No. 20210373.5, mailed on May 10, 2021, 9 pages.

Office Action received for European Patent Application No. 20210373.5, mailed on May 31, 2022, 5 pages.

Office Action received for European Patent Application No. 20728854.9, mailed on Apr. 8, 2024, 7 pages.

Office Action received for European Patent Application No. 20728854.9, mailed on May 7, 2024, 10 pages.

Office Action received for European Patent Application No. 21157252.4, mailed on Apr. 23, 2021, 8 pages.

Office Action received for European Patent Application No. 21157252.4, mailed on Jul. 24, 2023, 5 pages.

Office Action received for Indian Patent Application No. 202117017871, mailed on Apr. 4, 2024, 8 pages.

Office Action received for Indian Patent Application No. 202118021941, mailed on Mar. 23, 2022, 5 pages.

Office Action received for Indian Patent Application No. 202118028158, mailed on Apr. 22, 2024, 7 pages.

Office Action received for Indian Patent Application No. 202118028159, mailed on Jun. 27, 2022, 6 pages.

Office Action received for Japanese Patent Application No. 2021-565919, mailed on Jun. 13, 2022, 4 pages (2 pages of English Translation and 2 pages of Official Copy).

Office Action received for Japanese Patent Application No. 2022-145387, mailed on Oct. 2, 2023, 7 pages (3 pages of English Translation and 4 pages of Official Copy).

Office Action received for Korean Patent Application No. 10-2021-0022053, mailed on Mar. 1, 2021, 11 pages (5 pages of English Translation and 6 pages of Official Copy).

Office Action received for Korean Patent Application No. 10-2021-7036337, mailed on Dec. 8, 2021, 6 pages (2 pages of English Translation and 4 pages of Official Copy).

Office Action received for Korean Patent Application No. 10-2022-7023077, mailed on Jul. 25, 2022, 6 pages (2 pages of English Translation and 4 pages of Official Copy).

Notice of Allowance received for Korean Patent Application No. 10-2023-7041271, mailed on Nov. 24, 2024, 7 pages (2 pages of English Translation and 5 pages of Official Copy).

Office Action received for Australian Patent Application No. 2023282230, mailed on Dec. 9, 2024, 2 pages.

Office Action received for Japanese Patent Application No. 2023-158354, mailed on Dec. 2, 2024, 6 pages (3 pages of English Translation and 3 pages of Official Copy).

Decision to Grant received for European Patent Application No. 22722604.0, mailed on Jan. 23, 2025, 4 pages.

Intention to Grant received for European Patent Application No. 22184853.4, mailed on Feb. 5, 2025, 9 pages.

Notice of Allowance received for U.S. Appl. No. 17/960,695, mailed on Jan. 29, 2025, 8 pages.

Applicant-Initiated Interview Summary received for U.S. Appl. No. 19/017,062, mailed on Sep. 10, 2025, 2 pages.

Decision to Grant received for Japanese Patent Application No. 2023-158354, mailed on Sep. 8, 2025, 3 pages (1 page of English Translation and 2 pages of Official Copy).

Office Action received for Chinese Patent Application No. 202110766668.7, mailed on Aug. 27, 2025, 17 pages (10 pages of English Translation and 7 pages of Official Copy).

Applicant-Initiated Interview Summary received for U.S. Appl No. 18/373,171, mailed on Sep. 29, 2025, 5 pages.

Applicant-Initiated Interview Summary received for U.S. Appl. No. 18/611,281, mailed on Oct. 9, 2025, 2 pages.

Clarke et al., "Reactive Video: Adaptive Video Playback Based on User Motion for Supporting Physical Activity", Available online at: https://dl.acm.org/doi/pdf/10.1145/3379337.3415591, Oct. 20-23, 2020, pp. 196-208.

Decision to Grant received for European Patent Application No. 20206196.6, mailed on Nov. 6, 2025, 4 pages.

Examiner's Answer to Appeal Brief received for U.S. Appl. No. 17/088,790, mailed on Nov. 7, 2025, 16 pages.

Extended European Search Report received for European Patent Application No. 25190718.4, mailed on Oct. 10, 2025, 8 pages.

Final Office Action received for U.S. Appl. No. 18/611,281, mailed on Nov. 10, 2025, 35 pages.

Final Office Action received for U.S. Appl. No. 19/017,062, mailed on Sep. 26, 2025, 23 pages.

Intention to Grant received for European Patent Application No. 23173036.7, mailed on Nov. 5, 2025, 9 pages.

International Preliminary Report on Patentability received for PCT Patent Application No. PCT/US2024/020880, mailed on Oct. 2, 2025, 15 pages.

International Preliminary Report on Patentability received for PCT Patent Application No. PCT/US2024/024016, mailed on Dec. 11, 2025, 7 pages.

International Preliminary Report on Patentability received for PCT Patent Application No. PCT/US2024/026652, mailed on Nov. 20, 2025, 11 pages.

International Preliminary Report on Patentability received for PCT Patent Application No. PCT/US2024/031468, mailed on Dec. 11, 2025, 11 pages.

Non-Final Office Action received for U.S. Appl. No. 18/615,954, mailed on Nov. 19, 2025, 37 pages.

Notice of Acceptance received for Australian Patent Application No. 2023282230, mailed on Oct. 17, 2025, 3 pages.

Notice of Acceptance received for Australian Patent Application No. 2023285892, mailed on Oct. 27, 2025, 3 pages.

Notice of Allowance received for Chinese Patent Application No. 202010235395.9, mailed on Nov. 10, 2025, 2 pages (1 page of English Translation and 1 page of Official Copy).

Notice of Allowance received for Japanese Patent Application No. 2025-018293, mailed on Dec. 22, 2025, 3 pages (1 page of English Translation and 2 pages of Official Copy).

Notice of Allowance received for U.S. Appl. No. 18/204,881, mailed on Dec. 23, 2025, 9 pages.

Notice of Allowance received for U.S. Appl. No. 18/373,171, mailed on Oct. 24, 2025, 10 pages.

Notice of Hearing received for Indian Patent Application No. 202318031344, mailed on Dec. 12, 2025, 4 pages.

Office Action received for Chinese Patent Application No. 202010235395.9, mailed on Oct. 29, 2025, 2 pages (1 page of English Translation and 1 page of Official Copy).

Office Action received for Indian Patent Application No. 202218054596, mailed on Nov. 14, 2025, 6 pages.

Office Action received for Indian Patent Application No. 202218054599, mailed on Nov. 14, 2025, 8 pages.

Office Action received for Indian Patent Application No. 202318031342, mailed on Nov. 12, 2025, 6 pages.

Office Action received for Japanese Patent Application No. 2024-199034, mailed on Oct. 2, 2025, 7 pages (4 pages of English Translation and 3 pages of Official Copy).

* cited by examiner

Portable Multifunction Device 100

210

212

Speaker 111

Optical Sensor 164

Proximity Sensor 166

208

206

200

210 is SIM card slot
212 is headphone jack

208

202

Touch Screen 112

Contact Intensity Sensor(s) 165

Tactile Output Generator(s) 167

203

Microphone 113

Home 204

Accelerometer(s) 168

External Port 124

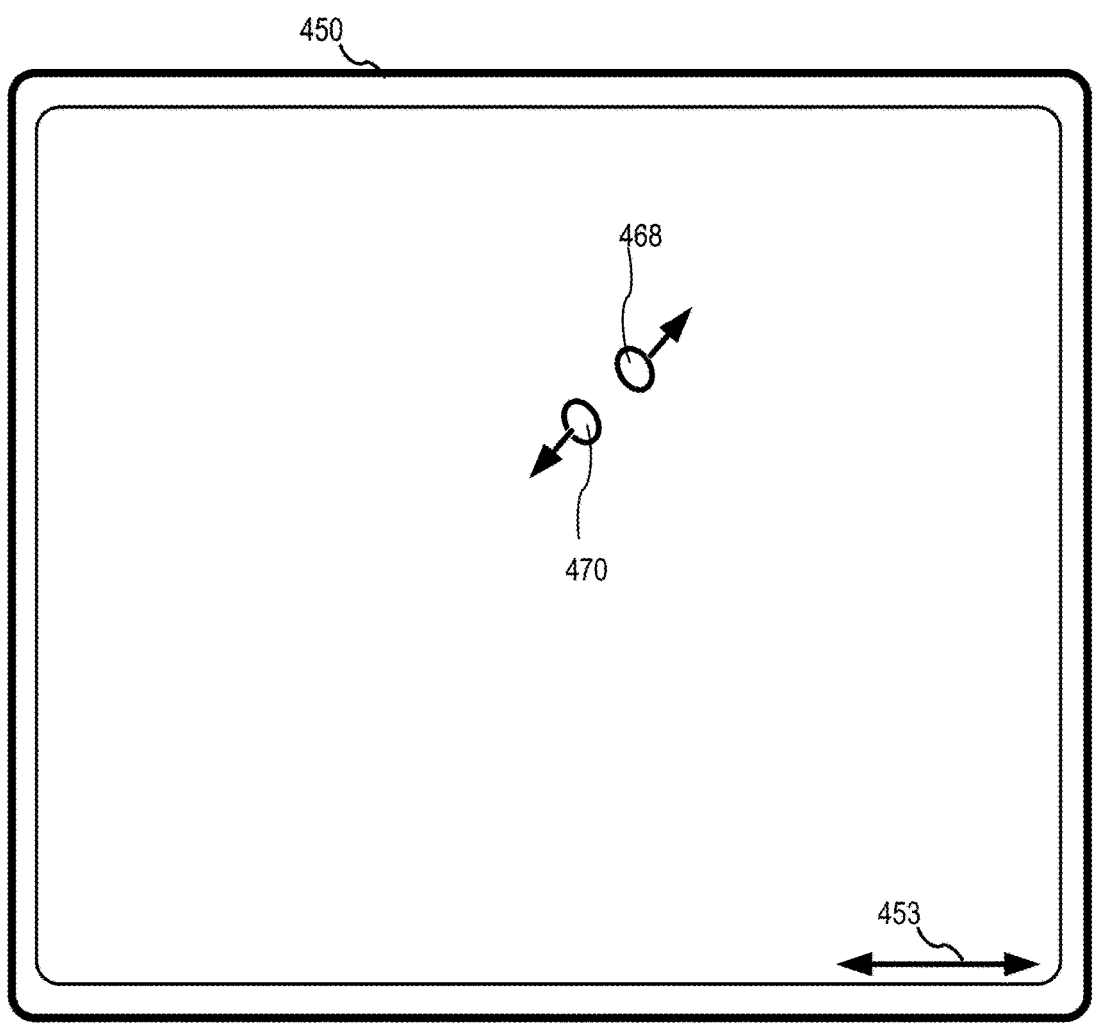
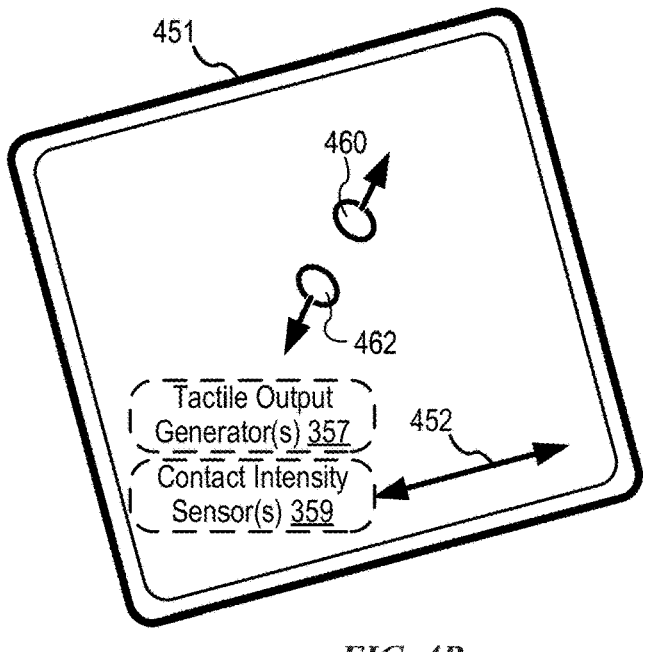
*FIG. 4B*

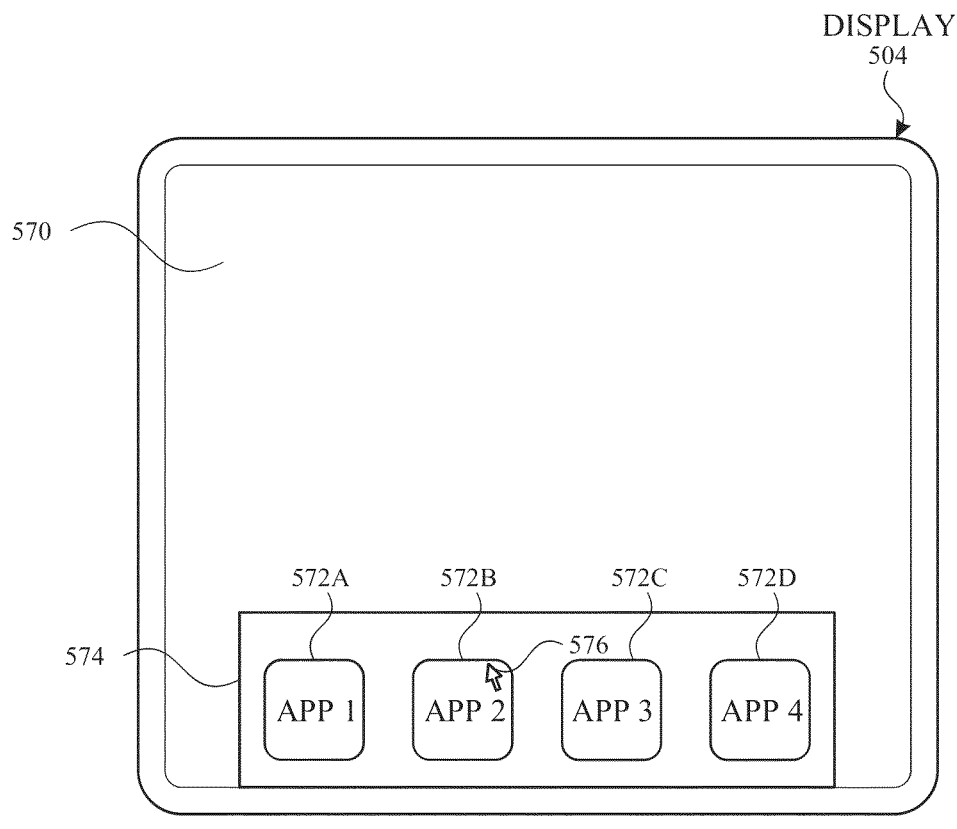
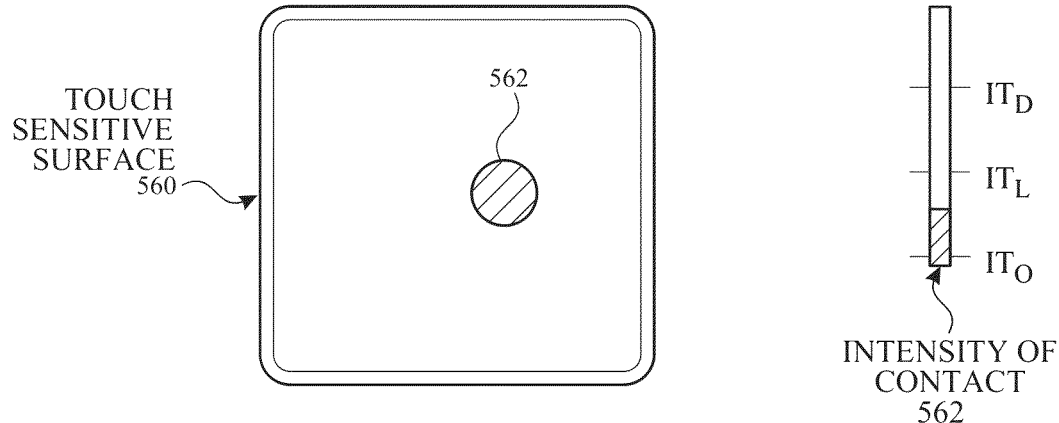
*FIG. 5E*

700

<u>702</u>
While displaying, via a display generation component, a camera preview:

<u>704</u>
Obtain information about a physical environment that corresponds to a field of view of one or more cameras based on information from one or more sensors of the computer system 706
In response to obtaining the information about the physical environment that corresponds to the field of view of the one or more cameras:

<u>708</u>
In accordance with a determination by the computer system, based on the information about the physical environment that corresponds to the field of view of the one or more cameras, that depth capture criteria are met, display, via the display generation component, a first selectable user interface object <u>710</u>
In accordance with a determination by the computer system, based on the information about the physical environment that corresponds to the field of view of the one or more cameras, that depth capture criteria are not met, forego displaying the first selectable user interface object

902
Display, via a display generation component, a camera user interface, wherein the camera user interface includes a selectable user interface object that corresponds to a current state of a first media capture setting, wherein the current state of the first media capture setting is a first state, and wherein a plurality of states including the first state are available for the first media capture setting

904
Detect a first user input corresponding to the selectable user interface object

906
In response to detecting the first user input:

908
In accordance with a determination that the first user input is an input of a first type, switch the first media capture setting to a second state of the plurality of states that is different from the first state

910
In accordance with a determination that the first user input is an input of a second type, display a selectable user interface object that corresponds to a third state of the plurality of states of the first media capture setting, wherein the selectable user interface object that corresponds to the third state, when selected, causes the first media capture setting to switch to the third state

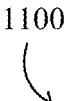

1102
While displaying, via a display generation component, a camera preview at a first zoom level that includes a first representation of a field-of-view of the one or more cameras that includes a first portion of an environment:

1104
Detect a first input that corresponds to a request to zoom the camera preview

1106
In response to detecting the first input:

1108
In accordance with a determination that the first input corresponds to a request to zoom to a second zoom level that is higher than a respective zoom threshold, display the camera preview at the second zoom level and a secondary representation of the field-of-view of the one or more cameras that is smaller than the camera preview and includes a representation of a larger portion of the environment than is included in the camera preview at the second zoom level

1110
In accordance with a determination that the first input corresponds to a request to zoom to a third zoom level that is lower than the respective zoom threshold, display the camera preview at the third zoom level, wherein the camera preview at the third level includes a second representation of a field-of-view of the one or more cameras that includes a second portion of the environment without displaying the secondary representation of the field-of-view of the one or more cameras

*FIG. 11*

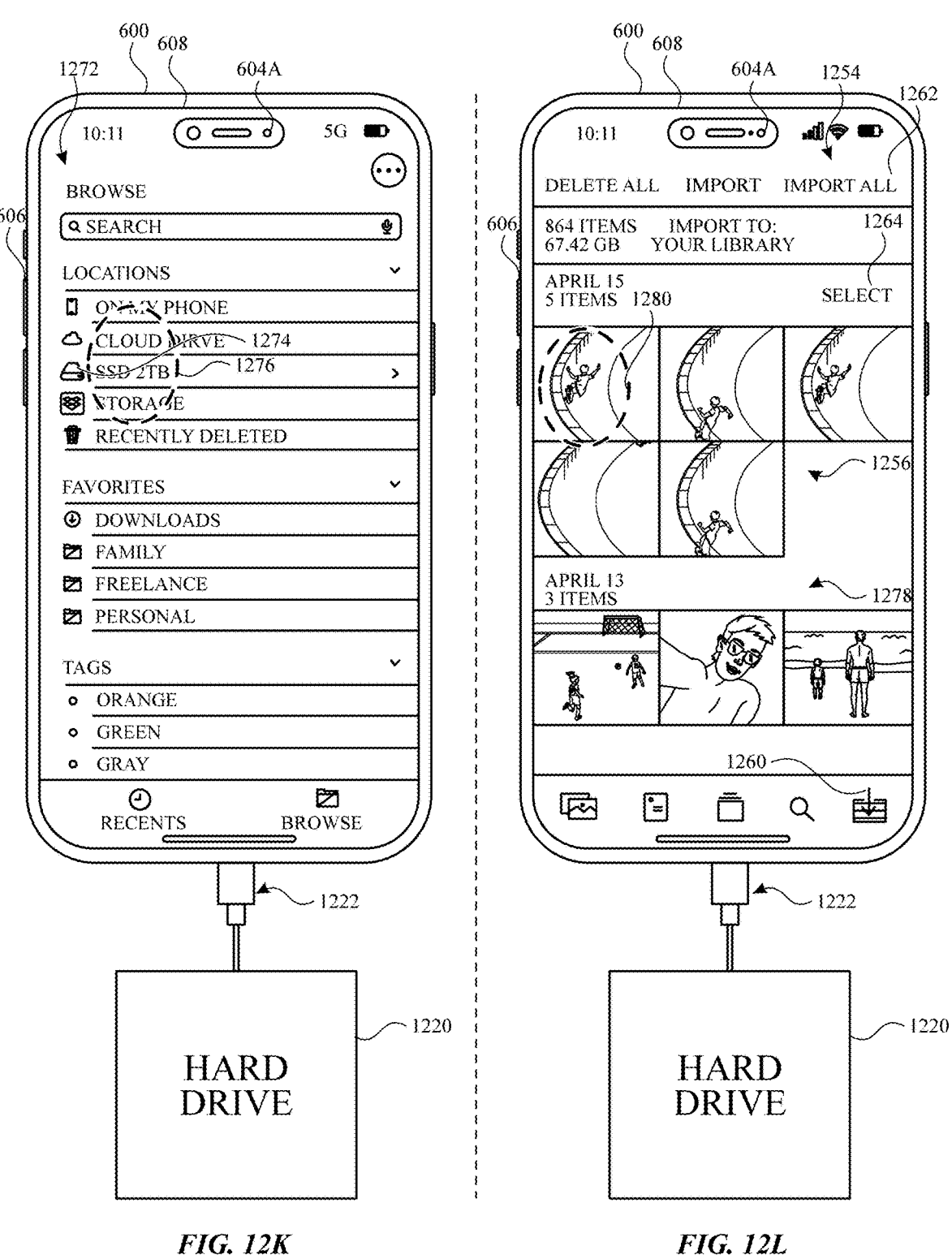
*FIG. 12K*                 *FIG. 12L*

1300

---

1302
While displaying, via a display generation component, a camera user interface, detect a request to view recently-captured media

---

1304
In response to detecting the request to view the recently-captured media:

---

1306
In accordance with a determination that a set of one or more external storage criteria are met, display a representation of a first set of one or more captured media wherein the first set of one or more captured media items are stored on an external storage device in communication with a computer system and have not been added to a media library associated with the computer system

---

1308
In accordance with a determination that the set of one or more external storage criteria are not met, display a representation of a second set of one or more captured media items that is different from the first set of one or more captured media items, wherein the second set of one or more captured media items are included in the media library associated with the computer system

1502
While displaying a camera user interface including a representation of a portion of a field-of-view of one or more cameras 1504
In accordance with a determination that the portion of the field-of-view of the one or more cameras satisfies a set of content criteria 1506
Display the representation of the portion of the field-of-view of the one or more cameras concurrently with a level indicator indicating an orientation of the field-of-view of the one or more cameras with respect to a respective orientation 1508
In accordance with a determination that the portion of the field-of-view of the one or more cameras does not satisfy the set of content criteria 1510
Display the representation of the portion of the field-of-view of the one or more cameras without displaying the level indicator

Figure 17:
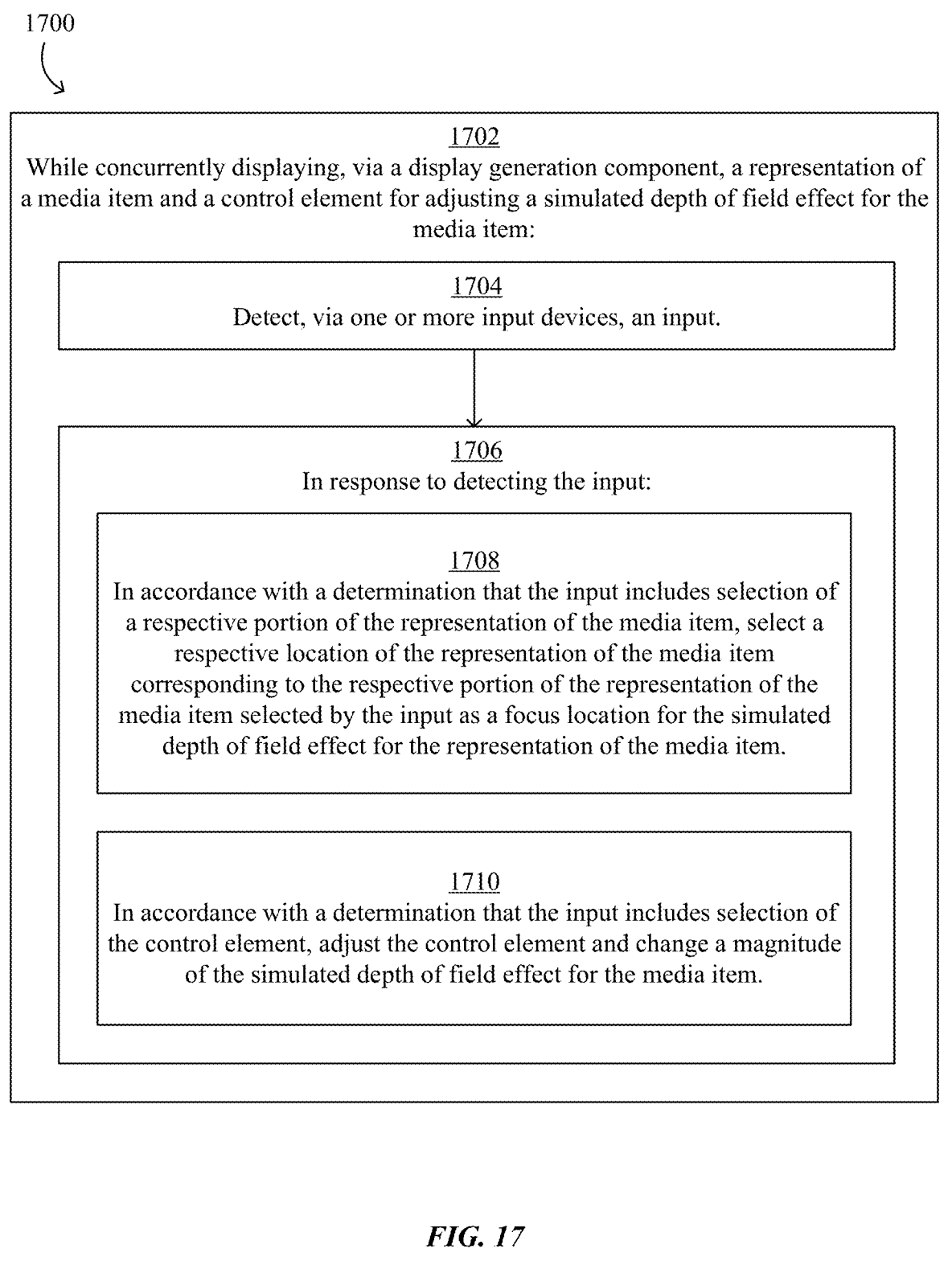

<u>1702</u>
While concurrently displaying, via a display generation component, a representation of a media item and a control element for adjusting a simulated depth of field effect for the media item:

<u>1704</u>
Detect, via one or more input devices, an input.

<u>1706</u>
In response to detecting the input:

<u>1708</u>
In accordance with a determination that the input includes selection of a respective portion of the representation of the media item, select a respective location of the representation of the media item corresponding to the respective portion of the representation of the media item selected by the input as a focus location for the simulated depth of field effect for the representation of the media item.

<u>1710</u>
In accordance with a determination that the input includes selection of the control element, adjust the control element and change a magnitude of the simulated depth of field effect for the media item.

<div style="border:1px solid">

1902
Detect, via one or more input devices, a request to display controls for editing a representation of a media item.

</div>

<div style="border:1px solid">

1904
In response to detecting the request to display controls for editing the representation of the media item, concurrently display, via a display generation component:

<div style="border:1px solid">

1906
A first control element for editing a feature of a set of one or more images that are available to be displayed in a sequence of images when the representation of the media item is displayed via the display generation component.

</div>

<div style="border:1px solid">

1908
A second control element for editing a simulated depth of field effect for the representation of the media item.

</div>

</div>

<u>2102</u>
While displaying, via a display generation component, a representation of a
media item that includes a simulated depth of field effect:

<u>2104</u>
Detect, via one or more input devices, an input directed toward the
representation of the media item that includes the simulated depth of
field effect.

<u>2106</u>
In response to detecting the input directed toward the representation of
the media item, display, via the display generation component, a
plurality of images corresponding to the media item, including
displaying the plurality of images in a sequence over time.

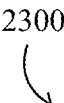

<u>2302</u>
Display, via a display generation component, a camera user interface that includes one or more selectable controls for managing zoom levels to capture media.

↓

<u>2304</u>
Detect, via one or more input devices, a first input directed to a respective selectable control that includes movement.

↓

<u>2306</u>
In response to detecting the first input directed to the respective selectable control, navigate through a plurality of candidate zoom levels from a first zoom level to a second zoom level in accordance with the movement, including snapping to one or more zoom levels while navigating through the plurality of candidate zoom levels and:

<u>2308</u>
In accordance with a determination that a third zoom level between the first zoom level and the second zoom level has been selected as a snapping zoom level, snapping to the third zoom level while navigating through the plurality of candidate zoom levels.

<u>2310</u>
In accordance with a determination that the third zoom level between the first zoom level and the second zoom level has not been selected as a snapping zoom level, forgoing snapping to the third zoom level while navigating through the plurality of candidate zoom levels.

*FIG. 23*

USER INTERFACES FOR CONTROLLING MEDIA CAPTURE SETTINGS

CROSS-REFERENCE TO RELATED APPLICATIONS

This application claims priority to U.S. Provisional Patent Application Ser. No. 63/464,528, entitled "USER INTERFACES FOR CONTROLLING MEDIA CAPTURE SETTINGS," filed on May 5, 2023, and U.S. Provisional Patent Application Ser. No. 63/470,539, entitled "USER INTERFACES FOR CONTROLLING MEDIA CAPTURE SETTINGS," filed on Jun. 2, 2023, and U.S. Provisional Patent Application Ser. No. 63/537,800, entitled "USER INTERFACES FOR CONTROLLING MEDIA CAPTURE SETTINGS," filed on Sep. 11, 2023. The contents of each of these applications are hereby incorporated by reference in their entirety.

FIELD

The present disclosure relates generally to computer user interfaces, and more specifically to techniques for controlling media capture settings.

BACKGROUND

Since the advent of virtual cameras, such as camera applications of smartphones and other personal electronic devices, the breadth of functionality available to a user to capture, store, and edit photo and video media has expanded significantly. For example, a virtual camera may provide numerous options for focus settings, zoom settings, lens settings, lighting settings, color settings, media size, media format, visual effects, and other aspects of media capture and management.

BRIEF SUMMARY

Some techniques for controlling media capture settings using electronic devices, however, are generally cumbersome and inefficient. For example, some existing techniques for controlling media capture settings use a complex and time-consuming user interface, which may include numerous inputs to access and use. Existing techniques require more time and effort to find, control, and manage media capture settings than necessary, wasting user time and device energy. This latter consideration is particularly important in battery-operated devices.

Accordingly, the present technique provides electronic devices with faster, more efficient methods and interfaces for controlling media capture settings. Such methods and interfaces optionally complement or replace other methods for controlling media capture settings. Such methods and interfaces reduce the cognitive burden on a user and produce a more efficient human-machine interface. Such methods and interfaces reduce the processing power used by a device to display user interfaces, receive inputs through the user interfaces, and respond to the user inputs. For battery-operated computing devices, such methods and interfaces conserve power and increase the time between battery charges.

In accordance with some embodiments, a method is described. The method is performed at a computer system that is in communication with a display generation component, one or more cameras, and one or more sensors, and comprises: while displaying, via the display generation component, a camera preview, obtaining information about a physical environment that corresponds to a field of view of the one or more cameras based on information from one or more sensors of the computer system; and in response to obtaining the information about the physical environment that corresponds to the field of view of the one or more cameras: in accordance with a determination by the computer system, based on the information about the physical environment that corresponds to the field of view of the one or more cameras, that depth capture criteria are met, displaying, via the display generation component, a first selectable user interface object, that, when selected, initiates a process for performing a first depth-based media capture function; and in accordance with a that the depth capture criteria are not met, forgoing displaying the first selectable user interface object.

In accordance with some embodiments, a non-transitory computer-readable storage medium is described. The non-transitory computer-readable storage medium stores one or more programs configured to be executed by one or more processors of a computer system that is in communication with a display generation component, one or more cameras, and one or more sensors, the one or more programs including instructions for: while displaying, via the display generation component, a camera preview, obtaining information about a physical environment that corresponds to a field of view of the one or more cameras based on information from one or more sensors of the computer system; and in response to obtaining the information about the physical environment that corresponds to the field of view of the one or more cameras: in accordance with a determination by the computer system, based on the information about the physical environment that corresponds to the field of view of the one or more cameras, that depth capture criteria are met, displaying, via the display generation component, a first selectable user interface object, that, when selected, initiates a process for performing a first depth-based media capture function; and in accordance with a that the depth capture criteria are not met, forgoing displaying the first selectable user interface object.

In accordance with some embodiments, a transitory computer-readable storage medium is described. The transitory computer-readable storage medium stores one or more programs configured to be executed by one or more processors of a computer system that is in communication with a display generation component, one or more cameras, and one or more sensors, the one or more programs including instructions for: while displaying, via the display generation component, a camera preview, obtaining information about a physical environment that corresponds to a field of view of the one or more cameras based on information from one or more sensors of the computer system; and in response to obtaining the information about the physical environment that corresponds to the field of view of the one or more cameras: in accordance with a determination by the computer system, based on the information about the physical environment that corresponds to the field of view of the one or more cameras, that depth capture criteria are met, displaying, via the display generation component, a first selectable user interface object, that, when selected, initiates a process for performing a first depth-based media capture function; and in accordance with a that the depth capture criteria are not met, forgoing displaying the first selectable user interface object.

In accordance with some embodiments, a computer system is described. The computer system is configured to communicate with a display generation component, one or more cameras, and one or more sensors, the computer system comprising one or more processors and memory storing one or more programs configured to be executed by the one or more processors, the one or more programs including instructions for: while displaying, via the display generation component, a camera preview, obtaining information about a physical environment that corresponds to a field of view of the one or more cameras based on information from one or more sensors of the computer system; and in response to obtaining the information about the physical environment that corresponds to the field of view of the one or more cameras: in accordance with a determination by the computer system, based on the information about the physical environment that corresponds to the field of view of the one or more cameras, that depth capture criteria are met, displaying, via the display generation component, a first selectable user interface object, that, when selected, initiates a process for performing a first depth-based media capture function; and in accordance with a that the depth capture criteria are not met, forgoing displaying the first selectable user interface object.

In accordance with some embodiments, a computer system is described. The computer system is configured to communicate with a display generation component, one or more cameras, and one or more sensors, the computer system comprising: means for, while displaying, via the display generation component, a camera preview, obtaining information about a physical environment that corresponds to a field of view of the one or more cameras based on information from one or more sensors of the computer system; and in response to obtaining the information about the physical environment that corresponds to the field of view of the one or more cameras: means for, in accordance with a determination by the computer system, based on the information about the physical environment that corresponds to the field of view of the one or more cameras, that depth capture criteria are met, displaying, via the display generation component, a first selectable user interface object, that, when selected, initiates a process for performing a first depth-based media capture function; and means for, in accordance with a that the depth capture criteria are not met, forgoing displaying the first selectable user interface object.

In accordance with some embodiments, a computer program product is described. The computer program product comprises one or more programs configured to be executed by one or more processors of a computer system that is in communication with a display generation component, one or more cameras, and one or more sensors, the one or more programs including instructions for: while displaying, via the display generation component, a camera preview, obtaining information about a physical environment that corresponds to a field of view of the one or more cameras based on information from one or more sensors of the computer system; and in response to obtaining the information about the physical environment that corresponds to the field of view of the one or more cameras: in accordance with a determination by the computer system, based on the information about the physical environment that corresponds to the field of view of the one or more cameras, that depth capture criteria are met, displaying, via the display generation component, a first selectable user interface object, that, when selected, initiates a process for performing a first depth-based media capture function; and in accordance with a that the depth capture criteria are not met, forgoing displaying the first selectable user interface object.

In accordance with some embodiments, a method is described. The method is performed at a computer system that is in communication with a display generation component and a camera, and comprises: displaying, via the display generation component, a camera user interface, wherein the camera user interface includes a selectable user interface object that corresponds to a current state of a first media capture setting, wherein the current state of the first media capture setting is a first state, and wherein a plurality of states including the first state are available for the first media capture setting; detecting a first user input corresponding to the selectable user interface object; in response to detecting the first user input: in accordance with a determination that the first user input is an input of a first type, switching the first media capture setting to a second state of the plurality of states that is different from the first state; and in accordance with a determination that the first user input is an input of a second type, displaying a selectable user interface object that corresponds to a third state of the plurality of states of the first media capture setting, wherein the selectable user interface object that corresponds to the third state, when selected, causes the first media capture setting to switch to the third state, wherein the third state is different from the first state and is different from the second state.

In accordance with some embodiments, a non-transitory computer-readable storage medium is described. The non-transitory computer-readable storage medium stores one or more programs configured to be executed by one or more processors of a computer system that is in communication with a display generation component and a camera, the one or more programs including instructions for: displaying, via the display generation component, a camera user interface, wherein the camera user interface includes a selectable user interface object that corresponds to a current state of a first media capture setting, wherein the current state of the first media capture setting is a first state, and wherein a plurality of states including the first state are available for the first media capture setting; detecting a first user input corresponding to the selectable user interface object; in response to detecting the first user input: in accordance with a determination that the first user input is an input of a first type, switching the first media capture setting to a second state of the plurality of states that is different from the first state; and in accordance with a determination that the first user input is an input of a second type, displaying a selectable user interface object that corresponds to a third state of the plurality of states of the first media capture setting, wherein the selectable user interface object that corresponds to the third state, when selected, causes the first media capture setting to switch to the third state, wherein the third state is different from the first state and is different from the second state.

In accordance with some embodiments, a transitory computer-readable storage medium is described. The transitory computer-readable storage medium stores one or more programs configured to be executed by one or more processors of a computer system that is in communication with a display generation component and a camera, the one or more programs including instructions for: displaying, via the display generation component, a camera user interface, wherein the camera user interface includes a selectable user interface object that corresponds to a current state of a first media capture setting, wherein the current state of the first media capture setting is a first state, and wherein a plurality of states including the first state are available for the first media capture setting; detecting a first user input corresponding to the selectable user interface object; in response to detecting the first user input: in accordance with a determination that the first user input is an input of a first type, switching the first media capture setting to a second state of the plurality of states that is different from the first state; and in accordance with a determination that the first user input is an input of a second type, displaying a selectable user interface object that corresponds to a third state of the plurality of states of the first media capture setting, wherein the selectable user interface object that corresponds to the third state, when selected, causes the first media capture setting to switch to the third state, wherein the third state is different from the first state and is different from the second state.

In accordance with some embodiments, a computer system is described. The computer system is configured to communicate with a display generation component and a camera, the computer system comprising one or more processors and memory storing one or more programs configured to be executed by the one or more processors, the one or more programs including instructions for: displaying, via the display generation component, a camera user interface, wherein the camera user interface includes a selectable user interface object that corresponds to a current state of a first media capture setting, wherein the current state of the first media capture setting is a first state, and wherein a plurality of states including the first state are available for the first media capture setting; detecting a first user input corresponding to the selectable user interface object; in response to detecting the first user input: in accordance with a determination that the first user input is an input of a first type, switching the first media capture setting to a second state of the plurality of states that is different from the first state; and in accordance with a determination that the first user input is an input of a second type, displaying a selectable user interface object that corresponds to a third state of the plurality of states of the first media capture setting, wherein the selectable user interface object that corresponds to the third state, when selected, causes the first media capture setting to switch to the third state, wherein the third state is different from the first state and is different from the second state.

In accordance with some embodiments, a computer system is described. The computer system is configured to communicate with a display generation component and a camera, the computer system comprising: means for displaying, via the display generation component, a camera user interface, wherein the camera user interface includes a selectable user interface object that corresponds to a current state of a first media capture setting, wherein the current state of the first media capture setting is a first state, and wherein a plurality of states including the first state are available for the first media capture setting; means for detecting a first user input corresponding to the selectable user interface object; in response to detecting the first user input: means for, in accordance with a determination that the first user input is an input of a first type, switching the first media capture setting to a second state of the plurality of states that is different from the first state; and means for, in accordance with a determination that the first user input is an input of a second type, displaying a selectable user interface object that corresponds to a third state of the plurality of states of the first media capture setting, wherein the selectable user interface object that corresponds to the third state, when selected, causes the first media capture setting to switch to the third state, wherein the third state is different from the first state and is different from the second state.

In accordance with some embodiments, a computer program product is described. The computer program product comprises one or more programs configured to be executed by one or more processors of a computer system that is in communication with a display generation component and a camera, the one or more programs including instructions for: displaying, via the display generation component, a camera user interface, wherein the camera user interface includes a selectable user interface object that corresponds to a current state of a first media capture setting, wherein the current state of the first media capture setting is a first state, and wherein a plurality of states including the first state are available for the first media capture setting; detecting a first user input corresponding to the selectable user interface object; in response to detecting the first user input: in accordance with a determination that the first user input is an input of a first type, switching the first media capture setting to a second state of the plurality of states that is different from the first state; and in accordance with a determination that the first user input is an input of a second type, displaying a selectable user interface object that corresponds to a third state of the plurality of states of the first media capture setting, wherein the selectable user interface object that corresponds to the third state, when selected, causes the first media capture setting to switch to the third state, wherein the third state is different from the first state and is different from the second state.

In accordance with some embodiments, a method is described. The method is performed at a computer system that is in communication with a display generation component and one or more cameras, and comprises: while displaying, via the display generation component, a camera preview at a first zoom level that includes a first representation of a field-of-view of the one or more cameras that includes a first portion of an environment, detecting a first input that corresponds to a request to zoom the camera preview; in response to detecting the first input: in accordance with a determination that the first input corresponds to a request to zoom to a second zoom level that is higher than a respective zoom threshold, displaying: the camera preview at the second zoom level; and a secondary representation of the field-of-view of the one or more cameras that is smaller than the camera preview and includes a representation of a larger portion of the environment than is included in the camera preview at the second zoom level; and in accordance with a determination that the first input corresponds to a request to zoom to a third zoom level that is lower than the respective zoom threshold, displaying the camera preview at the third zoom level, wherein the camera preview at the third zoom level includes a second representation of a field-of-view of the one or more cameras that includes a second portion of the environment without displaying the secondary representation of the field-of-view of the one or more cameras.

In accordance with some embodiments, a non-transitory computer-readable storage medium is described. The non-transitory computer-readable storage medium stores one or more programs configured to be executed by one or more processors of a computer system that is in communication with a display generation component and one or more cameras, the one or more programs including instructions for: while displaying, via the display generation component, a camera preview at a first zoom level that includes a first representation of a field-of-view of the one or more cameras that includes a first portion of an environment, detecting a first input that corresponds to a request to zoom the camera preview; in response to detecting the first input: in accordance with a determination that the first input corresponds to a request to zoom to a second zoom level that is higher than a respective zoom threshold, displaying: the camera preview at the second zoom level; and a secondary representation of the field-of-view of the one or more cameras that is smaller than the camera preview and includes a representation of a larger portion of the environment than is included in the camera preview at the second zoom level; and in accordance with a determination that the first input corresponds to a request to zoom to a third zoom level that is lower than the respective zoom threshold, displaying the camera preview at the third zoom level, wherein the camera preview at the third zoom level includes a second representation of a field-of-view of the one or more cameras that includes a second portion of the environment without displaying the secondary representation of the field-of-view of the one or more cameras.

In accordance with some embodiments, a transitory computer-readable storage medium is described. The transitory computer-readable storage medium stores one or more programs configured to be executed by one or more processors of a computer system that is in communication with a display generation component and one or more cameras, the one or more programs including instructions for: while displaying, via the display generation component, a camera preview at a first zoom level that includes a first representation of a field-of-view of the one or more cameras that includes a first portion of an environment, detecting a first input that corresponds to a request to zoom the camera preview; in response to detecting the first input: in accordance with a determination that the first input corresponds to a request to zoom to a second zoom level that is higher than a respective zoom threshold, displaying: the camera preview at the second zoom level; and a secondary representation of the field-of-view of the one or more cameras that is smaller than the camera preview and includes a representation of a larger portion of the environment than is included in the camera preview at the second zoom level; and in accordance with a determination that the first input corresponds to a request to zoom to a third zoom level that is lower than the respective zoom threshold, displaying the camera preview at the third zoom level, wherein the camera preview at the third zoom level includes a second representation of a field-of-view of the one or more cameras that includes a second portion of the environment without displaying the secondary representation of the field-of-view of the one or more cameras.

In accordance with some embodiments, a computer system is described. The computer system is configured to communicate with a display generation component and one or more cameras, the computer system comprising one or more processors and memory storing one or more programs configured to be executed by the one or more processors, the one or more programs including instructions for: while displaying, via the display generation component, a camera preview at a first zoom level that includes a first representation of a field-of-view of the one or more cameras that includes a first portion of an environment, detecting a first input that corresponds to a request to zoom the camera preview; in response to detecting the first input: in accordance with a determination that the first input corresponds to a request to zoom to a second zoom level that is higher than a respective zoom threshold, displaying: the camera preview at the second zoom level; and a secondary representation of the field-of-view of the one or more cameras that is smaller than the camera preview and includes a representation of a larger portion of the environment than is included in the camera preview at the second zoom level; and in accordance with a determination that the first input corresponds to a request to zoom to a third zoom level that is lower than the respective zoom threshold, displaying the camera preview at the third zoom level, wherein the camera preview at the third zoom level includes a second representation of a field-of-view of the one or more cameras that includes a second portion of the environment without displaying the secondary representation of the field-of-view of the one or more cameras.

In accordance with some embodiments, a computer system is described. The computer system is configured to communicate with a display generation component and one or more cameras, the computer system comprising: means for, while displaying, via the display generation component, a camera preview at a first zoom level that includes a first representation of a field-of-view of the one or more cameras that includes a first portion of an environment, detecting a first input that corresponds to a request to zoom the camera preview; in response to detecting the first input: means for, in accordance with a determination that the first input corresponds to a request to zoom to a second zoom level that is higher than a respective zoom threshold, displaying: the camera preview at the second zoom level; and a secondary representation of the field-of-view of the one or more cameras that is smaller than the camera preview and includes a representation of a larger portion of the environment than is included in the camera preview at the second zoom level; and means for, in accordance with a determination that the first input corresponds to a request to zoom to a third zoom level that is lower than the respective zoom threshold, displaying the camera preview at the third zoom level, wherein the camera preview at the third zoom level includes a second representation of a field-of-view of the one or more cameras that includes a second portion of the environment without displaying the secondary representation of the field-of-view of the one or more cameras.

In accordance with some embodiments, a computer program product is described. The computer program product comprises one or more programs configured to be executed by one or more processors of a computer system that is in communication with a display generation component and one or more cameras, the one or more programs including instructions for: while displaying, via the display generation component, a camera preview at a first zoom level that includes a first representation of a field-of-view of the one or more cameras that includes a first portion of an environment, detecting a first input that corresponds to a request to zoom the camera preview; in response to detecting the first input: in accordance with a determination that the first input corresponds to a request to zoom to a second zoom level that is higher than a respective zoom threshold, displaying: the camera preview at the second zoom level; and a secondary representation of the field-of-view of the one or more cameras that is smaller than the camera preview and includes a representation of a larger portion of the environment than is included in the camera preview at the second zoom level; and in accordance with a determination that the first input corresponds to a request to zoom to a third zoom level that is lower than the respective zoom threshold, displaying the camera preview at the third zoom level, wherein the camera preview at the third zoom level includes a second representation of a field-of-view of the one or more cameras that includes a second portion of the environment without displaying the secondary representation of the field-of-view of the one or more cameras.

In accordance with some embodiments, a method is described. The method is performed at a computer system that is in communication with a display generation component and a camera, and comprises: while displaying, via the display generation component, a camera user interface, detecting a request to view recently-captured media; and: in response to detecting the request to view the recently-captured media: in accordance with a determination that a set of one or more external storage criteria are met, displaying a representation of a first set of one or more captured media items, wherein the first set of one or more captured media items are stored on an external storage device in communication with the computer system and have not been added to a media library associated with the computer system; and in accordance with a determination that the set of one or more external storage criteria are not met, displaying a representation of a second set of one or more captured media items that is different from the first set of one or more captured media items, wherein the second set of one or more captured media items are included in the media library associated with the computer system.

In accordance with some embodiments, a non-transitory computer-readable storage medium is described. The non-transitory computer-readable storage medium stores one or more programs configured to be executed by one or more processors of a computer system that is in communication with a display generation component and a camera, the one or more programs including instructions for: while displaying, via the display generation component, a camera user interface, detecting a request to view recently-captured media; and: in response to detecting the request to view the recently-captured media: in accordance with a determination that a set of one or more external storage criteria are met, displaying a representation of a first set of one or more captured media items, wherein the first set of one or more captured media items are stored on an external storage device in communication with the computer system and have not been added to a media library associated with the computer system; and in accordance with a determination that the set of one or more external storage criteria are not met, displaying a representation of a second set of one or more captured media items that is different from the first set of one or more captured media items, wherein the second set of one or more captured media items are included in the media library associated with the computer system.

In accordance with some embodiments, a transitory computer-readable storage medium is described. The transitory computer-readable storage medium stores one or more programs configured to be executed by one or more processors of a computer system that is in communication with a display generation component and a camera, the one or more programs including instructions for: while displaying, via the display generation component, a camera user interface, detecting a request to view recently-captured media; and: in response to detecting the request to view the recently-captured media: in accordance with a determination that a set of one or more external storage criteria are met, displaying a representation of a first set of one or more captured media items, wherein the first set of one or more captured media items are stored on an external storage device in communication with the computer system and have not been added to a media library associated with the computer system; and in accordance with a determination that the set of one or more external storage criteria are not met, displaying a representation of a second set of one or more captured media items that is different from the first set of one or more captured media items, wherein the second set of one or more captured media items are included in the media library associated with the computer system.

In accordance with some embodiments, a computer system is described. The computer system is configured to communicate with a display generation component and a camera, the computer system comprising one or more processors and memory storing one or more programs configured to be executed by the one or more processors, the one or more programs including instructions for: while displaying, via the display generation component, a camera user interface, detecting a request to view recently-captured media; and: in response to detecting the request to view the recently-captured media: in accordance with a determination that a set of one or more external storage criteria are met, displaying a representation of a first set of one or more captured media items, wherein the first set of one or more captured media items are stored on an external storage device in communication with the computer system and have not been added to a media library associated with the computer system; and in accordance with a determination that the set of one or more external storage criteria are not met, displaying a representation of a second set of one or more captured media items that is different from the first set of one or more captured media items, wherein the second set of one or more captured media items are included in the media library associated with the computer system.

In accordance with some embodiments, a computer system is described. The computer system is configured to communicate with a display generation component and a camera, the computer system comprising: means for, while displaying, via the display generation component, a camera user interface, detecting a request to view recently-captured media; and: in response to detecting the request to view the recently-captured media: in accordance with a determination that a set of one or more external storage criteria are met, displaying a representation of a first set of one or more captured media items, wherein the first set of one or more captured media items are stored on an external storage device in communication with the computer system and have not been added to a media library associated with the computer system; and in accordance with a determination that the set of one or more external storage criteria are not met, displaying a representation of a second set of one or more captured media items that is different from the first set of one or more captured media items, wherein the second set of one or more captured media items are included in the media library associated with the computer system.

In accordance with some embodiments, a computer program product is described. The computer program product comprises one or more programs configured to be executed by one or more processors of a computer system that is in communication with a display generation component and a camera, the one or more programs including instructions for: while displaying, via the display generation component, a camera user interface, detecting a request to view recently-captured media; and: in response to detecting the request to view the recently-captured media: in accordance with a determination that a set of one or more external storage criteria are met, displaying a representation of a first set of one or more captured media items, wherein the first set of one or more captured media items are stored on an external storage device in communication with the computer system and have not been added to a media library associated with the computer system; and in accordance with a determination that the set of one or more external storage criteria are not met, displaying a representation of a second set of one or more captured media items that is different from the first set of one or more captured media items, wherein the second set of one or more captured media items are included in the media library associated with the computer system.

In accordance with some embodiments, a method is described. The method is performed at a computer system that is in communication with a display generation component and one or more cameras, and comprises: while displaying, via the display generation component, a camera user interface including a representation of a portion of a field-of-view of the one or more cameras: in accordance with a determination that the portion of the field-of-view of the one or more cameras satisfies a set of content criteria, displaying, via the display generation component, the representation of the portion of the field-of-view of the one or more cameras concurrently with a level indicator indicating an orientation of the field-of-view of the one or more cameras with respect to a respective orientation, wherein the set of content criteria includes a first criterion that is based on whether content of a first type is detected in the portion of the field-of-view of the one or more cameras; and in accordance with a determination that the portion of the field-of-view of the one or more cameras does not satisfy the set of content criteria, displaying the representation of the portion of the field-of-view of the one or more cameras without displaying the level indicator.

In accordance with some embodiments, a non-transitory computer-readable storage medium is described. The non-transitory computer-readable storage medium stores one or more programs configured to be executed by one or more processors of a computer system that is in communication with a display generation component and one or more cameras, the one or more programs including instructions for: while displaying, via the display generation component, a camera user interface including a representation of a portion of a field-of-view of the one or more cameras: in accordance with a determination that the portion of the field-of-view of the one or more cameras satisfies a set of content criteria, displaying, via the display generation component, the representation of the portion of the field-of-view of the one or more cameras concurrently with a level indicator indicating an orientation of the field-of-view of the one or more cameras with respect to a respective orientation, wherein the set of content criteria includes a first criterion that is based on whether content of a first type is detected in the portion of the field-of-view of the one or more cameras; and in accordance with a determination that the portion of the field-of-view of the one or more cameras does not satisfy the set of content criteria, displaying the representation of the portion of the field-of-view of the one or more cameras without displaying the level indicator.

In accordance with some embodiments, a transitory computer-readable storage medium is described. The transitory computer-readable storage medium stores one or more programs configured to be executed by one or more processors of a computer system that is in communication with a display generation component and one or more cameras, the one or more programs including instructions for: while displaying, via the display generation component, a camera user interface including a representation of a portion of a field-of-view of the one or more cameras: in accordance with a determination that the portion of the field-of-view of the one or more cameras satisfies a set of content criteria, displaying, via the display generation component, the representation of the portion of the field-of-view of the one or more cameras concurrently with a level indicator indicating an orientation of the field-of-view of the one or more cameras with respect to a respective orientation, wherein the set of content criteria includes a first criterion that is based on whether content of a first type is detected in the portion of the field-of-view of the one or more cameras; and in accordance with a determination that the portion of the field-of-view of the one or more cameras does not satisfy the set of content criteria, displaying the representation of the portion of the field-of-view of the one or more cameras without displaying the level indicator.

In accordance with some embodiments, a computer system is described. The computer system is configured to communicate with a display generation component, one or more cameras, and one or more sensors, the computer system comprising one or more processors and memory storing one or more programs configured to be executed by the one or more processors, the one or more programs including instructions for: while displaying, via the display generation component, a camera user interface including a representation of a portion of a field-of-view of the one or more cameras: in accordance with a determination that the portion of the field-of-view of the one or more cameras satisfies a set of content criteria, displaying, via the display generation component, the representation of the portion of the field-of-view of the one or more cameras concurrently with a level indicator indicating an orientation of the field-of-view of the one or more cameras with respect to a respective orientation, wherein the set of content criteria includes a first criterion that is based on whether content of a first type is detected in the portion of the field-of-view of the one or more cameras; and in accordance with a determination that the portion of the field-of-view of the one or more cameras does not satisfy the set of content criteria, displaying the representation of the portion of the field-of-view of the one or more cameras without displaying the level indicator.

In accordance with some embodiments, a computer system is described. The computer system is configured to communicate with a display generation component and one or more cameras, the computer system comprising: means for, while displaying, via the display generation component, a camera user interface including a representation of a portion of a field-of-view of the one or more cameras: in accordance with a determination that the portion of the field-of-view of the one or more cameras satisfies a set of content criteria, displaying, via the display generation component, the representation of the portion of the field-of-view of the one or more cameras concurrently with a level indicator indicating an orientation of the field-of-view of the one or more cameras with respect to a respective orientation, wherein the set of content criteria includes a first criterion that is based on whether content of a first type is detected in the portion of the field-of-view of the one or more cameras; and in accordance with a determination that the portion of the field-of-view of the one or more cameras does not satisfy the set of content criteria, displaying the representation of the portion of the field-of-view of the one or more cameras without displaying the level indicator.

In accordance with some embodiments, a computer program product is described. The computer program product comprises one or more programs configured to be executed by one or more processors of a computer system that is in communication with a display generation component and one or more cameras, the one or more programs including instructions for: while displaying, via the display generation component, a camera user interface including a representation of a portion of a field-of-view of the one or more cameras: in accordance with a determination that the portion of the field-of-view of the one or more cameras satisfies a set of content criteria, displaying, via the display generation component, the representation of the portion of the field-of-view of the one or more cameras concurrently with a level indicator indicating an orientation of the field-of-view of the one or more cameras with respect to a respective orientation, wherein the set of content criteria includes a first criterion that is based on whether content of a first type is detected in the portion of the field-of-view of the one or more cameras; and in accordance with a determination that the portion of the field-of-view of the one or more cameras does not satisfy the set of content criteria, displaying the representation of the portion of the field-of-view of the one or more cameras without displaying the level indicator.

In accordance with some embodiments, a method is described. The method comprises: at a computer system that is in communication with a display generation component and one or more input devices: while concurrently displaying, via the display generation component, a representation of a media item and a control element for adjusting a simulated depth-of-field effect for the media item: detecting, via the one or more input devices, an input; and in response to detecting the input: in accordance with a determination that the input includes selection of a respective portion of the representation of the media item, selecting a respective location of the representation of the media item corresponding to the respective portion of the representation of the media item selected by the input as a focus location for the simulated depth-of-field effect for the representation of the media item; and in accordance with a determination that the input includes selection of the control element, adjusting the control element and changing a magnitude of the simulated depth-of-field effect for the media item.

In accordance with some embodiments, a non-transitory computer-readable storage medium is described. The non-transitory computer-readable storage medium stores one or more programs configured to be executed by one or more processors of a computer system that is in communication with a display generation component and one or more input devices. The one or more programs include instructions for: while concurrently displaying, via the display generation component, a representation of a media item and a control element for adjusting a simulated depth-of-field effect for the media item: detecting, via the one or more input devices, an input; and in response to detecting the input: in accordance with a determination that the input includes selection of a respective portion of the representation of the media item, selecting a respective location of the representation of the media item corresponding to the respective portion of the representation of the media item selected by the input as a focus location for the simulated depth-of-field effect for the representation of the media item; and in accordance with a determination that the input includes selection of the control element, adjusting the control element and changing a magnitude of the simulated depth-of-field effect for the media item.

In accordance with some embodiments, a transitory computer-readable storage medium is described. The transitory computer-readable storage medium stores one or more programs configured to be executed by one or more processors of a computer system that is in communication with a display generation component and one or more input devices. The one or more programs include instructions for: while concurrently displaying, via the display generation component, a representation of a media item and a control element for adjusting a simulated depth-of-field effect for the media item: detecting, via the one or more input devices, an input; and in response to detecting the input: in accordance with a determination that the input includes selection of a respective portion of the representation of the media item, selecting a respective location of the representation of the media item corresponding to the respective portion of the representation of the media item selected by the input as a focus location for the simulated depth-of-field effect for the representation of the media item; and in accordance with a determination that the input includes selection of the control element, adjusting the control element and changing a magnitude of the simulated depth-of-field effect for the media item.

In accordance with some embodiments, a computer system configured to communicate with a display generation component and one or more input devices is described. The computer system comprises one or more processors and memory storing one or more programs configured to be executed by the one or more processors. The one or more programs include instructions for: while concurrently displaying, via the display generation component, a representation of a media item and a control element for adjusting a simulated depth-of-field effect for the media item: detecting, via the one or more input devices, an input; and in response to detecting the input: in accordance with a determination that the input includes selection of a respective portion of the representation of the media item, selecting a respective location of the representation of the media item corresponding to the respective portion of the representation of the media item selected by the input as a focus location for the simulated depth-of-field effect for the representation of the media item; and in accordance with a determination that the input includes selection of the control element, adjusting the control element and changing a magnitude of the simulated depth-of-field effect for the media item.

In accordance with some embodiments, a computer system configured to communicate with a display generation component and one or more input devices is described. The computer system comprises: means for, while concurrently displaying, via the display generation component, a representation of a media item and a control element for adjusting a simulated depth-of-field effect for the media item: detecting, via the one or more input devices, an input; and in response to detecting the input: in accordance with a determination that the input includes selection of a respective portion of the representation of the media item, selecting a respective location of the representation of the media item corresponding to the respective portion of the representation of the media item selected by the input as a focus location for the simulated depth-of-field effect for the representation of the media item; and in accordance with a determination that the input includes selection of the control element, adjusting the control element and changing a magnitude of the simulated depth-of-field effect for the media item.

In accordance with some embodiments, a computer program product is described. The computer program product comprises one or more programs configured to be executed by one or more processors of a computer system that is in communication with a display generation component and one or more input devices. The one or more programs include instructions for: while concurrently displaying, via the display generation component, a representation of a media item and a control element for adjusting a simulated depth-of-field effect for the media item: detecting, via the one or more input devices, an input; and in response to detecting the input: in accordance with a determination that the input includes selection of a respective portion of the representation of the media item, selecting a respective location of the representation of the media item corresponding to the respective portion of the representation of the media item selected by the input as a focus location for the simulated depth-of-field effect for the representation of the media item; and in accordance with a determination that the input includes selection of the control element, adjusting the control element and changing a magnitude of the simulated depth-of-field effect for the media item.

In accordance with some embodiments, a method is described. The method comprises: at a computer system that is in communication with a display generation component and one or more input devices: detecting, via the one or more input devices, a request to display controls for editing a representation of a media item; and in response to detecting the request to display controls for editing the representation of the media item, concurrently displaying, via the display generation component: a first control element for editing a feature of a set of one or more images that are available to be displayed in a sequence of images when the representation of the media item is displayed via the display generation component; and a second control element for editing a simulated depth-of-field effect for the representation of the media item.

In accordance with some embodiments, a non-transitory computer-readable storage medium is described. The non-transitory computer-readable storage medium stores one or more programs configured to be executed by one or more processors of a computer system that is in communication with a display generation component and one or more input devices. The one or more programs including instructions for: detecting, via the one or more input devices, a request to display controls for editing a representation of a media item; and in response to detecting the request to display controls for editing the representation of the media item, concurrently displaying, via the display generation component: a first control element for editing a feature of a set of one or more images that are available to be displayed in a sequence of images when the representation of the media item is displayed via the display generation component; and a second control element for editing a simulated depth-of-field effect for the representation of the media item.

In accordance with some embodiments, a transitory computer-readable storage medium is described. The transitory computer-readable storage medium stores one or more programs configured to be executed by one or more processors of a computer system that is in communication with a display generation component and one or more input devices. The one or more programs including instructions for: detecting, via the one or more input devices, a request to display controls for editing a representation of a media item; and in response to detecting the request to display controls for editing the representation of the media item, concurrently displaying, via the display generation component: a first control element for editing a feature of a set of one or more images that are available to be displayed in a sequence of images when the representation of the media item is displayed via the display generation component; and a second control element for editing a simulated depth-of-field effect for the representation of the media item.

In accordance with some embodiments, a computer system configured to communicate with a display generation component and one or more input devices is described. The computer system comprises one or more processors and memory storing one or more programs configured to be executed by the one or more processors. The one or more programs include instructions for: detecting, via the one or more input devices, a request to display controls for editing a representation of a media item; and in response to detecting the request to display controls for editing the representation of the media item, concurrently displaying, via the display generation component: a first control element for editing a feature of a set of one or more images that are available to be displayed in a sequence of images when the representation of the media item is displayed via the display generation component; and a second control element for editing a simulated depth-of-field effect for the representation of the media item.

In accordance with some embodiments, a computer system configured to communicate with a display generation component and one or more input devices is described. The computer system comprises: means for detecting, via the one or more input devices, a request to display controls for editing a representation of a media item; and means for, in response to detecting the request to display controls for editing the representation of the media item, concurrently displaying, via the display generation component: a first control element for editing a feature of a set of one or more images that are available to be displayed in a sequence of images when the representation of the media item is displayed via the display generation component; and a second control element for editing a simulated depth-of-field effect for the representation of the media item.

In accordance with some embodiments, a computer program product is described. The computer program product comprises one or more programs configured to be executed by one or more processors of a computer system that is in communication with a display generation component and one or more input devices. The one or more programs include instructions for: detecting, via the one or more input devices, a request to display controls for editing a representation of a media item; and in response to detecting the request to display controls for editing the representation of the media item, concurrently displaying, via the display generation component: a first control element for editing a feature of a set of one or more images that are available to be displayed in a sequence of images when the representation of the media item is displayed via the display generation component; and a second control element for editing a simulated depth-of-field effect for the representation of the media item.

In accordance with some embodiments, a method is described. The method comprises: at a computer system that is in communication with a display generation component and one or more input devices: while displaying, via the display generation component, a representation of a media item that includes a simulated depth-of-field effect: detecting, via the one or more input devices, an input directed toward the representation of the media item that includes the simulated depth-of-field effect; and in response to detecting the input directed toward the representation of the media item, displaying, via the display generation component, a plurality of images corresponding to the media item, including displaying the plurality of images in a sequence over time.

In accordance with some embodiments, a non-transitory computer-readable storage medium is described. The non-transitory computer-readable storage medium stores one or more programs configured to be executed by one or more processors of a computer system that is in communication with a display generation component and one or more input devices. The one or more programs include instructions for: while displaying, via the display generation component, a representation of a media item that includes a simulated depth-of-field effect: detecting, via the one or more input devices, an input directed toward the representation of the media item that includes the simulated depth-of-field effect;

and in response to detecting the input directed toward the representation of the media item, displaying, via the display generation component, a plurality of images corresponding to the media item, including displaying the plurality of images in a sequence over time.

In accordance with some embodiments, a transitory computer-readable storage medium is described. The transitory computer-readable storage medium stores one or more programs configured to be executed by one or more processors of a computer system that is in communication with a display generation component and one or more input devices. The one or more programs include instructions for: while displaying, via the display generation component, a representation of a media item that includes a simulated depth-of-field effect: detecting, via the one or more input devices, an input directed toward the representation of the media item that includes the simulated depth-of-field effect; and in response to detecting the input directed toward the representation of the media item, displaying, via the display generation component, a plurality of images corresponding to the media item, including displaying the plurality of images in a sequence over time.

In accordance with some embodiments, a computer system configured to communicate with a display generation component and one or more input devices is described. The computer system comprises one or more processors and memory storing one or more programs configured to be executed by the one or more processors. The one or more programs include instructions for: while displaying, via the display generation component, a representation of a media item that includes a simulated depth-of-field effect: detecting, via the one or more input devices, an input directed toward the representation of the media item that includes the simulated depth-of-field effect; and in response to detecting the input directed toward the representation of the media item, displaying, via the display generation component, a plurality of images corresponding to the media item, including displaying the plurality of images in a sequence over time.

In accordance with some embodiments, a computer system configured to communicate with a display generation component and one or more input devices is described. The computer system comprises: means for, while displaying, via the display generation component, a representation of a media item that includes a simulated depth-of-field effect: detecting, via the one or more input devices, an input directed toward the representation of the media item that includes the simulated depth-of-field effect; and in response to detecting the input directed toward the representation of the media item, displaying, via the display generation component, a plurality of images corresponding to the media item, including displaying the plurality of images in a sequence over time.

In accordance with some embodiments, a computer program product is described. The computer program product comprises one or more programs configured to be executed by one or more processors of a computer system that is in communication with a display generation component and one or more input devices. The one or more programs include instructions for: while displaying, via the display generation component, a representation of a media item that includes a simulated depth-of-field effect: detecting, via the one or more input devices, an input directed toward the representation of the media item that includes the simulated depth-of-field effect; and in response to detecting the input directed toward the representation of the media item, displaying, via the display generation component, a plurality of images corresponding to the media item, including displaying the plurality of images in a sequence over time.

In accordance with some embodiments, a method is described. The method comprises: at a computer system having one or more cameras, wherein the computer system is in communication with a display generation component and one or more input devices: displaying, via the display generation component, a camera user interface that includes one or more selectable controls for managing zoom levels to capture media; detecting a first input directed to a respective selectable control that includes movement; and in response to detecting the first input directed to the respective selectable control, navigating through a plurality of candidate zoom levels from a first zoom level to a second zoom level in accordance with the movement, including snapping to one or more zoom levels while navigating through the plurality of candidate zoom levels and: in accordance with a determination that a third zoom level between the first zoom level and the second zoom level has been selected as a snapping zoom level, snapping to the third zoom level while navigating through the plurality of candidate zoom levels; and in accordance with a determination that the third zoom level between the first zoom level and the second zoom level has not been selected as a snapping zoom level, forgoing snapping to the third zoom level while navigating through the plurality of candidate zoom levels.

In accordance with some embodiments, a non-transitory computer-readable storage medium is described. The non-transitory computer-readable storage medium stores one or more programs configured to be executed by one or more processors of a computer system that is in communication with a display generation component, one or more cameras, and one or more input devices. The one or more programs include instructions for: displaying, via the display generation component, a camera user interface that includes one or more selectable controls for managing zoom levels to capture media; detecting a first input directed to a respective selectable control that includes movement; and in response to detecting the first input directed to the respective selectable control, navigating through a plurality of candidate zoom levels from a first zoom level to a second zoom level in accordance with the movement, including snapping to one or more zoom levels while navigating through the plurality of candidate zoom levels and: in accordance with a determination that a third zoom level between the first zoom level and the second zoom level has been selected as a snapping zoom level, snapping to the third zoom level while navigating through the plurality of candidate zoom levels; and in accordance with a determination that the third zoom level between the first zoom level and the second zoom level has not been selected as a snapping zoom level, forgoing snapping to the third zoom level while navigating through the plurality of candidate zoom levels.

In accordance with some embodiments, a transitory computer-readable storage medium is described. The transitory computer-readable storage medium stores one or more programs configured to be executed by one or more processors of a computer system that is in communication with a display generation component, one or more cameras, and one or more input devices. The one or more programs include instructions for: displaying, via the display generation component, a camera user interface that includes one or more selectable controls for managing zoom levels to capture media; detecting a first input directed to a respective selectable control that includes movement; and in response to detecting the first input directed to the respective selectable control, navigating through a plurality of candidate zoom levels from a first zoom level to a second zoom level in accordance with the movement, including snapping to one or more zoom levels while navigating through the plurality of candidate zoom levels and: in accordance with a determination that a third zoom level between the first zoom level and the second zoom level has been selected as a snapping zoom level, snapping to the third zoom level while navigating through the plurality of candidate zoom levels; and in accordance with a determination that the third zoom level between the first zoom level and the second zoom level has not been selected as a snapping zoom level, forgoing snapping to the third zoom level while navigating through the plurality of candidate zoom levels.

In accordance with some embodiments, a computer system that is configured to communicate with a display generation component, one or more cameras, and one or more input devices is described. The computer system comprises one or more processors and memory storing one or more programs configured to be executed by the one or more processors. The one or more programs include instructions for: displaying, via the display generation component, a camera user interface that includes one or more selectable controls for managing zoom levels to capture media; detecting a first input directed to a respective selectable control that includes movement; and in response to detecting the first input directed to the respective selectable control, navigating through a plurality of candidate zoom levels from a first zoom level to a second zoom level in accordance with the movement, including snapping to one or more zoom levels while navigating through the plurality of candidate zoom levels and: in accordance with a determination that a third zoom level between the first zoom level and the second zoom level has been selected as a snapping zoom level, snapping to the third zoom level while navigating through the plurality of candidate zoom levels; and in accordance with a determination that the third zoom level between the first zoom level and the second zoom level has not been selected as a snapping zoom level, forgoing snapping to the third zoom level while navigating through the plurality of candidate zoom levels.

In accordance with some embodiments, a computer system that is configured to communicate with a display generation component, one or more cameras, and one or more input devices is described. The computer system comprises: means for displaying, via the display generation component, a camera user interface that includes one or more selectable controls for managing zoom levels to capture media; means for detecting a first input directed to a respective selectable control that includes movement; and means for, in response to detecting the first input directed to the respective selectable control, navigating through a plurality of candidate zoom levels from a first zoom level to a second zoom level in accordance with the movement, including snapping to one or more zoom levels while navigating through the plurality of candidate zoom levels and: in accordance with a determination that a third zoom level between the first zoom level and the second zoom level has been selected as a snapping zoom level, snapping to the third zoom level while navigating through the plurality of candidate zoom levels; and in accordance with a determination that the third zoom level between the first zoom level and the second zoom level has not been selected as a snapping zoom level, forgoing snapping to the third zoom level while navigating through the plurality of candidate zoom levels.

In accordance with some embodiments, a computer program product is described. The computer program product comprises one or more programs configured to be executed by one or more processors of a computer system that is in communication with a display generation component, one or more cameras, and one or more input devices. The one or more programs include instructions for: displaying, via the display generation component, a camera user interface that includes one or more selectable controls for managing zoom levels to capture media; detecting a first input directed to a respective selectable control that includes movement; and in response to detecting the first input directed to the respective selectable control, navigating through a plurality of candidate zoom levels from a first zoom level to a second zoom level in accordance with the movement, including snapping to one or more zoom levels while navigating through the plurality of candidate zoom levels and: in accordance with a determination that a third zoom level between the first zoom level and the second zoom level has been selected as a snapping zoom level, snapping to the third zoom level while navigating through the plurality of candidate zoom levels; and in accordance with a determination that the third zoom level between the first zoom level and the second zoom level has not been selected as a snapping zoom level, forgoing snapping to the third zoom level while navigating through the plurality of candidate zoom levels.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for controlling media capture settings, thereby increasing the effectiveness, efficiency, and user satisfaction with such devices. Such methods and interfaces may complement or replace other methods for controlling media capture settings.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5E-5H illustrate exemplary components and user interfaces of a personal electronic device in accordance with some embodiments.

FIG. 7 is a flow diagram of methods for controlling capture of media with associated depth information in accordance with some embodiments.

FIG. 9 is a flow diagram of methods for controlling media capture settings in accordance with some embodiments.

FIG. 11 is a flow diagram of methods for controlling zoom settings for media capture in accordance with some embodiments.

FIG. 13 is a flow diagram of methods for capturing and viewing media using internal and external media storage in accordance with some embodiments.

FIG. 15 is a flow diagram of methods for conditionally displaying a level indicator based on media capture contents in accordance with some embodiments.

FIG. 17 is a flow diagram of methods for capturing, viewing, and/or editing a media item in accordance with some embodiments.

FIG. 19 is a flow diagram of methods for displaying, editing, and/or controlling settings for a media item in accordance with some embodiments.

FIG. 21 is a flow diagram of methods for displaying a media item in accordance with some embodiments.

FIG. 23 is a flow diagram of methods for controlling a zoom level of a camera in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for controlling media capture settings. For example, automatically providing a depth capture indicator when depth capture criteria are met provides quick access to depth effect controls when relevant and hides the controls when they are unlikely to be used. For example, providing a control schema that switches between a limited set of states in response to one type of input and provides access to additional states in response to another type of input provides quick and intuitive access to media controls without cluttering a user interface. For example, displaying a secondary, zoomed-out camera preview when a primary camera preview is zoomed in past a certain threshold helps user compose and capture media based on a wider view of the environment. For example, displaying different media based on whether external storage criteria are met provides quick access to relevant media. For example, conditionally displaying a level indicator based on whether particular content is present automatically provides capture guidance when relevant and avoids cluttering the user interface, when conditions for display are not met. Such techniques can reduce the cognitive burden on a user while capturing media and managing captured media, thereby enhancing productivity. Such techniques reduce the processing power used by a device to display user interfaces, receive inputs through the user interfaces, and respond to the user inputs. Further, such techniques can reduce processor and battery power otherwise wasted on redundant user inputs.

Figures 8A, 8B:
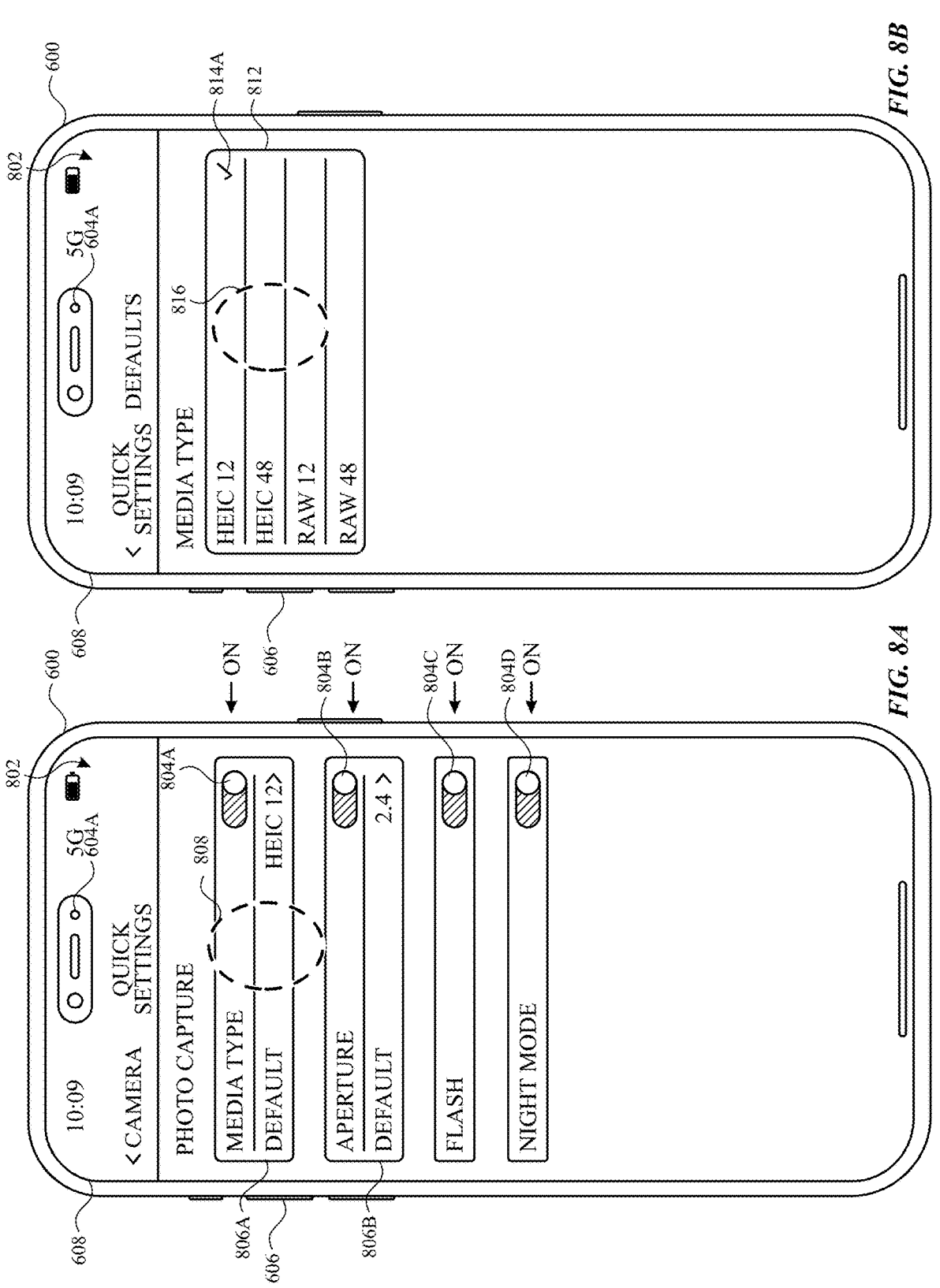
FIGS. 8A-8T illustrate example techniques and user interfaces for controlling media capture settings in accordance with some embodiments.
Figures 12A, 12B:
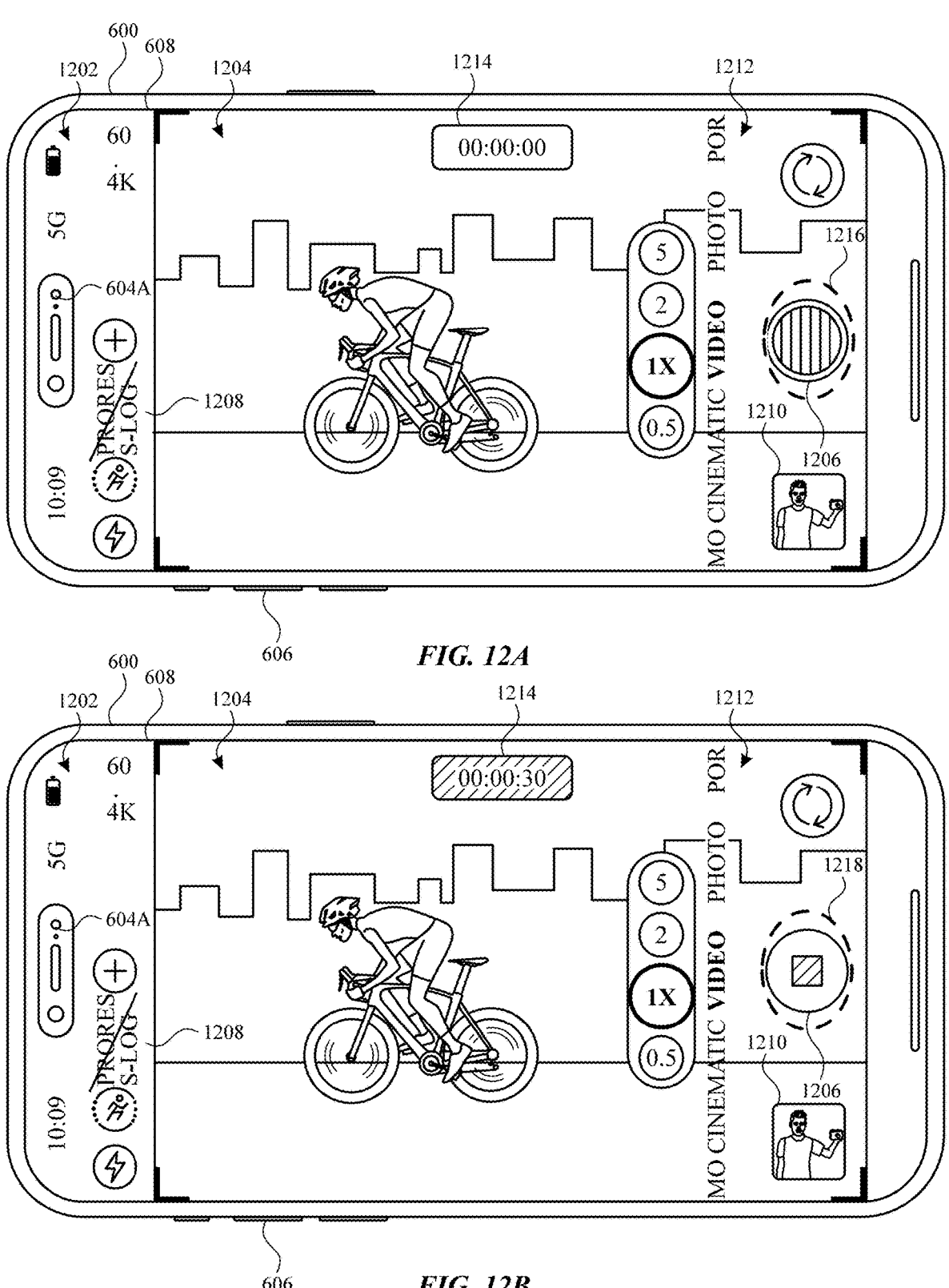
FIGS. 12A-12T illustrate example techniques and user interfaces for capturing and viewing media using internal and external media storage in accordance with some embodiments.
Figure 12C:
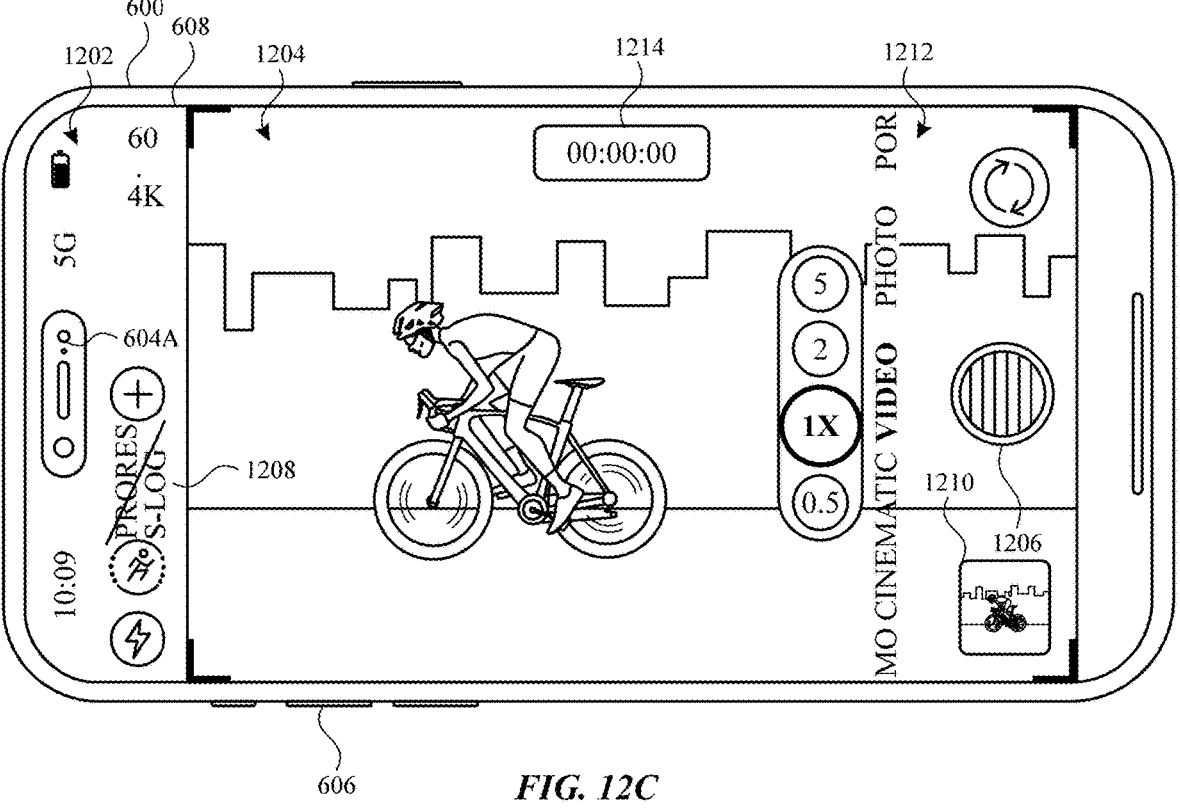
Figure 14A:
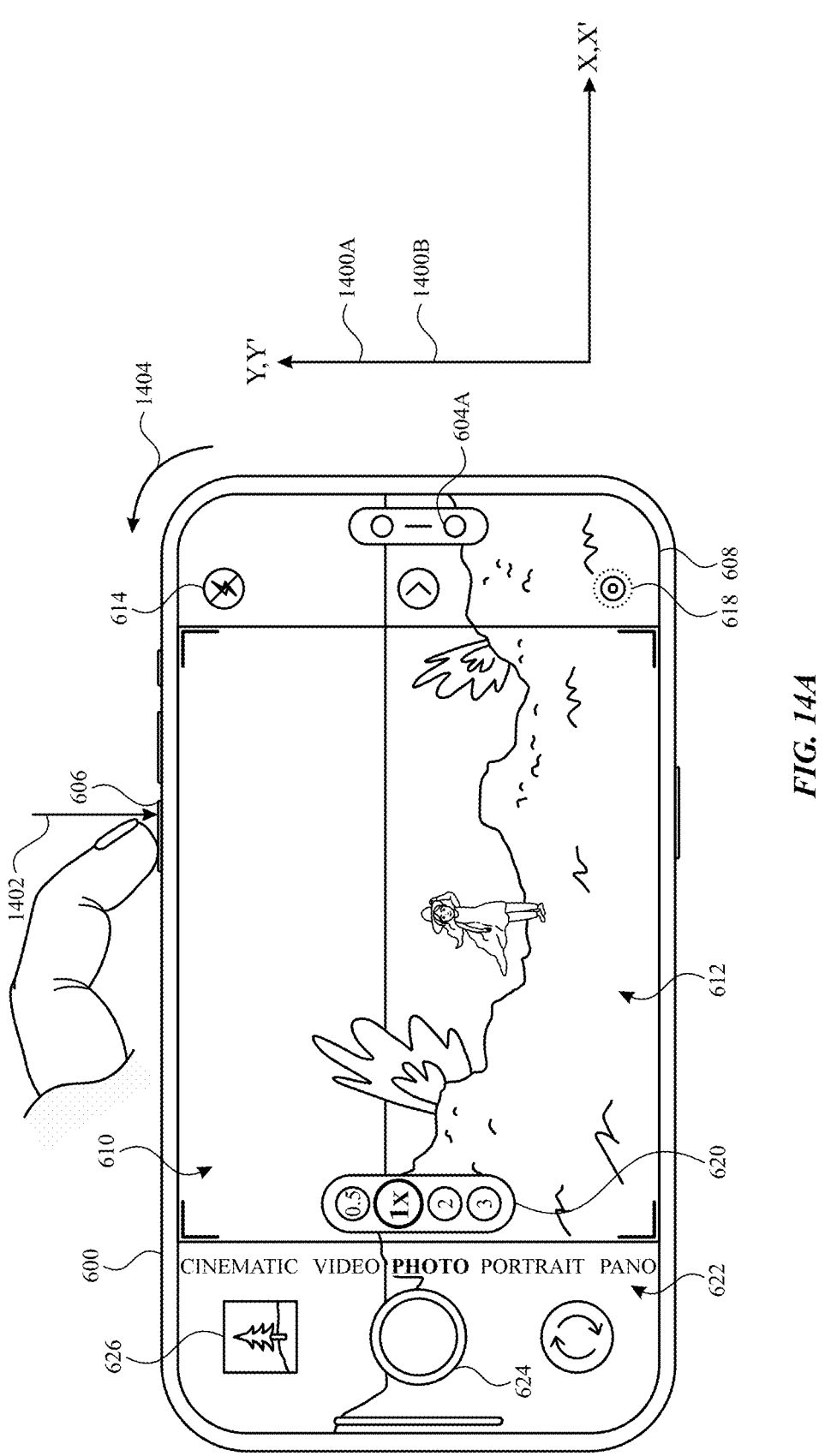
FIGS. 14A-14Q illustrate example techniques and user interfaces for conditionally displaying a level indicator based on media capture contents in accordance with some embodiments.

Below, FIGS. 1A-1B, 2, 3, 4A-4B, and 5A-5H provide a description of exemplary devices for performing the techniques for managing event notifications. FIGS. 6A-6U illustrate exemplary user interfaces for controlling capture of media with associated depth information. FIG. 7 is a flow diagram illustrating methods of controlling capture of media with associated depth information in accordance with some embodiments. The user interfaces in FIGS. 6A-6U are used to illustrate the processes described below, including the processes in FIG. 7. FIGS. 8A-8T illustrate exemplary user interfaces for controlling media capture settings. FIG. 9 is a flow diagram illustrating methods of controlling media capture settings in accordance with some embodiments. The user interfaces in FIGS. 8A-8T are used to illustrate the processes described below, including the processes in FIG. 9. FIGS. 10A-10I illustrate exemplary user interfaces for controlling zoom settings for media capture. FIG. 11 is a flow diagram illustrating methods of controlling capture of media with associated depth information in accordance with some embodiments. The user interfaces in FIGS. 10A-10I are used to illustrate the processes described below, including the processes in FIG. 11. FIGS. 12A-12T illustrate exemplary user interfaces for capturing and viewing media using internal and external media storage. FIG. 13 is a flow diagram illustrating methods of capturing and viewing media using internal and external media storage in accordance with some embodiments. The user interfaces in FIGS. 12A-12T are used to illustrate the processes described below, including the processes in FIG. 13. FIGS. 14A-14Q illustrate exemplary user interfaces for conditionally displaying a level indicator based on media capture contents. FIG. 15 is a flow diagram illustrating methods of conditionally displaying a level indicator based on media capture contents in accordance with some embodiments. The user interfaces in FIGS. 14A-14Q are used to illustrate the processes described below, including the processes in FIG.

23

Figures 18A, 18B:
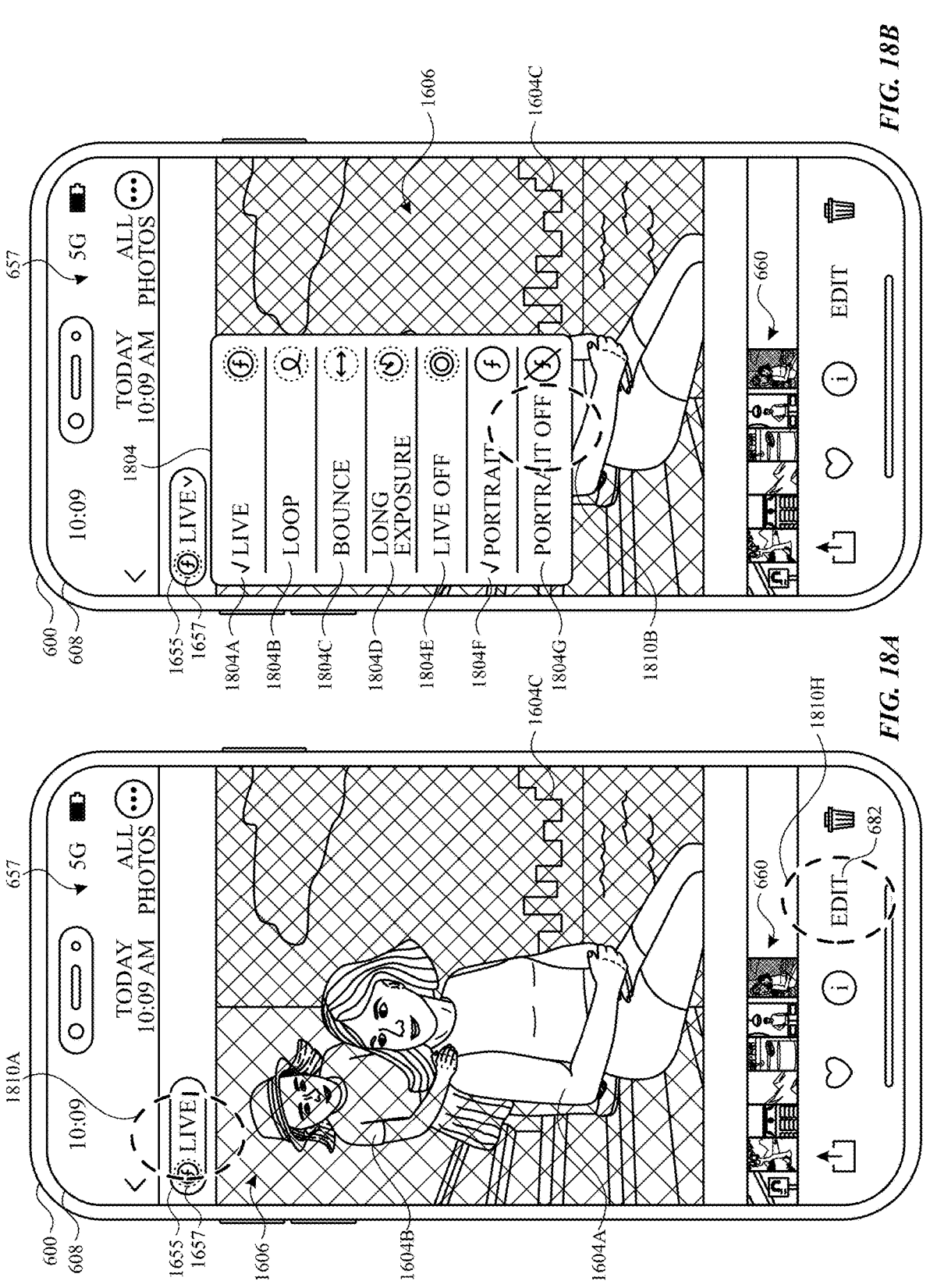
FIGS. 18A-18T illustrate example techniques and user interfaces for displaying, editing, and/or controlling settings for a media item in accordance with some embodiments.
Figures 18C, 18D:
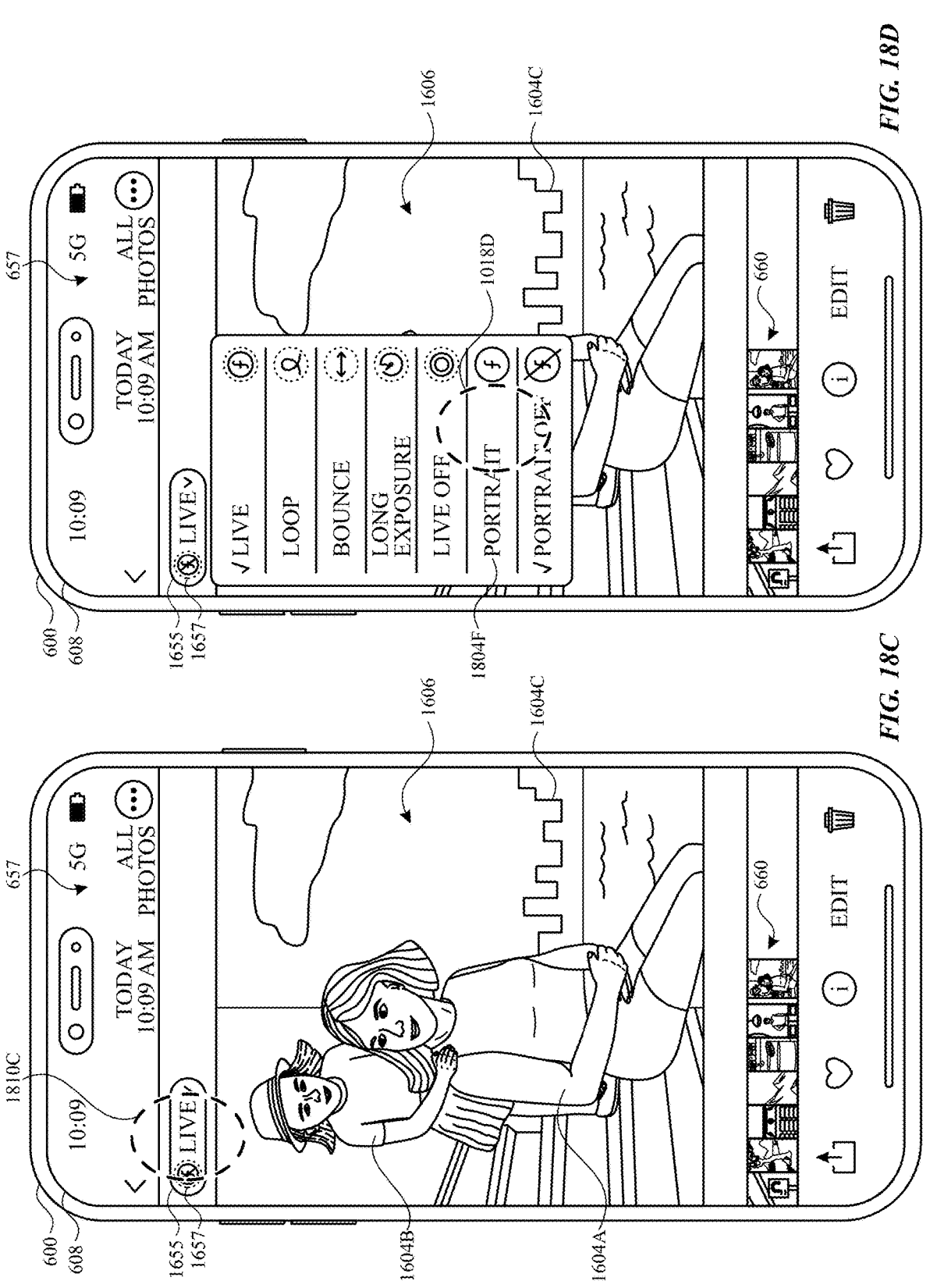
Figures 20A, 20B:
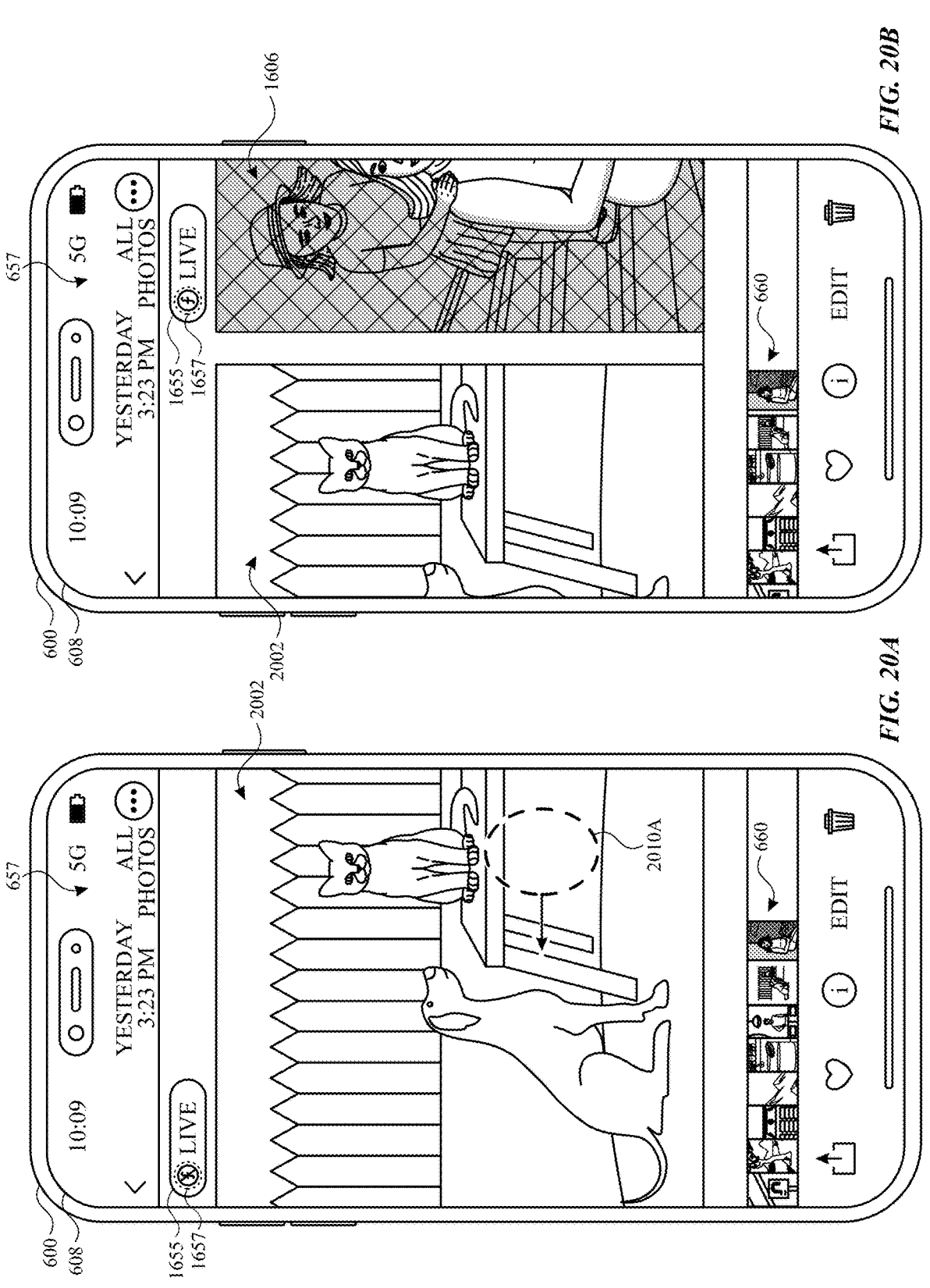
FIGS. 20A-20T illustrate example techniques and user interfaces for displaying a media item in accordance with some embodiments.
Figures 22A, 22B:
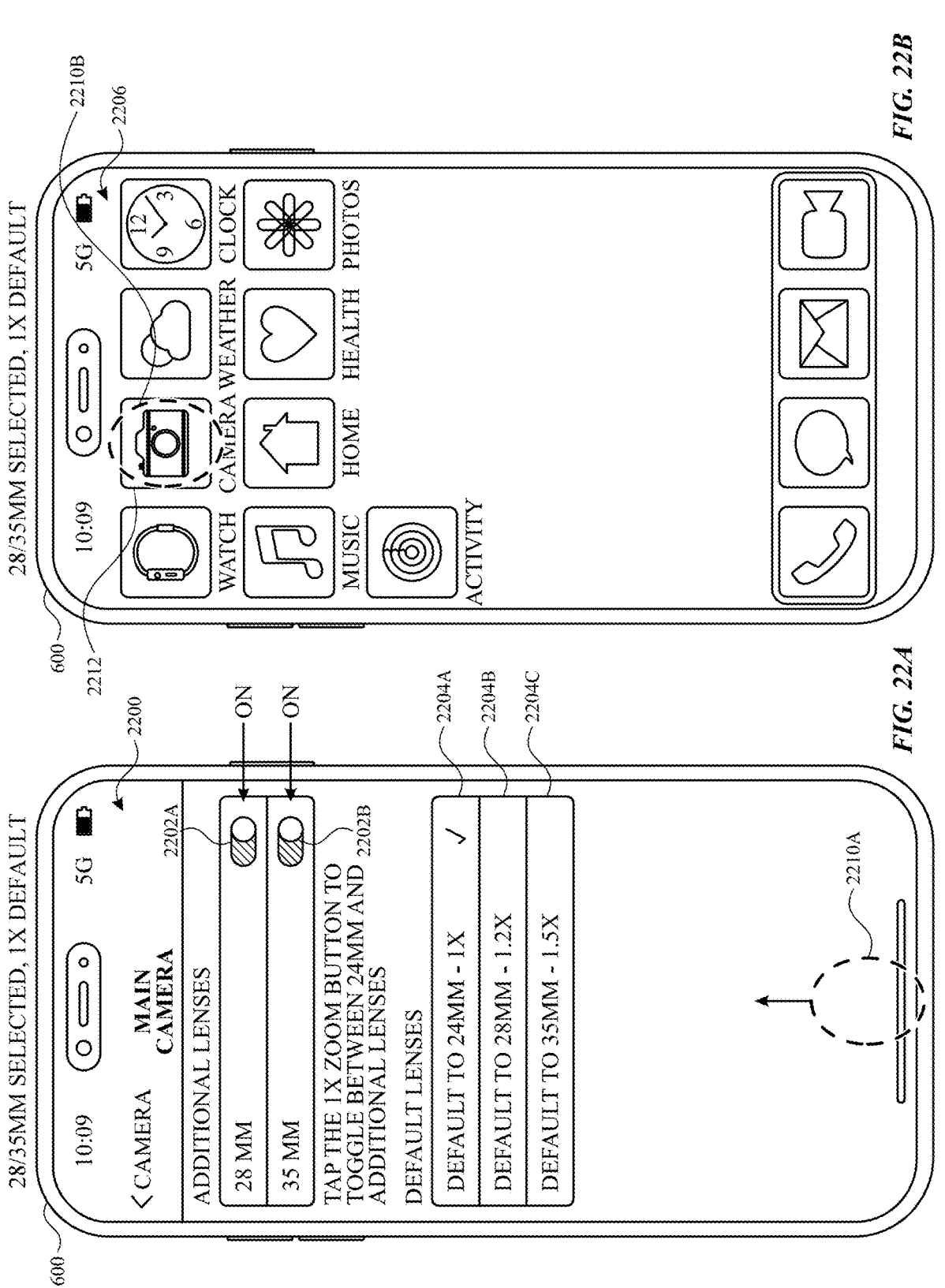
FIGS. 22A-22AL illustrate example techniques and user interfaces for controlling a zoom level of a camera in accordance with some embodiments.

15. FIGS. 16A-16M illustrate exemplary user interfaces for capturing, viewing, and/or editing a media item. FIG. 17 is a flow diagram illustrating methods of capturing, viewing, and/or editing a media item in accordance with some embodiments. The user interfaces in FIGS. 16A-16M are used to illustrate the processes described below, including the processes in FIG. 17. FIGS. 18A-18T illustrate exemplary user interfaces for displaying, editing, and/or controlling settings for a media item. FIG. 19 is a flow diagram illustrating methods of displaying, editing, and/or controlling settings for a media item in accordance with some embodiments. The user interfaces in FIGS. 18A-18T are used to illustrate the processes described below, including the processes in FIG. 19. FIGS. 20A-20T illustrate exemplary user interfaces for displaying a media item. FIG. 21 is a flow diagram illustrating methods of displaying a media item in accordance with some embodiments. The user interfaces in FIGS. 20A-20T are used to illustrate the processes described below, including the processes in FIG. 21. FIGS. 22A-22AL illustrate exemplary user interfaces for controlling a zoom level of a camera. FIG. 23 is a flow diagram illustrating methods of controlling a zoom level of a camera in accordance with some embodiments. The user interfaces in FIGS. 22A-22AL are used to illustrate the processes described below, including the processes in FIG. 23.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
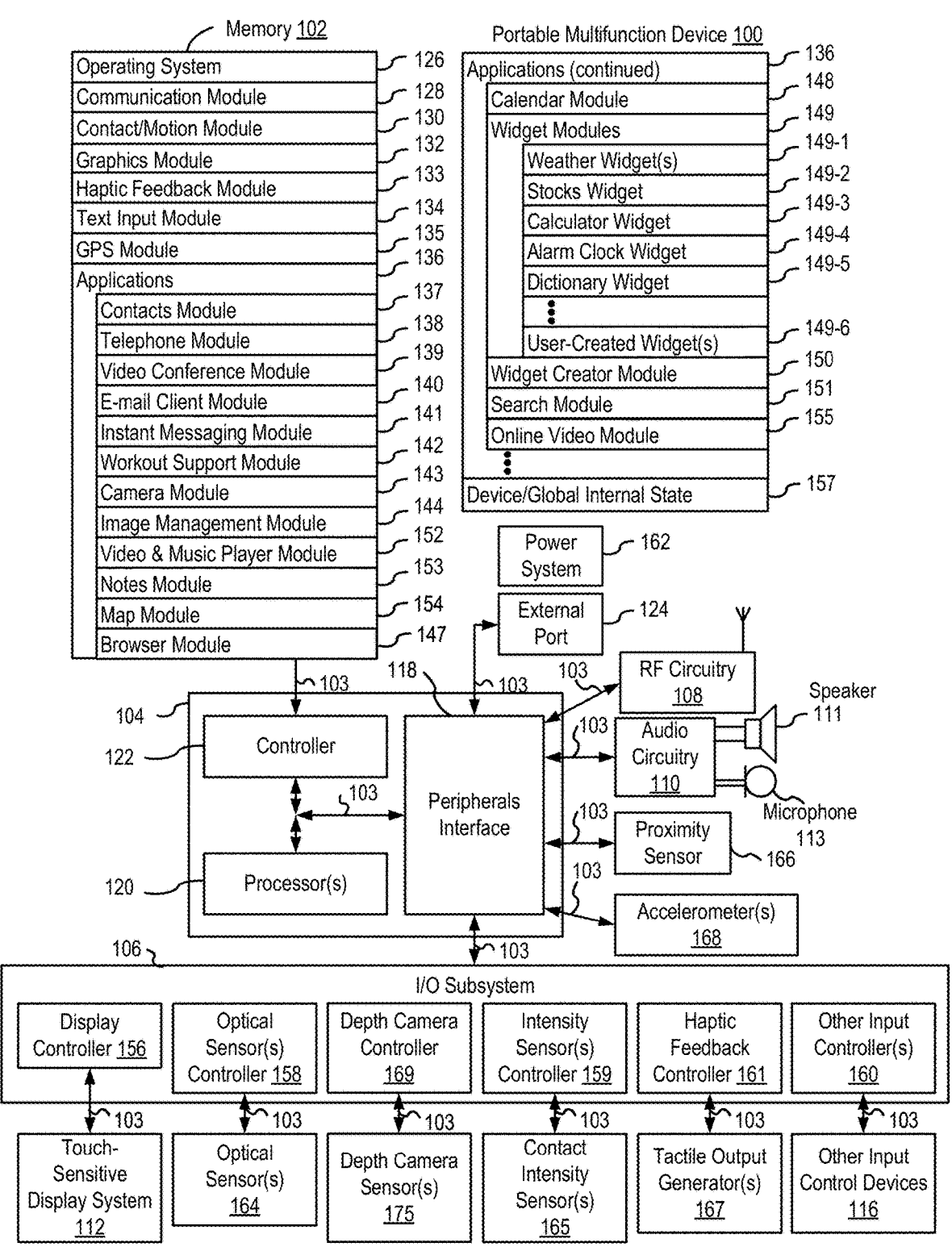
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage media), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.1 in, and/or IEEE 802.1 lac), voice over Internet Protocol (VoTP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al), U.S. Pat. No. 6,570,557 (Westerman et al), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
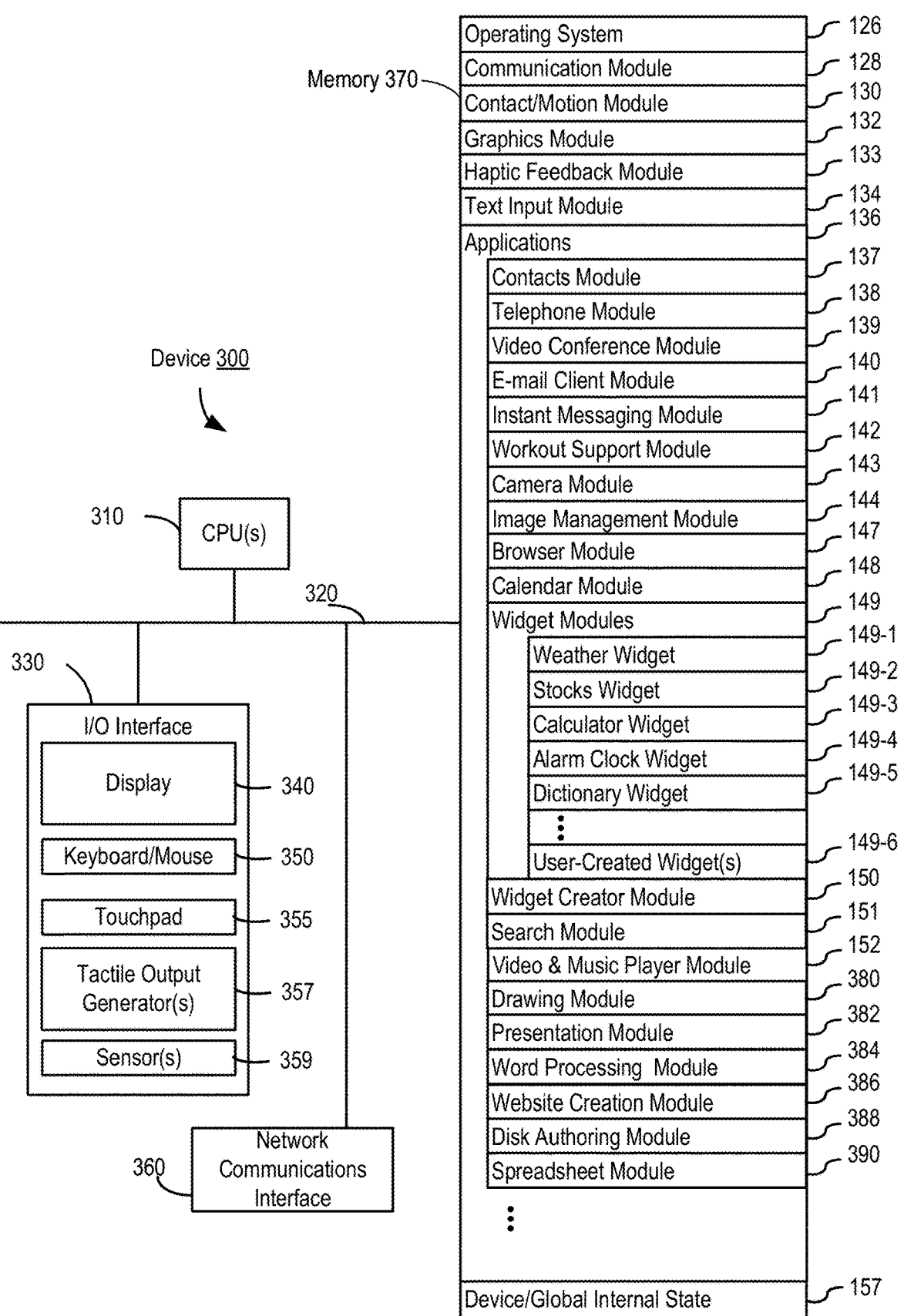
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);

Telephone module 138;

Video conference module 139;

E-mail client module 140;

Instant messaging (IM) module 141;

Workout support module 142;

Camera module 143 for still and/or video images;

Image management module 144;

Video player module;

Music player module;

Browser module 147;

Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
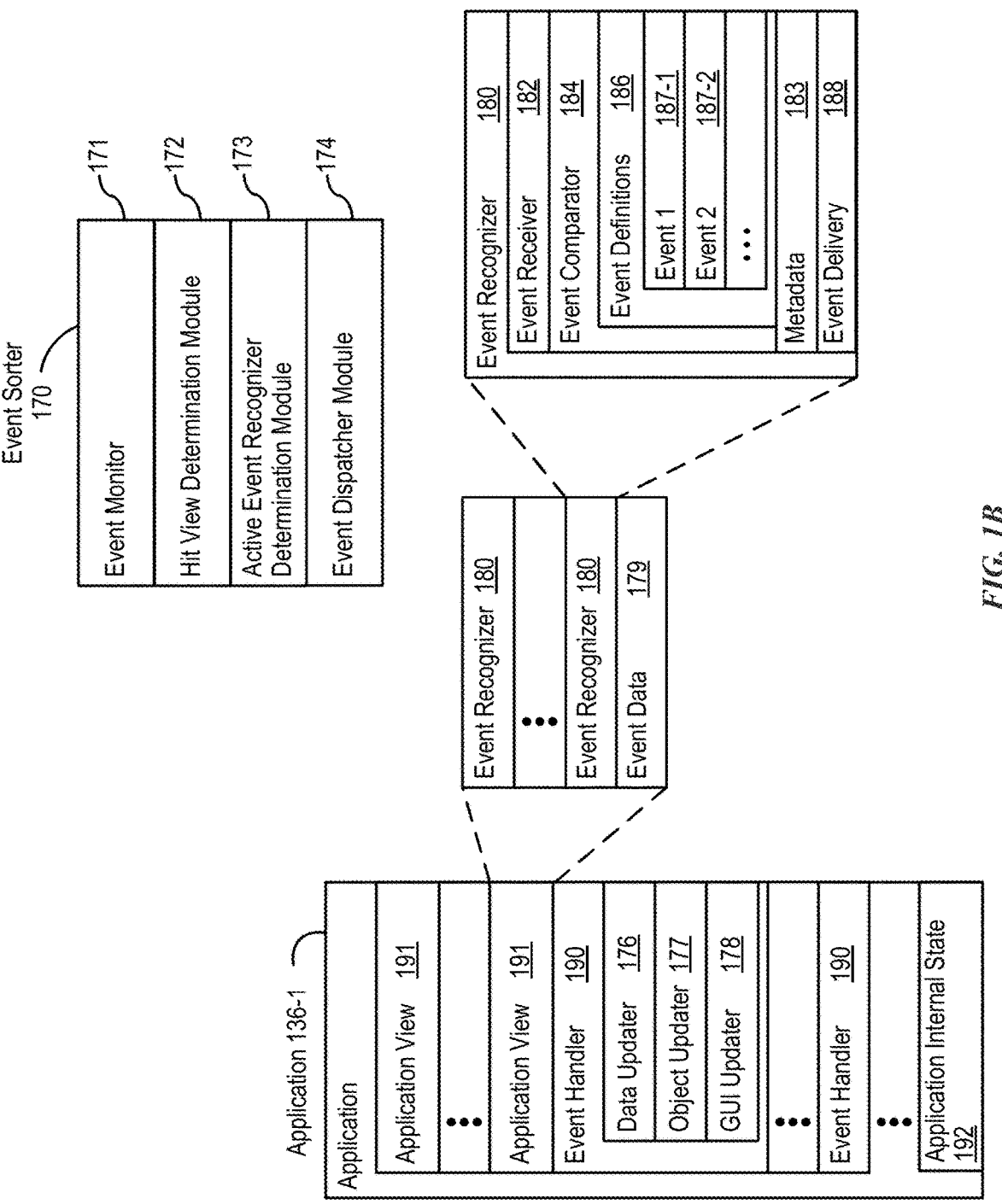
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
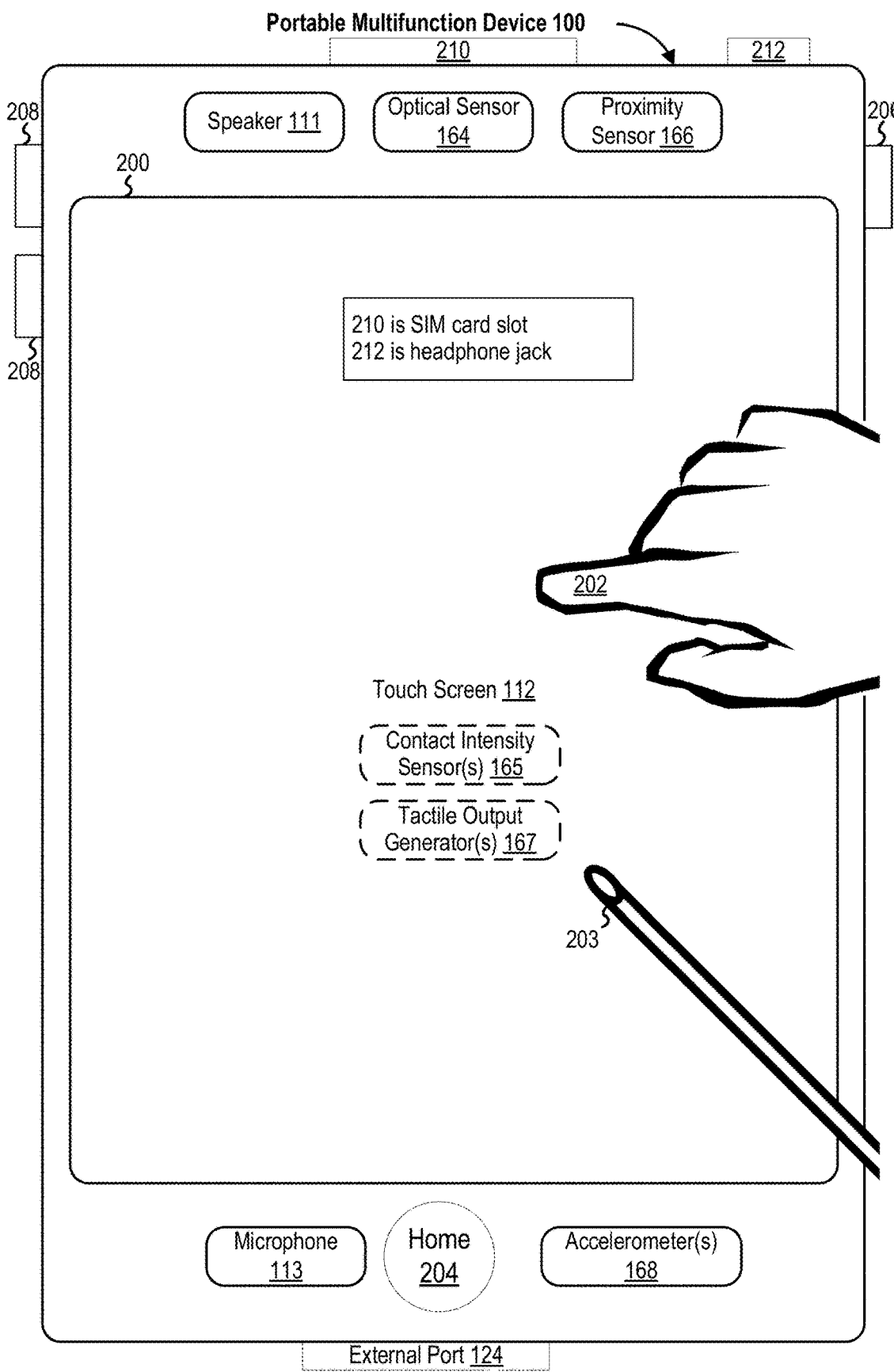
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multi-media player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
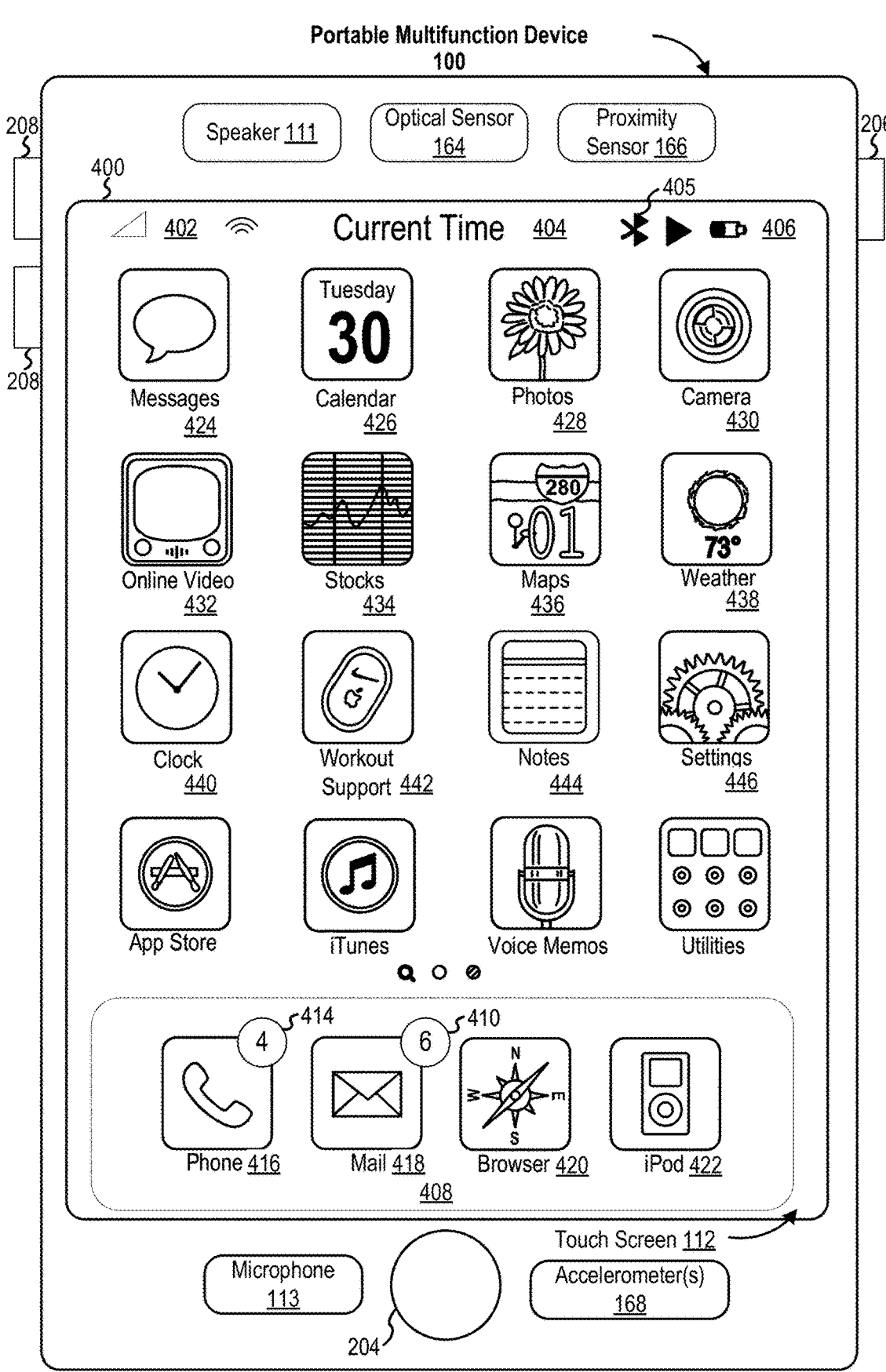
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface

451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
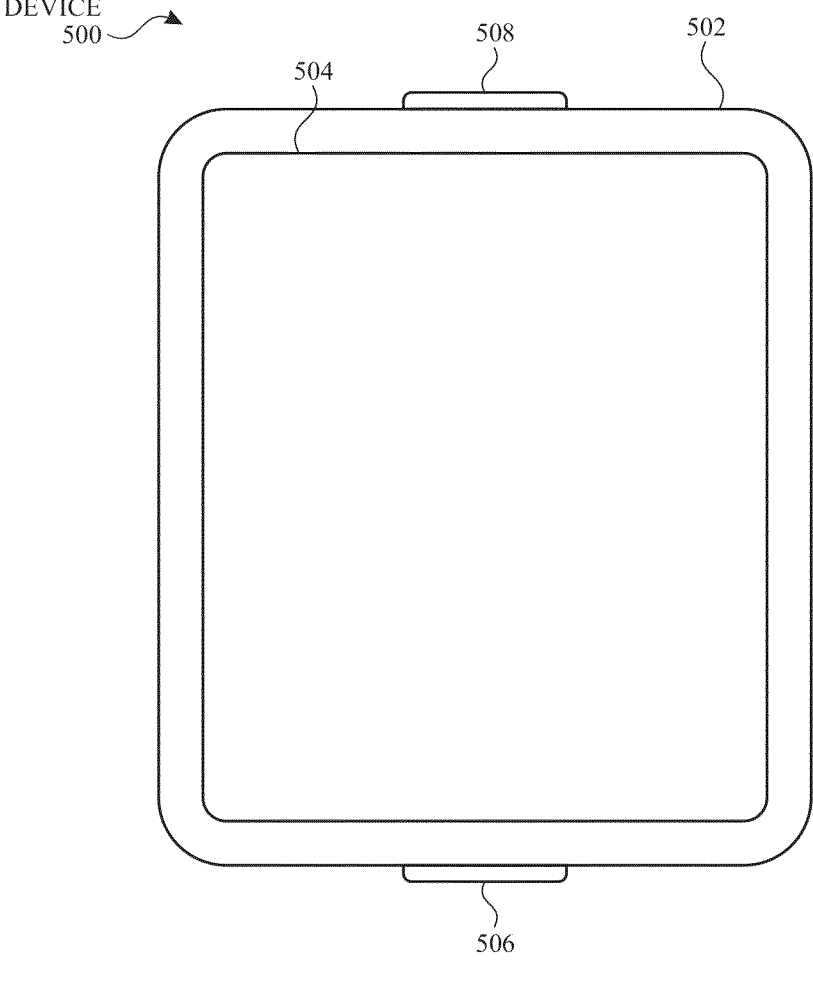
FIG. 5A illustrates a personal electronic device in accordance with some embodiments.
Figures 6A, 6B:
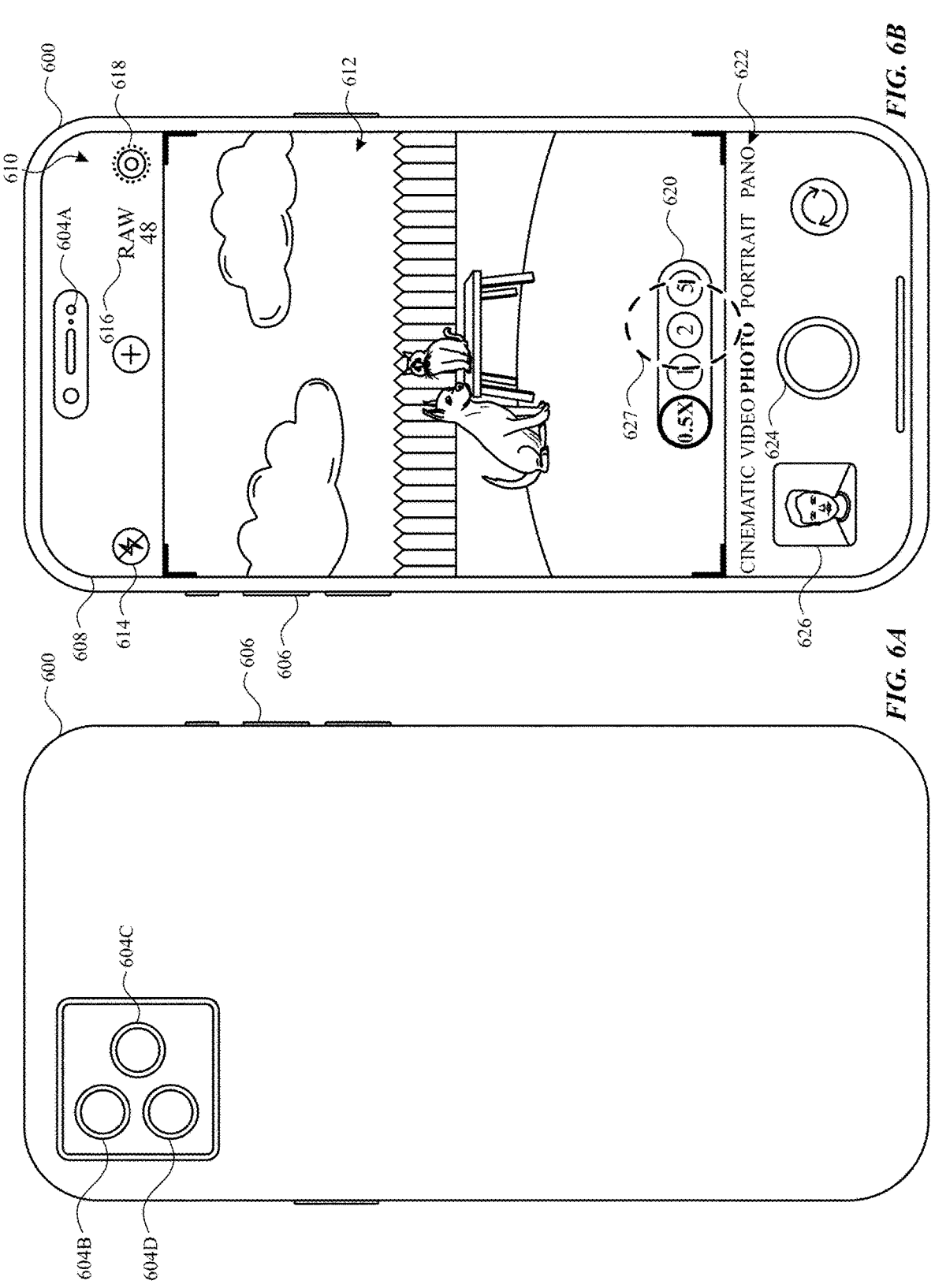
FIGS. 6A-6U illustrate example techniques and user interfaces for controlling capture of media with associated depth information in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
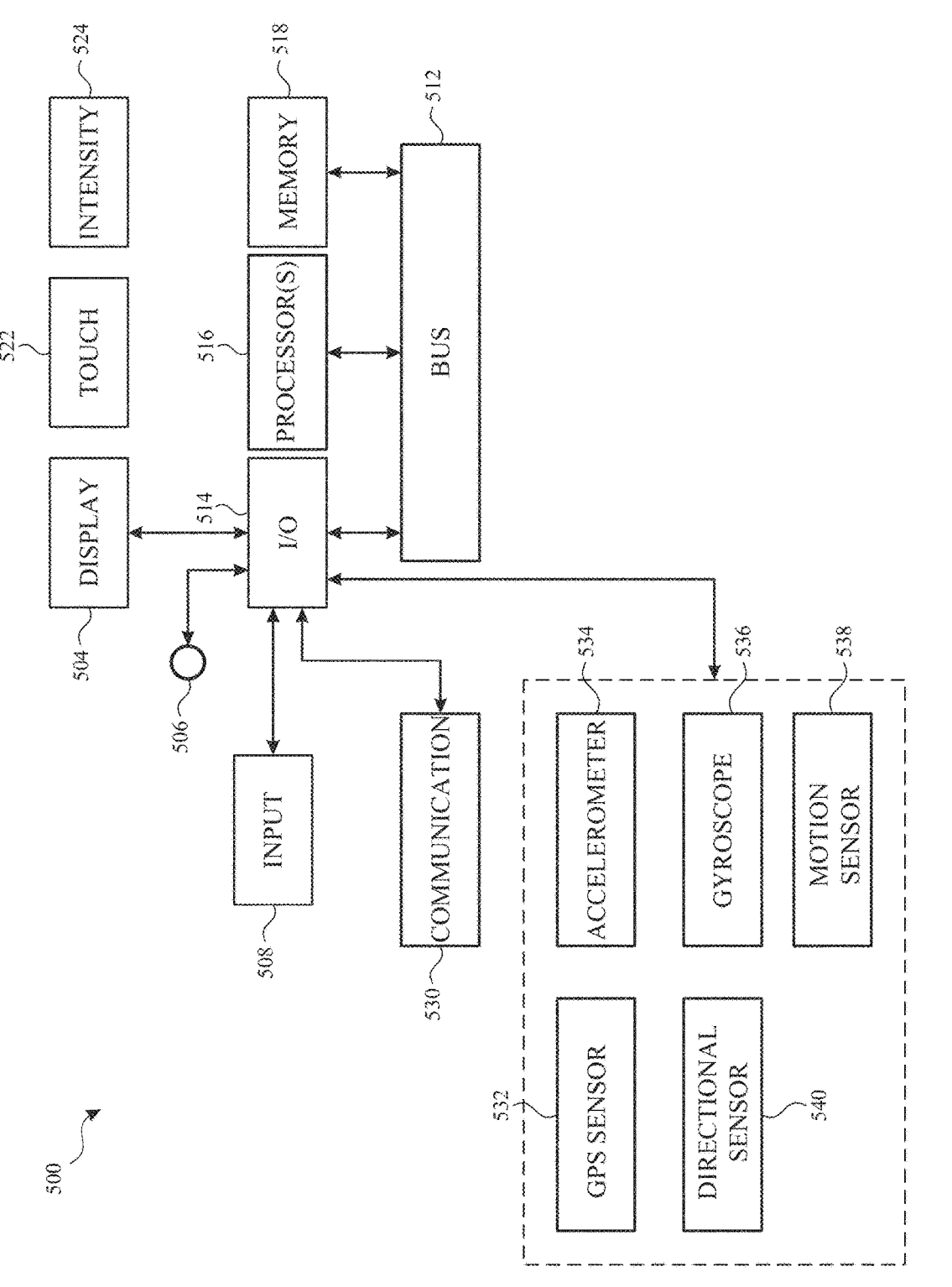
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage media, for storing computer-executable instructions, which, when executed by one or more computer processors 516, for example, can cause the computer processors to perform the techniques described below, including methods 700, 900, 1100, 1300, 1500, 1700, 1900, 2100 and 2300 (FIGS. 7, 9, 11, 13, 15, 17, 19, 21, and 23). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or

500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
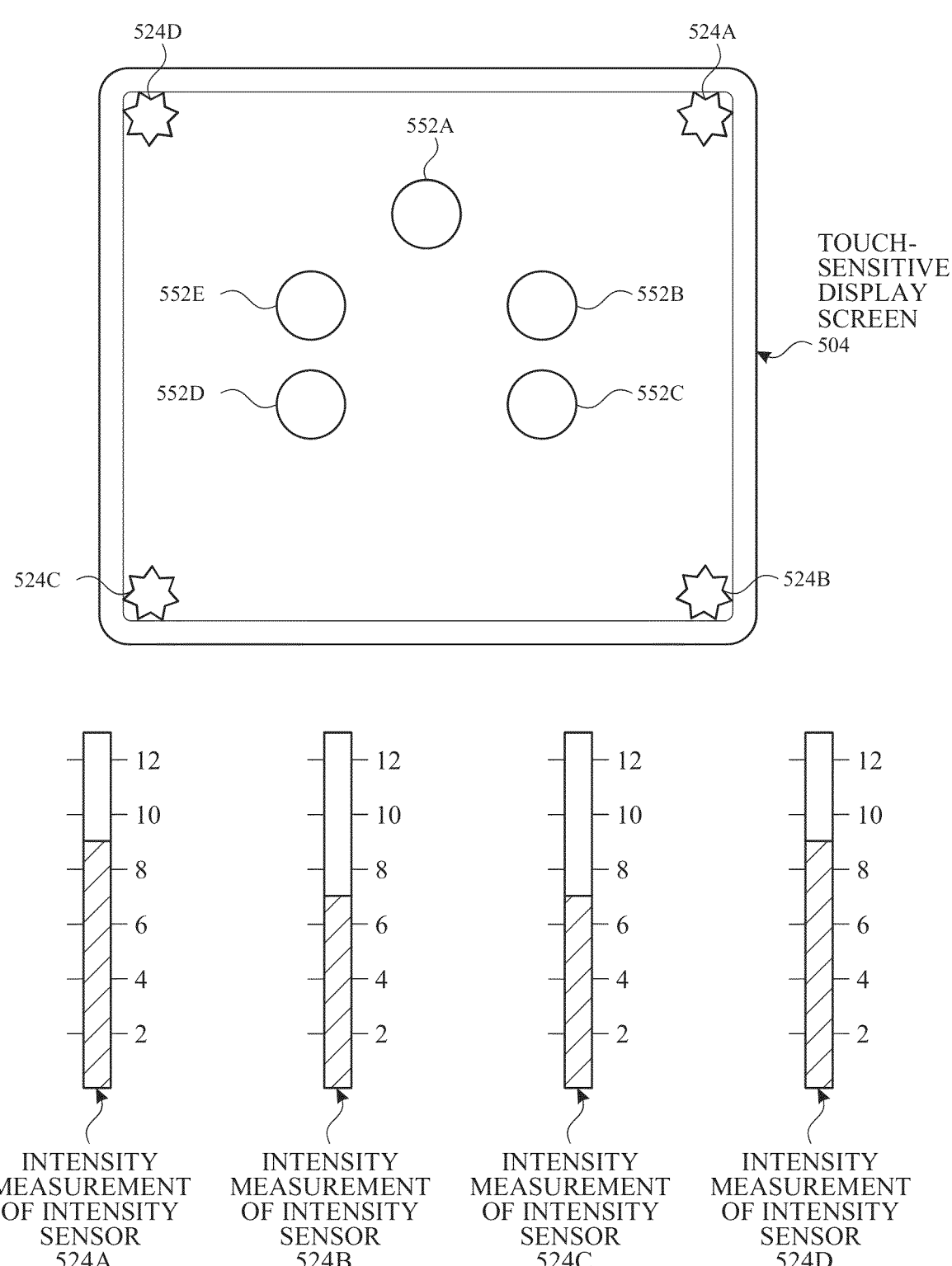
FIGS. 5C-5D illustrate exemplary components of a personal electronic device having a touch-sensitive display and intensity sensors in accordance with some embodiments.
Figure 5D:
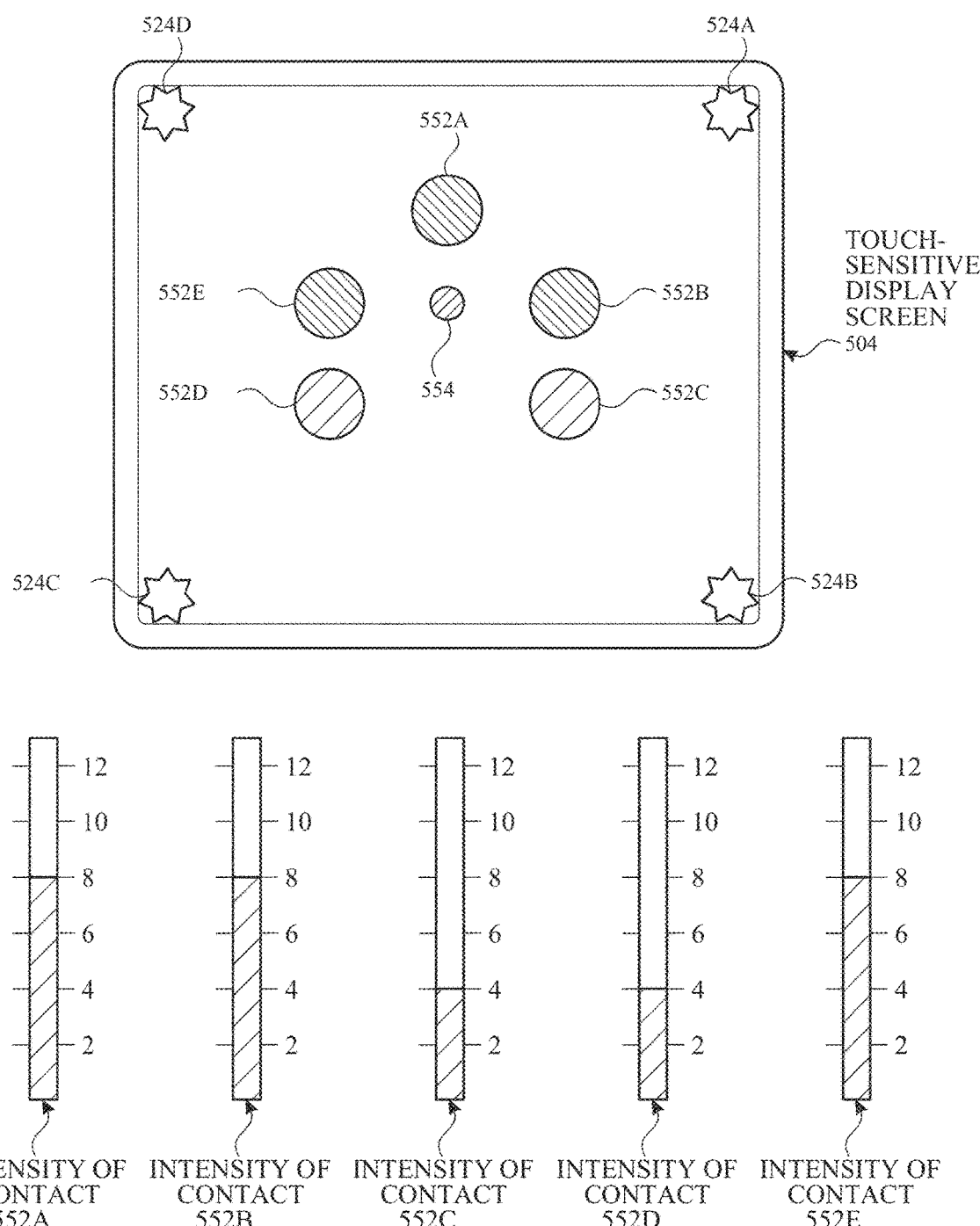

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5F:
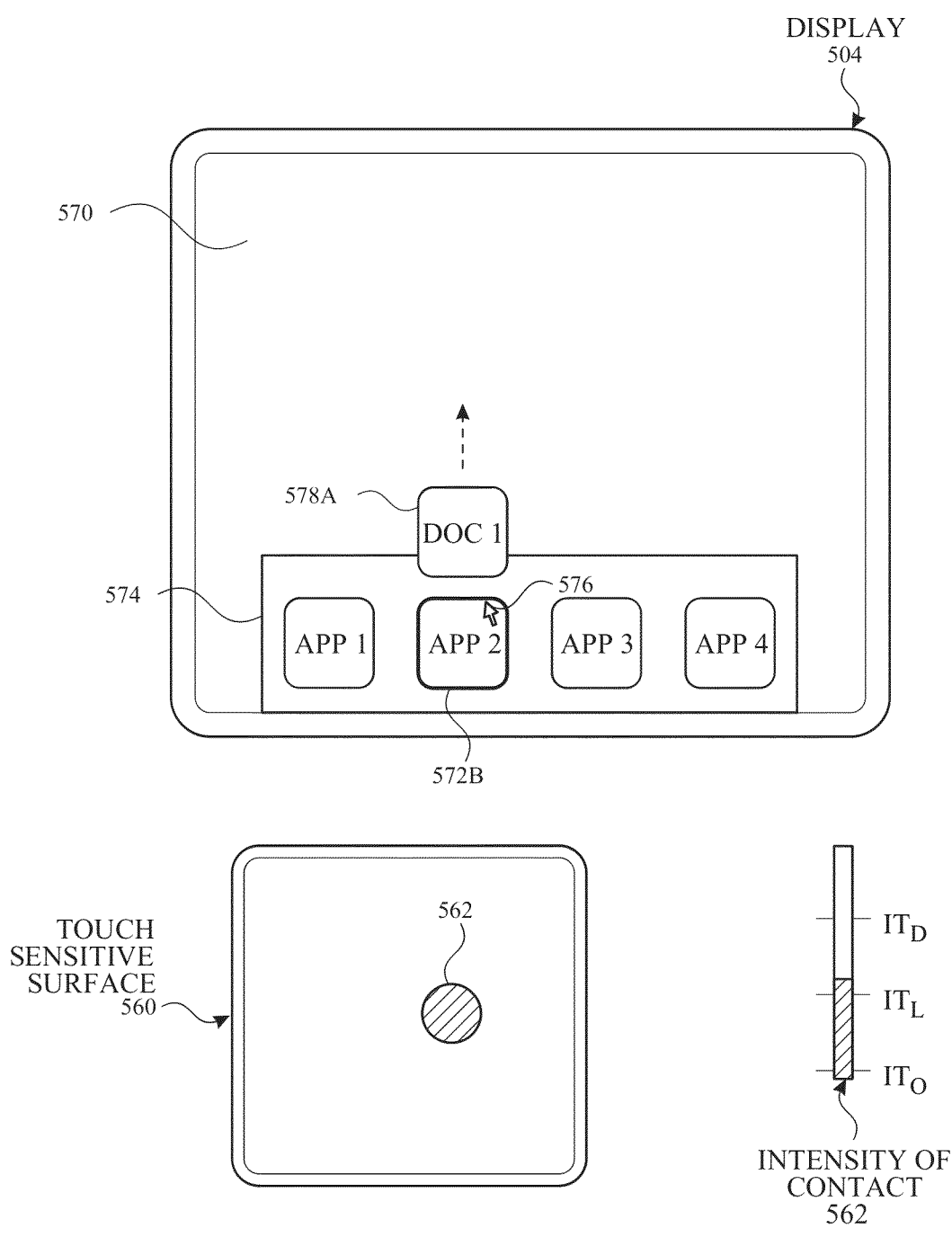
Figure 5G:
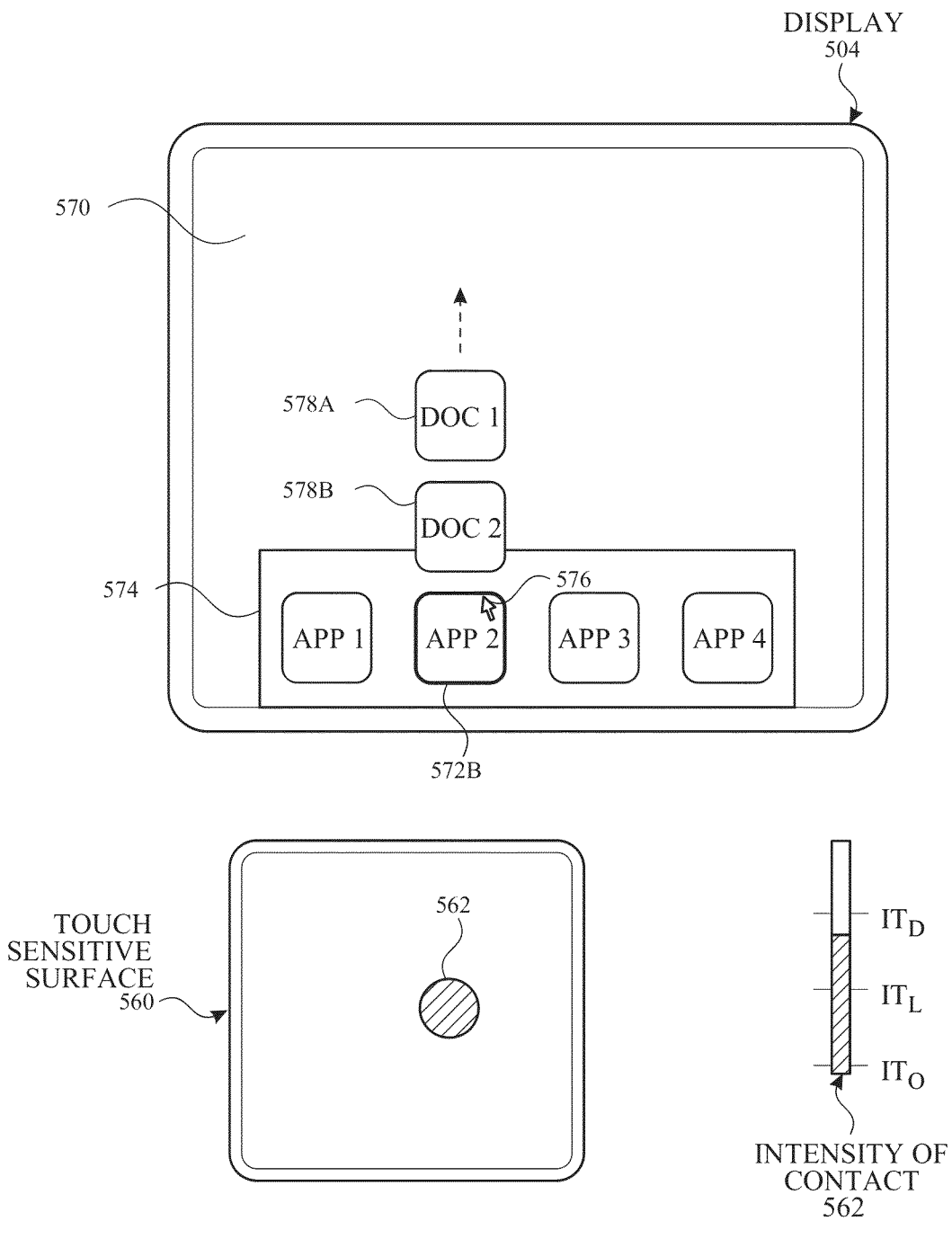
Figure 5H:
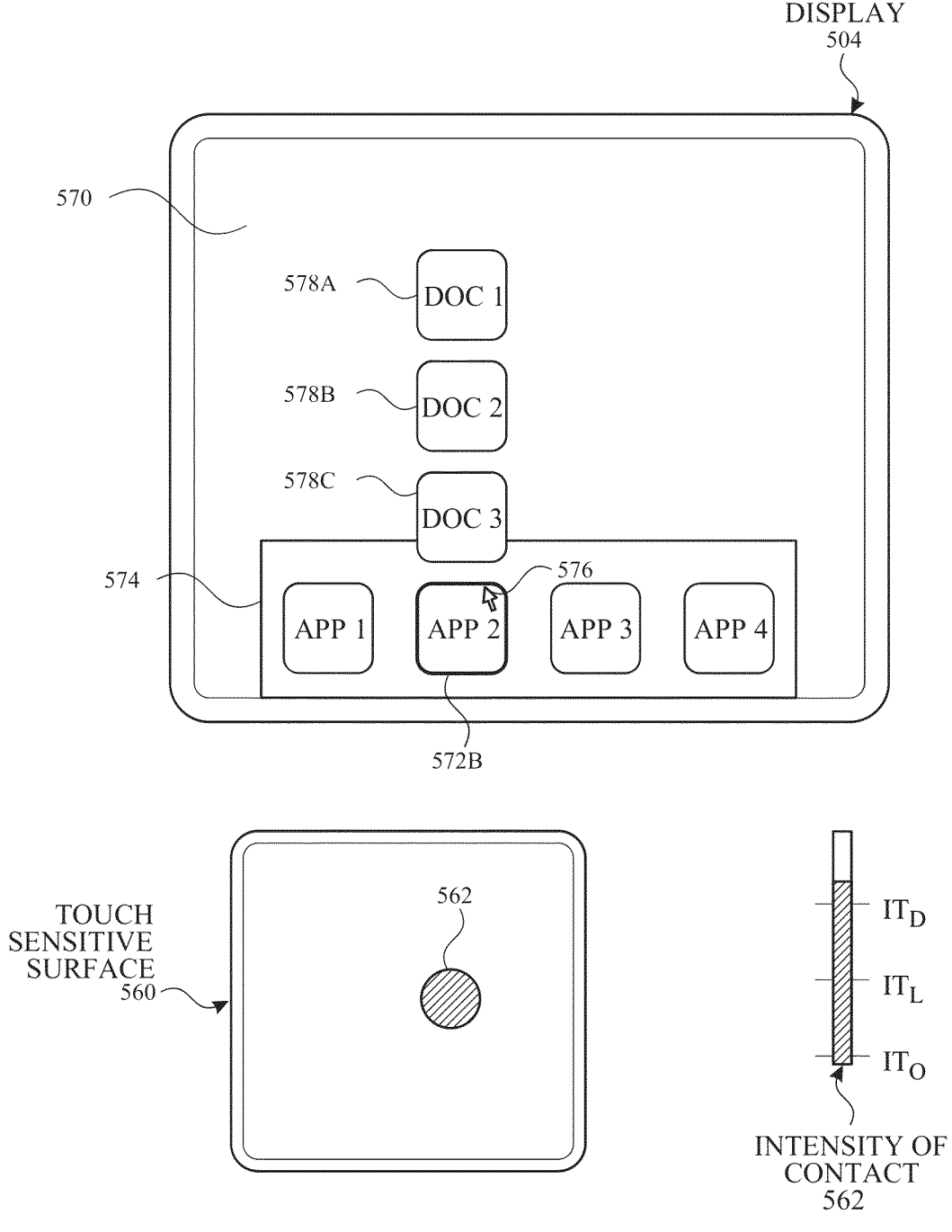

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT$_D$"). Contact 562 is maintained on touch-sensitive surface 560. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT$_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6U illustrate exemplary user interfaces for controlling capture of media with associated depth information, in accordance with some embodiments. The user interfaces in these figures are used to illustrate the processes described below, including the processes in FIG. 7.

FIGS. 6A-6B illustrate computer system 600 (e.g., a mobile phone device), viewed from the back (e.g., FIG. 6A) and from the front (e.g., FIG. 6B). Computer system 600 includes display 608 and a plurality of cameras, including first camera 604A, visible on its front side, as seen in FIG. 6B, second camera 604B, third camera 604C, and fourth camera 604D visible on the backside of the device, as seen in FIG. 6A. In some embodiments, the plurality of cameras have (e.g., in a fixed and/or variable/configurable manner) different optical specifications, such as different focal lengths (e.g., 24 mm, 35 mm, and/or 55 mm), different aperture sizes (e.g., f/1.8, f/2.4, and/or f/8), and/or different fields of view (e.g., 46°, 84°, and/or 120°). Computer system 600 includes a plurality of input devices, including hardware button 606 and a touch-sensitive surface of display 608. In some embodiments, computer system 600 includes one or more sensors, such as light sensors and/or depth sensors. In some embodiments, computer system 600 includes one or more hardware input ports, such as Mini USB, Micro USB, and/or USB-C ports. In some embodiments, the methods described herein using computer system 600 are implemented using (e.g., in conjunction with computer system 600) one or more user devices (e.g., mobile phones, tablet computers, laptop computers, and/or wearable electronic devices (e.g., smart watches)), remote devices (e.g., servers and/or network-connected devices), and/or peripheral devices (e.g., external storage drives, microphones, speakers, and/or hardware input devices). In some embodiments, computer system 600 includes one or more features of devices 100, 300, or 500 (e.g., first camera 604A is optical sensor 164).

At FIG. 6B, computer system 600 displays, via display 608, camera user interface 610 (e.g., a user interface for media capture, e.g., using a camera application). Camera user interface 610 includes camera preview 612, which represents the portion of the field-of-view of at least one of first camera 604A, second camera 604B, third camera 604C, and fourth camera 604D that would currently be included (e.g., captured) in a media capture. As illustrated in FIG. 6A, the portion of the field-of-view of the cameras currently included in camera preview 612 captures a portion of the physical environment including a dog and a cat in the midground and a fence and the sky in the background. In some embodiments, computer system 600 detects additional information about the physical environment. For example, using one or more depth sensors and/or by comparing the fields-of-view of first camera 604A, second camera 604B, and/or third camera 604C, computer system 600 can obtain depth information about the physical environment, such as the distance of the dog and cat to computer system 600.

Camera user interface 610 further includes flash affordance 614, media format affordance 616, multi-frame photo affordance 618, zoom affordance 620, capture mode menu 622, shutter affordance 624, and captured media icon 626. As indicated by zoom affordance 620, the zoom level is set to 0.5× magnification (e.g., an ultra wide-angle zoom setting), and as indicated by capture mode menu 622, the current capture mode is a photo capture mode.

At FIG. 6B, computer system 600 detects input 627 (e.g., a tap input via a touch-sensitive surface of display 608) on zoom affordance 620 requesting to increase the zoom level. In response to input 627, at FIG. 6C, computer system 600 sets the zoom level to 2× magnification, zooming camera preview 612 in on the physical environment, such that the dog and cat appear in the foreground of camera preview 612. At the zoom level of 2× magnification, computer system 600 detects the cat and dog as media capture subjects and indicates the detection with subject indicators 628A and 628B, framing the faces of the cat and dog (respectively). Because the current zoom level has increased beyond 1× magnification and the cat and dog (e.g., the media capture subjects) are determined (e.g., based on the obtained depth information) to be within a particular distance range (e.g., 2-8 feet from computer system 600), computer system 600 displays depth indicator 630. Depth indicator 630 indicates that computer system 600 is capturing depth information (e.g., using the one or more sensors) for use in capturing media.

Figures 6C, 6D:
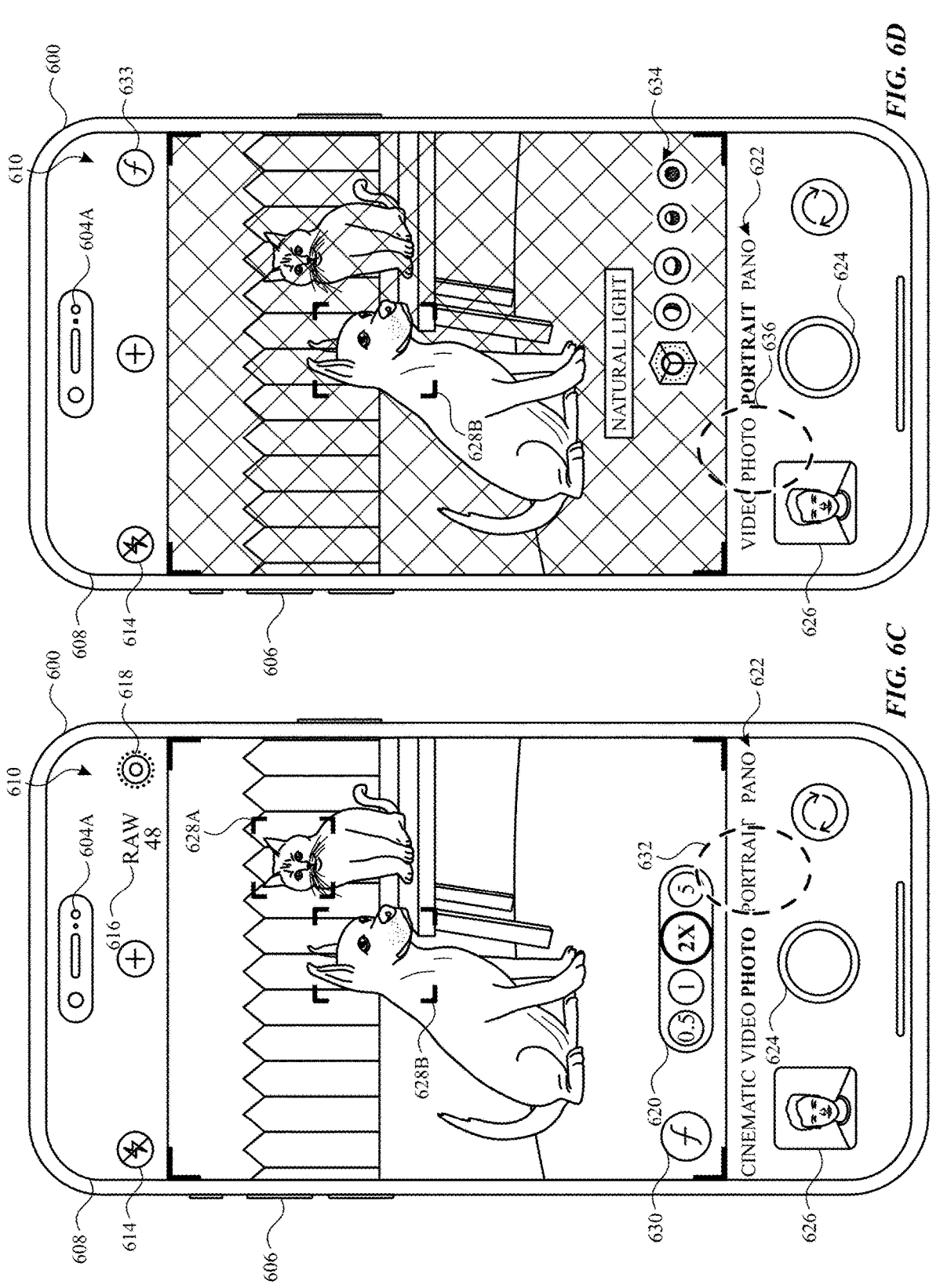

At FIG. 6C, computer system detects input 632 (e.g., a tap input via a touch-sensitive surface of display 608) selecting a "portrait" capture mode (e.g., a photo capture mode where content-aware simulated visual effects (e.g., depth effects) are applied to captured media) from capture mode menu 622. In response to input 632, at FIG. 6D, computer system 600 displays camera preview 612 with a simulated depth-of-field effect (e.g., simulated bokeh) based on obtained depth information about the physical environment, causing the physical environment to appear less in focus (e.g., blurrier) the farther it is from a plane of focus and to appear more in focus (e.g., sharper) the closer it is to a plane of focus. As illustrated in FIG. 6D, with the simulated depth-of-field effect applied to camera preview 612, the dog appears in focus, while the portions of the environment in front of and behind the dog (e.g., further from the plane of focus), including the cat and the fence, are blurred (e.g., represented in FIG. 6D and elsewhere by crosshatching). Although the crosshatching representing the blurring effect in these figures appears uniform, it is to be understood that portions of the environment further away from the plane of focus are blurred more than portions of the environment closer to the plane of focus (e.g., in FIG. 6D, the fence would appear blurrier than the cat). In some embodiments, the simulated depth-of-field effect simulates the depth-of-field of a particular aperture setting (e.g., an f-stop value, which defines a ratio between the focal length of a photographic lens and the aperture diameter, such as f/1.4, f/2.8, or f/8), and computer system 600 displays f-stop affordance 633, which can be selected to adjust the aperture setting in the portrait capture mode (e.g., similarly to the adjustment of the aperture setting described in more detail below). The extent to which the focus decreases (e.g., the extent to which the appearance blurs) as the distance from the plane of focus increases is proportionally greater for lower f-stop values (e.g., f/1.4) than for higher f-stop values (e.g., f/8) (e.g., the lower the f-stop, the more dramatically distance affects blurring). Additionally, in the portrait capture mode, computer system displays lighting effect menu 634 (e.g., a menu for selecting a simulated lighting effect to apply).

At FIG. 6D, computer system 600 detects input 636 (e.g., a tap input via a touch-sensitive surface of display 608) selecting the photo capture mode from capture mode menu 622. In response to input 636, at FIG. 6E, computer system

600 displays camera user interface 610 as described with respect to FIG. 6B, including displaying camera preview 612 without the simulated depth-of-field effect applied and displaying depth indicator 630.

Figures 6E, 6F:
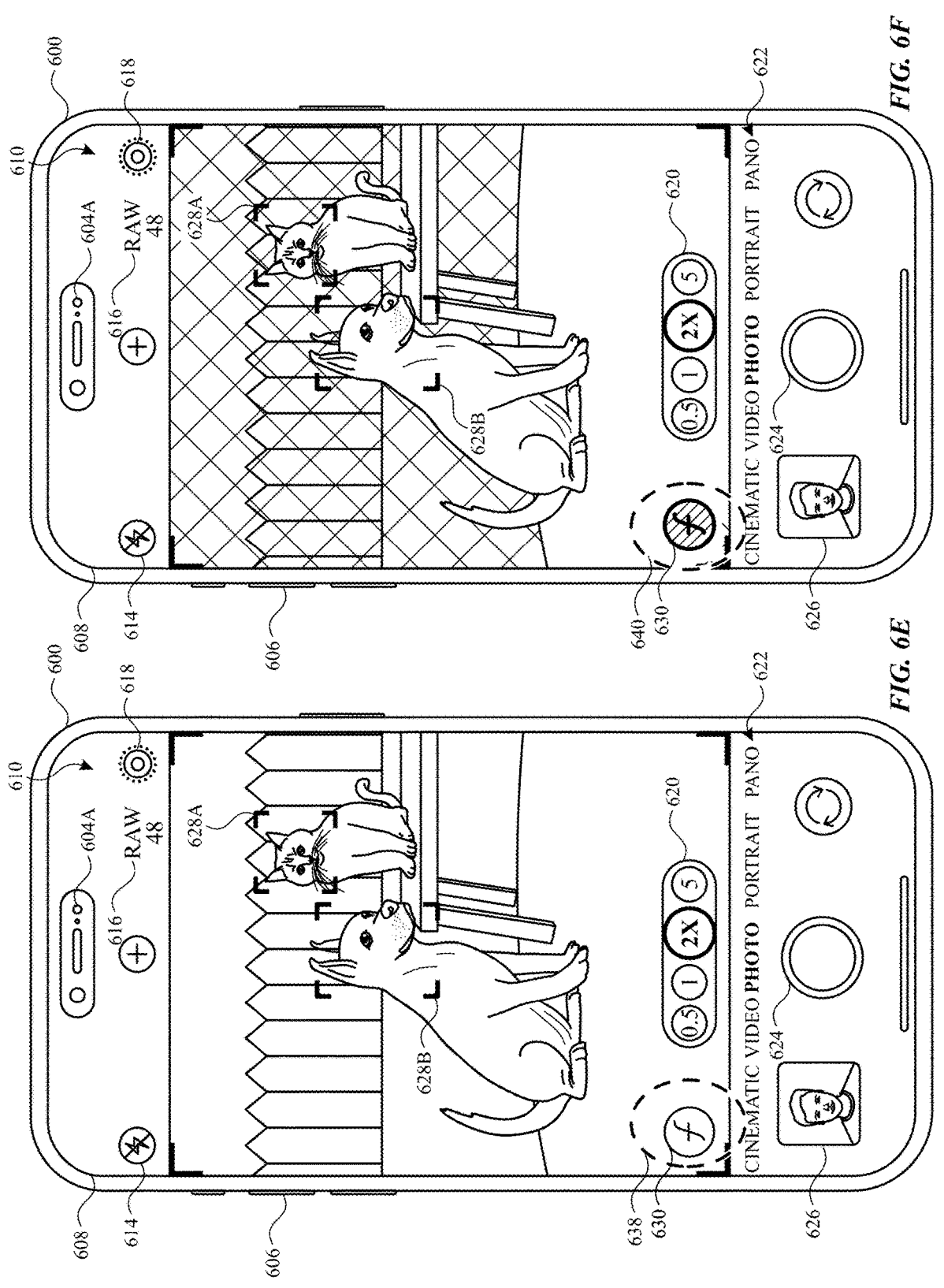

At FIG. 6E, computer system 600 detects input 638 selecting depth indicator 630. For example, input 638 includes a short tap and/or click input via a touch-sensitive surface of display 608, as described in further detail with respect to FIGS. 8A-8T And FIG. 9, below. In response to input 638, at FIG. 6F, computer system 600 displays camera preview 612 with a simulated depth-of-field effect, while still in the photo capture mode. As illustrated in FIG. 6F, with the simulated depth-of-field effect applied to camera preview 612, the dog and cat appear in focus, while portions of the environment in front of and/or behind the dog and cat (e.g., further from the plane of focus) are blurred. For example, the simulated depth-of-field effect applied to camera preview 612 simulates an aperture setting of f/2.8. Additionally, in response to input 638, computer system 600 updates the appearance of depth indicator 630, for example, changing the color, shading, and/or visual emphasis of depth indicator 630 (e.g., represented in FIG. 6F and elsewhere by shading) to indicate that depth indicator 630 is selected.

Figures 6G, 6H:
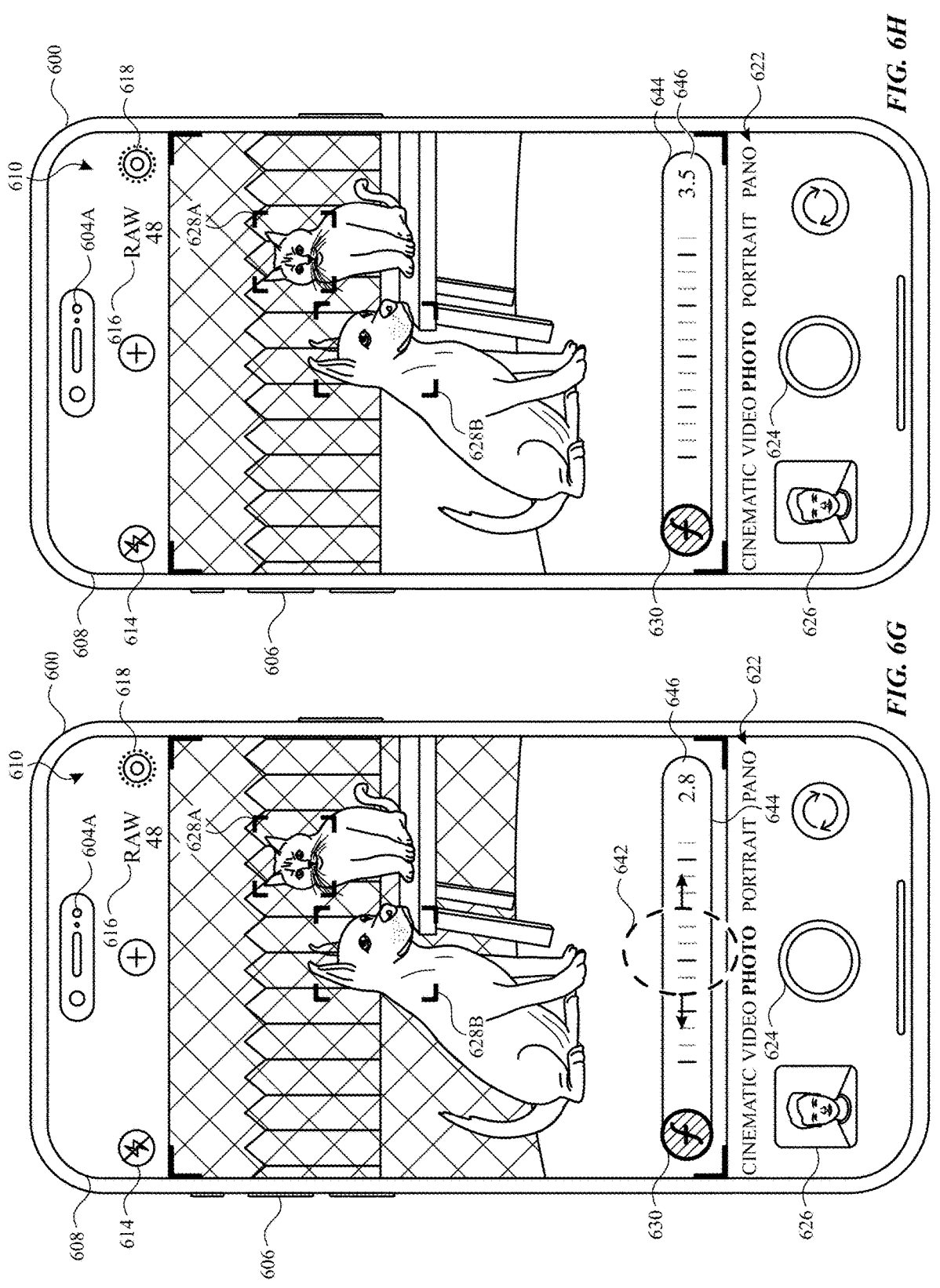

At FIG. 6F, computer system 600 detects input 640 selecting depth indicator 630. For example, input 640 includes a long press input via a touch-sensitive surface of display 608, as described in further detail with respect to FIGS. 8A-8T and FIG. 9, below. In response to input 640, at FIG. 6G, computer system 600 displays aperture setting slider 644. In some embodiments, computer system 600 displays (e.g., animates) aperture setting slider 644 expanding out from depth indicator 630. As illustrated in FIG. 6G, while displaying aperture setting sider 644, computer system 600 ceases displaying zoom affordance 620. Aperture setting slider 644 includes aperture setting indicator 646, which indicates that the current simulated aperture setting is f/2.8. In some embodiments, computer system 600 ceases displaying aperture setting slider 644 following detection of a finger-up (liftoff) event of input 640 after a threshold period of time without detecting an input on aperture setting slider 644. In some embodiments, computer system 600 ceases displaying aperture setting slider 644 in response to detecting an input at a location other than the location of aperture setting slider 644.

Figures 6I, 6J:
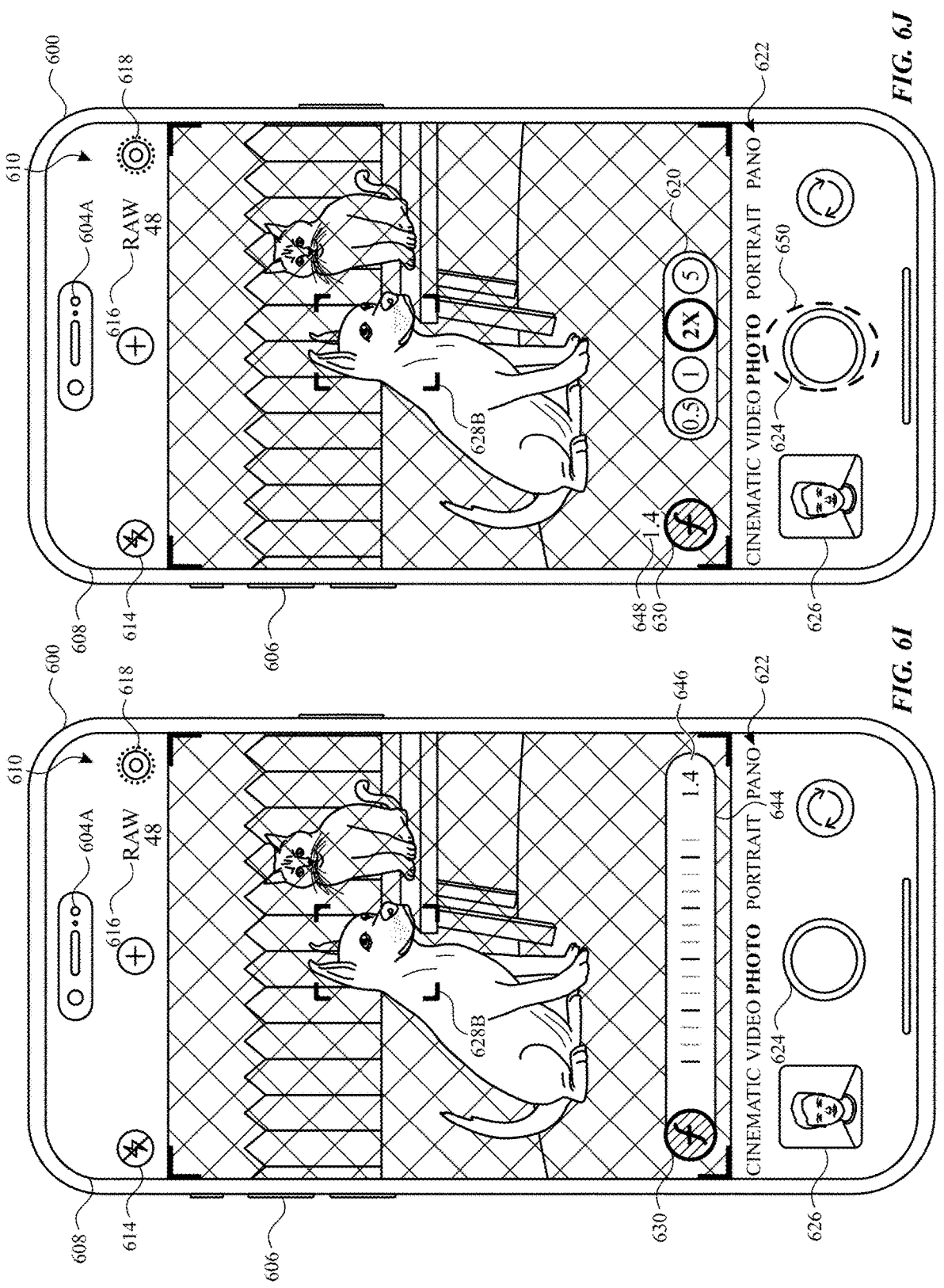

At FIG. 6G, computer system 600 detects input 642 (e.g., a drag and/or gesture input via a touch-sensitive surface of display 608) adjusting the aperture setting via aperture setting slider 644. In some embodiments, in response to dragging input 642 to the left, computer system 600 increases the f-stop value of the aperture setting. For example, as illustrated in FIG. 6H, computer system 600 increases the current simulated aperture setting to f/3.5, as indicated by aperture setting indicator 646. Applying the simulated depth-of-field effect to camera preview 612 with a simulated aperture setting of f/3.5, computer system 600 displays camera preview 612 with the dog, cat, and some of the background in focus, while still blurring the sky and fence. In some embodiments, in response to dragging input 642 to the right, computer system 600 decreases the f-stop value of the aperture setting. For example, as illustrated in FIG. 6I, computer system 600 decreases the current simulated aperture setting to f/1.4, as indicated by aperture setting indicator 646. Applying the simulated depth-of-field effect to camera preview 612 with a simulated aperture setting of f/1.8, computer system 600 displays camera preview 612 with the dog in focus, but the cat, fence, and other portions of the background and foreground blurred. In some embodiments, aperture setting slider 644 represents a plurality of f-stop values. For example, the tick marks of aperture setting slider 644 may represent discrete f-stop values within an overall aperture size range (e.g., steps in a range from f/1.4 to f/32). In some embodiments, computer system 600 determines the adjusted aperture setting (e.g., f-stop value) based on a distance (e.g., a net and/or normalized distance) traveled by input 642. For example, the aperture setting can be adjusted from f/2.4 to f/3.5 using a drag to the left of a distance corresponding to a distance between a tick mark representing f/2.4 and a tick mark representing f/3.5, and the aperture setting can be adjusted from f/2.4 to f/1.8 using a drag to the right of a distance corresponding to a distance between the tick mark representing f/2.4 and a tick mark representing f/1.8.

As illustrated in FIG. 6J, once input 642 is released (e.g., lifted from the touch-sensitive surface of display 608), computer system 600 ceases displaying aperture setting slider 644 and displays depth indicator 630 with aperture setting indicator 648, which indicates the adjusted aperture setting value (e.g., f/1.4). In some embodiments, aperture setting indicator 648 is displayed within depth indicator 630. As depth indicator 630 remains selected, computer system 600 continues displaying camera preview 612 with the simulated depth-of-field as described with respect to FIG. 6I (e.g., simulating the adjusted f-stop value of f/1.4).

Figures 6K, 6L:
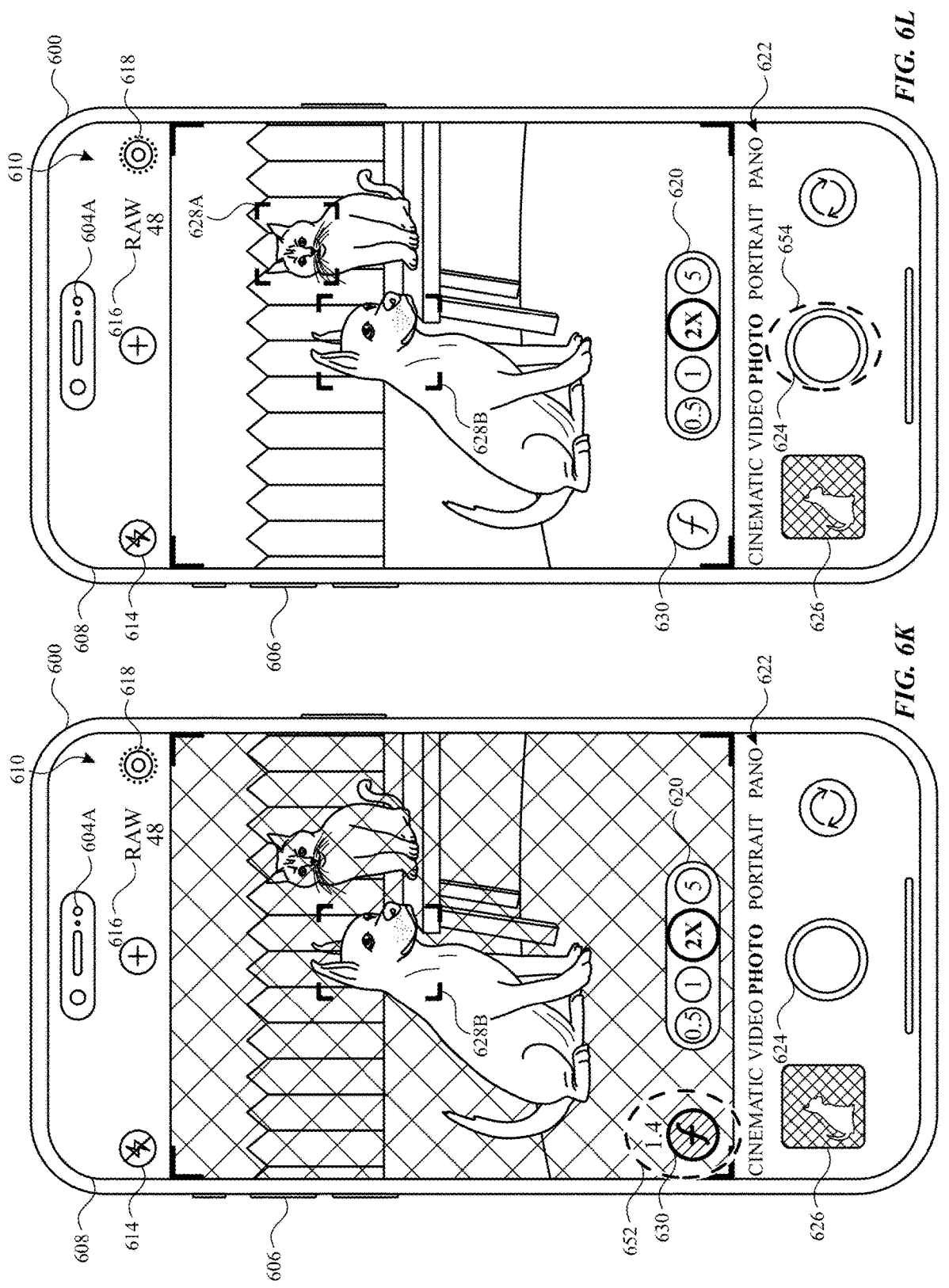

At FIG. 6J, computer system 600 detects input 650 (e.g., a tap input via a touch-sensitive surface of display 608; in some embodiments, input 650 can include a press of hardware buttons 606) on shutter affordance 624. In response to detecting input 650, computer system 600 initiates media capture with the currently-selected capture settings, including the simulated depth-of-field effect with the simulated aperture setting of f/1.4. As illustrated in FIG. 6K, after capturing media, computer system 600 updates captured media icon 626 to show a thumbnail of the captured media. The simulated depth-of-field effect that was applied to the captured media is visible in the thumbnail shown in captured media icon 626.

At FIG. 6K, computer system 600 detects input 652 (e.g., a short tap input via a touch-sensitive surface of display 608, as described with respect to input 638) selecting depth indicator 630. In response to detecting input 652, at FIG. 6L, computer system 600 ceases displaying camera preview 612 with the simulated depth-of-field effect. However, because the current zoom level remains above 1× magnification and the cat and dog are still within a particular distance range (e.g., as described with respect to FIG. 6C), computer system 600 continues to display depth indicator 630, indicating that computer system 600 is still capturing depth information. Additionally, in response to input 652, computer system 600 updates the appearance of depth indicator 630, for example, changing the color, shading, and/or visual emphasis of depth indicator 630 (e.g., reverting the changes in appearance described with respect to FIG. 6F) to indicate that depth indicator 630 is deselected.

Figures 6M, 6N:
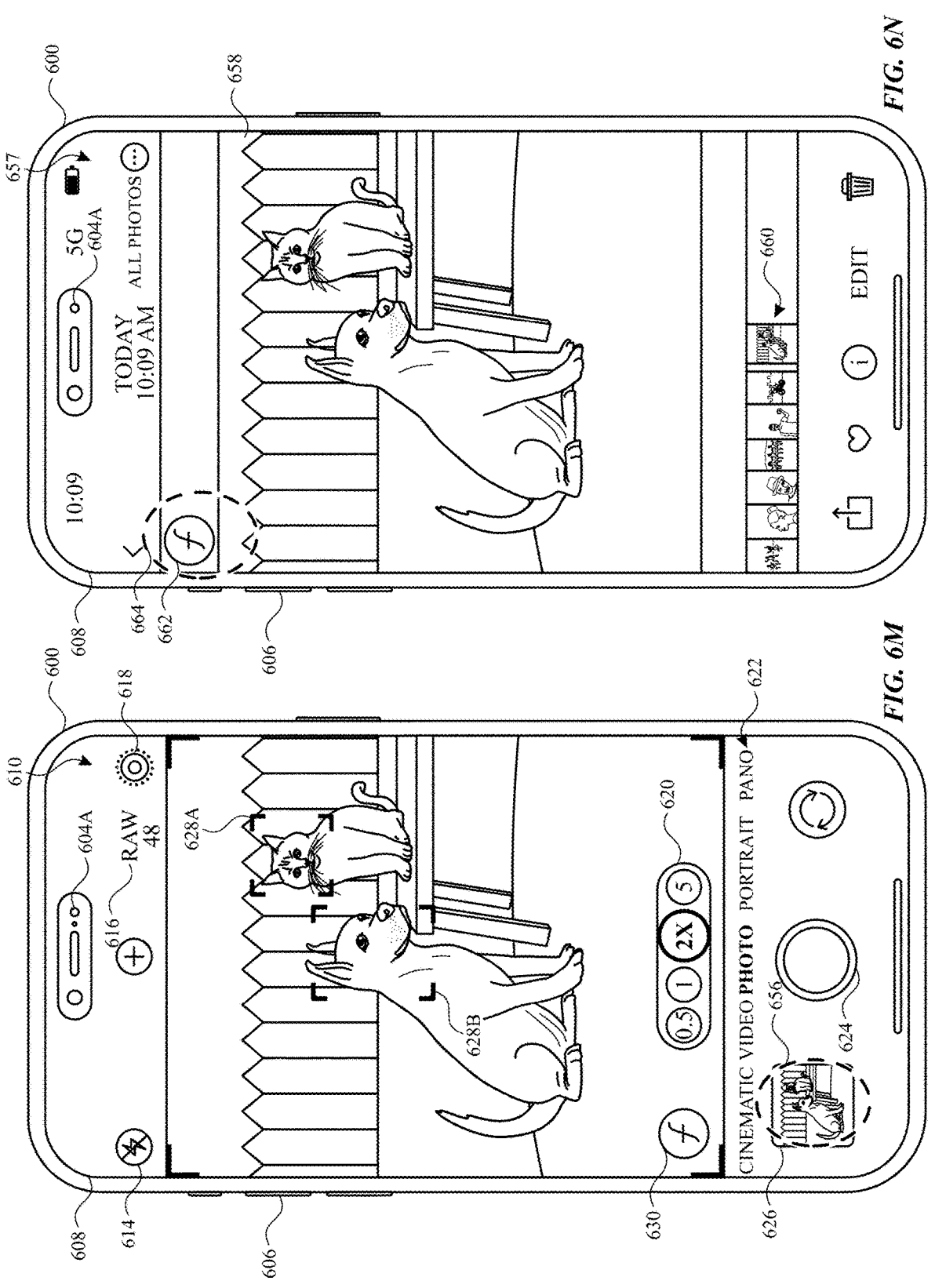

At FIG. 6L, computer system 600 detects input 654 (e.g., a tap input via a touch-sensitive surface of display 608; in some embodiments, input 650 can include a press of hardware buttons 606) on shutter affordance 624. In response to detecting input 654, computer system 600 initiates media capture with the currently-selected capture settings. As illustrated in FIG. 6M, after capturing media, computer system 600 updates captured media icon 626 to show a thumbnail of the captured media. As depth indicator 630 was deselected and the simulated depth-of-field effect was not applied to camera preview 612 when the media capture was performed, the thumbnail of the captured media does not appear with a simulated depth-of-field effect.

At FIG. 6M, computer system 600 detects input 656 (e.g., a tap input via a touch-sensitive surface of display 608) on captured media icon 626. In response to detecting input 656, at FIG. 6N, computer system 600 displays media user interface 657, including captured media 658 (e.g., the media captured in response to input 654 at FIG. 6L) and captured media roll 660, which includes a thumbnail of captured media 658. As depth indicator 630 was displayed in camera user interface 610 when the media capture was performed (e.g., indicating that depth information was being captured), computer system 600 displays media user interface 657 including f-stop affordance 662. As depth indicator 630 was deselected and the simulated depth-of-field effect was not applied to camera preview 612 when the media capture was performed, captured media 658 is displayed without a simulated depth-of-field effect (e.g., both in the larger view of captured media 658 and in the thumbnail of captured media 658 in captured media roll 660) and f-stop affordance 662 is displayed with a deselected appearance (e.g., as described with respect to the appearance of depth indicator 630 in FIG. 6L).

Figures 6O, 6P:
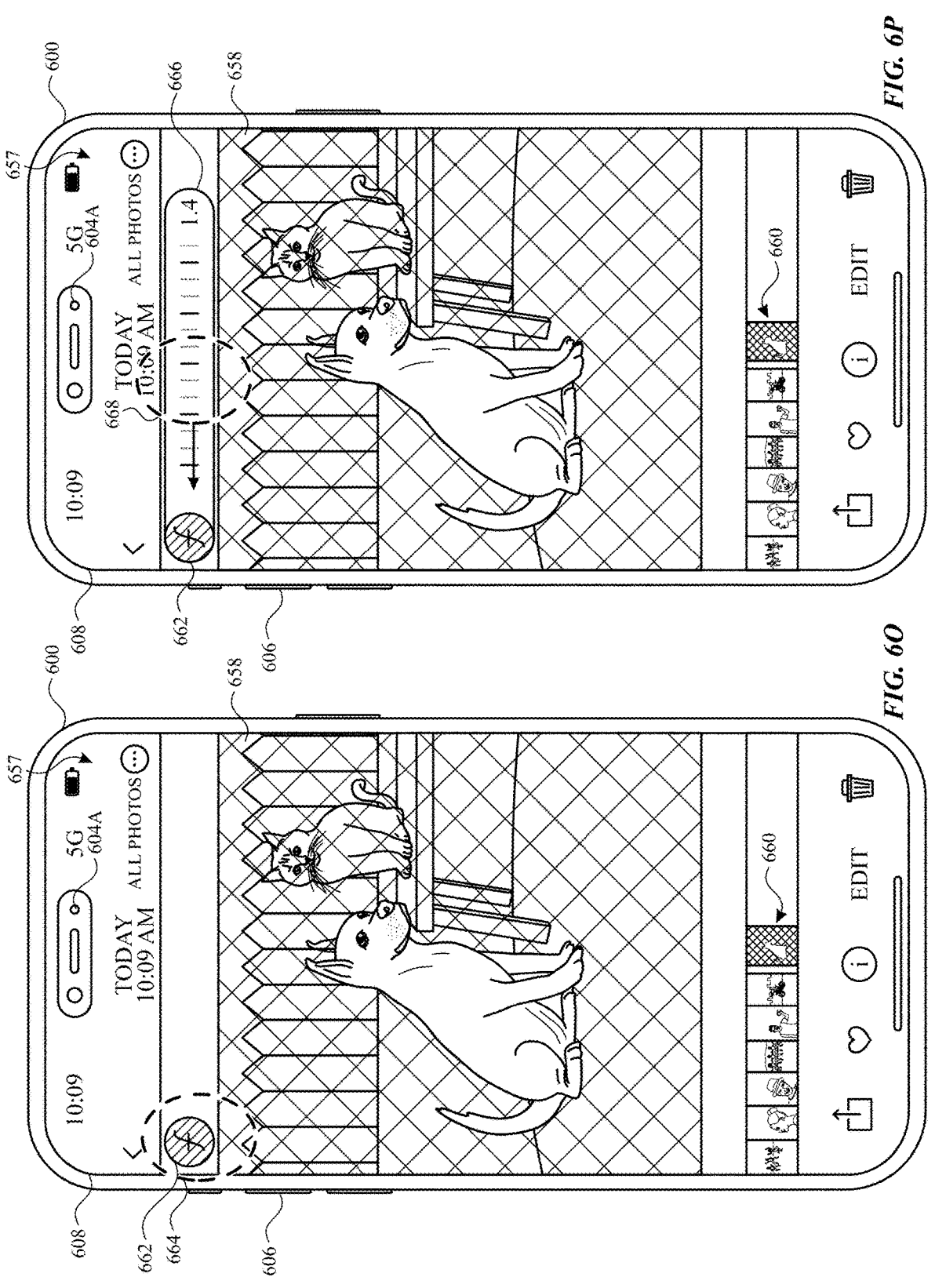

At FIG. 6N, computer system 600 detects input 664 selecting f-stop affordance 662. For example, input 664 includes a short tap and/or click input via a touch-sensitive surface of display 608, as described in further detail with respect to FIGS. 8A-8T And FIG. 9, below. In response to input 664, at FIG. 6O, computer system 600 displays captured media 658 with a simulated depth-of-field effect. As illustrated in FIG. 6O, the simulated depth-of-field effect is applied to captured media 658 with a simulated aperture setting of f/1.4, the simulated f-stop value selected (e.g., at FIG. 6H) before depth indicator 630 was deselected (e.g., at FIG. 6K), such that the dog appears in focus while the cat, background, and foreground farther away from the dog are blurred. The simulated depth-of-field effect is also applied to the thumbnail of captured media 658 in captured media roll 660. Additionally, in response to input 664, computer system 600 updates the appearance of f-stop affordance 662, for example, changing the color, shading, and/or visual emphasis of depth indicator 630 (e.g., represented in FIG. 6F and elsewhere by shading) to indicate that depth indicator 630 is selected.

At FIG. 6O, computer system detects input 664 selecting f-stop affordance 662. For example, input 664 includes a long press input via a touch-sensitive surface of display 608, as described in further detail with respect to FIGS. 8A-8T And FIG. 9, below. In response to input 664, at FIG. 6P, computer system 600 displays aperture setting menu 666, which indicates that the current simulated aperture setting is f/1.4. At FIG. 6P, computer system 600 detects input 668 (e.g., a drag and/or gesture input via a touch-sensitive surface of display 608) adjusting the aperture setting via aperture setting menu 666 (e.g., as described with respect to FIGS. 6G-6I).

Figures 6Q, 6R:
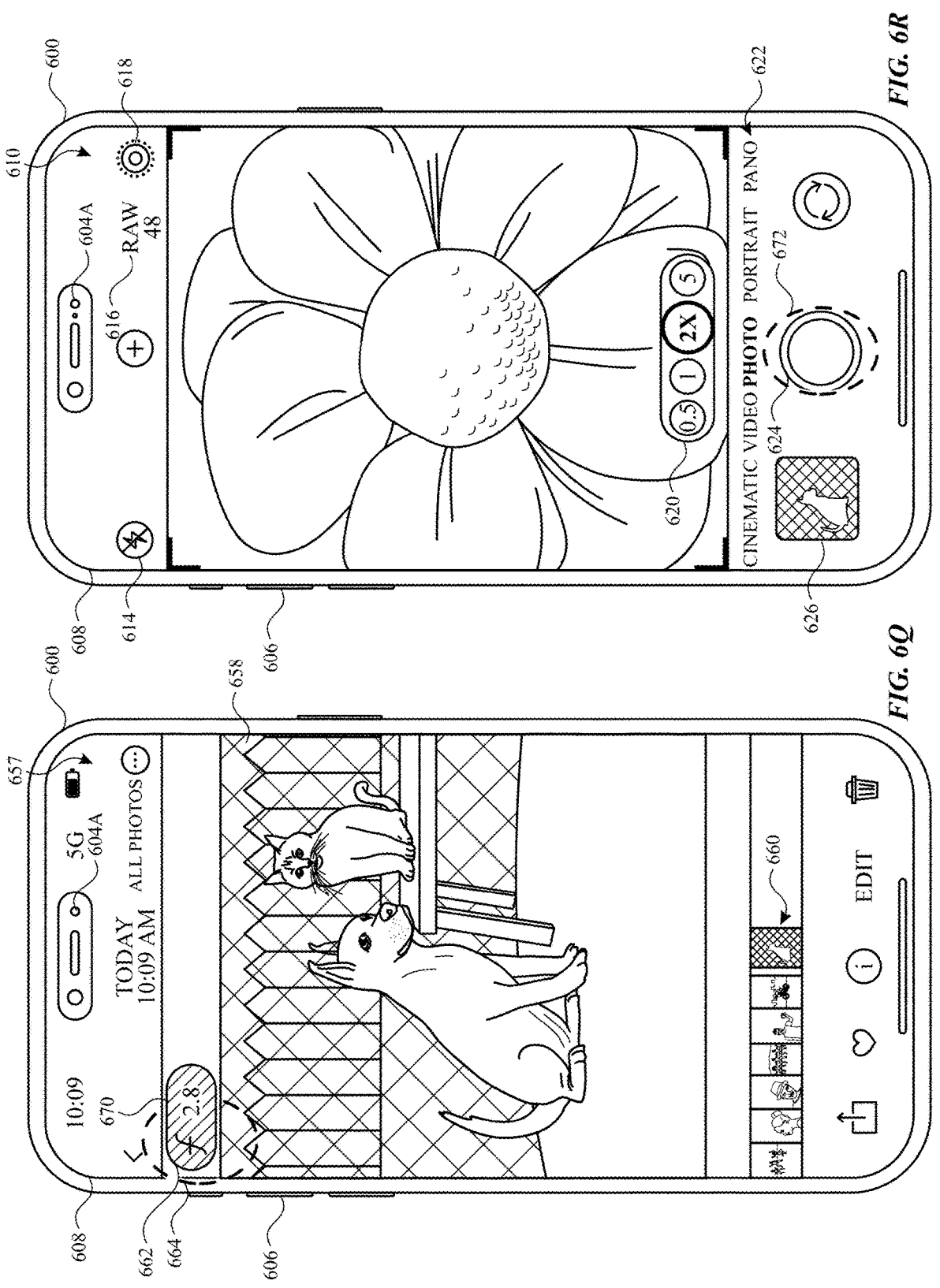

As illustrated in FIG. 6Q, once input 668 is released (e.g., lifted from the touch-sensitive surface of display 608), computer system 600 ceases displaying aperture setting menu 666 and displays f-stop affordance 662 with aperture setting indicator 670, which indicates the adjusted aperture setting value (e.g., f/2.8). In some embodiments, computer system 600 ceases displaying aperture setting indicator 670 after a predetermined period of time without an input. In response to the release of input 668, computer system 600 updates the simulated depth-of-field effect applied to captured media 658 to reflect the adjusted simulated aperture setting of f/2.8. As illustrated in FIG. 6Q, with the simulated depth-of-field effect applied to captured media 658, the dog and cat appear in focus, while portions of the environment in front of and/or behind the dog and cat (e.g., further from the plane of focus) are blurred.

At FIG. 6R, computer system 600 displays camera user interface 610 including camera preview 612. As illustrated in FIG. 6R, the portion of the field-of-view of the cameras currently included in camera preview 612 captures a portion of the physical environment including a flower, which takes up most of the area of camera preview 612. Although the current zoom level is at least 1× magnification, because a particular subject (e.g., a person, animal, and/or other pre-determined type of content) is not determined be within a particular distance range (e.g., 2-8 feet from computer system 600), computer system 600 does not display depth indicator 630, indicating that depth information is not being captured. At FIG. 6R, computer system 600 detects input 672 (e.g., a tap input via a touch-sensitive surface of display 608; in some embodiments, input 650 can include a press of hardware buttons 606) on shutter affordance 624, and in response, initiates media capture.

Figures 6S, 6T:
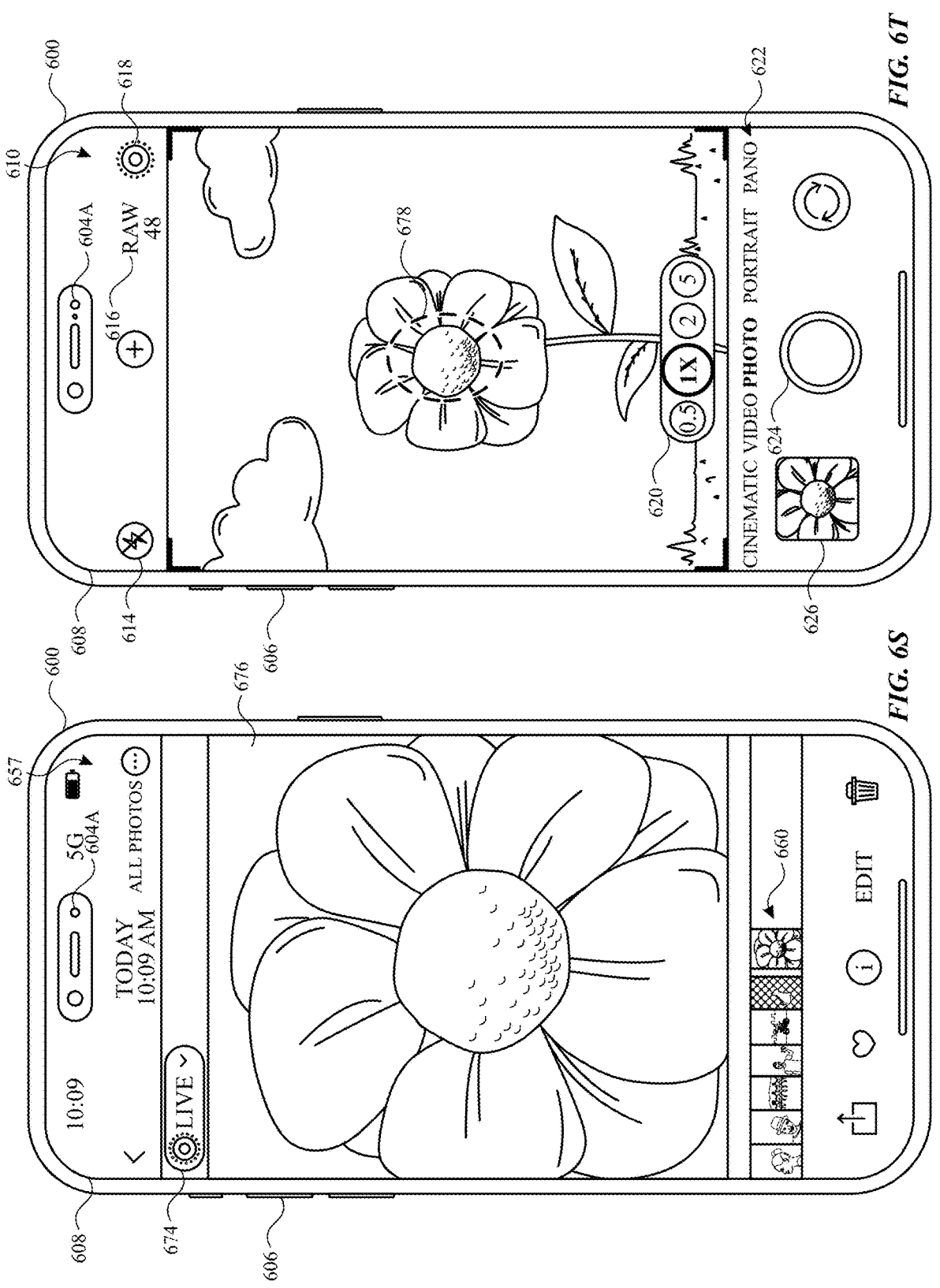
Figure 6U:
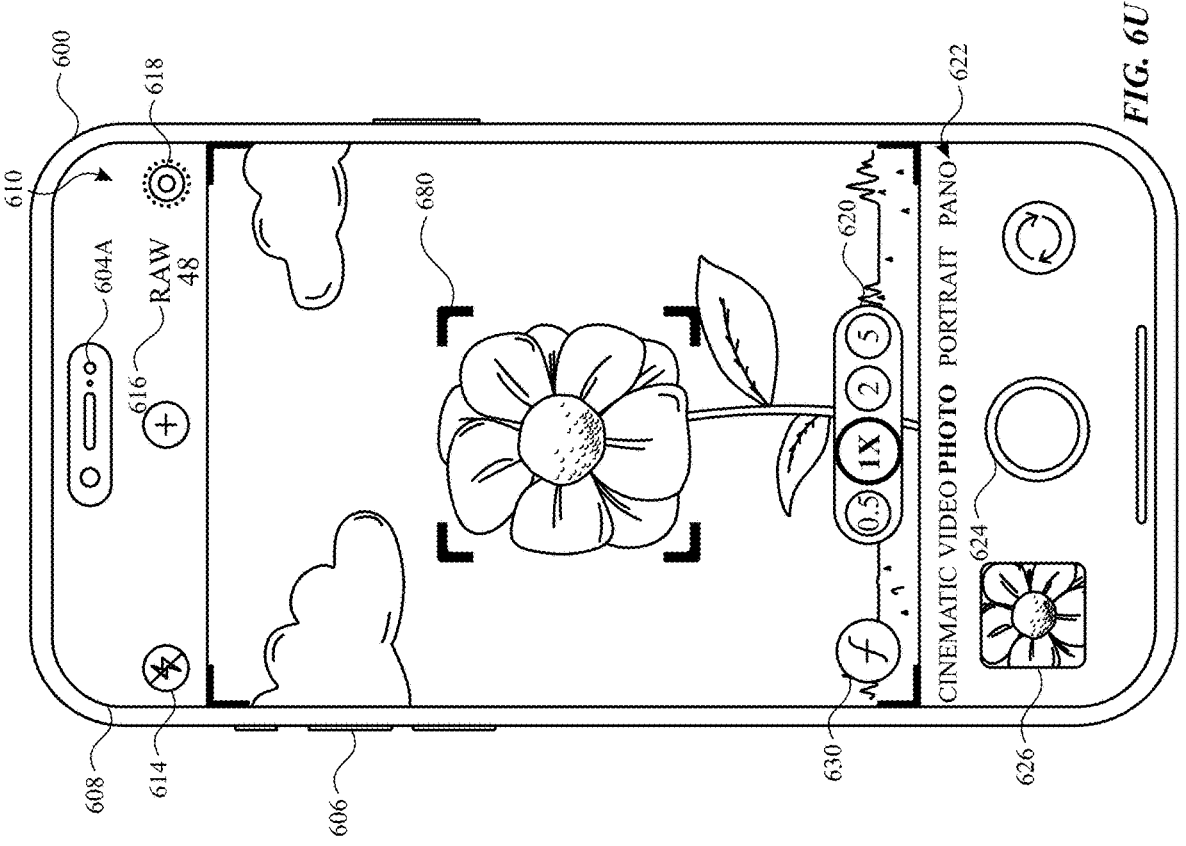

As illustrated in FIG. 6S, computer system 600 displays media user interface 657, including captured media 676 (e.g., the media captured in response to input 672 at FIG. 6R) and multi-frame photo capture affordance 674. Because depth indicator 630 was not displayed in camera user interface 610 when the media capture was performed (e.g., indicating that depth information was not being captured), computer system 600 does not display f-stop affordance 662. Accordingly, unlike captured media 658, computer system 600 does not provide the option to apply a simulated depth-of-field effect to captured media 676 post-capture.

As illustrated in FIG. 6T, the portion of the field-of-view of the cameras currently included in camera preview 612 captures a portion of the physical environment including the flower. As described with respect to FIG. 6R, although the current zoom level is at least 1× magnification, because a particular subject (e.g., a person and/or animal) is not determined be within a particular distance range (e.g., 2-8 feet from computer system 600), computer system 600 does not display depth indicator 630, indicating that depth information is not being captured.

At FIG. 6T, computer system 600 detects input 678 (e.g., a tap input via a touch-sensitive surface of display 608) directed to the location of the flower in camera preview 612. Although camera preview 612 still does not include a particular subject (e.g., a person, animal, and/or other pre-determined type of content), in response to input 678, at FIG. 6U, computer system 600 detects the flower as a media capture subject and indicates the detection with subject indicators 680. Additionally, computer system 600 displays depth indicator 630, indicating that depth information is being captured. Accordingly, after detecting input 678, simulated depth-of-field effects can be applied and con-trolled as described with respect to FIGS. 6C-6Q (e.g., applying and modifying the simulated depth-of-field effect in camera preview 612 and/or in media user interface 657 for media captured while depth indicator 630 is displayed).

FIG. 7 is a flow diagram illustrating a method for con-trolling capture of media with associated depth information using a computer system in accordance with some embodi-ments. Method 700 is performed at a computer system (e.g., 100, 300, 500, and/or 600) that is in communication with a display generation component (e.g., 608) (e.g., a display controller; a touch-sensitive display system; a display (e.g., integrated and/or connected), a 3D display, a transparent display, a projector, and/or a heads-up display), one or more cameras (e.g., 604A, 604B, 604C, and/or 604D) (in some embodiments, the computer system includes one or more cameras, such as a rear (e.g., user-facing) camera and a forward (e.g., environment-facing) camera and/or a plurality of forward cameras (e.g., with different lenses, such as a standard camera, a telephoto camera, and/or a wide-angle camera)), and one or more sensors (in some embodiments, the computer system includes one or more depth sensors). Some operations in method 700 are, optionally, combined, the orders of some operations are, optionally, changed, and some operations are, optionally, omitted.

As described below, method 700 provides an intuitive way for controlling capture of media with associated depth information. The method reduces the cognitive burden on a user for controlling capture of media with associated depth information, thereby creating a more efficient human-ma-chine interface. For battery-operated computing devices, enabling a user to control capture of media with associated depth information faster and more efficiently conserves power and increases the time between battery charges.

The computer system (e.g., 600) while displaying (702), via the display generation component (e.g., 608), a camera preview (e.g., 612), obtains (704) information about a physi-cal environment that corresponds to a field of view of the one or more cameras (e.g., a live preview of at least a portion of a field-of-view of the camera(s); in some embodiments, a camera preview in which depth information (e.g., informa-tion about the distance between the camera(s) and one or more subjects or features in the field-of-view of the camera (s)) is not currently being displayed in the preview and/or captured; in some embodiments, a camera preview in which depth-based functionality (e.g., simulated depth-of-field effects) is not currently being used) based on information from one or more sensors of the computer system (e.g., the one or more cameras and/or one or more depth sensors).

The computer system, in response to obtaining the infor-mation about the physical environment that corresponds to the field of view of the one or more cameras (706) and accordance with a determination by the computer system, based on the information about the physical environment that corresponds to the field of view of the one or more cameras (e.g., which is made without user intervention) (e.g., an automatic determination and/or a determination made without an explicit user input requesting display of the first user selectable user interface object), that depth capture criteria (e.g., portrait criteria; in some embodiments, the depth capture criteria include the current zoom setting be at 1× or above; in some embodiments, the depth capture criteria include detecting a particular subject (e.g., a person and/or pet) within a particular distance from the camera(s) (e.g., between 2-8 feet away, over 3 feet away, and/or under 10 feet away)) are met (e.g., as illustrated in FIG. 6C), displays (708) (in some embodiments, initially displaying; in some embodiments, maintaining display of the first selectable user interface object if the first selectable user interface object was displayed and the depth capture criteria continue to be met), via the display generation component (e.g., 608), a first selectable user interface object (e.g., 630) (e.g., a depth indicator/affordance, such as an f-stop icon and/or another indicator, displayed as part of the camera UI and/or superimposed over the camera preview), that, when selected (e.g., via a user input, such as a tap gesture or an air gesture, directed to the first selectable user interface object; in some embodiments, in response to detecting a user input selecting the first selectable user interface object, the com-puter system toggles the depth affordance (e.g., with a first type of input, such as a tap and/or short input) between states of the depth affordance), initiates a process for performing a first depth-based media capture function (e.g., as illustrated in FIG. 6F) (e.g., displaying and/or ceasing to display a simulated depth-of-field preview, capturing media with simulated depth-of-field applied, and/or controlling simulated depth-of-field settings; in some embodiments, in response to detecting a user input selecting the first selectable user interface object, the computer system initiates the process for performing the first depth-based media capture function).

The computer system, in response to obtaining the information about the physical environment that corresponds to the field of view of the one or more cameras (706) and in accordance with a determination (in some embodiments, a determination that is made without user intervention) that the depth capture criteria are not met, forgoes (710) displaying the first selectable user interface object (e.g., as illustrated in FIGS. 6B, 6R, and 6T) (e.g., maintaining the camera preview without displaying information about the distance between the camera(s) and one or more subjects or features in the field-of-view of the camera(s) or ceasing to display the first selectable user interface object if it is displayed and the depth capture criteria cease to be met). Providing a depth capture affordance that allows a user to initiate depth-based media capture functions (e.g., capturing depth information and/or using depth information for media capture) when the current media capture preview meets depth capture criteria provides improved media capture control options to a user without cluttering the media capture user interface with additional displayed controls. Doing so also assists the user with composing media capture events and reduces the risk that transient media capture opportunities are missed or captured with unintended settings (e.g., without capturing depth information when depth information/effects are desired by the user), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Additionally, displaying the depth capture affordance provides a user with real-time visual feedback about a state of the computer system (e.g., whether depth information is being captured and/or depth-based media capture functions are available). For example, the initial display of the depth capture affordance indicates that depth information can and/or will be captured and allows the user to quickly access related functionality for media capture if desired.

In some embodiments, the first selectable user interface object (e.g., 630) indicates a state of capture of depth information (e.g., information related to the distance between the one or more cameras and subjects in the physical environment and/or the distance between different subjects in the physical environment; in some embodiments, a depth map) about the physical environment that corresponds to the field of view of the one or more cameras (e.g., displaying the first selectable user interface object indicates that depth information is currently being captured) (e.g., captured by the one or more cameras and/or the one or more sensors; in some embodiments, the depth indicator indicates that depth information is currently being captured; in some embodiments, the depth indicator indicates that depth information will be captured). In some embodiments, the method further comprises: while displaying the first selectable user interface object, capturing (e.g., caching and/or storing)

depth information (e.g., information related to the distance between the one or more cameras and subjects in the physical environment and/or the distance between different subjects in the physical environment; in some embodiments, a depth map) about the physical environment that corresponds to the field of view of the one or more cameras (e.g., displaying the first selectable user interface object indicates that depth information is currently being captured). Capturing depth information while displaying the depth capture affordance provides a user with real-time visual feedback about a state of the computer system (e.g., whether depth information is being captured). Doing so also assists the user with composing media capture events and reduces the risk that transient media capture opportunities are missed (e.g., due to the user trying to confirm whether depth information is being captured) or captured with unintended settings (e.g., without capturing depth information when depth information/effects are desired by the user).

In some embodiments, the depth information is based on information from one or more depth sensors (e.g., structural light sensors, time-of-flight sensors (e.g., LIDAR and/or ultrasonic sensors), and/or stereoscopic camera sensors) of the one or more sensors.

In some embodiments, the depth information is based on a comparison of first image data obtained from a first camera of the one or more cameras and second image data obtained from a second camera of the one or more cameras (e.g., 604B, 604C, and/or 604D) (e.g., two cameras facing substantially the same direction but separated from each other by a known distance, such that depth information can be derived from discrepancies between the first image data and second image data (e.g., the closer the subject is to the two cameras, the more image data corresponding to the subject will differ between the first and second image data)).

In some embodiments, the computer system detects an input (e.g., 638, 640 and/or 652) selecting the first selectable user interface object (e.g., 630); and in response to detecting the input selecting the first selectable user interface object, the computer system initiates the process for performing the first depth-based media capture function, wherein the process for performing the first depth-based media capture function includes switching a simulated depth-of-field capture mode (e.g., a mode in which depth information is captured and/or used while capturing media (e.g., to apply a live preview of depth effects)) between an enabled state and a disabled state (e.g., as illustrated in FIGS. 6E-6F and FIGS. 6K-6L) (e.g., in accordance with a determination that the depth capture mode is disabled when a selection of the first user selectable user interface object is detected, enabling the depth capture mode, and in accordance with a determination that the depth capture mode is enabled when a selection of the first user selectable user interface object is detected, disabling the depth capture mode; in some embodiments, enabling the depth capture mode includes initializing a setting of the depth capture mode (e.g., the f-stop setting) to a first value; in some embodiments, the first value is the last-used value; in some embodiments, the first value is a default value). Using the first selectable user interface object to toggle a depth capture mode provides improved control of media capture settings without cluttering the media capture interface with unnecessary controls. Doing so also assists the user with composing media capture events and reduces the risk that transient media capture opportunities are missed or captured with unintended settings (e.g., without capturing depth information when depth information/effects are desired by the user), which enhances the operability of the system and makes the user-system interface more efficient.

In some embodiments, the computer system, in response to detecting the input (e.g., 638, 640 and/or 652) selecting the first selectable user interface object and in accordance with a determination that the simulated depth-of-field capture mode is in the enabled state, the computer system displays the camera preview (e.g., 612) (e.g., the live capture preview) with a simulated depth-of-field effect (e.g., as illustrated in FIGS. 6F-6K) (e.g., applying blurring and/or other depth-based visual effects to the image data being captured using the one or more cameras; in some embodiments, the simulated depth-of-field effect is only applied when a particular subject (e.g., a person and/or animal of a particular size in the camera preview) is detected) based on depth information (e.g., information related to the distance between the one or more cameras and subjects in the physical environment and/or the distance between different subjects in the physical environment; in some embodiments, a depth map) about the physical environment that corresponds to the field of view of the one or more cameras (e.g., blurring portions of the camera preview corresponding to elements of the physical environment that are farther away from the one or more cameras more than portions of the camera preview corresponding to elements of the physical environment that are closer to the one or more cameras). In some embodiments, the computer system, in response to detecting the input (e.g., 638, 640 and/or 652) selecting the first selectable user interface object and in accordance with a determination that the simulated depth-of-field capture mode is in the disabled state (e.g., before the first user selectable user interface object is initially selected or after the first selectable user interface object is deselected (e.g., in response to detecting a selection of the first selectable user interface object while the depth capture mode is already enabled)), the computer system displays the camera preview without the simulated depth-of-field effect (e.g., as illustrated in FIG. 6L). Applying the simulated depth-of-field effect to the live camera preview when the depth capture mode is enabled provides a user with real-time visual feedback about a state of the computer system. For example, the simulated depth-of-field effect indicates to the user that depth information is being captured and allows the user to preview how captured media will look with the simulated depth-of-field effect applied. Doing so also assists the user with composing media capture events and reduces the risk that transient media capture opportunities are missed or captured with unintended settings, which enhances the operability of the system and makes the user-system interface more efficient.

In some embodiments initiating the process for performing the first depth-based media capture function includes, in accordance with a determination that the input selecting the first selectable user interface object is an input of a first input type (e.g., 638, 640 and/or 652) (e.g., a short press and/or tap), switching the simulated depth-of-field capture mode between the enabled state and the disabled state (e.g., as illustrated in FIGS. 6E-6F and FIGS. 6K-6L). In some embodiments initiating the process for performing the first depth-based media capture function includes, in accordance with a determination that the input selecting the first selectable user interface object is an input of a second type (e.g., 640) (e.g., a long/held press and/or tap), displaying, via the display generation component, a second selectable user interface object (e.g., 644) (in some embodiments, a slider; in some embodiments, a selectable menu; in some embodiments, a platter with multiple affordances) that, when selected (e.g., via input 642) (e.g., via a user input, such as a tap gesture or an air gesture, directed to the second selectable user interface object), controls (e.g., allows a user to set and/or select a value for) a setting of the simulated depth-of-field capture mode (e.g., as illustrated in FIGS. 6G-6I) (in some embodiments, a simulated f-stop value of the simulated depth-of-field effect; in some embodiments, a slider affordance can be dragged (e.g., left and right and/or up and down) to select between a plurality of f-stop values; in some embodiments, a selectable menu and/or platter include selectable affordances for each of a plurality of f-stop values; in some embodiments, in response to detecting a user input selecting the second selectable user interface object, the computer system changes the setting of the simulated depth-of-field capture mode based on the user input (e.g., the selected affordance and/or the extent to which the slider is dragged)). Using the first selectable user interface object to both toggle a depth capture mode and access additional options for the depth capture mode provides improved media capture control options to a user without cluttering the media capture user interface with additional displayed controls. Doing so also assists the user with composing media capture events and reduces the risk that transient media capture opportunities are missed or captured with unintended settings, which enhances the operability of the system and makes the user-system interface more efficient.

In some embodiments, while displaying the camera preview (e.g., 612), the computer system displays, via the display generation component, at least one selectable user interface object, different from the first selectable user interface object (e.g., 614, 616, 618, 620, and/or 622), that, when selected (e.g., via a user input, such as a tap gesture or an air gesture, directed to the at least one selectable user interface object different from the first selectable user interface object), initiates a process for performing a media capture function different from the first depth-based media capture function (e.g., the different media capture function includes controlling flash settings (e.g., setting flash to on, off, and/or automatic), controlling a multi-frame capture setting (e.g., toggling a Live Photo and/or burst mode on or off), controlling an exposure setting (e.g., enabling a longer exposure time (e.g., low-light setting) and/or setting a maximum exposure time), controlling a zoom setting (e.g., zooming in or zooming out), selecting a media capture mode (e.g., selecting between modes for capturing a standard photo, standard video, Portrait-mode photo, high frame rate video, and/or panoramic photo), and/or selecting a camera of the one or more cameras (in some embodiments, a user-facing or environment-facing camera; in some embodiments, selecting between different environment-facing cameras); in some embodiments, in response to detecting a user input selecting at least one selectable user interface object, the computer system initiates the process for performing the media capture function different from the first depth-based media capture function; in some embodiments, the at least one selectable user interface object functions as described with respect to FIGS. 8A-8T and FIG. 9).

In some embodiments, while displaying the camera preview, the computer system displays, via the display generation component, a third selectable user interface object (e.g., 624) (e.g., a shutter affordance), different from the first selectable user interface object, that, when selected (e.g., via input 650, 654, and/or 672) (e.g., via a user input, such as a tap gesture or an air gesture, directed to the third selectable user interface object), initiates a process for capturing media (e.g., as illustrated in FIGS. 6J-6M and 6R-6S) (e.g., capturing photo media and/or capturing video media using the one or more cameras and storing the captured media (in some embodiments, along with any associated metadata, such as depth information) to a media library (in some embodiments, a media library stored on internal storage of the computer system; in some embodiments, a media library stored on remote storage (e.g., a cloud library); in some embodiments, a media library stored on external storage; e.g., as described with respect to FIGS. 12A-12T and FIG. 13); in some embodiments, in response to detecting a user input selecting the third selectable user interface object, the computer system initiates capture of photo media and/or video media).

In some embodiments, the computer system captures first media (e.g., as illustrated in FIGS. 6K, 6M, and 6S) (e.g., capturing photo media and/or capturing video media using the one or more cameras and storing the captured media (in some embodiments, along with any associated metadata, such as depth information) to a media library (in some embodiments, a media library stored on internal storage of the computer system; in some embodiments, a media library stored on remote storage (e.g., a cloud library); in some embodiments, a media library stored on external storage; e.g., as described with respect to FIGS. 12A-12T and FIG. 13)). In some embodiments, the computer system, after capturing the first media (in some embodiments, automatically after capturing the first media; in some embodiments, in response to a user input requesting to view the first media (in some embodiments, a selection of the photo well; in some embodiments, inputs navigating to a photo roll)), displays, via the display generation component, a representation of the first media (e.g., 658 and/or 676 and/or included in 626) (e.g., a thumbnail of the first media, a still frame of the first media (e.g., for video media and/or multi-frame photo captures), and/or the media itself, in some embodiments, displaying the representation of the first media while displaying the camera preview (e.g., displaying a thumbnail of the captured media in a photo well); in some embodiments, ceasing display of the camera preview and displaying the representation of the first media in a different UI (e.g., a collection of recently captured media and/or a media library of the user)). Displaying captured media provides a user with real-time visual feedback about a state of the computer system and assists the user with composing media capture events. For example, the user is able to check how captured media looks with the current media capture settings and adjust the media capture settings for additional media capture if desired.

In some embodiments, displaying the representation of the first media includes, in accordance with a determination that the first selectable user interface object is displayed in a first state (e.g., a selected, enabled, and/or on state; in some embodiments, the depth affordance is placed in the first state in response to a user input selecting the depth affordance while the depth affordance is in the second state) when capture of the first media is initiated (e.g., as illustrated in FIG. 6J), displaying the representation of the first media with a simulated depth-of-field effect (e.g., as illustrated by captured media icon 626 in FIGS. 6K-6L) (e.g., applying blurring and/or other depth-based visual effects to the media, still, and/or thumbnail) based on depth information (e.g., information related to the distance between the one or more cameras and subjects in the physical environment and/or the distance between different subjects in the physical environment; in some embodiments, a depth map) about the physical environment that corresponds to the field of view of the one or more cameras (e.g., blurring portions of the camera preview corresponding to elements of the physical environment that are farther away from the one or more cameras more than portions of the camera preview corresponding to elements of the physical environment that are closer to the one or more cameras). In some embodiments, displaying the representation of the first media includes, in accordance with a determination that the first selectable user interface object is not displayed in the first state (in some embodiments, when the first selectable user interface object is displayed in a (second) deselected/disabled state, e.g., in response to a user input selecting the depth affordance while the depth affordance is in the first state; in some embodiments, when the first selectable interface object is not displayed) when the capture of the first media is initiated (e.g., as illustrated in FIG. 6L), displaying the representation of the first media without a simulated depth-of-field effect (e.g., as illustrated by captured media icon 626 and captured media 658 in FIGS. 6M-6N). Displaying the representation of the captured media with or without the simulated depth effects applied depending on whether the depth affordance was selected or deselected provides a user with real-time visual feedback about a state of the computer system and assists the user with composing media capture events. For example, the user is able to check how captured media looks with the current depth capture settings and adjust the depth capture settings for additional media capture if desired.

In some embodiments, the computer system, while displaying the representation of the first media (e.g., 658) (in some embodiments, in a camera roll and/or media library UI), displays a fourth selectable user interface object (e.g., 662) (e.g., a depth and/or portrait mode affordance) that, when selected (e.g., via input 664) (e.g., via a user input, such as a tap gesture or an air gesture, directed to the fourth selectable user interface object), controls whether the representation of the first media is displayed with or without a simulated depth-of-field effect (e.g., as illustrated in FIGS. 6N-6Q) (e.g., applying blurring and/or other depth-based visual effects to the media) (in some embodiments, the simulated depth-of-field effect is based on depth information (e.g., information related to the distance between the one or more cameras and subjects in the physical environment and/or the distance between different subjects in the physical environment; in some embodiments, a depth map) about the physical environment that corresponds to the field of view of the one or more cameras (e.g., blurring portions of the camera preview corresponding to one or more background elements of the physical environment that are farther away from the one or more cameras more than portions of the camera preview corresponding to one or more subjects in the physical environment that have been selected manually or automatically to be in focus and/or blurring portions of the camera preview corresponding to one or more foreground elements of the physical environment that are closer to the one or more cameras more than portions of the camera preview corresponding to the one or more subjects in the physical environment that have been selected manually or automatically to be in focus); in some embodiments, in response to detecting a user input selecting the fourth selectable user interface object: in accordance with a determination that the fourth selectable user interface object is displayed in a deselected/disabled state when the user input is selected, the computer system displays the media with the simulated depth-of-field effect; and in accordance with a determination that the fourth selectable user interface object is displayed in a selected/enabled state when the user input is selected, the computer system display the media without the simulated depth-of-field effect).

In some embodiments, in accordance with a determination that the first selectable user interface object was displayed when capture of the first media was initiated (e.g., as illustrated in FIGS. 6J and 6L), depth information (e.g., information related to the distance between the one or more cameras and subjects in the physical environment and/or the distance between different subjects in the physical environment; in some embodiments, a depth map) about the physical environment that corresponds to the field of view of the one or more cameras (e.g., blurring portions of the camera preview corresponding to elements of the physical environment that are farther away from the one or more cameras more than portions of the camera preview corresponding to elements of the physical environment that are closer to the one or more cameras) is available to use for displaying the representation of the first media with a simulated depth-of-field effect (e.g., as illustrated in FIGS. 6N-6Q) (e.g., applying blurring and/or other depth-based visual effects to the media). In some embodiments, in accordance with a determination that the first selectable user interface object was not displayed when the capture of the first media was initiated (e.g., as illustrated in FIG. 6R), the depth information is not available to use for displaying the representation of the first media with the simulated depth-of-field effect (e.g., as illustrated in FIG. 6S). Providing the option to apply simulated depth-of-field effects after capturing media provides improved media capture control options to a user without cluttering the media capture user interface with additional displayed controls. Doing so also assists the user with composing media capture events and reduces the risk that transient media capture opportunities are missed or captured with unintended settings, which enhances the operability of the system and makes the user-system interface more efficient.

In some embodiments, the computer system detects a first user input (e.g., 678) directed to a first region of the camera preview (in some embodiments, a tap on the camera preview) (in some embodiments, while forgoing displaying the first selectable user interface object (e.g., while the depth capture criteria are not met)). In some embodiments, in response to detecting the first user input and in accordance with a determination that the first region of the camera preview includes a representation of a respective subject (e.g., an identifiable person, animal, and/or object; in some embodiments, detected based on the information about the physical environment that corresponds to the field of view of the one or more cameras (e.g., camera data and/or depth information)) in the physical environment (in some embodiments, while forgoing displaying the first selectable user interface object (e.g., while the depth capture criteria are not met)), the computer system captures (e.g., caching and/or storing) depth information (e.g., information related to the distance between the one or more cameras and subjects in the physical environment and/or the distance between different subjects in the physical environment; in some embodiments, a depth map) (in some embodiments, depth information that can be used to present a media item with a synthetic depth-of-field effect) about the physical environment that corresponds to the field of view of the one or more cameras (e.g., as illustrated in FIG. 6U) (e.g., when the depth affordance is not being displayed and/or the depth capture criteria are not met, the user can instead enable the capture of depth information by tapping on a subject in the camera preview; in some embodiments, in accordance with a determination that the first region of the camera preview does not include a representation of a respective subject and while forgoing displaying the first selectable user interface object (e.g., while the depth capture criteria are not met), forgoing capturing depth information). Capturing depth information in response to detecting a tap on a subject in the camera preview provides improved media capture control options to a user without cluttering the media capture user interface with additional displayed controls. Doing so also assists the user with composing media capture events and reduces the risk that transient media capture opportunities are missed or captured with unintended settings (e.g., without capturing depth information when depth information/effects are desired by the user), which enhances the operability of the system and makes the user-system interface more efficient.

In some embodiments, the computer system, in accordance with a determination that a portrait capture mode (e.g., a mode in which captured media items are presented with a synthetic depth-of-field effect) is enabled (in some embodiments, whether or not the depth capture affordance is displayed and/or the depth capture criteria are met), captures (e.g., caching and/or storing) depth information (e.g., information related to the distance between the one or more cameras and subjects in the physical environment and/or the distance between different subjects in the physical environment; in some embodiments, a depth map) about the physical environment that corresponds to the field of view of the one or more cameras—(e.g., as illustrated in FIG. 6D) (e.g., without regard to whether or not a subject is detected, without regard to whether a subject has been selected based on a user input and/or without regard to whether the user has adjusted any portrait mode settings)(e.g., depth information is always captured in the portrait capture mode). In some embodiments, media items captured while in the portrait capture mode including depth information (e.g., that can be used to present one or more depth effects (e.g., synthetic depth of field)). Capturing depth information while in a portrait capture mode provides improved media capture control options to a user without cluttering the media capture user interface with additional displayed controls. Doing so also assists the user with composing media capture events and reduces the risk that transient media capture opportunities are missed or captured with unintended settings (e.g., without capturing depth information when depth information/effects are desired by the user), which enhances the operability of the system and makes the user-system interface more efficient.

In some embodiments, the computer system, while (in some embodiments, in accordance with a determination that) the camera preview includes a representation of a respective subject (e.g., a person, animal, and/or object; in some embodiments, detected based on the information about the physical environment that corresponds to the field of view of the one or more cameras (e.g., camera data and/or depth information)) and in accordance with a determination that the portrait capture mode is enabled (e.g., using a mode selection affordance (e.g., for selecting between standard photo, standard video, portrait, panoramic, and high frame rate video modes)), displays the camera preview (e.g., the live capture preview) with a simulated depth-of-field effect (e.g., applying blurring and/or other depth-based visual effects to the image data being captured using the one or more cameras) based on depth information (e.g., information related to the distance between the one or more cameras and subjects in the physical environment and/or the distance between different subjects in the physical environment; in some embodiments, a depth map) about the physical environment that corresponds to the field of view of the one or more cameras (e.g., as illustrated in FIG. 6D) (e.g., blurring portions of the camera preview corresponding to elements of the physical environment that are farther away from the one or more cameras more than portions of the camera preview corresponding to elements of the physical environment that are closer to the one or more cameras). In some embodiments, the computer system, while the camera preview includes the representation of a respective subject and in accordance with a determination that the portrait capture mode is not enabled (e.g., the mode is disabled and/or another mode (e.g., a standard photo mode) is enabled) and that the first selectable user interface object (e.g., depth affordance) is not in an enabled state (in some embodiments, the first selectable user interface object is displayed but not selected; in some embodiments, the first selectable user interface object is not displayed), displays the camera preview (e.g., the live capture preview) without the simulated depth-of-field effect (e.g., as illustrated in FIGS. 6C, 6E, 6L, and 6M). Displaying a live preview of simulated depth effects when a subject is detected, and the camera is capturing in portrait mode provides improved media capture control options to a user without cluttering the media capture user interface with additional displayed controls. Doing so also assists the user with composing media capture events and reduces the risk that transient media capture opportunities are missed or captured with unintended settings (e.g., without capturing depth information when depth information/effects are desired by the user), which enhances the operability of the system and makes the user-system interface more efficient.

In some embodiments the depth capture criteria include a criterion that is met when a zoom setting is set to at least a threshold magnification (e.g., as illustrated in FIGS. 6C and 6U) (e.g., the depth affordance is displayed when the camera is zoomed in to or above a threshold zoom level (e.g., 0.75× zoom, 1× zoom, and/or 2× zoom but is not displayed when the camera is zoomed below the threshold zoom level); in some embodiments, the depth affordance is displayed at arbitrary zoom levels (e.g., the depth capture criteria do not include a criterion met by meeting a threshold magnification)). Displaying the depth capture affordance when zoomed in above a certain threshold provides improved media capture control options to a user without cluttering the media capture user interface with additional displayed controls, for example, when the additional displayed controls are less likely to be useful and/or desired by the user given the current composition of media capture.

In some embodiments, the depth capture criteria include a first criterion that is met when a representation of a respective subject (e.g., a person, animal, and/or other particular subject) is detected in the camera preview and a second criterion that is met when a distance from the one or more cameras to the respective subject in the physical environment falls within a distance range (e.g., the subject is 2-8 feet, 0-10 feet, and/or 5-15 feet away) (e.g., as illustrated in FIG. 6C) (in some embodiments, the depth capture criteria include a third criterion that is met when a lighting quality (e.g., brightness, contrast, and/or currently selected flash setting) of the camera preview meets a quality criteria (e.g., the respective subject is or will be sufficiently well-lit in a media capture)). Displaying the depth capture affordance when zoomed in above a certain threshold provides improved media capture control options to a user without cluttering the media capture user interface with additional displayed controls, for example, when the additional displayed controls are less likely to be useful and/or desired by the user given the current composition of media capture.

In some embodiments, the computer system, while displaying the first selectable user interface object (e.g., 630), displays zoom interface object (e.g., 620) (e.g., a button, a slider, and/or a menu/platter with multiple selectable options) that, when selected (e.g., via input 627) (e.g., via a user input, such as a tap gesture or an air gesture, directed to the zoom interface object), controls a zoom level of the camera preview (e.g., as illustrated in FIGS. 6B-6C) (in some embodiments, the depth affordance and the zoom controls are displayed close to each other in the same region of the camera UI (e.g., both at the bottom of the camera preview, with the depth indicator in the bottom left corner and the zoom controls in the bottom center and/or both at the same side camera preview, with the depth indicator in a corner and the zoom controls in the center); in some embodiments, in response to detecting an input selecting the zoom interface object, the computer system changes the zoom level of the camera preview based on the input (e.g., based on the extent to which a slider or wheel affordance is dragged and/or based on a particular option selected with the input)). Displaying zoom controls along with the depth affordance assists the user with composing media capture events and reduces the risk that transient media capture opportunities are missed or captured with unintended settings, which enhances the operability of the system and makes the user-system interface more efficient. For example, the user can check both the depth capture settings and the zoom settings without needing to search extensively for the different controls.

In some embodiments, the computer system detects an input of a respective type (e.g., 640) (e.g., a long/held input) directed to the first selectable user interface object (e.g., 630). In some embodiments, the computer system, in response to detecting the input of the respective type directed to the first selectable user interface object, ceasing display of the zoom interface object (e.g., 620) and displays a fifth selectable user interface object (e.g., 644) (e.g., an expanded options affordance for the depth capture operation, such as a menu and/or slider) that controls (e.g., allows a user to set and/or select a value for) a media capture setting associated with the first selectable user interface object (e.g., as illustrated in FIGS. 6G-6I) (e.g., the f-stop value for applying the simulated depth-of-field effect; in some embodiments, a slider affordance can be dragged (e.g., left and right and/or up and down) to select between a plurality of f-stop values; in some embodiments, a selectable menu and/or platter include selectable affordances for each of a plurality of f-stop values that can be selected with a tap and/or click input). Hiding the zoom controls and providing additional media capture settings provides improved media capture control options to a user without cluttering the media capture user interface with additional displayed controls.

In some embodiments, the first selectable user interface object (e.g., 630), when displayed in an enabled state (e.g., when selected), includes an indication (e.g., 648) of a current value of a depth-based media capture setting (e.g., the currently-selected aperture size (f-stop) value). In some embodiments, in response to detecting a change to the current value of the depth-based media capture setting, updating the indication of the current value of the depth-based media capture setting (e.g., as illustrated in FIGS. 6J-6K and 8M-8O). In some embodiments, in accordance with a determination that the current value of the depth-based media capture setting has a first value, the indication of the current value of the depth-based media capture setting has a first appearance (e.g., the indication of the current value of the depth-based media capture setting includes a first number indicating a simulated depth stop setting) and, in accordance with a determination that the current value of the depth-based media capture setting has a second value that is different from the first value, the indication of the current value of the depth based media capture setting has a second appearance different from the first appearance (e.g., the indication of the current value of the depth-based media capture setting includes a second number indicating a simulated depth stop setting or includes no number to indicate that a default value for the depth-based media capture setting is being used). Displaying and updating the depth affordance with an indication of currently-selected value of a depth-based media capture setting provides a user with real-time visual feedback about a state of the computer system and assists the user with composing media capture events.

Note that details of the processes described above with respect to method 700 (e.g., FIG. 7) are also applicable in an analogous manner to the methods described below. For example, method 700 optionally includes one or more of the characteristics of the various methods described below with reference to method 900, method 1100, method 1300, method 1700, method 1900, method 2100, and/or method 2300. For example, while capturing media with (or without) associated depth information in accordance with method 700, both the capture of depth information and other media capture settings can be controlled as described with respect to method 900. For example, a camera user interface incorporating the depth affordance of method 700 can also incorporate the zoom user interface described with respect to method 1100 and the external storage user interfaces described with respect to method 1300. For brevity, these details are not repeated below.

FIGS. 8A-8T illustrate exemplary user interfaces for controlling media capture settings, in accordance with some embodiments. The user interfaces in these figures are used to illustrate the processes described below, including the processes in FIG. 9.

At FIG. 8A, computer system 600 displays, via display 608, camera settings user interface 802 for selecting and configuring controls for a set of camera settings to be provided in a camera user interface (e.g., camera user interface 610). As illustrated in FIG. 8A, the set of camera settings includes a media format (e.g., "media type") setting (e.g., for the resolution and/or compression codec of media capture), a depth capture setting (e.g., for simulated depth-of-field effects, as described in detail with respect to FIGS. 6A-6U and FIG. 7), a camera flash setting, and a low-light (e.g., "night mode") capture setting (e.g., for exposure length).

Camera settings user interface 802 includes toggle affordances 804A, 804B, 804C, and 804D, corresponding to the media format setting, depth capture setting, camera flash setting, and low-light capture setting, respectively. When selected, toggle affordances 804A, 804B, 804C, and 804D control whether a control affordance for the corresponding camera setting is included in camera user interface 610. As illustrated in FIG. 8A, each of toggle affordances 804A, 804B, 804C, and 804D are placed in an "on" state. Accordingly, referring momentarily to FIG. 8D, computer system 600 displays camera user interface 610 with media format affordance 616, depth indicator 630, flash affordance 614, and night mode affordance 816. In some embodiments, even if toggle affordance 804B is placed in the "on" state, depth indicator 630 is only displayed when depth capture criteria are met (e.g., a zoom level of at least 1× magnification and/or detection of a particular subject (e.g., a person or animal) within a particular distance range), as described above with respect to FIGS. 6A-6U and FIG. 7. Referring again to FIG. 8A, camera settings user interface 802 includes default affordances 806A and 806B, corresponding to the media type setting and the aperture setting, respectively. Default affordance 806A indicates a currently-selected default media format setting of 12-megapixel resolution and high-efficiency image coding (HEIC) compression (e.g., "HEIC 12"). Default affordance 806B indicates a currently-selected default f-stop value of f/2.4 (e.g., "2.4").

At FIG. 8A, computer system 600 detects input 808 (e.g., a tap input via a touch-sensitive surface of display 608) selecting default affordance 806A. In response to detecting input 808, at FIG. 8B, computer system 600 displays default settings user interface 810 for the media format setting. Default settings user interface 810 includes default setting menu 812, which lists default settings options that can be selected for the media format setting, including 12-megapixel HEIC (e.g., "HEIC 12"), 48-megapixel HEIC (e.g., "HEIC 48"), 12-megapixel raw coding (e.g., "RAW 12"), and 48-megapixel raw coding (e.g., "RAW 48"). Computer system 600 displays selection indicator 814A, indicating that 12-megapixel HEIC is currently selected as the default value for the media format setting.

At FIG. 8B, computer system 600 detects input 813 (e.g., a tap input via a touch-sensitive surface of display 608) selecting the 48-megapixel HEIC option for the media format setting. In response to detecting input 813, at FIG. 8C, computer system 600 displays selection indicator 814B, indicating that 48-megapixel HEIC is selected as an additional default value for the media format setting.

Figures 8C, 8D:
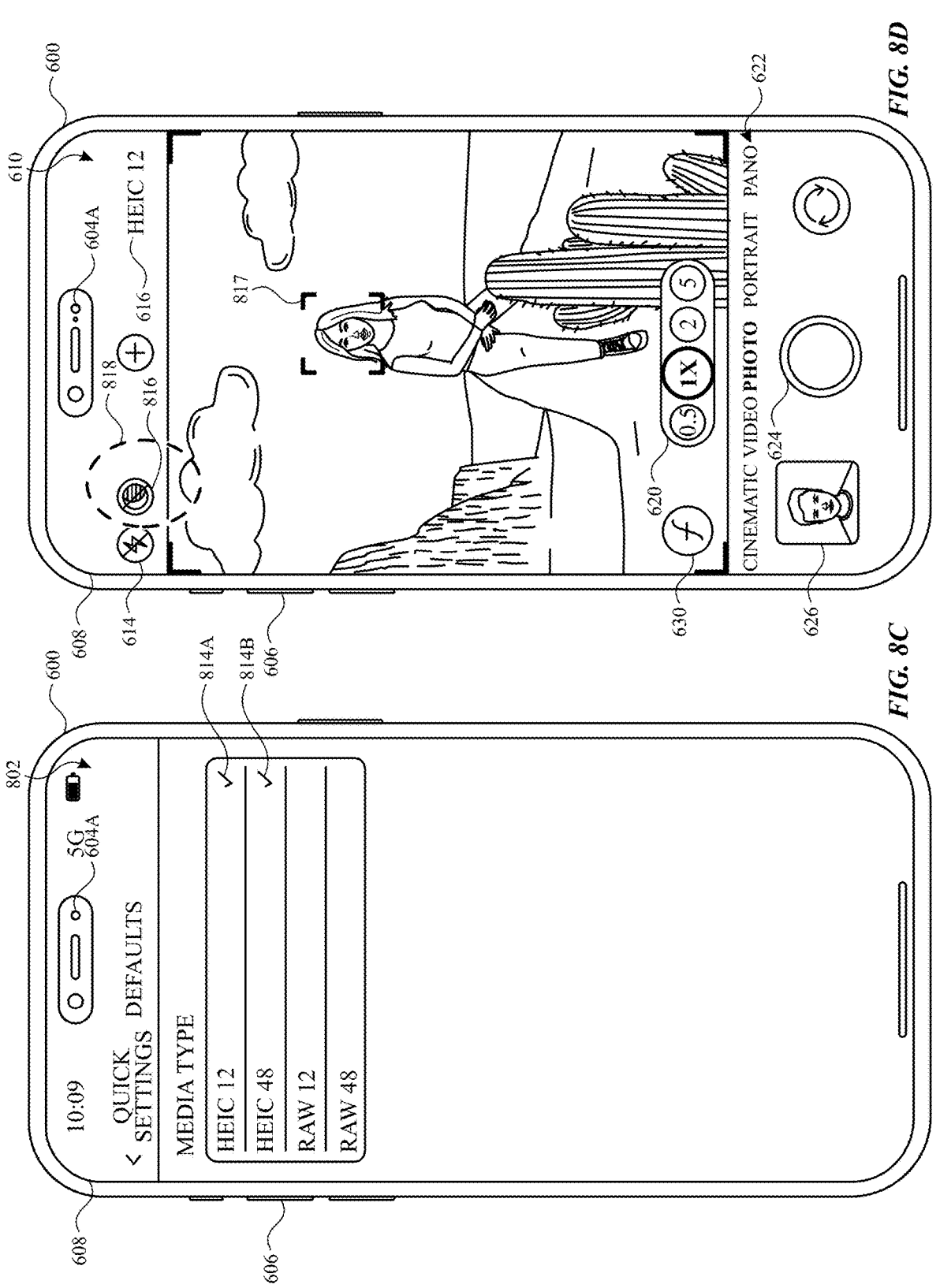

At FIG. 8D, computer system 600 displays camera user interface 610, including camera preview 612, zoom affordance 620, capture mode menu 622, shutter affordance 624, and captured media icon 626 (e.g., as described above with respect to FIGS. 6A-6U), in addition to media format affordance 616, depth indicator 630, flash affordance 614, and night mode affordance 816. As illustrated in FIG. 8D, the portion of the field-of-view of the cameras currently included in camera preview 612 includes a cactus in the foreground, a person in the midground, and landscape features and sky in the background. Computer system 600 detects the person as a media capture subject and indicates the detection with subject indicator 817. As discussed above, in some embodiments, computer system 600 displays depth indicator 630 both due to toggle affordance 804B being placed in the "on" state and because depth capture criteria are met (e.g., because the zoom level is at least 1× magnification and the person is detected within a 2-8 foot distance range from computer system 600).

At FIG. 8D, the camera flash setting is currently in an off (e.g., disabled) state, so flash will not be used if media capture is initiated. Accordingly, computer system 600 displays flash affordance 614 in an "off" state, displaying a line through and visually deemphasizing flash affordance 614. The low-light capture setting is currently in an off (e.g., disabled) state, so a standard, shorter exposure time (e.g., 0.05 seconds, 0.1 seconds, and/or 0.5 second) will be used when capturing media. Accordingly, computer system 600 displays night mode affordance 816 in an "off" state, displaying a line through and visually deemphasizing night mode affordance 816. The depth capture setting is currently in a deselected state, so computer system 600 does not display camera preview 612 with simulated depth-of-field effects (although in some embodiments, computer system 600 still captures depth information, as indicated by the display of depth indicator 630 (e.g., as described above with respect to FIGS. 6A-6U and FIG. 7)). Accordingly, computer system 600 displays depth indicator 630 in a deselected state, visually deemphasizing depth indicator 630 (e.g., as described above with respect to FIG. 6L). The media format setting is currently set to 12-megapixel HEIC (e.g., one of the previously-selected default media format options), which is indicated by the text "HEIC 12" included in media format affordance 616.

At FIG. 8D, computer system 600 detects input 818 directed to the location of night mode affordance 816. Input 818 is an input of a first input type. For example, the first input type includes a "short" tap and/or click input via a touch-sensitive surface of display 608, where a finger-down event followed by a finger-up (liftoff) event is detected within a limited amount of time (e.g., 0.05 second, 0.1 seconds, and/or 0.5 seconds). In response to detecting input 818 (e.g., the first type of input), at FIG. 8E, computer system 600 changes the low-light capture setting to an on (e.g., enabled) state, and in particular, an on state wherein media capture will be performed with a maximum exposure time of 1 second. In some embodiments, while the low-light capture setting is in an on state, computer system 600 will dynamically adjust the exposure time used for media capture up to the maximum exposure time, for example, based on detected ambient light and/or the determined brightness of camera preview 612. In response to detecting input 818 (e.g., and changing the low-light capture setting to the on state with the maximum exposure time of 1 second), computer system 600 updates the appearance of night mode affordance 816, for example, removing the line through night mode affordance 816 and/or visually emphasizing night mode affordance 816 to indicate that the low-light capture mode is enabled, and including a text indication of the maximum exposure time (e.g., "1 S").

In some embodiments, in response to detecting additional inputs of the first input type, computer system 600 cycles the low-light capture setting between a set of predetermined states. For example, as illustrated in sidebar 822, the set of predetermined states may include the on state with the maximum exposure time of 1 second, an on state with a maximum exposure time of 3 seconds, and/or the off (e.g., disabled) state, such that a user can enable, disable, and/or adjust the maximum exposure time with short tap inputs on night mode affordance 816.

Figures 8E, 8F:
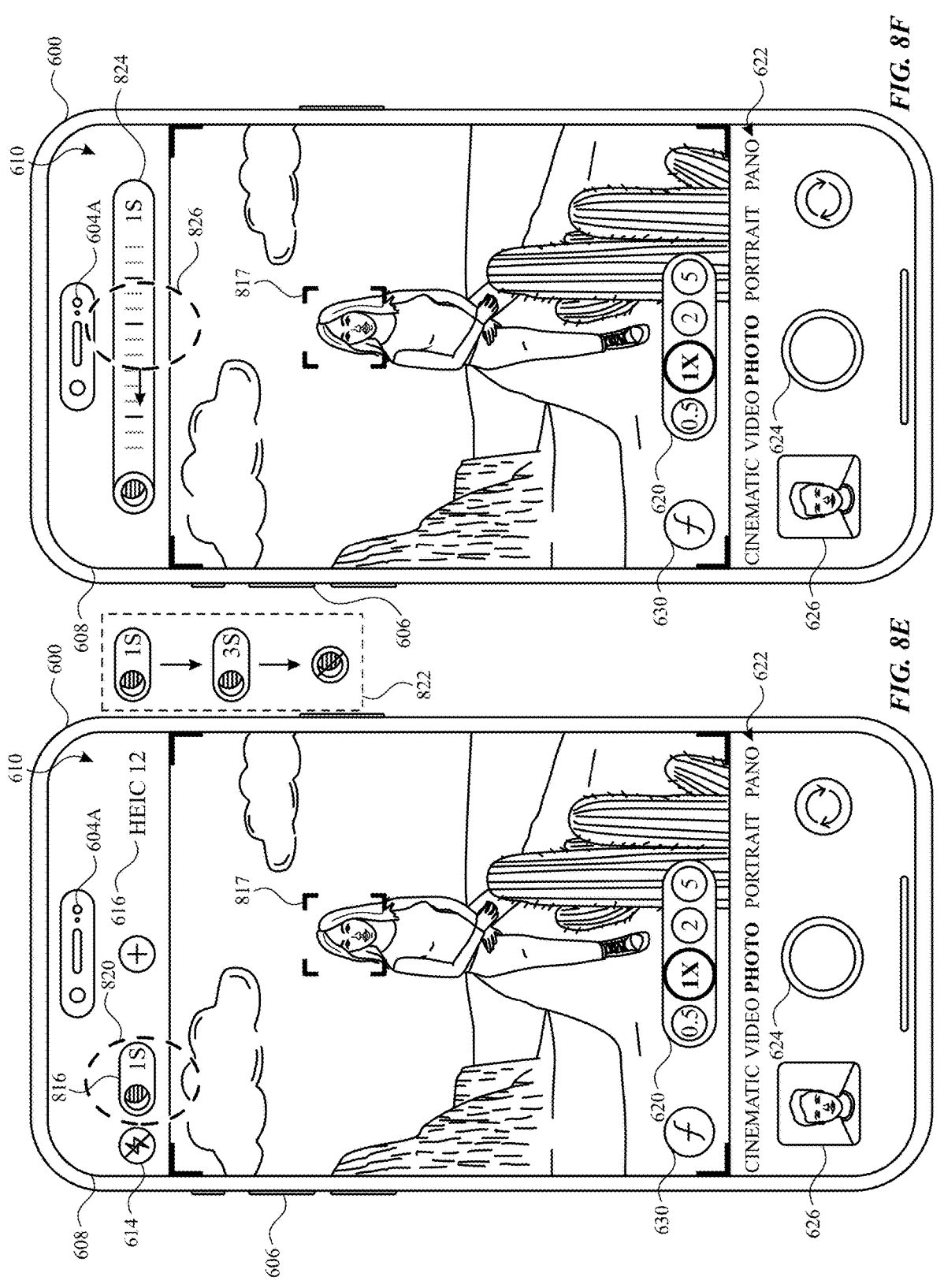

At FIG. 8E, computer system 600 detects input 820 directed to the location of night mode affordance 816. Input 820 is an input of a second input type different from the first input type. For example, the first input type includes a "long" press input via a touch-sensitive surface of display 608, where a finger-up (liftoff) event is not detected for at least a threshold period of time after a finger-down event is detected (e.g., the input is held at least 0.5 seconds, 1 second, and/or 1.5 seconds).

In response to detecting input 820 (e.g., the second type of input), at FIG. 8F, computer system 600 displays exposure slider 824. Exposure slider 824 indicates the current maximum exposure time of 1 second. In some embodiments, computer system 600 displays (e.g., animates) exposure slider 824 expanding out from night mode affordance 816. In some embodiments, exposure slider 824 represents a plurality of maximum exposure times. For example, the tick marks of exposure slider 824 may represent discrete increments (e.g., 0.1 seconds, 0.5 seconds, and/or 1 seconds) of maximum exposure time within an overall exposure range (e.g., 0.5-3.0 seconds, 1-5 seconds, and/or 0-10 seconds). As illustrated in FIG. 8F, while displaying exposure slider 824, computer system 600 ceases to display other user interface elements in the area of exposure slider 824, such as media format affordance 616. In some embodiments, computer system 600 ceases displaying exposure slider 824 following detection of a finger-up (liftoff) event of input 820 after a threshold period of time without detecting an input on exposure slider 824 and/or night mode affordance 816. In some embodiments, computer system 600 ceases displaying exposure slider 824 in response to detecting an input at a location other than the location of exposure slider 824.

As illustrated in FIG. 8F, while displaying exposure slider 824, computer system 600 detects input 826 (e.g., a drag and/or gesture input via a touch-sensitive surface of display 608) along exposure slider 824. In some embodiments, input 826 is a continuation of input 820 (e.g., a gesture detected after the finger-down event and before any finger-up event is detected). In some embodiments, input 826 is a distinct input (e.g., a gesture detected after the finger-up event of input 818 is detected) detected while exposure slider 824 is still displayed. In some embodiments, in response to detecting that input 826 is a drag to the left, computer system 600 increases the maximum exposure time of the low-light capture setting, and in response to detecting that input 826 is a drag to the right, computer system 600 decreases the maximum exposure time of the low-light capture setting. In some embodiments, computer system 600 determines the adjusted maximum exposure time based on a distance (e.g., a net and/or normalized distance) traveled by input 826. For example, input 826 is a drag to the left of a distance corresponding to the distance between a tick mark of exposure slider 824 representing a maximum exposure time of 1 second and a tick mark of exposure slider 824 representing a maximum exposure time of 2 seconds.

Figures 8G, 8H:
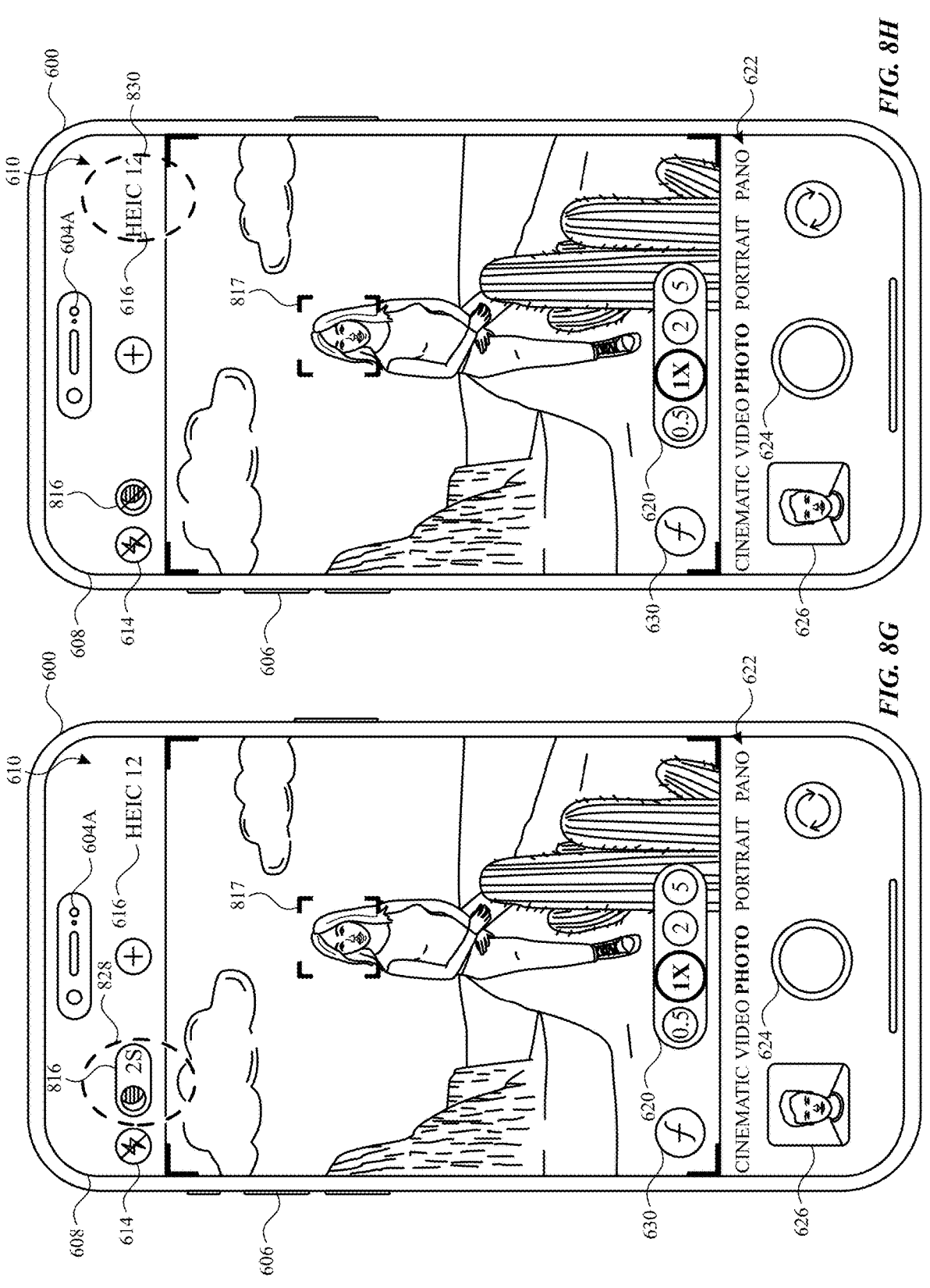

As illustrated in FIG. 8F, in response to detecting input 826, computer system 600 changes the low-light capture setting to an on state with a maximum exposure time of 2 seconds. Referring momentarily to sidebar 822 illustrated in FIG. 8E, an on state with a maximum exposure time of 2 seconds is not included in the set of predetermined states that can be selected (e.g., cycled between) using inputs of the first type. Accordingly, in response to input 820 (e.g., an input of the second input type), computer system 600 provides, via exposure slider 824, additional states for the low-light capture setting. As illustrated in FIG. 8G, after input 826 is released, computer system 600 ceases displaying exposure slider 824 and displays night mode affordance 816 with the enabled appearance (e.g., as described with respect to FIG. 8E) and a text indication of the maximum exposure time (e.g., "2 S").

At FIG. 8G, computer system 600 detects input 828 directed to the location of night mode affordance 816. Input 828 is an input of a first input type (e.g., as described above with respect to input 818). In response to detecting input 828 (e.g., the first type of input), at FIG. 8H, computer system 600 changes the low-light capture setting to an off (e.g., disabled) state. Additionally, in response to input 828, computer system 600 updates the appearance of night mode affordance 816, for example, the line through night mode affordance 816 and/or visually emphasizing night mode affordance 816 (e.g., reverting the changes in appearance described with respect to FIG. 8E) to indicate that the low-light capture mode is in the off state.

At FIG. 8H, computer system 600 detects input 830 directed to the location of media format affordance 616. Input 830 is an input of the first input type (e.g., a "short" tap and/or click input via a touch-sensitive surface of display 608, as described with respect to input 818). In response to detecting input 830 (e.g., the first type of input), at FIG. 8I, computer system 600 changes the media format setting from 12-megapixel HEIC (e.g., the initially selected default media format option) to 48-megapixel HEIC (e.g., the other default media format option enabled in FIG. 8C) and updates the appearance of media format affordance 616 to include the text "HEIC 48," indicating the updated media format setting. At FIG. 8I, computer system 600 detects input 832, another input of the first input type, directed to the location of media format affordance 616. In response to detecting input 832, at FIG. 8J, computer system 600 changes the media format setting from 48-megapixel HEIC to 12-megapixel HEIC (e.g., the other default media format option enabled in FIG. 8C) and updates the appearance of media format affordance 616 to include the text "HEIC 12." Accordingly, in response to inputs of the first type, computer system 600 cycles the media format setting between the set of predetermined states selected default settings user interface 810 for the media format setting.

Figures 8I, 8J:
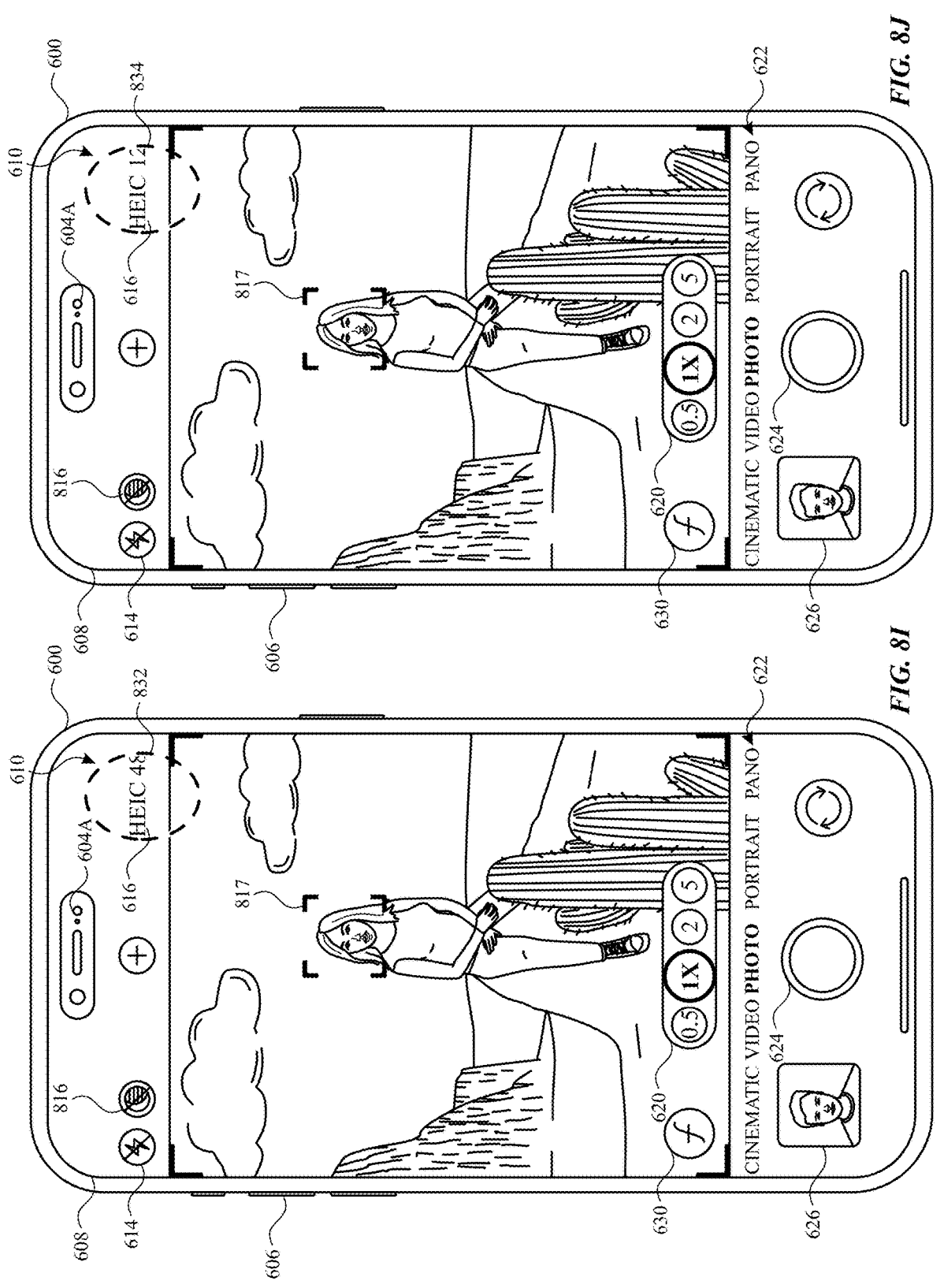

At FIG. 8I, computer system 600 detects input 834 directed to the location of media format affordance 616. Input 834 is an input of the second input type (e.g., a "long" press input via a touch-sensitive surface of display 608, as described with respect to input 820). In response to detecting input 834 (e.g., the second type of input), at FIG. 8K, computer system 600 displays media format menu 836. In some embodiments, computer system 600 displays (e.g., animates) media format menu 836 expanding out from night mode affordance 816. As illustrated in FIG. 8F, while displaying media format menu 836, computer system 600 ceases to display other user interface elements in the area of media format menu 836, such as flash affordance 614 and night mode affordance 816. Media format menu 836 includes selectable options corresponding to 12-megapixel HEIC (e.g., "HEIC 12"), 48-megapixel HEIC (e.g., "HEIC 48"), 12-megapixel raw coding (e.g., "RAW 12"), and 48-megapixel raw coding (e.g., "RAW 48"). In some embodiments, computer system 600 ceases displaying media format menu 836 after a threshold period of time without detecting an input on media format menu 836 and/or after detecting an input at a location other than the location of media format menu 836, as described with respect to exposure slider 824.

Figures 8K, 8L:
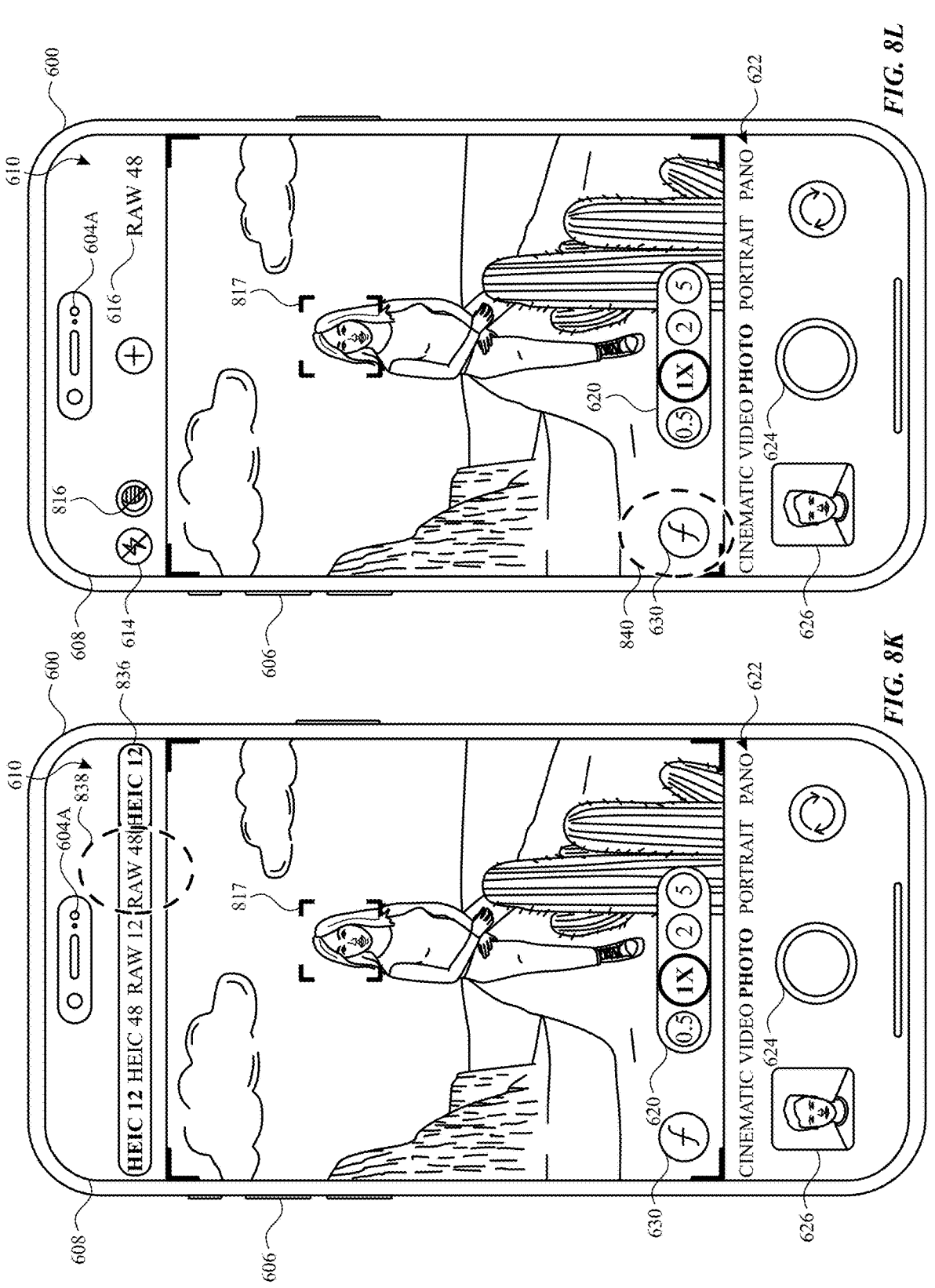

At FIG. 8K, while displaying media format menu 836, computer system 600 detects input 838 on media format menu 836. In some embodiments, input 838 is a continuation of input 834 and/or a distinct input from input 834, as described with respect to input 826 in FIG. 8F. As illustrated in FIG. 8K, input 838 is directed to the location of the selectable option of media format menu 836 corresponding to 48-megapixel raw coding (e.g., "RAW 48"). In response to detecting input 838, at FIG. 8L, computer system 600 changes the media format setting to 48-megapixel raw coding. Accordingly, in response to input 834, computer system 600 provides, via media format menu 836, a media format option not available for selection via inputs of the first input type (e.g., as illustrated in FIGS. 8H-8J). As illustrated in FIG. 8L, after input 838 is released, computer system 600 ceases displaying media format menu 836 and updates the appearance of media format affordance 616 to include the text "RAW 48."

Figures 8M, 8N:
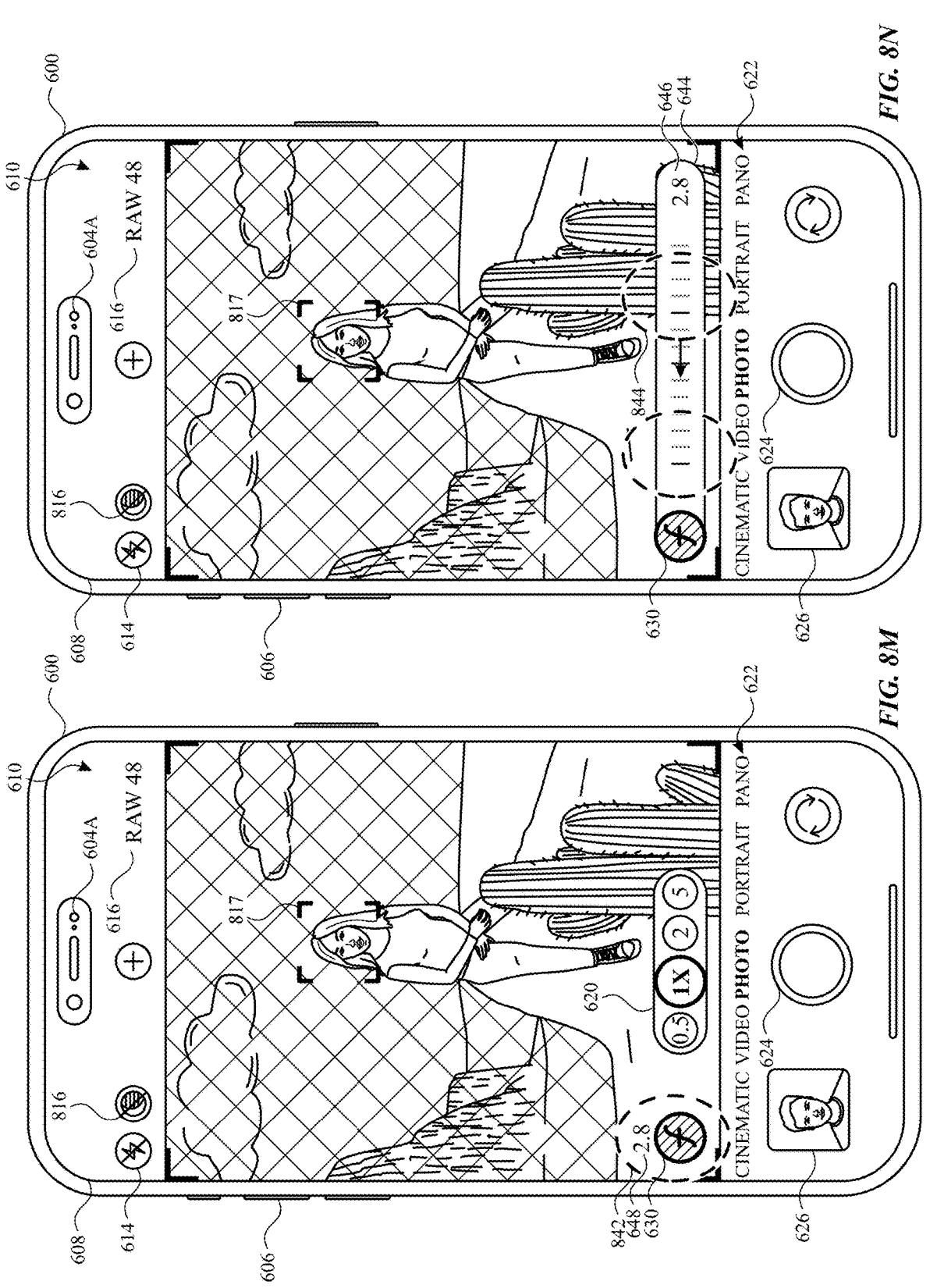

At FIG. 8L, computer system 600 detects input 840, which is an input of the first input type, directed to the location of depth indicator 630. In response to detecting input 840 (e.g., the first type of input), at FIG. 8M, computer system 600 displays camera preview 612 with a simulated depth-of-field effect, enabling media capture with the simulated depth-of-field effect applied (e.g., as described with respect to FIGS. 6A-6U). As illustrated in FIG. 8M, the simulated depth-of-field effect is applied with a simulated aperture setting of f/2.8, such that the person and cactus appear in focus, while the background is blurred. Computer system 600 updates the appearance of depth indicator 630, for example, changing the color, shading, and/or visual emphasis of depth indicator 630 (e.g., represented in FIG. 8M and elsewhere by shading) to indicate that depth indicator 630 is selected, and displaying aperture setting indicator 648, which indicates that the current simulated aperture setting is f/2.8. In some embodiments, in response to detecting additional inputs of the first input type, computer system 600 toggles between displaying camera preview 612 without the simulated depth-of-field effect and with the simulated depth-of-field effect applied using a simulated aperture setting is f/2.8.

Figures 8O, 8P:
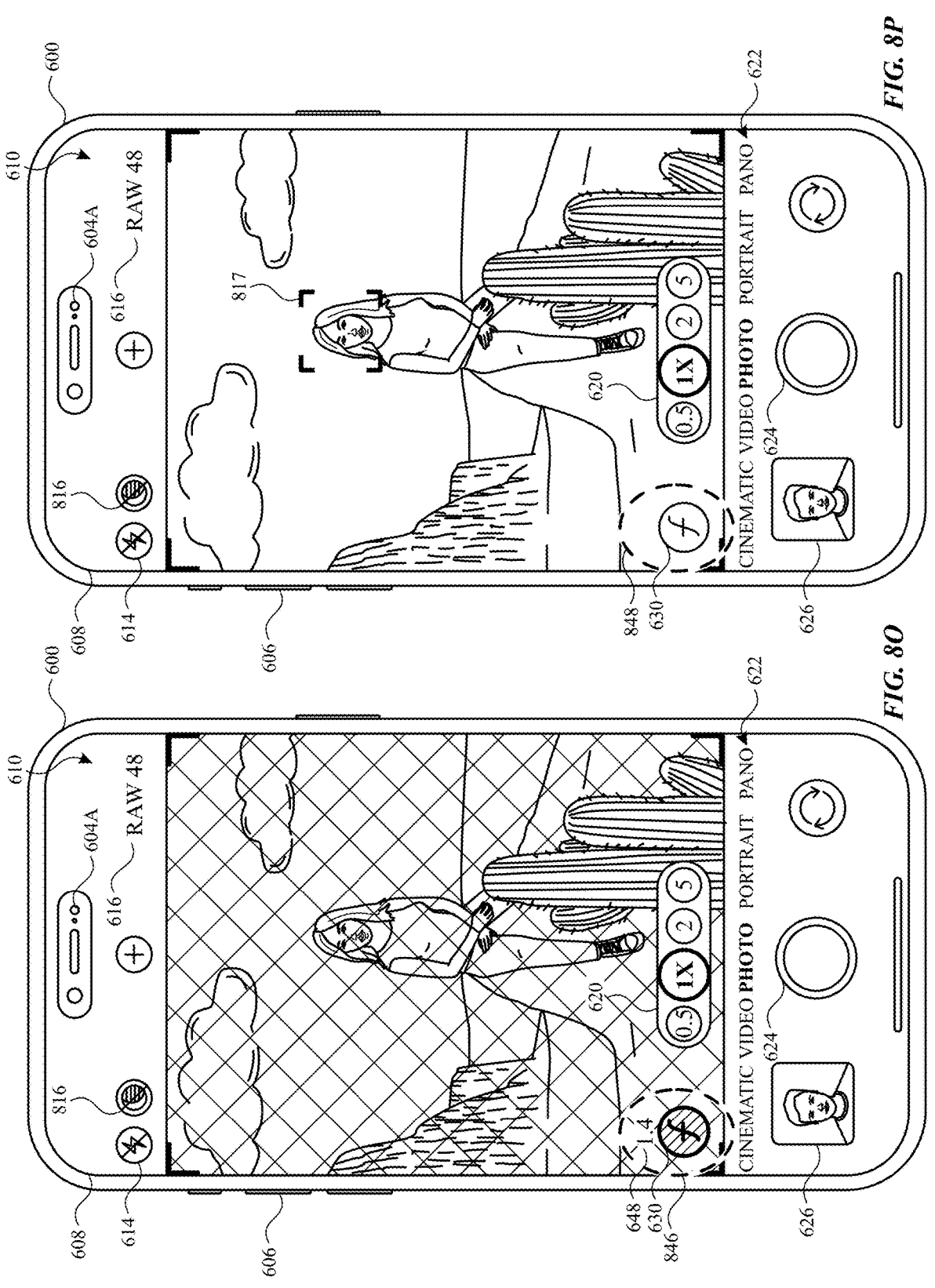

At FIG. 8M, computer system 600 detects input 842 directed to the location of depth indicator 630, which is an input of the second input type. In response to detecting input 842 (e.g., the second type of input), at FIG. 8N, computer system 600 displays aperture setting slider 644 including aperture setting indicator 646 (e.g., as described with respect to FIG. 6G). As illustrated in FIG. 8N, while displaying aperture setting slider 644, computer system 600 detects input 844 (e.g., a drag and/or gesture input via a touch-sensitive surface of display 608) along aperture setting slider 644 (e.g., as described with respect to FIGS. 6H-6I). As illustrated in FIG. 8O, in response to detecting input 844, computer system 600 changes the depth capture setting to a simulated aperture setting of f/1.4, such that computer system 600 displays camera preview 612 with the cactus in focus and the person and background blurred.

At FIG. 8O, computer system 600 detects input 846 directed to the location of depth indicator 630, which is an input of the first input type. In response to detecting input 846 (e.g., the first type of input), at FIG. 8P, computer system 600 ceases displaying camera preview 612 with the simulated depth-of-field effect and updates the appearance of depth indicator 630, for example, changing the color, shading, and/or visual emphasis of depth indicator 630 (e.g., reverting the changes in appearance described with respect to FIG. 8M) to indicate that depth indicator 630 is deselected.

Figures 8Q, 8R:
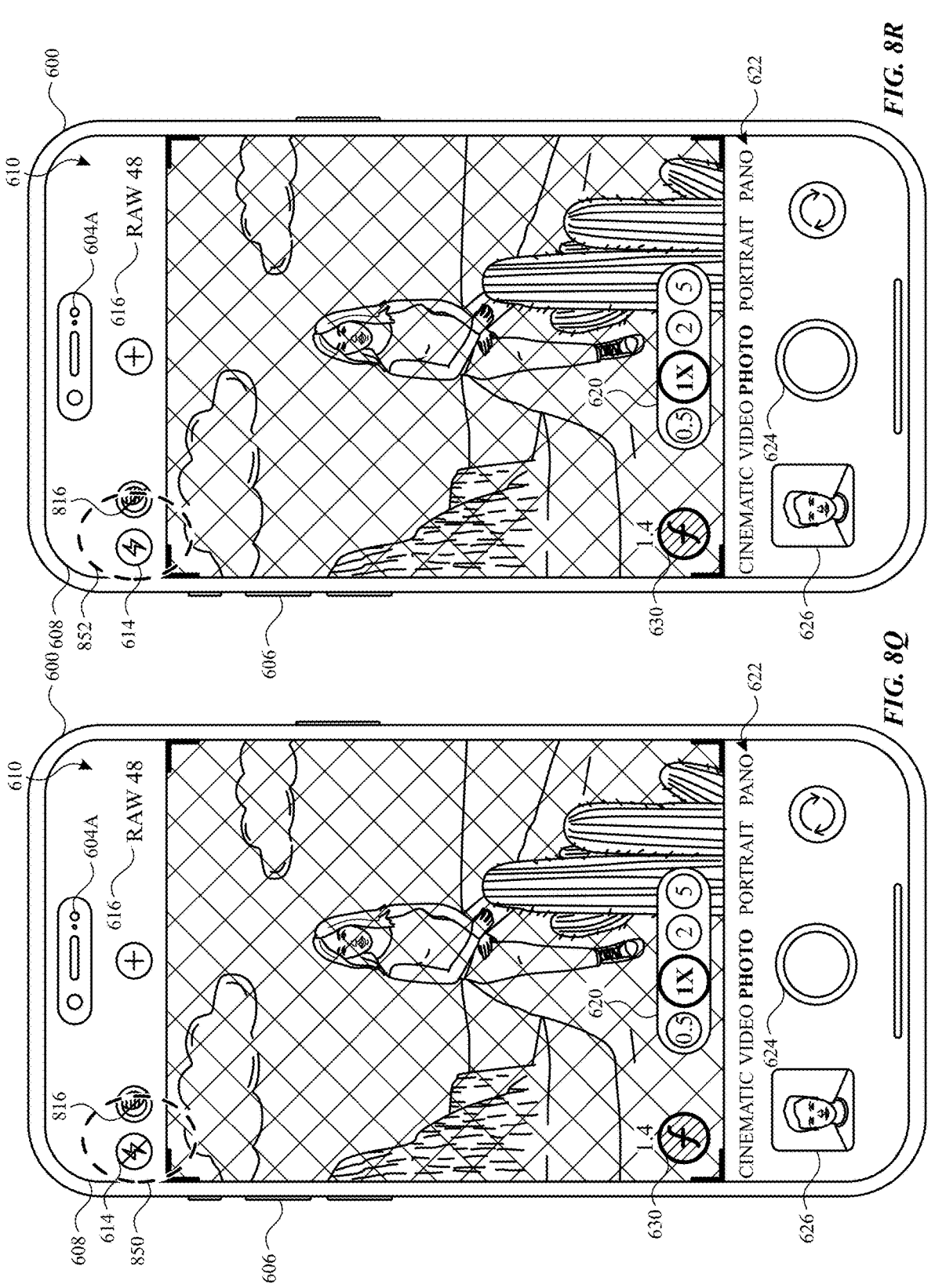
Figures 8S, 8T:
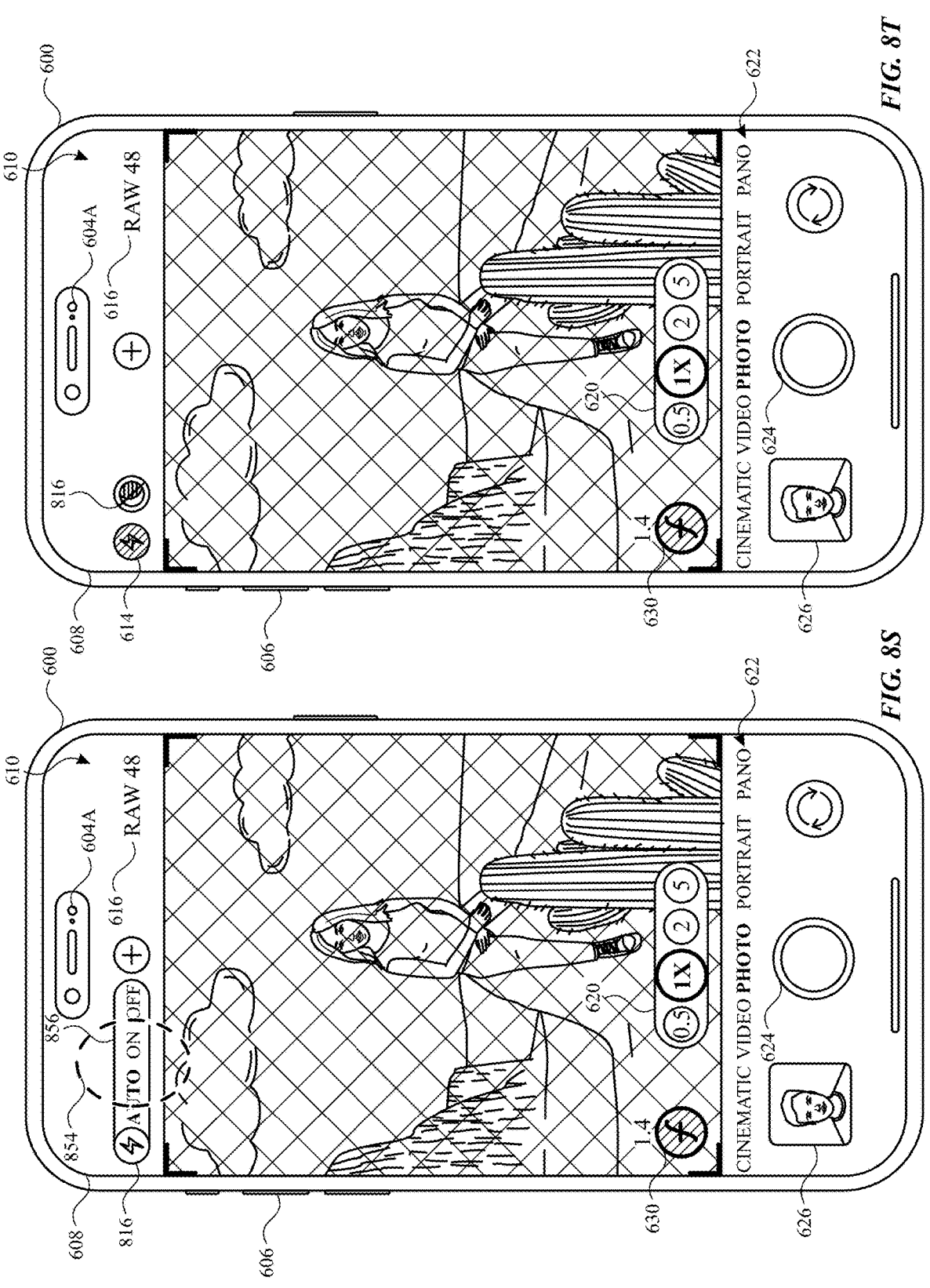

At FIG. 8P, computer system 600 detects input 848 directed to the location of depth indicator 630, which is an input of the first input type. In response to detecting input 848 (e.g., the first type of input), at FIG. 8Q, computer system 600 displays camera preview 612 with a simulated depth-of-field effect, again enabling media capture with the simulated depth-of-field effect applied. As illustrated in FIG. 8Q, the simulated depth-of-field effect is applied with a simulated aperture setting of f/1.4, the f-stop value selected via aperture setting slider 644 prior to deselecting depth indicator 630. Accordingly, in response to detecting additional inputs of the first input type, computer system 600 toggles between displaying camera preview 612 without the simulated depth-of-field effect and with the simulated depth-of-field effect applied using a single simulated aperture setting (e.g., a default and/or last-used f-stop value), while inputs of the second input type (e.g., opening aperture setting slider 644) are used to apply select any other simulated aperture settings.

At FIG. 8Q, computer system 600 detects input 850, which is an input of the first input type, directed to the location of flash affordance 614. In response to detecting input 850 (e.g., the first type of input), at FIG. 8R, computer system 600 changes the camera flash setting to an automatic flash mode (e.g., a mode wherein computer system 600 automatically determines whether or not to use flash for a media capture, for example, based on detected ambient light and/or the determined brightness of camera preview 612). In response to detecting input 850 (e.g., and changing the camera flash setting to the automatic state), computer system 600 updates the appearance of flash affordance 614, for example, removing the line through flash affordance 614 to indicate the automatic flash mode is selected.

At FIG. 8R, computer system 600 detects input 852, which is an input of the second input type, directed to the location of flash affordance 614. In response to detecting input 852 (e.g., the second type of input), at FIG. 8S, computer system 600 displays camera flash menu 856. As illustrated in FIG. 8S, while displaying camera flash menu 856, computer system 600 ceases to display other user interface elements in the area of camera flash menu 856, such as night mode affordance 816. Camera flash menu 856 includes selectable options corresponding to the automatic flash mode ("AUTO"), the off state ("OFF"), and an "on" state ("ON") (e.g., an "always on" mode wherein computer system 600 always uses flash for media capture). In some embodiments, computer system 600 ceases displaying camera flash menu 856 after a threshold period of time without detecting an input on camera flash menu 856 and/or after detecting an input at a location other than the location of camera flash menu 856.

At FIG. 8S, while displaying camera flash menu 856, computer system 600 detects input 854 (e.g., a continuation of input 852 and/or a distinct input from input 852, as described above with respect to input 838). As illustrated in FIG. 8S, input 854 is directed to the location of the selectable option corresponding to the on state. In response to detecting input 854, at FIG. 8T, computer system 600 changes the camera flash setting to the on state, and updates the appearance of flash affordance 614, for example, visually emphasizing flash affordance 614 (e.g., represented by shading in FIG. 8T) to indicate camera flash setting is in the on state.

FIG. 9 is a flow diagram illustrating a method for controlling media capture settings using a computer system in accordance with some embodiments. Method 900 is performed at a computer system (e.g., 100, 300, 500, and/or 600) that is in communication with a display generation component (e.g., 608) (e.g., a display controller; a touch-sensitive display system; a display (e.g., integrated and/or connected), a 3D display, a transparent display, a projector, and/or a heads-up display) and a camera (e.g., 604A, 604B, 604C, and/or 604D) (in some embodiments, the computer system includes one or more cameras, such as a rear (e.g., user-facing) camera and a forward (e.g., environment-facing) camera and/or a plurality of forward cameras (e.g., with different lenses, such as a standard camera, a telephoto camera, and/or a wide-angle camera)) (in some embodiments, the computer system includes one or more depth sensors). Some operations in method 900 are, optionally, combined, the orders of some operations are, optionally, changed, and some operations are, optionally, omitted.

As described below, method 900 provides an intuitive way for controlling media capture settings. The method reduces the cognitive burden on a user for controlling media capture settings, thereby creating a more efficient human-machine interface. For battery-operated computing devices, enabling a user to controlling media capture settings faster and more efficiently conserves power and increases the time between battery charges.

The computer system (e.g., 600) displays (902), via the display generation component (e.g., 608), a camera user interface (e.g., 610) (e.g., a camera/capture UI including at least a portion of a field-of-view of the camera(s); in some embodiments, the camera UI includes one or more zoom control affordances, one or more capture mode affordances (e.g., for standard photo capture, standard video capture, panoramic photo capture, portrait-mode photo capture, and/or high frame rate video capture), one or more camera selection affordances (e.g., for switching between one or more lenses and/or a front- and back-facing camera), one or more flash control affordances, one or more framing elements, one or more captured media affordances (e.g., a photo well and/or affordance for accessing a photo library), and/or one or more capture affordances), wherein the camera user interface includes a selectable user interface object (e.g., 614, 616, 630, and/or 816) that corresponds to a current state of a first media capture setting, wherein the current state of the first media capture setting is a first state, and wherein a plurality of states including the first state are available for the first media capture setting (e.g., a status indicator/affordance for a camera setting, such as a depth capture/f-stop setting, a zoom setting, a flash setting, a night mode/exposure setting, and/or a media codec setting).

The computer system detects (904) (in some embodiments, via a touch-sensitive and/or pressure-sensitive surface of a display) a first user input (e.g., 818, 820, 828, 830, 832, 834, 840, 842, 846, 848, 850, and/or 852) corresponding to (e.g., selecting; e.g., received at and/or near a location of the selectable user interface object on a touch-sensitive/pressure-sensitive surface of a display) the selectable user interface object (e.g., 614, 616, 630, and/or 816).

The computer system, in response to detecting the first user input (906) and in accordance with a determination that the first user input is an input of a first type (e.g., 818, 828, 830, 832, 840, 846, 848, and/or 850) (e.g., a tap or a rapid quick activation of a button, and/or an input of a duration below a predetermined threshold), switches (908) the first media capture setting to a second state of the plurality of states that is different from the first state (e.g., as illustrated in FIGS. 8E, 8H, 8I, 8J, 8M, 8P, 8Q, and 8R) (e.g., switching the respective media capture setting from the first state to the second state) (e.g., switching between capture settings/options; in some embodiments, switching an setting from "off" to "on" or vis versa; in some embodiments, switching between different "on" settings/options (e.g., from an f-stop of 1.8 to an f-stop of 2.4 and/or from RAW to HEIC)).

The computer system, in response to detecting the first user input and in accordance with a determination that the first user input is an input of a second type (e.g., 820, 834, 842, and/or 852) (in some embodiments, a relatively long input, such as a long press and/or click-and-hold input), displays (910) a selectable user interface object (e.g., 644, 824, 836, and/or 856) (e.g., an expanded options affordance for the media capture settings, such as a menu and/or slider; in some embodiments, a plurality of options; in some embodiments, a plurality of additional selectable options) that corresponds to a third state of the plurality of states of the first media capture setting, wherein the selectable user interface object that corresponds to the third state, when selected (e.g., via 826, 838, 844, and/or 854) (e.g., via a user input, such as a tap gesture or an air gesture, directed to the selectable user interface object), causes the first media capture setting to switch to the third state (e.g., as illustrated in FIGS. 8G, 8L, 8O, and 8T) (e.g., from a current state such as the first state) (in some embodiments, in response to detecting an input selecting the selectable user interface object, the computer system causes the first media capture setting to switch to the third state), wherein the third state is different from the first state and is different from the second state. Using a respective selectable user interface object to toggle a setting in response to a first type of input and to provide additional options for the setting in response to a second type of input provides improved media capture control options to a user without cluttering the media capture user interface with additional displayed controls. Doing so also assists the user with composing media capture events and reduces the risk that transient media capture opportunities are missed or captured with unintended media capture settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the camera user interface includes (in some embodiments, concurrently includes along with the selectable user interface object) a second selectable user interface object (e.g., 614, 616, 630, and/or 816) that corresponds to a current state of a second media capture setting (e.g., another status indicator/affordance for a camera setting, such as a depth capture/f-stop setting, a zoom setting, a flash setting, a night mode/exposure setting, and/or a media codec setting) different from the first media capture setting, wherein the current state of the second media capture setting is a first state. In some embodiments, the computer system detects a second user input (e.g., 818, 820, 828, 830, 832, 834, 840, 842, 846, 848, 850, and/or 852) corresponding to (e.g., selecting) the second selectable user interface object.

In some embodiments, in response to detecting the second user input and in accordance with a determination that the second user input is an input of the first type (e.g., 818, 828, 830, 832, 840, 846, 848, and/or 850) (e.g., a tap or a rapid quick activation of a button, and/or an input of a duration below a predetermined threshold), switching the second media capture setting to a second state that is different from the first state (e.g., as illustrated in FIGS. 8E, 8H, 8I, 8J, 8M, 8P, 8Q, and 8R) (e.g., switching the respective media capture setting from the first state to the second state) (e.g., switching between capture settings/options; in some embodiments, switching an setting from "off" to "on" or vis versa; in some embodiments, switching between different "on" settings/options (e.g., from an f-stop of 1.8 to an f-stop of 2.4 and/or from RAW to HEIC)). In some embodiments, in response to detecting the second user input and in accordance with a determination that the second user input is an input of the second type (e.g., 820, 834, 842, and/or 852) (in some embodiments, a relatively long input, such as a long press and/or click-and-hold input), the computer system displays a selectable user interface object (e.g., 644, 824, 836, and/or 856) (e.g., an expanded options affordance for the media capture settings, such as a menu and/or slider; in some embodiments, a plurality of options; in some embodiments, a plurality of additional selectable options) that corresponds to a third state of the second media capture setting, wherein the selectable user interface object that corresponds to the third state, when selected (e.g., via 826, 838, 844, and/or 854) (e.g., via a user input, such as a tap gesture or an air gesture, directed to the selectable user interface object), causes the second media capture setting to switch to the third state (e.g., as illustrated in FIGS. 8G, 8L, 8O, and 8T) (e.g., from a current state such as the first state; in some embodiments, in response to detecting an input selecting the selectable user interface object, the computer system causes the second media capture setting to switch to the third state), wherein the third state is different from the first state and is different from the second state. Having multiple different selectable user interface object that toggle a setting in response to a first type of input and to provide additional options for the setting in response to a second type of input provides improved media capture control options to a user without cluttering the media capture user interface with additional displayed controls. Doing so also assists the user with composing media capture events and reduces the risk that transient media capture opportunities are missed or captured with unintended media capture settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, switching the first media capture setting to a respective state (e.g., either in response to an input of the first type or in response to a selection of the selectable user interface object corresponding to the third state) is performed while displaying (e.g., maintaining display of) the camera user interface (e.g., 610) (e.g., the respective media capture setting is changed while maintaining display of the rest of the camera UI). Providing an affordance to allow a user to switch a media capture setting while still displaying the camera user interface assists the user with composing media capture events and reduces the risk that transient media capture opportunities are missed or captured with unintended media capture settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the camera user interface (e.g., 610) includes a camera preview (e.g., 612) that includes a representation of a field-of-view of the camera (e.g., a live preview of the camera feed including a portion of the environment). Providing an affordance to allow a user to switch a media capture setting while still displaying the live camera preview assists the user with composing media capture events and reduces the risk that transient media capture opportunities are missed or captured with unintended media capture settings, which enhances the operability of the system and makes the user-system interface more efficient.

In some embodiments, the camera user interface includes at least one selectable user interface object that (e.g., 624), when selected (e.g., via a user input, such as a tap gesture or an air gesture, directed to the selectable user interface object; in some embodiments, in response to detecting an input selecting the selectable user interface object, the computer system initiates capture of media (e.g., initiates taking a photo and/or capturing video and storing the media in a media library)), initiates capture of media (e.g., as illustrated in FIGS. 6J, 6L, and 6R) (e.g., the camera user interface is a camera capture user interface; e.g., including a shutter/capture affordance). Providing an affordance to allow a user to switch a media capture setting while still displaying a capture user interface assists the user with composing media capture events and reduces the risk that transient media capture opportunities are missed or captured with unintended media capture settings, which enhances the operability of the system and makes the user-system interface more efficient.

In some embodiments, the input of the first type includes a selection input (e.g., 818, 828, 830, 832, 840, 846, 848, and/or 850) (e.g., a tap gesture or an air gesture), (e.g., received at a touch-sensitive and/or pressure-sensitive surface; in some embodiments, of a display) wherein a start of the selection input and an end of the selection input (e.g., liftoff of a contact that was detected as part of the start of the tap gesture) occur within a first threshold period of time (e.g., a, quick tap; e.g. detecting the initial application of pressure followed by lift-off of pressure within a predetermined time limit (e.g., within 0.05 seconds, 0.1 seconds, and/or 0.5 seconds)). Using a tap input to switch the media capture setting between at least two states the user with composing media capture events and reduces the risk that transient media capture opportunities are missed or captured with unintended media capture settings, for example, as the user can toggle between the settings with a quick input.

In some embodiments, the input of the second type includes a press input (e.g., 820, 834, 842, and/or 852), (e.g., received at a touch-sensitive and/or pressure-sensitive surface; in some embodiments, of a display) wherein an initial touch of the press input that is maintained for at least a second threshold period of time (e.g., a long/held press; e.g. detecting the initial application of pressure held for at least a predetermined amount of time before detecting lift-off of pressure (e.g., held over 0.05 seconds, 0.1 seconds, 0.2, 0.5, 1 and/or 2 seconds)). Using a long press input to view additional settings options for the media capture setting provides improved media capture control options to a user without cluttering the media capture user interface with additional displayed controls. Doing so also assists the user with composing media capture events and reduces the risk that transient media capture opportunities are missed or captured with unintended media capture settings, for example, while seeking out additional options for the media capture setting.

In some embodiments, the first media capture setting is a simulated depth-of-field capture setting (e.g., as described with respect to FIGS. 6A-6U) (e.g., capturing media with depth information and/or applying a simulated depth-of-field effect to the camera preview and/or captured media), and the plurality of states of the first media capture setting includes a disabled state (e.g., as illustrated in FIG. 8L) (e.g., an off state, where depth information is not captured and/or the simulated depth-of-field effect is not applied to the camera preview and/or the captured media); a first enabled state (e.g., an on state, where depth information is captured and/or the simulated depth-of-field effect is applied to the camera preview and/or the captured media), wherein a simulated aperture size (e.g., f-stop value, such as 1.8, 2.4, and/or 4.2) of the simulated depth-of-field capture setting is set to a first value (e.g., as illustrated in FIG. 8M) (in some embodiments, if the first enabled state is the first state or second state, the first value is a default, favorite, and/or last-used f-stop value) in the first enabled state; and a second enabled state, wherein the simulated aperture size of the simulated depth-of-field capture setting is set to a second value different from the first value in the second enabled state (e.g., as illustrated in FIGS. 8O and 8Q) (in some embodiments, if the second enabled state is the third state, an f-stop value other than the default, favorite, and/or last-used f-stop value that is enabled and/or disabled using the first type of input). Using the first and second type of input to set different depth capture settings provides improved media capture control options to a user without cluttering the media capture user interface with additional displayed controls. Doing so also assists the user with composing media capture events and reduces the risk that transient media capture opportunities are missed or captured with unintended media capture settings, for example, while seeking out additional options for the depth capture setting.

In some embodiments, the first media capture setting is a flash setting (e.g., a setting of a camera flash; in some embodiments, the camera flash is a flash output using a light-emitting device of the computer system (e.g., a flash-bulb); in some embodiments, the camera flash is a flash output using a display of the computer system), and the plurality of states of the first media capture setting includes a disabled state (e.g., as illustrated in FIG. 8Q) (e.g., an off state, such that the camera flash is not used when capturing media); a first enabled state (e.g., as illustrated in FIG. 8T) (e.g., an on state), wherein, while the first media capture setting is in the first enabled state, initiating a respective media capture operation triggers a camera flash (e.g., the flash is "always on" and will trigger for all media captures and/or all photo media captures); and a second enabled state (e.g., as illustrated in FIG. 8R) (e.g., an automatic state), wherein while the first media capture setting is in the second enabled state, initiating the respective media capture operation triggers the camera flash in accordance with a determination (in some embodiments, the determination is made before the media capture operation is triggered; in some embodiments, the determination is made in response to an input initiating the media capture operation), based on obtained luminance data (in some embodiments, from a light sensor of the computer system; in some embodiments, from the one or more cameras), to enable the camera flash (e.g., the flash is automatic and will, e.g., trigger for media captures in low-light settings and not trigger for captures in higher-light settings). Using the first and second type of input to set different flash capture settings provides improved media capture control options to a user without cluttering the media capture user interface with additional displayed controls. Doing so also assists the user with composing media capture events and reduces the risk that transient media capture opportunities are missed or captured with unintended media capture settings, for example, while seeking out additional options for flash.

In some embodiments, the first media capture setting is a low-light capture setting (e.g., a setting for automatically adjusting an exposure duration and/or simulated shutter speed based on luminance data; in some embodiments, a night mode setting) and the plurality of states of the first media capture setting includes a disabled state, wherein an exposure duration for media capture is set to a first duration value in the disabled state (e.g., as illustrated in FIG. 8D) (e.g., a standard/default exposure (e.g., capture) duration, simulated shutter speed, and/or frame rate appropriate for non-low-light media capture, such as an exposure duration of under 0.2 s, 0.5 s, and/or Is); a first enabled state (e.g., as illustrated in FIG. 8E), wherein, in the first enabled state, an exposure duration value for media capture not exceeding a first maximum exposure duration (e.g., a maximum capture duration of Is, 2*s*, and/or 3*s*; in some embodiments, if the first enabled state is the first state or second state, the first maximum exposure duration is a default, favorite, and/or last-used maximum exposure duration; in some embodiments, the first maximum exposure duration is longer than the first duration value) is determined (e.g., exposure duration is automatically increased up to the set maximum value as ambient light decreases and/or is automatically decreased as ambient light increases) based on obtained luminance data (in some embodiments, from a light sensor of the computer system; in some embodiments, from the one or more cameras) (in some embodiments, enabling a low-light capture mode using a maximum exposure duration includes capturing a sequence of images (e.g., frames) during a period of time lasting up to the maximum exposure duration, wherein the sequence of images are captured at one or more configurable frame rates and/or with one or more configurable exposure durations (e.g., configured based on the luminance data) (e.g., using lower frame rates and/or longer exposure times to capture one or more brighter frames, based on a greater amount of camera data (e.g., light) captured in the frames and/or using higher frame rates and/or shorter exposure times to capture one or more darker (but less prone to blurring) frames) and, in some embodiments, combining one or more images of the sequence of images (e.g., using a neural network and/or other machine-learning systems and/or techniques, to select pixels from one or more frames and/or to discard one or more frames (e.g., frames captured with longer exposure times can be blurrier due to motion of the one or more cameras during the longer exposure times))); and a second enabled state (e.g., as illustrated in FIG. 8G), wherein, in the second enabled state, an exposure duration value for media capture not exceeding a second maximum exposure duration (in some embodiments, if the second enabled state is the third state, a maximum duration other than the default, favorite, and/or last-used maximum exposure duration that is enabled and/or disabled using the first type of input; in some embodiments, the second maximum exposure duration is longer than the first duration value), different from the first maximum exposure duration, is determined based on the obtained luminance data. Using the first and second type of input to set different low-light capture settings provides improved media capture control options to a user without cluttering the media capture user interface with additional displayed controls. Doing so also assists the user with composing media capture events and reduces the risk that transient media capture opportunities are missed or captured with unintended media capture settings, for example, while seeking out additional options for low-light capture.

In some embodiments, the first media capture setting is a media size setting (e.g., resolution and/or file size) and the plurality of states of the first media capture setting includes a state for capturing media of a first media capture size, a state for capturing media of a second media capture size, and a state for capturing media of a third media capture size, wherein the first media capture size, second media capture size, and third media capture size are all different (e.g., 12, 24, and 48 MP resolution and/or 5 MB, 10 MB, and 20 MB file size). Using the first and second type of input to set the media capture size provides improved media capture control options to a user without cluttering the media capture user interface with additional displayed controls. Doing so also assists the user with composing media capture events and reduces the risk that transient media capture opportunities are missed or captured with unintended media capture settings, for example, while seeking out additional options for resolution and/or file size.

In some embodiments, the first media capture setting is a media format setting (e.g., for selecting a media compression codec) and the plurality of states of the first media capture setting includes a state for capturing media using a first media capture format, a state for capturing media using a second media capture format, and a state for capturing media using a third media capture format, wherein the first media capture format, second media capture format, and third media capture format are all different (in some embodiments, capturing media using a particular format includes compressing the captured media data using a particular codec, such as RAW, HEIC/HEVC, and/or MPEG codecs; in some embodiments, capturing media using a particular format includes encoding and storing the captured media data using a particular file format). Using the first and second type of input to set the media capture format provides improved media capture control options to a user without cluttering the media capture user interface with additional displayed controls. Doing so also assists the user with composing media capture events and reduces the risk that transient media capture opportunities are missed or captured with unintended media capture settings.

In some embodiments, at least one of the first state of the first media capture setting and the second state of the first media capture setting (e.g., the states that can be toggled between using the first type of input) is a state selected by a user of the computer system (e.g., as illustrated in FIGS. 8B-8C and 8N-8O) (e.g., via a camera settings user interface; in some embodiments, the camera settings user interface is distinct from the camera user interface (e.g., a separate settings menu or application); in some embodiments, the camera settings user interface is included in the camera user interface). Using the first type of input to enable or disable a particular user-selected setting provides improved media capture control options to a user without cluttering the media capture user interface with additional displayed controls, for example, by allowing the user to quickly enable a favorite or frequently-used setting. Doing so also assists the user with composing media capture events and reduces the risk that transient media capture opportunities are missed or captured with unintended media capture settings.

In some embodiments, switching the first media capture setting between the first state and the second state includes switching the first media capture setting between an enabled state (e.g., turning the respective setting on; in some embodiments, enabling the respective setting with a particular value) and a disabled state (e.g., as illustrated in FIGS. 8D-8E, 8G-8H, 8L-8M, and 8O-8R) (e.g., turning the respective setting off) (in some embodiments, the first type of input only toggles between the disabled and enabled state; in some embodiments, the first type of input toggles between the disabled state and multiple different enabled states). Using the first type of input to enable or disable the setting provides improved media capture control options to a user without cluttering the media capture user interface with additional displayed controls, for example, by allowing the user to quickly turn the setting on or off. Doing so also assists the user with composing media capture events and reduces the risk that transient media capture opportunities are missed or captured with unintended media capture settings.

In some embodiments, switching the first media capture setting to the enabled state includes setting the first media capture setting to a first value, wherein the first value is a previously-applied value (e.g., as illustrated in FIG. 8Q) (in some embodiments, the value of the first media capture setting the last time the first media capture setting was enabled (e.g., last-used); in some embodiments, a default value of the first media capture setting). Using the first type of input to toggle the setting between the off state and the last-used on state provides improved media capture control options to a user without cluttering the media capture user interface with additional displayed controls, for example, by allowing the user to quickly toggle the setting on and off at a particular value. Doing so also assists the user with composing media capture events and reduces the risk that transient media capture opportunities are missed or captured with unintended media capture settings.

In some embodiments, switching the first media capture setting between the first state and the second state includes switching the first media capture setting between a first enabled state and a second enabled state different from the first enabled state (e.g., as illustrated in FIGS. 8E and 8H-8J) (in some embodiments, for a setting that does not have a disabled/off state (e.g., media format and/or media size) the first type of input only toggles between the first and second enabled states and/or between multiple different enabled states; in some embodiments, the first type of input toggles between the disabled state and multiple different enabled states (e.g., an "always on" and "auto" mode for flash, multiple different f-stop values for a depth effect, and/or multiple different exposure settings); in some embodiments, the first type of input toggles between three or more different enabled states (e.g., different f-stop values and/or different maximum exposures)), wherein while in the first enabled state, the first media capture setting is set to a first value and while in the second enabled state, the first media capture setting is set to a second value different from the first value. Using the first type of input to toggle the setting between two different modes provides improved media capture control options to a user without cluttering the media capture user interface with additional displayed controls, for example, by allowing the user to quickly toggle between different values for a setting. Doing so also assists the user with composing media capture events and reduces the risk that transient media capture opportunities are missed or captured with unintended media capture settings.

In some embodiments, the third state of the first media capture setting is not selected (e.g., is not selectable) in response to detecting a respective user input of the first type corresponding to the selectable user interface object (e.g., inputs of the first type cause the media capture setting to be toggled through a predetermined set of states that includes the first and second state but does not include the third state) (e.g., as illustrated in sidebar 822 of FIG. 8E and FIG. 8G). Using the first type of input to toggle the setting between at least different states but not the third state provides improved media capture control options to a user without cluttering the media capture user interface with additional displayed controls. Doing so also assists the user with composing media capture events and reduces the risk that transient media capture opportunities are missed or captured with unintended media capture settings.

Note that details of the processes described above with respect to method 900 (e.g., FIG. 9) are also applicable in an analogous manner to the methods described below/above. For example, method 900 optionally includes one or more of the characteristics of the various methods described above with reference to method 700 and below with reference to methods 1100, 1300, 1700, 1900, 2100, and/or 2300. For example, the conditional depth capture settings described with respect to method 700 can also be controlled as described with respect to method 900. For example, a camera user interface implementing the controls of method 900 can also incorporate the zoom user interface described with respect to method 1100 and the external storage user interface described with respect to method 1300. For brevity, these details are not repeated below.

FIGS. 10A-10I illustrate exemplary user interfaces for controlling zoom settings for media capture, in accordance with some embodiments. The user interfaces in these figures are used to illustrate the processes described below, including the processes in FIG. 11.

Figure 10A:
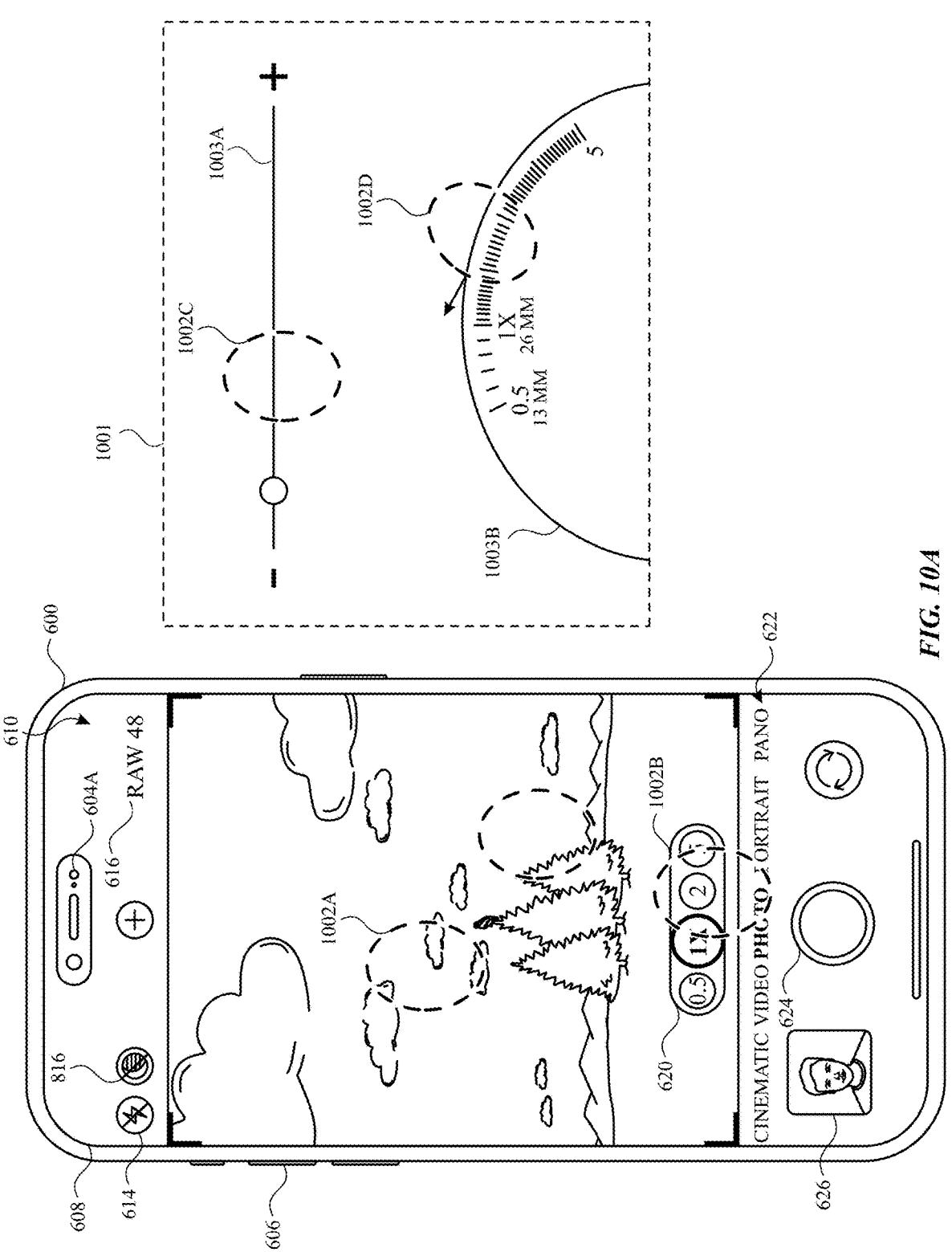
FIGS. 10A-10I illustrate example techniques and user interfaces for controlling zoom settings for media capture in accordance with some embodiments.

At FIG. 10A, computer system 600 displays, via display 608, camera user interface 610 including camera preview 612, zoom affordance 620 (e.g., including zoom level options for 0.5× magnification, 1× magnification, 2× magnification, and 5× magnification) capture mode menu 622, shutter affordance 624, and captured media icon 626, media format affordance 616, depth indicator 630, flash affordance 614, and night mode affordance 816 (e.g., as described above with respect to FIGS. 6A-6U and 8A-8T). As indicated by zoom affordance 620, at FIG. 10A, the current zoom level is set to 1× magnification, and the portion of the field-of-view of the camera(s) (e.g., second camera 604B, third camera 604C, and/or fourth camera 604D) included in camera preview 612 at the zoom level of 1× magnification represents a portion of the environment including three far-off trees surrounded by a mountainous landscape and cloudy sky.

At FIG. 10A, computer system 600 detects an input requesting to increase the zoom level for media capture. For example, the input requesting to increase the zoom level includes input 1002A, a two-finger pinch-to-zoom gesture (e.g., an input where computer system 600 detects two fingers touching down followed by movement from their initial positions, where movement converging the locations of the two fingers indicates a request to zoom out (e.g., decrease magnification) and movement diverging the locations of the two fingers indicates a request to zoom in (e.g., increase magnification)), and/or input 1002B, an input via zoom affordance 620. In some embodiments, input 1002B is a short tap input (e.g., as described with respect to input 818) directed to a particular zoom level option (e.g., 2× magnification) of zoom affordance 620. In some embodiments, input 1002B is a long press input (e.g., as described with respect to input 820) on zoom affordance 620, which causes computer system 600 to display additional zoom controls such as zoom slider 1003A and/or zoom wheel 1003B, illustrated in sidebar 1001 of FIG. 10A. In some embodiments, input 1002B includes an input directed to the additional zoom controls, such as input 1002C (e.g., a drag gesture along zoom slider 1003A, where movement to the left indicates a request to zoom out and movement to the right indicates a request to zoom in) and/or input 1002D (e.g., a drag gesture around zoom wheel 1003B, where clockwise movement indicates a request to zoom out and counterclockwise movement indicates a request to zoom in).

Figures 10B, 10C:
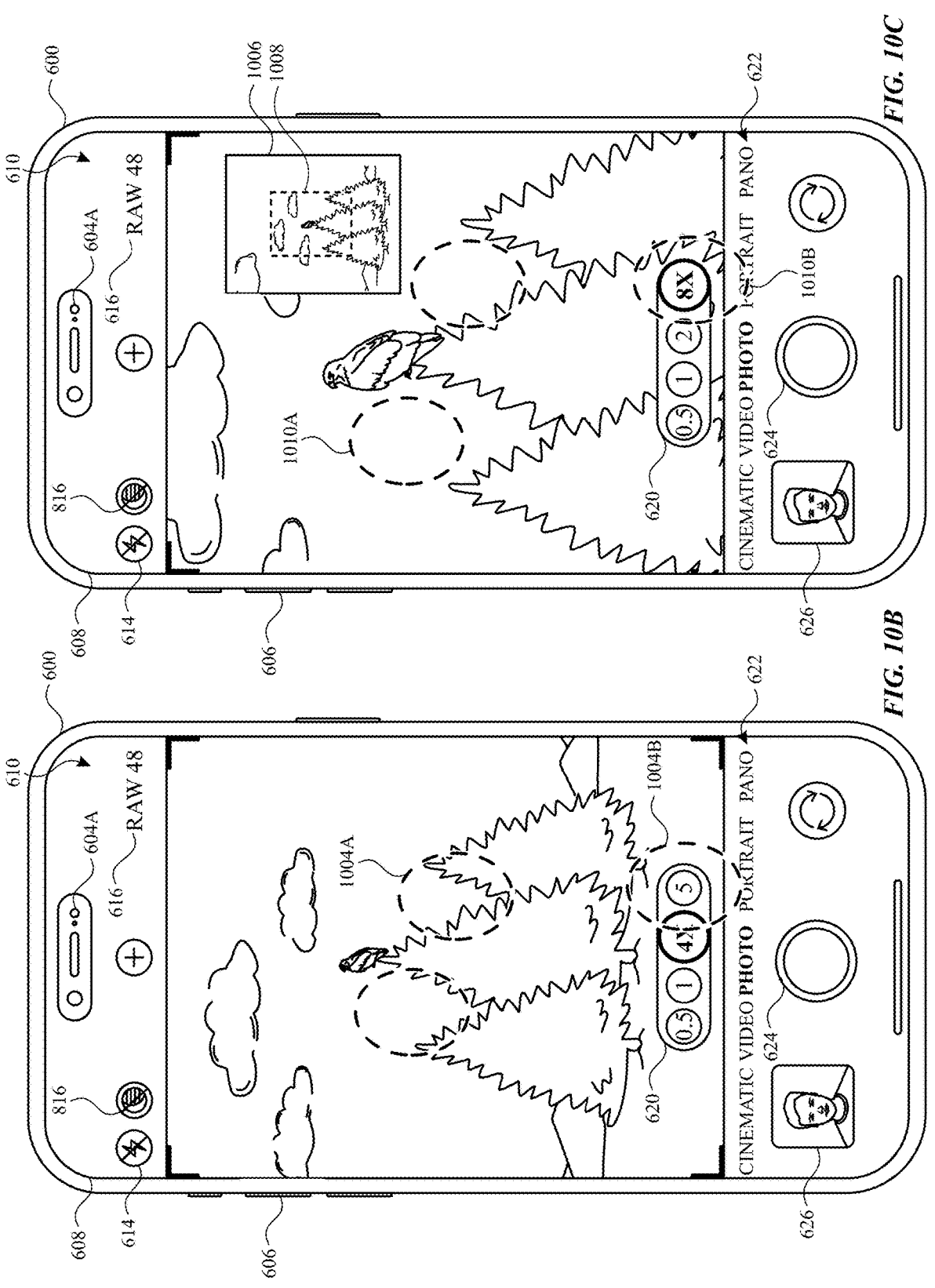

As illustrated in FIG. 10B, in response to detecting input(s) requesting to increase the zoom level for media capture, computer system 600 changes the zoom level accordingly, increasing the zoom level to 4× magnification as indicated by zoom affordance 620. At the zoom level of 4× magnification, camera preview 612 includes the three trees at a higher magnification, revealing a bird perched on the center tree, and including less of the mountainous landscape and cloudy sky than was included in the camera preview 612 at the zoom level of 1× magnification.

At FIG. 10B, computer system 600 detects another input requesting to increase the zoom level for media capture, such as pinch-to-zoom gesture input 1004A (e.g., as described with respect to input 1002A) and/or input 1004B via zoom affordance 620 (e.g., as described with respect to input 1002B, input 1002C, and/or input 1002D). In response to detecting the input requesting to change the zoom level for media capture (e.g., input 1004A and/or 1004B), in FIG. 10C, computer system 600 changes the zoom level accordingly, increasing the zoom level to 8× magnification as indicated by zoom affordance 620. At the zoom level of 8× magnification, camera preview 612 includes a further magnified view of the upper portions of the three trees, the bird perched on the middle tree, and some of the sky behind the trees, and no longer includes any of the mountainous landscape.

As illustrated in FIG. 10C, in response to increasing the zoom level to a first threshold of at least 8× magnification, computer system 600 displays mini-map 1006, which is an inset view (e.g., a secondary preview) of a portion of the field-of-view of the cameras (e.g., second camera 604B, third camera 604C, and/or fourth camera 604D) that is displayed superimposed over the upper right corner of camera preview 612. The portion of the field-of-view of the camera(s) represented in mini-map 1006 is a "zoomed-out" view, representing a larger portion of the environment than the portion of the field-of-view of the camera(s) represented in camera preview 612 at the current zoom level, while being displayed with a smaller overall size than camera preview 612. In some embodiments, when the zoom level first increases to the threshold of at least 8× magnification (e.g., upon initially displaying mini-map 1006), computer system 600 displays mini-map 1006 with a zoom level of 4× magnification. Additionally, both the portion of the field-of-view of the camera(s) represented in mini-map 1006 and the portion of the field-of-view of the camera(s) represented in camera preview 612 are centered around the same point of the environment (e.g., the bird perched in the center tree). Accordingly, as illustrated in FIG. 10C, the portion of the environment represented in mini-map 1006 includes a view of the entirety of the three trees, portions of the mountainous landscape, and more of the sky, previewing the environment outside of the portion that is currently visible in camera preview 612 and that would currently be included (e.g., captured) in a media capture.

Additionally, computer system 600 displays mini-map 1006 with view indicator 1008, which frames the central region of mini-map 1006 that corresponds to the portion of the field-of-view of the camera(s) included in camera preview 612, visually situating the zoomed-in view of camera preview 612 within the zoomed-out view of mini-map 1006. As noted above, in some embodiments, when camera preview 612 is displayed with a zoom level of 8× magnification, computer system 600 displays mini-map 1006 with a zoom level of 4× magnification, and accordingly, the initial height and width of view indicator 1008 are 50% of the height and width of mini-map 1006, respectively.

At FIG. 10C, computer system 600 detects another input requesting to increase the zoom level for media capture, such as pinch-to-zoom gesture input 110A (e.g., as described with respect to input 1002A) and/or input 1010B via zoom affordance 620 (e.g., as described with respect to input 1002B, input 1002C, and/or input 1002D). In response to detecting input 1010A and/or 1010B, in FIG. 10D, computer system 600 changes the zoom level accordingly, increasing the zoom level to 16× magnification as indicated by zoom affordance 620. At the zoom level of 16× magnification, camera preview 612 includes a further magnified view of only the very tops of the three trees, the bird perched on the middle tree, and still less of the sky than was seen in camera preview 612 at 8× zoom.

While increasing the zoom level from 8× magnification to 16× magnification, the zoom level remains below a second threshold of greater than 16× magnification. Accordingly, in response to detecting input 1010A and/or 1010B, in FIG. 10D, computer system 600 does not change the zoom level of mini-map 1006, but instead changes the size of view indicator 1008 to frame the region of mini-map 1006 that corresponds to the view of camera preview 612. For example, in response to increasing the zoom level of camera preview 612 to 16× magnification, computer system 600 continues to display mini-map 1006 with a zoom level of 4× magnification but shrinks view indicator 1008 to an updated height and width of 25% of the height and width of mini-map 1006, respectively, in order to frame the region of mini-map 1006 currently corresponding to camera preview 612. In some embodiments, as computer system 600 changes the zoom level of camera preview 612 between the first threshold (e.g., at least 8× magnification) and the second threshold (e.g., greater than 16× magnification), computer system increases the size of view indicator 1008 in response to requests to zoom out and decreases the size of view indicator 1008 in response to requests to zoom in as needed to frame the portion of mini-map 1006 corresponding to camera preview 612 at the current zoom level.

Figures 10D, 10E:
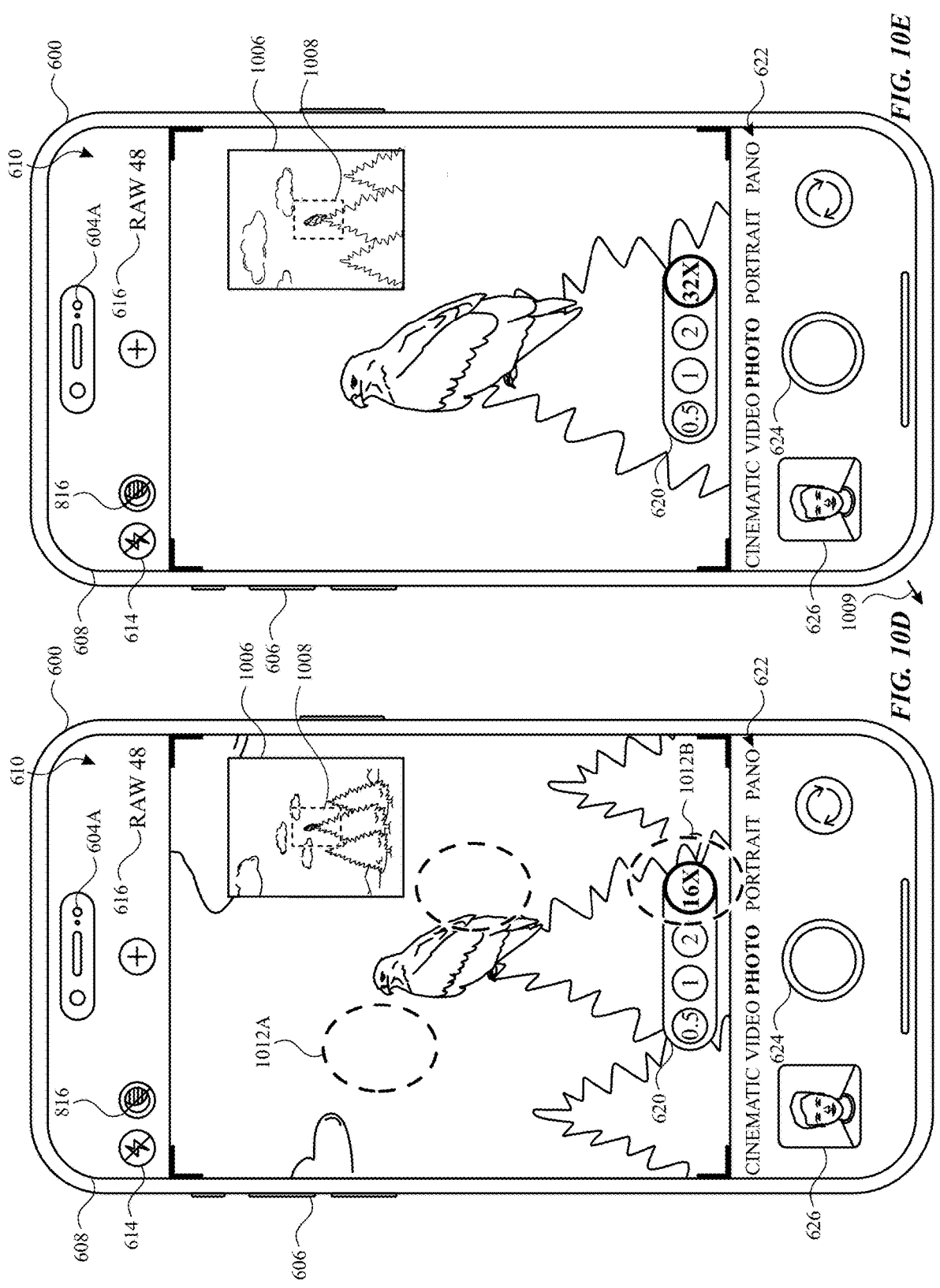

At FIG. 10D, computer system 600 detects another input requesting to increase the zoom level for media capture, such as pinch-to-zoom gesture input 1012A and/or input 1012B via zoom affordance 620. In response to detecting input 1012A and/or 1012B, in FIG. 10E, computer system 600 changes the zoom level accordingly, increasing the zoom level to 20× magnification as indicated by zoom affordance 620. At the zoom level of 32× magnification, camera preview 612 includes a further magnified view of the bird and the top of the center tree, while the left and right trees are no longer visible.

In response to detecting input 1012A and/or 1012B increasing the zoom level to beyond the second threshold of 16× magnification, at FIG. 10E, computer system 600 does not change the size of view indicator 1008 any further, but instead increases the zoom level of mini-map 1006. As illustrated in FIG. 10E, the portion of the environment represented in mini-map 1006 includes the upper portions of the three trees, the bird perched on the middle tree, and some of the sky behind the trees, previewing less of the environment than was visible in mini-map 1006 at lower zoom levels but still more of the environment than is currently visible in camera preview 612. For example, while camera preview 612 is displayed at the zoom level of 32× magnification, mini-map 1006 is displays at a zoom level of 8×, such that view indicator 1008 frames the region of mini-map 1006 corresponding to camera preview 612 while being displayed with the height and width of 25% of the height and width of mini-map 1006. In some embodiments, as computer system 600 changes the zoom level of camera preview 612 to zoom levels greater the second threshold (e.g., greater than 16× magnification), computer system increases the zoom level of mini-map 1006 in response to requests to zoom in and decreases the zoom level of mini-map 1006 in response to requests to zoom out as needed for view indicator 1008 to frame the portion of mini-map 1006 corresponding to camera preview 612 at the current zoom level.

At FIG. 10E, computer system 600 moves down and to the left (e.g., as indicated by arrow 1009), changing the field-of-view of the cameras to center around the portion of the environment including the top of the left tree. Accordingly, at FIG. 10F, the bird perched on the center tree is no longer visible in the portion of the field-of-view of the camera(s) included in camera preview 612, but the bird remains visible in the portion of the field-of-view of the camera(s) included in mini-map 1006, specifically, in the region of mini-map 1006 falling outside of the central region framed by view indicator 1008.

Figures 10F, 10G:
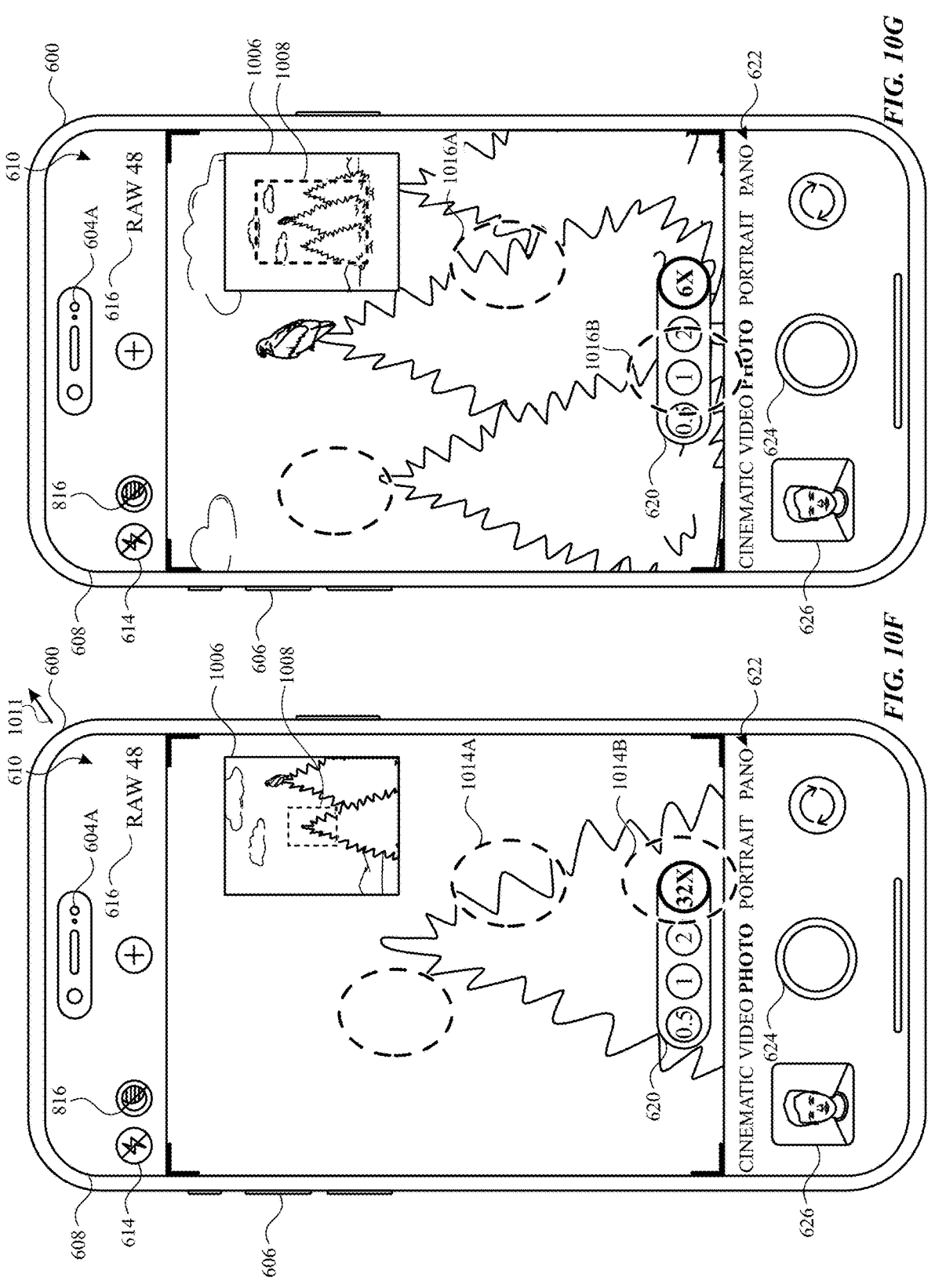

At FIG. 10F, computer system 600 moves up and to the right (e.g., as indicated by arrow 1011), changing the field-of-view of the cameras to center around the portion of the environment including the bird perched on the center tree, and computer system 600 detects an input requesting to decrease the zoom level for media capture, such as pinch-to-zoom gesture input 1014A (e.g., as described with respect to input 1002A) and/or input 1014B via zoom affordance 620 (e.g., as described with respect to input 1002B, input 1002C, and/or input 1002D). In response to detecting input 1014A and/or 1014B, in FIG. 10G, computer system 600 changes the zoom level accordingly, decreasing the zoom level to 6× magnification as indicated by zoom affordance 620.

Although the zoom level of 6× magnification falls below the first threshold of at least 8× magnification, as the zoom level remains above a third threshold of at least 4× magnification, at FIG. 10G, computer system 600 continues displaying mini-map 1006. As described above, in some embodiments, while decreasing the zoom level between a magnification higher than the second threshold (e.g., greater than 16× magnification) and the second threshold, computer system 600 changes the zoom level of mini-map 1006 but does not change the size of view indicator 1008, and while decreasing the zoom level between the second threshold and the first threshold (e.g., at least 8× magnification), computer system 600 changes the size of view indicator 1008 and does not change the zoom level of mini-map 1006. Additionally, in some embodiments, while decreasing the zoom level between the first threshold and the third threshold (e.g., at least 4× magnification), computer system 600 changes the size of view indicator 1008 and does not change the zoom level of mini-map 1006. For example, at a zoom level of 6× magnification, computer system 600 displays mini-map 1006 with a zoom level of 4× magnification, and increases the height and width of view indicator 1008 up to 75% of the height and width of mini-map 1006, respectively (e.g., displaying view indicator 1008 at a larger size than view indicator 1008 was initially displayed (e.g., at FIG. 10C)).

Figures 10H, 10I:
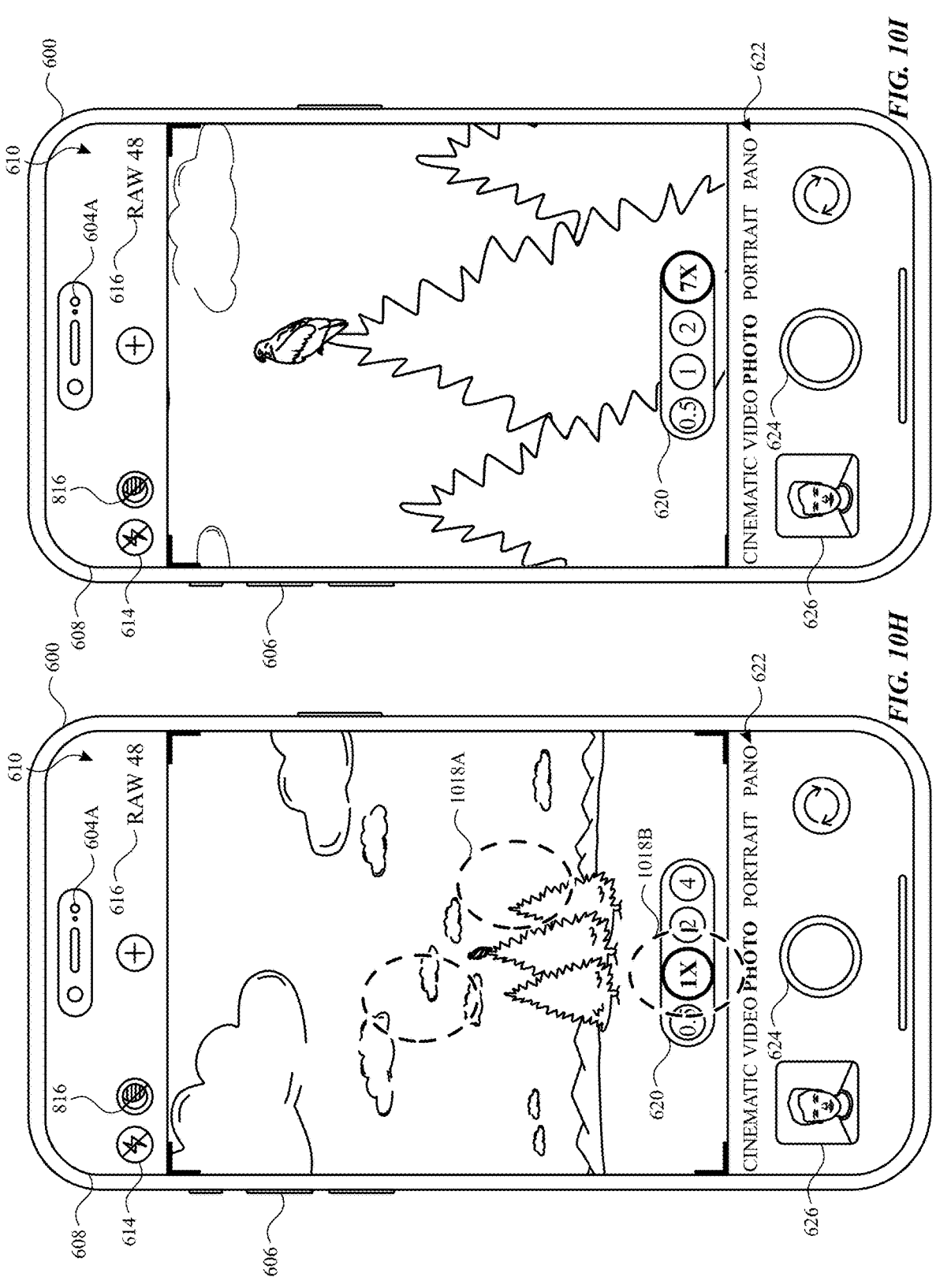

At FIG. 10G, computer system 600 detects another input requesting to decrease the zoom level for media capture, such as pinch-to-zoom gesture input 1016A and/or input 1016B via zoom affordance 620. In response to detecting input 1016A and/or 1016B, in FIG. 10H, computer system 600 changes the zoom level accordingly, decreasing the zoom level to 1× magnification as indicated by zoom affordance 620. As illustrated in FIG. 10H, in response to decreasing the zoom level past the third threshold of at least 4× magnification, computer system 600 ceases displaying mini-map 1006 and view indicator 1008.

At FIG. 10H, computer system 600 detects an input requesting to increase the zoom level for media capture, such as pinch-to-zoom gesture input 1018A and/or input 1018B via zoom affordance 620. In response to detecting input 1018A and/or 1018B, at FIG. 10I, computer system 600 changes the zoom level accordingly, increasing the zoom level to 7× magnification as indicated by zoom affordance 620. Although the zoom level of 7× exceeds the third threshold of at least 4× magnification, because input 1018A and/or 1018B do not request to increase the zoom level to the first threshold of at least 8× magnification, at FIG. 10I, computer system 600 does not resume displaying mini-map 1006 and/or view indicator 1008.

FIG. 11 is a flow diagram illustrating a method for controlling zoom settings for media capture using a computer system in accordance with some embodiments. Method 1100 is performed at a computer system (e.g., 100, 300, 500, and/or 600) that is in communication with a display generation component (e.g., 608) (e.g., a display controller; a touch-sensitive display system; a display (e.g., integrated and/or connected), a 3D display, a transparent display, a projector, and/or a heads-up display) and one or more cameras (e.g., 604A, 604B, 604C, and/or 604D) (in some embodiments, the one or more cameras include a plurality of cameras with different lenses and/or optical features, such as a standard camera, a telephoto camera, and/or a wide-angle camera; in some embodiments, the one or more cameras include a rear (e.g., user-facing) camera and a forward (e.g., environment-facing) camera). Some operations in method 1100 are, optionally, combined, the orders of some operations are, optionally, changed, and some operations are, optionally, omitted.

As described below, method 1100 provides an intuitive way for controlling zoom settings for media capture. The method reduces the cognitive burden on a user for controlling zoom settings for media capture, thereby creating a more efficient human-machine interface. For battery-operated computing devices, enabling a user to controlling zoom settings for media capture faster and more efficiently conserves power and increases the time between battery charges.

The computer system (e.g., 600), while displaying (1102), via the display generation component, a camera preview (e.g., 612) at a first zoom level that includes a first representation of a field-of-view of the one or more cameras that includes a first portion (e.g., at least the portion of the field-of-view of the one or more cameras that would be captured at the current magnification; in some embodiments, additional portions of the field-of-view of the one or more cameras, such as portions bordering the portion that would be captured) of an environment (e.g., physical environment at which the one or more cameras are directed), detects (1104) a first input (e.g., 1002A, 1002B, 1002C, 1002D, 1004A, 1004B, 110A, 1101B, 1012A, 1012B, 1014A, 1014B, 1016A, 1016B, 1018A, and/or 1018B) (e.g., a selection of a zoom setting affordance (e.g., 0.5×, 1×, 2×, and/or 10×), a pinch gesture, a drag gesture on a zoom wheel affordance, and/or a multi-finger tap followed by an upward or downward swipe motion) that corresponds to a request to zoom (e.g., zoom in so as to increase a level of magnification and/or zoom out so as to decrease a level of magnification) the camera preview (in some embodiments, a request to modify the zoom level at which media will be captured).

The computer system, in response to detecting the first input (1106) and in accordance with a determination that the first input corresponds to a request to zoom to a second zoom level that is higher than a respective zoom threshold (e.g., a zoom level of e.g., 5×, 8×, and/or 10× magnification or greater), displays (1108) the camera preview (e.g., 612) at the second zoom level (e.g., a portion of the environment that is less than the second portion of the environment (e.g., a more zoomed-in portion)) and a secondary representation (e.g., 1006) of the field-of-view of the one or more cameras that is smaller than the camera preview and includes a representation of a larger portion of the environment than is included in the camera preview at the second zoom level (e.g., as illustrated in FIGS. 10C-10G) (e.g., a secondary camera preview (e.g., mini-map); in some embodiments, the fourth portion includes less than an entire field-of-view of the one or more cameras (e.g., the mini-map is does not show a fully zoomed-out view); in some embodiments, the fourth portion includes an entire field-of-view of the one or more cameras (e.g., the mini-map includes a fully zoomed-out view); in some embodiments, the representation of a field-of-view of the one or more cameras that includes the fourth portion of the environment is displayed as an inset, e.g., overlaid on at least a portion of the camera preview at the third zoom level)(e.g., the secondary camera preview (e.g., mini-map) is a zoomed-out preview in comparison to the main camera preview, so more of the physical environment and/or overall field-of-view of the one or more cameras is visible in the mini-map than in the main camera preview) (in some embodiments, the fourth portion of the environment is greater than the first and/or second portions of the environment).

The computer system, in response to detecting the first input (1106) and in accordance with a determination that the first input corresponds to a request to zoom to a third zoom level that is lower than the respective zoom threshold (e.g., the camera has not zoomed in beyond e.g., 5×, 8×, and/or 10× magnification), displays (1110) the camera preview at the third zoom level, wherein the camera preview at the third zoom level includes a second representation of a field-of-view of the one or more cameras that includes a second portion of the environment without displaying the secondary representation of the field-of-view of the one or more cameras (e.g., as illustrated in FIGS. 10B and 10H-10I) (in some embodiments, a portion that is less than the first portion of the environment (e.g., a more zoomed-in portion); in some embodiments, a portion that is greater than the first portion of the environment (e.g., a more zoomed-out portion)). Displaying a secondary representation of the field-of-view of a camera that shows a zoomed-out view of the environment (e.g., a zoomed-out "mini-map") when a camera preview is zoomed in over a certain magnification level and ceasing displaying the secondary representation of the field-of-view of the camera when the camera preview is not zoomed in over the certain magnification level assists the user with quickly composing (e.g., framing) media capture events and reduces the risk that transient media capture opportunities are missed or captured in an undesirable manner, which enhances the operability of the system and makes the user-system interface more efficient (e.g., by helping the user to provide proper inputs and reducing user mistakes when operating/interacting with the system), reducing power usage and improves battery life of the system by enabling the user to use the system more quickly and efficiently. Additionally, conditionally displaying the mini-map provides a user with real-time visual feedback about a state of the computer system. For example, showing the mini-map helps situate a zoomed-in view of the camera within the greater environment and shows the user portions of the environment that could be captured by zooming out, while ceasing display of the mini-map when the view of the camera is zoomed out allows the user to see more of the zoomed-out view of the camera.

In some embodiments, the secondary representation (e.g., 1006) of the field-of-view of the one or more cameras (e.g., mini-map) is displayed overlaying at least a first region (e.g., portion (e.g., the upper right or upper left)) of the camera preview (e.g., as illustrated in FIGS. 10C-10G) (in some embodiments, the mini-map is displayed over the camera preview) (in some embodiments, and not overlaying at least a second region of the camera preview (e.g., the camera preview remains visible while displaying the mini map)). Displaying the mini-map overlaying the camera preview (e.g., as an inset view) assists the user with composing media capture events and reduces the risk that transient media capture opportunities are missed or captured in an undesirable manner. Additionally, displaying the mini-map overlaying the camera preview provides a user with real-time visual feedback about a state of the computer system. For example, the user can monitor both what will be captured with the current framing and zoom level and what else could be captured by the cameras, e.g., by zooming in/out and/or changing the framing.

In some embodiments, the camera preview (e.g., 612) is displayed occupying a first display region and the secondary representation (e.g., 1006) of the field-of-view of the one or more cameras (e.g., mini-map) is displayed occupying a second display region smaller than the first display region (e.g., as illustrated in FIGS. 10C-10G) (in some embodiments, the second region is inset (e.g., entirely contained) within the first region). Displaying the mini-map in a smaller region the camera preview (e.g., as an inset view) provides a user with real-time visual feedback about a state of the computer system. For example, the user can monitor both what will be captured with the current framing and zoom level and what else could be captured by the cameras, e.g., by zooming in/out and/or changing the framing.

In some embodiments, the larger portion of the environment (e.g., the portion of the environment represented in the mini-map) is centered around a portion of the environment included in the camera preview at the second zoom level (e.g., the portion of the environment visible in the zoomed-in camera preview is the center portion of the zoomed-out mini-map). Displaying a mini-map that is centered on the region the camera preview provides a user with real-time visual feedback about a state of the computer system. For example, the user can monitor both what will be captured with the current framing and zoom level and what else could be captured by the cameras, e.g., by zooming in/out and/or changing the framing.

In some embodiments, displaying the secondary representation of the field-of-view of the one or more cameras (e.g., the mini-map) includes displaying a visual indication (e.g., 1008) (e.g., a box, brackets, and/or shading), wherein the visual indication frames a region of the secondary representation of the field-of-view of the one or more cameras, wherein the region of the secondary representation of the field-of-view of the one or more cameras includes a representation of a portion of the environment included in the camera preview at the second zoom level (e.g., as illustrated in FIGS. 10C-10G) (e.g., the framed region of the mini-map represents the portion of the environment visible in the zoomed-in camera preview). Displaying the mini-map (e.g., the zoomed-out view) with a visual indication of the region captured in the camera preview (e.g., the zoomed-in view) assists the user with composing media capture events and reduces the risk that transient media capture opportunities are missed or captured in an undesirable manner. Additionally, displaying the mini-map overlaying the camera preview provides a user with real-time visual feedback about a state of the computer system. For example, the user can monitor both what will be captured with the current framing and zoom level and what else could be captured by the cameras, e.g., by zooming in/out and/or changing the framing.

In some embodiments, the computer system, while displaying the camera preview at the second zoom level, displaying the visual indication (e.g., 1008) with first dimensions (e.g., as illustrated in FIG. 10D) (e.g., at a first size that frames 50%, 25%, and/or 15% of the mini-map area) detects a second input (e.g., 1012A and/or 1012B) (e.g., a selection of a zoom setting affordance (e.g., 0.5×, 1×, 2×, and/or 10×), a pinch gesture, a drag gesture on a zoom wheel affordance, and/or a multi-finger tap followed by an upward or downward swipe motion) that corresponds to a request to zoom (e.g., zoom in so as to increase a level of magnification and/or zoom out so as to decrease a level of magnification) the camera preview (in some embodiments, a request to modify the zoom level at which media will be captured). In some embodiments, the computer system, in response to detecting the second input and in accordance with a determination that the second input corresponds to a request to zoom to a fourth zoom level that is higher than the respective zoom threshold (e.g., a zoom level of e.g., 5×, 8×, and/or 10× magnification or greater) and the second zoom level, maintains display of the visual indication with the first dimensions (e.g., as illustrated in FIG. 10E) (e.g., the visual indication does not change size as the camera zooms in further). In some embodiments, in accordance with a determination that the second input corresponds to a request to zoom to a zoom level that is lower than the respective zoom threshold, ceasing display of the secondary representation and the visual indication; in some embodiments, in accordance with a determination that the second input corresponds to a request to zoom to a zoom level that is higher than the respective zoom threshold and lower than the second zoom level, displaying the visual indication with second dimensions larger than the first dimensions (e.g., the visual indication size is dynamic up to a point, and the second zoom level represents the threshold where the visual indication stops shrinking); in some embodiments, in accordance with a determination that the second input corresponds to a request to zoom to a zoom level that is higher than the respective zoom threshold and lower than the second zoom level, displaying the visual indication with the first dimensions (e.g., the visual indication size is static, so the dimensions do not change as the device zooms out). Maintaining a consistent size of the visual indication provides a user with real-time visual feedback about a state of the computer system, for example, by conveying the framing of the current media capture relative to the environment without the visual indication becoming too small or too large to be legible.

In some embodiments, the computer system, while displaying the camera preview at a respective zoom level, wherein the respective zoom level is higher than the respective zoom threshold, displaying the visual indication with respective dimensions, wherein the respective dimensions fall within a size range (e.g., as illustrated in FIGS. 10C-10G) (e.g., upper and/or lower size limits). Maintaining a consistent size of the visual indication provides a user with real-time visual feedback about a state of the computer system, for example, by conveying the framing of the current media capture relative to the environment without the visual indication becoming too small or too large to be legible.

In some embodiments, the computer system, while displaying the camera preview at the respective zoom threshold (e.g., as illustrated in FIG. 10C) (e.g., the magnification level at which the mini-map is initially displayed), displays the visual indication (e.g., 1008) with first respective dimensions (e.g., a first size and/or a first area) (in some embodiments, the height and/or width of the visual indication is a first percentage (e.g., 75%, 60%, and/or 50%) of the height and/or width of the mini-map; in some embodiments, visual indication frames a first percentage (e.g., 75%, 60%, and/or 50%) of the total area of the mini-map; in some embodiments, the first dimensions are an upper size limit of the size range (e.g., the initial size of the mini-map is the maximum size); in some embodiments, when zooming out past the respective zoom threshold, the visual indication can be displayed with an even larger size than the first dimensions). In some embodiments, while displaying the camera preview at a zoom level that is greater than a second respective zoom threshold (e.g., as illustrated in FIG. 10D), wherein the second respective zoom threshold is greater than the respective zoom threshold (e.g., when zooming in beyond a second threshold magnification beyond the magnification at which the mini-map is initially displayed), displaying the visual indication with second respective dimensions smaller than the first respective dimensions (e.g., a size and/or area less than size and/or area of the first respective dimensions) (in some embodiments, the height and/or width of the visual indication is a second, smaller percentage (e.g., 40%, 25%, and/or 10%) of the height and/or width of the mini-map; in some embodiments, visual indication frames a second, smaller percentage (e.g., 40%, 25%, and/or 10%) of the total area of the mini-map; in some embodiments, the second dimensions are a smaller percentage (e.g., 75%, 50%, and/or 25%) of the first dimensions; in some embodiments, wherein the second dimensions are a lower size limit of the size range).

In some embodiments, the computer system detects a third input (e.g., 1002A, 1002B, 1002C, 1002D, 1004A, 1004B, 110A, 1101B, 1012A, 1012B, 1014A, 1014B, 1016A, 1016B, 1018A, and/or 1018B) (e.g., a selection of a zoom setting affordance (e.g., 0.5×, 1×, 2×, and/or 10×), a pinch gesture, a drag gesture on a zoom wheel affordance, and/or a multi-finger tap followed by an upward or downward swipe motion) that corresponds to a request to zoom (e.g., zoom in so as to increase a level of magnification and/or zoom out so as to decrease a level of magnification) the camera preview (in some embodiments, a request to modify the zoom level at which media will be captured). In some embodiments, in response to detecting the third input and in accordance with a determination that the third input corresponds to a request to zoom to a fifth zoom level that is higher than the respective zoom threshold (e.g., a zoom level of e.g., 5×, 8×, and/or 10× magnification or greater), the computer system displays the camera preview (e.g., 612) at the fifth zoom level (e.g., a portion of the environment that is less than the second portion of the environment (e.g., a more zoomed-in portion)) and displays the secondary representation (e.g., 1006) of the field-of-view of the one or more cameras that is smaller than the camera preview and includes a representation of a larger portion of the environment than is included in the camera preview at the fifth zoom level. In some embodiments, in accordance with a determination that the fifth zoom level is higher than the second zoom level, the representation of the larger portion of the environment than is included in the camera preview at the fifth zoom level is smaller than the larger portion of the environment than is included in the camera preview at the second zoom level (e.g., as illustrated in FIGS. 10E-10F (e.g., showing the fifth zoom level) compared to FIG. 10C or 10D (e.g., showing the second zoom level)) (e.g., as the camera zooms in further than the second zoom level, the mini-map also zooms in, and thus displays a smaller portion of the environment). In some embodiments, in accordance with a determination that the fifth zoom level is higher than the second zoom level, the representation of the larger portion of the environment than is included in the camera preview at the fifth zoom level is larger than the larger portion of the environment than is included in the camera preview at the second zoom level (e.g., as illustrated in FIG. 10C or 10D (e.g., showing the fifth zoom level) compared to FIGS. 10E-10F (e.g., showing the second zoom level)) (e.g., as the camera zooms out further than the second zoom level, the mini-map also zooms out, and thus displays a larger portion of the environment) (e.g., the live preview and the mini-map zoom in/out at the same time). Changing the magnification of the mini-map as the camera preview changes provides a user with real-time visual feedback about a state of the computer system. For example, the user can monitor both what will be captured with the current framing and zoom level and what else could be captured by the cameras, e.g., by zooming in/out and/or changing the framing.

In some embodiments, the computer system, while displaying the camera preview (e.g., 612) and the secondary representation (e.g., 1006) of the field-of-view of the one or more cameras, detects a change in the field-of-view of the one or more cameras (e.g., 1009 and/or 1011) (e.g., changing the direction of the camera (e.g., where the camera is pointing), changing the position of the camera (e.g., where the camera is), and/or changing the camera(s) being used (e.g., switching to a different lens and/or camera)). In some embodiments, in response to detecting the change in the field-of-view of the one or more cameras, the computer system changes a respective appearance of the camera preview and changes a respective appearance of the secondary representation of the field-of-view of the one or more cameras (e.g., as illustrated in FIGS. 10F and 10G) (e.g., both the camera preview and the mini-map represent the current field-of-view of the camera and update accordingly as the field-of-view updates). Changing the appearance of both the camera preview and the mini-map as the field-of-view of the one or more cameras changes provides a user with real-time visual feedback about a state of the computer system. For example, the user can monitor both what will be captured with the current framing and zoom level and what else could be captured by the cameras, e.g., by zooming in/out and/or changing the framing.

In some embodiments, the computer system, while displaying the secondary representation (e.g., 1006) of the field-of-view of the one or more cameras, detects a fourth input (e.g., 110A, 1010B, 1012A, 1012B, 1014A, 1014B, 1016A, 1016B, 1018A, and/or 1018B) (e.g., a selection of a zoom setting affordance (e.g., 0.5×, 1×, 2×, and/or 10×), a pinch gesture, a drag gesture on a zoom wheel affordance, and/or a multi-finger tap followed by an upward or downward swipe motion) that corresponds to a request to zoom (e.g., zoom in so as to increase a level of magnification and/or zoom out so as to decrease a level of magnification) the camera preview (in some embodiments, a request to modify the zoom level at which media will be captured). In some embodiments, the computer system, in response to detecting the fourth input and in accordance with a determination that the fourth input corresponds to a request to zoom to a sixth zoom level that is lower than a second respective zoom threshold (e.g., a zoom level of e.g., 5×, 8×, and/or 10× magnification or greater; in some embodiments, the second respective zoom threshold is the same as the respective zoom threshold (e.g., the mini-map appears and disappears at the same zoom level); in some embodiments, the second respective zoom threshold is different from the respective zoom threshold (e.g., the mini-map appears at one zoom level and disappears at another, avoiding flicker near the respective threshold)), ceases displaying the secondary representation of the field-of-view of the one or more cameras (e.g., as illustrated in FIG. 10H). Ceasing display of the mini-map when zoomed out past a certain threshold provides improved media capture control options to a user without cluttering the media capture user interface with additional displayed controls.

In some embodiments, the computer system detects a fifth input (e.g., 1002A, 1002B, 1002C, 1002D, 1004A, 1004B, 110A, 1101B, 1012A, 1012B, 1014A, 1014B, 1016A, 1016B, 1018A, and/or 1018B) (e.g., a selection of a zoom setting affordance (e.g., 0.5×, 1×, 2×, and/or 10×), a pinch gesture, a drag gesture on a zoom wheel affordance, and/or a multi-finger tap followed by an upward or downward swipe motion) that corresponds to a request to zoom (e.g., zoom in so as to increase a level of magnification and/or zoom out so as to decrease a level of magnification) the camera preview (in some embodiments, a request to modify the zoom level at which media will be captured). In some embodiments, the computer system, in response to detecting the fifth input and in accordance with a determination that the fifth input corresponds to a request to zoom to the respective zoom threshold (e.g., the point at which the mini-map initially appears), displays the camera preview at the respective zoom threshold and the secondary representation of the field-of-view of the one or more cameras that is smaller than the camera preview and includes a representation of a larger portion of the environment than is included in the camera preview at the respective zoom threshold, wherein displaying the secondary representation includes displaying a visual indication (e.g., 1008) framing a first region of the secondary representation of the field-of-view of the one or more cameras (e.g., as illustrated in FIG. 10C).

In some embodiments, the computer system detects a sixth input (e.g., 1002A, 1002B, 1002C, 1002D, 1004A, 1004B, 1010A, 0101B, 1012A, 1012B, 1014A, 1014B, 1016A, 1016B, 1018A, and/or 1018B) (e.g., a selection of a zoom setting affordance (e.g., 0.5×, 1×, 2×, and/or 10×), a pinch gesture, a drag gesture on a zoom wheel affordance, and/or a multi-finger tap followed by an upward or downward swipe motion) that corresponds to a request to zoom (e.g., zoom in so as to increase a level of magnification and/or zoom out so as to decrease a level of magnification) the camera preview (in some embodiments, a request to modify the zoom level at which media will be captured); (in some embodiments, the sixth input is detected while displaying the visual indication framing a first region of the secondary representation of the field-of-view of the one or more cameras). In some embodiments, the computer system, in response to detecting the sixth input and in accordance with a determination that the sixth input corresponds to a request to zoom to a seventh zoom level that is higher than the respective zoom threshold (e.g., zooming in beyond point at which the mini-map initially appears; in some embodiments, the seventh zoom level is lower than an additional respective zoom threshold (e.g., the point at which the mini-map frame stops shrinking)), displays the visual indication (e.g., 1008) framing a second region of the secondary representation of the field-of-view of the one or more cameras, wherein the second region is smaller than the first region (e.g., as illustrated in FIGS. 10D-10D) (e.g., the visual indication shrinks to frame a smaller portion of the mini-map). Changing the size of the visual indication as the zoom level of the camera preview changes provides a user with real-time visual feedback about a state of the computer system. For example, the user can monitor both what will be captured with the current framing and zoom level and what else could be captured by the cameras, e.g., by zooming in/out and/or changing the framing.

In some embodiments, the computer system, in response to detecting the sixth input and in accordance with a determination that the sixth input corresponds to a request to zoom to a seventh zoom level that is higher than the respective zoom threshold (e.g., zooming in beyond point at which the mini-map initially appears; in some embodiments, also in accordance with a determination that the seventh zoom level is lower than an additional respective zoom threshold (e.g., the point at which the mini-map frame stops shrinking)), displays the secondary representation (e.g., 1006) of the field-of-view of the one or more cameras that is smaller than the camera preview and includes a representation of a larger portion of the environment than is included in the camera preview at the seventh zoom level, wherein the representation of the larger portion of the environment than is included in the camera preview at the seventh zoom level and the representation of the larger portion of the environment than is included in the camera preview at the respective zoom threshold are displayed at the same magnification (e.g., as illustrated in FIG. 10D) (e.g., the mini-map does not zoom in as the camera preview zooms in from the initial threshold to the seventh zoom level). In some embodiments, in accordance with a determination that the sixth input corresponds to a request to zoom to a seventh zoom level that is not higher than the respective zoom threshold, ceasing display of the secondary representation and the visual indication; in some embodiments, in accordance with a determination that the sixth input corresponds to a request to zoom to a seventh zoom level that is higher than the respective zoom threshold and higher than the additional respective zoom threshold, displaying the secondary representation of the field-of-view of the one or more cameras that is smaller than the camera preview and includes a representation of a larger portion of the environment than is included in the camera preview at the seventh zoom level, wherein the representation of the larger portion of the environment than is included in the camera preview at the seventh zoom level is displayed at a higher magnification than the representation of the larger portion of the environment than is included in the camera preview at the respective zoom threshold. Changing the size of the visual indication without zooming in the mini-map as the zoom level of the camera preview changes provides a user with real-time visual feedback about a state of the computer system. For example, the user can monitor both what will be captured with the current framing and zoom level and what else could be captured by the cameras, e.g., by zooming in/out and/or changing the framing.

In some embodiments, the computer system detects a seventh input (e.g., 1002A, 1002B, 1002C, 1002D, 1004A, 1004B, 110A, 1101B, 1012A, 1012B, 1014A, 1014B, 1016A, 1016B, 1018A, and/or 1018B) (e.g., a selection of a zoom setting affordance (e.g., 0.5×, 1×, 2×, and/or 10×), a pinch gesture, a drag gesture on a zoom wheel affordance, and/or a multi-finger tap followed by an upward or downward swipe motion) that corresponds to a request to zoom (e.g., zoom in so as to increase a level of magnification and/or zoom out so as to decrease a level of magnification) the camera preview (in some embodiments, a request to modify the zoom level at which media will be captured). In some embodiments, the computer system, in response to detecting the seventh input and in accordance with a determination that the seventh input corresponds to a request to zoom to an eighth zoom level that is higher than the respective zoom threshold and higher than an additional zoom threshold, wherein the additional zoom threshold is higher than the respective zoom threshold (e.g., zooming in further beyond point at which the mini-map initially appears), displays the secondary representation (e.g., 1008) of the field-of-view of the one or more cameras that is smaller than the camera preview and includes a representation of a larger portion of the environment than is included in the camera preview at the eighth zoom level, wherein the representation of the larger portion of the environment than is included in the camera preview at the eighth zoom level is displayed at a higher magnification than the representation of the larger portion of the environment than is included in the camera preview at the respective zoom threshold (e.g., as illustrated in FIGS. 10E-10F) (e.g., the mini-map also zooms in when the second threshold is passed; in some embodiments, the mini-map zooms in such that the visual indication of the camera preview framing remains a consistent size). In some embodiments, in accordance with a determination that the seventh input corresponds to a request to zoom to an eighth zoom level that is not higher than the respective zoom threshold, ceasing display of the secondary representation and the visual indication; in some embodiments, in accordance with a determination that the seventh input corresponds to a request to zoom to an eighth zoom level that is higher than the respective zoom threshold and is not higher than an additional zoom threshold, displaying the secondary representation of the field-of-view of the one or more cameras that is smaller than the camera preview and includes a representation of a larger portion of the environment than is included in the camera preview at the eighth zoom level, wherein the representation of the larger portion of the environment than is included in the camera preview at the eighth zoom level is displayed at the same magnification than the representation of the larger portion of the environment than is included in the camera preview at the respective zoom threshold. Increasing the zoom level of the mini-map past a certain camera preview zoom threshold provides a user with real-time visual feedback about a state of the computer system, for example, by keeping the visual indication of the framing large enough for the user to monitor the framing of the shot relative to the environment.

Note that details of the processes described above with respect to method 1100 (e.g., FIG. 11) are also applicable in an analogous manner to the methods described below/above. For example, method 1100 optionally includes one or more of the characteristics of the various methods described above with reference to method 700 and method 900 and below with reference to methods 1300, 1700, 1900, 2100, and/or 2300. For example, method 1100 can be implemented for controlling zoom in a camera user interface that also implements the control schema of method 900, the depth effect controls of method 700, and/or the external storage controls of method 1300. For brevity, these details are not repeated below.

FIGS. 12A-12T illustrate exemplary user interfaces for capturing and viewing media using internal and external media storage, in accordance with some embodiments. The user interfaces in these figures are used to illustrate the processes described below, including the processes in FIG. 13.

At FIG. 12A, computer system 600 displays, via display 608, camera user interface 1202 (e.g., a user interface for media capture, e.g., using a camera application). Camera user interface 1202 includes camera preview 1204, which represents the portion of the field-of-view of at least one of first camera 604A, second camera 604B, third camera 604C, and fourth camera 604D that would currently be included (e.g., captured) in a media capture; capture affordance 1206; captured media icon 1210 (e.g., including a thumbnail of previously-captured media); and capture mode menu 1212. As indicated by capture mode menu 1212 in FIG. 12A, the current capture mode is a video capture mode. While the current capture mode is a video capture mode, computer system 600 displays camera user interface 1202 including video format affordance 1208 (e.g., reading "PRORES S-LOG") and video capture timer 1214, and displays capture affordance 1206 with visual features indicating that the video capture mode is selected, for example, displaying capture affordance 1206 with a red inner portion (e.g., represented by shading in FIG. 12A). As indicated by the line displayed through video format affordance 1208, a high-quality video capture mode (e.g., a mode for capturing video media with high resolution and/or lossless/no compression) is currently disabled.

At FIG. 12A, computer system 600 detects input 1216 (e.g., a tap input via a touch-sensitive surface of display 608) on capture affordance 1206. In response to detecting input 1216, computer system 600 initiates the capture of first video media (e.g., a video of a person riding a bike) with the currently-selected video capture settings (e.g., as the high-quality video capture mode is disabled, capturing video with a lower-quality resolution and/or compression codec than is used for the high-quality video capture mode). As illustrated in FIG. 12B, while capturing the first video media, computer system 600 updates the appearance of camera user interface 1202 to indicate that video media is being captured. In particular, computer system 600 updates the appearance of capture affordance 1206 to include a stop icon (e.g., a square displayed in the center of capture affordance 1206), updates the appearance of video capture timer 1214 (e.g., changing the color of video capture timer 1214 (e.g., represented by shading in FIG. 12B)), and updates video capture timer 1214 to indicate the elapsed time of the video media capture (e.g., reading "00:00:30" when 30 seconds of video have been captured).

At FIG. 12B, computer system 600 detects input 1218 (e.g., a tap input via a touch-sensitive surface of display 608) on capture affordance 1206 (e.g., while displaying capture affordance 1206 with the stop icon). In response to detecting input 1218, at FIG. 12C, computer system 600 ceases the capture of the first video media. In some embodiments, computer system 600 stores the first video media on one or more internal storage devices of computer system 600 (e.g., hard drives and/or solid state storage devices built into computer system 600). In some embodiments, computer system 600 stores the first video media on one or more remote storage devices (e.g., servers and/or other storage devices in communication with computer system 600 via an Internet connection (e.g., cloud storage)). In some embodiments, computer system 600 stores the first video media on the one or more remote storage devices in association with an account (e.g., a cloud storage account) associated with computer system 600 and/or a user of computer system 600. In response to detecting input 1218, at FIG. 12C, computer system 600 updates captured media icon 1210 to include a thumbnail of the first video media (e.g., a still frame of the first video media depicting the person on the bike). Additionally, computer system 600 displays capture affordance 1206 and video capture timer 1214 as they appeared in FIG. 12A (e.g., prior to initiating video capture).

Figures 12D, 12E:
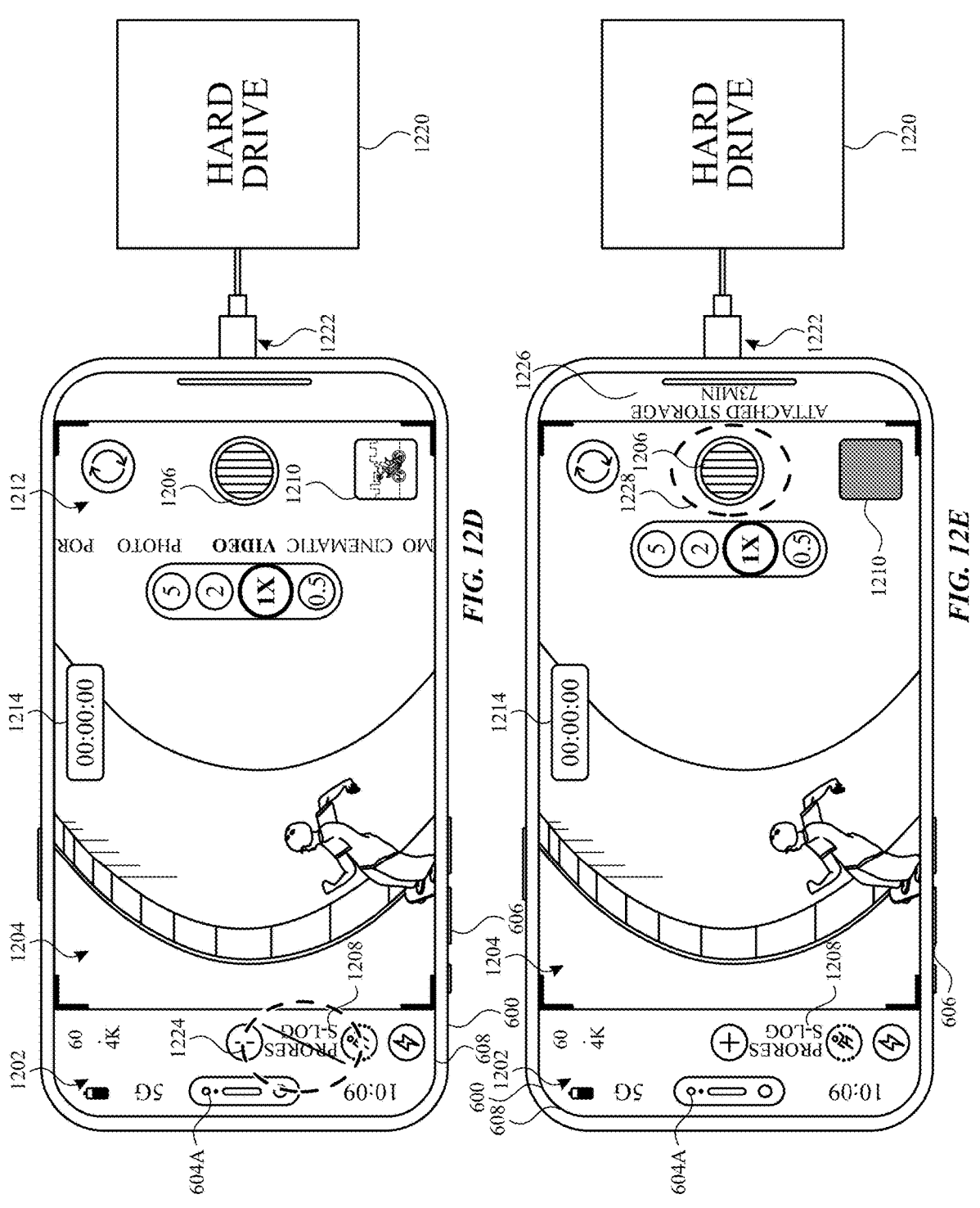

As illustrated in FIG. 12D, computer system 600 detects external storage device 1220 connecting to computer system 600 via wired connection 1222. For example, computer system 600 detects external storage device 1220 connecting via the one or more hardware input ports, such as Lightning, Mini USB, Micro USB, and/or USB-C ports. In some embodiments, computer system 600 enables the high-quality video capture mode automatically in response to detecting the connection of external storage device 1220. In some embodiments, as illustrated in FIG. 12D, computer system 600 detects input 1224 (e.g., a tap input via a touch-sensitive surface of display 608) on video format affordance 1208, and, in response, enables the high-quality video capture mode. Accordingly, at FIG. 12E, computer system 600 ceases displaying the line through video format affordance 1208, indicating that the high-quality video capture mode is enabled.

At FIG. 12E, because external storage device 1220 is connected and the high-quality video capture mode is enabled, computer system 600 updates the appearance of camera user interface 1202, indicating than an external storage mode is enabled. In particular, computer system 600 ceases displaying capture mode menu 1212 and updates captured media icon 1210 to appear blank (e.g., captured media icon 1210 no longer includes the thumbnail of the first video media or any other captured media thumbnail and appearing as an empty frame). Computer system 600 also displays external storage indicator 1226, which includes status information related to external storage device 1220. As illustrated in FIG. 12E, external storage indicator 1226 includes a name or identifier for external storage device 1220 (e.g., "ATTACHED STORAGE") and an indication of the storage space available on external storage device 1220 for storing captured media (e.g., "73 MIN," indicating that approximately 73 minutes of video media captured with the current settings can be stored on external storage device 1220). Computer system 600 displays external storage indicator 1226 at a location of display 608 near wired connection 1222 (e.g., near the hardware input port(s) used to connect external storage device 1220).

At FIG. 12E, computer system 600 detects input 1228 (e.g., a tap input via a touch-sensitive surface of display 608) on capture affordance 1206. In response to detecting input 1228, computer system 600 initiates the capture of second video media (e.g., a video of a person riding a skateboard) with the currently-selected video capture settings (e.g., capturing video with high resolution and/or lossless/no compression). Because external storage device 1220 is connected and the high-quality video capture mode is enabled, computer system 600 stores the second video media (e.g., while capturing and/or once capture is completed) on external storage device 1220. In some embodiments, computer system 600 does not store the second video media (e.g., while capturing and/or once capture is completed) on the one or more internal storage devices of computer system 600 and/or on the one or more remote storage devices (e.g., cloud storage).

Figures 12F, 12G:
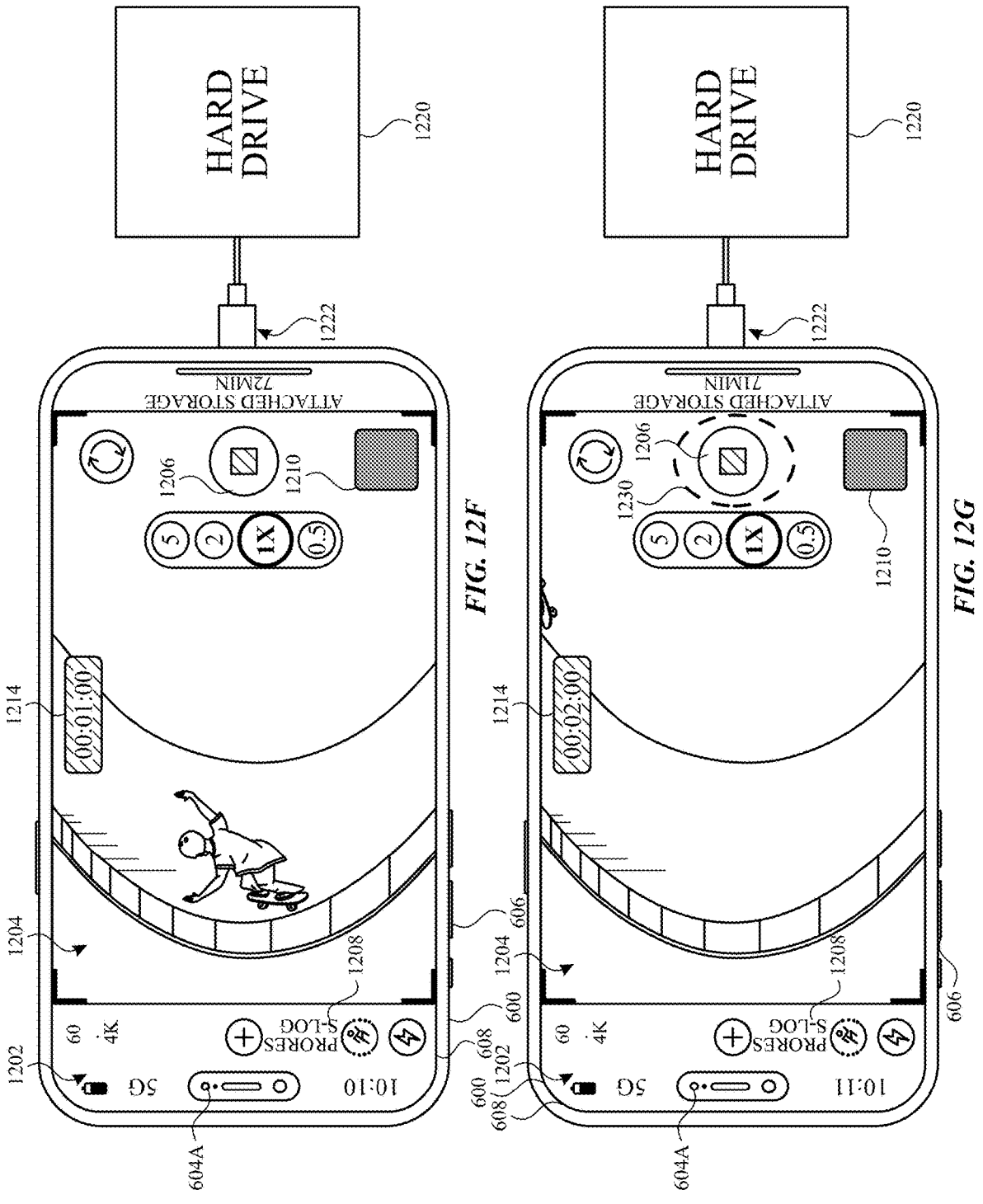

As illustrated in FIG. 12F, in response to detecting input 1228, computer system 600 updates the appearance of camera user interface 1202 to indicate that video media is being captured (e.g., as described with respect to FIG. 12B). While capturing the second video media, computer system 600 continues to display external storage indicator 1226, updating the indication of the storage space available on external storage device 1220 as the elapsed time of the second video media. For example, when the capture of the second video media has elapsed by one minute (e.g., as indicated by video capture timer 1214 in FIG. 12F), computer system 600 updates external storage indicator 1226 to read "72 MIN," a decrease of one minute from the previously-indicated available storage time of 73 minutes, and when the capture of the second video media has elapsed by two minutes (e.g., as indicated by video capture timer 1214 in FIG. 12G), computer system 600 updates external storage indicator 1226 to read "71 MIN."

At FIG. 12G, computer system 600 detects input 1230 (e.g., a tap input via a touch-sensitive surface of display 608) on capture affordance 1206 (e.g., while displaying capture affordance 1206 with the stop icon). In response to detecting input 1230, at FIG. 12H, computer system 600 ceases the capture of the second video media and updates captured media icon 1210 to include a thumbnail of the second video media (e.g., a still frame of the second video media depicting the person on the skateboard). Additionally, computer system 600 displays capture affordance 1206 and video capture timer 1214 as they appeared in FIG. 12E (e.g., prior to initiating video capture). In some embodiments, computer system 600 defines the particular "capture session" during which the second video media is captured as the period from when external storage device 1220 was connected and the high-quality video capture mode enabled until external storage device 1220 is disconnected and/or the high-quality video capture mode is disabled. In some embodiments, during the particular capture session, computer system 600 captures additional media in the manner described with respect to FIGS. 12E-12H and stores the additional media on external storage device 1220.

Figure 12H:
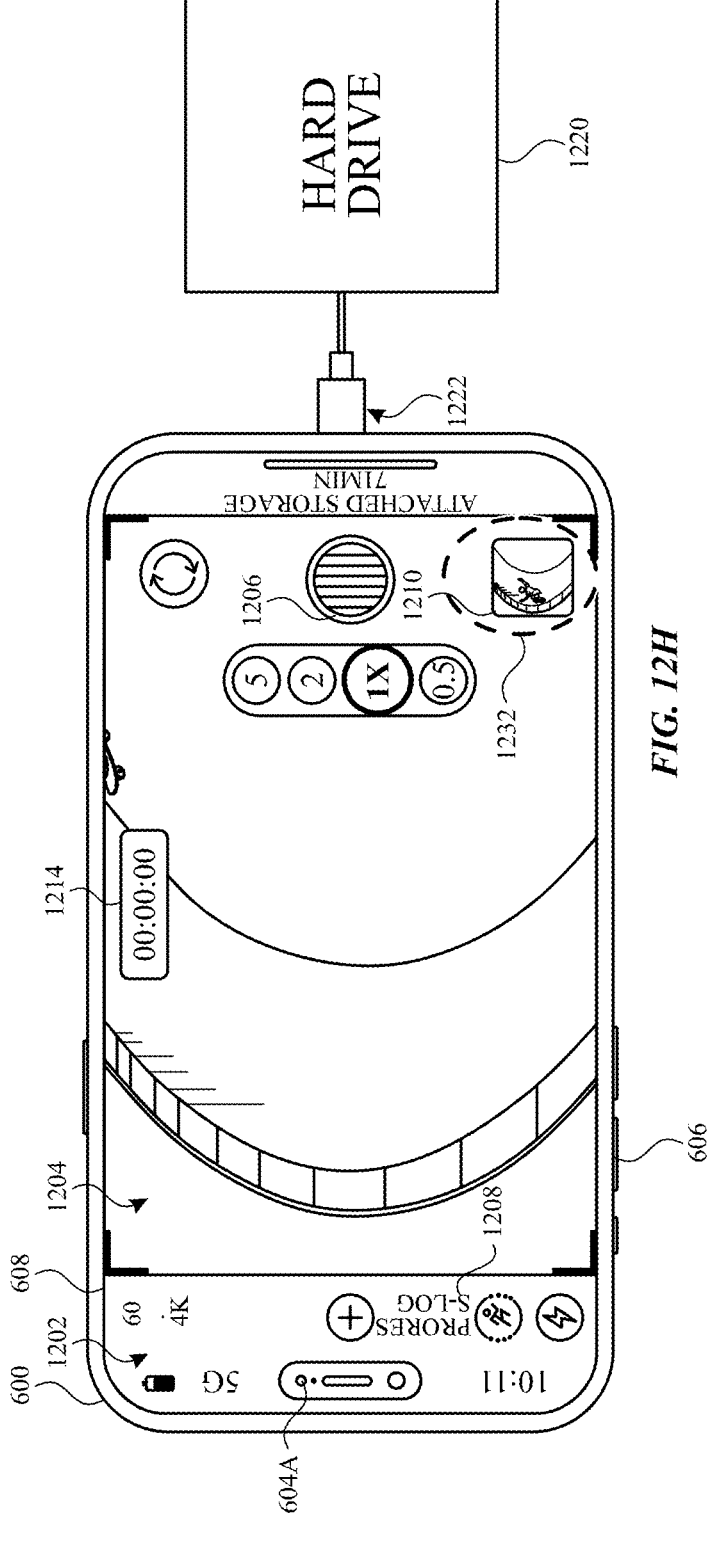

At FIG. 12H, computer system 600 detects input 1232 (e.g., a tap input via a touch-sensitive surface of display 608) on captured media icon 1210. In response to detecting input 1232, at FIG. 12I, computer system 600 ceases displaying camera user interface 1202 and displays media user interface 1234. As illustrated by the left side of FIG. 12I, because external storage device 1220 is connected and the high-quality video capture mode is enabled when input 1232 is detected, computer system 600 displays media user interface 1234 including view 1236 of the captured second video media, thumbnail set 1238 (e.g., a set of thumbnails representing media captured during the particular capture session), import affordance 1240, external storage library affordance 1242 (e.g., reading "ALL MEDIA"), and return affordance 1243.

Figure 12I:
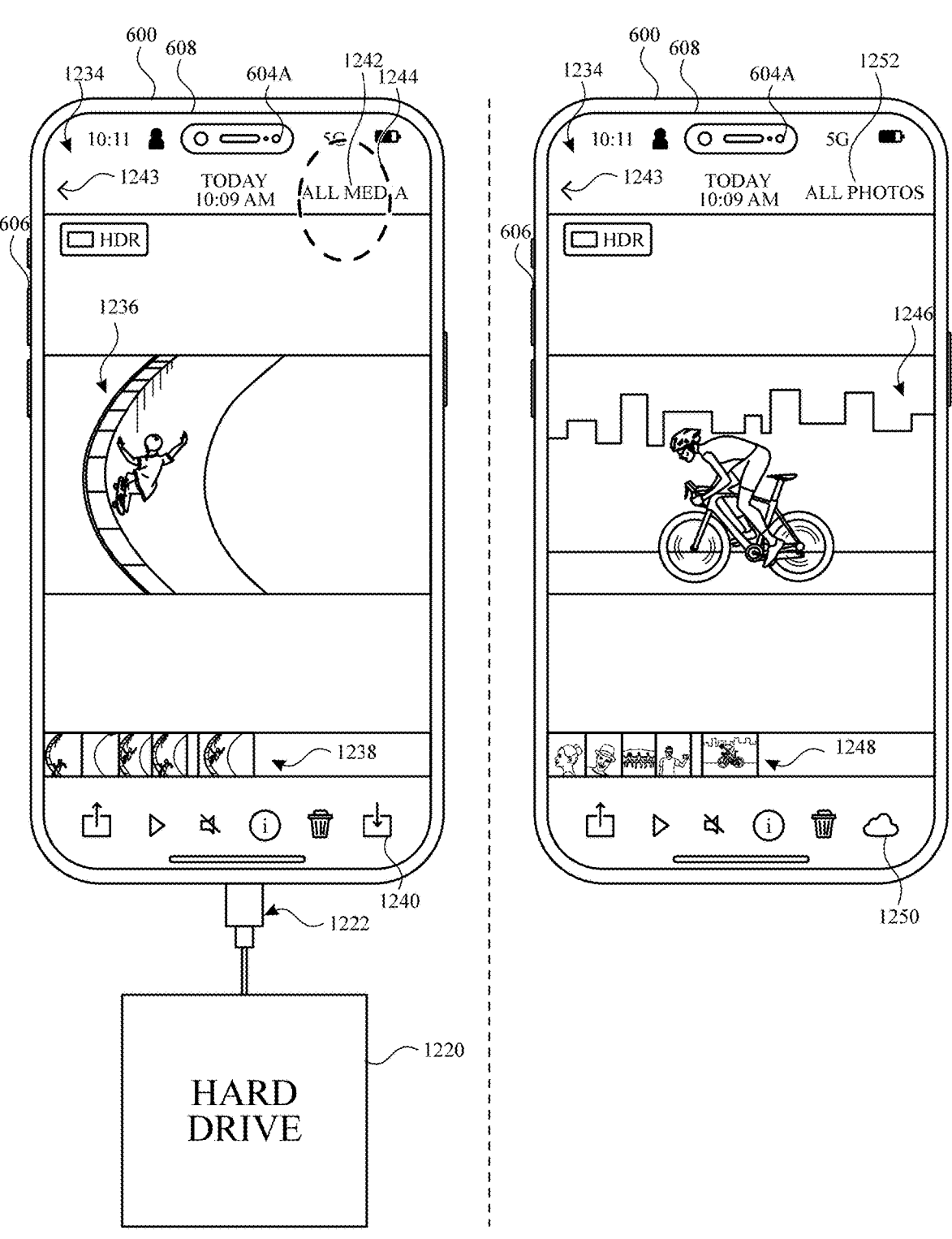

Alternatively, as illustrated by the right side of FIG. 12I, in some embodiments, if external storage device 1220 were disconnected and/or the high-quality video capture mode disabled (e.g., when input 1232 is detected and/or while displaying media user interface 1234), computer system 600 displays media user interface 1234 including view 1246 of the captured first video media (e.g., the last media captured outside of the particular capture session) instead of view 1236, thumbnail set 1248 (e.g., a set of thumbnails representing other media captured outside of the particular capture session) instead of thumbnail set 1238, upload affordance 1250 instead of import affordance 1240, and media library affordance 1252 (e.g., reading "ALL PHOTOS") instead of external storage library affordance 1242.

As illustrated by the left side of FIG. 12I, computer system 600 detects input 1244 (e.g., a tap input via a touch-sensitive surface of display 608) on external storage library affordance 1242. In response to detecting input 1244, at FIG. 12J, computer system 600 displays media library user interface 1254. As illustrated by the left side of FIG. 12J, because external storage device 1220 is connected when input 1244 is detected, computer system 600 displays media library user interface 1254 including thumbnail set 1256, a set of thumbnails representing media captured during the particular capture session (including the second video media). Additionally, computer system 600 displays media library user interface 1254 including import affordance 1260, import all affordance 1262, and selection affordance 1264, which, when selected, allow a user to select some or all of the media represented by thumbnail set 1256 (e.g., the media from the current capture session that are currently stored on external storage device 1220) to be imported into (e.g., duplicated and stored on) the one or more internal storage devices of computer system 600 and/or on the one or more remote storage devices (e.g., cloud storage).

Figure 12J:
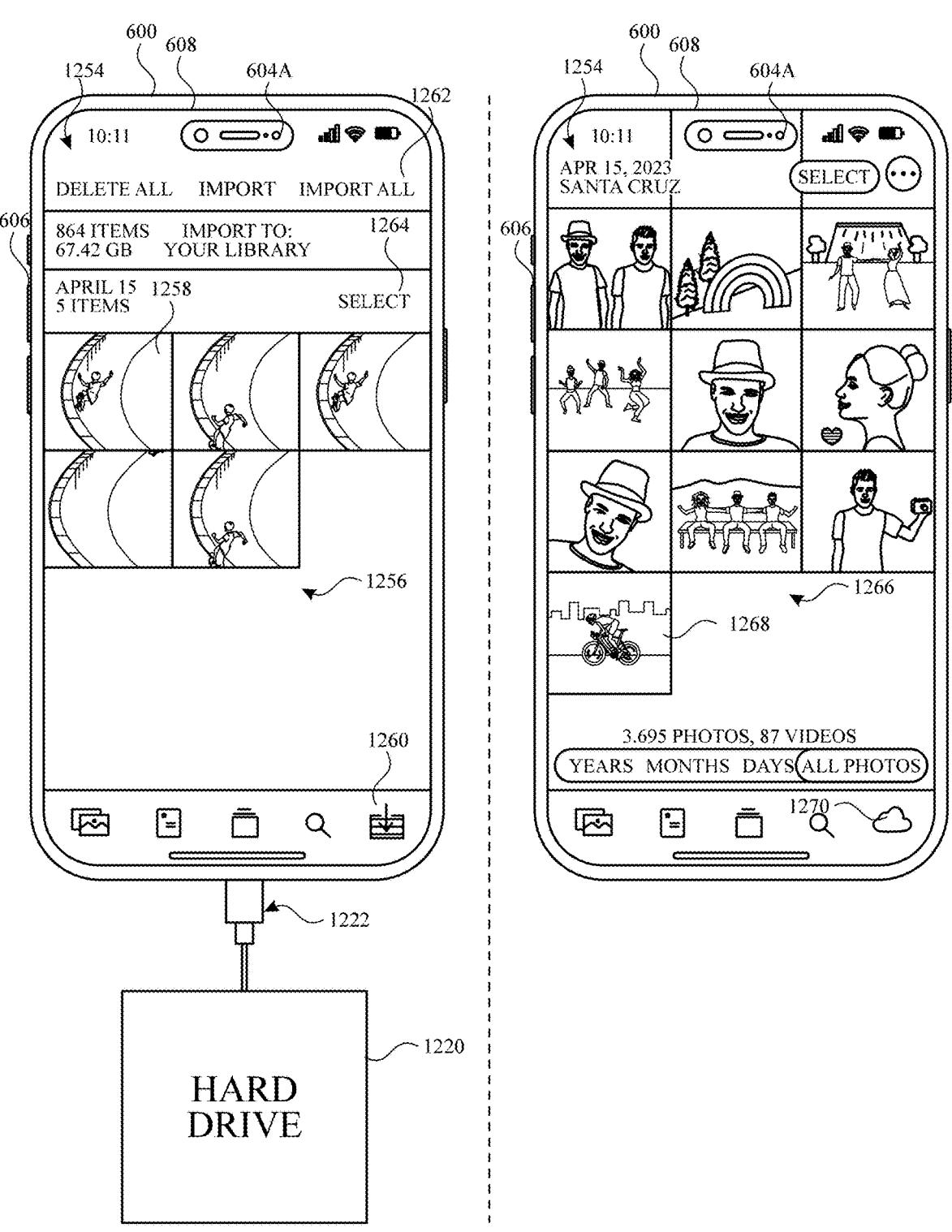

Alternatively, as illustrated by the right side of FIG. 12J, in some embodiments, if external storage device 1220 were disconnected and/or the high-quality video capture mode disabled (e.g., when input 1232 is detected and/or while displaying media user interface 1234), computer system 600 displays media library user interface 1254 including thumbnail set 1266, a set of thumbnails representing media stored on the one or more internal storage devices of computer system 600 and/or on the one or more remote storage devices (e.g., cloud storage), including thumbnail 1268 representing the first video media (e.g., the video captured prior to connecting external storage device 1220 and enabling the high-quality video capture mode), instead of displaying thumbnail set 1256. Additionally, computer system 600 displays cloud storage affordance 1270 (e.g., instead of displaying import affordance 1260, import all affordance 1262, and/or selection affordance 1264), which, when selected, allows a user to interact with (e.g., view and/or manage) media stored on the one or more remote storage devices in association with the account associated with computer system 600 and/or the user of computer system 600.

As illustrated in FIG. 12K, computer system 600 displays file system user interface 1272, a user interface for interacting with (e.g., viewing and/or managing) files accessible to computer system 600, such as internally, externally, and/or remotely stored files. While external storage device 1220 is connected, computer system 600 displays file system user interface 1272 including external storage affordance 1274 corresponding to external storage device 1220.

At FIG. 12K, computer system 600 detects input 1276 (e.g., a tap input via a touch-sensitive surface of display 608) on external storage affordance 1274. In response to detecting input 1276, at FIG. 12L, computer system 600 displays media library user interface 1254. As discussed with respect to FIG. 12J, because external storage device 1220 is connected when input 1276 is detected, computer system 600 displays media library user interface 1254 including thumbnail set 1256. Additionally, as media library user interface 1254 is accessed via file system user interface 1272 (e.g., as opposed to via media user interface 1234 and external storage library affordance 1242), computer system 600 displays media library user interface 1254 including thumbnail set 1278, a set of thumbnails representing media stored on external storage device 1220 that were captured outside of the particular capture session (e.g., prior to the connection of external storage device 1220 and/or the enablement of the high-quality video capture mode depicted in FIGS. 12D and 12E).

Figure 12M:
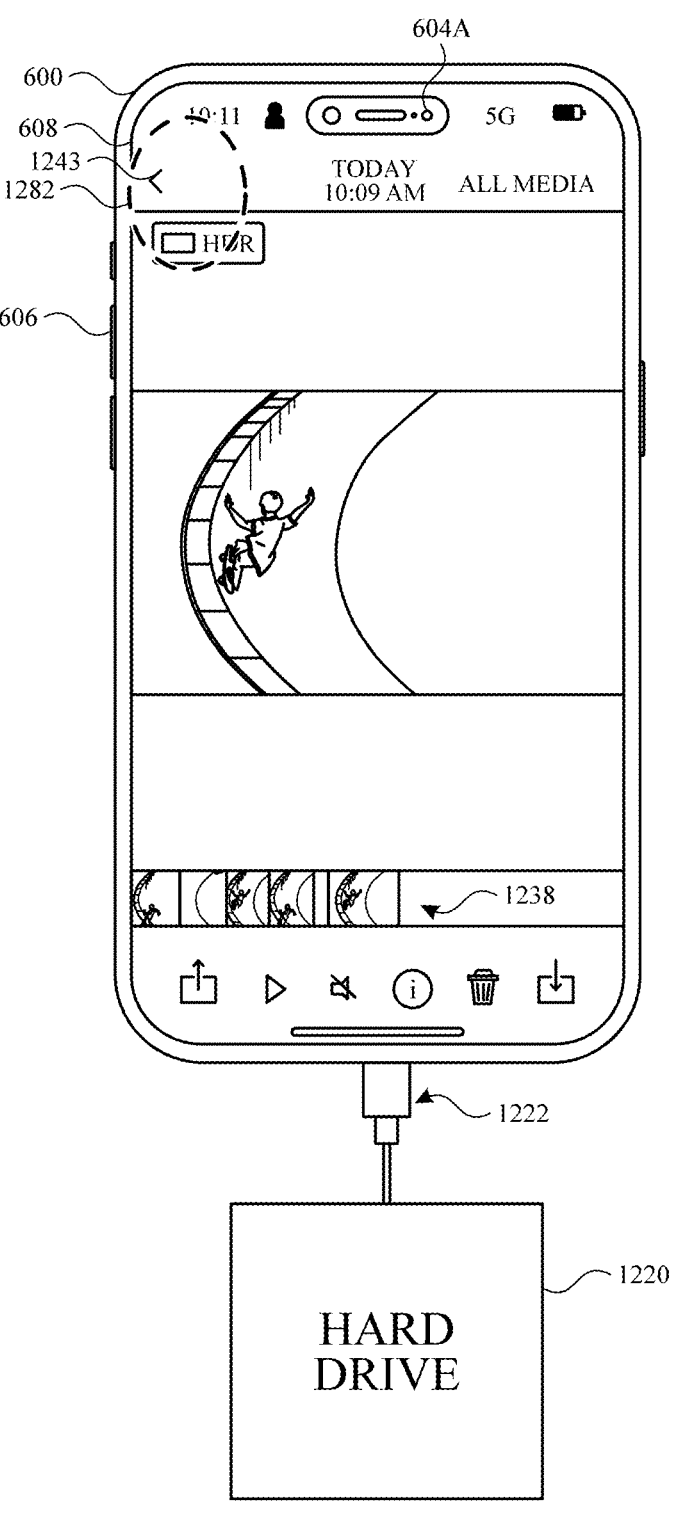

As illustrated in FIG. 12M, while displaying media user interface 1234 as described with respect to the left side of FIG. 12J, computer system 600 detects input 1282 (e.g., a tap input via a touch-sensitive surface of display 608) on return affordance 1243. In response to detecting input 1282, at FIG. 12N, computer system 600 displays camera user interface 1202 as described with respect to FIG. 12I, including displaying captured media icon 1210 with the thumbnail of the second video media.

Figures 12N, 12O:
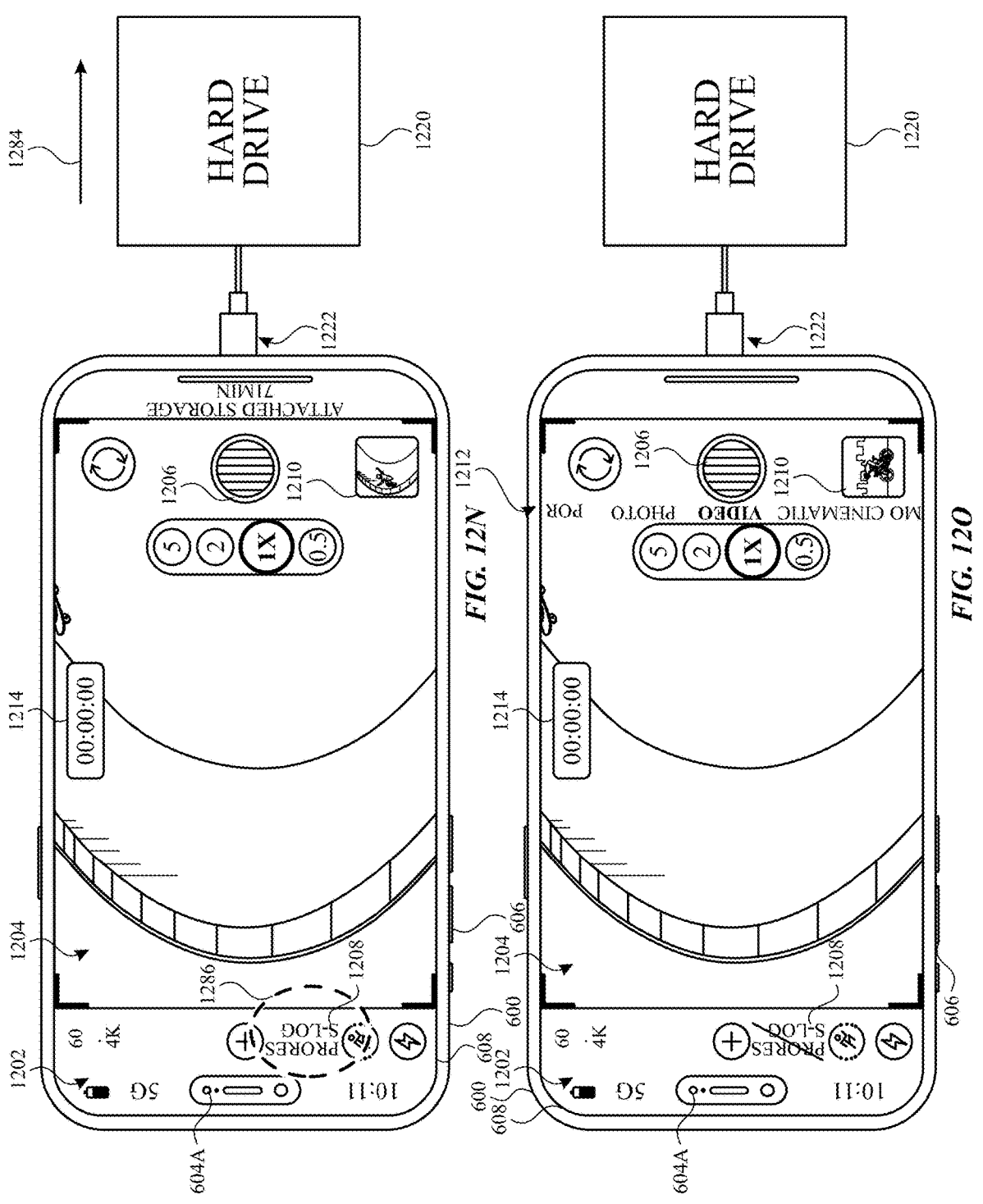

As illustrated in FIG. 12N, in some embodiments, computer system 600 detects disconnection 1284 of external storage device 1220 and/or input 1286 (e.g., a tap input via a touch-sensitive surface of display 608) on video format affordance 1208. In some embodiments, disconnection 1284 is a physical disconnection of wired connection 1222. In some embodiments, disconnection 1284 is another event ending communication between external storage device 1220, such as a software command to "eject" external storage device 1220 and/or a power-down event of external storage device 1220. In some embodiments, computer system 600 disables the high-quality video capture mode automatically in response to detecting disconnection 1284 of external storage device 1220. In some embodiments, computer system 600 disables the high-quality video capture mode in response to detecting input 1286 (e.g., whether or not external storage device 1220 remains connected).

In response to detecting disconnection 1284 and/or input 1286, at FIG. 12O, computer system 600 ceases displaying external storage indicator 1226 and updates captured media icon 1210 to include the thumbnail of the first video media (e.g., the still frame of the first video media depicting the person on the bike). As illustrated in FIG. 12O, in embodiments where computer system 600 detects input 1286 and/or embodiments where computer system 600 disables the high-quality video capture mode automatically in response to detecting disconnection 1284, computer system 600 again displays the line through video format affordance 1208, indicating that the high-quality video capture mode is disabled. Alternatively, as illustrated in FIG. 12P, in embodiments where computer system 600 does not detect input 1286 and/or embodiments where computer system 600 does not automatically disable the high-quality video capture mode in response to detecting disconnection 1284, computer system 600 does not display the line through video format affordance 1208.

Figures 12P, 12Q:
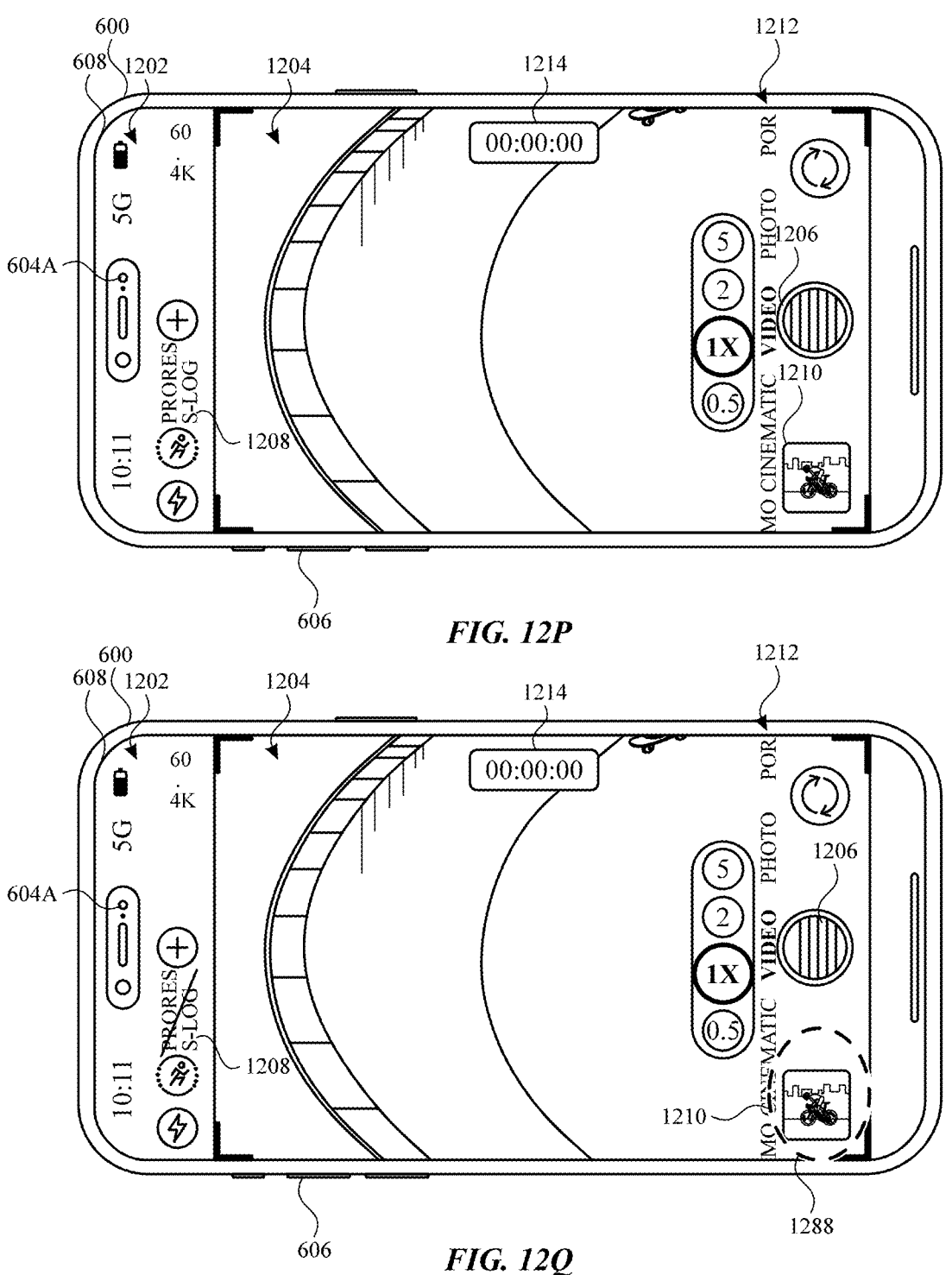

In FIG. 12Q, computer system 600 detects input 1288 (e.g., a tap input via a touch-sensitive surface of display 608) on captured media icon 1210. In response to detecting input 1288, at FIG. 12R, computer system 600 displays ceases displaying camera user interface 1202 and displays media user interface 1234 as described with respect to the right side of FIG. 12I, including view 1246 of the captured first video media and thumbnail set 1248 (e.g., representing media captured outside of the particular capture session and stored on the one or more internal storage devices of computer system 600 and/or on the one or more remote storage devices (e.g., cloud storage)).

Figures 12R, 12S:
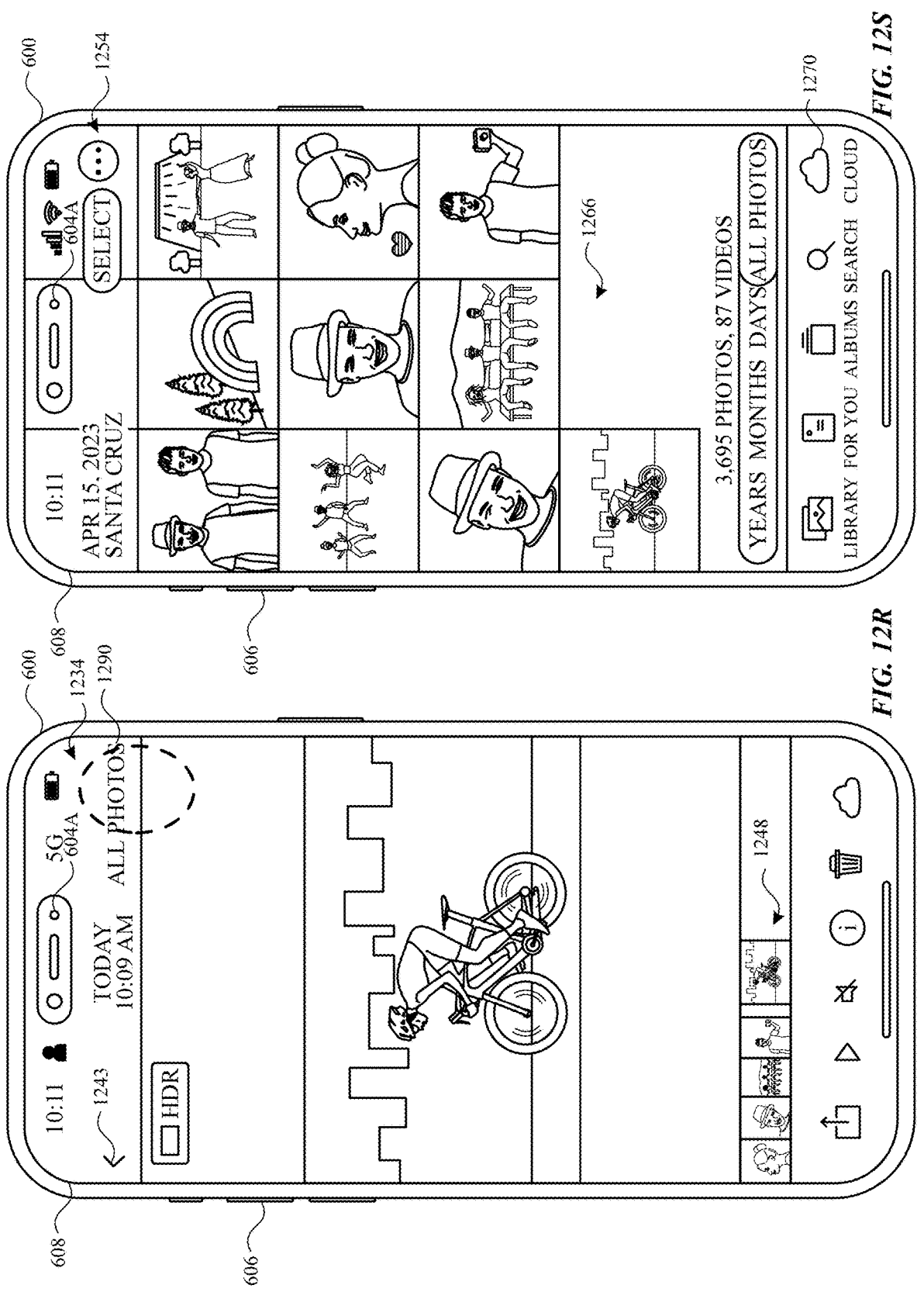
Figure 12T:
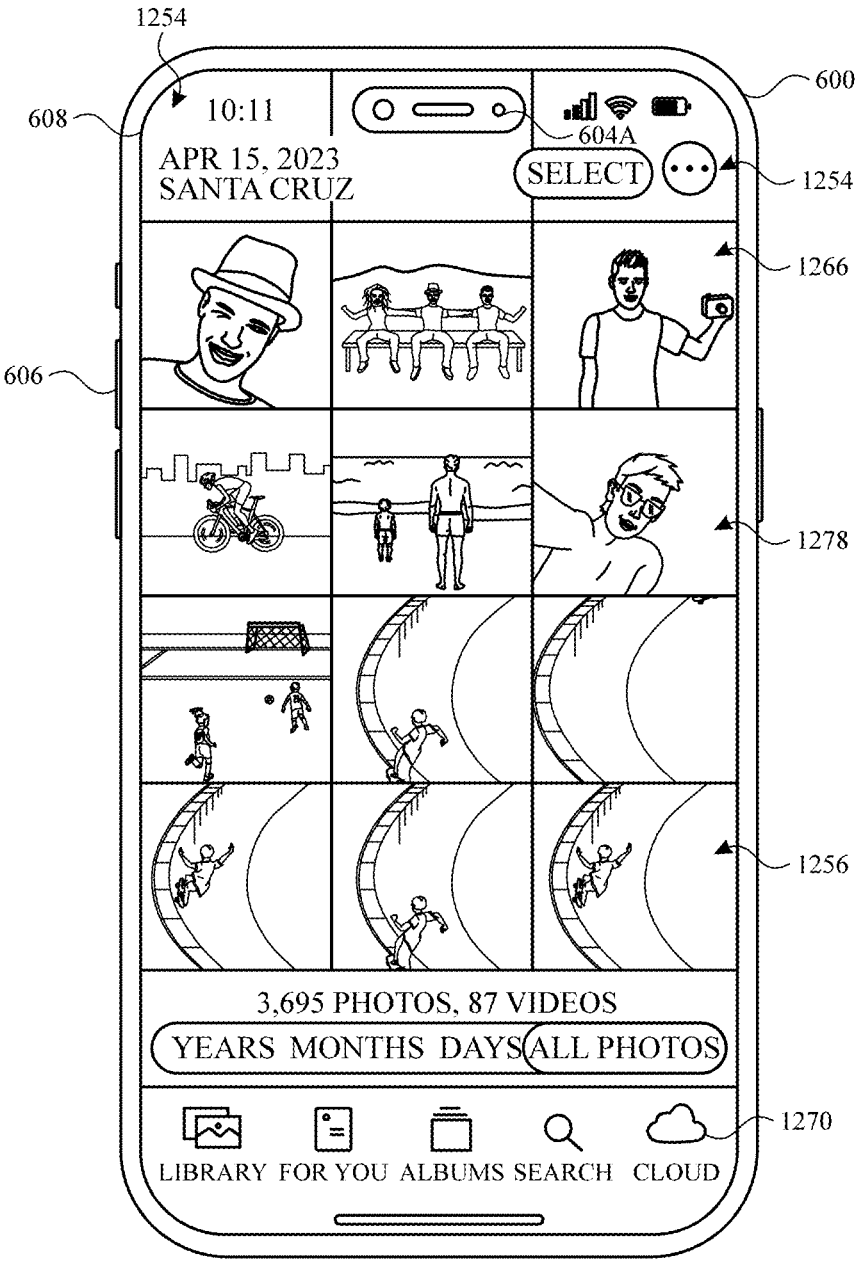

At FIG. 12R, computer system 600 detects input 1290 (e.g., a tap input via a touch-sensitive surface of display 608) on media library affordance 1252. In response to detecting input 1290, at FIG. 12S, computer system 600 displays media library user interface 1254 as described with respect to the right side of FIG. 12J, including thumbnail set 1266 (e.g., representing media captured outside of the particular capture session and stored on the one or more internal storage devices of computer system 600 and/or on the one or more remote storage devices (e.g., cloud storage)). Alternatively, in some embodiments where some or all of the media represented by thumbnail set 1256 was imported into the one or more internal storage devices of computer system 600 and/or on the one or more remote storage devices via media library user interface 1254 (e.g., using import affordance 1260, import all affordance 1262, and/or selection affordance 1264) while external storage device 1220 was connected, computer system 600 displays media library user interface 1254 including thumbnail set 1256 and thumbnail set 1278 (e.g., representing the imported media) in addition to thumbnail set 1266, as illustrated in FIG. 12T.

FIG. 13 is a flow diagram illustrating a method for capturing and viewing media using internal and external media storage using a computer system in accordance with some embodiments. Method 1300 is performed at a computer system (e.g., 100, 300, 500, 600) that is in communication with a display generation component (e.g., 608) (e.g., a display controller; a touch-sensitive display system; a display (e.g., integrated and/or connected), a 3D display, a transparent display, a projector, and/or a heads-up display) and a camera (e.g., 604A, 604B, 604D, and/or 604D) (in some embodiments, the computer system includes one or more cameras, such as a rear (e.g., user-facing) camera and a forward (e.g., environment-facing) camera and/or a plurality of forward cameras (e.g., with different lenses, such as a standard camera, a telephoto camera, and/or a wide-angle camera)) (in some embodiments, the computer system includes internal data storage (e.g., an internal hard drive)) (in some embodiments, the computer system includes one or more hardware ports for wired communication, such as Lightning and/or USB-C ports). Some operations in method 1300 are, optionally, combined, the orders of some operations are, optionally, changed, and some operations are, optionally, omitted.

As described below, method 1300 provides an intuitive way for capturing and viewing media using internal and external media storage. The method reduces the cognitive burden on a user for capturing and viewing media using internal and external media storage, thereby creating a more efficient human-machine interface. For battery-operated computing devices, enabling a user to capture and view media using internal and external media storage faster and more efficiently conserves power and increases the time between battery charges.

The computer system, while displaying, via the display generation component, a camera user interface (e.g., 610) (e.g., a camera/capture UI; in some embodiments, the camera user interface includes a representation of recently-captured media (e.g., a photo well affordance); in some embodiments, the camera user interface includes at least a portion of a field-of-view of the camera(s) (e.g., a live capture preview)), detects (1302) a request to view recently-captured media (e.g., 1232, 1244, 1276, 1288, and/or 1290) (e.g., media captured using the camera user interface) (in some embodiments, the request is a selection of the representation of recently-captured media (e.g., the photo well affordance)).

The computer system, in response to detecting the request to view the recently-captured media (1304) and in accordance with a determination that a set of one or more external storage criteria are met, displays (1306) a representation of a first set of one or more captured media items (e.g., 1236, 1238, 1256, 1278) (e.g., a photo roll including thumbnails and/or larger views of captured media), wherein the first set of one or more captured media items are stored on an external storage device (e.g., 1220) (in some embodiments, an external hard drive or external solid state storage) in communication with the computer system and have not been added to a media library associated with the computer system (in some embodiments, communicating via a wired connection through a hardware port of a user device, such as a Lightning and/or USB-C connection; in some embodiments, only the first set of one or more captured media items and/or only media items stored on the external storage device are displayed (e.g., captured media items included in a media library associated with the computer system are not displayed); in some embodiments, additional captured media items included in a media library associated with the computer system (e.g., from the second set of captured media items) are displayed along with the first set of one or more captured media items).

The computer system, in response to detecting the request to view the recently-captured media (1304) and in accordance with a determination that the set of one or more external storage criteria are not met, displays (1308) a representation of a second set of one or more captured media items (e.g., 1246, 1248, 1268, and/or 1266) that is different from the first set of one or more captured media items, wherein the second set of one or more captured media items are included in the media library associated with the computer system (in some embodiments, the media library includes media items captured by and/or added to the media library by a particular user or group of users of the computer system (e.g., the media library is a personal media library); in some embodiments, the media library includes captured media items stored on an internal hard drive of the user device; in some embodiments, only the second set of one or more captured media items and/or only media items included in the media library associated with the computer system are displayed (e.g., captured media items stored on an external storage device are not displayed); in some embodiments, the media library includes captured media items stored on one or more servers (e.g., on a user's cloud or remote storage account)). Displaying media either from an external storage drive or from a media library associated with the computer system (e.g., an internal/local library) based on external storage criteria assists the user with finding and organizing captured media, which enhances the operability of the system and makes the user-system interface more efficient (e.g., by reducing the number of inputs needed, helping the user to provide proper inputs, and reducing user mistakes when operating/interacting with the system) which, additionally, reduces power usage and improves battery life of the system by enabling the user to use the system more quickly and efficiently. Doing so also provides improved media control options to a user without cluttering the media user interface with additional displayed controls (e.g., by automatically displaying particular media based on external storage criteria). For example, rather than displaying a merged media library of internally and externally stored media and requiring a user to manually seek out particular media (e.g., media captured in a particular session and/or stored on a particular drive), the user is automatically presented with a relevant selection of media.

In some embodiments, storage of at least a portion of contents in the media library associated with the computer system is synchronized with storage of the at least a portion of contents in an online media library (e.g., the media library is a cloud-synched media library; in some embodiments, the contents are stored both locally at the computer system (e.g., on a user device such as a phone, tablet, and/or laptop) and remotely (e.g., on a server) in association with a user account) and storage of contents of the external storage device (e.g., 1220) is not synchronized with storage in the online media library (e.g., the external storage device is not cloud-synched).

In some embodiments the camera user interface (e.g., 610) includes a first selectable user interface object (e.g., 1210) (e.g., a photo well affordance, a camera roll affordance, and/or an external storage affordance), and wherein detecting the request to view the recently-captured media includes detecting an input (e.g., 1232 and/or 1288) directed to the first selectable user interface object (e.g., a touch input on a touch-sensitive surface of a display directed to the region where the first selectable user interface object is displayed and/or another input selecting the first selectable user interface object (e.g., a hardware input, a gesture or air gesture input, and/or a speech input)). Automatically displaying media either from an external storage drive or from a media library associated with the computer system (e.g., an internal/local library) in response to detecting a selection of an option in the camera user interface provides multiple media viewing options to a user without cluttering the media capture user interface with additional displayed controls.

In some embodiments, the camera user interface (e.g., 610) includes a second selectable user interface object (e.g., 1206) that, when selected (e.g., via input 1216 and/or 1228) (e.g., via a user input, such as a tap gesture or an air gesture, directed to the second selectable user interface object), initiates capture of media (e.g., a media capture affordance; in some embodiments, in response to detecting an input selecting the second selectable user interface object, the computer system initiates capture of media (e.g., initiates taking a photo and/or capturing video and storing the media in a media library)).

In some embodiments, the computer system, while displaying the camera user interface, detects an input (e.g., 1216 and/or 1228) directed to the second selectable user interface object (e.g., 1206) (e.g., the media capture affordance). In some embodiments, the computer system, in response to detecting the input directed to the second selectable user interface object, initiates capture of first media (e.g., as illustrated in FIGS. 12B and 12F-12G). In some embodiments, the computer system, in accordance with a determination that the set of one or more external storage criteria are met, stores the first media on the external storage device (e.g., 1220) (in some embodiments, and not storing the first media in the media library). In some embodiments, the computer system, in accordance with a determination that the set of one or more external storage criteria are not met, stores the first media in the media library associated with the computer system (in some embodiments, on local/internal storage of a user device; in some embodiments, on a server in association with a user account (e.g., in a cloud library synched with the media library)). Storing media either on an external storage drive or in a media library associated with the computer system (e.g., an internal/local library and/or a remote library) based on external storage criteria assists the user with finding and organizing captured media, which enhances the operability of the system and makes the user-system interface more efficient, for example, by reducing the number of inputs used to select where captured media is stored and by helping the user manage data storage on and off of a user device.

In some embodiments, the set of one or more external storage criteria include a criterion that is met when the external storage device is in communication (e.g., currently in communication) with the computer system (e.g., via 1222) (e.g., attached to the computer system via connector such as a physical data port and/or a wired connection). Displaying media from the external storage drive when the external storage drive is connected assists the user with finding and organizing captured media, which enhances the operability of the system and makes the user-system interface more efficient, for example, by reducing the number of inputs used to view relevant captured media.

In some embodiments, the set of one or more external storage criteria include a criterion that is met when a respective media capture setting (e.g., represented by 1208) (e.g., a particular camera mode and/or a particular capture format or resolution, such as settings that result in relatively large media file sizes (e.g., video capture, high-quality video capture (e.g., video capture using high resolution, high dynamic range, high frame rate, and/or lossless/no compression), and/or high frame rate video capture)) is enabled for (e.g., via a selection made in the camera user interface; via setting of a setting menu for a camera application that generates the camera user interface) the camera user interface (e.g., as illustrated in FIG. 12E) (e.g., when the request to view captured media is received). Displaying media from the external storage drive when certain camera modes are enabled assists the user with finding and organizing captured media, which enhances the operability of the system and makes the user-system interface more efficient, for example, by reducing the number of inputs used to view relevant captured media.

In some embodiments, displaying the first set of one or more captured media items includes selecting the first set of one or more captured media items from a plurality of captured media items stored on the external storage device (e.g., the displayed media is a subset of the media stored on external storage), wherein the first set of one or more captured media items includes at least a first media item of the plurality of captured media items stored on the external storage device (e.g., 1236, 1238, and/or 1256) and does not include at least a second media item of the plurality of captured media items stored on the external storage device (e.g., 1278). Displaying a subset of all of the media items stored on the external storage drive assists the user with finding and organizing captured media, which enhances the operability of the system and makes the user-system interface more efficient, for example, by reducing the number of inputs used to view relevant captured media.

In some embodiments, selecting the first set of one or more captured media items is based on a determination of whether a respective captured media item was captured during a respective (e.g., current) capture session (in some embodiments, the respective capture session is the current period during which the external storage drive is connected (e.g., connecting the external storage drive starts a new session); in some embodiments, the respective capture session is the current period during which the camera application is open (e.g., opening the camera application starts a new session)), wherein the first media item was captured during the respective capture session and the second media item was not captured during the respective capture session (e.g., the second media item was captured during a different capture session). Displaying the subset of media items captured during the current capture session assists the user with finding and organizing captured media, which enhances the operability of the system and makes the user-system interface more efficient, for example, by reducing the number of inputs used to view relevant captured media.

In some embodiments, the computer system, while displaying the first set of one or more captured media items (in some embodiments, while the external storage criteria are met), detects a request to view additional media (e.g., 1276). In some embodiments, the computer system, in response to detecting the request to view additional media, displaying a file storage user interface (e.g., a user interface for viewing media and other data items stored on the external storage device; in some embodiments, including media items captured during different capture sessions) including a representation of at least the second media item of the plurality of captured media items (in some embodiments, including representations of one or more other media items not included in the plurality of captured media items (e.g., media captured during other capture sessions); in some embodiments, including representations of one or more other data items (e.g., text documents, audio files, PDFs, and/or program files)). Providing the subset of media items captured during other capture sessions when requested assists the user with finding and organizing captured media, which enhances the operability of the system and makes the user-system interface more efficient (e.g., by reducing the number of inputs needed, helping the user to provide proper inputs, and reducing user mistakes when operating/interacting with the system).

In some embodiments, the first set of one or more captured media items includes at least a third media item of the plurality of captured media items, wherein the third media item was not captured during the respective capture session (e.g., as illustrated in FIG. 12L) (e.g., the third media item was captured during a different capture session, but is compatible for display with the media from the current capture session; in some embodiments, the third media item is the same media format and/or type as the media from the current capture session (e.g., another video, another high frame rate video, and/or another high-quality video (e.g., a video capture using high resolution, high dynamic range, high frame rate, and/or lossless/no compression))). Displaying the subset of media items including both items captured during the current capture session and compatible media items from other capture sessions assists the user with finding and organizing captured media, which enhances the operability of the system and makes the user-system interface more efficient, for example, by reducing the number of inputs used to view relevant captured media.

In some embodiments, the computer system, while displaying the first set of one or more captured media items, displays a third selectable user interface object (e.g., 1240, 1260, 1262, and/or 1264) (e.g., an import affordance) that, when selected (e.g., via a user input, such as a tap gesture or an air gesture, directed to the third selectable user interface object), initiates a process for importing (e.g., allowing the user to select and/or import) one or more captured media items stored on the external storage device into the media library associated with the computer system (in some embodiments, in response to detecting an input selecting the selectable user interface object, the computer system receives one or more inputs selecting one or more captured media items stored on the external storage device (e.g., the computer system enables selection of media items, e.g., via inputs directed to the representations of the media items); in some embodiments, in response to detecting an input selecting the selectable user interface object, the computer system imports (e.g., duplicates and stores) a set (e.g., all, a predetermined set (e.g., all media items from a particular capture setting), and/or a user-defined set (e.g., a set of selected media items) of captured media items stored on the external storage device into the media library)). Displaying the option to import from the external storage drive along with the displayed captured media assists the user with finding and organizing captured media, which enhances the operability of the system and makes the user-system interface more efficient, for example, by reducing the number of inputs used to view relevant captured media.

In some embodiments, the computer system, while displaying the camera user interface (e.g., 610), displays a representation of recently-captured media (e.g., 1210) (e.g., a photo well (e.g., thumbnail and/or still) previewing recently-captured media), wherein displaying a representation of recently-captured media includes, in accordance with a determination that the set of one or more external storage criteria are met, displaying a representation of at least one media item stored on the external storage device (e.g., as illustrated in FIGS. 12H and 12N) (in some embodiments, a thumbnail of the most recently captured media on the external storage drive; in some embodiments, a thumbnail of the most recently captured media on the external storage drive from the current photo session). Displaying a preview of media stored on the external storage drive in the camera UI provides a user with real-time visual feedback about a state of the computer system. For example, the preview provides the user with feedback on recently-captured media (e.g., indicating when new media has been captured and giving a preview of the composition) and indicates when the external storage criteria have been met.

In some embodiments, displaying a representation of recently-captured media includes, in accordance with a determination that the set of one or more external storage criteria are not met, displaying a representation of at least one media item included in the media library associated with the computer system (e.g., as illustrated in FIG. 12D) (in some embodiments, a thumbnail of the most recently captured media from the media library; in some embodiments, a thumbnail of the most recently captured media from the media library from the current photo session). Displaying a preview of media stored on the external storage drive in the camera UI provides a user with real-time visual feedback about a state of the computer system. For example, the preview provides the user with feedback on recently-captured media (e.g., indicating when new media has been captured and giving a preview of the composition) and indicates when the external storage criteria have been met.

In some embodiments, the computer system, while displaying the representation of recently-captured media (e.g., 1210) including the representation of the at least one media item stored on the external storage device (e.g., as illustrated in FIGS. 12H and 12N) (e.g., the photo well of the media stored on the external storage drive), detects a disconnection (e.g., 1284) of the external storage device (in some embodiments, the external storage drive is no longer physically and/or wirelessly connected to the computer system; in some embodiments, the external storage drive is in a powered-down and/or other inactive state). In some embodiments, the computer system, in response to detecting the disconnection of the external storage device, ceases displaying the representation of the at least one media item stored on the external storage device and displays the representation of recently-captured media including the representation of the at least one media item included in the media library associated with the computer system (e.g., as illustrated in FIG. 12O). Updating the preview of media to switch from showing media stored on the external storage drive to showing media stored in the media library when the external storage drive is disconnected provides a user with real-time visual feedback about a state of the computer system (e.g., what media is currently available to view and where further media captures will be stored).

In some embodiments, the computer system, while the set of one or more external storage criteria are not met, detects a change in a state of the computer system (in some embodiments, detecting the external storage drive being connected and/or turned on; in some embodiments, detecting a change of the capture mode of the camera to a compatible capture mode), and, in response to detecting the change in the state of the computer system and in accordance with a determination that the set of one or more external storage criteria are met, changes an appearance of the representation of recently-captured media (e.g., as illustrated in FIG. 12E) (e.g., initially clearing and/or graying out the photo well when the external storage criteria are met). In some embodiments, in accordance with a determination that the set of one or more external storage criteria are not met, maintaining (e.g., not changing) the appearance of the representation of recently-captured media. Changing the appearance of preview of media when the external storage mode is initially entered provides a user with real-time visual feedback about a state of the computer system (e.g., indicating that a new capture session has started and that media will be stored on the external drive).

In some embodiments, the computer system, in accordance with a determination that the set of one or more external storage criteria are met, displays an indication (e.g., 1226) of available storage capacity on the external storage device (in some embodiments, a text indication, such as an indication of how much data space remains available (e.g., "1 TB") and/or an indication of how much video can still be stored (e.g., "65 min." and/or "2.5 hr.")). in some embodiments, in accordance with a determination that the set of one or more external storage criteria are not met, forgoing displaying the indication of available storage capacity. Displaying an indication of the remaining available storage when the external storage criteria are met provides a user with real-time visual feedback about a state of the computer system (e.g., indicating that captured media will be stored on the external storage drive and indicating how much media the external storage drive can still store).

In some embodiments, the external storage device (e.g., 1220) is connected to the computer system via a cable port (e.g., via 1222) located near a respective region (e.g., adjacent to the region; in some embodiments, the region is the portion of displayed content that is closest to the port) of content displayed by the display generation component (e.g., for a user device such as a phone or tablet, the cable port is located at the bottom, top, and/or side of the user device, and thus near the bottom, top, and/or side of a touch-sensitive display of the user device), and the indication (e.g., 1226) of the available storage capacity is displayed in the respective region (e.g., near the cable port). (In some embodiments, the indication is displayed elsewhere within the camera UI, e.g., when the external storage device is connected via a different hardware port and/or wirelessly.) Displaying an indication of the remaining available storage when the external storage criteria are met provides a user with real-time visual feedback about a state of the computer system (e.g., indicating that captured media will be stored on the external storage drive (e.g., that the external storage drive is connected) and indicating how much media the external storage drive can still store).

In some embodiments, the indication of the available storage capacity includes a number of minutes corresponding to the available storage capacity (e.g., the number of minutes of video that can be stored on the available storage of the external storage device; in some embodiments, the number of minutes of video that can be stored when the video is captured using the current capture settings (e.g., the number of minutes is determined based on the current capture settings; e.g., a larger number of minutes is displayed when the camera is configured to capture standard video, while a smaller number of minutes is displayed when the camera is configured to capture high-quality video (e.g., a video capture using high resolution, high dynamic range, high frame rate, and/or lossless/no compression) or high frame rate video); in some embodiments, in response to changing current capture settings (e.g., changing the frame rate, resolution, and/or compression codec), the computer system updates the indication of the available storage capacity to an updated number of minutes (e.g., the number of minutes of video that can be stored when the video is captured using the updated capture settings)). Displaying an indication of the remaining available storage when the external storage criteria are met provides a user with real-time visual feedback about a state of the computer system (e.g., indicating that captured media will be stored on the external storage drive (e.g., that the external storage drive is connected) and indicating how much media the external storage drive can still store).

In some embodiments, the computer system, while displaying the camera user interface and in accordance with a determination that the set of one or more external storage criteria are not met, displays a selectable user interface object (e.g., 1212) (e.g., a camera mode selection affordance; in some embodiments, one of several camera mode selection affordances (e.g., a mode menu)) corresponding to a respective capture mode (e.g., standard photo mode, Portrait mode, and/or panoramic mode). In some embodiments, the computer system, while displaying the camera user interface and in accordance with a determination that the set of one or more external storage criteria are met, forgoing display of the selectable user interface object corresponding to the respective capture mode (e.g., while external storage is connected, hide one or more camera mode selection affordances; in some embodiments, default to a video capture mode while the camera mode selection affordances are hidden). Displaying certain capture mode selection affordances only when the external storage criteria are not met provides capture mode control options to a user when relevant without cluttering the media capture user interface with additional displayed controls at other times.

In some embodiments, the computer system, after determining that the set of one or more external storage criteria are met (e.g., while presenting the camera UI and/or the representation of the first set of stored media from the external storage device in an external storage mode), detects a disconnection (e.g., 1284) of the external storage device (e.g., 1220) (in some embodiments, the external storage drive is no longer physically and/or wirelessly connected to the computer system; in some embodiments, the external storage drive is in a powered-down and/or other inactive state) and in response to detecting the disconnection of the external storage device, updates the user interface to indicate that the set of one or more external storage criteria are not met (e.g., as illustrated in FIGS. 12O-12P) (e.g., exiting the external storage mode for presenting the camera UI and/or the representation of the first set of stored media; in some embodiments, ceasing displaying the indication of the available storage capacity; in some embodiments, changing the appearance of the representation of recently-captured media to include displaying a thumbnail of a media item included in the media library (e.g., the most recent media item in the media library) (e.g., instead of a thumbnail of media stored on the external storage device); in some embodiments, displaying a high-quality media capture format affordance in a deselected state). Exiting an external storage mode in response to the user disconnecting the external storage device provides capture mode control options to a user without cluttering the media capture user interface with additional displayed controls.

In some embodiments, the computer system, while displaying the camera user interface, displays a selectable user interface object (e.g., 1208) (e.g., a camera mode selection affordance; in some embodiments, one of several camera mode selection affordances (e.g., a mode menu)) corresponding to a respective capture mode (e.g., a capture mode that is not compatible with an external capture mode and/or does not default to storing media on external storage when available, such as standard photo mode, Portrait mode, and/or panoramic photo mode). In some embodiments, the computer system detects a selection (e.g., 1286) (e.g., a tap, press, hardware input, speech input, and/or gesture) of the selectable user interface object corresponding to the respective capture mode and in response to detecting the selection of the selectable user interface object corresponding to the respective capture mode, updates the user interface to indicate that the set of one or more external storage criteria are not met (e.g., as illustrated in FIGS. 12O-12P) (e.g., exiting the external storage mode for presenting the camera UI and/or the representation of the first set of stored media; in some embodiments, ceasing displaying the indication of the available storage capacity; in some embodiments, changing the appearance of the representation of recently-captured media to include displaying a thumbnail of a media item included in the media library (e.g., the most recent media item in the media library) (e.g., instead of a thumbnail of media stored on the external storage device); in some embodiments, displaying a high-quality media capture format affordance in a deselected state). Exiting an external storage mode in response to the user disconnecting the external storage device provides capture mode control options to a user without cluttering the media capture user interface with additional displayed controls.

Note that details of the processes described above with respect to method 1300 (e.g., FIG. 13) are also applicable in an analogous manner to the methods described above. For example, method 1300 optionally includes one or more of the characteristics of the various methods described above with reference to methods 700, 900, and/or 1100 and/or below with reference to methods 1700, 1900, 2100, and/or 2300. For example, media captured and viewed on external storage and in a media library can be captured and edited as described with respect to methods 700, 900, and 1100. For brevity, these details are not repeated below.

FIGS. 14A-14Q illustrate exemplary user interfaces for conditionally displaying a level indicator based on media capture contents, in accordance with some embodiments. The user interfaces in these figures are used to illustrate the processes described below, including the processes in FIG. 15.

At FIG. 14A, computer system 600 displays, via display 608, camera user interface 610, including camera preview 612, zoom affordance 620, capture mode menu 622, shutter affordance 624, and captured media icon 626 (e.g., as described above with respect to FIGS. 6A-6U). As illustrated in FIG. 14A, the portion of the field-of-view of the cameras currently included in camera preview 612 is primarily occupied by a view of a coastal landscape, with a person standing in the distance with their face occupying relatively little (e.g., less than 5%) of camera preview 612. Computer system 600 is positioned in a landscape orientation, and more specifically, the cameras of computer system 600 (e.g., first camera 604A, second camera 604B, third camera 604C, and fourth camera 604D) are positioned with orientation 1400B (represented by a dotted x-y axis (e.g., visible in FIG. 14B) labeled X'-Y', where the x-axis runs parallel to the long edge of display 608 and the y-axis runs parallel to the short edge of display 608), which, at FIG. 14A, is aligned with orientation 1400A of the environment (represented by a solid x-y axis labeled X-Y, where the y-axis runs parallel to the direction of gravitational pull in the environment (e.g., the gravitational pull of Earth) and the x-axis runs perpendicular to the direction of gravitational pull). Accordingly, at FIG. 14A, the horizon of the environment (e.g., as captured by second camera 604B, third camera 604C, and/or fourth camera 604D on the backside of computer system 600) appears level in camera preview 612 (e.g., parallel to the long edge of display 608) and would appear level in media captured at the current orientation (e.g., parallel to the long edge of the landscape-oriented media capture).

At FIG. 14A, computer system 600 detects input 1402, an input via hardware button 606, requesting level capture guidance. In some embodiments where hardware button 606 includes a pressure-sensitive button (e.g., a button that can detect variations in applied pressure), input 1402 includes a light press, which is a press input activated by applying at least a threshold activation pressure (e.g., 75 g/cm$^2$, 100 g/cm$^2$, or 150 g/cm$^2$) and maintaining at least a threshold maintenance pressure (e.g., 5 g/cm$^2$, 10 g/cm$^2$, or 20 g/cm$^2$) without exceeding a threshold maximum pressure (e.g., 75 g/cm$^2$, 100 g/cm$^2$, or 150 g/cm$^2$, at which point the input may register as a hard press instead of a light press). However, computer system 600 does not display level capture guidance at FIG. 14A, as orientation 1400B (e.g., the orientation of the cameras of computer system 600) is substantially aligned with orientation 1400A (e.g., the direction of gravitational pull). In some embodiments, rather than physically providing input 1402, a user of computer system 600 can enable a level capture guidance setting (e.g., as discussed with respect to FIGS. 14P-14Q below), which, while enabled, causes the level guidance to be displayed in camera user interface 610 whenever level indicator criteria are met, as described in further detail below. Thus, the level capture guidance setting can be used to set whether the guidance is displayed whenever the level guidance criteria are met or only when the criteria are met and the required input at hardware button 606 is also provided.

Figure 14B:
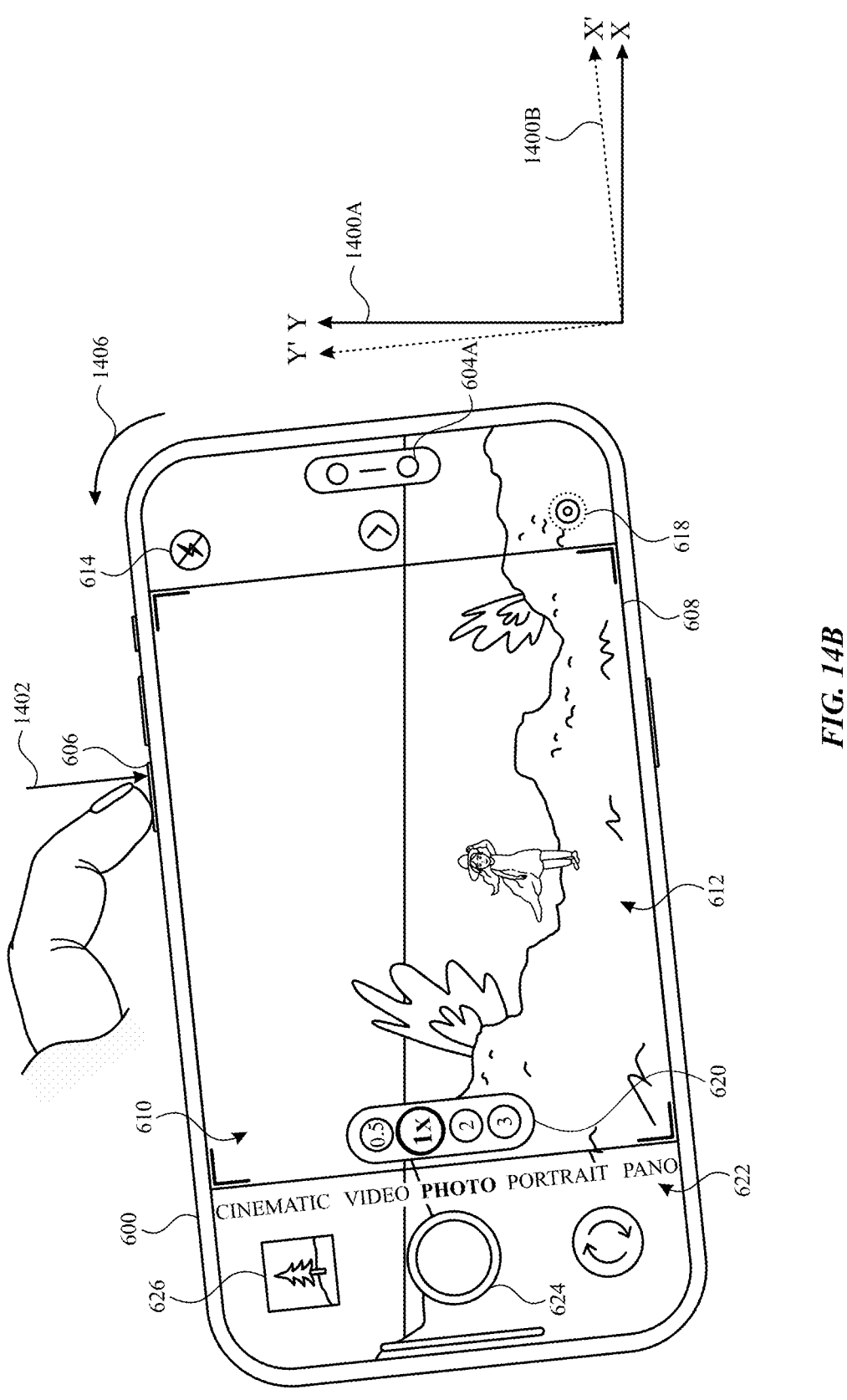

At FIG. 14A, computer system 600 detects rotation 1404, rotating computer system 600 counterclockwise to the position shown in FIG. 14B, where orientation 1400B is slightly out of alignment with orientation 1400A. Although computer system 600 detects input 1402 requesting level capture guidance, at FIG. 14B, computer system 600 still does not display level capture guidance, as the difference between orientation 1400A and orientation 1400B does not exceed a first threshold difference (e.g., 0.05°, 0.10, 0.2°, 0.3°, 0.5°, 10, or 2°).

Figure 14C:
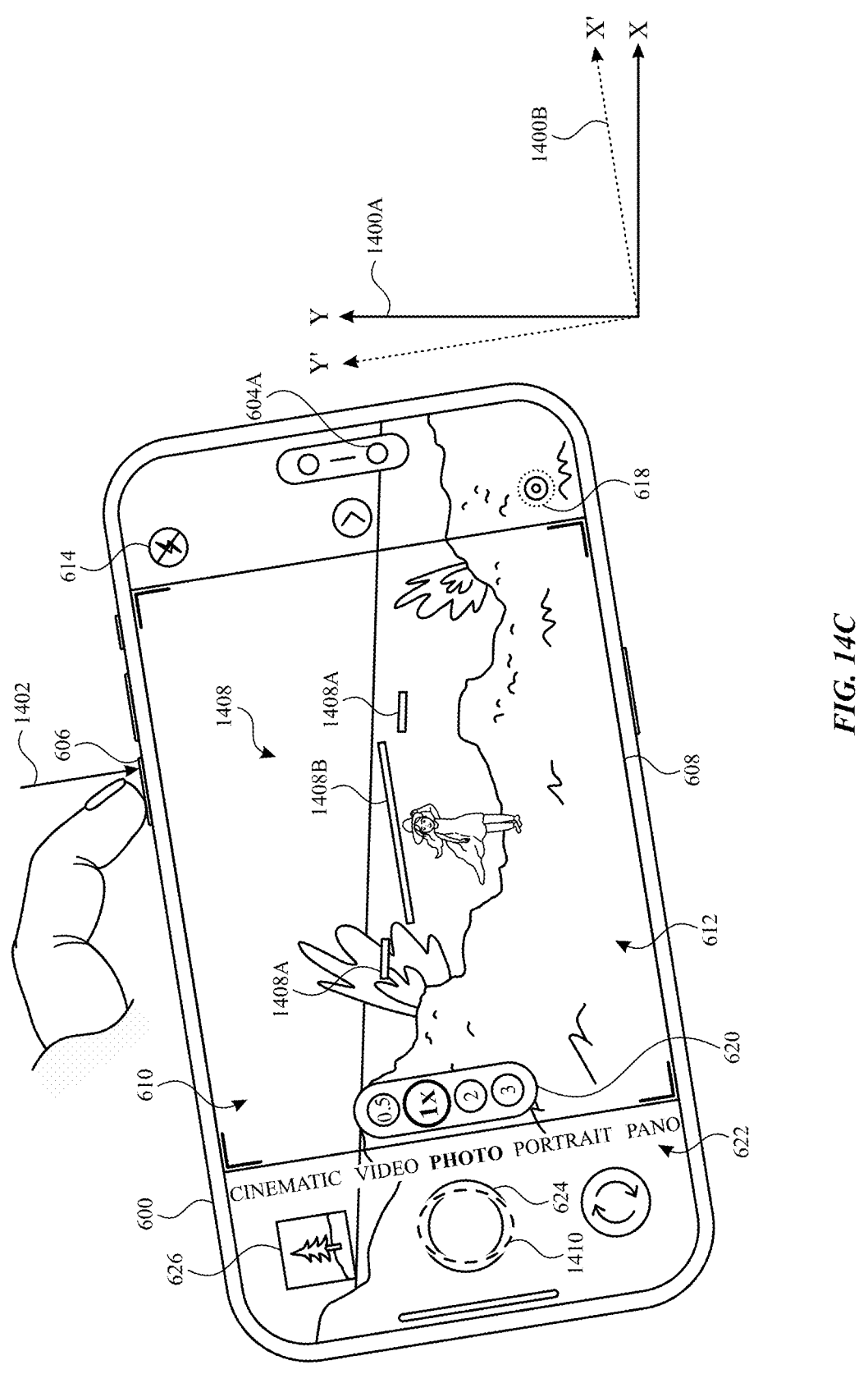

At FIG. 14B, computer system detects rotation 1406, further rotating computer system 600 counterclockwise to the position shown in FIG. 14C, where the difference between orientation 1400A and orientation 1400B exceeds the first threshold difference (e.g., 0.05°, 0.10, 0.2°, 0.3°, 0.5°, 10, or 2°) and the horizon of the environment appears visibly tilted with respect to camera preview 612. As illustrated in FIG. 14C, computer system 600 detects (e.g., using image and/or facial recognition techniques) that the portion of the field-of-view of the cameras currently included in camera preview 612 is still primarily occupied by a view of a coastal landscape, with a person standing in the distance occupying relatively little (e.g., roughly less than 5%) of camera preview 612. Although computer system 600 may detect the face of the person standing in the distance, the face of the person occupies a very small portion of camera preview 612.

Because camera preview 612 is primarily occupied (e.g., at least 75%, 80%, or 90% occupied) by non-facial content, at FIG. 14C, computer system 600 displays level indicator 1408 in response to input 1402 requesting level capture guidance. Level indicator 1408 indicates the current difference between orientation 1400A and orientation 1400B. Specifically, computer system 600 displays first portion 1408A of level indicator 1408, an exterior portion of a broken line, in alignment with orientation 1400A (e.g., parallel to the x-axis of X-Y), and displays second portion

1408B of level indicator 1408, an interior portion of the broken line, in alignment with orientation 1400B (e.g., parallel to the x-axis of X'-Y').

Figure 14D:
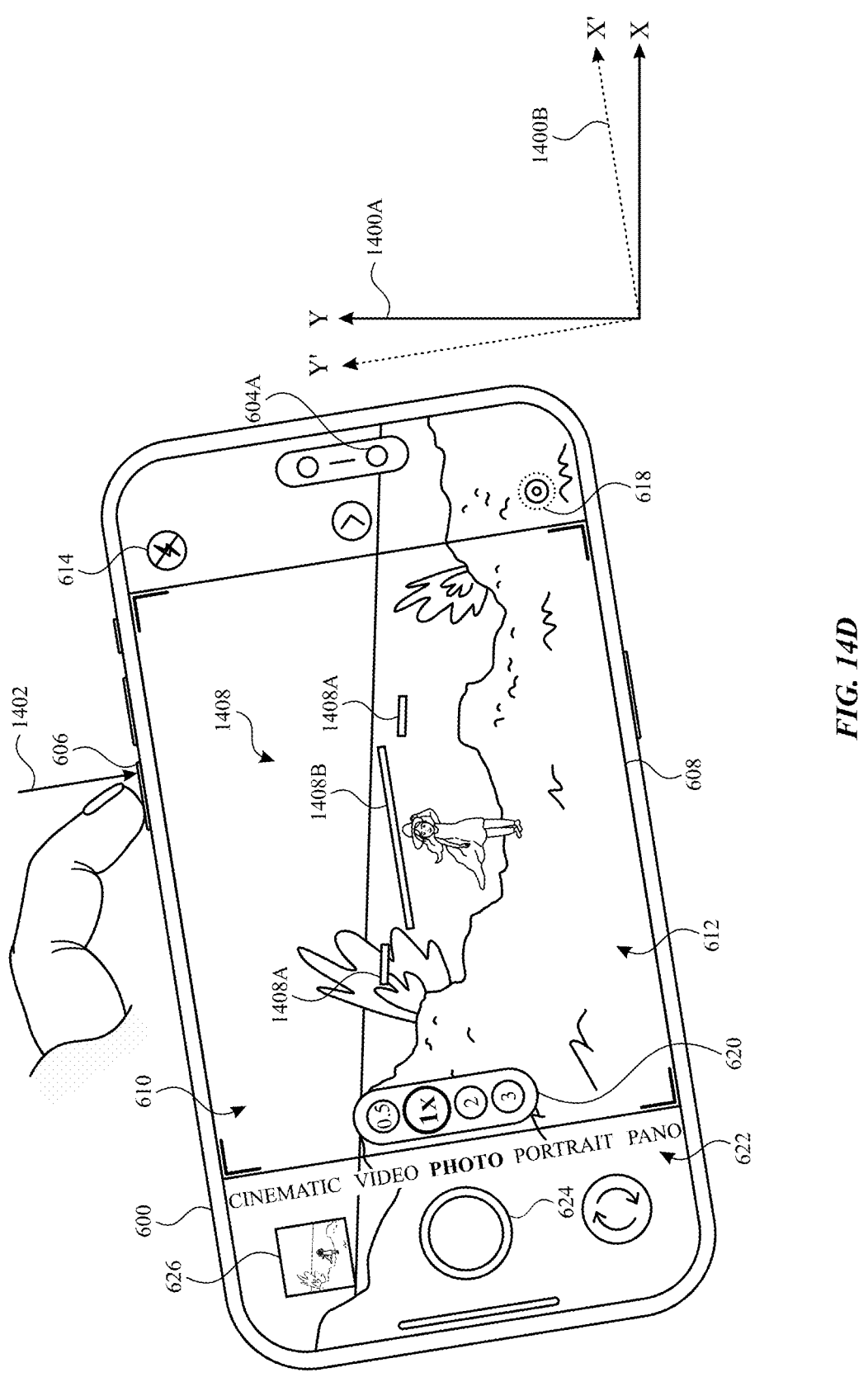

At FIG. 14C, computer system 600 detects an input requesting media capture, such as tap input 1410 directed to shutter affordance 624. In some embodiments, input 1402 is detected as an input requesting media capture if the pressure applied by input 1402 exceeds the threshold maximum pressure (e.g., 75 g/cm$^2$, 100 g/cm$^2$, or 150 g/cm$^2$, registering as a hard press instead of a soft press). In response to detecting the input requesting media capture, computer system 600 initiates media capture, using second camera 604B, third camera 604C, and/or fourth camera 604D to capture photo media at orientation 1400B. As illustrated in FIG. 14D, after capturing the photo media, computer system 600 updates captured media icon 626 to display a thumbnail of the photo media. The photo media captured at orientation 1400B is visibly tilted with respect to the horizon of the environment, and level indicator 1408 is not included in the captured photo media.

Figure 14E:
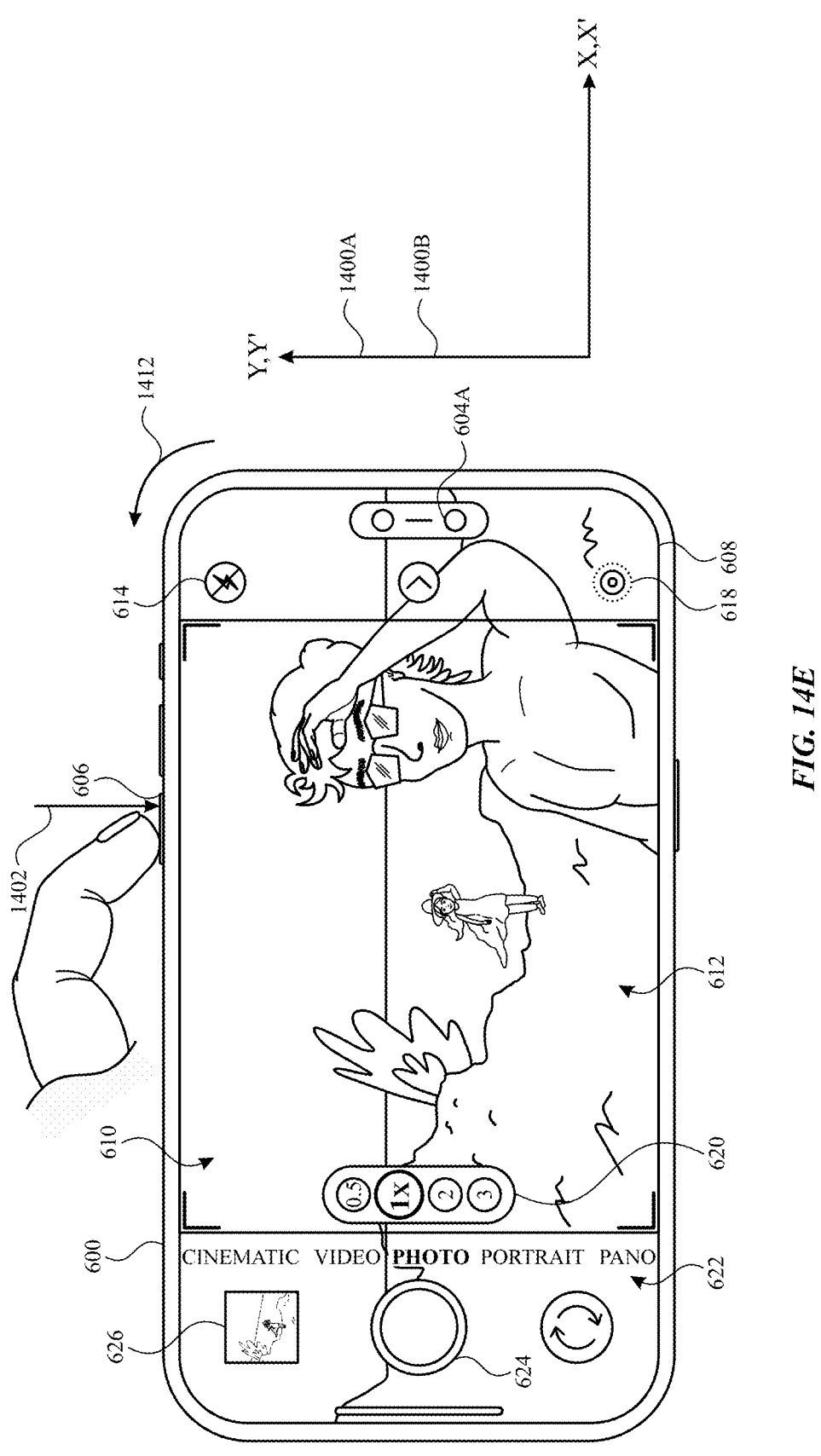
Figure 14F:
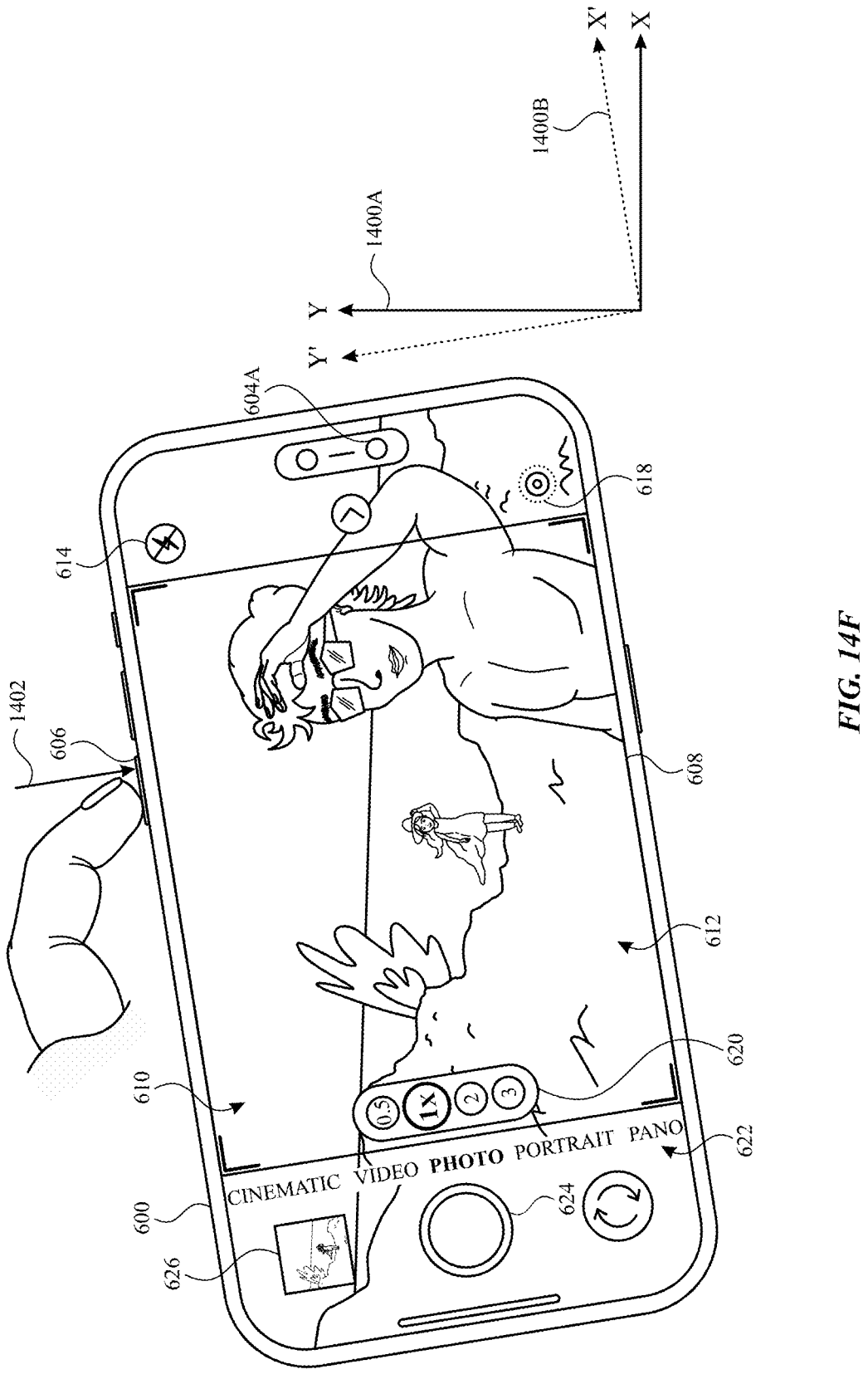

At FIG. 14E, computer system 600 is positioned as described with respect to FIG. 14A, with orientation 1400A and orientation 1400B aligned, and thus, in response to detecting input 1402 requesting level capture guidance, computer system 600 does not display level capture guidance (e.g., level indicator 1408). At FIG. 14E, computer system detects rotation 1412, rotating computer system 600 counterclockwise to the position shown in FIG. 14F, where, as in FIG. 14C, the difference between orientation 1400A and orientation 1400B exceeds the first threshold difference (e.g., 0.05°, 0.10, 0.2°, 0.3°, 0.5°, 1°, or 2°) and the horizon of the environment appears visibly tilted with respect to camera preview 612. However, as illustrated in FIGS. 14E-14F, computer system 600 detects (e.g., using image and/or facial recognition techniques) that the portion of the field-of-view of the cameras currently included in camera preview 612 is occupied by a face of a person in the foreground of camera preview 612, and that the face of the person in the foreground occupies over a threshold area (e.g., at least 10%, 20%, or 25%) of camera preview 612. Accordingly, computer system 600 still does not display level capture guidance (e.g., level indicator 1408), as camera preview 612 is not primarily occupied (e.g., at least 75%, 80%, or 90% occupied) by non-facial content.

In some embodiments, if the face of the person in the foreground of camera preview 612 were detected while computer system 600 is displaying level indicator 1408 (e.g., if the person entered the frame of camera preview 612 while computer system 600 is in the state described with respect to FIG. 14C), computer system 600 ceases displaying level indicator 1408 while the face is present and occupying at least the threshold area of capture preview 612. In some embodiments, if computer system 600 no longer detects the face of the person in the foreground of camera preview 612 occupying at least the threshold area while computer system 600 is in the state described with respect to 14F (e.g., if the person exits the frame or moves further away), computer system 600 displays level indicator 1408 (e.g., as illustrated in FIG. 14C).

Figure 14G:
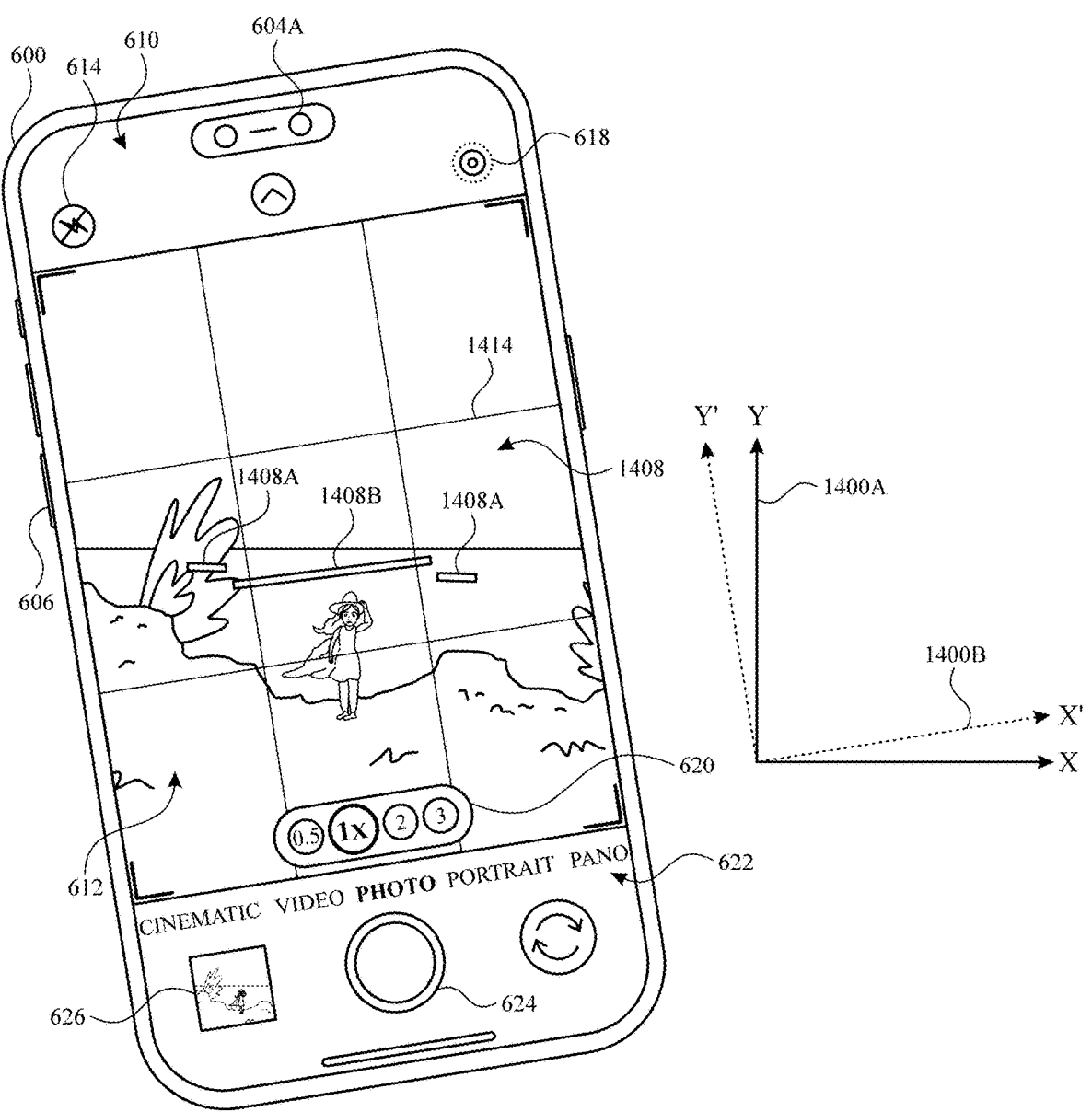

At FIG. 14G, computer system 600 is positioned in a portrait orientation, and the cameras of computer system 600 are positioned with orientation 1400B. However, while in the portrait orientation, the x-axis of X'-Y' runs parallel to the short edge of display 608 and the y-axis of X'-Y' runs parallel to the long edge of display 608. At FIG. 14G, the difference between orientation 1400A and orientation 1400B is the same as the difference between orientation 1400A and orientation 1400B at FIG. 14C, and exceeds the first thresh-old difference (e.g., 0.05°, 0.10, 0.2°, 0.3°, 0.5°, 10, and/or 2°). As illustrated in FIG. 14G, the portion of the field-of-view of the cameras currently included in camera preview 612 is primarily occupied by a view of a coastal landscape with the person standing in the distance occupying relatively little (e.g., roughly less than 5%) of camera preview 612. Additionally, at FIG. 14G, the level capture guidance setting is enabled (e.g., as discussed with respect to FIGS. 14P-14Q below). Accordingly, computer system 600 displays level indicator 1408 with first portion 1408A aligned with orien-tation 1400A (e.g., the x-axis of X-Y) and second portion 1408B aligned with orientation 1400*b* (e.g., the x-axis of X'-Y', which, when computer system 600 is positioned in the portrait orientation, is parallel to the short edge of display 608). In some embodiments, the level capture guidance setting is enabled as part of a general capture guidance setting, and, when the general capture guidance setting is enabled, computer system 600 displays camera preview 612 with capture guidance grid 1414.

Figure 14H:
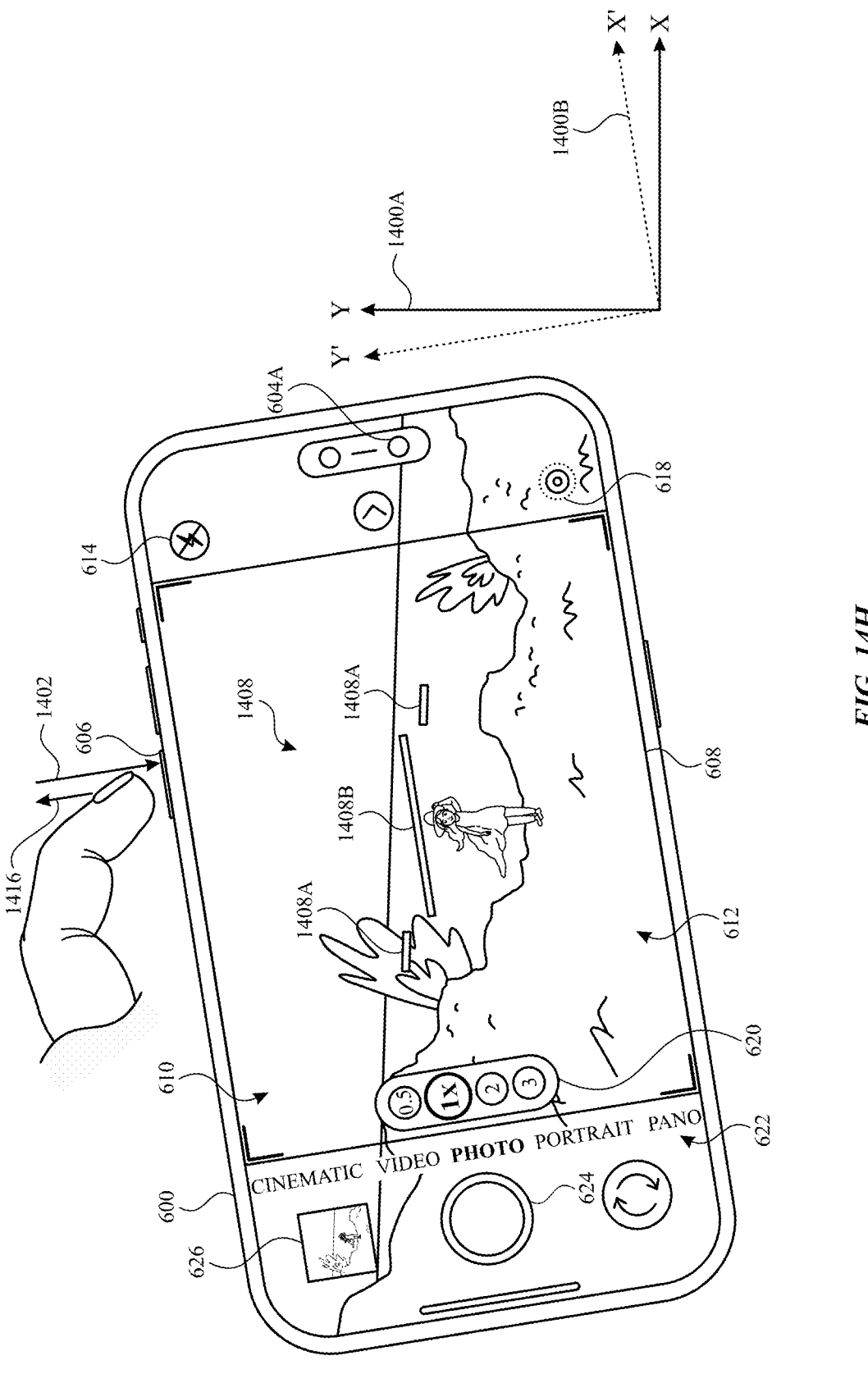

At FIG. 14H, computer system 600 is positioned such that the difference between orientation 1400A and orientation 1400B exceeds the first threshold, and camera preview 612 is primarily occupied by non-facial content (e.g., as described with respect to FIG. 14C). Additionally, at FIG. 14H, the level capture guidance setting is disabled (e.g., as discussed with respect to FIGS. 14P-14Q below). Accord-ingly, in response to detecting input 1402 requesting level capture guidance, computer system 600 displays level indi-cator 1408 with first portion 1408A and second portion 1408B aligned relative to each other as described with respect to FIG. 14C.

At FIG. 14H, computer system 600 detects liftoff 1416 of input 1402 (e.g., the press of hardware button 606 is released and/or falls below the threshold maintenance pressure, and computer system 600 stops detecting input 1402). As input 1402 requesting level capture guidance is no longer detected and the level capture guidance setting is disabled, at FIG. 14I, computer system ceases displaying level indicator 1408, despite computer system 600 remaining in the same position and camera preview 612 being occupied by the same content as in FIG. 14H.

Figure 14I:
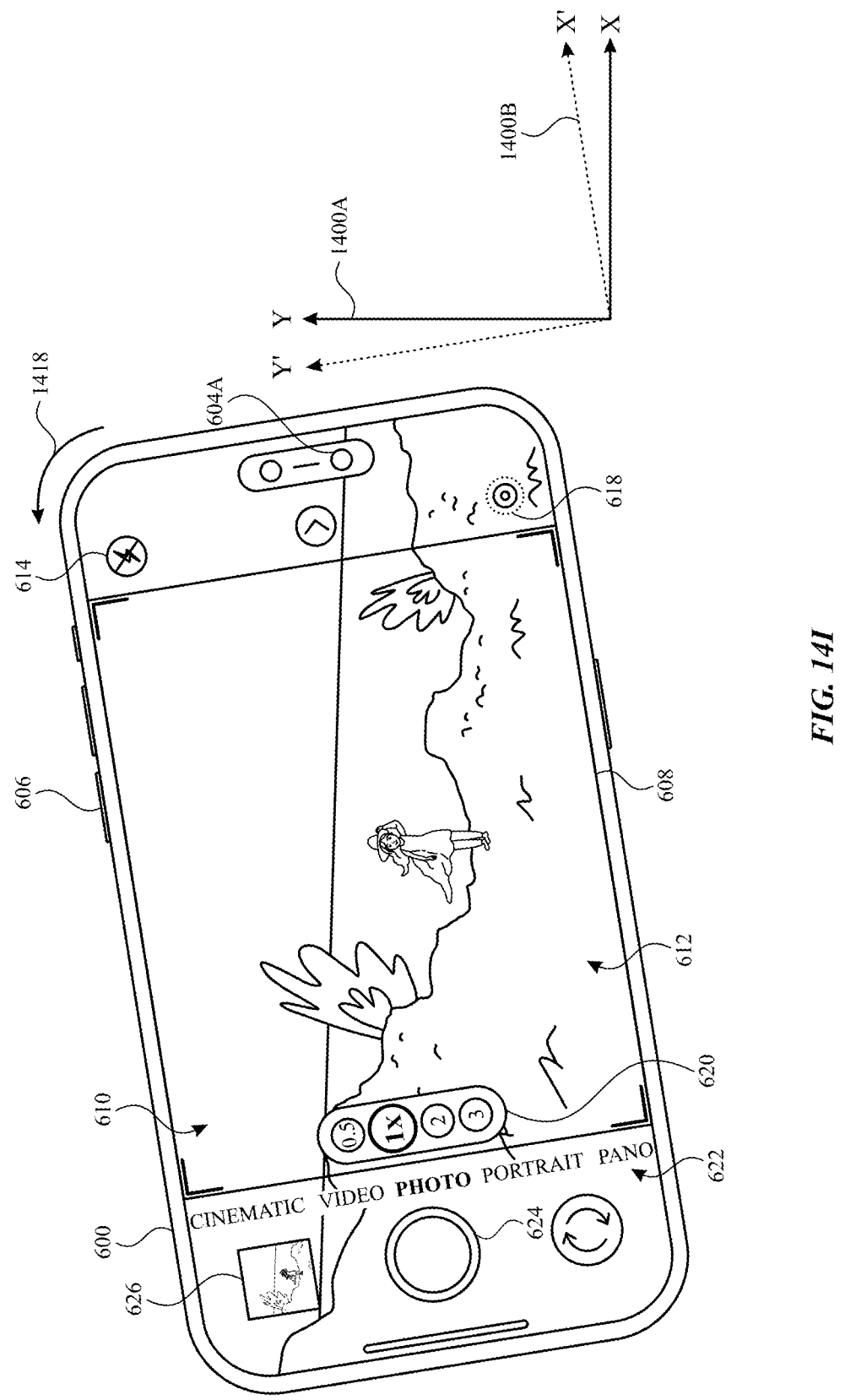
Figure 14J:
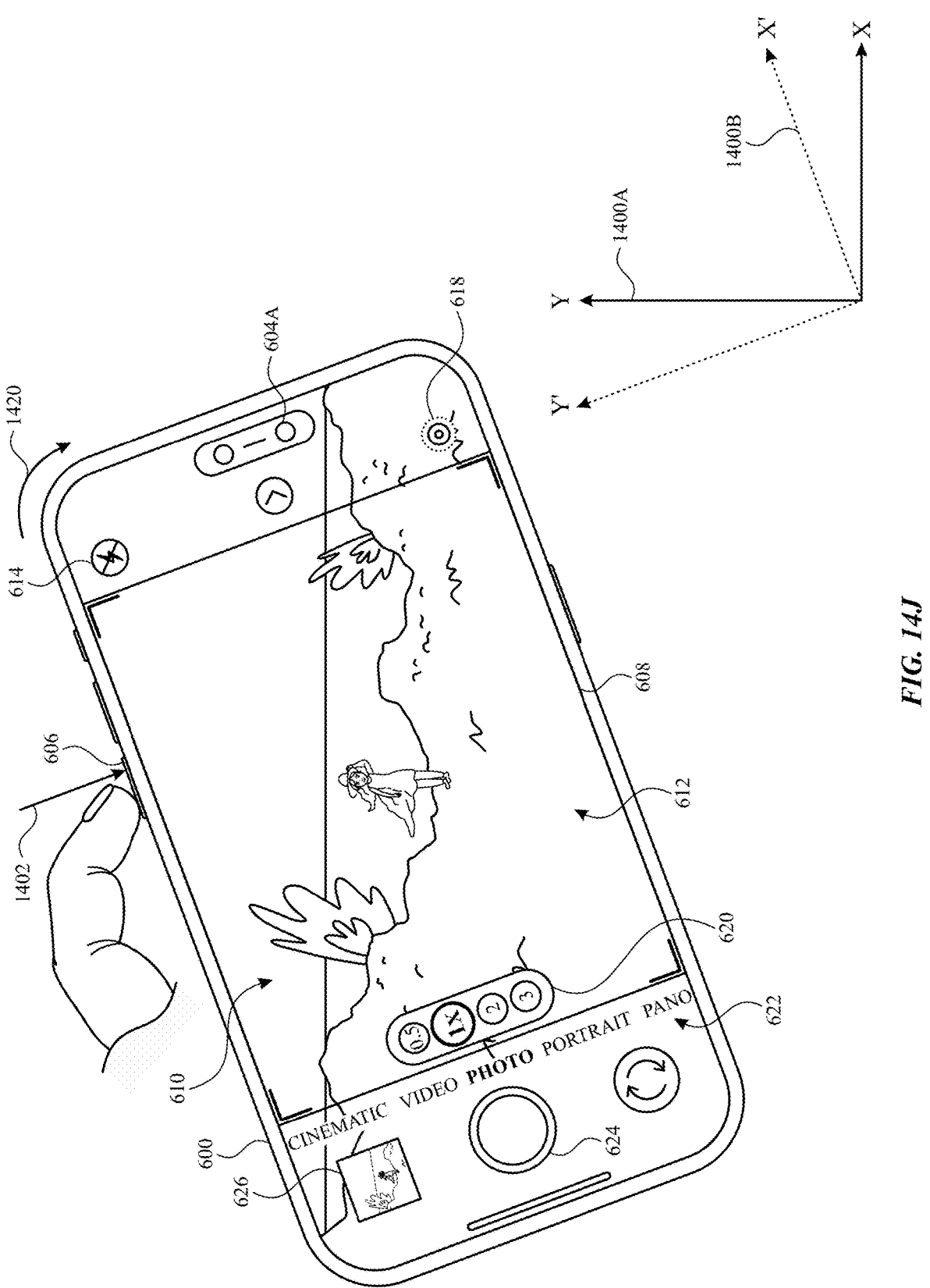

At FIG. 14I, computer system 600 detects rotation 1418, further rotating computer system 600 counterclockwise to the position shown in FIG. 14J. At FIG. 14J, the difference between orientation 1400A and orientation 1400B exceeds a second threshold difference (e.g., 3°, 5°, 7.5°, 10°, 15°, or 20°) that is greater than the first threshold difference. Because the difference between orientation 1400A and ori-entation 1400B exceeds the second threshold difference, computer system 600 does not display level capture guid-ance (e.g., level indicator 1408) in response to detecting input 1402 requesting level capture guidance, despite cam-era preview 612 still being primarily occupied by non-facial content.

Figure 14K:
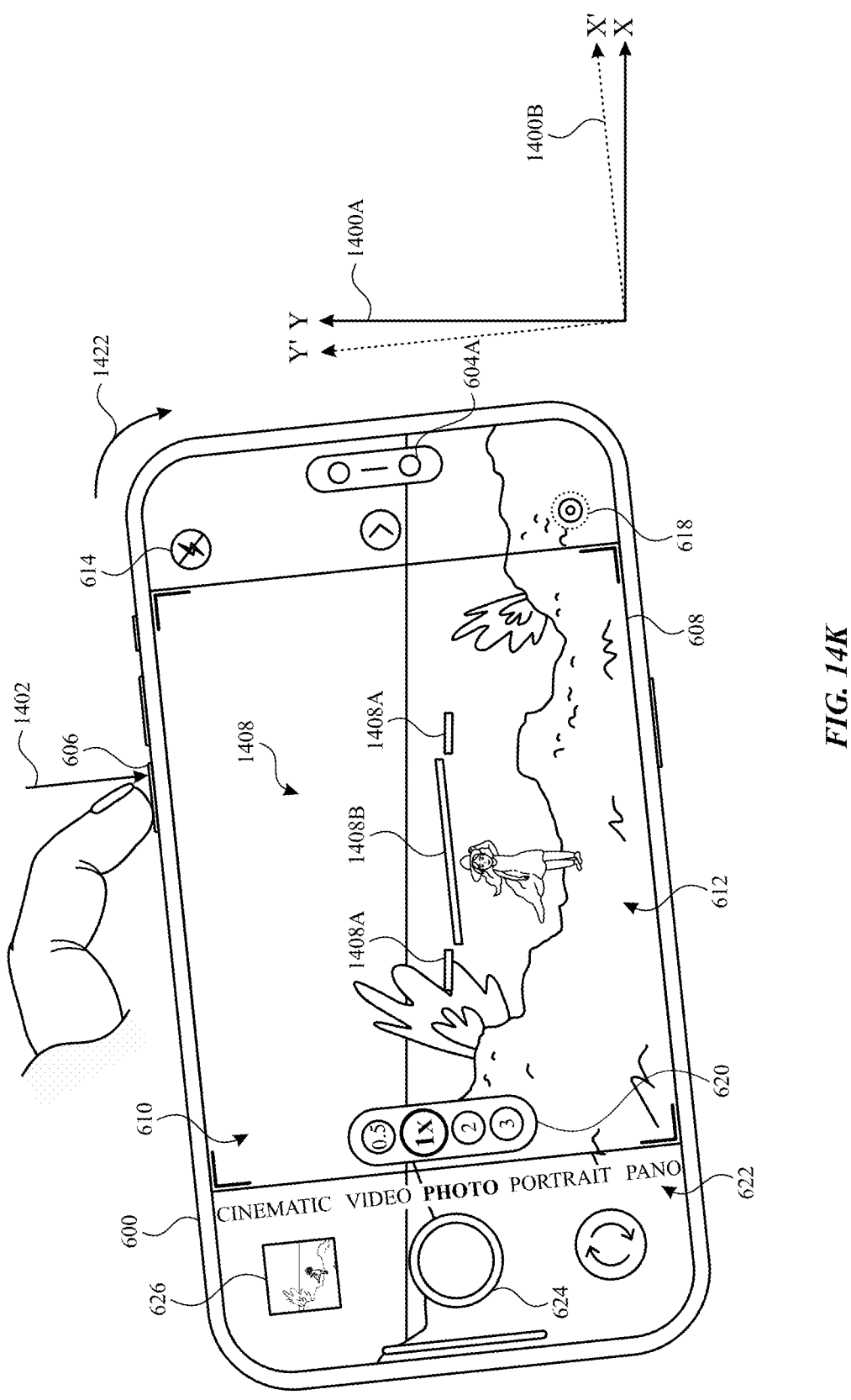

At FIG. 14J, computer system 600 detects rotation 1420, rotating computer system 600 clockwise to the position shown in FIG. 14K and thereby reducing the difference between orientation 1400A and orientation 1400B. In some embodiments, as the difference between orientation 1400A and orientation 1400B decreases to below a third threshold difference (e.g., 2.5°, 4°, 6°, 8°, 12°, or 15°) that is lower than the second threshold difference but still greater than the first threshold difference, computer system 600 may display level indicator 1408 (e.g., in response to detecting input 1402 requesting level capture guidance and/or while camera preview 612 is primarily occupied by non-facial content). At FIG. 14K, the difference between orientation 1400A and orientation 1400B has decreased to below the third threshold difference and the first threshold difference (e.g., the thresh-old difference at which level indicator 1408 was initially displayed in FIG. 14C) but remains above a fourth threshold difference (e.g., 0.02°, 0.05°, 0.10, 0.2°, 0.3°, 0.5°, or 1°), and camera preview 612 is still primarily occupied by non-facial content. Accordingly, computer system 600 dis-plays level indicator 1408 in response to input 1402 request-ing level capture guidance. As illustrated in FIG. 14K, with first portion 1408A of level indicator 1408 displayed aligned to orientation 1400A and second portion 1408B of level indicator 1408 displayed aligned to orientation 1400B, level indicator 1408 still appears as a broken line, but first portion 1408A and second portion 1408B are displayed closer to alignment than they were displayed in FIG. 14C (e.g., when the difference between orientation 1400A and orientation 1400B was greater).

Figure 14L:
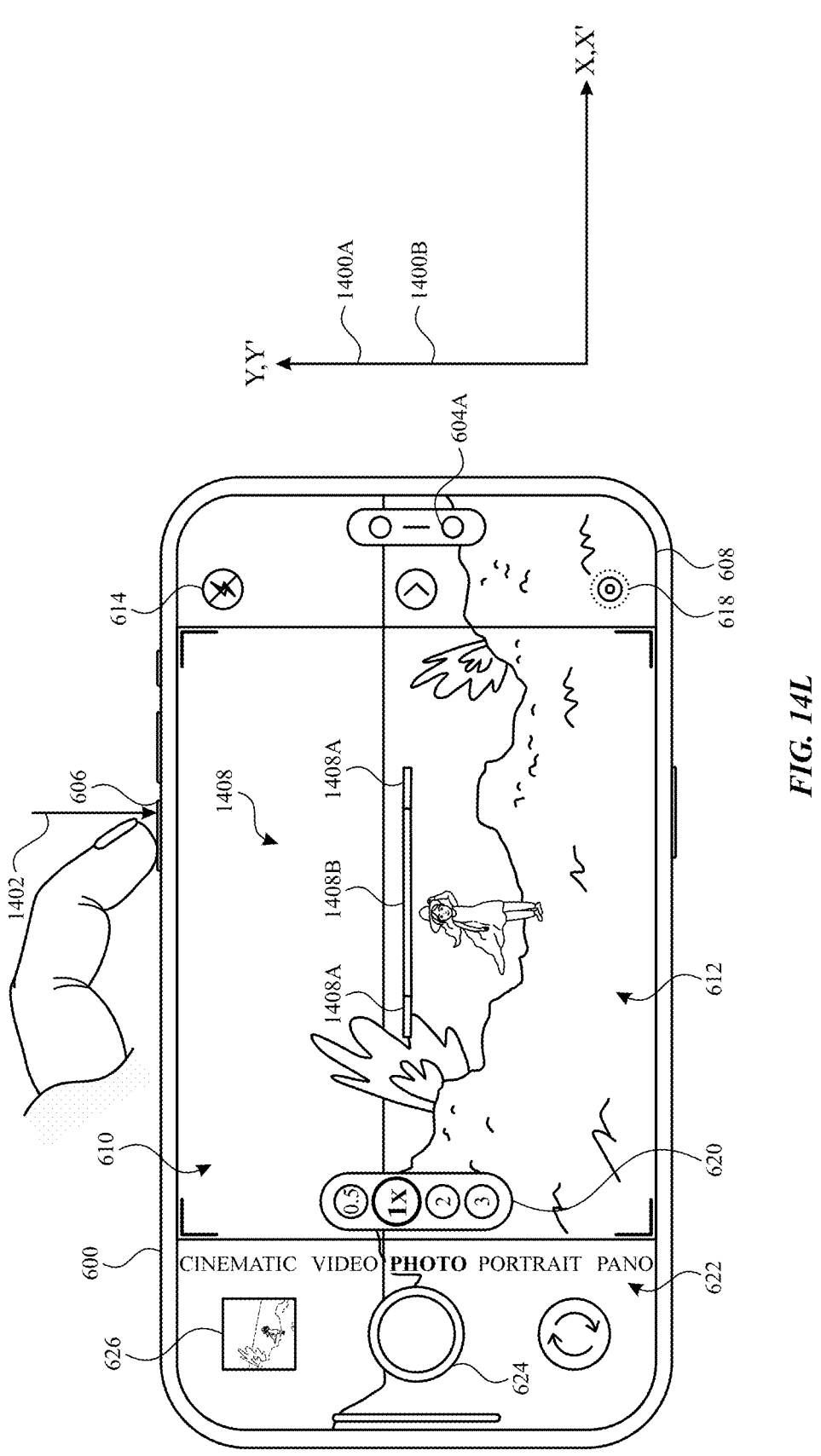

At FIG. 14K, computer system 600 detects rotation 1422, rotating computer system 600 clockwise to the position shown in FIG. 14L and thereby further reducing the differ-ence between orientation 1400A and orientation 1400B. At FIG. 14L, the difference between orientation 1400A and orientation 1400B falls below the fourth threshold differ-ence. Accordingly, computer system 600 temporarily dis-plays first portion 1408A of level indicator 1408 and second portion 1408B of level indicator 1408 lining up such that level indicator 1408 appears as an unbroken line, and subsequently, at FIG. 14M, computer system 600 ceases displaying level indicator 1408 in response to input 1402 requesting level guidance.

Figure 14M:
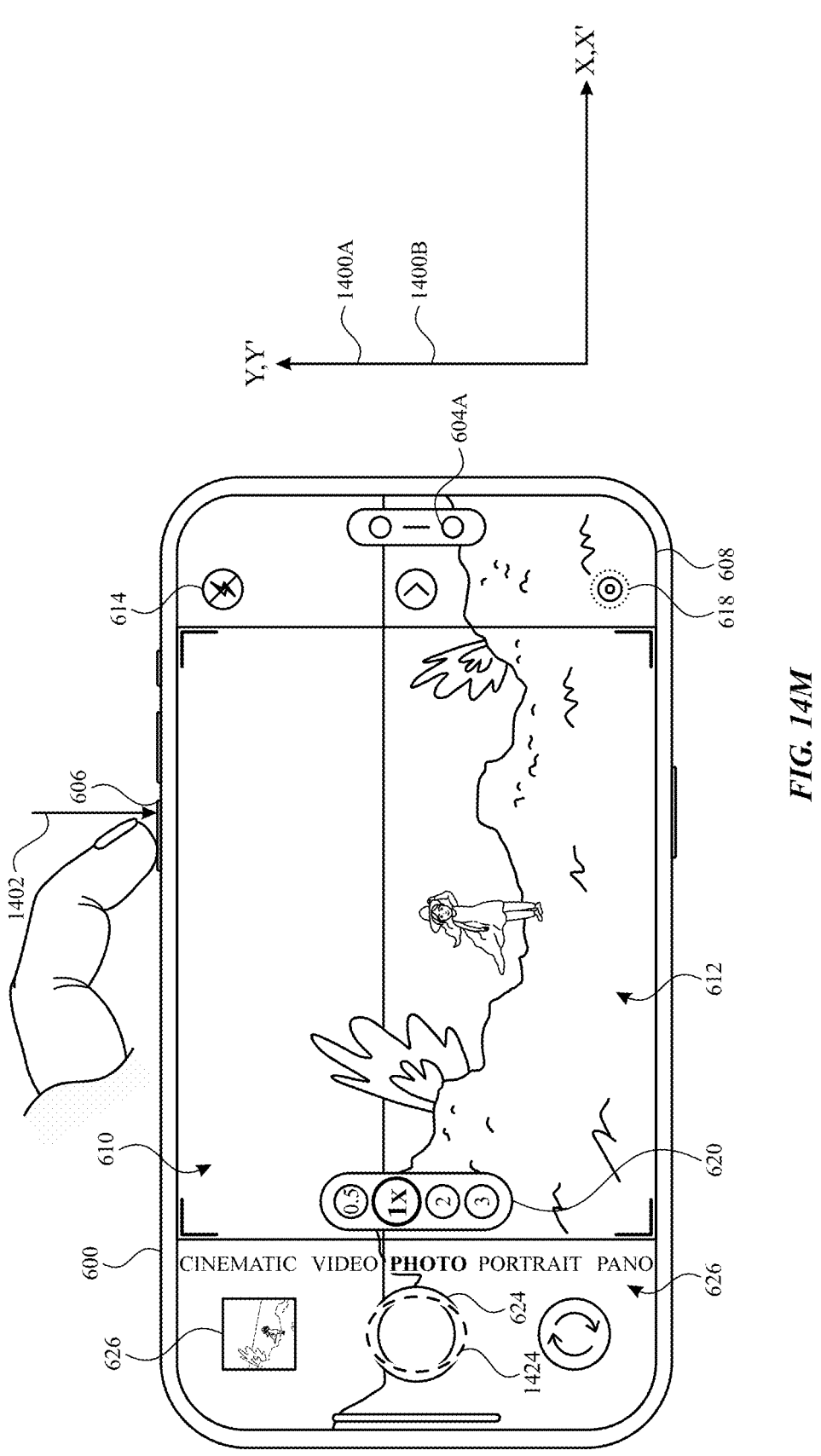
Figure 14N:
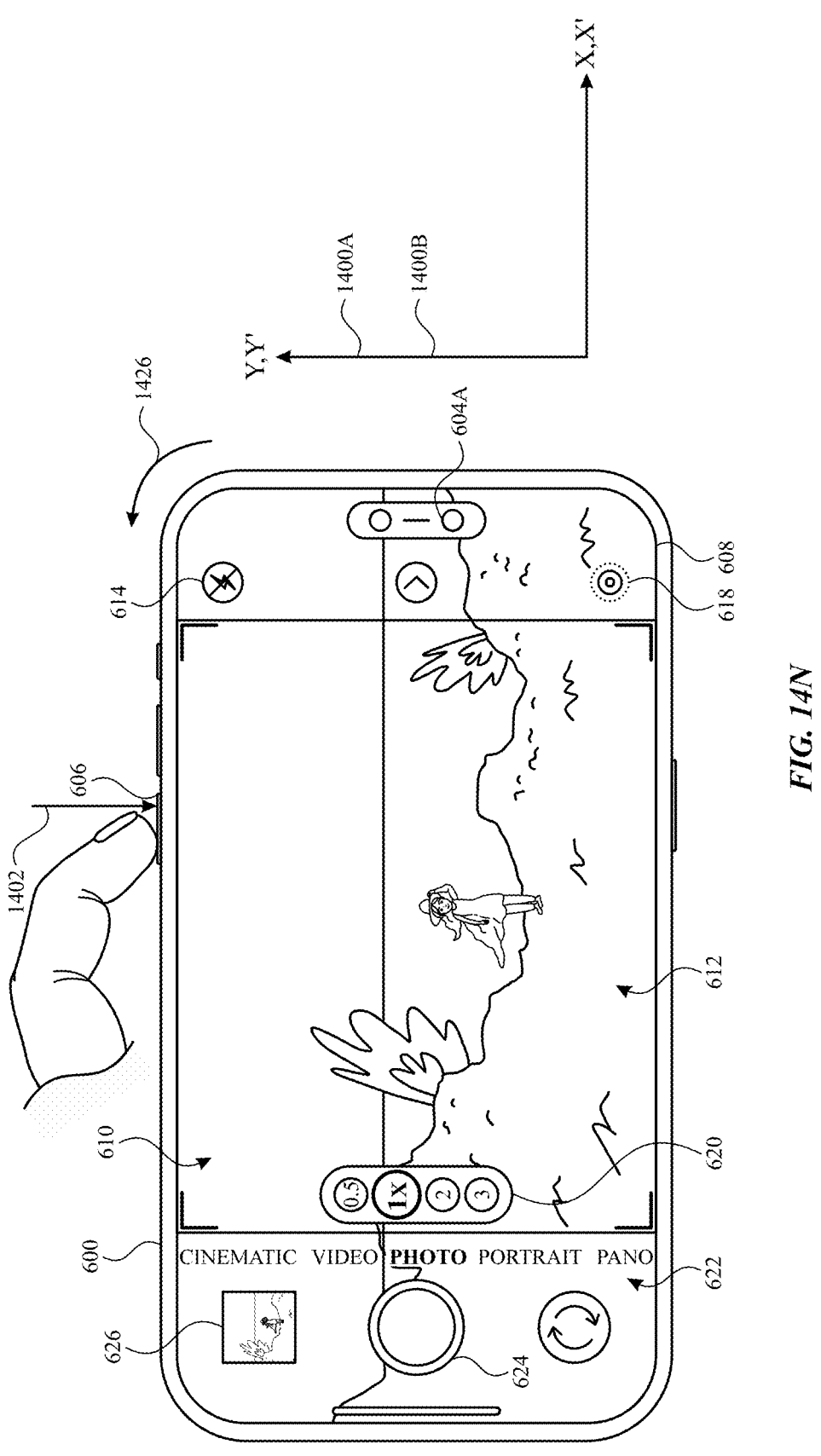

At FIG. 14M, computer system 600 detects an input requesting media capture, such as tap input 1424 directed to shutter affordance 624 and/or input 1402 with an increased pressure applied. In response to detecting the input request-ing media capture, computer system 600 initiates media capture, using second camera 604B, third camera 604C, and/or fourth camera 604D to capture photo media at orientation 1400B. As illustrated in FIG. 14N, after captur-ing the photo media, computer system 600 updates captured media icon 626 to display a thumbnail of the photo media, which is not noticeably tilted with respect to the horizon of the environment.

Figure 14O:
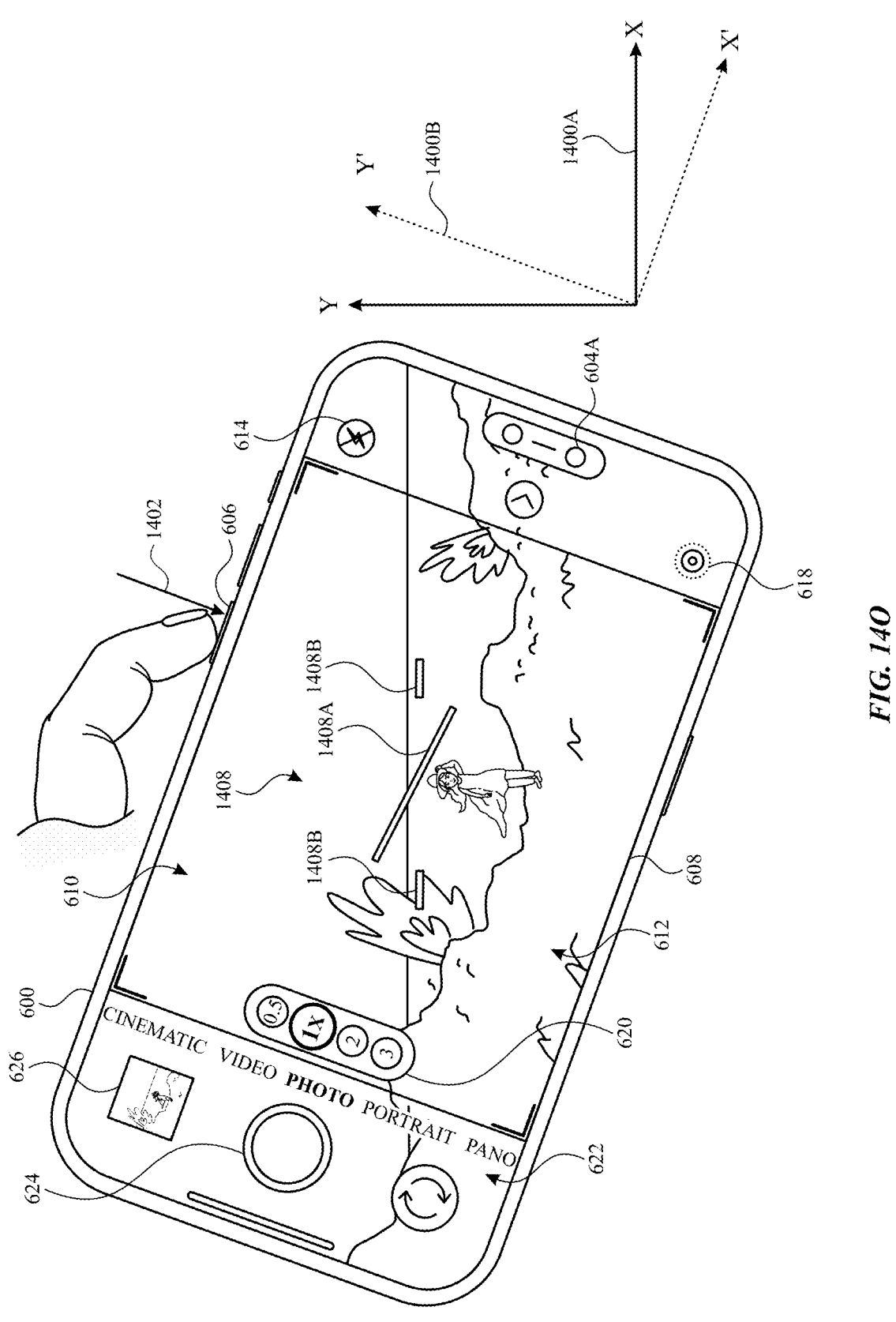

At FIG. 14N, computer system 600 detects rotation 1426, rotating computer system 600 clockwise to the position shown in FIG. 14O, where the difference between orienta-tion 1400A and orientation 1400B exceeds the first threshold difference (e.g., 0.05°, 0.10, 0.2°, 0.3°, 0.5°, 10, or 2°) and does not exceed the second threshold difference (e.g., 3, 5°, 7.5°, 10°, 15°, or 20°). Additionally, at FIG. 14O, computer system 600 detects that camera preview 612 is primarily occupied by non-facial content. Accordingly, at FIG. 14O, computer system 600 displays level indicator 1408 in response to input 1402 requesting level capture guidance, with first portion 1408A of level indicator 1408 displayed aligned to orientation 1400A and second portion 1408B of level indicator 1408 displayed aligned to orientation 1400B.

Figure 14P:
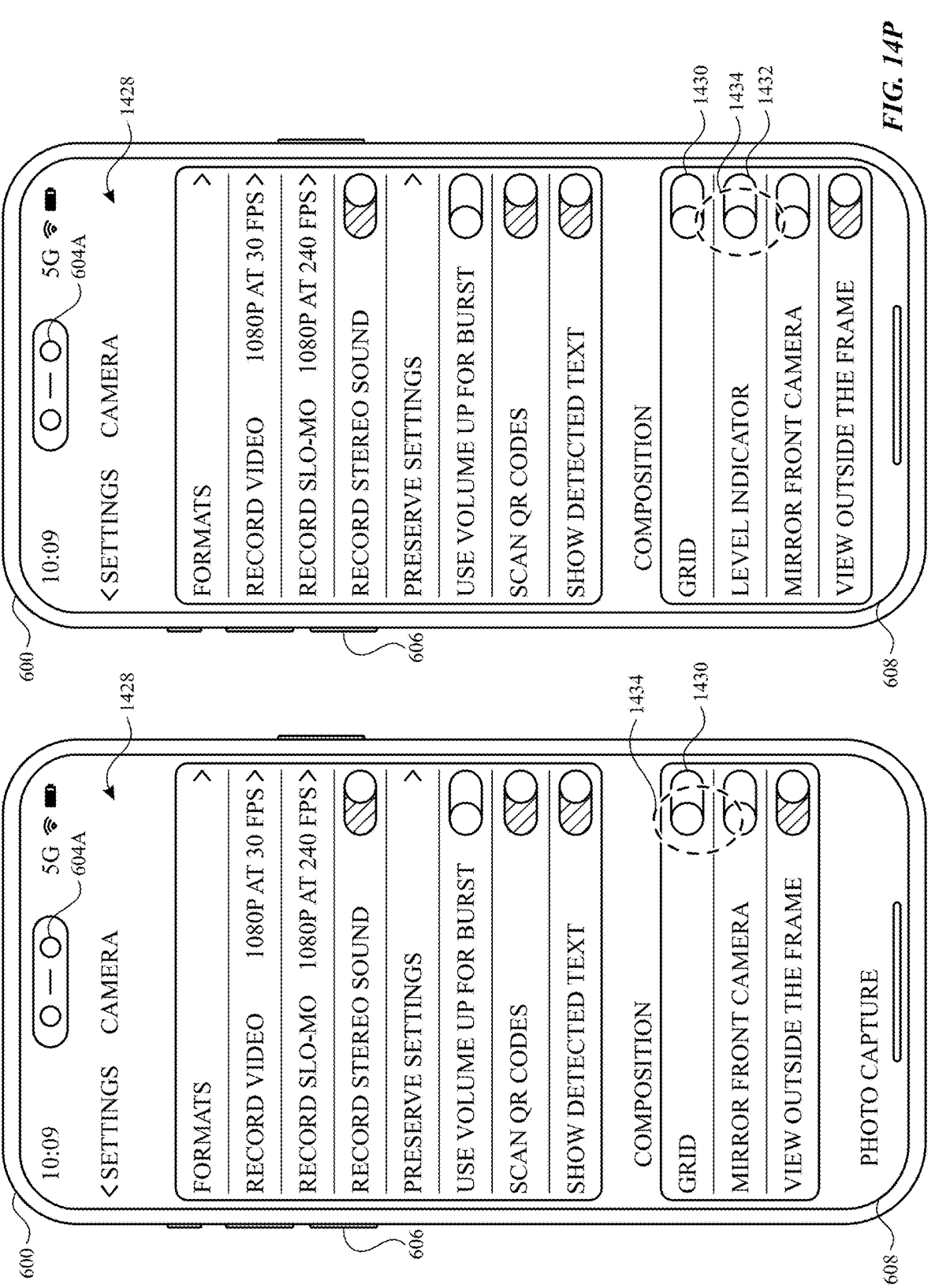
Figure 14Q:
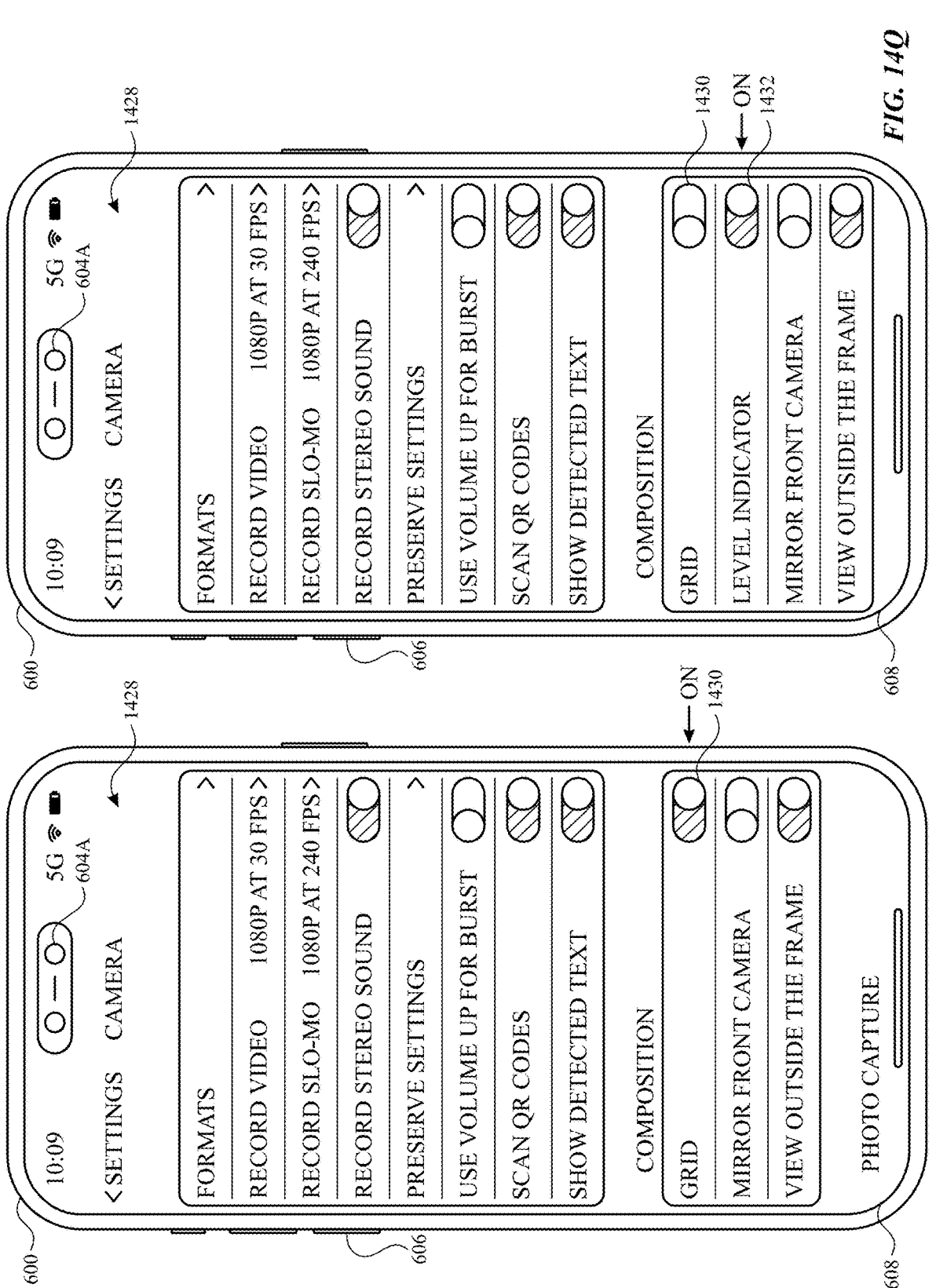

At FIGS. 14P-14Q, computer system 600 displays set-tings user interface 1428, which can be used to enable and disable the level capture guidance setting. As discussed above, while the level capture guidance setting is disabled, computer system 600 conditionally displays level indicator 1408 in response to detecting an explicit user input, such as input 1402, requesting level capture guidance, and while the level capture guidance setting is enabled, computer system 600 conditionally displays level indicator 1408 even if an explicit user input, such as input 1402, requesting level capture guidance is not detected. As illustrated in FIG. 14P, settings user interface 1428 includes capture guidance affordance 1430, labeled "grid," for controlling a general capture guidance setting. In some embodiments, as illustrated by the left panel of FIG. 14P, the general capture guidance setting includes the level capture guidance setting, such that controlling (e.g., toggling) the general capture guidance setting also controls the level capture guidance setting. In some embodiments, as illustrated by the right panel of FIG. 14P, the general capture guidance setting does not include the level capture guidance setting, and settings user interface 1428 includes level capture guidance affordance 1432, labeled "level indicator," for controlling the level capture guidance setting (e.g., independently from the general capture guidance setting).

As illustrated in FIG. 14P, the level capture guidance setting is disabled, as indicated in the left panel of FIG. 14P by displaying capture guidance affordance 1430 in an off (e.g., disabled) toggle state and in the right panel of FIG. 14P by displaying level capture guidance affordance 1432 in an off (e.g., disabled) toggle state. While the level capture guidance setting is disabled, computer system 600 detects input 1434 (e.g., a tap, touch, and/or gesture input) toggling the level capture guidance setting. As illustrated by the left panel of FIG. 14P, in some embodiments where the level capture guidance setting is included in the general capture guidance setting, input 1434 toggling the level capture guidance setting is an input directed to capture guidance affordance 1430. As illustrated by the right panel of FIG. 14P, in some embodiments where the level capture guidance setting is independent from the general capture guidance setting, input 1434 toggling the level capture guidance setting is an input directed to level capture guidance affordance 1432.

As illustrated in FIG. 14Q, in response to detecting input 1434, computer system 600 enables the level capture guidance setting, as indicated in the left panel of FIG. 14Q by displaying capture guidance affordance 1430 in an on (e.g., enabled) toggle state and in the right panel of FIG. 14Q by displaying level capture guidance affordance 1432 in an on (e.g., enabled) toggle state. In some embodiments where the level capture guidance setting is included in the general capture guidance setting, when the general capture guidance setting is enabled, computer system 600 both displays camera preview 612 with capture guidance grid 1414 and conditionally displays camera preview 612 with level indicator 1408 (e.g., as described above with respect to FIGS. 14A-14H and 14J-14O, without requiring detection input 1402 to display level indicator 1408). In some embodiments where the level capture guidance setting is independent from the general capture guidance setting, when the level capture guidance setting is enabled (e.g., whether or not the general capture guidance setting is enabled), computer system 600 conditionally displays camera preview 612 with level indicator 1408 (e.g., as described above with respect to FIGS. 14A-14H and 14J-14O, without requiring detection input 1402 to display level indicator 1408), whether or not capture guidance grid 1414 is concurrently displayed.

FIG. 15 is a flow diagram illustrating a method for conditionally displaying a level indicator based on media capture contents using a computer system in accordance with some embodiments. Method 1500 is performed at a computer system (e.g., 100, 300, 500, and/or 600) that is in communication with a display generation component (e.g., 708) (e.g., a display controller; a touch-sensitive display system; a display (e.g., integrated and/or connected), a 3D display, a transparent display, a projector, and/or a heads-up display) and one or more cameras (e.g., 604A, 604B, 604C, and/or 604D). In some embodiments, the computer system includes one or more cameras, such as a rear (e.g., user-facing) camera and a forward (e.g., environment-facing) camera and/or a plurality of forward cameras (e.g., with different lenses, such as a standard camera, a telephoto camera, and/or a wide-angle camera). In some embodiments, the computer system includes one or more depth sensors; in some embodiments, the computer system includes one or more orientation sensors (e.g., accelerometers, gyroscopes, and/or magnetometers). Some operations in method 1500 are, optionally, combined, the orders of some operations are, optionally, changed, and some operations are, optionally, omitted.

As described below, method 1500 provides an intuitive way for conditionally displaying a level indicator based on media capture contents. The method reduces the cognitive burden on a user when controlling (e.g., enabling or disabling) capture guidance and composing media capture, thereby creating a more efficient human-machine interface. For battery-operated computing devices, enabling a user to control capture guidance and compose media capture faster and more efficiently conserves power and increases the time between battery charges.

The computer system (e.g., 600), while displaying (1502), via the display generation component (e.g., 608), a camera user interface (e.g., 610) including a representation of a portion of a field-of-view of the one or more cameras (e.g., 612) (e.g., a camera preview), in accordance with a determination (1504) that the portion of the field-of-view of the one or more cameras satisfies a set of content criteria, displays (1506), via the display generation component, the representation of the portion of the field-of-view of the one or more cameras (e.g., 612) concurrently with a level indicator (e.g., 1408) indicating an orientation of the field-of-view of the one or more cameras (e.g., 1400B) (e.g., orientation of a vertical axis and/or a horizontal axis of the computer system (e.g., device) and/or of the one or more cameras; in some embodiments, the orientation is normalized to a respective plane (e.g., the orientation measures tilt but not pitch)) with respect to a respective orientation (e.g., 1400A) (e.g., a target orientation; in some embodiments, the target orientation is parallel or perpendicular to the direction of gravity's pull; in some embodiments, the target orientation is parallel or perpendicular to a horizon line) (e.g., as illustrated in FIGS. 14C, 14D, 14G, 14H, 14K, 14L, and 14O). The set of content criteria includes a first criterion that is based on whether content of a first type (e.g., a person, pet, animal, and/or other particular subject) is detected (e.g., using visual processing/image recognition techniques) in the portion of the field-of-view of the one or more cameras. In some embodiments, the first criterion is met when the content of the first type is detected in the portion of the field-of-view of the one or more cameras; in some embodiments, the first criterion is met when the content of the first type is not detected in the portion of the field-of-view of the one or more cameras; in some embodiments, the first criterion is met when a face (e.g., of a person, pet, and/or animal) detected in the portion of the field-of-view of the one or more cameras occupies less than a certain size/proportion of the field-of-view (e.g., 10%, 20%, and/or 25%); in some embodiments, the first criterion is met when a face (e.g., of a person, pet, and/or animal) is not detected in the portion of the field-of-view of the one or more cameras; and in some embodiments, the first criterion is met when non-facial content (e.g., objects, environmental content, and/or text) detected in the portion of the field-of-view of the one or more cameras occupies more than a certain size/proportion of the field-of-view (e.g., 75%, 80%, and/or 90%). In some embodiments, the content criteria include conditions on the alignment of the field-of-view of the camera; in some embodiments, the content criteria include conditions on user settings (e.g., is the level indicator setting turned on and/or explicitly requested by a user).

The computer system, in accordance with a determination (1508) that the portion of the field-of-view of the one or more cameras does not satisfy the set of content criteria (in some embodiments, if the content of the first type is detected), display the representation of the portion of the field-of-view of the one or more cameras (e.g., 612) without displaying the level indicator (in some embodiments, ceasing displaying the level indicator). Conditionally displaying a level indicator for composing media capture based on whether particular content is detected in the field-of-view of the cameras used for media capture provides additional media capture functionality without cluttering the user interface and reduces the number of user inputs needed to control (e.g., enable or disable) the additional media capture functionality. For example, the level indicator may be automatically displayed (e.g., if the capture is tilted to a certain degree) when capturing a view of a landscape and automatically hidden (e.g., even if the capture is tilted to a certain degree) when capturing a close up of a person. Doing so also provides real-time visual feedback about a state of the computer system, assists the user with composing media capture events, and reduces the risk that transient media capture opportunities are missed or mis-captured (e.g., due to misalignment of the system), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, when capturing content that the user is likely to want to appear aligned (e.g., straight up and down and/or level), the level indicator automatically indicates to a user when media captured at the instant camera orientation will be visibly tilted.

In some embodiments, the content of the first type includes a face (e.g., a visage) (in some embodiments, a portion of a face) that occupies a region of the representation of the portion of the field-of-view of the one or more cameras of at least a respective size (e.g., the face takes up at least a threshold amount (e.g., at least 10%, 20%, and/or 30%) of the area of the camera preview; in some embodiments, the first criterion is met when a face that occupies a region of at least the respective size is not detected in the portion of the field-of-view of the one or more cameras). Conditionally displaying a level indicator for composing media capture based on whether a person's face takes up a certain amount of space in the media capture provides additional media capture functionality without cluttering the user interface and reduces the number of user inputs needed to control (e.g., enable or disable) the additional media capture functionality. For example, the level indicator may be automatically displayed (e.g., if the capture is tilted to a certain degree) when capturing a wide shot of a person (e.g., a shot including relatively more of the surrounding environment) and automatically hidden (e.g., even if the capture is tilted to a certain degree) when capturing a close up of a person. Doing so also provides real-time visual feedback about a state of the computer system, assists the user with composing media capture events, and reduces the risk that transient media capture opportunities are missed or mis-captured (e.g., due to misalignment of the system), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the set of content criteria includes a second criterion that is based on (e.g., met based on) a difference between the orientation of the field-of-view of the one or more cameras (e.g., 1400B) (in some embodiments, an orientation of a vertical axis of the computer system (e.g., device) and/or the one or more cameras (e.g., when the photo is being taken in portrait mode); in some embodiments, an orientation of a vertical axis of the computer system and/or the one or more cameras (e.g., when the photo is being taken in landscape mode)) and a direction of gravitational pull (e.g., 1400A) (e.g., of the earth) (e.g., a plumb or vertical orientation of the environment; in some embodiments, the direction of gravitational pull is perpendicular to the respective (e.g., target) orientation). Conditionally displaying a level indicator based on the current orientation of the cameras with respect to the pull of gravity provides real-time visual feedback about a state of the computer system, assists the user with composing media capture events, and reduces the risk that transient media capture opportunities are missed or mis-captured (e.g., due to misalignment of the system), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the second criterion is met when the difference between the orientation of the field-of-view of the one or more cameras (e.g., 1400B) and the direction of gravitational pull (e.g., 1400A) (e.g., of the earth) is within a threshold range (e.g., only display the level indicator when the computer system and/or the one or more cameras are close to level), wherein a maximum difference of the threshold range is a first threshold amount (e.g., 3°, 7°, and/or 10°) (e.g., if the computer system and/or the one or more cameras are tilted more than the maximum difference, forgo displaying the level indicator). Conditionally displaying a level indicator for composing media capture when the current alignment of the cameras is less than a threshold difference from alignment with the pull of gravity provides additional media capture functionality without cluttering the user interface and reduces the number of user inputs needed to control (e.g., enable or disable) the additional media capture functionality, for example, automatically hiding the level indicator if the tilt exceeds the threshold difference (e.g., indicating that the shot is intentionally tilted). Doing so also provides real-time visual feedback about a state of the computer system, assists the user with composing media capture events, and reduces the risk that transient media capture opportunities are missed or mis-captured (e.g., due to misalignment of the system), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, a minimum difference of the threshold range is a second threshold amount (e.g., 0.05°, 0.10, 0.2°, 0.3°, 0.5°, 10, and/or 2°) that is lower than the first threshold amount (e.g., if the computer system and/or the one or more cameras are tilted less than the minimum difference, forgo displaying the level indicator). Conditionally displaying a level indicator for composing media capture when the current alignment of the cameras is over a second threshold difference from alignment with the pull of gravity provides additional media capture functionality without cluttering the user interface and reduces the number of user inputs needed to control (e.g., enable or disable) the additional media capture functionality, for example, automatically hiding the level indicator when a level orientation has been achieved. Doing so also provides real-time visual feedback about a state of the computer system, assists the user with composing media capture events, and reduces the risk that transient media capture opportunities are missed or mis-captured (e.g., due to misalignment of the system), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the set of content criteria includes a third criterion that is met when a user input of a first type (e.g., 1402 and/or 1434) (e.g., an input requesting display of the level indicator; an input on a specific button and/or affordance) is detected (in some embodiments, is currently detected) (in some embodiments, is currently being detected (e.g., displaying the level indicator while a hardware button input is being held); in some embodiments, was previously detected (e.g., displaying the level indicator when a level indicator setting has been enabled by the user)). Conditionally displaying a level indicator for composing media capture when requested by the user provides additional media capture functionality without cluttering the user interface. Doing so also provides real-time visual feedback about a state of the computer system, assists the user with composing media capture events, and reduces the risk that transient media capture opportunities are missed or mis-captured (e.g., due to misalignment of the system), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the user input of the first type includes an input (e.g., 1434) (in some embodiments, via a camera settings user interface; in some embodiments, via the camera user interface (e.g., an affordance and/or menu within the camera UI)) placing a level indicator setting (in some embodiments, a dedicated level indicator setting; in some embodiments, a grid and/or other capture guidance mode) into an enabled state (e.g., while the level indicator setting is enabled, conditionally display the level indicator (e.g., if the other content criteria are met); in some embodiments, if the level indicator setting is disabled, forgo displaying the level indicator even if the other content criteria are met; in some embodiments, if the level indicator setting is disabled but a different user input requesting the level indicator (e.g., a hardware button input) is detected, conditionally display the level indicator). Conditionally displaying a level indicator for composing media capture when the user has enabled the level indicator provides additional media capture functionality without cluttering the user interface.

In some embodiments, the user input of the first type (e.g., requesting the display of the level indicator) includes an activation (e.g., 1402) of a hardware button in communication with the computer system (e.g., 606) (e.g., pressing a button on a device or headset; in some embodiments, the hardware button is a multi-function button; in some embodiments, the hardware button is a pressure-sensitive button) (e.g., conditionally display the level indicator in response to a hardware button press; in some embodiments, if no hardware button press is currently detected (e.g., if the hardware button press is not being held), forgo displaying the level indicator even if the other content criteria are met; in some embodiments, if no hardware button press is currently detected but the level indicator setting is enabled, conditionally display the level indicator). Conditionally displaying a level indicator for composing media capture when the user presses a hardware button provides additional media capture functionality without cluttering the user interface. Doing so also provides real-time feedback about a state of the computer system, assists the user with composing media capture events, and reduces the risk that transient media capture opportunities are missed or mis-captured (e.g., due to misalignment of the system), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the user can press the hardware button to quickly check the alignment of the current media capture.

In some embodiments, while a level indicator setting is in an enabled state (e.g., as illustrated in FIG. 14Q), the third criterion is met (e.g., detecting the user input requesting the display of the level indicator includes detecting that the level indicator setting has been placed in an enabled state by a user input (in some embodiments, via a camera settings user interface; in some embodiments, via the camera user interface (e.g., an affordance and/or menu within the camera UI)); e.g., if the level indicator setting is in the enabled state, the third criterion is met without requiring a hardware button input). In some embodiments, while the level indicator setting is not in an enabled state (e.g., as illustrated in FIG. 14P), the third criterion is met while an activation (e.g., 1402) of a hardware button in communication with the computer system (e.g., 606) is detected (e.g., detecting the user input requesting the display of the level indicator includes detecting that a light press of the hardware button is currently being held), wherein the activation of the hardware button applies less than a threshold pressure (e.g., a maximum light press pressure, 75 g/cm², 100 g/cm², 150 g/cm²) to the hardware button (in some embodiments, the activation of the hardware button is detected starting when at least a second threshold pressure (e.g., a light press activation pressure lower than the maximum light press pressure, such as 50 g/cm², 75 g/cm², and/or 100 g/cm²) is applied to the hardware button; in some embodiments, the activation of the hardware button is detected while at least a third threshold pressure (e.g., a light press maintenance pressure lower than both the maximum pressure and the activation pressure, such as 5 g/cm², 10 g/cm², and/or 20 g/cm²) is applied to the hardware button). Conditionally displaying a level indicator for composing media capture when the user presses a hardware button and/or when the user has enabled the level indicator provides additional media capture functionality without cluttering the user interface. Doing so also provides real-time feedback about a state of the computer system, assists the user with composing media capture events, and reduces the risk that transient media capture opportunities are missed or mis-captured (e.g., due to misalignment of the system), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, displaying the camera user interface (e.g., 610) includes displaying the camera user interface in a vertical (e.g., portrait) orientation (e.g., as illustrated in FIG. 14G) or in a horizontal (e.g., landscape) orientation (e.g., as illustrated in FIGS. 14A-14F and 14H-14O) (in some embodiments, in accordance with a determination that the camera user interface is displayed in the vertical orientation, the level indicator (when conditionally displayed) visually represents an orientation of a first hardware axis (in some embodiments, the first hardware axis is an axis corresponding to a shorter edge of a primary display (e.g., the short edge of the phone face)) relative to a target orientation, and in accordance with a determination that the camera user interface is displayed in the horizontal orientation, the level indicator (when conditionally displayed) visually represents an orientation of a second hardware axis relative to the target orientation, wherein the second hardware axis is perpendicular to the first hardware axis (in some embodiments, the second hardware axis is an axis corresponding to a longer edge of a primary display (e.g., the long edge of the phone face))). Conditionally displaying a level indicator for composing media capture in both portrait and landscape capture mode provides additional media capture functionality without cluttering the user interface.

In some embodiments, the computer system (e.g., 600), while displaying the representation of the portion of the field-of-view of the one or more cameras concurrently with the level indicator (e.g., 1408) (e.g., while displaying the level indicator) (e.g., as illustrated in FIGS. 14C-14D, 14G-14H, and 14K-14L, and 14O), detects a change (e.g., 1422) to the orientation of the field-of-view of the one or more cameras (e.g., 1400B). In some embodiments, in response to detecting the change to the orientation of the field-of-view of the one or more cameras and in accordance with a determination that the orientation of the field-of-view of the one or more cameras satisfies a set of alignment criteria, displaying the representation of the portion of the field-of-view of the one or more cameras without the level indicator (e.g., ceasing displaying the level indicator) (e.g., as illustrated in FIG. 14M), wherein the set of alignment criteria includes a criterion that is met when a difference between the orientation of the field-of-view of the one or more cameras (e.g., 1400B) and a predetermined (e.g., target) orientation (e.g., 1400A) (in some embodiments, the predetermined orientation is parallel or perpendicular to the direction of gravity's pull; in some embodiments, the predetermined orientation is parallel or perpendicular to a horizon line) falls within a threshold range (e.g., less than 0.05°, 0.10, 0.2°, 0.3°, 0.5°, 10°, and/or 2° tilt and/or over 3°, 7°, and/or 10° tilt) (in some embodiments, in accordance with a determination that the orientation of the field-of-view of the one or more cameras does not satisfy the set of alignment criteria, continuing to display the level indicator and updating the appearance of the level indicator to indicate the changed orientation of the field-of-view of the one or more cameras with respect to the target orientation (in some embodiments, rotating at least one portion of the level indicator in accordance with the detected change)). Conditionally displaying a level indicator for composing media capture when the current alignment of the cameras is satisfies alignment criteria provides additional media capture functionality without cluttering the user interface and reduces the number of user inputs needed to control (e.g., enable or disable) the additional media capture functionality, for example, automatically hiding the level indicator when a level orientation has been achieved and/or when the user is not attempting to take a level media capture. Doing so also provides real-time visual feedback about a state of the computer system, assists the user with composing media capture events, and reduces the risk that transient media capture opportunities are missed or mis-captured (e.g., due to misalignment of the system), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system, while displaying the camera user interface, detects (in some embodiments, while displaying the level indicator; in some embodiments, while the level indicator is not displayed) a media capture user input (e.g., 1402, 1410, and/or 1424) (in some embodiments, a hardware button press; in some embodiments, an input selecting a software media capture affordance (e.g., a tap, touch, click gesture, and/or air gesture); in some embodiments, an input that satisfies certain media capture criteria, such as attention or gaze-based criteria, an input duration, and/or an input pressure threshold). In some embodiments, the computer system, in response to detecting the media capture user input and irrespective of whether the level indicator is displayed or not displayed, initiates media capture using the one or more cameras (e.g., as illustrated in FIGS. 14D and 14N) (in some embodiments, media capture can be initiated while the level indicator is still being displayed (e.g., even if the capture is not level)).

Note that details of the processes described above with respect to method 1500 (e.g., FIG. 15) are also applicable in an analogous manner to the methods described above. For example, method 1500 optionally includes one or more of the characteristics of the various methods described above with reference to methods 700, 900, 1100, and/or 1300 and/or below with reference to methods 1500, 1700, 1900, 2100, and/or 2300. For example, other media capture settings can be controlled as described with respect to methods 700, 900, and 1100 in addition to conditionally displaying a level indicator based on media capture contents, and captured media can be stored and viewed on either internal or external storage as described with respect to method 1300. For brevity, these details are not repeated below.

FIGS. 16A-16M illustrate exemplary user interfaces for capturing, viewing, and/or editing a media item, in accordance with some embodiments. The user interfaces in these figures are used to illustrate the processes described below, including the processes in FIG. 17.

Figures 16A, 16B:
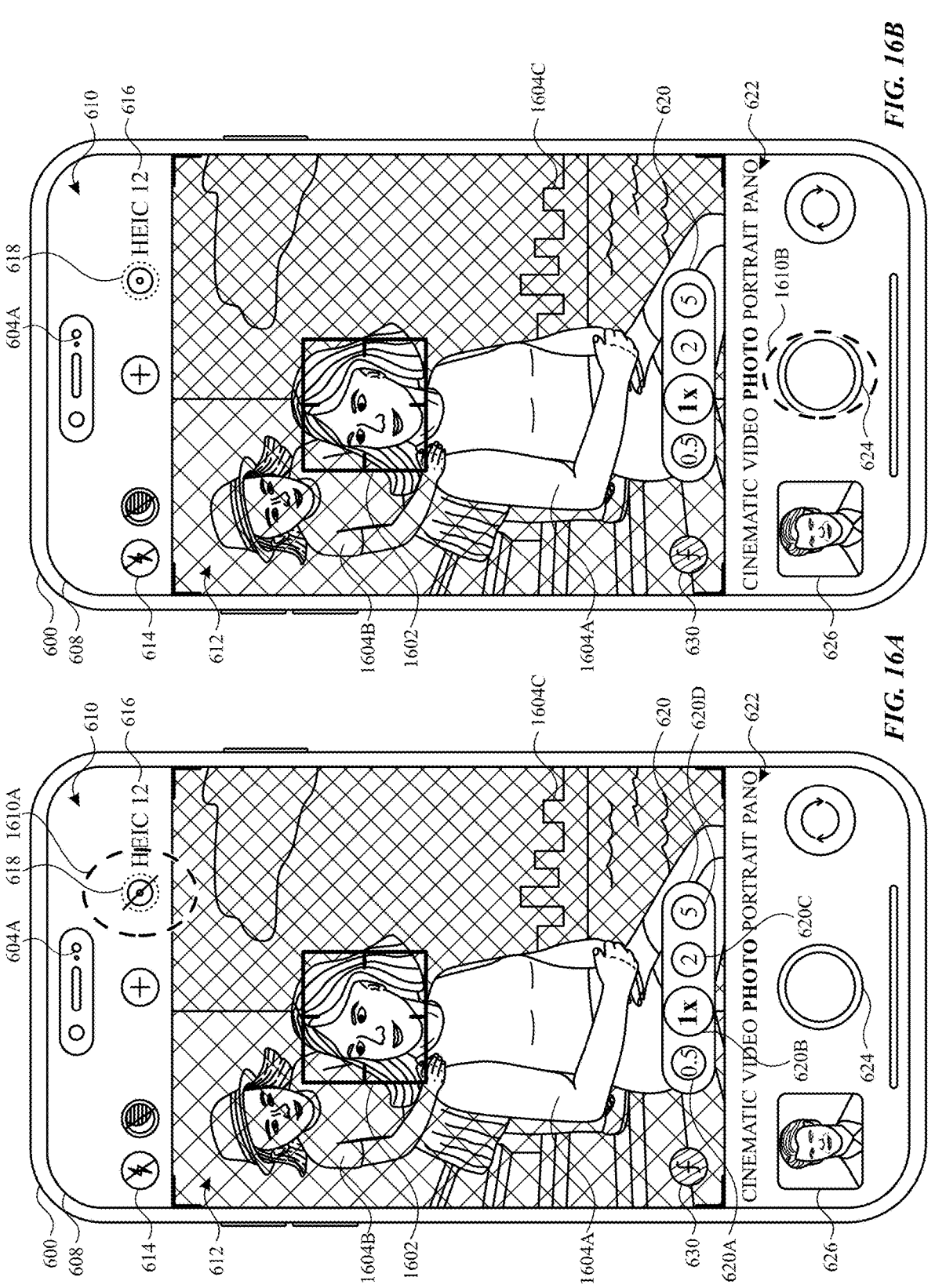
FIGS. 16A-16M illustrate example techniques and user interfaces for capturing, viewing, and/or editing a media item in accordance with some embodiments.

FIG. 16A illustrates computer system 600 described above (e.g., with reference to FIGS. 6A-6U, 8A-8T, 10A-10I, 12A-12T, and 14A-14Q). In FIG. 6A, computer system 600 displays camera user interface 610. Features of camera user interface 610 are described in FIGS. 6B-6M. In FIG. 6A, camera preview 612 includes media capture subject 1604A (e.g., a woman), media capture subject 1604B (e.g., a child), and media capture subject 1604C (e.g., a ship). Media capture subject 1604A is closer to computer system 600 than media capture subject 1604B; and media capture subject 1604B is closer to computer system 600 than media capture subject 1604C.

In FIG. 6A, because depth indicator 630 is selected, computer system 600 displays camera preview 612 with a simulated depth-of-field effect applied to camera preview 612 (e.g., as described in FIG. 6F). In FIG. 6A, media capture subject 1604A is at a focus location (e.g., in focus and/or displayed without a blurring effect applied) and media capture subject 1604B and media capture subject 1604C are blurred (e.g., a blurring effect is applied to media capture subject 1604B and media capture subject 1604C). Throughout FIGS. 16A-16M, 18A-18T, 20A-20T, and 22A-22AL, the blurring effect is represented by the diagonal hatching pattern illustrated in FIG. 16A, where the density of the diagonal lines represents a magnitude of the blurring effect (e.g., greater line density represents more blurring). Because media capture subject 1604C is farther from the focus location than media capture subject 1604B, media capture subject 1604C is blurred by a greater amount than media capture subject 1604B.

In FIG. 16A, a multi-frame photo capture mode is disabled, as indicated by the slash through multi-frame photo affordance 618. In response to detecting input 1610A (e.g., a tap and/or other selection input) selecting multi-frame photo affordance 618 in FIG. 16A, computer system 600 enables a multi-frame photo capture mode in which computer system 600 captures multiple images in response to detecting selection of shutter affordance 624. Computer system 600 indicates that the multi-frame photo capture mode is enabled by displaying multi-frame photo affordance 618 with the appearance shown in FIG. 16B (e.g., without the slash displayed in FIG. 16A).

In FIG. 16B, computer system 600 detects input 1610B (e.g., a tap and/or other selection input) selecting shutter affordance 624. In response to detecting input 1610B, computer system 600 captures media (e.g., a media item). Because depth indicator 630 is selected, computer system 600 captures depth information for the content in the field of view of computer system 600 (e.g., the field of view of second camera 604B, third camera 604C, and/or fourth camera 604D). Because the multi-frame photo capture mode is enabled, computer system 600 captures multiple images (or frames) of the field of view. In response to capturing the media in response to detecting input 1610B selecting shutter affordance 624, computer system 600 displays a representation of the captured media in captured media icon 626, as shown in FIG. 16C.

Figures 16C, 16D:
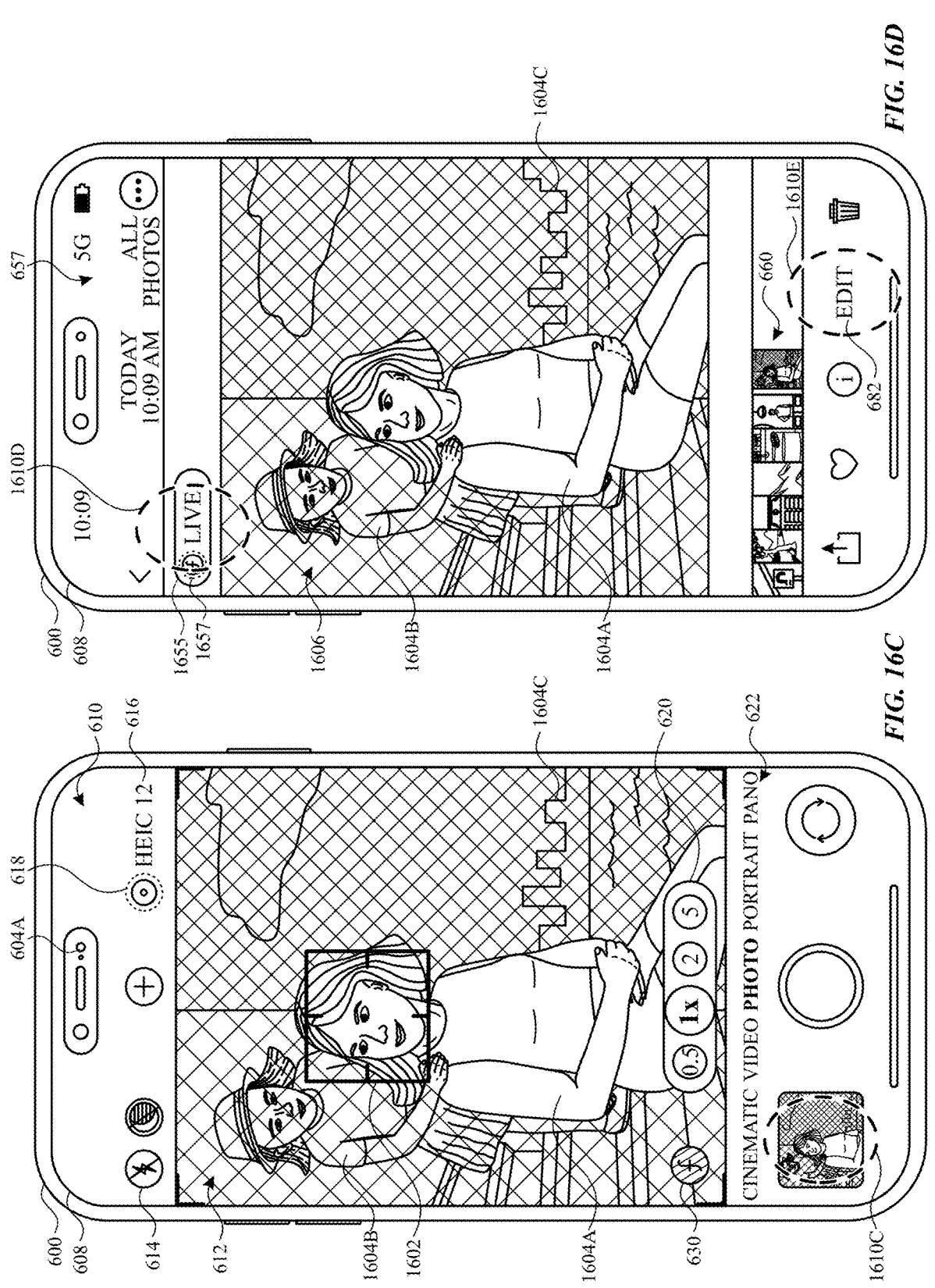

In FIG. 16C, computer system 600 detects input 1610C (e.g., a tap and/or other selection input) selecting captured media icon 626. In response to detecting input 1610C selecting captured media icon 626, computer system 600 displays media user interface 657 as shown in FIG. 16D. Features of media user interface 657 are described in FIGS. 6N-6Q. In FIG. 16D, computer system 600 displays captured media 1606 (e.g., a representation of the media item captured in response to detecting input 1610B selecting shutter affordance 624 in FIG. 16B). In response to detecting input 1610D (e.g., a tap and/or other selection input) selecting effects element 1655, computer system 600 displays media display menu 1804, as described with reference to, e.g., FIG. 18B. In some embodiments, effects element 1655 is multi-frame photo capture affordance 674 (e.g., shown in FIG. 6S). In response to detecting input 1610E (e.g., a tap and/or other selection input) selecting edit affordance 682, computer system 600 displays media editing user interface 1608 shown in FIG. 16E. Media editing user interface 1608 displays captured media 1606. When media editing user interface 1608 is initially displayed (e.g., in response to detecting input 1610E selecting edit affordance 682), computer system 600 displays aperture setting slider 1620. Similar to aperture setting slider 644 described in FIGS. 6G-6I, a user can interact with aperture setting slider 1620 to adjust an aperture setting (e.g., an f-stop and/or a simulated f-stop) that controls the appearance of the simulated depth-of-field effect applied to captured media 1606 (e.g., as described above with reference to FIGS. 6D-6I). In some embodiments, when edit affordance 682 is selected for a media item that includes a plurality of images that can be displayed in a sequence, but does not include depth information or has the simulated depth effect is disabled, computer system 600 displays media editing user interface 1608 with options for editing the plurality of images (e.g., as shown in FIGS. 18K-18O).

Figures 16E, 16F:
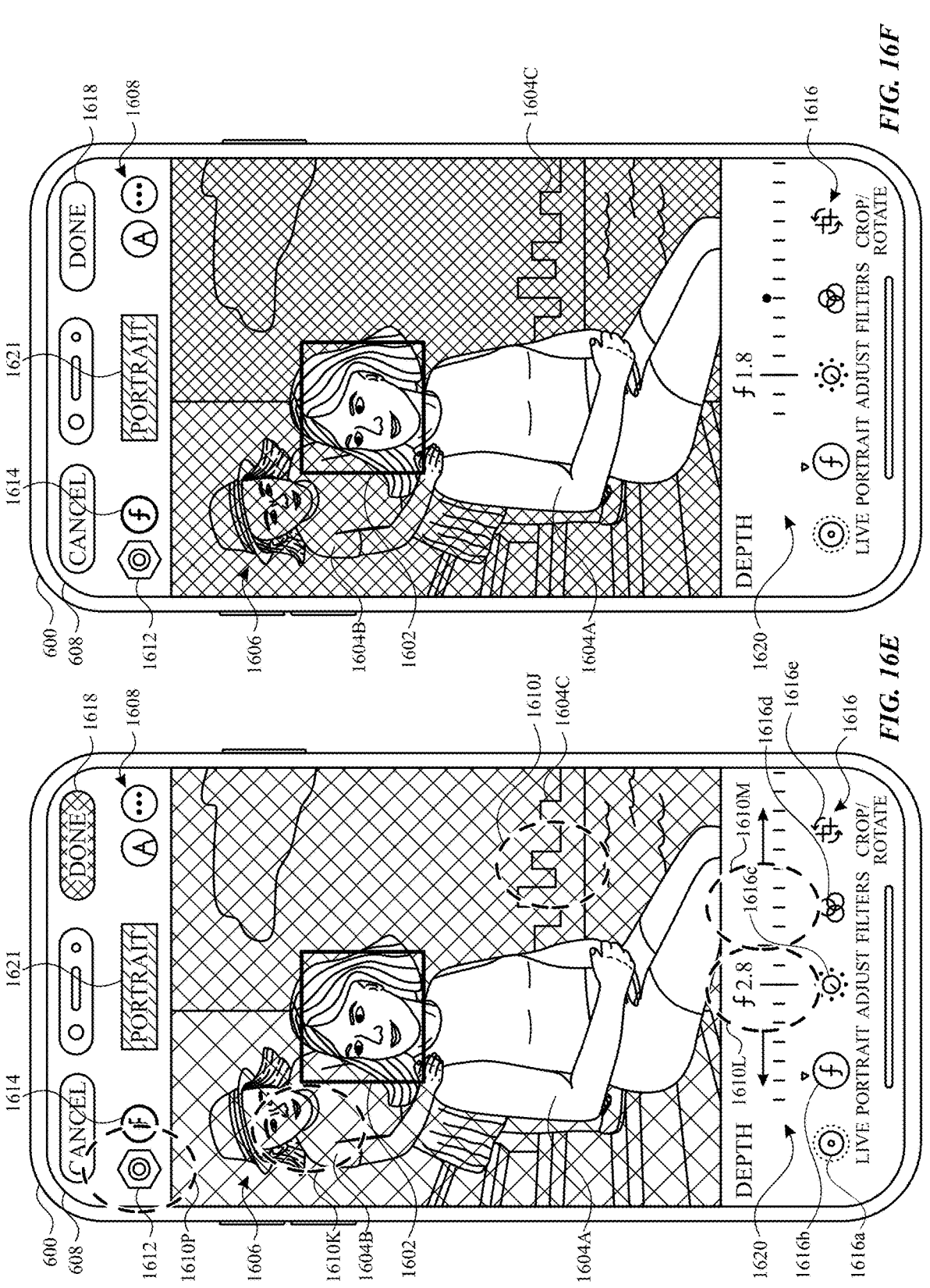

In FIG. 16E, captured media subject 1604A is at the focus location. As indicated by aperture setting slider 1620, the aperture setting is set to f/2.8. In response to detecting input 1610M (e.g., a drag, swipe, and/or tap gesture) moving aperture setting slider 1620 to the right, computer system 600 decreases the aperture setting to f/1.8, which increases the blurring effect on captured media subject 1604B and captured media subject 1604C, as shown in FIG. 16F.

Figures 16G, 16H:
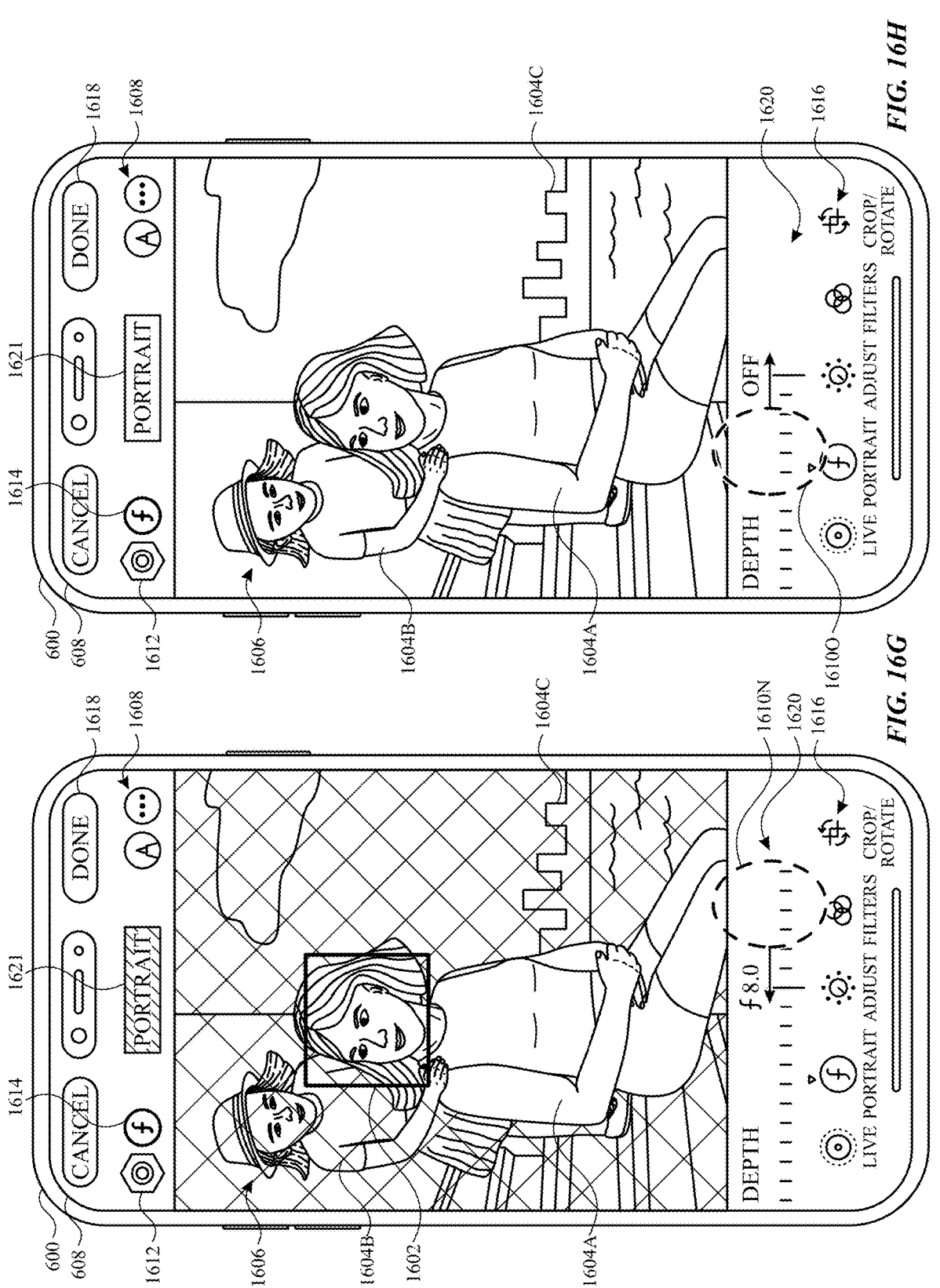
Figures 16I, 16J:
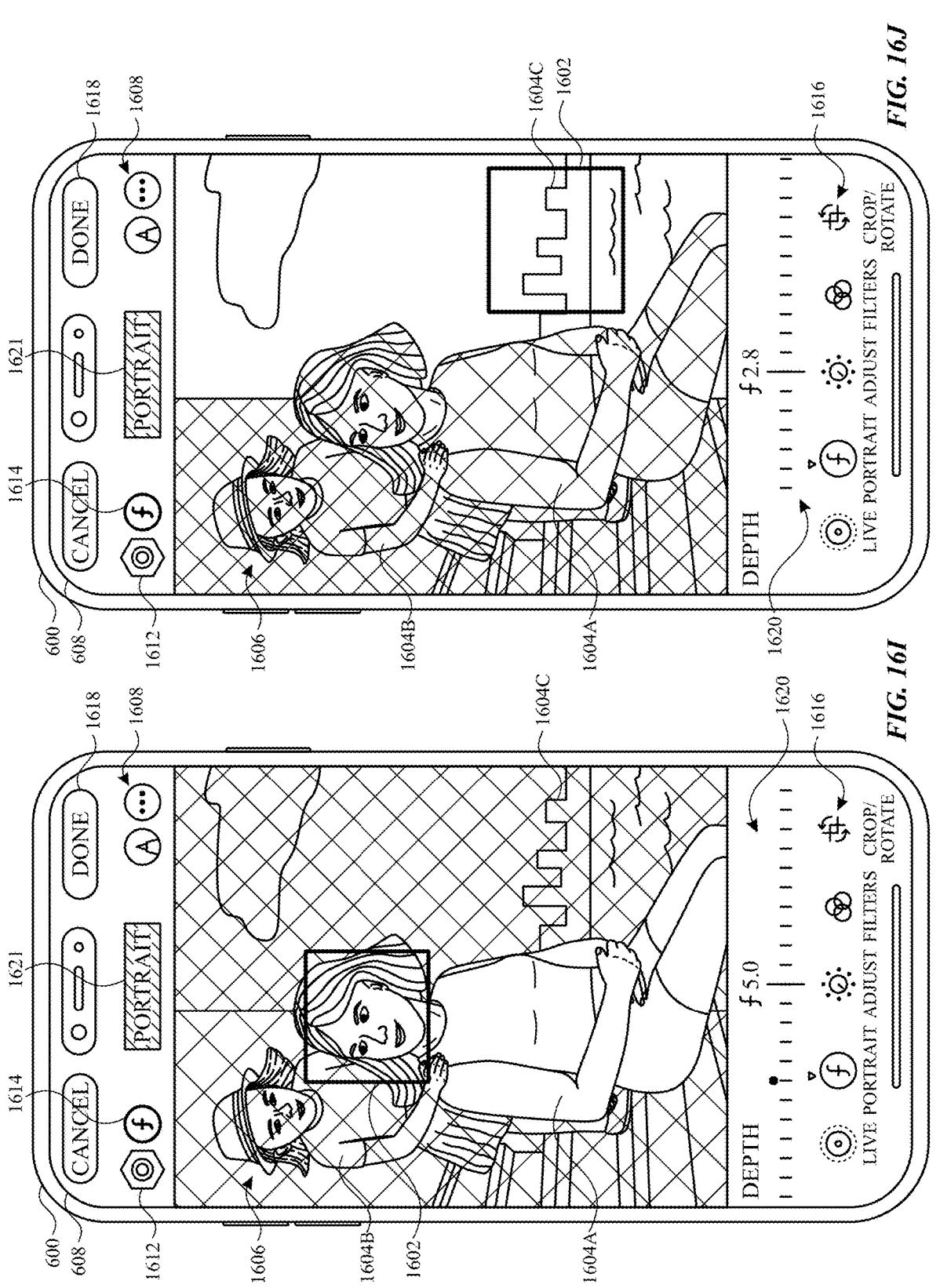

Alternatively, in response to detecting input 1610L in FIG. 16E (e.g., a drag, swipe, and/or tap gesture) moving aperture setting slider 1620 to the left, computer system 600 increases the aperture setting to f/8, which decreases the blurring effect on captured media subject 1604B and captured media subject 1604C, as shown in FIG. 16G. While the aperture setting is set to f/8 in FIG. 16G, computer system 600 detects input 1610N (e.g., a drag, swipe, and/or tap gesture) moving aperture setting slider 1620 to a limit (e.g., on a high end of f-stop values). In response to detecting input 1610N, computer system 600 turns off the simulated depth-of-field effect, as shown in FIG. 16H. In FIG. 16H, aperture setting slider 1620 indicates that the simulated depth-of-field effect is OFF; the appearance of status indicator 1621 is updated (compared to FIG. 16G) to indicate that the simulated depth-of-field effect is off, and captured media 1606 is displayed without the simulated depth-of-field effect. While the simulated depth-of-field effect is turned off in FIG. 16H, computer system 600 detects input 1610O (e.g., a drag, swipe, and/or tap gesture) moving aperture setting slider 1620 to the right. In response to detecting input 1610O, computer system 600 turns the simulated depth-of-field effect back on, as shown in FIG. 16I.

Returning to FIG. 16E, as mentioned, captured media subject 1604A is at the focus location. In response to detecting input 1610J (e.g., a tap and/or other selection input) selecting captured media subject 1604C while displaying media editing user interface 1608, computer system 600 sets the location of captured media subject 1604C as the focus location such that no blurring is applied to captured media subject 1604C and blurring is applied to captured media subject 1604A and captured media subject 1604B, as shown in FIG. 16J. Alternatively, in response to detecting input 1610K (e.g., a tap and/or other selection input) selecting captured media subject 1604B while displaying media editing user interface 1608, computer system 600 sets the location of captured media subject 1604B as the focus location such that no blurring is applied to captured media subject 1604B and blurring is applied to captured media subject 1604A and captured media subject 1604C, as shown in FIG. 16K.

Figures 16K, 16L:
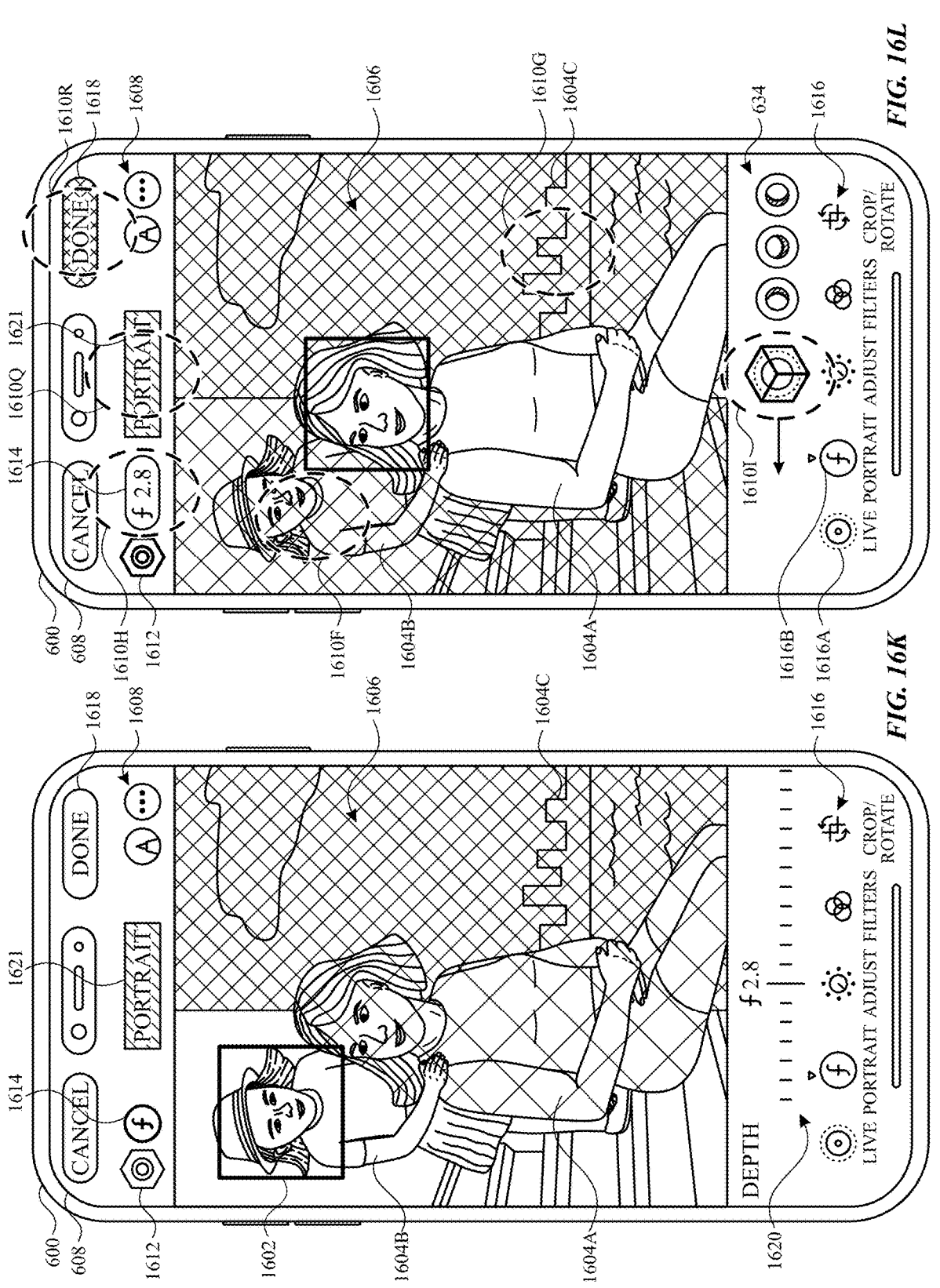

Referring again to FIG. 16E, in response to computer system 600 detecting input 1610P (e.g., a tap and/or other selection input) selecting lighting effect settings affordance 1612, computer system 600 displays lighting effect menu 634, as shown in FIG. 16L. Lighting effect menu 634 is shown and/or described in, e.g., FIGS. 6D, 18J, 18T, and 22L. For example, in response to detecting input 1610I (e.g., a tap, swipe, drag, and/or other selection input) selecting lighting effect menu 634, computer system 600 selects a different simulated lighting effect to apply to captured media 1606 and/or displaying options for selecting a different simulated lighting effect or feature thereof. In some embodiments, in response to detecting input 1610H (e.g., a tap and/or other selection input) selecting portrait settings affordance 1614, computer system 600 displays aperture setting slider 1620 (e.g., replaces lighting effect menu 634 with aperture setting slider 1620). In response to detecting input 1610G (e.g., a tap and/or other selection input) selecting captured media subject 1604C while displaying media editing user interface 1608, computer system 600 sets the location of captured media subject 1604C as the focus location such that no blurring is applied to captured media subject 1604C and blurring is applied to captured media subject 1604A and captured media subject 1604B (e.g., as shown in FIG. 16J). In response to detecting input 1610F (e.g., a tap and/or other selection input) selecting captured media subject 1604B while displaying media editing user interface 1608, computer system 600 sets the location of captured media subject 1604B as the focus location such that no blurring is applied to captured media subject 1604B and blurring is applied to captured media subject 1604A and captured media subject 1604C (e.g., as shown in FIG. 16K). In response to detecting input 1610Q (e.g., a tap and/or other selection input) selecting status indicator 1621, computer system 600 disables the simulated depth-of-field effect and/or simulated lighting effects for captured media 1606. In response to detecting input 1610R (e.g., a tap and/or other selection input) selecting done button 1618, computer system 600 exits media editing user interface 1608 and displays captured media 1606 with the settings applied in media editing user interface 1608 (e.g., simulated aperture settings, simulated lighting effect settings, and/or multi-frame photo settings).

Figure 16M:
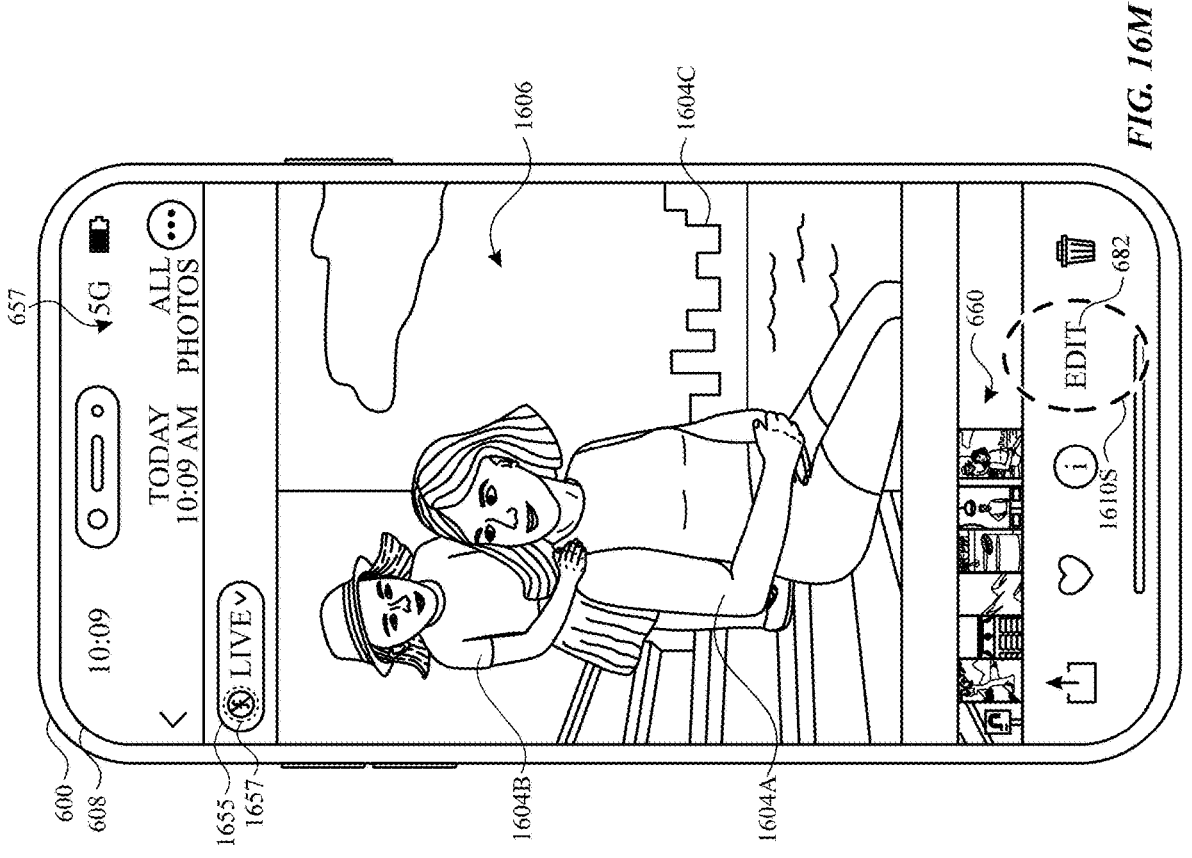

Turning to FIG. 16M, computer system 600 displays captured media 1606 in media user interface 657 with the simulated depth-of-field effect disabled (e.g., as indicated by the appearance of effects status indicator 1657 described in greater detail with reference to, e.g., FIG. 18A). In FIG. 16M, computer system 600 detects input 1610S (e.g., a tap and/or other selection input) selecting edit affordance 682. In some embodiments, in response to detecting input 1610S while the simulated depth-of-field effect is disabled for captured media 1606, computer system 600 displays media editing user interface 1608 as shown in FIG. 16H (e.g., with aperture setting slider 1620 in the OFF position).

FIG. 17 is a flow diagram illustrating a method for capturing, viewing, and/or editing a media item using a computer system in accordance with some embodiments. Method 1700 is performed at a computer system (e.g., 100, 300, 500, and/or 600) that is in communication with (e.g., includes and/or is connected to) a display generation component (e.g., 608; 1800; a display controller; a touch-sensitive display system; a display (e.g., integrated and/or connected), a 3D display, a transparent display, a projector, and/or a heads-up display) and one or more input devices. In some embodiments, the one or more input devices include: a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial). In some embodiments, the computer system is in communication with (e.g., includes and/or is connected to) one or more cameras (e.g., 604A, 604B, 604C, and/or 604D), such as one or more rear (e.g., user-facing) cameras and/or one or more forward (e.g., environment-facing) cameras (e.g., a plurality of cameras with different lenses, such as a standard camera, a telephoto camera, and/or a wide-angle camera). In some embodiments, the computer system is in communication with (e.g., includes and/or is connected to) one or more sensors (e.g., one or more depth sensors and/or depth cameras). Some operations in method 1700 are, optionally, combined, the orders of some operations are, optionally, changed, and some operations are, optionally, omitted.

As described below, method 1700 provides an intuitive way for capturing, viewing, and/or editing a media item. The method reduces the cognitive burden on a user for capturing, viewing, and/or editing a media item, thereby creating a more efficient human-machine interface. For battery-operated computing devices, enabling a user to capture, view, and/or edit a media item faster and more efficiently conserves power and increases the time between battery charges.

According to some embodiments, method 1700 is performed while (1702) the computer system is concurrently displaying, via the display generation component, a representation of a media item (e.g., 1606) (e.g., an image, a photo, a set of photos, a sequence of photos, one or more previously captured photos, a live photo, a live image, an animated photo, an animated image, a multiple-image photo, and/or a set of one or more images that are available to be displayed in a sequence of images when the representation of the media item is displayed) and a control element (e.g., 674, 1655, 1614, 1616B, and/or 1620) (e.g., a selectable user interface element, a user-interactive user interface element, an affordance, and/or a simulated depth of field control element) for adjusting (e.g., adjusting a degree, feature, value, setting, parameter, magnitude, size of a focus region, and/or simulated distance of) a simulated depth-of-field effect (e.g., a visual effect that simulates a depth of field for a captured image) for the media item. In some embodiments, the representation of the media item includes a representative image (e.g., a key frame) of a set of images. In some embodiments, the simulated depth-of-field effect is based on detection of one or more subjects in the representation of the media item. In some embodiments, the simulated depth-of-field effect is based on detected or estimated depth information (e.g., a depth map) about objects in the representation of the media item. In some embodiments, the depth information is captured at the time the media item is captured and is associated with the media item. In some embodiments, the depth information includes a distance of an object (or a portion of an object) from a sensor (e.g., a camera or lens) or other point of reference. In some embodiments, the depth information includes a distance of an object (or a portion of an object) from another object (or portion of an object) (e.g., the relative distance between two objects or portions of objects). In some embodiments, the depth-of-field effect is based on segmentation information that separates a subject from other elements, such as foreground and/or background elements. In some embodiments, the simulated depth-of-field effect includes blurring (e.g., artificially blurring and/or adding a blurring effect to) a portion of an image that is in a foreground and/or a background relative to a subject (e.g., a detected subject and/or a designated subject) or a depth plane of the image (e.g., a simulated focal plane and/or a plane perpendicular to an optical axis). In some embodiments, the portion of the image that is blurred when the simulated depth-of-field effect is applied is not blurry when the depth-of-field effect is not applied. In some embodiments, when the simulated depth-of-field effect is applied, portions of the image that are at a different depth (e.g., along an optical axis) than the subject are blurred. In some embodiments, portions of the image that are not within a threshold depth (or range of depths) relative to the subject are blurred. In some embodiments, an amount or degree of blurring applied to a portion of an image varies based on a distance (e.g., along an optical axis) from the subject or a simulated focal plane. For example, the simulated depth-of-field effect includes applying a greater amount of blur to a portion of the image that is farther from the subject than to a portion of the image that is closer to the subject (e.g., objects in the image that are further from the subject are blurred by a greater amount than objects that are closer to the subject). In some embodiments, the media item includes a plurality of images. In some embodiments, the plurality of images includes a set of images that were captured over a duration of time (e.g., 1 second, 1.5 seconds, or 2 seconds) including a first set (e.g., a first subset) of one or more images that was captured before a request to initiate capture of the plurality of images was detected and a second set (e.g., a second subset) of one or more images was captured after the request to initiate capture of the plurality of images was detected. In some embodiments, the plurality of images are saved in a file format that supports both still and animated images such as the GIF ("Graphics Interchange Format"), APNG ("Animated Portable Network Graphics"), or FLIF ("Free Lossless Image Format"). In some embodiments, the plurality of images are displayed in a sequence over time in response to detecting a user input. For example, while a representative image (e.g., a key frame) of the media item is displayed, the computer system detects an input (e.g., a selection of the representation of the media item, a tap on the representation of the media item, and/or a press and hold input on the representation of the media item); and in response to detecting the input, the computer system displays the plurality of images in a sequence over time. In some embodiments, the computer system displays at least a portion of the plurality of images in a sequence over time in response to detecting a request to display the representation of the media item (e.g., in response to switching from one media item to another in a media item album). In some embodiments, a key frame of the media item is a frame of the media item that is displayed when the media item is not being animated (e.g., when the plurality of images are not being displayed in a sequence over time). The computer system detects (1704), via the one or more input devices, an input (e.g., 1610F, 1610G, 1610J, 1610K, 1610L, 1610M, 1610N, or 1610O) (e.g., a contact on a touch-sensitive surface, a gesture, a touch gesture, an air gesture, a speech input, movement of an input device, and/or activation of a physical button). In response (1706) to detecting the input: in accordance with a determination (1708) that the input includes selection of (e.g., includes an input that is directed to) a respective portion (e.g., 1604A, 1604B, or 1604C) of the representation of the media item (e.g., 1610F, 1610G, 1610J or 1610K), the computer system selects (e.g., designating, visually designating, and/or visually indicating) a respective location (e.g., a point and/or an area) (e.g., 1604A, 1604B, or 1604C or a location corresponding thereto) of the representation of the media item corresponding to the respective portion of the representation of the media item selected by the input as a focus location for the simulated depth-of-field effect for the representation of the media item (e.g., a location of the representation of the media item that is not subject to additional blurring from the simulated depth-of-field effect) (e.g., as described with reference to FIGS. 16J and/or 16K); and in accordance with a determination (1710) that the input includes selection of (e.g., includes an input that is directed to) the control element (e.g., 1610L, 1610M, 1610N, or 1610O), the computer system adjusts the control element (e.g., adjusting a visual appearance of the control element) and changes (e.g., increasing or decreasing) a magnitude (e.g., an amount of blurring and/or a size of a focus region) of the simulated depth-of-field effect for the media item (e.g., making portions of the representation of the media item that are outside the simulated depth of field more or less blurry) (e.g., as described with reference to FIGS. 16F, 16G, 16H, and/or 16I). In some embodiments, a focus location for the simulated depth-of-field effect is a point, area, and/or subject of the representation of the media item that does not include a blurring effect (e.g., to which a blurring effect is not applied) from the simulated depth-of-field effect. In some embodiments, the focus location is a simulated focal point and/or a simulated focal plane. In some embodiments, the representation of the media item may be blurry at the focus location due to, e.g., movement of a subject and/or a camera during capture of the media item and/or optics of the camera, but not due to the simulated depth-of-field effect. In some embodiments, changing the magnitude of the simulated depth-of-field effect includes narrowing or widening a simulated depth of field and/or changing a simulated f-stop. Selecting a respective location of the representation of the media item as a focus location for the simulated depth-of-field effect or adjusting a control element and changing a magnitude of the simulated depth-of-field effect based on whether the input includes selection of the respective portion of the representation of the media item or selection of the control element, respectively, enables the user to perform different functions related to the media item by selecting different portions of a user interface, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, prior to detecting the input (e.g., 1610F, 1610G, 1610J or 1610K), a previously-selected location of the representation of the media item is selected as the focus location for the simulated depth-of-field effect for the representation of the media item, wherein the previously-selected location of the representation of the media item is different from the respective location of the media item, and selecting the respective location of the media item corresponding to the respective portion of the representation of the media item selected by the input as the focus location for the simulated depth-of-field effect for the representation of the media item includes changing an appearance of the representation of the media item so that the respective location of the representation of the media item is more in-focus (e.g., less blurry) than before detecting the input (e.g., decreasing an amount of blur at the respective location) (e.g., 1604B is more in-focus (or less blurry) in FIG. 16K than in FIG. 16E) and the previously-selected location of the representation of the media item is less in-focus (e.g., more blurry) than before detecting the input (e.g., increasing an amount of blur at the first location) (e.g., 1604A is blurrier in FIG. 16K than in FIG. 16E). Changing an appearance of the representation of the media item so that the respective location of the representation of the media item is more in-focus than before detecting the input and the previously-selected location of the representation of the media item is less in-focus than before detecting the input enables the user to quickly and efficiently change the focus location of the representation of the media item, thereby providing improved visual feedback to the user and/or reducing the number of inputs needed to perform an operation.

In some embodiments, in response to detecting the input: in accordance with a determination that the input includes selection of (e.g., includes an input that is directed to) a first portion (e.g., 1604A, 1604B, or 1604C) of the representation of the media item, the computer system selects (e.g., designating, visually designating, and/or visually indicating) a first location (e.g., a point and/or an area) (e.g., 1604A, 1604B, or 1604C or a location corresponding thereto) of the representation of the media item corresponding to the first portion of the representation of the media item selected by the input as the focus location for the simulated depth-of-field effect for the representation of the media item; and in accordance with a determination that the input includes selection of (e.g., includes an input that is directed to) a second portion (e.g., 1604A, 1604B, or 1604C) of the representation of the media item, the computer system selects (e.g., designating, visually designating, and/or visually indicating) a second location (e.g., a point and/or an area) (e.g., 1604A, 1604B, or 1604C or a location corresponding thereto) of the representation of the media item corresponding to the second portion of the representation of the media item selected by the input as the focus location for the simulated depth-of-field effect for the representation of the media item, wherein: the first portion is different from the second portion, and the first location is different from the second location. Selecting a first location or a second location of the representation of the media item as the focus location for the simulated depth-of-field effect depending on the portion of the representation of the media item that is selected enables the user to quickly and efficiently selected a desired portion of the representation as the focus location, thereby providing improved visual feedback to the user, reducing the number of inputs needed to perform an operation, and/or performing an operation when a set of conditions has been met without requiring further user input.

In some embodiments, changing the magnitude of the simulated depth-of-field effect includes: in accordance with a determination that the input has a first characteristic (e.g., a first input location and/or a first input magnitude), changing the magnitude of the simulated depth-of-field effect by a first magnitude of change (e.g., a first amount) (e.g., input 1610L changes the f-stop from f/2.8 to f/8.0); and in accordance with a determination that the input has a second characteristic (e.g., a second input location and/or a second input magnitude) that is different from the first characteristic, changing the magnitude of the simulated depth-of-field effect by a second magnitude of change (e.g., a second amount) that is different from the first magnitude of change (e.g., input 1610M changes the f-stop from f/2.8 to f/1.8). In some embodiments, the input is directed to an interactive and moveable (e.g., slidable, scalable, rotatable, translatable, and/or scrollable) user interface element, and the input is directed to a location on the user interface element and/or includes movement (e.g., sliding, translation, rotation, and/or scrolling) of the user interface element (e.g., the magnitude of the simulated depth-of-field effect is changed based on a location selected on the user interface element and/or an amount that the user interface element is moved). Changing the magnitude of the simulated depth-of-field effect by a magnitude of change that is based on a characteristic of the input enables the user to quickly and efficiently customize the representation of the media item by controlling the magnitude of the simulated depth-of-field effect, thereby providing improved visual feedback to the user, reducing the number of inputs needed to perform an operation, and/or performing an operation when a set of conditions has been met without requiring further user input.

In some embodiments, changing the magnitude of the simulated depth-of-field effect includes: in accordance with a determination that the input has a third characteristic (e.g., a third input location and/or a first direction), increasing the magnitude of the simulated depth-of-field effect (e.g., input 1610L increases the f-stop); and in accordance with a determination that the input has a fourth characteristic (e.g., a fourth input location and/or a second direction) that is different from the third characteristic, decreasing the magnitude of the simulated depth-of-field effect (e.g., input 1610M decreases the f-stop). In some embodiments, the input is directed to an interactive and moveable (e.g., slidable, scalable, rotatable, translatable, and/or scrollable) user interface element, and the input is directed to a location on the user interface element and/or moves the user interface element in a direction (e.g., the direction of change of the magnitude of the simulated depth-of-field effect is based on a location selected on the user interface element and/or a direction in which the user interface element is moved). Increasing or decreasing the magnitude of the simulated depth-of-field effect depending on a characteristic of the input enables the user to quickly and efficiently customize the representation of the media item by controlling the magnitude of the simulated depth-of-field effect, thereby providing improved visual feedback to the user, reducing the number of inputs needed to perform an operation, and/or performing an operation when a set of conditions has been met without requiring further user input.

In some embodiments, the selection of the control element includes movement of the input (e.g., a swipe or drag) (e.g., 1610L, 1610M, 1610N, and 1610O include movement). Enabling selection of the control element with an input that includes movement provides the user with a more efficient technique for interacting with the control element and enables the user to quickly and efficiently adjust the control element and/or change the magnitude of the simulated depth-of-field effect, thereby providing improved visual feedback to the user and/or reducing the number of inputs needed to perform an operation.

In some embodiments, changing the magnitude of the simulated depth-of-field effect includes changing the magnitude of the simulated depth-of-field effect based on a magnitude of the input (e.g., in accordance with a determination that the input has a first magnitude, change the magnitude of the simulated depth-of-field effect by a first amount; and in accordance with a determination that the input has a second magnitude that is different from the first magnitude, change the magnitude of the simulated depth-of-field effect by a second amount that is different from the first amount) (e.g., the change in f-stop is based on a length of 1610L, 1610M, 1610N, and 1610O). Changing the magnitude of the simulated depth-of-field effect based on a magnitude of the input enables the user to quickly and efficiently customize the appearance of the representation of the media item by changing the magnitude of the simulated depth-of-field effect, thereby providing improved visual feedback to the user and/or reducing the number of inputs needed to perform an operation.

In some embodiments, changing the magnitude of the simulated depth-of-field effect includes changing the magnitude of the simulated depth-of-field effect based on a direction of the input (e.g., in accordance with a determination that the input has a first direction, increase the magnitude of the simulated depth-of-field effect; and in accordance with a determination that the input has a second direction that is different from the first direction, decrease the magnitude of the simulated depth-of-field effect) (e.g., the f-stop is increased in response to input 1610L moving from right to left and decreased in response to input 1610M moving from left to right). Changing the magnitude of the simulated depth-of-field effect based on a direction of the input enables the user to quickly and efficiently customize the appearance of the representation of the media item by changing the magnitude of the simulated depth-of-field effect, thereby providing improved visual feedback to the user and/or reducing the number of inputs needed to perform an operation.

In some embodiments, the selection of the control element includes adjusting the control element to a limit of the control element (e.g., an off position) (e.g., input 1610N moves 1620 to a far right side); and changing the magnitude of the simulated depth-of-field effect includes removing the simulated depth-of-field effect (e.g., turning off the simulated depth-of-field effect, changing the magnitude of the depth-of-field effect to zero magnitude, and/or displaying the representation of the media item without the depth-of-field effect) (e.g., computer system 600 removes the simulated depth-of-field effect in response to input 1610N as shown in FIG. 16H). Removing the simulated depth-of-field effect in response to adjusting the control element to a limit of the control element enables the user to quickly and efficiently interact with the control element to customize the representation of the media item by removing the simulated depth-of-field effect, thereby providing improved visual feedback to the user and/or reducing the number of inputs needed to perform an operation.

In some embodiments, prior to detecting the input (e.g., 1610O), the computer system displays, via the display generation component, the representation of the media item without the simulated depth-of-field effect (e.g., as shown in FIG. 16H) (e.g., when the input is detected, the representation of the media item is displayed without the simulated depth-of-field effect concurrently with the control element) (e.g., when the input is detected, the representation of the media item is displayed with the simulated depth-of-field effect disabled or turned off), wherein changing the magnitude of the simulated depth-of-field effect includes displaying the representation of the media item with the simulated depth-of-field effect (e.g., as shown in FIG. 16I) (e.g., enabling or turning on the simulated depth-of-field effect). Displaying the representation of the media item with the simulated depth-of-field effect when the magnitude of the simulated depth-of-field effect is changed enables the user to quickly and efficiently enable (or re-enable) the simulated depth-of-field effect to customize the representation of the media item, thereby providing improved visual feedback to the user and/or reducing the number of inputs needed to perform an operation.

In some embodiments, while displaying the control element (e.g., 1620), the computer system displays, via the display generation component, an indication (e.g., text, a color, a graphic, and/or one or more alphanumeric characters) (e.g., "f2.8" in FIG. 16E, "f1.8" in FIG. 16F, "f8.0" in FIG. 16G, "OFF" in FIG. 16H, and/or "f5.0" in FIG. 16I) of a state (e.g., a current state, a focal length, an f-stop, a zoom level, and/or a magnification) of the simulated depth-of-field effect (e.g., the current magnitude of the simulated depth-of-field effect). In some embodiments, the control element includes the indication of the state of the simulated depth-of-field effect. In some embodiments, adjusting the control element includes changing the indication of the state of the simulated depth-of-field effect (e.g., to indicate the current magnitude or change in magnitude of the simulated depth-of-field effect). Displaying an indication of a state of the simulated depth-of-field effect while displaying the control element provides the user with information about the status of the media item while providing an options for quickly and efficiently adjusting the control element and/or the magnitude of the simulated depth-of-field effect, thereby providing improved visual feedback to the user and/or reducing the number of inputs needed to perform an operation.

In some embodiments, while displaying the representation of the media item, the computer system displays, via the display generation component, an indication (e.g., 1602) (e.g., a reticle and/or an outline) of the focus location for the simulated depth-of-field effect. In some embodiments, the indication of the focus location for the simulated depth-of-field effect has a same or similar appearance of an indication of a focus location for the simulated depth-of-field effect displayed while displaying a preview (e.g., a live preview) of a field of view of one or more cameras of the computer system in an interface for capturing a media item (e.g., while displaying a photo capture user interface in a camera application). Displaying an indication of the focus location for the simulated depth-of-field effect while displaying the representation of the media item enables the user to quickly and efficiently identify the focus location of the simulated depth-of-field effect without having to further navigate the user interface, thereby providing improved visual feedback to the user and/or reducing the number of inputs needed to perform an operation.

In some embodiments, in response to detecting the input: in accordance with a determination that the input includes selection of the respective portion of the representation of the media item: the computer system ceases display of an indication (e.g., a reticle and/or an outline) of the focus location at a previous location on the representation of the media item that is different from the respective location; and the computer system displays, via the display generation component, the indication of the focus location at the respective location of the representation of the media item (e.g., 1602 moves from 1604A in FIG. 16E to 1604B in FIG. 16K and to 1604C in FIG. 16J). In some embodiments, in response to detecting the input: in accordance with a determination that the input includes selection of a first portion of the representation of the media item, the computer system displays the indication of the focus location at a location of the representation of the media item corresponding to the first portion of the representation of the media item; and in accordance with a determination that the input includes selection of a second portion of the representation of the media item that is different from the first portion of the representation of the media item, the computer system displays the indication of the focus location at a location of the representation of the media item corresponding to the second portion of the representation of the media item. Changing the location at which an indication of the focus location is displayed in response to selection of a respective portion of the representation of the media item enables the user to quickly and efficiently identify the current focus location without further navigating the user interface, thereby providing improved visual feedback to the user and/or reducing the number of inputs needed to perform an operation, and/or performing an operation when a set of conditions has been met without requiring further user input.

In some embodiments, the representation of the media item includes a first element (e.g., a first subject, a first object, a first item, and/or a representation thereof) (e.g., 1604B) corresponding to a first depth and a second element (e.g., a second subject, a second object, a second item, and/or a representation thereof) (e.g., 1604C) corresponding to a second depth that is different from the first depth; and displaying the representation of the media item (e.g., with the simulated depth-of-field effect) includes: displaying the first element with a first amount of blurring; and displaying the second element with a second amount of blurring that is different from the first amount of blurring (e.g., in FIG. 16A, 1604C is blurred more than 1604B because 1604C has a greater depth than 1604B). In some embodiments, the amount of blurring (e.g., applied, additional, and/or artificial blurring) is based on the depth corresponding to the element. In some embodiments, the amount of blurring (e.g., applied, additional, and/or artificial blurring) is proportional to the depth of the corresponding element relative to an element at the focus location (e.g., elements that are further from the element at the focus location are blurred more than elements that are closer to the element at the focus location). Displaying the first element with a first amount of blurring and displaying a second element with a different amount of blurring provides the user with information about the relative depth of the first element and the second element, thereby providing improved visual feedback to the user.

Note that details of the processes described above with respect to method 1700 (e.g., FIG. 17) are also applicable in an analogous manner to the methods described below and above. For example, methods 700, 900, 1100, 1300, 1500, 1900, 2100, and/or 2300 optionally include one or more of the characteristics of the various methods described above with reference to method 1700.

FIGS. 18A-18T illustrate exemplary user interfaces for displaying, editing, and/or controlling settings for a media item (e.g., a media item that includes a plurality of images and depth information), in accordance with some embodiments. The user interfaces in these figures are used to illustrate the processes described below, including the processes in FIG. 19.

In FIG. 18A, computer system 600 displays media user interface 657. Computer system 600 is described above with reference to FIGS. 6A-6U, 8A-8T, 10A-10I, 12A-12T, and 14A-14Q, and 16A-16M. Embodiments and features of media user interface 657 are described in, e.g., FIGS. 6N-6Q, 16D, and 16M.

Captured media 1606 is displayed in media user interface 657 with the simulated depth-of-field effect. Captured media 1606 includes a plurality of images that can be played in a sequence of images (e.g., as an animation over time) in response to various types of inputs and in various manners or modes (e.g., as described with reference to FIGS. 20A-

20F, 20H, and 20J-20T). Media user interface 657 displays effects element 1655, which includes effects status indicator 1657 (e.g., a thumbnail, icon, and/or glyph). In some embodiments, multi-frame photo capture affordance 674 includes effects status indicator 1657. The appearance of effects element 1655 and/or effects status indicator 1657 indicates a mode in which the sequence of images is displayed and the status of the simulated depth-of-field effect for captured media 1606. In FIG. 18A, effects status indicator 1657 indicates that the sequence of images is displayed in a standard move (e.g., Live) and the simulated depth-of-field effect (e.g., Portrait effect) is enabled, as indicated in media display menu 1804 discussed with reference to FIG. 18B.

In FIG. 18A, computer system 600 detects input 1810A (e.g., a tap and/or other selection input) selecting effects element 1655. In response to detecting input 1810A, computer system 600 displays media display menu 1804, as shown in FIG. 18B. Media display menu 1804 concurrently displays various options for controlling the display and/or appearance of captured media 1606 with respect to the simulated depth-of-field effect and the sequence of images associated with captured media 1606. For example, display options 1804A-1804E correspond to respective modes in which the sequence of images are displayed when display of the sequence of images is activated. Display option 1804F and display option 1804G are options for enabling and disabling display of the simulated depth-of-field effect for captured media 1606, respectively.

In FIG. 18B, display option 1804F is designated with a check mark, indicating that the simulated depth-of-field effect is enabled for captured media 1606. In response to detecting input 1810B (e.g., a tap and/or other selection input) selecting display option 1804G, computer system 600 disables the simulated depth-of-field effect for captured media 1606 and displays captured media 1606 without the simulated depth-of-field effect, as shown in FIG. 18C. Because the simulated depth-of-field effect is disabled, effects status indicator 1657 is updated to indicate that the simulated depth-of-field effect is disabled (e.g., with a line through the f-stop indicator).

In FIG. 18C, computer system 600 detects input 1810C (e.g., a tap and/or other selection input) selecting effects element 1655. In response to detecting input 1810C, computer system 600 displays (e.g., re-displays) media display menu 1804, as shown in FIG. 18D. In response to detecting input 1810D (e.g., a tap and/or other selection input) selecting display option 1804F, computer system 600 enables the simulated depth-of-field effect for captured media 1606 and applies the simulated depth-of-field effect to captured media 1606 as shown in FIG. 18E.

Figures 18E, 18F:
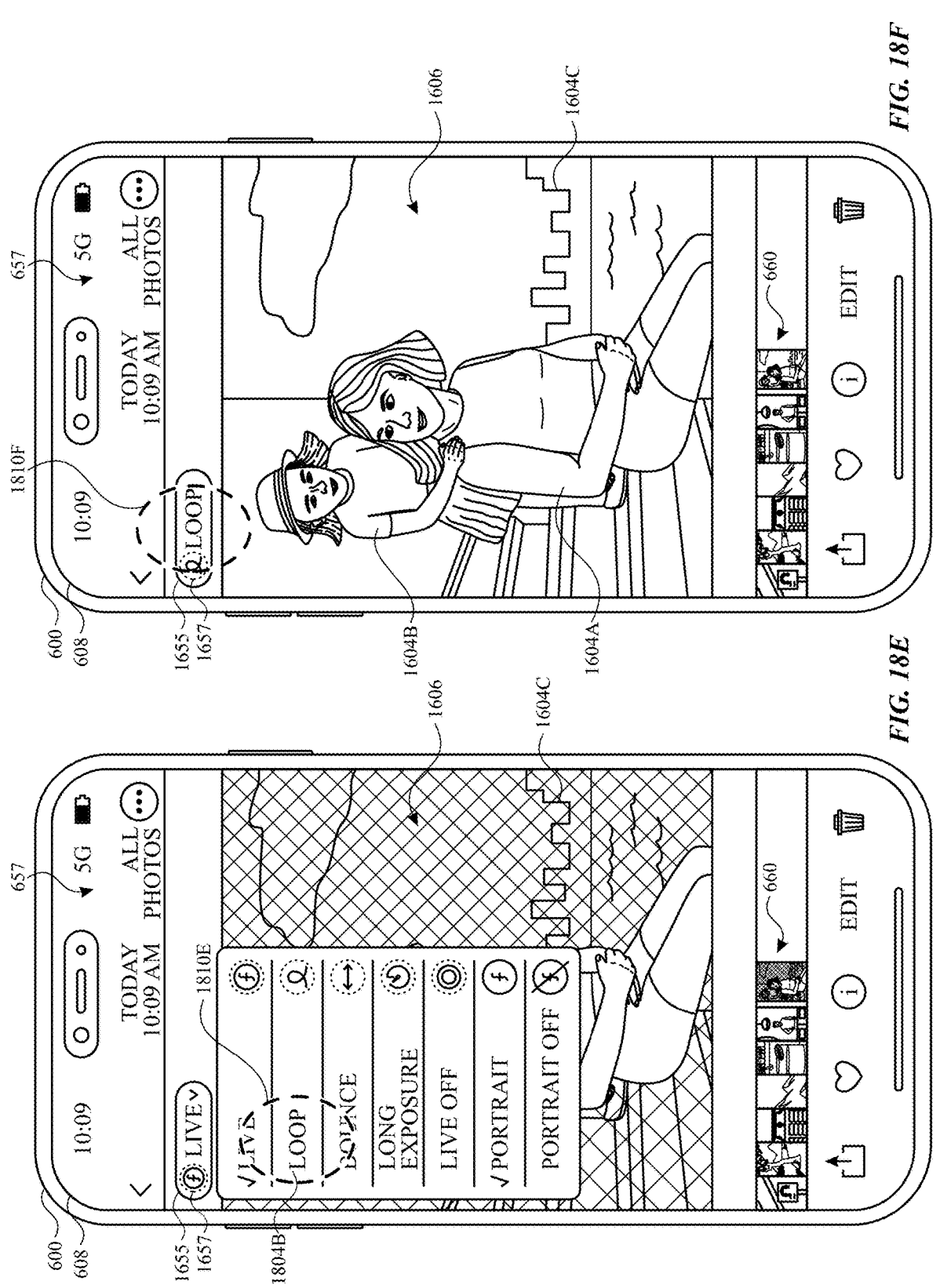

In FIG. 18E, computer system 600 detects input 1810E (e.g., a tap and/or other selection input) selecting display option 1804B corresponding to a loop mode in which the sequence of images of captured media 1606 is displayed repeatedly (e.g., in media user interface 657 automatically without user input). In some embodiments, when a predetermined display mode is enabled (e.g., any of the display modes corresponding to display options 1804B-1804D), computer system 600 disabled (e.g., automatically disables) the simulated depth-of-field effect for the selected media item. For example, in response to detecting input 1810E, computer system 600 displays captured media 1606 in the selected mode corresponding to display option 1804B without the simulated depth-of-field effect, as shown in FIG. 18F. In FIG. 18F, effects element 1655 is updated to reflect the currently selected display option.

Figures 18G, 18H:
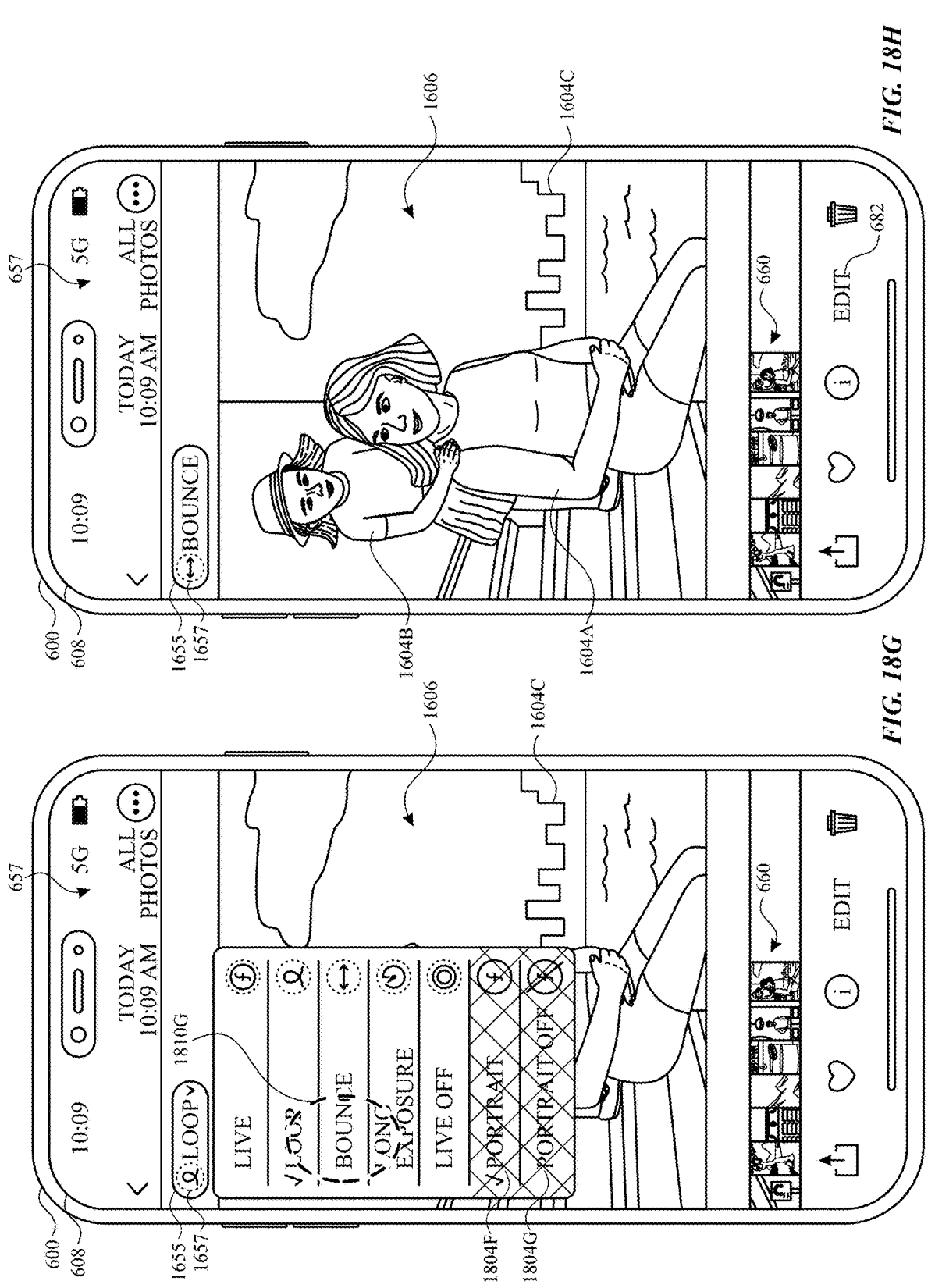

In some embodiments, the simulated depth-of-field effect cannot be enabled when a predetermined display mode for the sequence of images is enabled. For example, in response to detecting input 1810F (e.g., a tap and/or other selection input) selecting effects element 1655 in FIG. 18F, computer system 600 displays media display menu 1804 as shown in FIG. 18G. In FIG. 18G, display option 1804F is marked (indicating that the simulated depth-of-field effect is disabled) and display options 1804F-1804G are not selectable, as indicated by the hashing on display options 1804F-1804G.

In FIG. 18G, computer system 600 detects input 1810G (e.g., a tap and/or other selection input) selecting display option 1804C corresponding to a bounce mode in which the sequence of images is displayed forward and then backward in time (e.g., automatically without user input and, optionally, repeatedly). Because display option 1804C corresponds to a predetermined display mode, the simulated depth-of-field effect remains disabled, as shown in FIG. 18H.

Figures 18I, 18J:
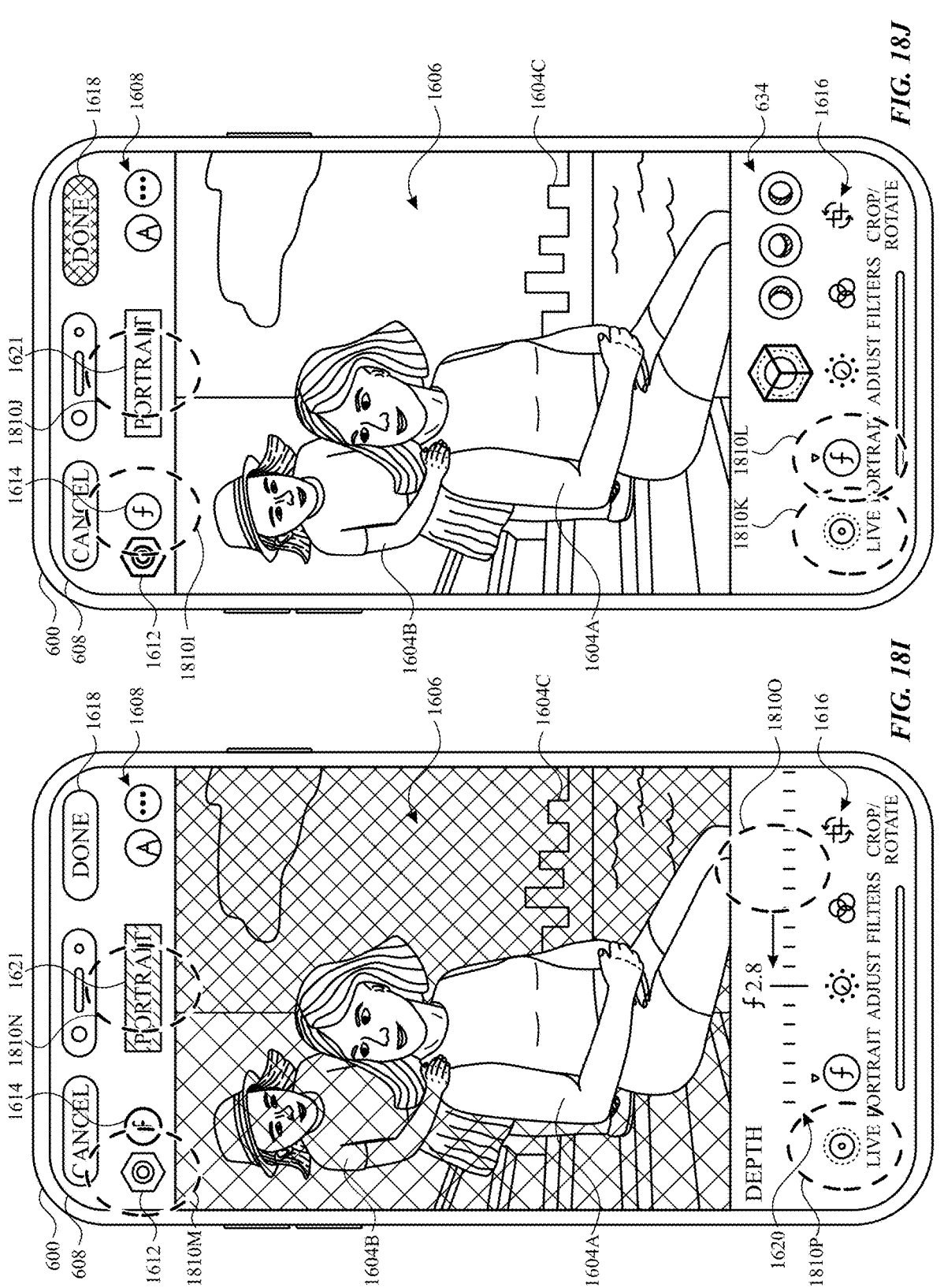
Figures 18K, 18L:
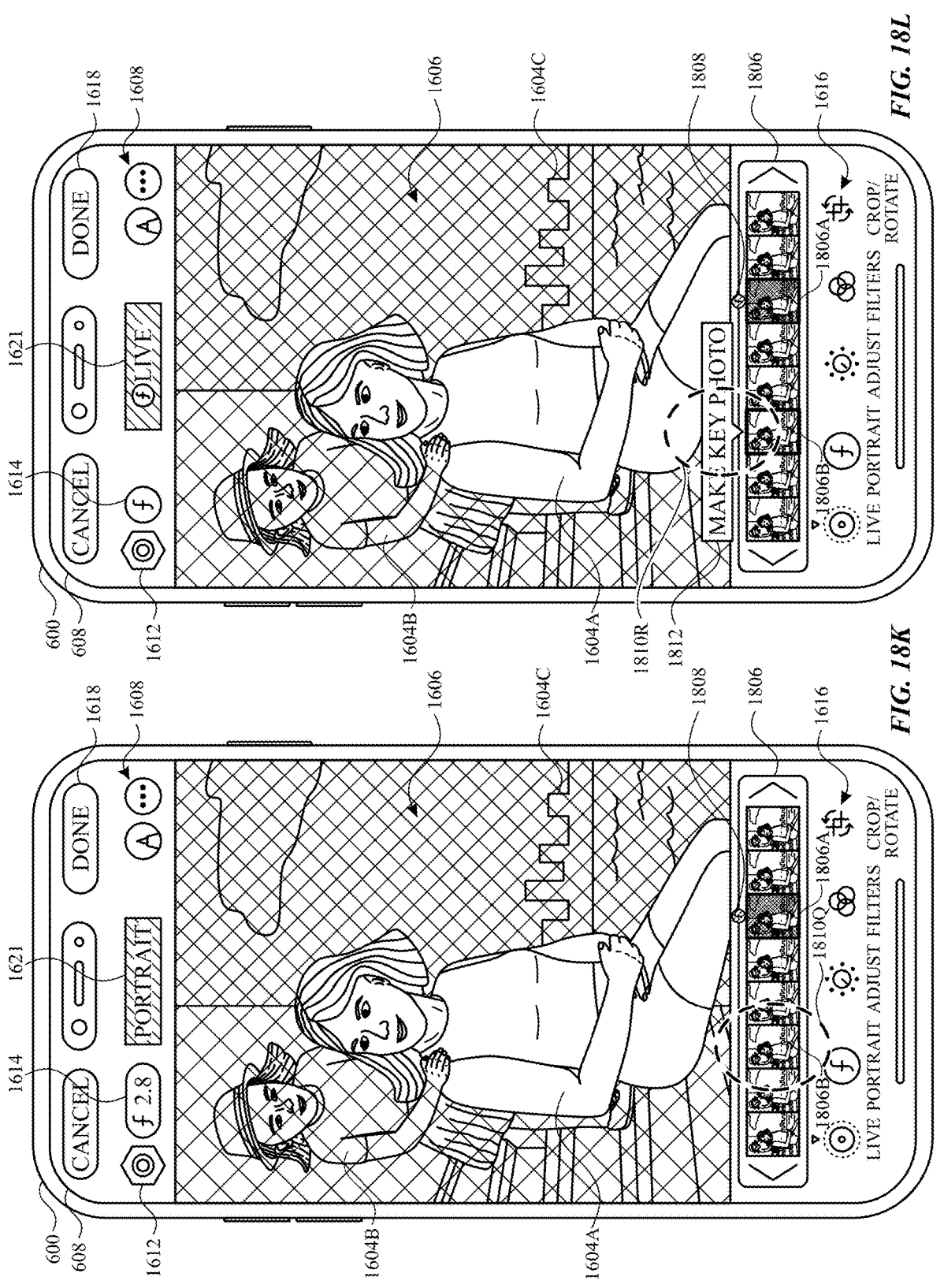

Returning to FIG. 18A, computer system 600 detects input 1810H (e.g., a tap and/or other selection input) selecting edit affordance 682. In response to detecting input 1810H, computer system 600 displays media editing user interface 1608 as shown in FIG. 18I. Embodiments and features of media editing user interface 1608 are described with reference to FIGS. 16E-16L. For example, in response to detecting input 1810N (e.g., a tap and/or other selection input) selecting status indicator 1621, computer system 600 disables the simulated depth-of-field effect. In response to detecting input 1810O (e.g., a tap, swipe, drag, and/or other input) directed to aperture setting slider 1620, computer system 600 adjusts the aperture setting for the simulated depth-of-field effect. In response to detecting input 1810P (e.g., a tap and/or other selection input) selecting multi-frame photo settings tab 1616A, computer system 600 displays controls for editing features related to the plurality of images associated with captured media 1606. For example, in response to detecting input 1810P, computer system 600 displays multi-frame photo editing control 1806, as shown in FIG. 18K described below. In response to detecting input 1810M (e.g., a tap and/or other selection input) selecting lighting effect settings affordance 1612, computer system 600 displays lighting effect menu 634 (e.g., replaces aperture setting slider 1620 with lighting effect menu 634), as shown in FIG. 18J.

In FIG. 18J, in response to detecting input 1810J (e.g., a tap and/or other selection input) selecting status indicator 1621, computer system 600 displays captured media 1606 with the simulated depth-of-field effect in media editing user interface 1608 (e.g., for the purpose of editing the simulated depth-of-field effect settings for captured media 1606). In response to detecting input 1810I (e.g., a tap and/or other selection input) selecting portrait settings affordance 1614 and/or input 1810L (e.g., a tap and/or other selection input) selecting portrait settings tab 1616B, computer system 600 displays (e.g., re-displays) aperture setting slider 1620 (e.g., replaces lighting effect menu 634 with aperture setting slider 1620). In response to detecting input 1810K (e.g., a tap and/or other selection input) selecting multi-frame photo settings tab 1616A, computer system 600 displays controls for editing features related to the plurality of images associated with captured media 1606. For example, in response to detecting input 1810K, computer system 600 displays multi-frame photo editing control 1806, as shown in FIG. 18K. Multi-frame photo editing control 1806 can be used to edit the sequence of images associated with captured media 1606. Depth information icon 1808 indicates a frame that includes depth information and/or that can be displayed with portrait mode effects (e.g., the simulated depth-of-field effect and/or a simulated lighting effect). In some embodiments, if more than one frame of captured media 1606 includes depth information, then computer system 600 displays multiple instances of depth information icon corresponding to respective frames that include depth information.

Figures 18M, 18N:
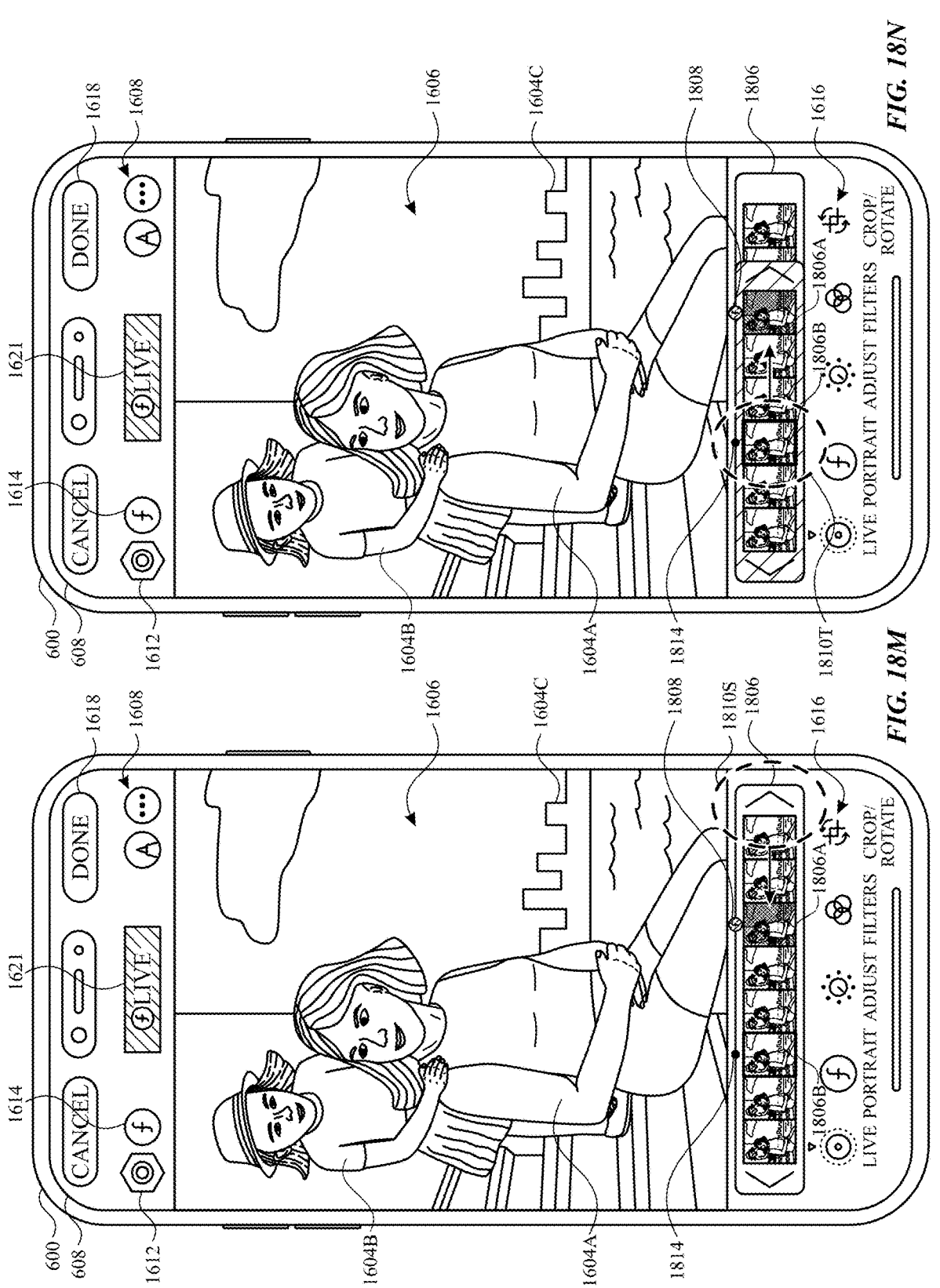

In multi-frame photo editing control 1806, a representative frame (e.g., frame 1806A in FIG. 18K) is visually indicated (e.g., with an outline, highlighting, color, brightness, shading, and/or other appearance that distinguishes the representative frame from other images in multi-frame photo editing control 1806). In FIG. 18K, computer system 600 detects input 1810Q (e.g., a tap, swipe, drag, and/or other selection input) selecting a frame 1806B in multi-frame photo editing control 1806 (e.g., a frame different from the currently selected representative frame). In response to detecting input 1810Q, computer system 600 visually indicates the selected frame (e.g., with an outline, highlighting, color, brightness, shading, and/or other appearance that distinguishes the selected frame from other images in multi-frame photo editing control 1806) and displays key photo selection affordance 1812, as shown in FIG. 18L. In response to detecting input 1810R (e.g., a tap and/or other selection input) selecting key photo selection affordance 1812, computer system 600 sets the selected frame as the representative frame for captured media 1606, as indicated by the outline around frame 1806B and representative frame indicator 1814 in FIG. 18M. In FIG. 18M, frame 1806B is displayed as the representation of captured media 1606. Because frame 1806B does not include depth information that enables display of the simulated depth-of-field effect, computer system 600 displays captured media 1606 without the simulated depth-of-field effect.

In some embodiments, a user can edit the length, starting frame, and/or ending frame of the sequence of images (e.g., by selecting and/or manipulating multi-frame photo editing control 1806 or a portion thereof). In FIG. 18M, computer system 600 detects input 1810S (e.g., a drag, swipe, tap, and/or other selection input) corresponding to a request to change which frame is the final frame in the sequence of images (e.g., to trim, shorten, and/or reduce the number of images in the sequence of images). In response to detecting input 1810S, computer system 600 updates multi-frame photo editing control 1806 to indicate that frame 1806A is the final frame in the sequence of images, as shown in FIG. 18N.

Figures 18O, 18P:
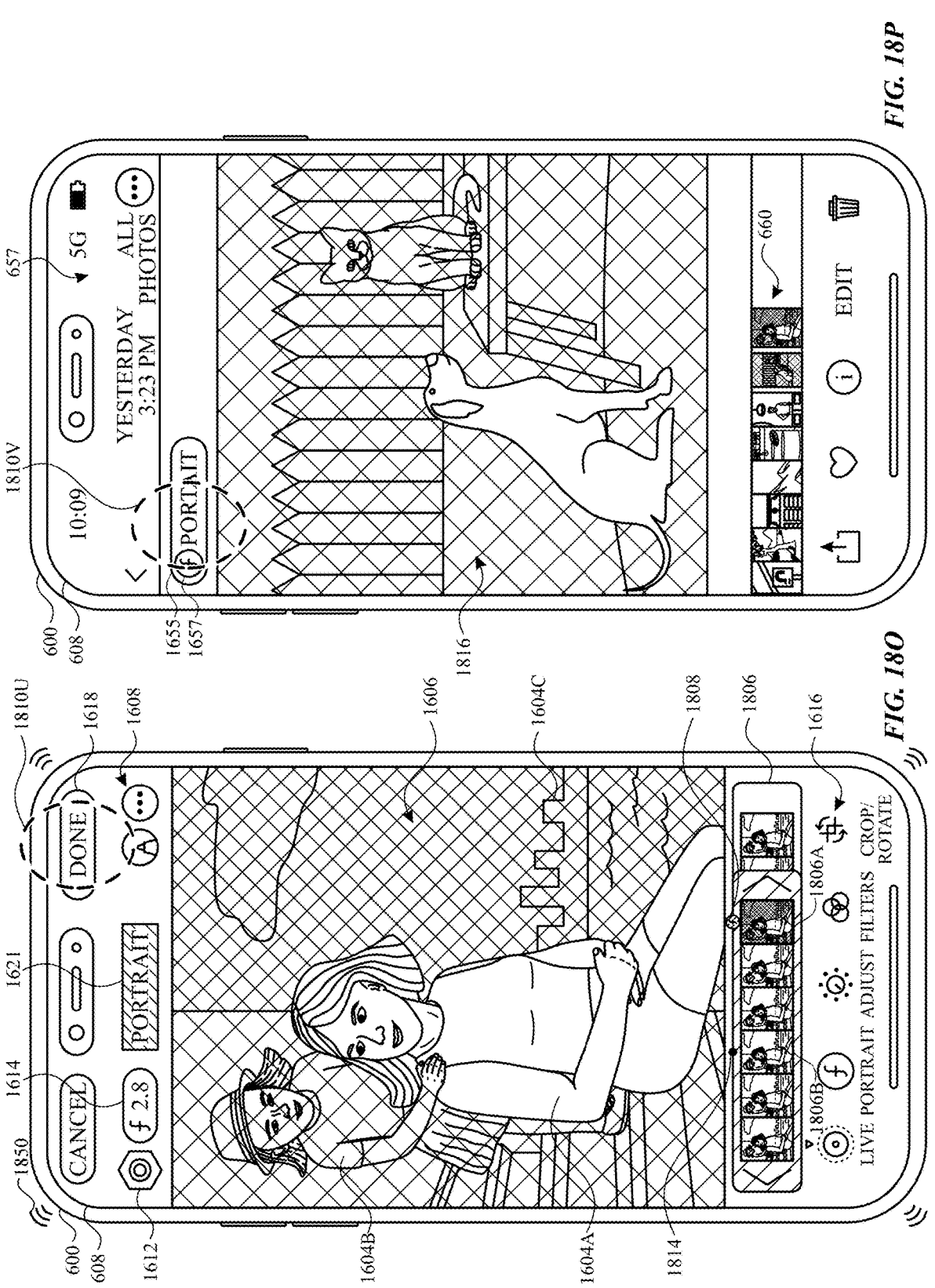

In FIG. 18N, computer system 600 detects input 1810T (e.g., a drag, swipe, tap, and/or other selection input) directed to multi-frame photo editing control 1806 corresponding to a request to select frame 1806A as the representative frame for captured media 1606. In response to input 1810T, computer system 600 selects frame 1806A as the representative frame for captured media 1606 and displays frame 1806A as the representative image of captured media 1606, as shown in FIG. 18O. Because frame 1806A includes depth information, computer system 600 displays captured media 1606 with the simulated depth-of-field effect in FIG. 18O. In some embodiments, computer system 600 outputs haptic output 1850 because frame 1806A includes depth information (e.g., in response to selecting a frame that includes depth information as the representative image).

In response to detecting input 1810U (e.g., a tap and/or other selection input) selecting done affordance 1618, computer system 600 exits media editing user interface 1608. In some embodiments, in response to detecting a request (e.g., input 1810U) to exit media editing user interface 1608, computer system 600 displays captured media 1606 (e.g., in media user interface 657) with the parameters, features, and/or settings selected in media editing user interface 1608 (e.g., according to inputs 1810I-1810T in FIGS. 18I-18O).

Figures 18Q, 18R:
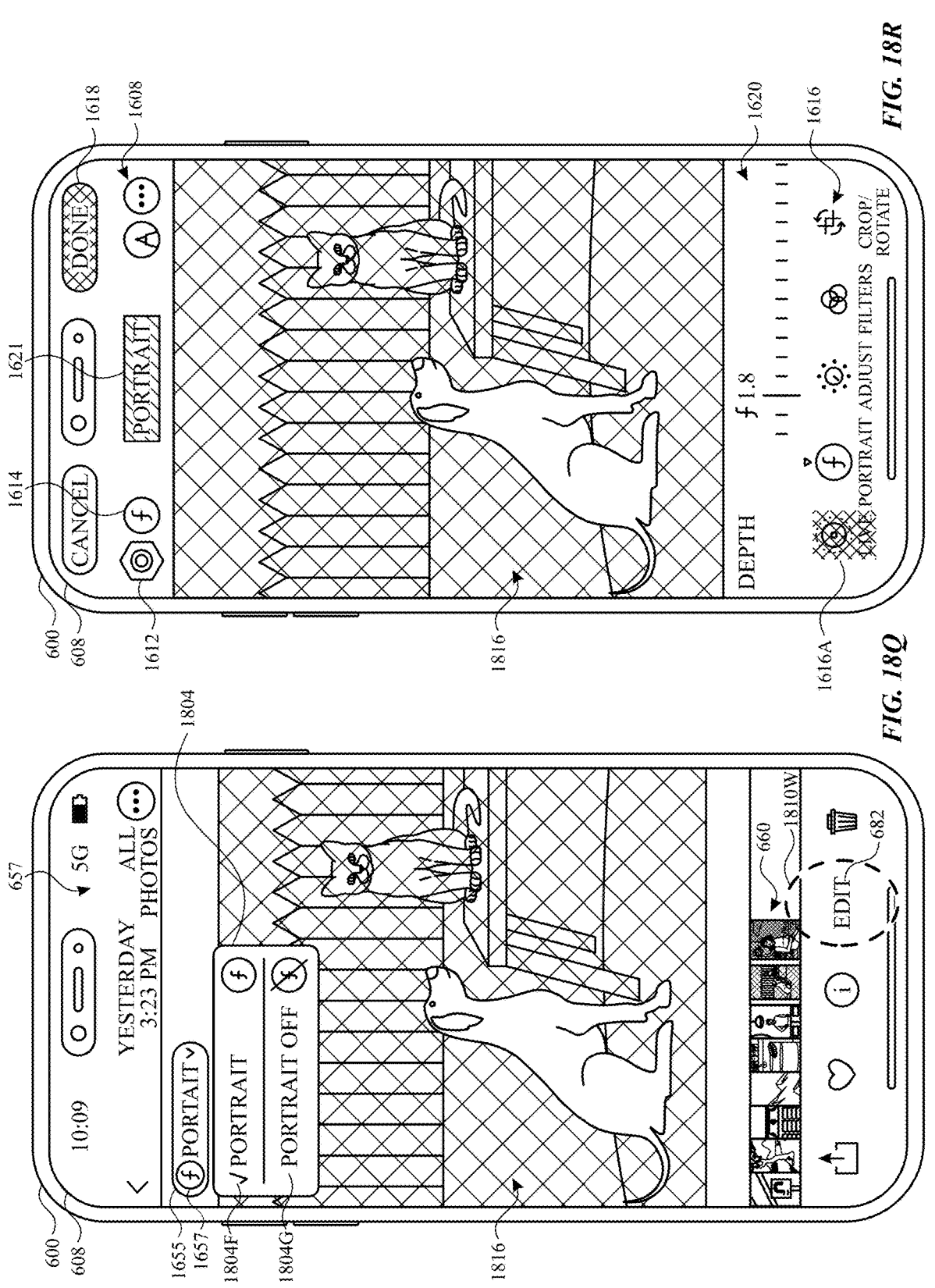
Figures 18S, 18T:
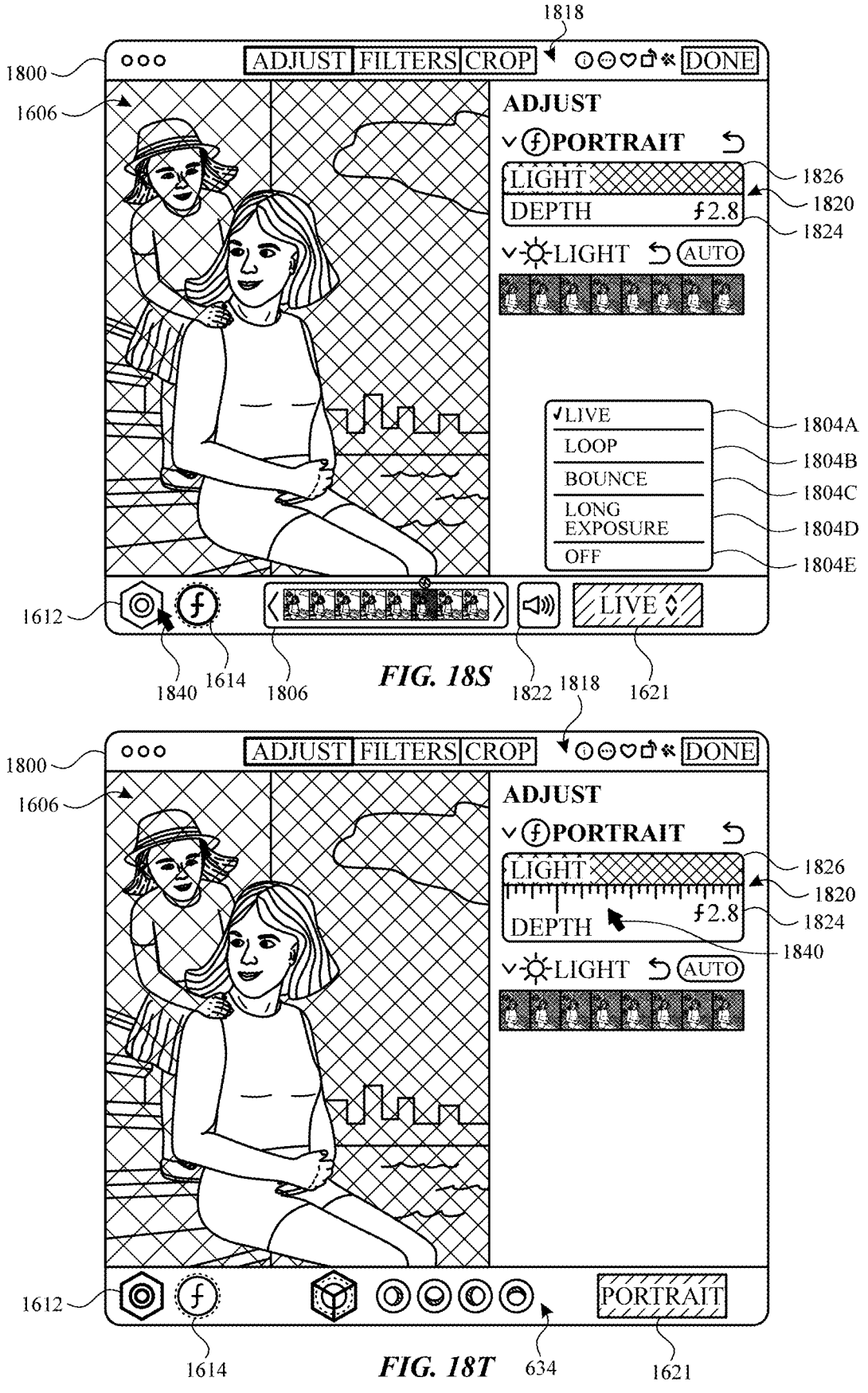

Turning to FIG. 18P, computer system 600 displays media user interface 657 with captured media 1816 (e.g., corresponding to a different media item than captured media 1606). Captured media 1816 includes depth information that enables display of the simulated depth-of-field effect but does not include a plurality of images that enables display of a sequence of images, as indicated by effects element 1655 and effects status indicator 1657 in FIG. 18P. As shown in FIG. 18Q, because captured media 1816 does not include a plurality of images, computer system 600 displays media display menu 1804 without display options 1804A-1804E in response to detecting input 1810V (e.g., a tap and/or other selection input) selecting effects element 1655 (e.g., media display menu 1804 includes only display options 1804F-1804G).

In FIG. 18Q, computer system 600 detects input 1810W (e.g., a tap and/or other selection input) selecting edit affordance 682. In response to detecting input 1810W, computer system 600 displays media editing user interface 1608 as shown in FIG. 18R. In FIG. 18R, because captured media 1816 does not include a plurality of images, computer system 600 disables the ability to select multi-frame photo settings tab 1616A in settings menu 1616 in media editing user interface 1608. Computer system 600 greys out, blurs, removes, or otherwise deemphasizes multi-frame photo settings tab 1616A to indicate that options for editing features of a plurality of images are not available (e.g., as indicated by the hatching on multi-frame photo settings tab 1616A in FIG. 18R).

Turning to FIG. 18S, display 1800 displays media editing user interface 1818. In some embodiments, display 1800 is a display of a computer system such as a desktop computer, a laptop computer, or a tablet computer (e.g., a computer system other than computer system 600). In some embodiments, display 1800 is larger than display 608 of computer system 600. Media editing user interface 1818 concurrently displays captured media 1606, lighting effect settings affordance 1612, and portrait settings affordance 1614. Status indicator 1621 indicates that media editing user interface 1818 is in a multi-frame photo editing mode in which controls are provided for editing the plurality of images associated with captured media 1606 described above, including multi-frame photo editing control 1806 and audio affordance 1822 (e.g., for controlling audio associated with the plurality of images of captured media 1606, such as turning the audio on and off). In FIG. 18S, status indicator 1621 is expanded (or selected) to show display options 1804A-1804D described above for displaying the plurality of images. Multi-frame photo editing control 1806 and display options 1804A-1804D can be selections and/or navigated using cursor 1840 in a manner analogous to the techniques described above with reference to computer system 600 and display 608.

In FIG. 18S, media editing user interface 1818 displays portrait settings controls 1820, including simulated aperture control 1824 and lighting control 1826 (e.g., for controlling a light setting associated with captured media 1606), concurrently with the elements described above. In response to detecting an input (e.g., via cursor 1840) corresponding to a request to display additional controls for editing portrait features of captured media 1606, media editing user interface 1818 displays lighting effect menu 634 and expands simulated aperture control 1824 to provide an aperture setting slider (e.g., with functionality analogous to aperture setting slider 644 and/or aperture setting slider 1620), as shown in FIG. 18T. In some embodiments, the request to display additional controls for editing portrait feature of captured media 1606 includes selection of lighting effect settings affordance 1612. In some embodiments, the request to display additional controls for editing portrait feature of captured media 1606 includes selection of portrait settings affordance 1614. In some embodiments, media editing user interface 1818 includes an element analogous to portrait settings tab 1616B, and the request to display additional controls for editing portrait feature of captured media 1606 includes selection of the element analogous to portrait settings tab 1616B. In some embodiments, media editing user interface 1818 includes an element analogous to multi-frame photo settings tab 1616A that can be selected (e.g., in FIG. 18T) to return to 1818 as shown in FIG. 18S.

FIG. 19 is a flow diagram illustrating a method for displaying, editing, and/or controlling settings for a media item using a computer system in accordance with some embodiments. Method 1900 is performed at a computer system (e.g., 100, 300, 500, and/or 600) that is in communication with (e.g., includes and/or is connected to) a display generation component (e.g., 608; 1800; a display controller; a touch-sensitive display system; a display (e.g., integrated and/or connected), a 3D display, a transparent display, a projector, and/or a heads-up display) and one or more input devices. In some embodiments, the one or more input devices include: a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial). In some embodiments, the computer system is in communication with (e.g., includes and/or is connected to) one or more cameras (e.g., 604A, 604B, 604C, and/or 604D), such as one or more rear (e.g., user-facing) cameras and/or one or more forward (e.g., environment-facing) cameras (e.g., a plurality of cameras with different lenses, such as a standard camera, a telephoto camera, and/or a wide-angle camera). In some embodiments, the computer system is in communication with (e.g., includes and/or is connected to) one or more sensors (e.g., one or more depth sensors). Some operations in method 1900 are, optionally, combined, the orders of some operations are, optionally, changed, and some operations are, optionally, omitted.

As described below, method 1900 provides an intuitive way for playing, editing, and/or controlling settings for a media item. The method reduces the cognitive burden on a user for playing, editing, and/or controlling settings for a media item, thereby creating a more efficient human-machine interface. For battery-operated computing devices, enabling a user to play, edit, and/or control settings for a media item faster and more efficiently conserves power and increases the time between battery charges.

According to method 1900, the computer system detects (1902), via the one or more input devices, a request (e.g., 1810A, 1810C, 1810F, 1810H, 1810W, and/or 1610E) to display controls for editing a representation of a media item (e.g., 1606) (e.g., an image, a photo, a set of photos, a sequence of photos, one or more previously captured photos, a live photo, a live image, an animated photo, an animated image, a multiple-image photo, and/or a set of one or more images that are available to be displayed in a sequence of images when the representation of the media item is displayed). In some embodiments, the representation of the media item includes a representative image (e.g., a key frame) of a set of images. In some embodiments, the request to display controls for editing the representation of the media item includes a set of one or more inputs (e.g., a contact on a touch-sensitive surface, a gesture, a touch gesture, an air gesture, a speech input, movement of an input device, and/or activation of a physical button). In some embodiments, the media item includes a plurality of images. In some embodiments, the plurality of images includes a set of images that were captured over a duration of time (e.g., 1 second, 1.5 seconds, or 2 seconds) including a first set (e.g., a first subset) of one or more images that was captured before a request to initiate capture of the plurality of images was detected and a second set (e.g., a second subset) of one or more images was captured after the request to initiate capture of the plurality of images was detected. In some embodiments, the plurality of images are saved in a file format that supports both still and animated images such as the GIF ("Graphics Interchange Format"), APNG ("Animated Portable Network Graphics"), or FLIF ("Free Lossless Image Format"). In some embodiments, the plurality of images are display in a sequence over time in response to detecting a user input. For example, while a representative image (e.g., a key frame) of the media item is displayed, the computer system detects an input (e.g., a selection of the representation of the media item, a tap on the representation of the media item, and/or a press and hold input on the representation of the media item); and in response to detecting the input, the computer system displays the plurality of images in a sequence over time. In some embodiments, the computer system displays at least a portion of the plurality of images in a sequence over time in response to detecting a request to display the representation of the media item (e.g., in response to switching from one media item to another in a media item album). In some embodiments, a key frame of the media item is a frame of the media item that is displayed when the media item is not being animated (e.g., when the plurality of images are not being displayed in a sequence over time). In response to detecting the request to display controls for editing the representation of the media item, the computer system concurrently displays (1904), via the display generation component: (1906) a first control element (e.g., 1804A, 1804B, 1804C, 1804D, 1804E, 1806, 1612, and/or 1616A) (e.g., a live photo control element, a live image control element, an animated photo control element, and/or an animated image control element) (e.g., a selectable user interface element, a user-interactive user interface element, and/or an affordance) for editing a feature (e.g., a value, a parameter, and/or a setting) of a set of one or more images (e.g., one or more captured images, a live photo, a live image, an animated photo, an animated image, and/or a multiple-image photo) that are available to be displayed in a sequence of images when the representation of the media item is displayed via the display generation component (e.g., without editing the one or more images and/or without editing a simulated depth-of-field effect for the representation of the media item) and (1908) a second control element (e.g., 1804F, 1804G, 1614, 1616B, and/or 1620) (e.g., a simulated depth-of-field effect control element and/or a portrait effect control element) (e.g., a selectable user interface element, a user-interactive user interface element, and/or an affordance) for editing (e.g., setting, adjusting, and/or changing) a simulated depth-of-field effect (or, in some embodiments, a degree, feature, value, setting, parameter, magnitude, and/or amount of blurring of the simulated depth-of-field effect) for the representation of the media item (e.g., a visual effect that simulates a depth of field for an image of the media item). Concurrently displaying the first control for editing a feature of the set of one or more images and the second control for editing the simulated depth-of-field effect enables the user to quickly and efficiently customize multiple features of the media item without additional inputs to navigate the user interface, thereby reducing the number of inputs needed to perform an operation and/or providing additional control options without cluttering the user interface with additional displayed controls.

In some embodiments, in response to detecting selection of (or interaction with) the first control element, the computer system edits (e.g., changes, sets, and/or adjusts) the feature of the sequence of images. In some embodiments, in response to detecting the request to display controls for editing the representation of the media item: in accordance with a determination that the media item includes a set of one or more images that are available to be displayed in a sequence of images when the representation of the respective media item is displayed via the display generation component, the computer system displays the first control element; and in accordance with a determination that the media item does not include a set of one or more images that are available to be displayed in a sequence of images when the representation of the respective media item is displayed via the display generation component, the computer system forgoes displaying the first control element. In some embodiments, displaying the sequence of images includes displaying a first effect (e.g., a standard live effect) that includes displaying the sequence of images a single time. In some embodiments, displaying the sequence of images includes displaying a second effect (e.g., a loop effect) that includes repeating display of the sequence of images (e.g., looping the sequence of images) (e.g., repeating display of the sequence of images without additional input, in response to a single request to display the sequence of images, and/or while maintaining an input). In some embodiments, displaying the sequence of images includes displaying a third effect (e.g., a bounce effect) that includes displaying the sequence of images in a first order (e.g., forward and/or first to last) followed by displaying the sequence of images in a reverse order (e.g., backward and/or last to first) (e.g., to create a bounce effect). In some embodiments, displaying the sequence of images includes repeatedly displaying the sequence of images in a first order followed by displaying the sequence of images in a reverse order (e.g., without additional input, in response to a single request to display the sequence of images, and/or while maintaining an input). In some embodiments, displaying the sequence of images includes displaying a fourth effect (e.g., a long exposure effect) that includes concurrently displaying the sequence of images (or a subset of the sequence of images) (e.g., superimposing the images on one another) (e.g., to create a long exposure effect). In some embodiments, the media item includes the set of one or more images and/or information (e.g., metadata) that represents the sequence of images and/or an effect (e.g., standard live effect, a loop effect, a bounce effect, and/or a long exposure effect) with which the representation of the media item (or, in some embodiments, the sequence of images) is configured to be displayed (e.g., a currently selected effect). In some embodiments, in response to detecting selection of (or interaction with) the second control element, the computer system edits (e.g., changes, sets, and/or adjusts) the simulated depth-of-field effect for the representation of the media item. In some embodiments, in response to detecting the request to display controls for editing the representation of the media item: in accordance with a determination that the media item includes depth information that enables display of the simulated depth-of-field effect, the computer system displays the second control element; and in accordance with a determination that the media item does not include depth information that enables display of the simulated depth-of-field effect, the computer system foregoes displaying the second control element.

In some embodiments, the simulated depth-of-field effect is based on detection of one or more subjects in the representation of the media item. In some embodiments, the simulated depth-of-field effect is based on detected or estimated depth information (e.g., a depth map) about objects in the representation of the media item. In some embodiments, the depth information is captured at the time the media item is captured and is associated with the media item. In some embodiments, the depth information includes a distance of an object (or a portion of an object) from a sensor (e.g., a camera or lens) or other point of reference. In some embodiments, the depth information includes a distance of an object (or a portion of an object) from another object (or portion of an object) (e.g., the relative distance between two objects or portions of objects). In some embodiments, the depth-of-field effect is based on segmentation information that separates a subject from other elements, such as foreground and/or background elements. In some embodiments, the simulated depth-of-field effect includes blurring (e.g., artificially blurring and/or adding a blurring effect to) a portion of an image that is in a foreground and/or a background relative to a subject (e.g., a detected subject and/or a designated subject) or a depth plane of the image (e.g., a simulated focal plane and/or a plane perpendicular to an optical axis). In some embodiments, the portion of the image that is blurred when the simulated depth-of-field effect is applied is not blurry when the depth-of-field effect is not applied. In some embodiments, when the simulated depth-of-field effect is applied, portions of the image that are at a different depth (e.g., along an optical axis) than the subject are blurred. In some embodiments, portions of the image that are not within a threshold depth (or range of depths) relative to the subject are blurred. In some embodiments, an amount or degree of blurring applied to a portion of an image varies based on a distance (e.g., along an optical axis) from the subject or a simulated focal plane. For example, the simulated depth-of-field effect includes applying a greater amount of blur to a portion of the image that is farther from the subject than to a portion of the image that is closer to the subject (e.g., objects in the image that are further from the subject are blurred by a greater amount than objects that are closer to the subject).

In some embodiments, while concurrently displaying the first control element and the second control element, the computer system detects, via the one or more input devices, a first input (e.g., 1810B, 1810D, 1810E, 1810G, 1810O, 1810Q, 1810R, 1810S, 1810T, 1610L, 1610M, 1610N, and/or 1610O) (e.g., a contact on a touch-sensitive surface, a gesture, a touch gesture, an air gesture, a speech input, movement of an input device, and/or activation of a physical button); and in response to detecting the first input: in accordance with a determination that the first input includes selection of (e.g., is directed to) the first control element (e.g., 1804A, 1804B, 1804C, 1804D, 1804E, sand/or 1806), the computer system edits (e.g., adjusting a parameter of) the feature of the set of one or more images that are available to be displayed in a sequence of images when the representation of the media item is displayed via the display generation component; and in accordance with a determination that the first input includes selection of (e.g., is directed to) the second control element (e.g., 1804F, 1804G, and/or 1620), the computer system edits (e.g., increasing, decreasing, and/or adjusting a parameter of) the simulated depth-of-field effect for the representation of the media item. Editing the feature of the set of one or more images or editing the simulated depth-of-field effect depending on whether the first control element or the second control element is selected enables the user to quickly and efficiently customize multiple features of the media item without additional inputs to navigate the user interface, thereby providing improved visual feedback to the user, reducing the number of inputs needed to perform an operation, and/or performing an operation when a set of conditions has been met without requiring further user input.

In some embodiments, while concurrently displaying the first control element and the second control element, the computer system detects, via the one or more input devices, a second input (e.g., a contact on a touch-sensitive surface, a gesture, a touch gesture, an air gesture, a speech input, movement of an input device, and/or activation of a physical button); and in response to detecting the second input: in accordance with a determination that the second input includes selection of (e.g., is directed to) the first control element (e.g., 1616A), the computer system displays, via the display generation component, a first set of one or more control elements (e.g., 1806 and/or portions thereof) (e.g., one or more selectable user interface elements, user-interactive user interface elements, and/or affordances) for editing (e.g., adjusting a parameter of) the feature of the set of one or more images that are available to be displayed in a sequence of images when the representation of the media item is displayed via the display generation component; and in accordance with a determination that the second input includes selection of (e.g., is directed to) the second control element (1616B), the computer system displays, via the display generation component, a second set of one or more control elements (e.g., 1620) (e.g., one or more selectable user interface elements, user-interactive user interface elements, and/or affordances) for editing (e.g., increasing, decreasing, and/or adjusting a parameter of) the simulated depth-of-field effect for the representation of the media item. Displaying a first set of control elements for editing the feature of the set of one or more images or displaying a second set of control elements for editing the simulated depth-of-field effect depending on whether the first control element or the second control element is selected enables the user to quickly and efficiently access additional controls for editing aspects of the media item without requiring additional inputs to navigate the user interface, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, the request to display controls for editing the representation of the media item includes selection of (e.g., a contact on a touch-sensitive surface, a gesture, a touch gesture, an air gesture, a speech input, movement of an input device, and/or activation of a physical button corresponding to selection of) a media item status indicator (e.g., 674, 1655 and/or 1657) (e.g., a selectable user interface element, a user-interactive user interface element, and/ or an affordance) that indicates (e.g., visually indicates) a status of the media item (e.g., in accordance with a determination that the media item has a first status, the media item status indicator is displayed with a first appearance; and in accordance with a determination that the media item has a second status that is different from the first status, the media item status indicator is displayed with a second appearance that is different from the first appearance). In some embodiments, the status of the media item indicates a manner or mode in which the representation of the media item is set to be displayed (e.g., with the simulated depth-of-field effect, without the simulated depth-of-field effect, with a capability to display the set of one or more images in the sequence of images, and/or without the capability to display the set of one or more images in the sequence of images). Concurrently displaying the first control element and the second control element in response to detecting selection of a media item status indicator that indicates a status of the media item concurrently provides the user with both information about the media item and a quick and efficient techniques for customizing the media item, thereby providing improved visual feedback to the user, reducing the number of inputs needed to perform an operation, and/or providing additional control options without cluttering the user interface with additional displayed controls.

In some embodiments, an appearance of the media item status indicator is based on one or more of: a status (e.g., a current status, a default status, and/or a user-selected status) of the feature (e.g., a display mode and/or an animation mode) of the set of one or more images, and a status (e.g., a current status, a default status, and/or a user-selected status) (e.g., enabled, on, disabled, and/or off) of the simulated depth-of-field effect (e.g., 1655 has a different appearance in FIG. 18C than in FIG. 18B). Displaying the media item status indicator with an appearance that is based on one or more of a status of the feature of the set of one or more images and a status of the simulated depth-of-field effect enables the computer system to concurrently provide information about one or more aspects of the media item and a control for customizing the media item via a single graphical element, thereby providing improved visual feedback to the user and/or providing additional control options without cluttering the user interface with additional displayed controls. In some embodiments, in accordance with a determination that the feature of the set of one or more images and the simulated depth-of-field effect have a first status, the media item status indicator is displayed with a first appearance (e.g., a first glyph and/or first icon) (e.g., a first version of 1657); and in accordance with a determination that the feature of the set of one or more images and the simulated depth-of-field effect have a second status that is different from the first status, the media item status indicator is displayed with a second appearance (e.g., a second glyph and/or second icon) (e.g., a second version of 1657) that is different from the first appearance. Displaying the media item status indicator with a first appearance or a second appearance depending on the status of the feature of the set of one or more images concurrently provides the user with information about the feature of the set of one or more images and a control for customizing the media item via a single graphical element, thereby providing improved visual feedback to the user, reducing the number of inputs needed to perform an operation, and/or providing additional control options without cluttering the user interface with additional displayed controls.

In some embodiments, the feature of the set of one or more images includes one or more playback options (e.g., 1804A-1804E) that correspond to respective modes (e.g., standard mode, loop mode, bounce mode, and/or long exposure mode) in which the sequence of images is displayed (e.g., in accordance with a determination that a first playback option is selected, the sequence of images is displayed in a first mode; and in accordance with a determination that a second playback option is selected, the sequence of images is displayed in a second mode). In some embodiments, in response to detecting selection of the first control element, the computer system selects (e.g., changes) a mode in which the sequence of images is displayed. Displaying a control for editing one or more playback options for the representation of the media item enables the user to quickly and efficiently customize playback of the representation of the media item without requiring additional inputs to navigate the user interface, thereby providing improved visual feedback to the user, reducing the number of inputs needed to perform an operation, and/or providing additional control options without cluttering the user interface with additional displayed controls. In some embodiments, while concurrently displaying the first control element and the second control element, the computer system detects, via the one or more input devices, an input (e.g., 1810E and/or 1810G) (e.g., a contact on a touch-sensitive surface, a gesture, a touch gesture, an air gesture, a speech input, movement of an input device, and/or activation of a physical button) directed to the first control element (e.g., 1804B, 1804C, or 1804D); and in response to detecting the input directed to the first control element: the computer system sets the feature of the set of one or more images to a respective feature (e.g., a respective display and/or animation mode) corresponding to the first control element; and the computer system disables the simulated depth-of-field effect for the representation of the media item (e.g., displaying the representation of the media item without the simulated depth-of-field effect and/or removing the simulated depth-of-field effect from the representation of the media item) (e.g., as shown in FIG. 18F). Setting the feature of the set of one or more images and disabling the simulated depth-of-field effect in response to selection of the first control element enables the user to customize multiple features of the media item with a single input and a single user interface element, thereby providing improved visual feedback to the user, reducing the number of inputs needed to perform an operation, and/or providing additional control options without cluttering the user interface with additional displayed controls. In some embodiments, in response to detecting the input (e.g., 1810E and/or 1810G) directed to the first control element (e.g., 1804B, 1804C, or 1804D), the computer system disables the second control element (e.g., 1804F and/or 1804G) (e.g., setting the second control element to a state in which the second control element cannot be selected) (e.g., disabling an option to turn on the simulated depth-of-field effect). In some embodiments, disabling the second control element includes changing a visual appearance of the second control element (e.g., greying out, removing, and/or visually deemphasizing the second control element). Disabling the second control element indicates to the user that the simulated depth-of-field effect is not available and prevents incorrect inputs, thereby providing improved visual feedback to the user and/or reducing the number of inputs needed to perform an operation.

In some embodiments, while concurrently displaying the first control element (e.g., 1804A, 1804B, 1804C, 1804D, and/or 1804E) and the second control element (e.g., 1804F and/or 1804G), the computer system detects, via the one or more input devices, an input (e.g., 1810B and/or 1810D) (e.g., a contact on a touch-sensitive surface, a gesture, a touch gesture, an air gesture, a speech input, movement of an input device, and/or activation of a physical button) directed to the second control element; and in response to detecting the input directed to the second control element, the computer system enables (e.g., turns on) (e.g., as shown in FIG. 18E) or disables (e.g., turns off) (e.g., as shown in FIG. 18C) the simulated depth-of-field effect for the representation of the media item. Enabling or disabling the simulated depth-of-field effect in response to selection of the second control element enables the user to customize the representation of the media item quickly and efficiently without additional inputs, thereby providing improved visual feedback to the user and/or reducing the number of inputs needed to perform an operation.

In some embodiments, while concurrently displaying the first control element and the second control element, the computer system detects, via the one or more input devices, an input (e.g., 1810O, 1610L, 1610M, 1610N, and/or 1610O) (e.g., a contact on a touch-sensitive surface, a gesture, a touch gesture, an air gesture, a speech input, movement of an input device, and/or activation of a physical button) directed to the second control element (e.g., 1620); and in response to detecting the input directed to the second control element, the computer system changes (e.g., adjusts, increases, and/or decreases) the simulated depth-of-field effect for the representation of the media item. Changing the simulated depth-of-field effect in response to selection of the second control element enables the user to customize the simulated depth-of-field effect quickly and efficiently without additional inputs, thereby providing improved visual feedback to the user and/or reducing the number of inputs needed to perform an operation.

In some embodiments, in response to detecting a request (e.g., a contact on a touch-sensitive surface, a gesture, a touch gesture, an air gesture, a speech input, movement of an input device, and/or activation of a physical button) to display respective controls for editing a representation of a respective media item: in accordance with a determination that the respective media item does not include a set of one or more images that are available to be displayed in a sequence of images when the representation of the respective media item is displayed via the display generation component, the computer system forgoes display of the first control element (e.g., displaying the second control element without displaying the first control element) (e.g., as described with reference to FIGS. 18P-18Q). In some embodiments, the computer system displays the first control element in response to detecting the request to display controls for editing the representation of the respective media item in accordance with a determination that the respective media item includes a set of one or more images that are available to be displayed in a sequence of images when the representation of the respective media item is displayed via the display generation component. Foregoing display of the first control element when a media item does not include a set of one or more images that are available to be displayed in a sequence of images avoids cluttering the user interface with elements that are not relevant in a particular context, prevents the user from providing erroneous inputs, and avoids mistakes, thereby providing improved visual feedback to the user, reducing the number of inputs needed to perform an operation, providing additional control options without cluttering the user interface with additional displayed controls, performing an operation when a set of conditions has been met without requiring further user input.

In some embodiments, in response to detecting a request (e.g., 1610D, 1810A, 1810C, 1810F, and/or 1810V) (e.g., a contact on a touch-sensitive surface, a gesture, a touch gesture, an air gesture, a speech input, movement of an input device, and/or activation of a physical button) to display respective controls for editing a representation of a respective media item: in accordance with a determination that the respective media item does not include depth information that enables display of the simulated depth-of-field effect, the computer system forgoes display of the second control element (e.g., 1804F and/or 1804G) (e.g., displaying the first control element without displaying the second control element). In some embodiments, the computer system displays the second control element in response to detecting the request to display controls for editing the representation of the respective media item in accordance with a determination that the respective media item includes depth information that enables display of the simulated depth-of-field effect. Foregoing display of the second control element when a media item does not include depth information avoids cluttering the user interface with elements that are not relevant in a particular context, prevents the user from providing erroneous inputs, and avoids mistakes, thereby providing improved visual feedback to the user, reducing the number of inputs needed to perform an operation, providing additional control options without cluttering the user interface with additional displayed controls, performing an operation when a set of conditions has been met without requiring further user input.

In some embodiments, the request to display controls for editing the representation of the media item includes selection of (e.g., 1610E, 1810H, and/or 1810W) (e.g., a contact on a touch-sensitive surface, a gesture, a touch gesture, an air gesture, a speech input, movement of an input device, and/or activation of a physical button corresponding to selection of) a selectable edit mode element (e.g., 682) (e.g., a selectable user interface element, a user-interactive user interface element, and/or an affordance) that corresponds to an editing mode (e.g., in response to detecting selection of the selectable edit mode element, the computer system enters an edit mode that includes selectable options and/or controls for editing the media item). In some embodiments, in response to detecting selection of the selectable edit mode element, the computer system displays an editing user interface that concurrently displays the representation of the media item, the first control element, and the second control element (e.g., the computer system switches from a user interface for viewing a camera roll and/or a photo album to the editing user interface). Concurrently displaying the first control element and the second control element in response to selection of a selectable element that corresponds to an editing mode enables the user to quickly and efficiently customize the media item and access additional controls for editing the media item, avoids cluttering the user interface with elements that are not relevant in a particular context, thereby providing improved visual feedback to the user, reducing the number of inputs needed to perform an operation, and/or providing additional control options without cluttering the user interface with additional displayed controls.

In some embodiments, in response to detecting the request to display controls for editing the representation of the media item, the computer system displays, via the display generation component and concurrently with the first control element and the second control element, a set of one or more selectable editing options (e.g., 1616C, 1616D, and/or 1616E) (e.g., one or more selectable user interface elements, user-interactive user interface elements, and/or affordances) for adjusting an appearance of the representation of the media item (e.g., options for adjusting a color of the representation of the media item, selecting a filter that is applied to the representation of the media item, and/or cropping the representation of the media item). Displaying a set of one or more selectable editing options for adjusting an appearance of the representation of the media item in response to detecting the request to display controls for editing the representation of the media item enables the user to quickly and efficiently access additional control and customize the representation of the media item, thereby providing improved visual feedback to the user, reducing the number of inputs needed to perform an operation, and/or providing additional control options without cluttering the user interface with additional displayed controls.

In some embodiments, while concurrently displaying the first control element and the second control element, the computer system detects, via the one or more input devices, an input (e.g., 1810L) (e.g., a contact on a touch-sensitive surface, a gesture, a touch gesture, an air gesture, a speech input, movement of an input device, and/or activation of a physical button) directed to the second control element (e.g., 1616B); and in response to detecting the input directed to the second control element, the computer system displays, via the display generation component, a set of one or more selectable elements (e.g., 1620) (e.g., one or more selectable user interface elements, user-interactive user interface elements, and/or affordances) for editing the simulated depth-of-field effect (e.g., for adjusting a magnitude of the simulated depth-of-field effect and/or selecting a focus location for the simulated depth-of-field effect for the representation of the media item (e.g., a location of the representation of the media item that is not subject to additional blurring from the simulated depth-of-field effect)). Displaying a set of one or more selectable elements for editing the simulated depth-of-field effect in response to detecting selection of the second control element enables the user to quickly and efficiently customize the simulated depth-of-field effect, thereby providing improved visual feedback to the user, reducing the number of inputs needed to perform an operation, and/or providing additional control options without cluttering the user interface with additional displayed controls.

In some embodiments, while concurrently displaying the first control element and the second control element, the computer system detects, via the one or more input devices, an input (e.g., 1810P and/or 1810K) (e.g., a contact on a touch-sensitive surface, a gesture, a touch gesture, an air gesture, a speech input, movement of an input device, and/or activation of a physical button) directed to the first control element (e.g., 1616A); and in response to detecting the input directed to the first control element, the computer system displays, via the display generation component, a set of one or more selectable elements (e.g., 1806) (e.g., one or more selectable user interface elements, user-interactive user interface elements, and/or affordances) for editing respective features of the set of one or more images that are available to be displayed in the sequence of images (e.g., for selecting a starting frame in the sequence of images, selecting an ending frame in the sequence of images, and/or selecting a key frame to be displayed as the representation of the media item). Displaying a set of one or more selectable elements for editing features of the set of one or more images in response to detecting selection of the first control element enables the user to quickly and efficiently customize features of the set of one or more images, thereby providing improved visual feedback to the user, reducing the number of inputs needed to perform an operation, and/or providing additional control options without cluttering the user interface with additional displayed controls.

In some embodiments, the computer system detects, via the one or more input devices, an input (e.g., 1810Q and/or 1810R) (e.g., a contact on a touch-sensitive surface, a gesture, a touch gesture, an air gesture, a speech input, movement of an input device, and/or activation of a physical button) corresponding to selection of a representative image (e.g., a key frame) from the set of one or more images that is displayed as the representation of the media item; and in response to detecting the input corresponding to selection of the representative image, the computer system edits (e.g., enabling or disabling) the simulated depth-of-field effect (e.g., as described with reference to FIGS. 18K-18M). Editing the simulated depth-of-field effect in response to detecting selection of a representative image for the representation of the media item enables the user to concurrently designate a representative image for the representation of the media item and set the simulated depth-of-field effect to a state that corresponds to the selected representative image, thereby providing improved visual feedback to the user, reducing the number of inputs needed to perform an operation, and/or providing additional control options without cluttering the user interface with additional displayed controls.

In some embodiments, editing the simulated depth-of-field effect includes: in accordance with a determination that the simulated depth-of-field effect is enabled and the representative image does not include depth information, disabling the simulated depth-of-field effect (and, in some embodiments, in accordance with a determination that the simulated depth-of-field effect is enabled and the representative image includes depth information, foregoing disabling the simulated depth-of-field effect) (e.g., as described with reference to FIGS. 18K-18M). Disabling the simulated depth-of-field effect in response to detecting selection of the representative image when the simulated depth-of-field effect is enabled automatically sets the state of the simulated depth-of-field effect to a state that corresponds to the selected representative image without requiring additional input from the user, thereby providing improved visual feedback to the user, reducing the number of inputs needed to perform an operation, and/or providing additional control options without cluttering the user interface with additional displayed controls.

In some embodiments, editing the simulated depth-of-field effect includes: in accordance with a determination that the simulated depth-of-field effect is disabled and the representative image includes depth information, enabling the simulated depth-of-field effect (e.g., as described with reference to FIGS. 18N-18O) (and, in some embodiments, in accordance with a determination that the simulated depth-of-field effect is disabled and the representative image does not include depth information, forgoing enabling the simulated depth-of-field effect). Enabling the simulated depth-of-field effect in response to detecting selection of the representative image when the simulated depth-of-field effect is disabled automatically sets the state of the simulated depth-of-field effect to a state that corresponds to the selected representative image without requiring additional input from the user, thereby providing improved visual feedback to the user, reducing the number of inputs needed to perform an operation, and/or providing additional control options without cluttering the user interface with additional displayed controls. In some embodiments, enabling the simulated depth-of-field effect includes applying the simulated depth-of-field effect to the representation of the media item according to settings (e.g., focus location, simulated depth of field, and/or lighting effects) of the simulated depth of field effect that were applied when the simulated depth-of-field effect was disabled (e.g., apply the simulated depth-of-field effect in FIG. 18O with the same settings that were applied in FIG. 18L). Applying the simulated depth-of-field effect according to settings of the simulated depth-of-field effect that were applied when the simulated depth-of-field effect was disabled provides the user with the ability to disable and re-enable the simulated depth-of-field effect to a previously customized state without having to re-apply previously selected settings, thereby providing improved visual feedback to the user and/or reducing the number of inputs needed to perform an operation. In some embodiments, enabling the simulated depth-of-field effect includes applying the simulated depth-of-field effect to the representation of the media item according to default settings (e.g., focus location, simulated depth of field, and/or lighting effects) of the simulated depth-of-field effect (apply the simulated depth-of-field effect in FIG. 18O with default settings). Applying the simulated depth-of-field effect according to default settings enables the user to reset the simulated depth-of-field effect without additional inputs to undo individual previously customized settings, thereby providing improved visual feedback to the user and/or reducing the number of inputs needed to perform an operation.

In some embodiments, editing the simulated depth-of-field effect includes: in accordance with a determination that the simulated depth-of-field effect is disabled and the representative image includes depth information, forgoing enabling the simulated depth-of-field effect (e.g., display the representation of the media item without the simulated depth-of-field effect and/or keep the simulated depth-of-field effect disabled) (e.g., do not apply and/or enable the simulated depth-of-field effect in FIG. 18O). Foregoing enabling the simulated depth-of-field effect when the simulated depth-of-field effect is disabled and the representative image includes depth information provides a more consistent appearance of the representation of the media item when the representative image is selected, avoids distracting the user, and prevents the user from having to provide additional inputs to disable the simulated depth-of-field effect, thereby providing improved visual feedback to the user, reducing the number of inputs needed to perform an operation, and/or performing an operation when a set of conditions has been met without requiring further user input.

In some embodiments, the computer system displays, via the display generation component, a representation of the set of one or more images (e.g., 1806) (e.g., a user-interactive element for selecting a key frame), including displaying one or more indicators (e.g., 1808) that identify respective images of the set of one or more images that include depth information, wherein the depth information enables the respective images to be displayed with the simulated depth-of-field effect. Displaying one or more indicators that identify respective images that include depth information enables the user to quickly and efficiently locate images that can be displayed with the simulated depth-of-field effect without having to select individual images, thereby providing improved visual feedback to the user and/or reducing the number of inputs needed to perform an operation. In some embodiments, the computer system detects, via the one or more input devices, an input (e.g., 1810T) directed to a first location (e.g., a frame next to 1806A) (e.g., a location corresponding to a representation of a first image) in the representation of the set of one or more images; and in response to detecting the input directed to the first location in the representation of the set of one or more images, the computer system selects (e.g., visually identifying, visually designating, outlining, and/or highlighting) a representation (e.g., 1806A) of an image in the set of images that includes depth information, wherein the representation of the image is located at a second location in the representation of the set of one or more images that is different from the first location in the representation of the set of one or more images. Selecting a representation of an image that is located at a different position from the location of the input enables the user to more easily select images that can be displayed with the simulated depth-of-field effect as the representation of the set of one or more images, thereby providing improved visual feedback to the user and/or reducing the number of inputs needed to perform an operation. In some embodiments, the computer system detects, via the one or more input devices, an input (e.g., 1810T) (e.g., a contact on a touch-sensitive surface, a gesture, a touch gesture, an air gesture, a speech input, movement of an input device, and/or activation of a physical button) directed to a location in the representation of the set of one or more images (e.g., 1806) that corresponds to an image that includes depth information (e.g., an input that designates different images in the set of one or more images as the input moves over time); and in response to detecting the input directed to the location in the representation of the set of one or more images that corresponds to an image that includes depth information, the computer system outputs a haptic output (e.g., 1850). Outputting a haptic output in response to detecting an input directed to the location of an image that includes depth information provides feedback to the user that the image can be displayed with the simulated depth-of-field effect and enables the user to select an image that can be displayed with the simulated depth-of-field effect more quickly and efficiently, thereby reducing the number of inputs needed to perform an operation.

In some embodiments, while an image that does not include depth information is selected as a representative image for the media item (e.g., an image without depth information is displayed as the representation of the media item) (e.g., as shown in FIG. 18N) and the simulated depth-of-field effect is disabled (e.g., as shown in FIG. 18J and/or FIG. 16M), the computer system detects, via the one or more input devices, a request to enable the simulated depth-of-field effect (e.g., selection of 1621 and/or 1804G); and in response to detecting the request to enable the simulated depth-of-field effect, the computer system displays, via the display generation component, an image that includes depth information as the representation of the media item (e.g., changing the key frame to an image that includes depth information), including displaying the image that includes depth information with the simulated depth-of-field effect. Displaying an image that includes depth information with the simulated depth-of-field effect in response to detecting a request to enable the simulated depth-of-field effect when an image that does not include depth information is currently selected as a representative image for the media item enables the user to quickly and efficiently switch to an image that is capable of being displayed with the simulated depth-of-field effect without providing additional input to select the image, thereby providing improved visual feedback to the user and/or reducing the number of inputs needed to perform an operation.

In some embodiments, in response to detecting a request (e.g., 1810H and/or 1810W) (e.g., a contact on a touch-sensitive surface, a gesture, a touch gesture, an air gesture, a speech input, movement of an input device, and/or activation of a physical button) to display respective controls for editing a representation of a respective media item: in accordance with a determination that the respective media item does not include depth information that enables display of the simulated depth-of-field effect, the computer system forgoes displaying the second control element (e.g., 1616B, 1614, 1620, and/or 1621) (e.g., displaying the first control element without displaying the second control element). In some embodiments, the computer system displays the second control element in response to detecting the request to display controls for editing the representation of the respective media item in accordance with a determination that the respective media item includes depth information that enables display of the simulated depth-of-field effect. Foregoing display of the second control element in accordance with a determination that the respective media item does not include depth information that enables display of the simulated depth-of-field effect avoids cluttering the user interface with elements that are not relevant in a particular context, prevents the user from providing erroneous inputs, and avoids mistakes, thereby providing improved visual feedback to the user, reducing the number of inputs needed to perform an operation, providing additional control options without cluttering the user interface with additional displayed controls, performing an operation when a set of conditions has been met without requiring further user input.

In some embodiments, in response to detecting a request (e.g., 1810H and/or 1810W) (e.g., a contact on a touch-sensitive surface, a gesture, a touch gesture, an air gesture, a speech input, movement of an input device, and/or activation of a physical button) to display respective controls for editing a representation of a respective media item: in accordance with a determination that the respective media item does not include a set of one or more images that are available to be displayed in a sequence of images when the representation of the respective media item is displayed via the display generation component, the computer system forgoes displaying the first control element (e.g., 1616A and/or 1806) (e.g., displaying the second control element without displaying the first control element). In some embodiments, the computer system displays the first control element in response to detecting the request to display controls for editing the representation of the respective media item in accordance with a determination that the respective media item includes a set of one or more images that are available to be displayed in a sequence of images when the representation of the respective media item is displayed via the display generation component. Foregoing display of the first control element in accordance with a determination that the respective media item does not include a set of one or more images that are available to be displayed in a sequence of images avoids cluttering the user interface with elements that are not relevant in a particular context, prevents the user from providing erroneous inputs, and avoids mistakes, thereby providing improved visual feedback to the user, reducing the number of inputs needed to perform an operation, providing additional control options without cluttering the user interface with additional displayed controls, performing an operation when a set of conditions has been met without requiring further user input.

In some embodiments, in response to detecting the request to display controls for editing the representation of the media item, the computer system concurrently displays, via the display generation component: a plurality of selectable control elements (e.g., 1616A, 1804A, 1804B, 1804C, 1804D, 1806, 1822, and/or 1621) (e.g., selectable user interface elements, user-interactive user interface elements, and/or affordances) for editing respective features (e.g., display mode, animation mode, starting frame, ending frame, and/or key frame) of the set of one or more images that are available to be displayed in the sequence of images when the representation of the media item is displayed via the display generation component; and a plurality of selectable control elements (e.g., 1612, 1614, 1616B, 1820, 1824, 1826, 634, and/or 1621) (e.g., selectable user interface elements, user-interactive user interface elements, and/or affordances) for editing respective features (e.g., an activation status, f-stop, and/or magnitude) of the simulated depth-of-field effect for the representation of the media item. Concurrently displaying a plurality of selectable control elements for editing respective features of the set of one or more images and a plurality of selectable control elements for editing respective features of the simulated depth-of-field effect enables the user to quickly and efficiently customize features of the set of one or more images and the simulated depth-of-field effect from a single user interface without providing additional user inputs to navigate to separate user interfaces, thereby reducing the number of inputs needed to perform an operation and/or providing additional control options without cluttering the user interface with additional displayed controls.

In some embodiments, in response to detecting the request to display controls for editing the representation of the media item, the computer system displays, via the display generation component, a selectable element (e.g., 1616B, 1612, and/or 1614) (e.g., a selectable user interface element, a user-interactive user interface element, and/or an affordance) for displaying one or more additional control elements (e.g., 1620, 644, and/or 634) (e.g., one or more selectable user interface elements, user-interactive user interface elements, and/or affordances) for editing the simulated depth-of-field effect for the representation of the media item (e.g., for enabling, disabling, increasing, and/or decreasing the simulated depth-of-field effect); the computer system detects, via the one or more input devices, an input (e.g., a contact on a touch-sensitive surface, a gesture, a touch gesture, an air gesture, a speech input, movement of an input device, and/or activation of a physical button) corresponding to selection of the element for displaying the one or more additional control elements for editing the simulated depth-of-field effect for the representation of the media item; and in response to detecting the input corresponding to selection of the element for displaying the one or more additional control elements for editing the simulated depth-of-field effect for the representation of the media item: the computer system displays, via the display generation component, the one or more additional control elements (e.g., 1824, 634, 1620, and/or 644) for editing the simulated depth-of-field effect for the representation of the media item; and the computer system ceases display of one or more selectable elements (e.g., 1804A, 1804B, 1804C, 1804D, 1806, and/or 1822) for editing respective features of the set of one or more images that are available to be displayed in the sequence of images when the representation of the media item is displayed via the display generation component. Displaying the one or more additional control element for editing the simulated depth-of-field effect and ceasing display of one or more selectable elements for editing the respective features of the set of one or more images enables the user to navigate the user interface and access relevant control more quickly and efficiently by displaying relevant controls and removing less relevant controls, thereby providing improved visual feedback to the user, reducing the number of inputs needed to perform an operation, and/or providing additional control options without cluttering the user interface with additional displayed controls.

In some embodiments, displaying the one or more additional control elements for editing the simulated depth-of-field effect for the representation of the media item includes displaying a selectable control element (e.g., 634) for selecting a simulated lighting effect that is applied to the representation of the media item (e.g., concurrently with the simulated depth-of-field effect); and ceasing display of one or more selectable elements for editing respective features (e.g., display mode, animation mode, starting frame, ending frame, and/or key frame) of the set of one or more images that are available to be displayed in the sequence of images when the representation of the media item is displayed via the display generation component includes ceasing display of a selectable control element (e.g., 1806) for changing a representative image of the media item and/or changing a length of the sequence of images. In some embodiments, a simulated lighting effect is applied to an image based on depth information. In some embodiments, the simulated lighting effect includes a "Natural Light" lighting effect in which a foreground region and a background region are displayed with the "Natural Light" lighting effect (e.g., using the natural lighting from the scene and/or without using any synthetic light). In some examples, the simulated lighting effect includes a "Studio Light" lighting effect, a "Contour Light" lighting effect, a "Stage Light" lighting effect, and a "Stage Light Mono" lighting effect, each of which, when applied to the representation of media item, affects a visual characteristic of the representation of media item. In some embodiments, when the computer system applies the natural lighting effect, no synthetic lighting is added to an image (e.g., the original image is displayed). In some embodiments, the studio lighting effect includes modelling of multiple discrete point-of-light sources (e.g., lights within a photography studio) positioned uniformly around the subject (e.g., creates a bright fill lighting effect). In some embodiments, the contour lighting effect includes modelling of multiple discrete point-of-light sources positioned along a circumference of a subject (e.g., creates a slimming effect, creates shadows on side of a subject's face, and/or over the subject's chin). In some embodiments, the stage light lighting effect includes modelling of a single discrete point-light-source positioned above the subject (e.g., creates a spotlight effect). In some embodiments, the stage light mono lighting effect includes modelling in black and white of a single discrete point light source positioned above the subject (e.g., creates a spotlight effect in a black and white). In some embodiments, the computer system detects a subject's face in the representation of the media item, and the computer system uses the media item's depth information and the corresponding facial features when applying a lighting effect. In some such embodiments, the lighting effect is applied with greater precision around the subject's face and certain facial features may be lighted differently based on a selected lighting effect (e.g., increasing or decreasing shadows around the subject's chin and/or cheek bones). In some examples, the media item includes depth information which includes depth contours of objects. Displaying the one or more additional control elements for editing the simulated depth-of-field effect and ceasing display of one or more selectable elements for editing the respective features of the set of one or more images enables the user to navigate the user interface and access relevant control more quickly and efficiently by displaying relevant controls and removing less relevant controls, thereby providing improved visual feedback to the user, reducing the number of inputs needed to perform an operation, and/or providing additional control options without cluttering the user interface with additional displayed controls.

Note that details of the processes described above with respect to method 1900 (e.g., FIG. 19) are also applicable in an analogous manner to the methods described below and above. For example, methods 700, 900, 1100, 1300, 1500, 1700, 2100, and/or 2300 optionally include one or more of the characteristics of the various methods described above with reference to method 1900.

FIGS. 20A-20T illustrate exemplary user interfaces for displaying a media item (e.g., a media item that includes a plurality of images and depth information), in accordance with some embodiments. The user interfaces in these figures are used to illustrate the processes described below, including the processes in FIG. 21.

In FIG. 20A, computer system 600 displays media user interface 657. Computer system 600 is described above with reference to FIGS. 6A-6U, 8A-8T, 10A-10I, 12A-12T, and 14A-14Q, 16A-16M, and 18A-18R. Embodiments and features of media user interface 657 are described in, e.g., FIGS. 6N-6Q, 16D, 16M, 18A-18H, and 18P-18Q.

Captured media 2002 is displayed in media user interface 657. Computer system 600 detects input 2010A (e.g., a tap, swipe, drag, and/or other navigation input) corresponding to a request to display captured media 1606. Captured media 1606 is described above with reference to, e.g., FIGS. 16D-16M. In response to detecting input 2010A, computer system 600 navigates (or begins to navigate) to captured media 1606. In FIG. 20B, captured media 1606 is partially displayed as captured media 1606 enters media user interface 657 from a right side of media user interface 657 as captured media 2002 is moved off of a left side of media user interface 657. Effects element 1655 and effects status indicator 1657 indicate that the portrait display mode is enabled and that a sequence of images can be displayed. In the embodiment illustrated in FIG. 20B, as captured media 1606 is entering media user interface 657, a representative frame of captured media 1606 is displayed with the simulated depth-of-field effect and a simulated lighting effect (e.g., represented by the shading applied to portions of captured media 1606 other than media capture subject 1604A).

Figures 20C, 20D, 20E:
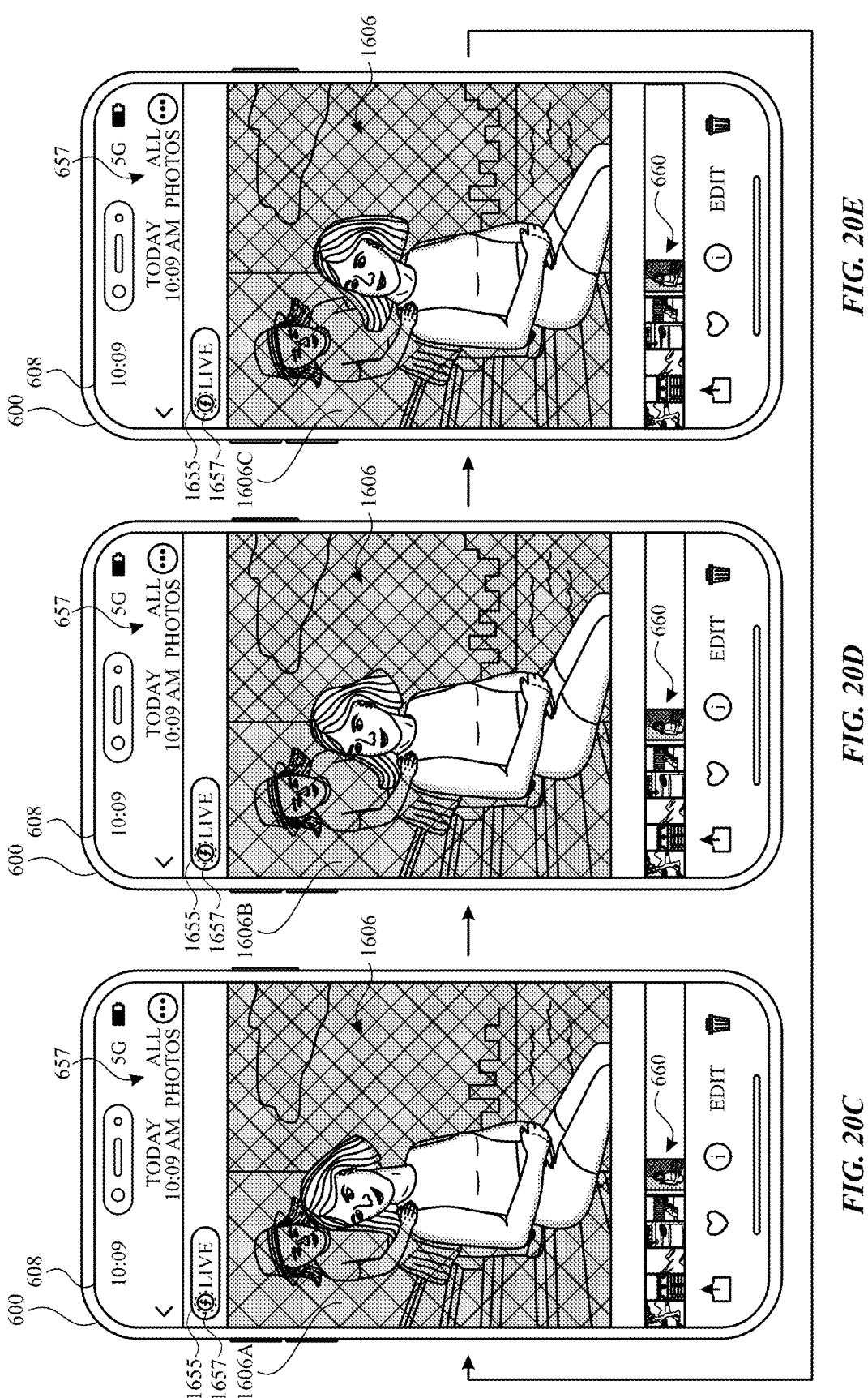
Figures 20F, 20G:
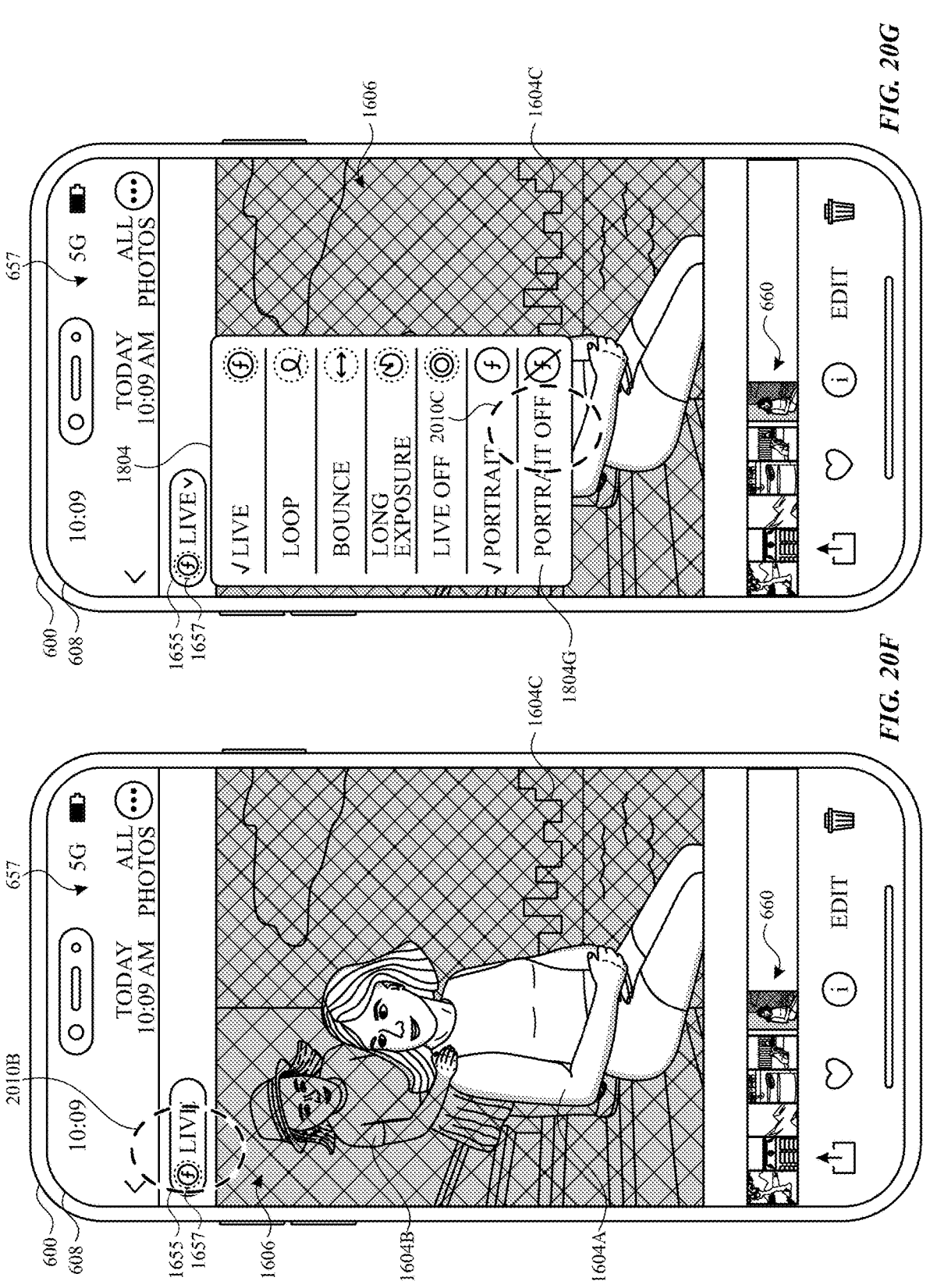

In the embodiment illustrated in FIGS. 20A-20E, the sequence of images associated with captured media 1606 is displayed in response to detecting input 2010A corresponding to the request to display captured media 1606. In some embodiments, the sequence of images begins to play as captured media 1606 is entering media user interface 657 (e.g., prior to displaying the representative frame and/or before the representative frame is entirely displayed). In some embodiments, the sequence of images begins to play after captured media 1606 is fully displayed in media user interface 657. FIGS. 20C-20E illustrate an example of displaying the sequence of images over time. FIG. 20C illustrates first frame 1606A (e.g., a starting frame) displayed in the sequence of images; FIG. 20D illustrates second frame 1606B (e.g., an intermediate frame) displayed after first frame 1606A in the sequence of images; and FIG. 20E illustrates third frame 1606C (e.g., an ending frame) displayed after second frame 1606B in the sequence of images. In some embodiments, the sequence of images includes additional frames and displaying the sequence of images includes displaying one or more images before first frame 1606A, between first frame 1606A and second frame 1606B, between second frame 1606B and third frame 1606C, and/or after third frame 1606C. As the display of the sequence of images progresses over time from FIG. 20C to FIG. 20D to FIG. 20E, the head of media capture subject 1604A tilts from left to right in media user interface 657. In the embodiment illustrated in FIGS. 20B-20F, the multi-frame photo mode is set to a first mode (e.g., a standard mode labeled as "LIVE"). Because the multi-frame photo mode is set to the first mode, after displaying the sequence of images, computer system 600 displays a representative frame (e.g., a key frame) of captured media 1606, as shown in FIG. 20F. In some embodiments, the sequence of images in FIGS. 20C-20E are displayed without the simulated depth-of-field effect and/or a simulated lighting effect, and then the representative frame is displayed with the simulated depth-of-field effect and/or a simulated lighting effect (e.g., as shown in FIG. 20F).

In FIG. 20F, computer system 600 detects input 2010B (e.g., a tap and/or other selection input) selecting effects element 1655. As shown in FIG. 20G, in response to detecting input 2010B, computer system 600 displays media display menu 1804 (e.g., as described with reference to FIG. 18B). In response to detecting input 2010C (e.g., a tap and/or other selection input) selecting display option 1804G, computer system 600 disables the simulated depth-of-field effect for captured media 1606 (and, in some embodiments, disables any simulated lighting effect selected for captured media 1606) and updates effects status indicator 1657, as shown in FIG. 20H.

Figures 20H, 20I:
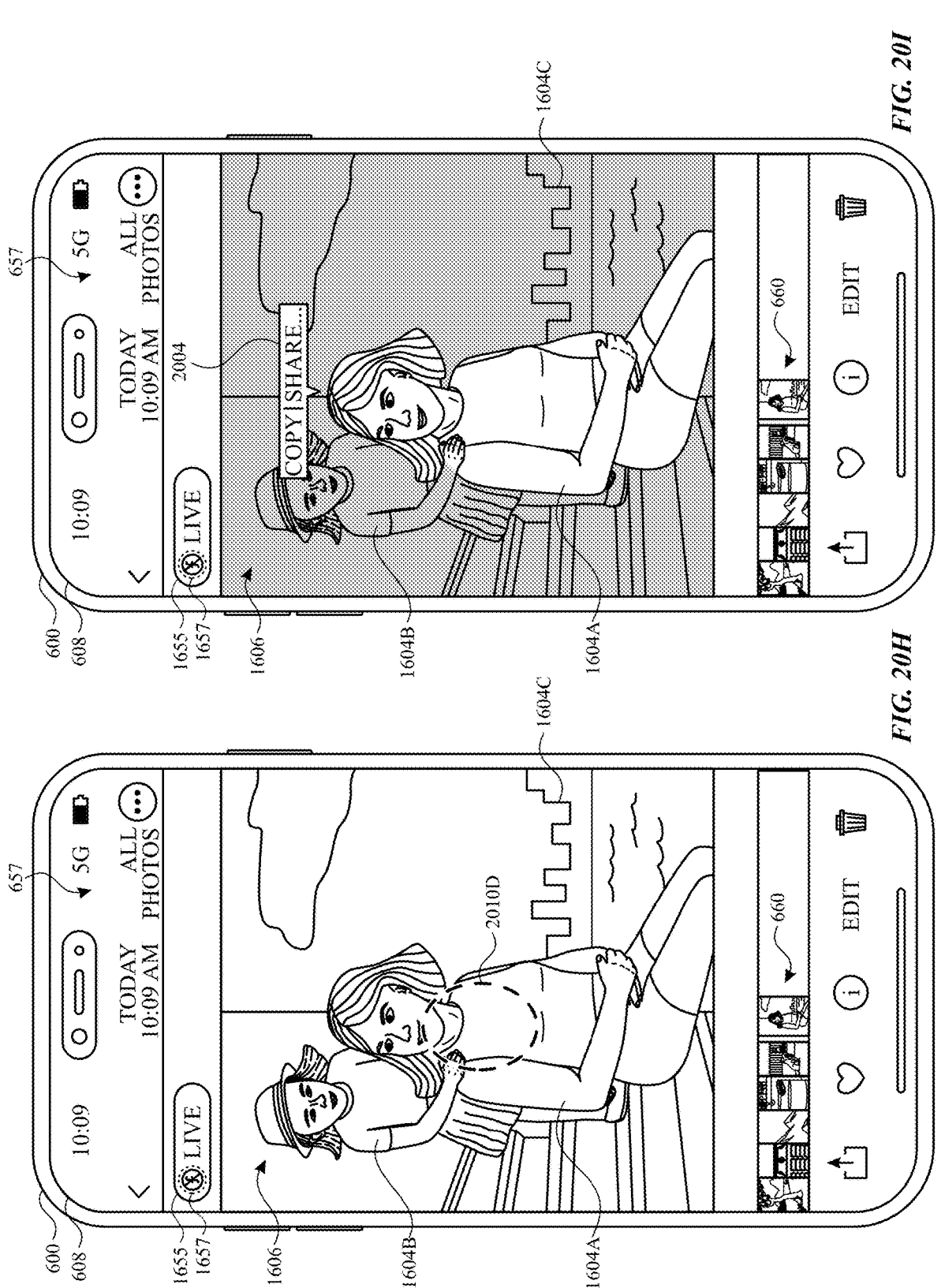
Figures 20J, 20K, 20L:
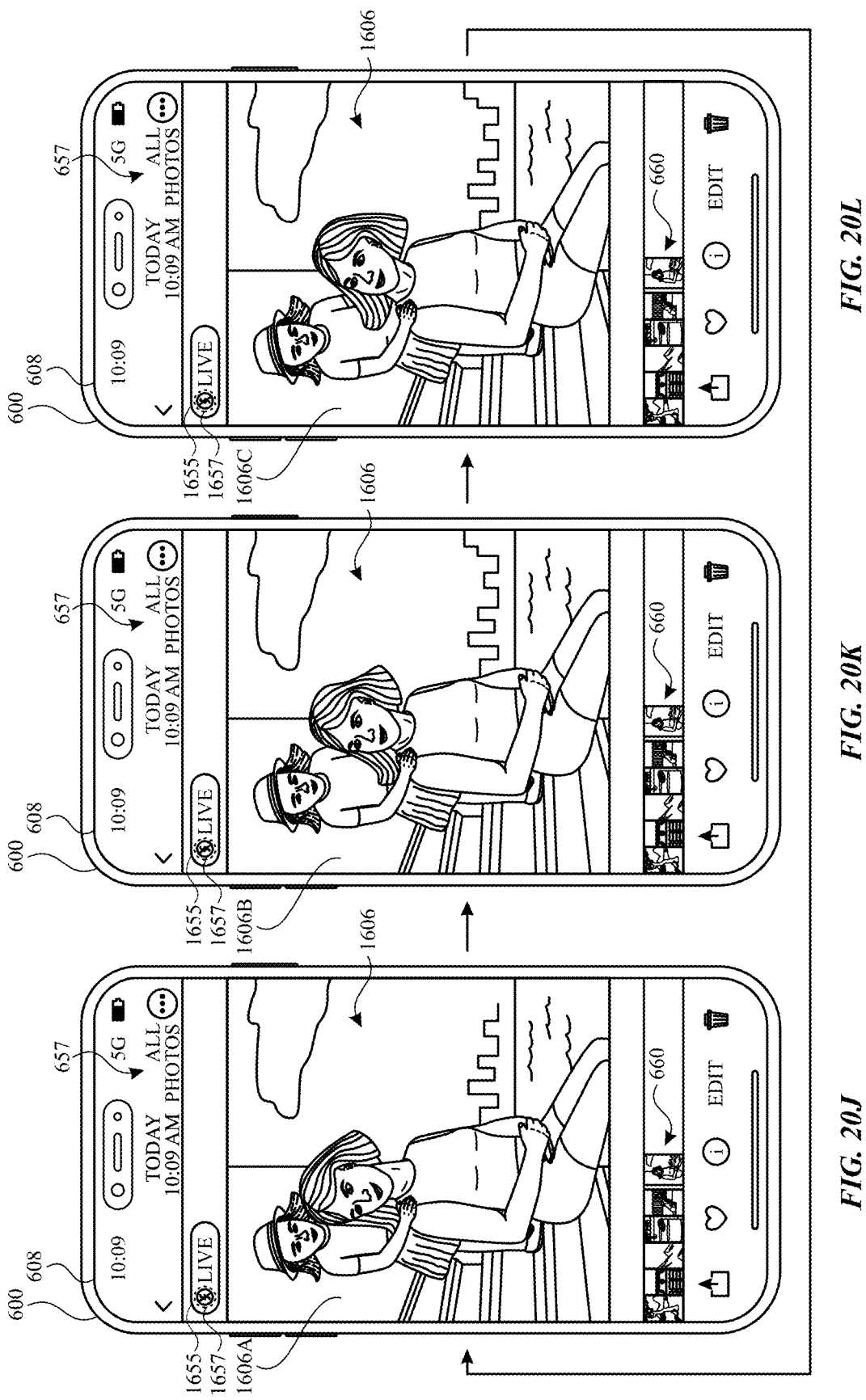

In FIG. 20H, computer system 600 detects input 2010D (e.g., a tap, press and hold, and/or other input) directed to captured media 1606. In accordance with a determination that input 2010D satisfied a first set of criteria (e.g., input 2010D is directed to media capture subject 1604A and has a duration that satisfies (e.g., is equal to and/or longer than) a threshold duration), computer system 600 visually designates media capture subject 1604A and/or displays media subject menu 2004 in response to detecting input 2010D, as shown in FIG. 20I. In some embodiments, media subject menu 2004 provides options that can be selected to copy and/or share media capture subject 1604A (e.g., as opposed to an entirety of captured media 1606). In accordance with a determination that input 2010D satisfied a second (e.g., different) set of criteria (e.g., input 2010D is not directed to a media capture subject and has a duration that satisfies (e.g., is equal to and/or longer than) a threshold duration), computer system 600 displays the sequence of images associated with captured media 1606 in response to detecting input 2010D, as shown in FIGS. 20J-20L. In the embodiment illustrated in FIGS. 20J-20L, because the simulated depth-of-field effect is disabled when input 2010D is detected, computer system 600 displays the sequence of images without the simulated depth-of-field effect and/or a lighting effect.

Figure 20M:
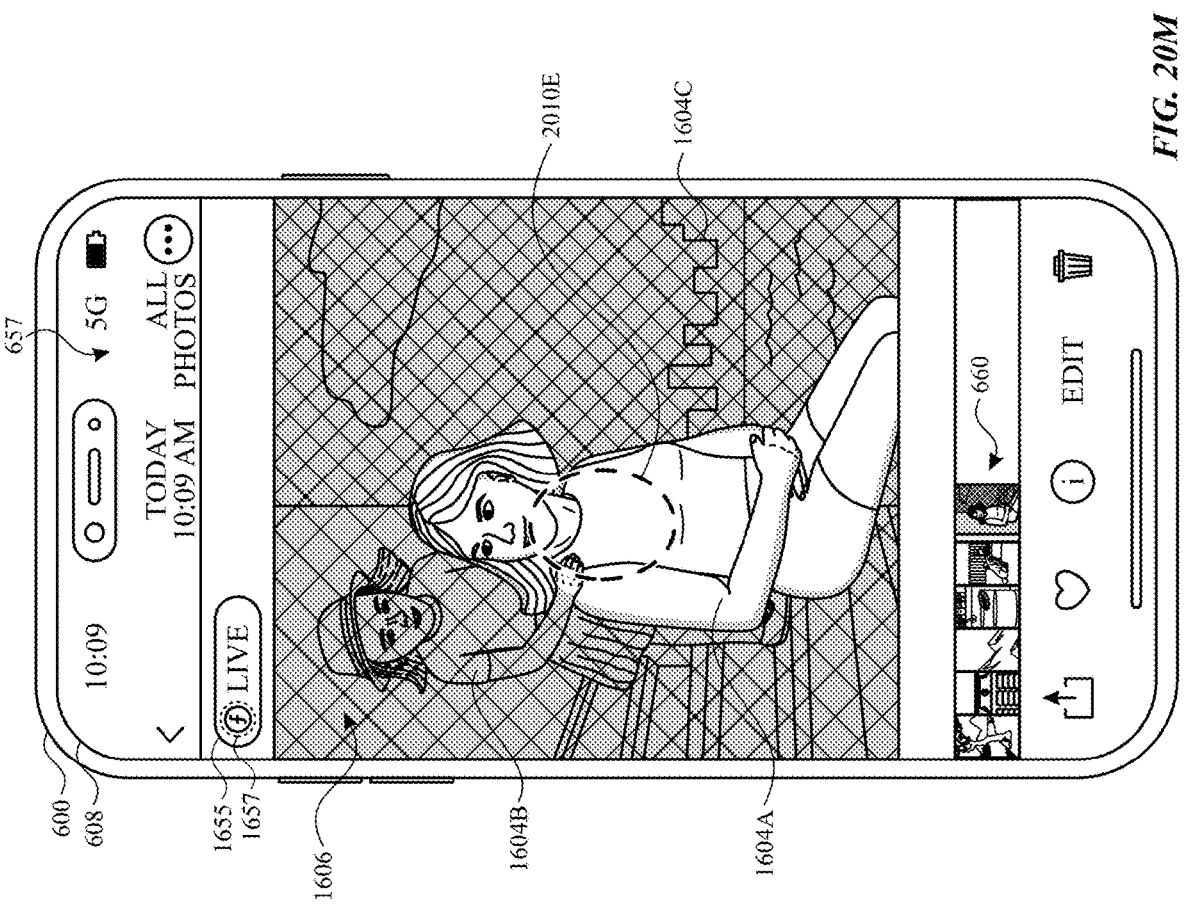
Figures 20N, 20O, 20P:
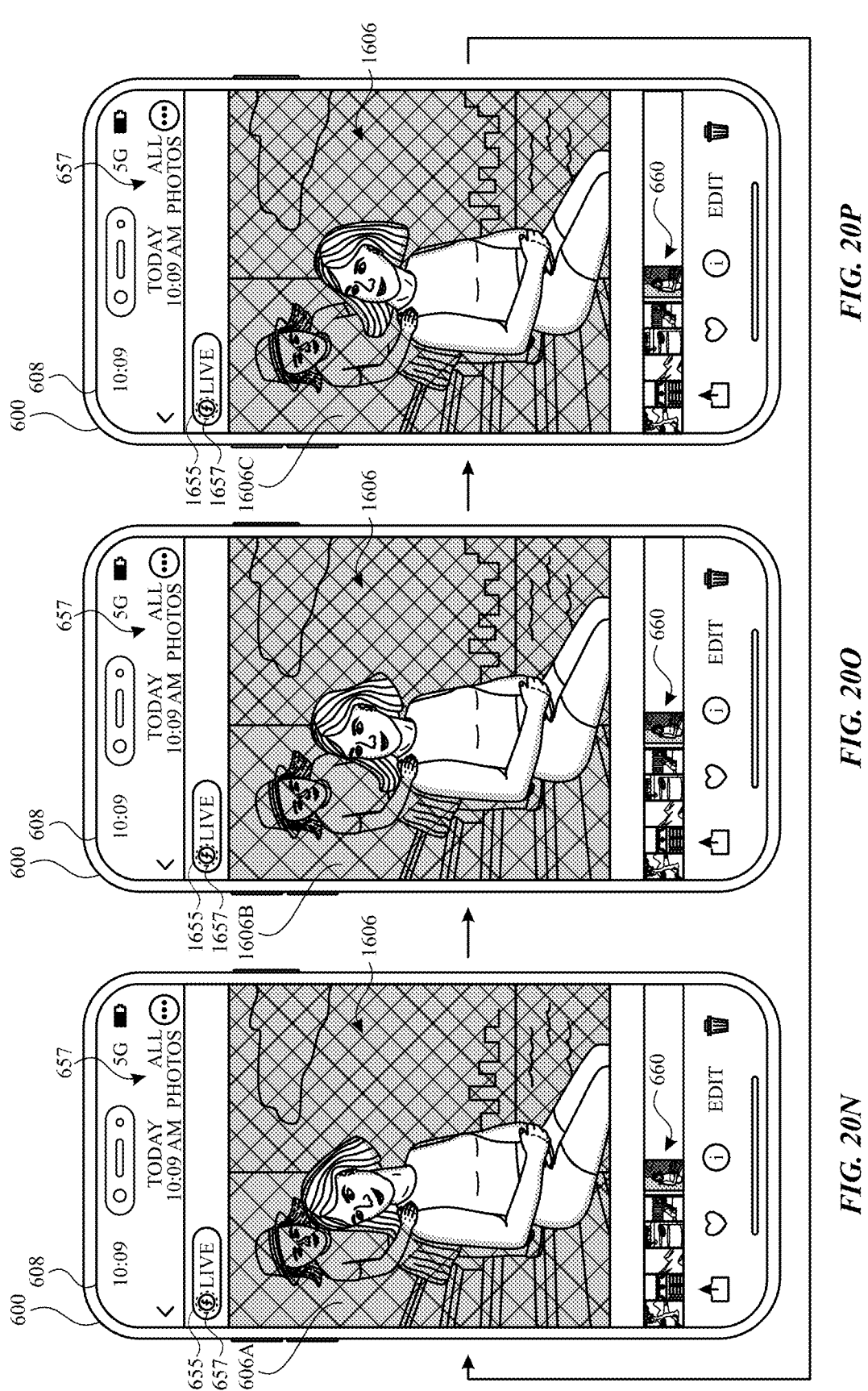

Turning to FIG. 20M, computer system 600 displays an embodiment in which captured media 1606 is displayed in media user interface 657 with the simulated depth-of-field effect and a simulated lighting effect. While displaying captured media 1606 in FIG. 20M, computer system 600 detects input 2010E (e.g., a tap, press and hold, and/or other input) directed to captured media 1606. In response to detecting input 2010E, computer system 600 displays the sequence of images associated with captured media 1606, as shown in FIGS. 20N-20P. In the embodiment illustrated in FIGS. 20N-20P, because the simulated depth-of-field effect and the simulated lighting effect are enabled when input 2010E is detected, computer system 600 displays the sequence of images with the simulated depth-of-field effect and the simulated lighting effect. In some embodiments, computer system 600 performs different operations depending on the characteristics of input 2010E (e.g., like described with reference to input 2010D and FIGS. 20H-20L).

Figure 20Q:
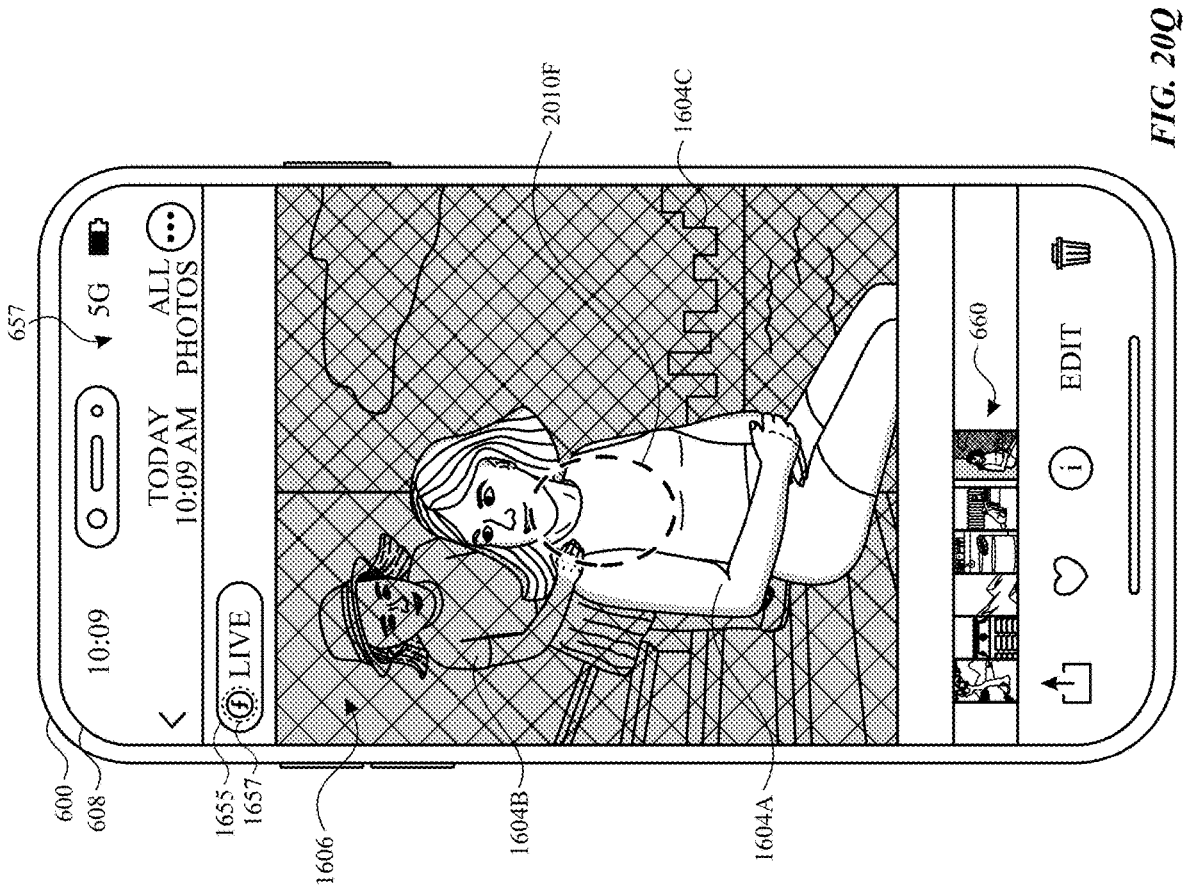
Figures 20R, 20S, 20T:
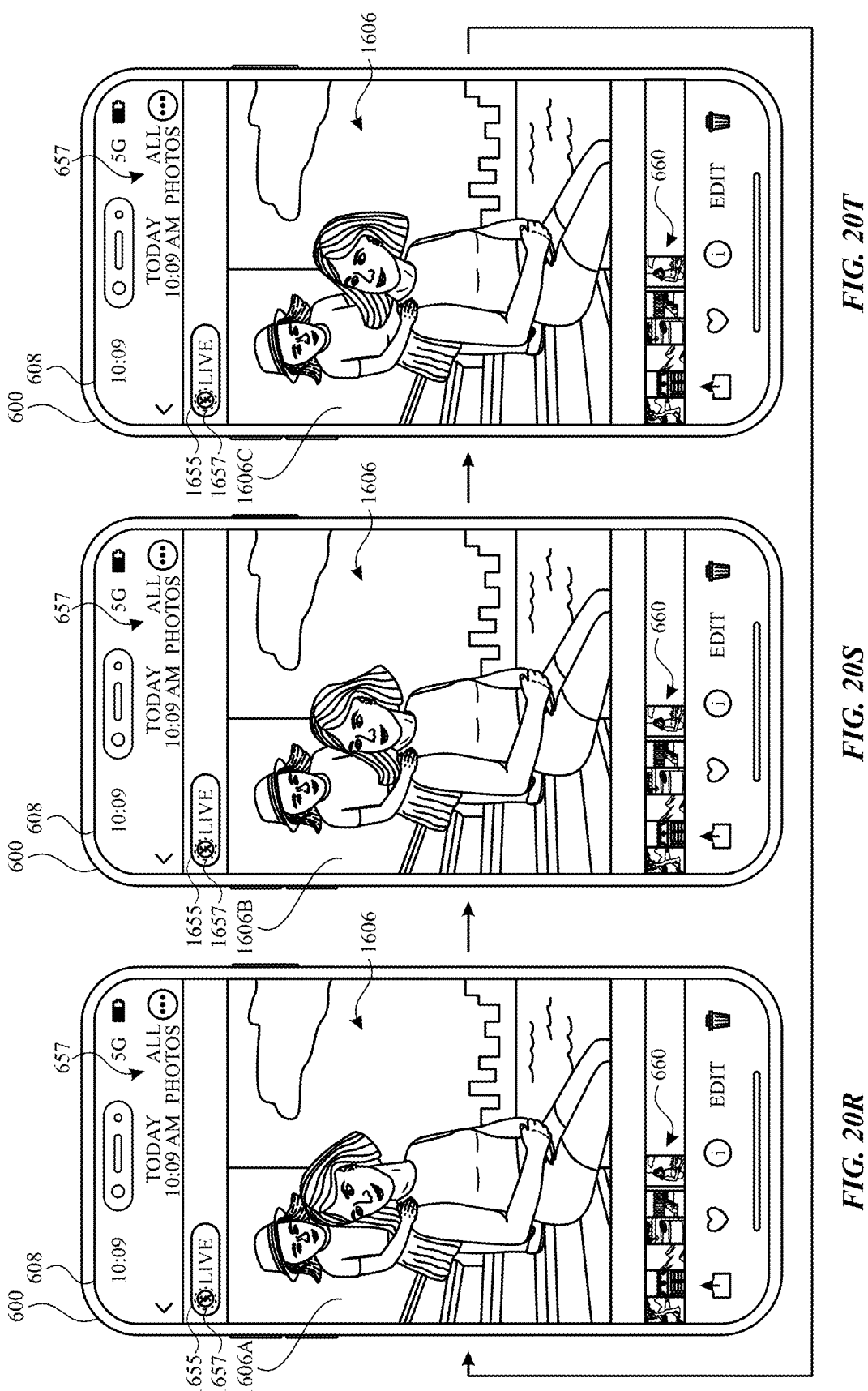

Turning to FIG. 20Q, computer system 600 displays an embodiment in which captured media 1606 is displayed in media user interface 657 with the simulated depth-of-field effect and a simulated lighting effect (e.g., similar to FIG. 20M). While displaying captured media 1606 in FIG. 20Q, computer system 600 detects input 2010F (e.g., a tap, press and hold, and/or other input) directed to captured media 1606. In response to detecting input 2010F, computer system 600 displays the sequence of images associated with captured media 1606, as shown in FIGS. 20R-20T. In the embodiment illustrated in FIGS. 20R-20T, although the simulated depth-of-field effect and the simulated lighting effect are enabled when input 2010F is detected, computer system 600 displays the sequence of images without the simulated depth-of-field effect and/or the simulated lighting effect. In some embodiments, after computer system 600 displays the sequence of images as in FIGS. 20R-20T, computer system 600 displays (e.g., re-displays) captured media 1606 with the simulated depth-of-field effect and the simulated lighting effect (e.g., as shown in FIG. 20Q). In some embodiments, computer system 600 performs different operations depending on the characteristics of input 2010F (e.g., like described with reference to input 2010D and FIGS. 20H-20L).

FIG. 21 is a flow diagram illustrating a method for displaying a media item using a computer system in accordance with some embodiments. Method 2100 is performed at a computer system (e.g., 100, 300, 500, and/or 600) that is in communication with (e.g., includes and/or is connected to) a display generation component (e.g., 608; 1800; a display controller; a touch-sensitive display system; a display (e.g., integrated and/or connected), a 3D display, a transparent display, a projector, and/or a heads-up display) and one or more input devices. In some embodiments, the one or more input devices include: a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial). In some embodiments, the computer system is in communication with (e.g., includes and/or is connected to) one or more cameras (e.g., 604A, 604B, 604C, and/or 604D), such as one or more rear (e.g., user-facing) cameras and/or one or more forward (e.g., environment-facing) cameras (e.g., a plurality of cameras with different lenses, such as a standard camera, a telephoto camera, and/or a wide-angle camera). In some embodiments, the computer system is in communication with (e.g., includes and/or is connected to) one or more sensors (e.g., one or more depth sensors). Some operations in method 2100 are, optionally, combined, the orders of some operations are, optionally, changed, and some operations are, optionally, omitted.

As described below, method 2100 provides an intuitive way for displaying a media item. The method reduces the cognitive burden on a user for displaying a media item, thereby creating a more efficient human-machine interface. For battery-operated computing devices, enabling a user to display a media item faster and more efficiently conserves power and increases the time between battery charges.

According to some embodiments, method 2100 is performed while (2102) displaying, via the display generation component, a representation of a media item (e.g., 1606) (e.g., an image, a photo, a set of photos, a sequence of photos, one or more previously captured photos, a representation of a media item, a live photo, a live image, an animated photo, an animated image, a multiple-image photo, and/or a set of one or more images that are available to be displayed in a sequence of images when the representation of the media item is displayed) that includes a simulated depth-of-field effect. In some embodiments, the representation of the media item includes a representative image (e.g., a key frame) of a set of images. In some embodiments, the simulated depth-of-field effect is based on detection of one or more subjects in the representation of the media item. In some embodiments, the simulated depth-of-field effect is based on detected or estimated depth information about objects in the representation of the media item. In some embodiments, the depth information is captured at the time the media item is captured and is associated with the media item. In some embodiments, the depth information includes a distance of an object (or a portion of an object) from a sensor (e.g., a camera or lens) or other point of reference. In some embodiments, the depth information includes a distance of an object (or a portion of an object) from another object (or portion of an object) (e.g., the relative distance between two objects or portions of objects). In some embodiments, the depth-of-field effect is based on segmentation information that separates a subject from other elements, such as foreground and/or background elements. In some embodiments, the simulated depth-of-field effect includes blurring (e.g., artificially blurring and/or adding a blurring effect to) a portion of an image that is in a foreground and/or a background relative to a subject (e.g., a detected subject and/or a designated subject) or a depth plane of the image (e.g., a simulated focal plane and/or a plane perpendicular to an optical axis). In some embodiments, the portion of the image that is blurred when the simulated depth-of-field effect is applied is not blurry when the depth-of-field effect is not applied. In some embodiments, when the simulated depth-of-field effect is applied, portions of the image that are at a different depth (e.g., along an optical axis) than the subject are blurred. In some embodiments, portions of the image that are not within a threshold depth (or range of depths) relative to the subject are blurred. In some embodiments, an amount or degree of blurring applied to a portion of an image varies based on a distance (e.g., along an optical axis) from the subject or a simulated focal plane. For example, the simulated depth-of-field effect includes applying a greater amount of blur to a portion of the image that is farther from the subject than to a portion of the image that is closer to the subject (e.g., objects in the image that are further from the subject are blurred by a greater amount than objects that are closer to the subject). The computer system detects (2104), via the one or more input devices, an input (e.g., 2010A, 2010D, 2010E, and/or 2010F) (e.g., a contact on a touch-sensitive surface, a gesture, a touch gesture, an air gesture, a speech input, movement of an input device, and/or activation of a physical button) directed toward the representation of the media item that includes the simulated depth-of-field effect. In response (2106) to detecting the input directed toward the representation of the media item, the computer system displays, via the display generation component, a plurality of images (e.g., 1606A, 1606B, and/or 1606C) (e.g., two or more captured images, a live photo, an animated photo, an animated image, and/or a multiple-image photo) corresponding to the media item, including displaying the plurality of images in a sequence over time (e.g., as shown in FIG. 20C through FIG. 20E, FIG. 20J through FIG. 20L, FIG. 20N through FIG. 20P, and/or FIG. 20R through FIG. 20T). In some embodiments, the plurality of images includes a set of images that were captured over a duration of time (e.g., 1 second, 1.5 seconds, or 2 seconds) including a first set (e.g., a first subset) of one or more images that was captured before a request to initiate capture of the plurality of images was detected and a second set (e.g., a second subset) of one or more images was captured after the request to initiate capture of the plurality of images was detected. In some embodiments, the plurality of images are saved in a file format that supports both still and animated images such as the GIF ("Graphics Interchange Format"), APNG ("Animated Portable Network Graphics"), or FLIF ("Free Lossless Image Format"). In some embodiments, the plurality of images are displayed in a sequence over time in response to detecting a user input. For example, while a representative image (e.g., a key frame) of the media item is displayed, the computer system detects an input (e.g., a selection of the representation of the media item, a tap on the representation of the media item, and/or a press and hold input on the representation of the media item); and in response to detecting the input, the computer system displays the plurality of images in a sequence over time. In some embodiments, the computer system displays at least a portion of the plurality of images in a sequence over time in response to detecting a request to display the representation of the media item (e.g., in response to switching from one media item to another in a media item album). In some embodiments, a key frame of the media item is a frame of the media item that is displayed when the media item is not being animated (e.g., when the plurality of images are not being displayed in a sequence over time). Displaying the plurality of images corresponding to the media item in a sequence over time in response to detecting an input directed toward a representation of a media item that includes a simulated depth-of-field effect enables the user to quickly and efficiently control when the plurality of images is displayed while also providing the simulated depth-of-field effect (e.g., when the plurality of images are not being displayed in a sequence over time), thereby providing improved visual feedback to the user and/or reducing the number of inputs needed to perform an operation.

In some embodiments, the input (e.g., 2010D, 2010E, and/or 2010F) directed toward the representation of the media item that includes the simulated depth-of-field effect has a duration that exceeds a predetermined (e.g., a non-zero) amount of time (e.g., a contact on a touch-sensitive surface that exceeds the predetermined amount of time and/or a touch and hold input on the representation of the media item). In some embodiments, in response to detecting the input directed toward the representation of the media item: in accordance with a determination that the input has a duration that exceeds the predetermined amount of time, the computer system displays the plurality of images corresponding to the media item in a sequence over time; in accordance with a determination that the input has a duration that does not exceed the predetermined amount of time (e.g., the input is a tap), the computer system forgoes displaying the plurality of images corresponding to the media item in a sequence over time (and, optionally, performs a different operation). For example, in accordance with a determination that the input is a tap gesture, the computer system removes display of user interface elements (e.g., selectable options for performing operations associated with the media item, such as sharing the media item, designating the media item as a favorite, deleting the media item, entering an edit mode, displaying information about the media item, selecting a different media item for display, and/or displaying options for setting features of the media item) other than the representation of the media item (e.g., displays only the representation of the media item) or displays the user interface elements other than the representation of the media item; in accordance with a determination that the input includes a double tap, the computer system zooms (e.g., in or out) the representation of the media item; in accordance with a determination that the input includes a first contact separating from a second contact (e.g., a de-pinch gesture), the computer system zooms in the representation of the media item; and in accordance with a determination that the input includes a first contact moving closer to a second contact (e.g., a pinch gesture), the computer system displays a plurality of representations of respective media items. Displaying the plurality of images in a sequence over time in response to an input that has a duration that exceeds a predetermined amount of time provides the user with greater control over when the plurality of images are displayed and enables other operations to be performed when by inputs with a duration that does not exceed the predetermined amount of time, thereby providing improved visual feedback to the user, reducing the number of inputs needed to perform an operation, and/or providing additional control options without cluttering the user interface with additional displayed controls.

In some embodiments, the input (e.g., 2010A) directed toward the representation of the media item that includes the simulated depth-of-field effect includes a request to navigate from a representation of another media item (e.g., 2002) to the representation of the media item (e.g., 1606) (e.g., a request to navigate between media items, a swipe gesture, and/or a drag gesture) (e.g., as described with reference to FIGS. 20A-20B). Displaying the plurality of images in response to a request to navigate from a representation of another media item to the representation of the media item informs the user that the media item includes the plurality of images and that the plurality of images are available to be displayed when the representation of the media item is selected, thereby providing improved visual feedback to the user and/or reducing the number of inputs needed to perform an operation.

In some embodiments, in response to detecting the input directed toward the representation of the media item: after displaying the plurality of images in the sequence over time, the computer system displays, via the display generation component, the representation of the media item with the simulated depth-of-field effect (e.g., as shown in FIG. 20F). Displaying the representation of the media item with the simulated depth-of-field effect after displaying the plurality of images automatically provides the user with the simulated depth-of-field effect when the representation of the media item is selected without having to provide additional inputs to display both the plurality of images and the simulated depth-of-field effect, thereby providing improved visual feedback to the user and reducing the number of inputs needed to perform an operation.

In some embodiments, while displaying a representation of a first media item (e.g., the media item or a media item different from said media item), the computer system detects, via the one or more input devices, a request (e.g., 2010A) (e.g., a contact on a touch-sensitive surface, a gesture, a touch gesture, an air gesture, a speech input, movement of an input device, and/or activation of a physical button) to display a representation of a second media item that is different from the first media item; and in response to detecting the request to display the representation of the second media item: in accordance with a determination that the second media item does not include the simulated depth-of-field effect, the computer system displays, via the display generation component, a plurality of images (e.g., 1606A, 1606B, and/or 1606C in FIGS. 20J-20L) (e.g., two or more captured images, a live photo, an animated photo, an animated image, and/or a multiple-image photo) corresponding to the second media item, including displaying the plurality of images corresponding to the second media item in a sequence over time; and in accordance with a determination that the second media item includes the simulated depth-of-field effect, the computer system displays, via the display generation component, the representation of the second media item without displaying the plurality of images corresponding to the second media item in the sequence over time (e.g., display 1606 as in FIG. 20F without displaying 1606A, 1606B, and/or 1606C as shown in FIGS. 20C-20E). Displaying the plurality of images of the second media item or displaying the representation of the second media item without displaying the plurality of images based on whether the second media item includes the simulated depth-of-field effect indicates to the user whether the media item includes the simulated depth-of-field effect without requiring additional input, thereby providing improved visual feedback to the user, reducing the number of inputs needed to perform an operation, and/or performing an operation when a set of conditions has been met without requiring further user input.

In some embodiments, displaying the plurality of images (e.g., 1606a, 1606B, and/or 1606C) corresponding to the media item includes displaying (e.g., switching and/or cross-fading to) a representation of the media item that does not include the simulated depth-of-field effect (e.g., 1606 as shown in FIG. 20H), wherein displaying the plurality of images in the sequence over time includes displaying the plurality of images without the simulated depth-of-field effect (e.g., without displaying images of the media item that include depth information) (e.g., as shown in FIGS. 20J-20L and/or FIGS. 20R-20T). In some embodiments, the plurality of images displayed in the sequence over time includes an image that includes depth information (e.g., an image to which the simulated depth-of-field effect can be applied). Displaying the plurality of images without the simulated depth-of-field effect when the representation of the media item does not include the simulated depth-of-field effect indicates to the user that the simulated depth-of-field effect is not available for the media item when the representation of the media item is selected without requiring additional input, thereby providing improved visual feedback to the user and/or reducing the number of inputs needed to perform an operation. In some embodiments, displaying the plurality of images corresponding to the media item includes displaying the plurality of images without a simulated lighting effect associated with the media item (e.g., as shown in FIGS. 20J-20L and/or FIGS. 20R-20T) (e.g., the representation of the media item is displayed with the simulated lighting effect when the plurality of images corresponding to the media item are not being displayed in the sequence over time). Displaying the plurality of images without a simulated lighting effect indicates to the user that a simulated lighting effect is not available for the media item when the representation of the media item is selected without requiring additional user input, thereby providing improved visual feedback to the user and/or reducing the number of inputs needed to perform an operation.

In some embodiments, displaying the plurality of images in the sequence over time includes displaying two or more images that include the simulated depth-of-field effect (e.g., as shown in FIGS. 20C-20E and/or FIGS. 20N-20P). In some embodiments, most or all of the plurality of images displayed in the sequence over time include the simulated depth-of-field effect. In some embodiments, at least one image before a key frame of the plurality of images includes the simulated depth-of-field effect. Displaying two or more images that include the simulated depth-of-field effect when the plurality of images is displayed provides the user with an enhanced visual experience by providing additional visual effects that are available for the media item when the representation of the media item is selected without requiring additional input, thereby providing improved visual feedback to the user and/or reducing the number of inputs needed to perform an operation. In some embodiments, displaying the plurality of images in the sequence over time includes displaying two or more images that include a simulated lighting effect (e.g., as shown in FIGS. 20C-20E and/or FIGS. 20N-20P). In some embodiments, most or all of the plurality of images displayed in the sequence over time include the simulated lighting effect. In some embodiments, at least one image before a key frame of the plurality of images includes the simulated lighting effect. Displaying two or more images that include a simulated lighting effect when the plurality of images is displayed informs the user that the simulated lighting effect is available for the media item when the representation of the media item is selected without requiring additional user input, thereby providing improved visual feedback to the user and/or reducing the number of inputs needed to perform an operation.

In some embodiments, displaying the plurality of images in the sequence over time includes: in accordance with a determination that the simulated depth-of-field effect is enabled (e.g., as shown in FIG. 20M), displaying a set of two or more images with a blurring effect applied to a background of the images (e.g., as shown in FIGS. 20N-20P); and in accordance with a determination that the simulated depth-of-field effect is disabled (e.g., as in FIG. 20H), displaying the set of two or more images without the blurring effect applied to the background of the images (e.g., as shown in FIGS. 20J-20L). Displaying a set of two or more images with or without a blurring effect when displaying the plurality of images depending on whether the simulated depth-of-field effect is enabled provides the user with control over the manner in which the plurality of images is displayed and indicates the state of the media item without requiring additional user input, thereby providing improved visual feedback to the user, reducing the number of inputs needed to perform an operation, and/or performing an operation when a set of conditions has been met without requiring further user input.

In some embodiments, displaying the plurality of images includes displaying two or more images of the plurality of images with a blurring effect applied to a background of the two or more images of the plurality of images (e.g., as shown in FIGS. 20C-20E and/or FIGS. 20N-20P). Displaying two or more images of the plurality of images with a blurring effect applied to a background when the plurality of images is displayed provides the user with an enhanced display of the plurality of images and indicates to the user that the representation of the media item can be displayed with the blurring effect, thereby providing improved visual feedback to the user and/or reducing the number of inputs needed to perform an operation. In some embodiments, displaying the two or more images of the plurality of images includes displaying the two or more images of the plurality of images with a simulated lighting effect (e.g., concurrently with the simulated depth-of-field effect) (e.g., as shown in FIGS. 20C-20E and/or FIGS. 20N-20P). Displaying the two or more images of the plurality of images with a simulated lighting effect provides the user with an enhanced display of the plurality of images and indicates to the user that the representation of the media item can be displayed with the simulated lighting effect, thereby providing improved visual feedback to the user and/or reducing the number of inputs needed to perform an operation.

In some embodiments, while displaying the representation of the media item (e.g., while displaying the plurality of images in the sequence over time), the computer system displays, via the display generation component, a media item status indicator (e.g., 674, 1655, and/or 1657) (e.g., a user-interactive graphical element that has an appearance that is based on a status of the media item); the computer system detects, via the one or more input devices, an input (e.g., 2010B, 1610D, 1810A, 1810C, 1810F, and/or 1810V) (e.g., a contact on a touch-sensitive surface, a gesture, a touch gesture, an air gesture, a speech input, movement of an input device, and/or activation of a physical button) directed to the media item status indicator; and in response to detecting the input directed to the media item status indicator, the computer system displays, via the display generation component, a set of one or more selectable control elements (e.g., one or more selectable user interface elements, user-interactive user interface elements, and/or affordances) for changing a manner in which the plurality of images is displayed without editing the representation of the media item. Displaying the set of one or more selectable control elements in response to an input directed to a media item status indicator provides the user with a control element that both provides information about the media item and provides additional controls, reducing the number of inputs needed to perform an operation and/or providing additional control options without cluttering the user interface with additional displayed controls.

In some embodiments, prior to displaying the representation of the media item that includes the simulated depth-of-field effect and while displaying (e.g., in a camera application), via the display generation component, a live preview (e.g., 612) of images captured by one or more cameras (e.g., 604A, 604B, 604C, and/or 604D) of the computer system, wherein the live preview does not include the simulated depth-of-field effect (e.g., while the computer system is in a standard photo capture mode) (e.g., displaying 612 in FIGS. 16A-16B without the simulated depth-of-field effect), the computer system detects, via the one or more input devices, a request (e.g., 1610B) (e.g., a contact on a touch-sensitive surface, a gesture, a touch gesture, an air gesture, a speech input, movement of an input device, and/or activation of a physical button) to capture one or more images (e.g., the media item) using the one or more cameras of the computer system; and in response to detecting the request to capture the one or more images, the computer system captures, using the one or more cameras, a plurality of images (e.g., a burst of photos) (e.g., 1606A, 1606B, and/or 1606C) and depth information about physical elements in a field of view of the one or more cameras (e.g., the computer system captures multiple images and depth information while in a standard photo capture mode). In some embodiments, the computer system captures images and depth information while displaying a live preview of a field of view of the one or more cameras and saves the images and depth information that is associated with a key frame of the plurality of images captured in response to detecting the request to capture the one or more images. Capturing a plurality of images and depth information in response to detecting a request while displaying a live preview that does not include the simulated depth-of-field effect enables the user to quickly and efficiently capture information that enables the representation of the media item to be displayed with the simulated depth-of-field effect (e.g., after the media item is captured) without obscuring portions of the field of view of the one or more cameras that are blurred by the simulated depth-of-field effect while preparing to capture the media item, thereby reducing the number of inputs needed to perform an operation and/or providing additional control options without cluttering the user interface with additional displayed controls.

In some embodiments, prior to displaying the representation of the media item that includes the simulated depth-of-field effect and while displaying (e.g., in a camera application), via the display generation component, a live preview (e.g., 612) of images captured by one or more cameras of the computer system, wherein the live preview include the simulated depth-of-field effect based on depth information captured by the one or more cameras (e.g., while the computer system is in a photo capture mode dedicated to capturing photos that include depth information for applying the simulated depth-of-field effect), the computer system detects, via the one or more input devices, a request (e.g., 1610B) (e.g., a contact on a touch-sensitive surface, a gesture, a touch gesture, an air gesture, a speech input, movement of an input device, and/or activation of a physical button) to capture one or more images (e.g., the media item) using the one or more cameras of the computer system; and in response to detecting the request to capture the one or more images, the computer system captures, using the one or more cameras, a single image (e.g., only 1606B) and depth information about physical elements in a field of view of the one or more cameras. In some embodiments, in response to detecting the request to capture the one or more images: in accordance with a determination that a first mode (e.g., a live photo capture mode and/or a burst mode) is enabled (e.g., as described with reference to FIG. 16B), the computer system captures a plurality of images and depth information about physical element in a field of view of the one or more cameras; and in accordance with a determination that the first mode is disabled (e.g., as in FIG. 16A), the computer system captures a single image and depth information about physical elements in the field of view of the one or more cameras. In some embodiments, while displaying the live preview of images captured by the one or more cameras of the computer system with the simulated depth-of-field effect (e.g., while the computer system is in a first image capture mode in which the computer system captures a media item to which the simulated depth-of-field effect can be applied), the computer system displays selectable control elements for adjusting an appearance of the images captured by the one or more cameras (e.g., for applying and/or selecting a simulated lighting effect and/or adjusting a magnitude and/or intensity of the simulated depth-of-field effect) that are not displayed when the computer system is in a different image capture mode (e.g., a mode in which the computer system captures images to which the simulated depth-of-field effect cannot be applied and/or a mode in which the live preview of images captured by the one or more cameras of the computer system is displayed without the simulated depth-of-field effect). In some embodiments, in accordance with a determination that the computer system is enabled to capture a media item to which the simulated depth-of-field effect can be applied, the computer system forgoes displaying an option to enable an ability to capture a plurality of images (e.g., to capture a live photo). Displaying a live preview with the simulated depth-of-field effect and then capturing a single image and depth information about the physical elements in response to detecting the request to capture the one or more images indicates to the user that a plurality of images will not be captured and saves memory resources by not capturing additional images, thereby providing improved visual feedback to the user and/or reducing the number of inputs needed to perform an operation.

Note that details of the processes described above with respect to method 2100 (e.g., FIG. 21) are also applicable in an analogous manner to the methods described below and above. For example, methods 700, 900, 1100, 1300, 1500, 1700, 1900, and/or 2300 optionally include one or more of the characteristics of the various methods described above with reference to method 2100.

FIGS. 22A-22AL illustrate exemplary user interfaces for controlling a zoom level of a camera, in accordance with some embodiments. The user interfaces in these figures are used to illustrate the processes described below, including the processes in FIG. 23.

In FIG. 22A, computer system 600 displays camera settings user interface 2200. Computer system 600 is described above with reference to, e.g., FIGS. 6A-6U, 8A-8T, 10A-10I, 12A-12T, and 14A-14Q, 16A-16M, 18A-18R, and 20A-20T. Camera settings user interface 2200 displays zoom level option 2202A and zoom level option 2202B. Zoom level option 2202A corresponds to a lens with a focal length (e.g., a physical focal length, a focal length equivalent, or a simulated focal length) of 28 millimeters and a zoom level (e.g., a physical or digital zoom level) of 1.2×. The zoom level corresponding to zoom level option 2202A is sometimes referred to herein as the 28 mm lens equivalent zoom level. Zoom level option 2202B corresponds to a lens with a focal length (e.g., a physical focal length, a focal length equivalent, or a simulated focal length) of 35 millimeters and a zoom level (e.g., a physical or digital zoom level) of 1.5×. The zoom level corresponding to zoom level option 2202B is sometimes referred to herein as the 35 mm lens equivalent zoom level. Zoom level option 2202A and zoom level option 2202B can be selected (e.g., via a tap and/or other selection input) to enable and disable snapping to the respective zoom levels. For example, when option 2202A is selected (e.g., in the ON state), then snapping to the zoom level corresponding to a focal length equivalent of 28 mm (e.g., the 28 mm lens equivalent zoom level) is enabled; and when option 2202A is deselected (e.g., in the OFF state), then snapping to the zoom level corresponding to a focal length of 28 mm is disabled. In FIG. 22A, the 28 mm lens equivalent zoom level and the 35 mm lens equivalent zoom level are both selected, as indicated by zoom level option 2202A and zoom level option 2202B both being selected (e.g., in the ON state).

Camera settings user interface 2200 includes default zoom level options 2204A-2204C for selecting a default zoom level. Default zoom level option 2204A corresponds to a lens with a focal length (e.g., a physical focal length, a focal length equivalent, or a simulated focal length) of 24 millimeters and a zoom level (e.g., a physical or digital zoom level) of 1× (e.g., a zoom level that serves as a reference for other lenses and/or zoom levels, such as the zoom levels associated with zoom level option 2202A and zoom level option 2202B). The zoom levels corresponding to default zoom level option 2204A is referred to as the 24 mm lens equivalent zoom level. In some embodiments, the zoom level corresponding to default zoom level option 2204A is a predetermined zoom level that cannot be selected and/or deselected by the user. Default zoom level option 2204B corresponds to the zoom level associated with zoom level option 2202A. Default zoom level option 2204C corresponds to the zoom level associated with zoom level option 2202B. In FIG. 22A, the zoom level corresponding to default zoom level option 2204A is selected as the default zoom level. In some embodiments, default zoom level option 2204B is displayed and/or available to be selected because corresponding zoom level option 2202A is selected, and default zoom level option 2204C is displayed and/or available to be selected because corresponding zoom level option 2202B is selected. In some embodiments, when zoom level option 2202A is deselected, computer system 600 displays camera settings user interface 2200 without default zoom level option 2204B and/or with default zoom level option 2204B being unavailable to be selected; and when zoom level option 2202B is deselected, computer system 600 displays camera settings user interface 2200 without default zoom level option 2204C and/or with default zoom level option 2204C being unavailable to be selected.

Figures 22C, 22D:
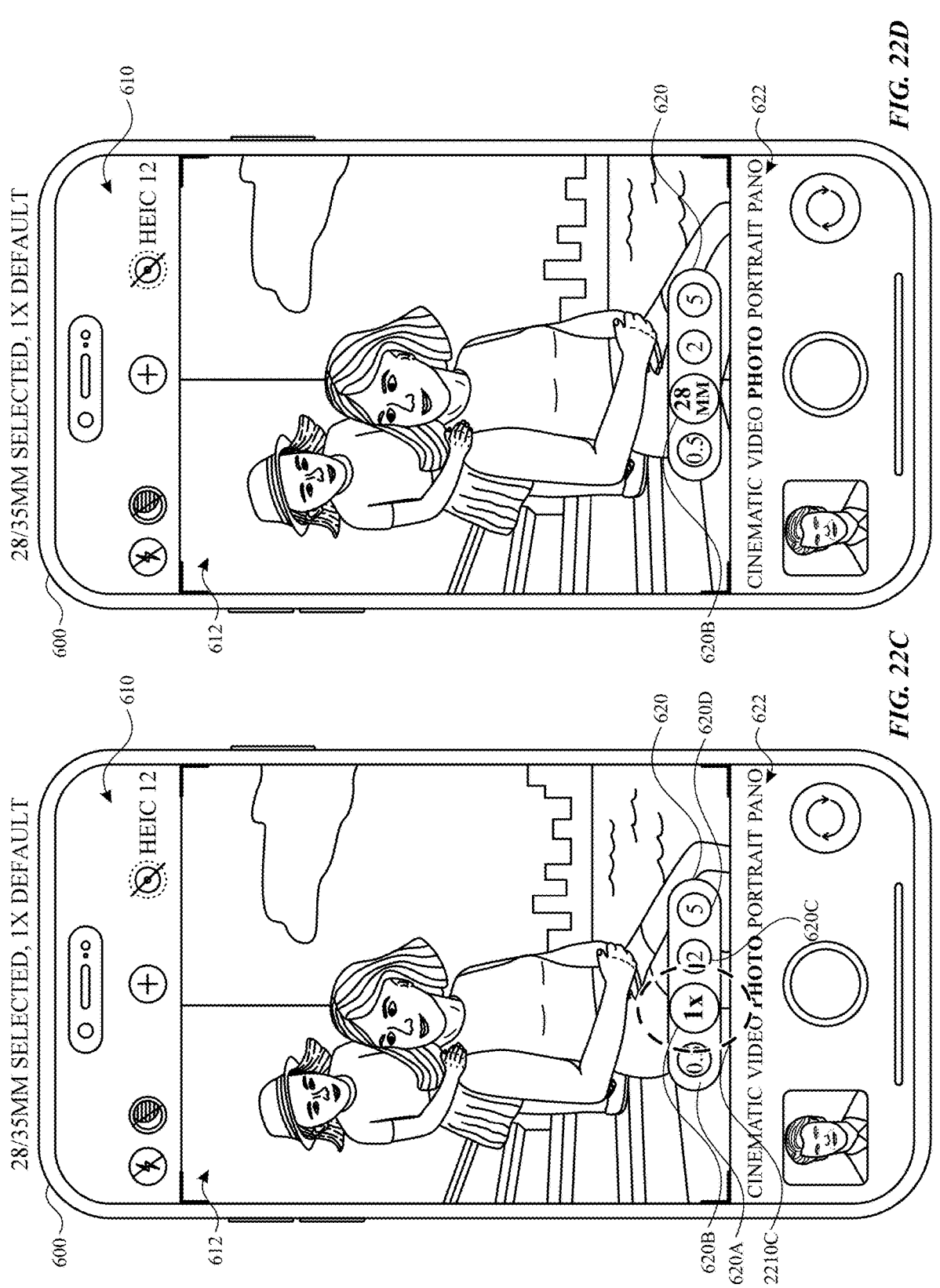

In response to detecting input 2210A (e.g., a tap, swipe, and/or other input) corresponding to a request to navigate away from camera settings user interface 2200, computer system 600 displays application selection user interface 2206 (e.g., a home screen), as shown in FIG. 22B. In FIG. 22B, computer system 600 detect input 2210B (e.g., a tap and/or other selection input) selecting camera application icon 2212. In response to detecting input 2210B, computer system 600 displays camera user interface 610 as shown in FIG. 22C. Embodiments and features of camera user interface 610, including, e.g., camera preview 612 and zoom affordance 620, are described above with reference to FIGS. 6B-6M, 6R, 6T, 6U, 8D-8T, 10A-10I, 14A-14O, and 16A-16B. Camera user interface 610 includes zoom affordance 620. In the embodiment illustrated in FIG. 22C, zoom affordance 620 includes zoom level controls 620A-620D corresponding to respective zoom levels and/or equivalent lenses. In FIG. 22C, zoom level control 620A, zoom level control 620C, and zoom level control 620D correspond to preset zoom levels. Zoom level control 620B can correspond to multiple zoom levels and/or equivalent lenses depending on the settings selected in camera settings user interface 2200.

In FIG. 22C, when camera user interface 610 is displayed (e.g., initially displayed), because the 24 mm lens equivalent zoom level corresponding to default zoom level option 2204A was selected in camera settings user interface 2200, the zoom level for media capture is set to the zoom level (e.g., 1×) of the 24 mm lens equivalent zoom level, as indicated by zoom level control 620B, and camera preview 612 is displayed with a 1× magnification.

Figures 22E, 22F:
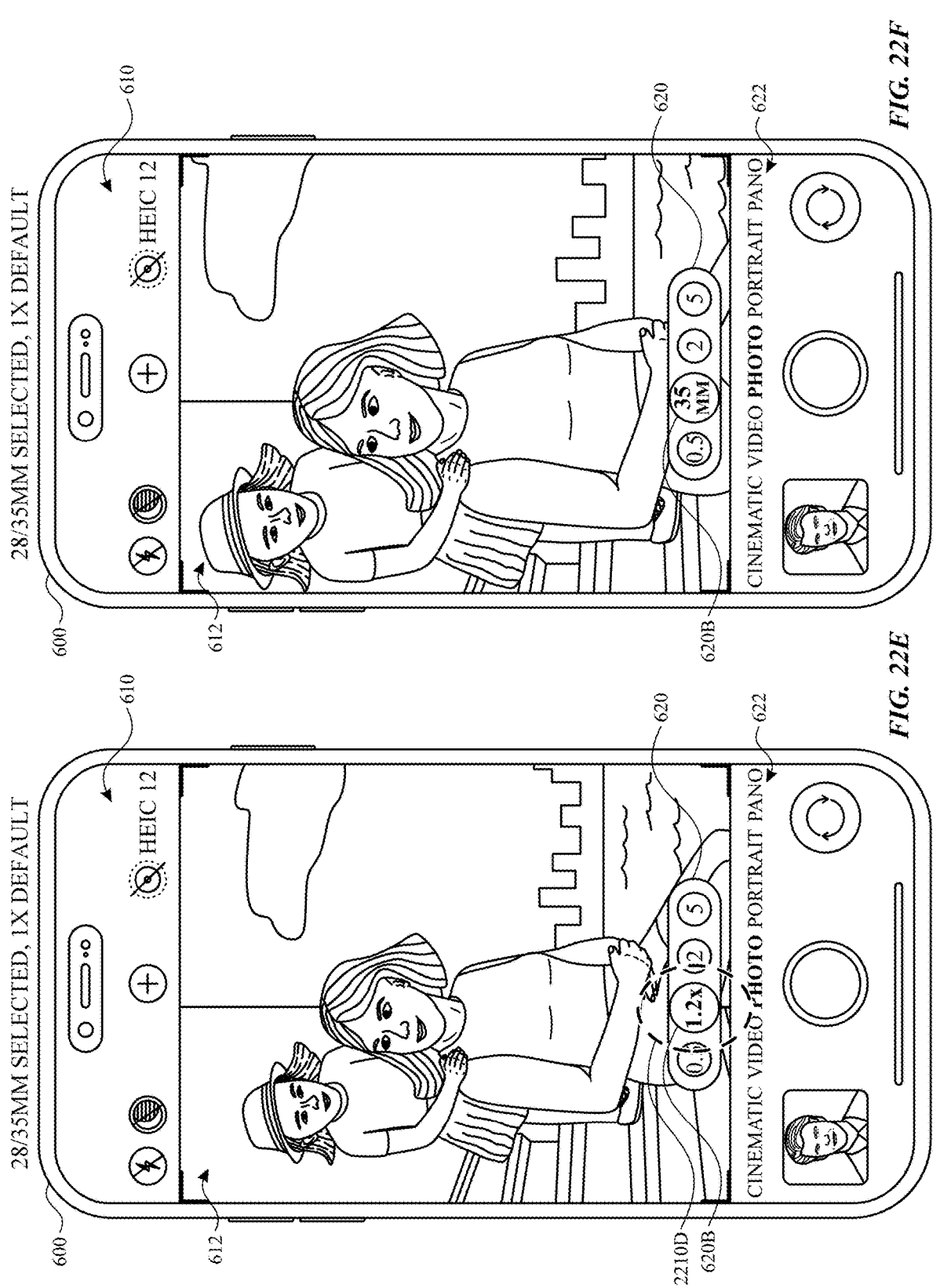

In FIG. 22C, computer system 600 detects input 2210C (e.g., a tap and/or other selection input) selecting zoom level control 620B. In response to detecting input 2210C, computer system 600 changes the zoom level for media capture based on the settings selected in camera settings user interface 2200. As shown in FIG. 22D, because the 28 mm lens equivalent zoom level is selected, computer system 600 changes to the 28 mm lens equivalent zoom level for media capture, displays an indication (e.g., "28 MM") of the 28 mm lens equivalent zoom level in zoom level control 620B, and zooms camera preview 612 to 1.2× magnification in response to detecting input 2210C. In FIG. 22D, computer system 600 initially displays the indication of the 28 mm lens equivalent zoom level as a representation of the corresponding focal length. After displaying the indication of the 28 mm lens equivalent zoom level as a representation of the focal length (e.g., for a predetermined amount of time), computer system 600 updates the appearance of zoom level control 620B to display a representation of the zoom level (e.g., 1.2×) associated with the 28 mm lens equivalent zoom level, as shown in FIG. 22E. In some embodiments, computer system 600 updates the appearance of the zoom level control 620B from FIG. 22D to FIG. 22E without user input (e.g., automatically).

Figures 22G, 22H:
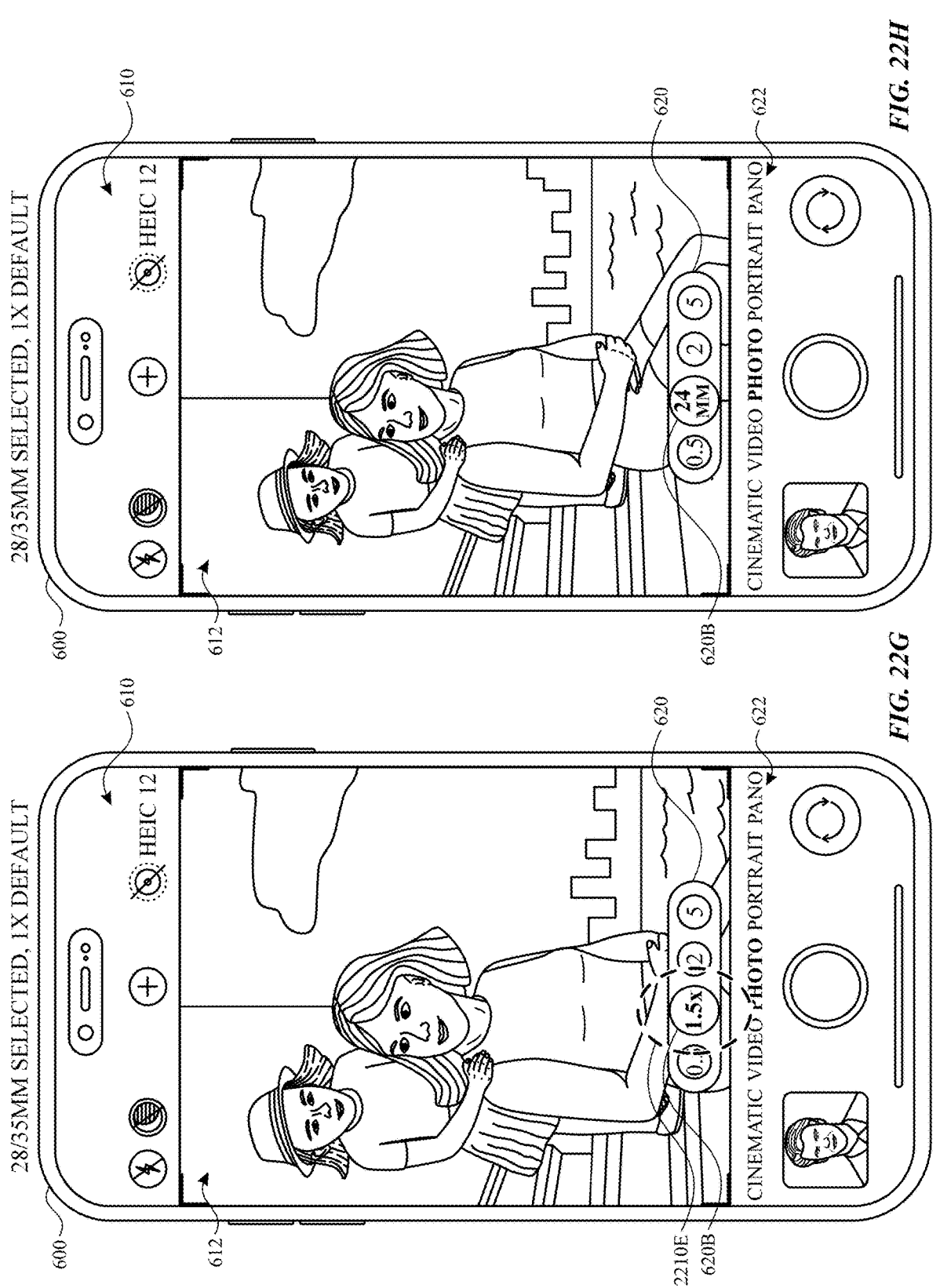

In FIG. 22E, while the zoom level for media capture is set to the zoom level for the 28 mm lens equivalent zoom level, computer system 600 detects input 2210D (e.g., a tap and/or other selection input) selecting zoom level control 620B. In response to detecting input 2210D, computer system 600 changes the zoom level for media capture based on the settings selected in camera settings user interface 2200. As shown in FIG. 22F, because the 35 mm lens equivalent zoom level is selected, computer system 600 changes to the 35 mm lens equivalent zoom level for media capture, displays an indication (e.g., "35 MM") of the 35 mm lens equivalent zoom level in zoom level control 620B, and zooms camera preview 612 to 1.5× magnification in response to detecting input 2210D. In FIG. 22F, computer system 600 initially displays the indication of the 35 mm lens equivalent zoom level as a representation of the corresponding focal length. After displaying the indication of the 35 mm lens equivalent zoom level as a representation of the focal length (e.g., for a predetermined amount of time), computer system 600 updates the appearance of zoom level control 620B to display a representation of the zoom level (e.g., 1.5×) associated with the 35 mm lens equivalent zoom level, as shown in FIG. 22G. In some embodiments, computer system 600 updates the appearance of the zoom level control 620B from FIG. 22F to FIG. 22G without user input (e.g., automatically).

Figures 22I, 22J:
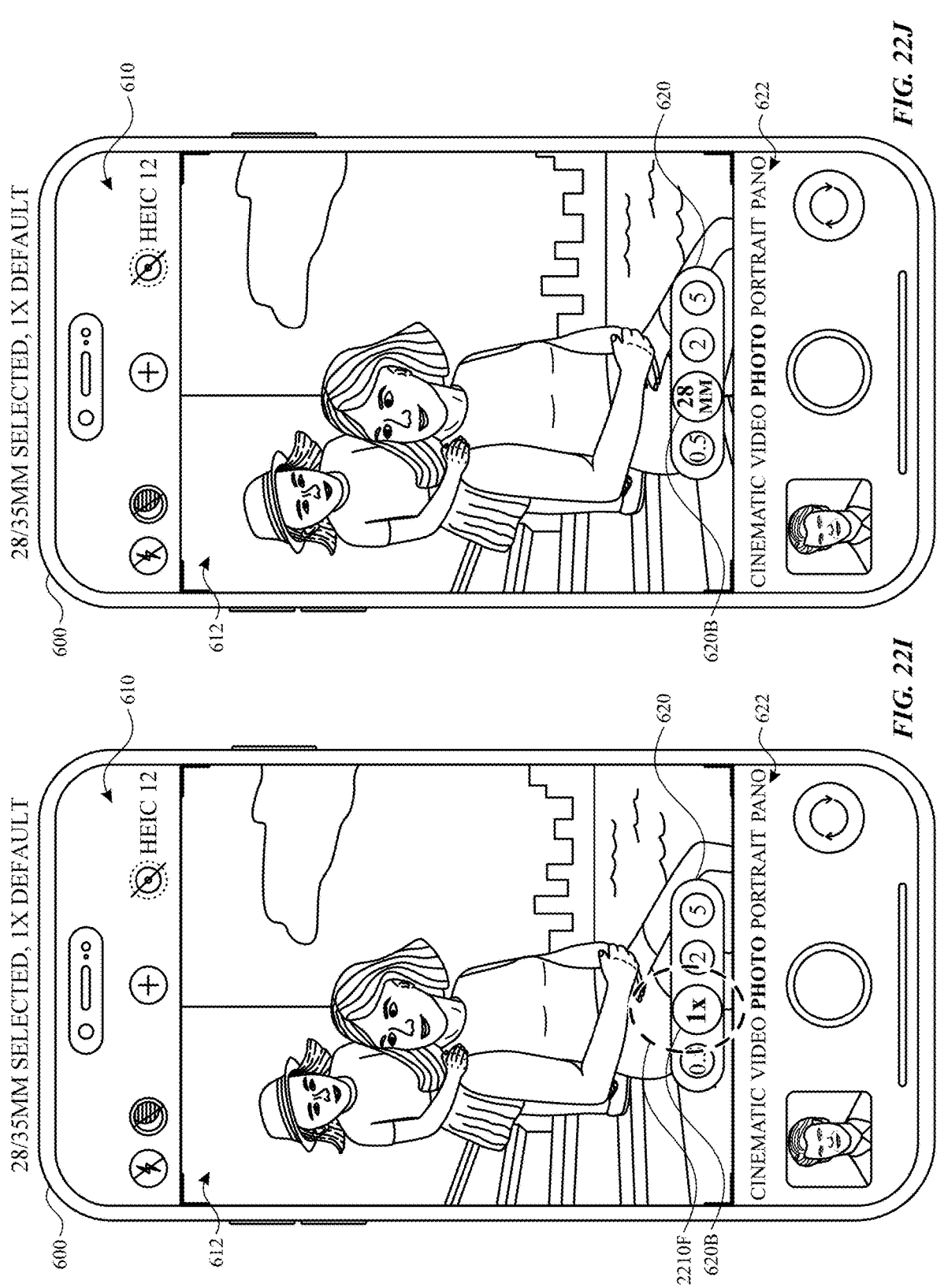

In FIG. 22G, while the zoom level for media capture is set to the zoom level for the 35 mm lens equivalent zoom level, computer system 600 detects input 2210E (e.g., a tap and/or other selection input) selecting zoom level control 620B. In response to detecting input 2210E, computer system 600 changes the zoom level for media capture to the default zoom level (e.g., back to 1× corresponding to the 24 mm lens equivalent zoom level). Because the 35 mm lens equivalent zoom level is a last of the zoom levels selected in camera settings user interface 2200, computer system 600 changes (e.g., returns) to the default zoom level. For example, as shown in FIG. 22H, computer system 600 displays an indication (e.g., "24 MM") of the 24 mm lens equivalent zoom level in zoom level control 620B and changes camera preview 612 to 1× magnification in response to detecting input 2210E. In FIG. 22H, computer system 600 initially displays the indication of the 24 mm lens equivalent zoom level as a representation of the corresponding focal length. After displaying the indication of the 24 mm lens equivalent zoom level as a representation of the focal length (e.g., for a predetermined amount of time), computer system 600 updates the appearance of zoom level control 620B to display a representation of the zoom level (e.g., 1×) associated with the 24 mm lens equivalent zoom level, as shown in FIG. 22I. In some embodiments, computer system 600 updates the appearance of the zoom level control 620B from FIG. 22H to FIG. 22I without user input (e.g., automatically).

Figures 22K, 22L:
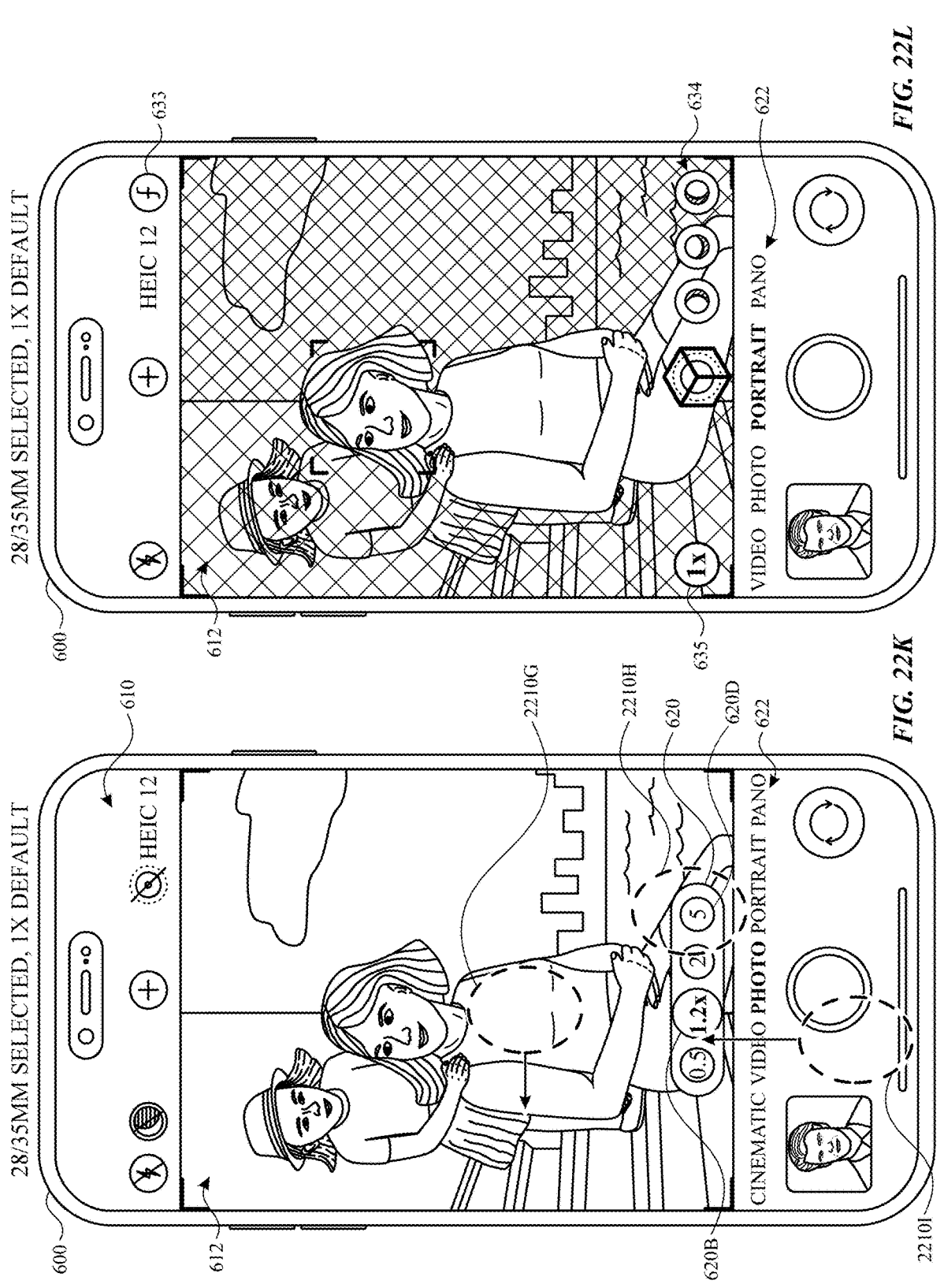

In FIG. 22I, computer system 600 detects input 2210F (e.g., a tap and/or other selection input) selecting zoom level control 620B. As shown in FIGS. 22J and 22K, in response to detecting input 2210F, computer system 600 changes (e.g., returns) to the 28 mm lens equivalent zoom level for media capture as described with reference to FIGS. 22C-22E. In this way, a user can cycle through a set of zoom levels by repeatedly selecting zoom level control 620B in accordance with the settings selected in camera settings user interface 2200.

In FIG. 22K, computer system 600 is in a standard photo capture mode, as indicated by capture mode menu 622. Embodiments and features of capture mode menu 622 are described above with reference to, e.g., FIGS. 6B-6D, 8D, 10A, and 14A. In response to detecting input 2210G (e.g., a tap, swipe, drag, and/or other input) corresponding to a request to change the capture mode (e.g., a tap on "portrait mode" affordance in capture mode menu 622 or a swipe to the right or to the left at a location corresponding to capture mode menu 622 or over camera preview 612), computer system 600 changes the capture mode to a portrait capture mode, as indicated by capture mode menu 622 in FIG. 22L. In some embodiments, when computer system 600 changes to the portrait capture mode, computer system 600 sets (e.g., changes) the zoom level for media capture to a predetermined zoom level. For example, in some embodiments, computer system 600 sets the zoom level for media capture to a zoom level corresponding to a preset zoom level (e.g., the 24 mm lens equivalent zoom level). In some embodiments, computer system 600 sets the zoom level for media capture to a selected default zoom level (e.g., a default zoom level selected in camera settings user interface 2200). In some embodiments, computer system 600 maintains a current zoom level when changing media capture modes. In FIG. 22L, when computer system 600 changes to the portrait capture mode, computer system 600 changes the zoom level for media capture to 1× magnification corresponding to the 24 mm lens equivalent zoom level, as indicated by zoom level indicator 635, and updates camera preview 612 accordingly.

Returning to FIG. 22K, in response to detecting input 2210H (e.g., a tap and/or other selection input selecting zoom level control 620D) corresponding to a request to change the zoom level for media capture to a preset zoom level (e.g., 5× magnification), computer system 600 changes the zoom level accordingly and changes the zoom level currently associated with zoom level control 620B to a predetermined zoom level (e.g., a preset zoom level and/or a default zoom level selected in camera settings user interface 2200). For example, in FIG. 22M, computer system 600 zooms camera preview 612 to 5× magnification (corresponding to selected zoom level control 620D) and changes the appearance of zoom level control 620B to indicate that computer system 600 will change the zoom level to 1× magnification in response to detecting selection of zoom level control 620B. Computer system 600 responds to selection of other preset zoom levels (e.g., corresponding to zoom level control 620A and/or zoom level control 620C) in zoom affordance 620 in a manner analogous to that described for selection of zoom level control 620D. In some embodiments, computer system 600 maintains the appearance of zoom level control 620B when a preset zoom level is selected. In some embodiments, in response to detecting an input (e.g., input 2210T in FIG. 22AA) directed to zoom affordance 620, computer system 600 displays expanded zoom level controls (e.g., zoom slider 1003A and/or zoom wheel 1003B). In some embodiments, when zoom level control 620B is currently selected (or the zoom level is set to a zoom level associated with zoom level control 620B), computer system 600 changes the zoom level for media capture to a different zoom level associated with zoom level control 620B (e.g., a zoom level selected in camera settings user interface 2200) other than the zoom level indicated by the appearance of zoom level control 620B at the time that zoom level control 620B is selected. In some embodiments, when a zoom level option other than zoom level control 620B is currently selected (or the zoom level is set to a zoom level associated with a zoom level option other than zoom level control 620B), computer system 600 changes the zoom level for media capture to the zoom level indicated by the appearance of zoom level control 620B at the time that zoom level control 620B is selected.

Figures 22M, 22N:
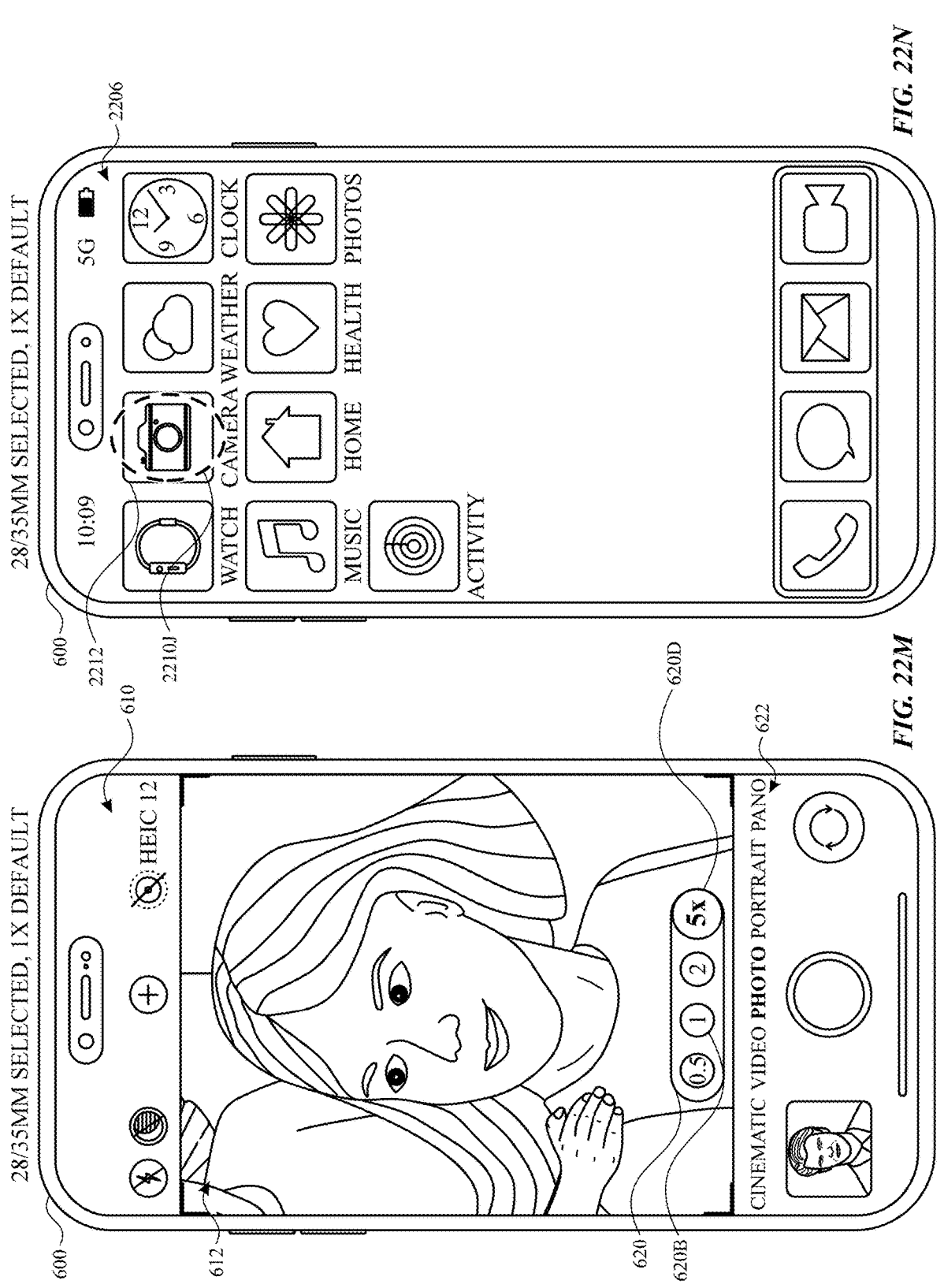

Returning to FIG. 22K, in response to detecting input 2210I (e.g., a tap, swipe, and/or other input) corresponding to a request to navigate away from camera user interface 610, computer system 600 displays application selection user interface 2206 (e.g., a home screen), as shown in FIG. 22N and described above with reference to FIG. 22B. In response to detecting input 2210J (e.g., a tap and/or other selection input) selecting camera application icon 2212, computer system 600 displays (e.g., returns to) camera user interface 610 as shown in FIG. 22O, with the zoom level set to the default zoom level (e.g., as indicated by zoom affordance 620 and zoom level control 620B).

Figures 22O, 22P:
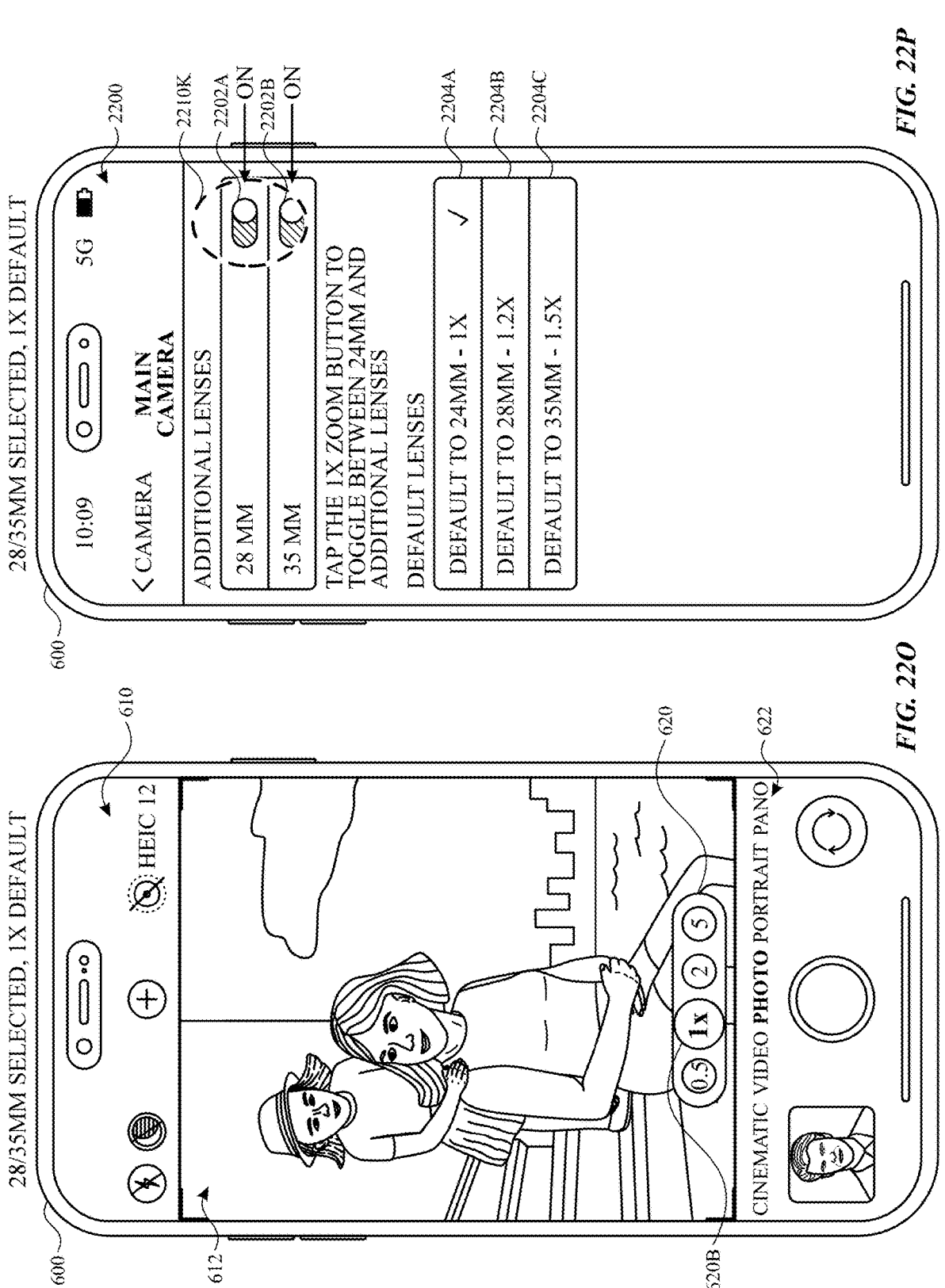
Figures 22Q, 22R:
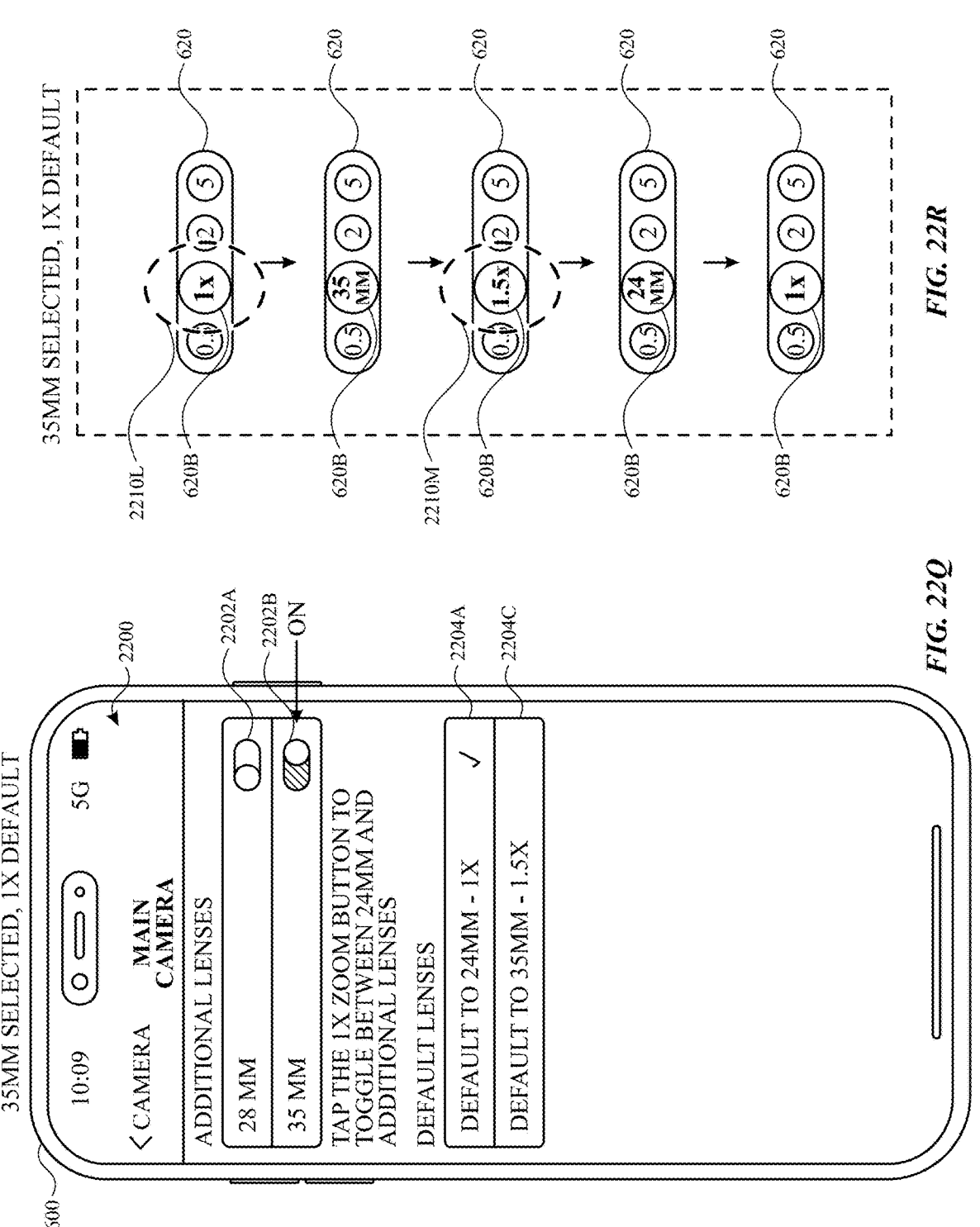

Turning to FIG. 22P, computer system 600 detects input 2210K (e.g., a tap, swipe, and/or other input) selecting zoom level option 2202A. As shown in FIG. 22Q, in response to detecting input 2210K, computer system 600 disables the 28 mm lens equivalent zoom level and removes default zoom level option 2204B from camera settings user interface 2200. FIG. 22R illustrates an example of how zoom affordance 620 (e.g., as displayed in camera user interface 610) is displayed over time (from top to bottom in FIG. 22R) according to the settings in FIG. 22Q (e.g., when the 28 mm lens equivalent zoom level is deselected, the 35 mm lens equivalent zoom level is selected, and the 24 mm lens equivalent zoom level is selected as the default zoom level). Although zoom affordance 620 is illustrated in isolation in FIG. 22R, the instances of zoom affordance 620 illustrated in FIG. 22R can be displayed in camera user interface 610, with camera preview 612 and other elements of camera user interface 610 displayed in accordance with the inputs and zoom levels shown in FIG. 22R. When computer system 600 has the setting shown in FIG. 22Q, zoom affordance 620 is initially displayed as shown in the top of FIG. 22R, with the zoom level and appearance of zoom level control 620B set to the default zoom level selected in camera settings user interface 2200. In response to detecting input 2210L (e.g., a tap and/or other selection input) selecting zoom level control 620B, computer system 600 changes the zoom level for media capture based on the settings selected in camera settings user interface 2200. Because the 28 mm lens equivalent zoom level is deselected and the 35 mm lens equivalent zoom level is selected, computer system 600 changes to the 35 mm lens equivalent zoom level for media capture (e.g., instead of the 28 mm lens equivalent zoom level as described with reference to FIGS. 22C-22E) and displays an indication (e.g., "35 MM") of the 35 mm lens equivalent zoom level in zoom level control 620B. After displaying the indication of the 35 mm lens equivalent zoom level as a representation of the focal length (e.g., for a predetermined amount of time), computer system 600 updates (e.g., automatically) the appearance of zoom level control 620B to display a representation of the zoom level (e.g., 1.5×) associated with the 35 mm lens equivalent zoom level. In response to detecting input 2210M (e.g., a tap and/or other selection input) selecting zoom level control 620B when the zoom level is set to 1.5× magnification, computer system 600 changes (e.g., returns) the zoom level for media capture to the zoom level of the 24 mm lens equivalent zoom level. Computer system 600 displays an indication (e.g., "24 MM") of the 24 mm lens equivalent zoom level in zoom level control 620B and then updates (e.g., automatically) the appearance of zoom level control 620B to display a representation of the zoom level (e.g., 1×) associated with the 24 mm lens equivalent zoom level.

Figure 22S:
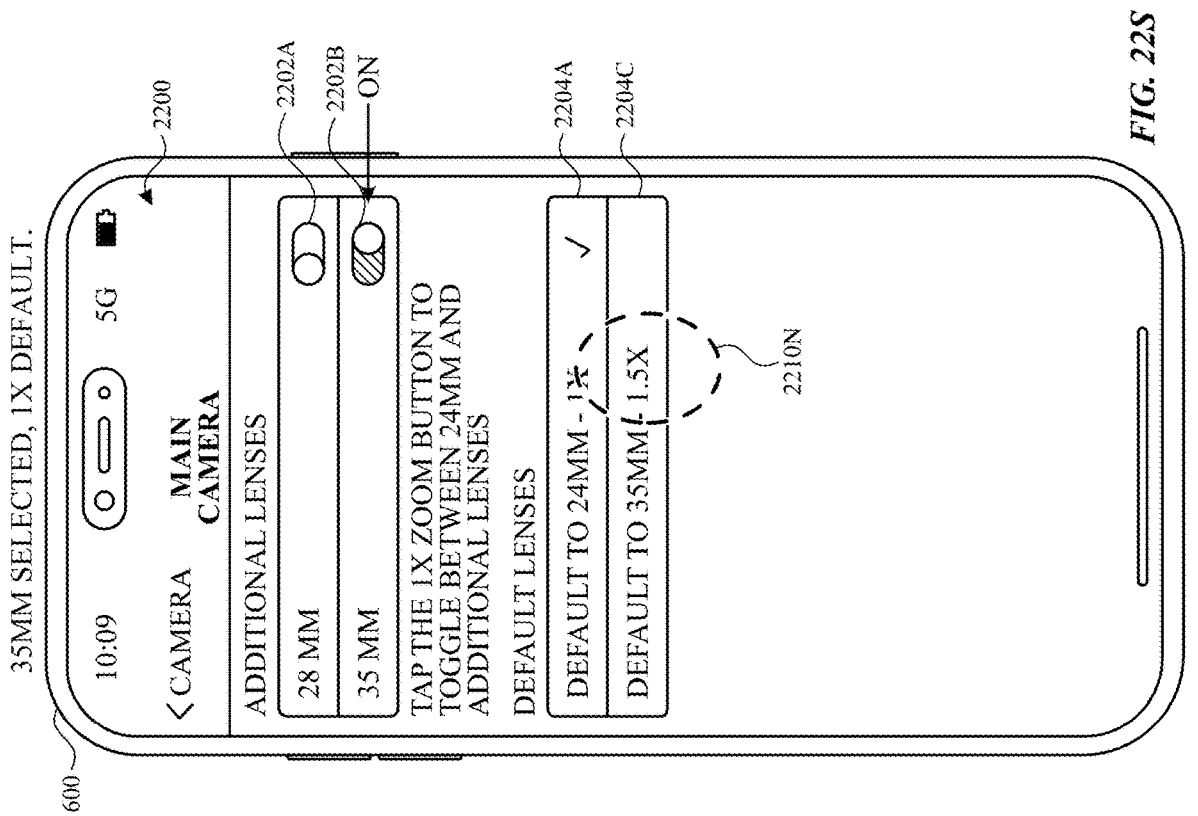
Figures 22T, 22U:
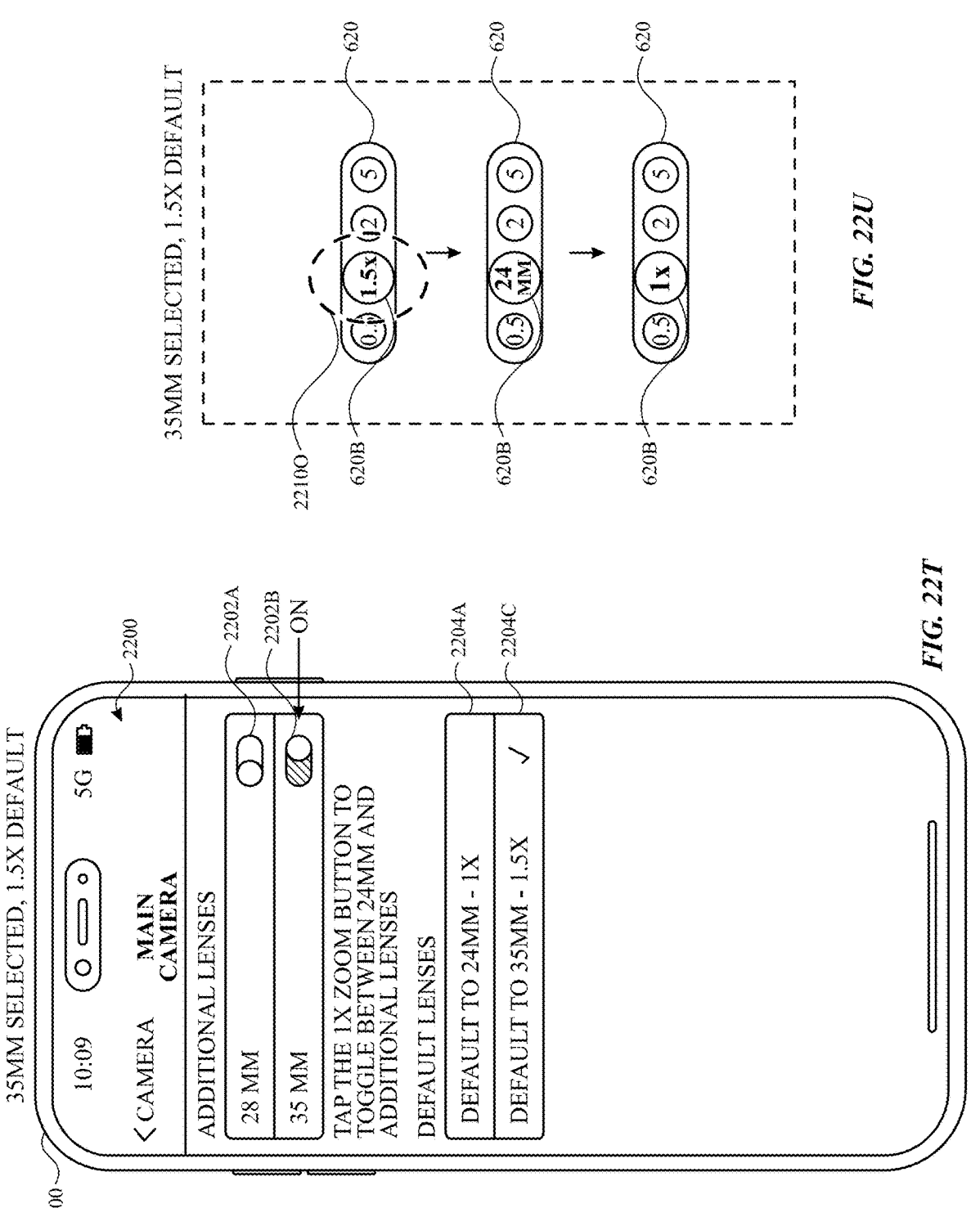

Turning to FIG. 22S, computer system 600 displays camera settings user interface 2200 with the same settings as in FIG. 22Q. Computer system 600 detects input 2210N (e.g., a tap and/or other selection input) selecting the 35 mm lens equivalent zoom level as the default zoom level (e.g., by selecting default zoom level option 2204C). In response to detecting input 2210N selecting the 35 mm lens equivalent zoom level as the default zoom level, computer system 600 updates camera settings user interface 2200 as shown in FIG. 22T to indicate that the 35 mm lens equivalent zoom level is the default zoom level (e.g., as indicated by the check mark in default zoom level option 2204C). FIG. 22U illustrates an example of how zoom affordance 620 (e.g., as displayed in camera user interface 610) is displayed over time (from top to bottom in FIG. 22U) according to the settings in FIG. 22T (e.g., when the 28 mm lens equivalent zoom level is deselected, the 35 mm lens equivalent zoom level is selected, and the 35 mm lens equivalent zoom level is selected as the default zoom level). Although zoom affordance 620 is illustrated in isolation in FIG. 22U, the instances of zoom affordance 620 illustrated in FIG. 22U can be displayed in camera user interface 610, with camera preview 612 and other elements of camera user interface 610 displayed in accordance with the inputs and zoom levels shown in FIG. 22U. When computer system 600 has the setting shown in FIG. 22T, zoom affordance 620 is initially displayed as shown in the top of FIG. 22U, with the zoom level and appearance of zoom level control 620B set to the default zoom level selected in camera settings user interface 2200 (e.g., 1.5×). In response to detecting input 2210O (e.g., a tap and/or other selection input) selecting zoom level control 620B, computer system 600 changes the zoom level for media capture to the zoom level of the 24 mm lens equivalent zoom level. Computer system 600 displays an indication (e.g., "24 MM") of the 24 mm lens equivalent zoom level in zoom level control 620B and then updates (e.g., automatically) the appearance of zoom level control 620B to display a representation of the zoom level (e.g., 1×) associated with the 24 mm lens equivalent zoom level.

Figures 22V, 22W:
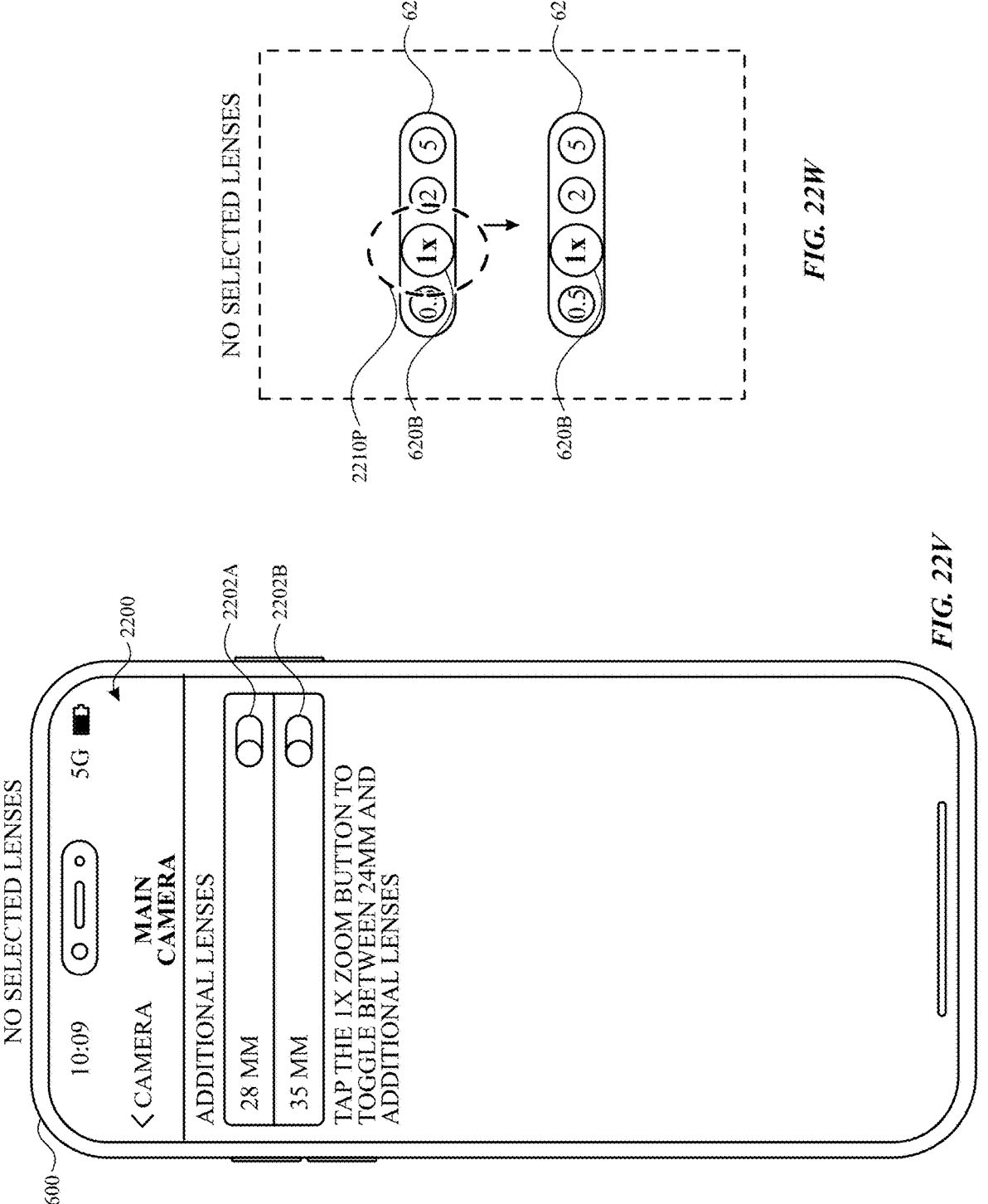

Turning to FIG. 22V, computer system 600 displays camera settings user interface 2200 with both the 28 mm lens equivalent zoom level and the 35 mm lens equivalent zoom level deselected. Because neither the 28 mm lens equivalent zoom level nor the 35 mm lens equivalent zoom level is selected (e.g., no user-selectable zoom level is selected), computer system 600 displays camera settings user interface 2200 without default zoom level option 2204A corresponding to the 24 mm lens equivalent zoom level (e.g., since there is no other zoom level selected). FIG.

22W illustrates an example of how zoom affordance 620 (e.g., as displayed in camera user interface 610) is displayed over time (from top to bottom in FIG. 22W) according to the settings in FIG. 22V (e.g., when the 28 mm lens equivalent zoom level is deselected and the 35 mm lens equivalent zoom level is deselected). Although zoom affordance 620 is illustrated in isolation in FIG. 22W, the instances of zoom affordance 620 illustrated in FIG. 22W can be displayed in camera user interface 610, with camera preview 612 and other elements of camera user interface 610 displayed in accordance with the inputs and zoom levels shown in FIG. 22V. When computer system 600 has the setting shown in FIG. 22W, zoom affordance 620 is initially displayed as shown in the top of FIG. 22W, with the zoom level and appearance of zoom level control 620B set to the zoom level of the preset zoom level associated with zoom level control 620B (e.g., 1×). In response to detecting input 2210P (e.g., a tap and/or other selection input) selecting zoom level control 620B, computer system 600 maintains the current zoom level for media capture (e.g., because no other zoom level associated with zoom level control 620B is selected).

Figures 22X, 22Y:
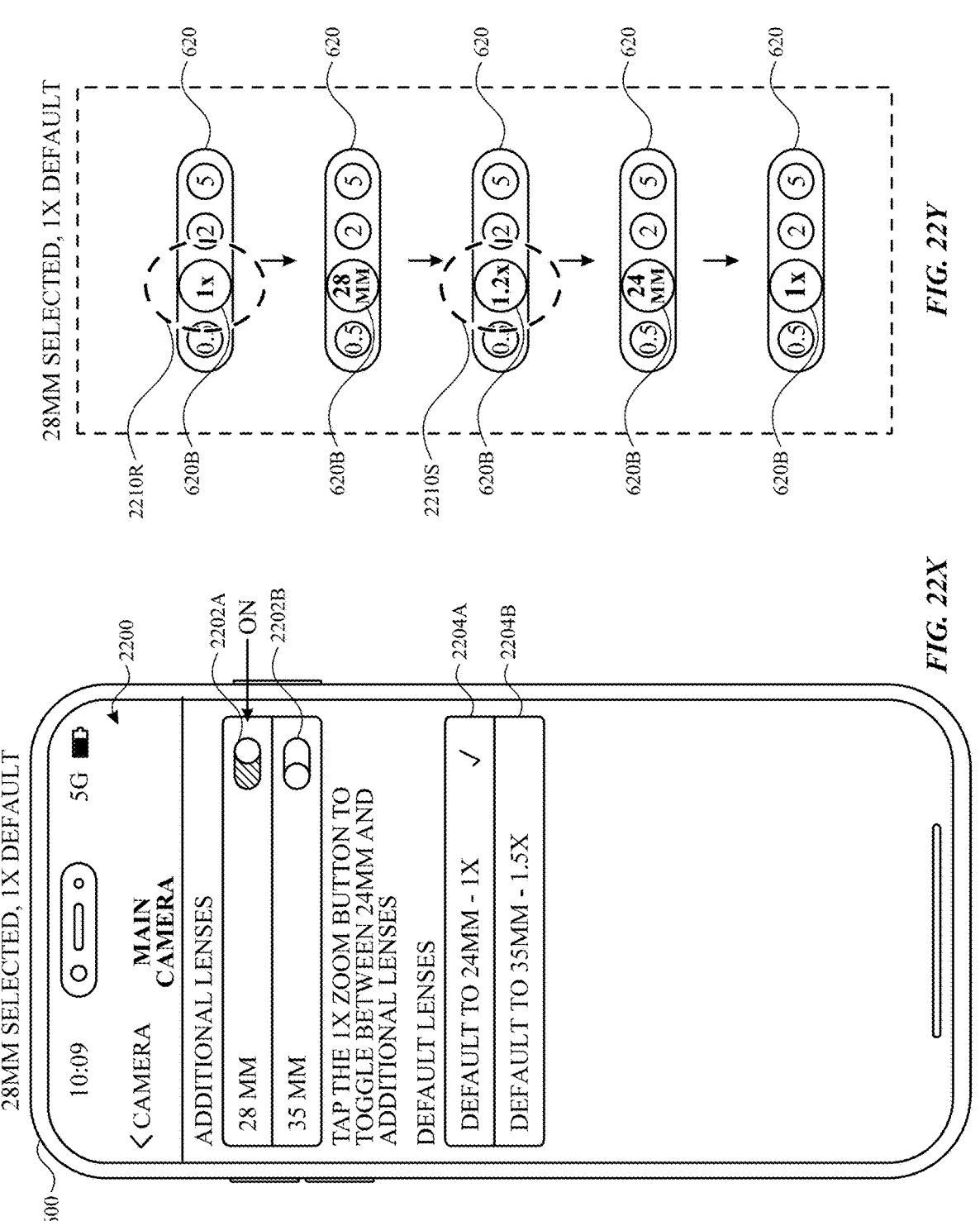

Turning to FIG. 22X, computer system 600 displays camera settings user interface 2200 with the 28 mm lens equivalent zoom level selected, the 35 mm lens equivalent zoom level deselected, and the 24 mm lens equivalent zoom level selected as the default zoom level. Because the 35 mm lens equivalent zoom level is deselected, computer system 600 displays camera settings user interface 2200 without default zoom level option 2204C corresponding to the 35 mm lens equivalent zoom level. FIG. 22Y illustrates an example of how zoom affordance 620 (e.g., as displayed in camera user interface 610) is displayed over time (from top to bottom in FIG. 22Y) according to the settings in FIG. 22X (e.g., when the 28 mm lens equivalent zoom level is selected, the 35 mm lens equivalent zoom level is deselected, and the 24 mm lens equivalent zoom level is the default zoom level). Although zoom affordance 620 is illustrated in isolation in FIG. 22Y, the instances of zoom affordance 620 illustrated in FIG. 22Y can be displayed in camera user interface 610, with camera preview 612 and other elements of camera user interface 610 displayed in accordance with the inputs and zoom levels shown in FIG. 22Y. When computer system 600 has the setting shown in FIG. 22X, zoom affordance 620 is initially displayed as shown in the top of FIG. 22Y, with the zoom level and appearance of zoom level control 620B set to the zoom level of the default zoom level selected in camera settings user interface 2200 (e.g., 1×). In response to detecting input 2210R (e.g., a tap and/or other selection input) selecting zoom level control 620B, computer system 600 changes the zoom level for media capture based on the settings selected in camera settings user interface 2200. Because the 28 mm lens equivalent zoom level is selected and the 35 mm lens equivalent zoom level is deselected (e.g., unlike in FIG. 22Q in which the 28 mm lens equivalent zoom level is deselected and the 35 mm lens equivalent zoom level is selected), computer system 600 changes to the 28 mm lens equivalent zoom level for media capture and displays an indication (e.g., "28 MM") of the 28 mm lens equivalent zoom level in zoom level control 620B. After displaying the indication of the 28 mm lens equivalent zoom level as a representation of the focal length (e.g., for a predetermined amount of time), computer system 600 updates (e.g., automatically) the appearance of zoom level control 620B to display a representation of the zoom level (e.g., 1.2×) associated with the 28 mm lens equivalent zoom level. In response to detecting input 2210S (e.g., a tap and/or other selection input) selecting zoom level control 620B when the zoom level is set to 1.2× magnification, computer system 600 changes (e.g., returns) the zoom level for media capture to the zoom level of the 24 mm lens equivalent zoom level (e.g., instead of the 35 mm lens equivalent zoom level, since the 35 mm lens equivalent zoom level is deselected). Computer system 600 displays an indication (e.g., "24 MM") of the 24 mm lens equivalent zoom level in zoom level control 620B and then updates (e.g., automatically) the appearance of zoom level control 620B to display a representation of the zoom level (e.g., 1×) associated with the 24 mm lens equivalent zoom level.

Figure 22Z:
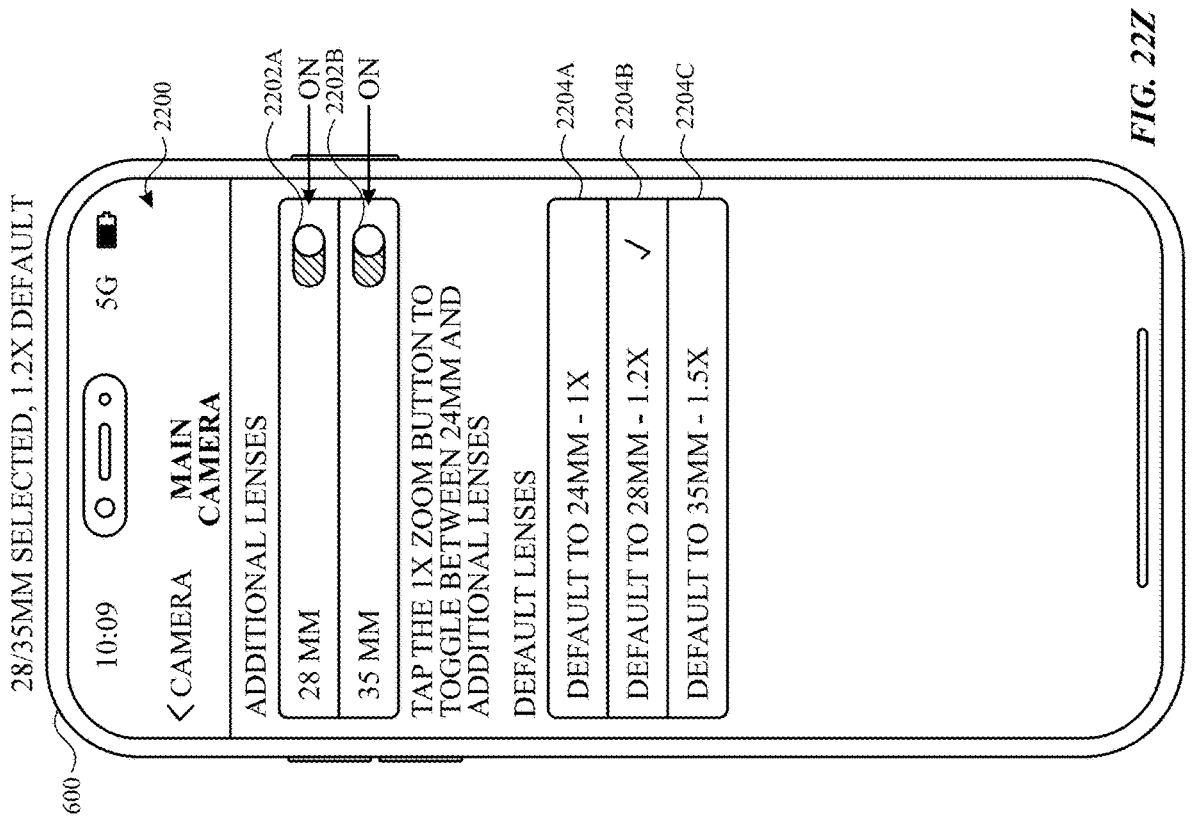
Figure 22A:
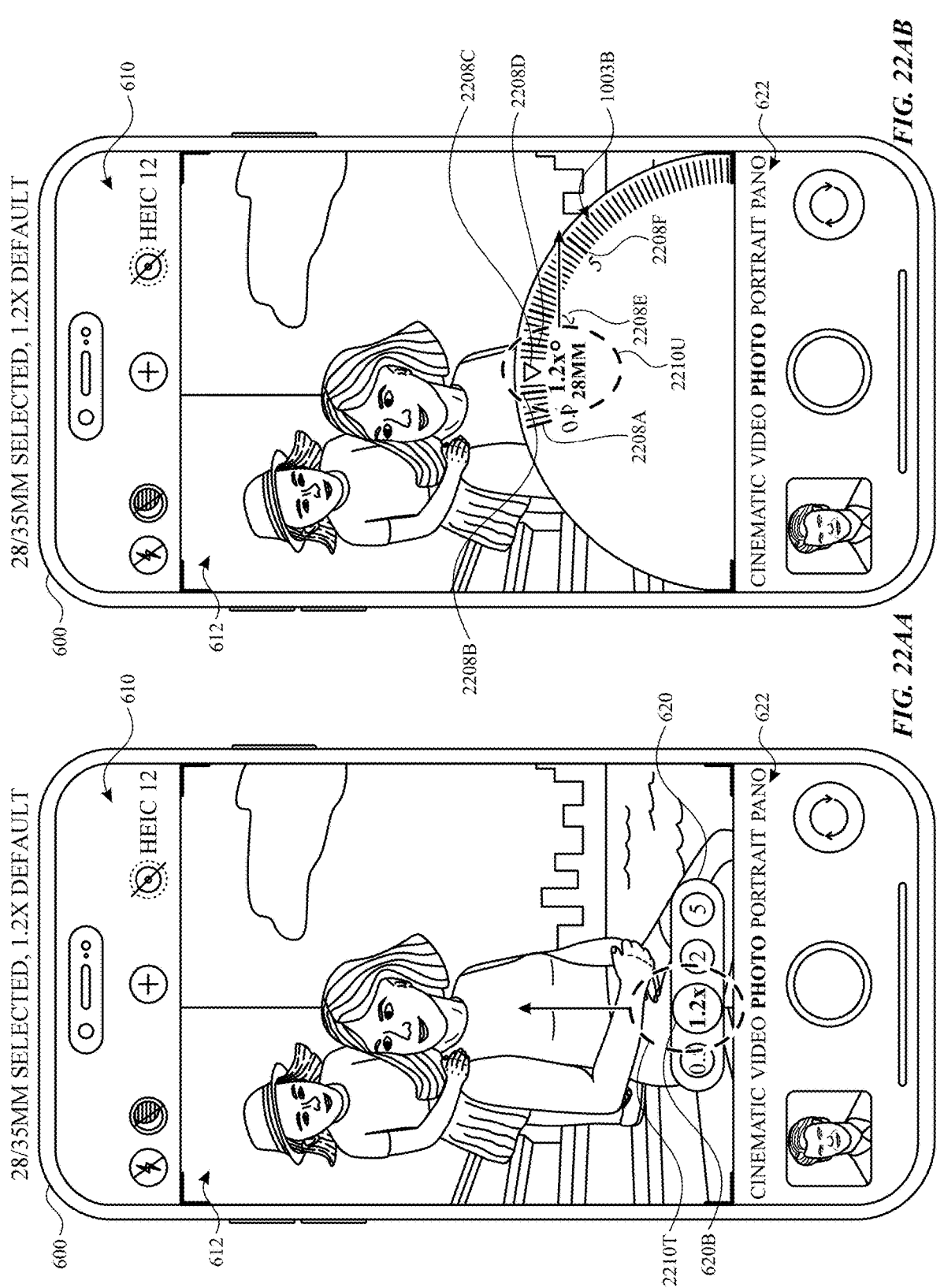
Figure 22A:
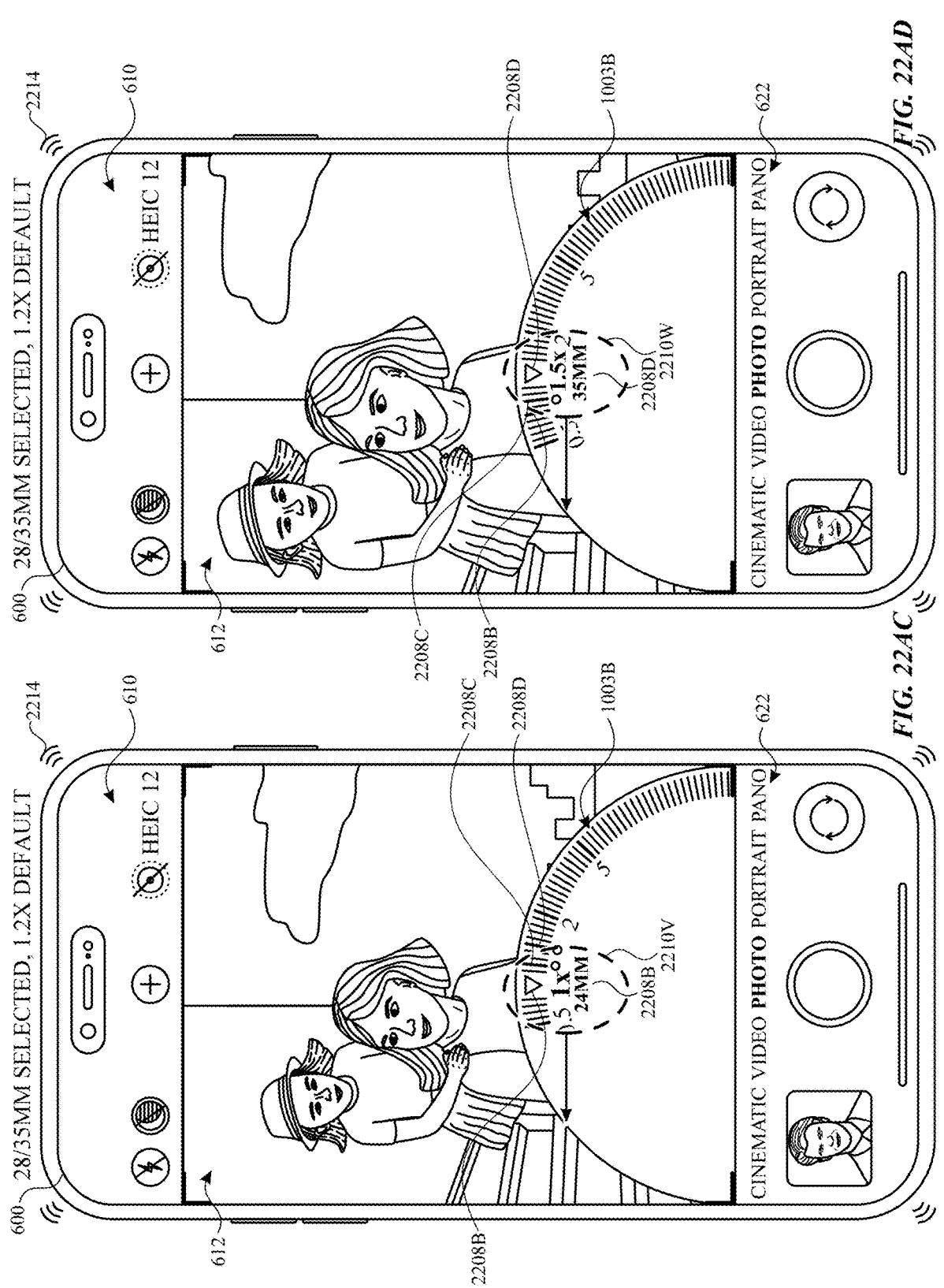
Figure 22A:
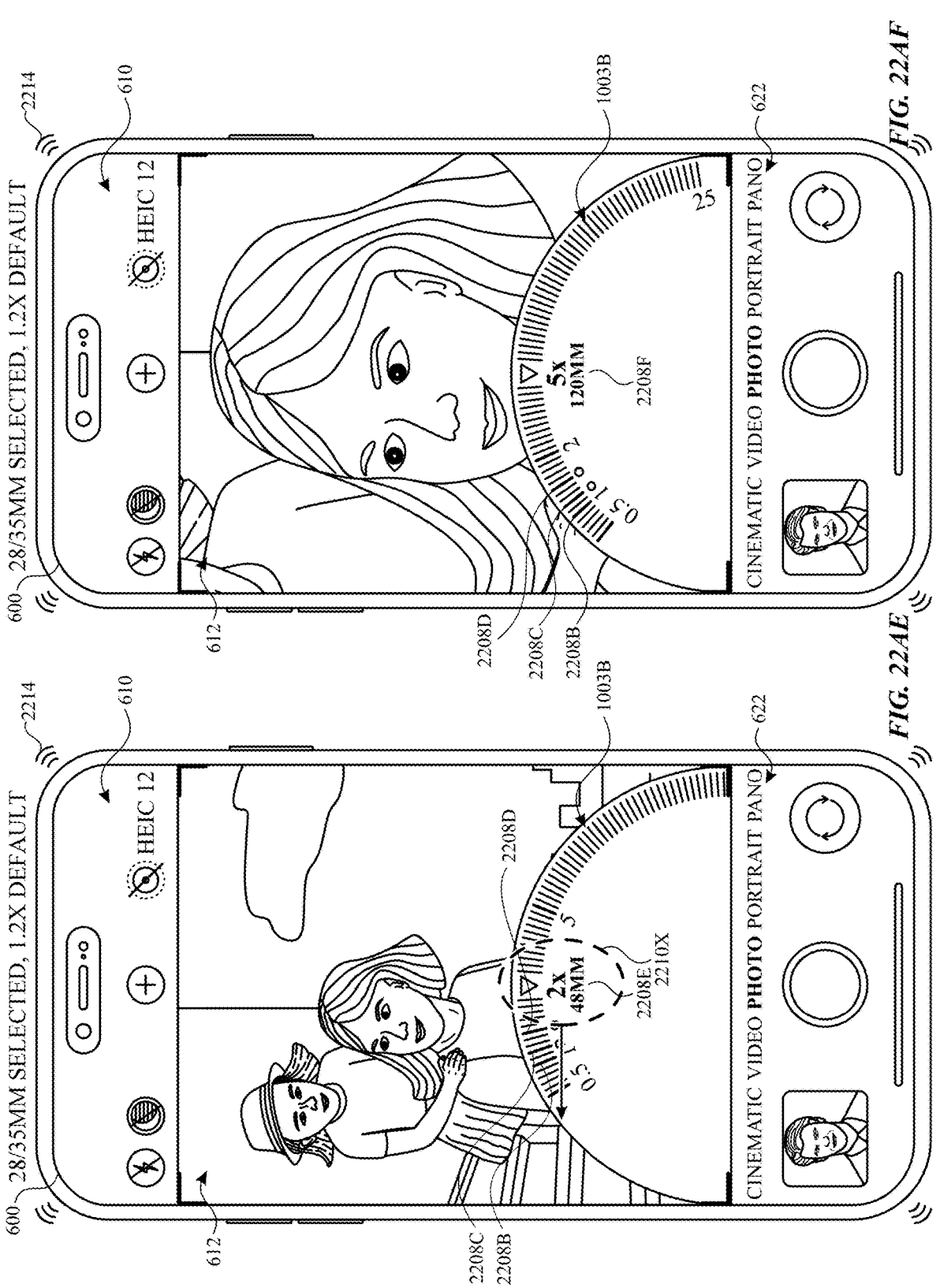
Figure 22A:
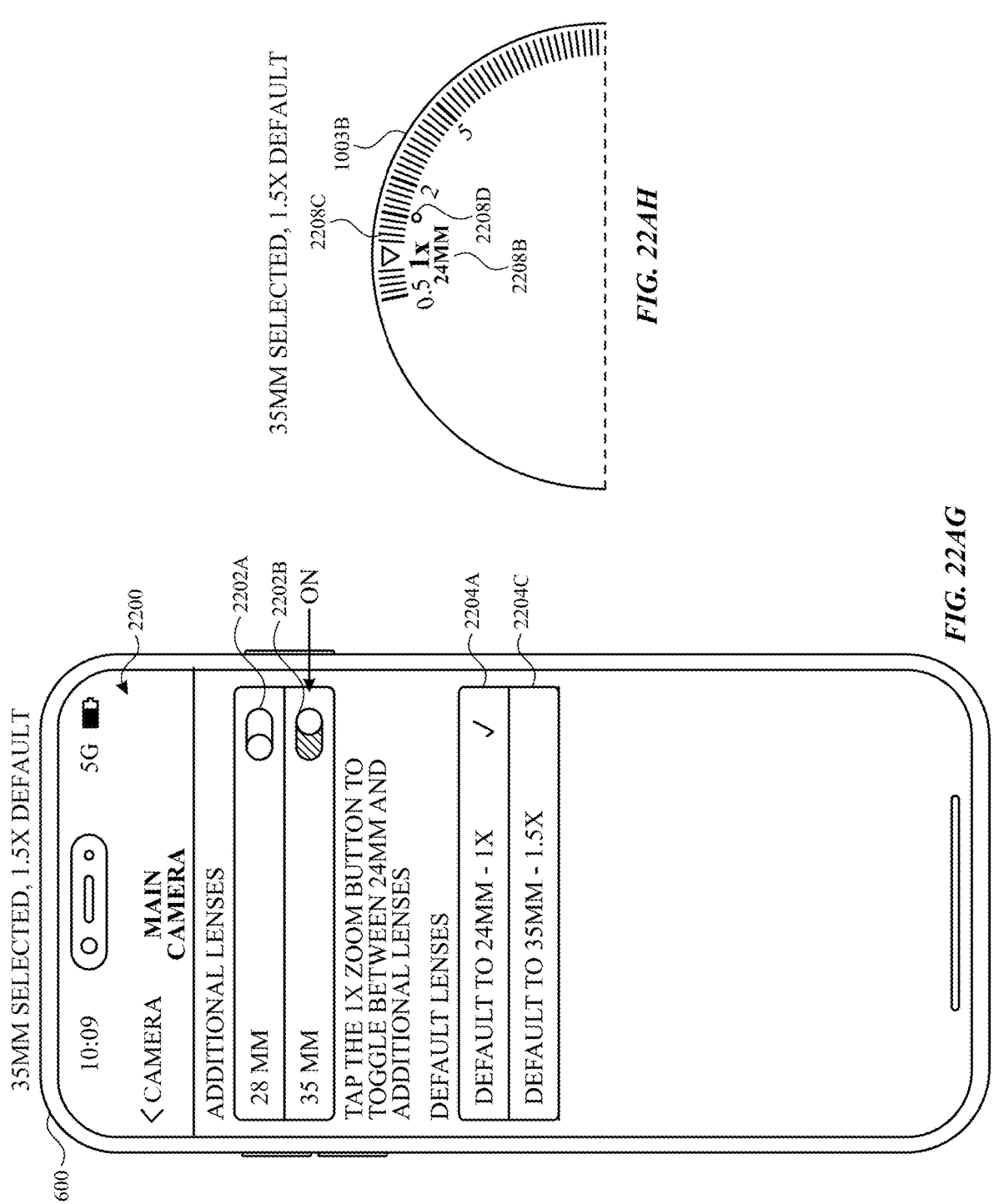
Figure 22A:
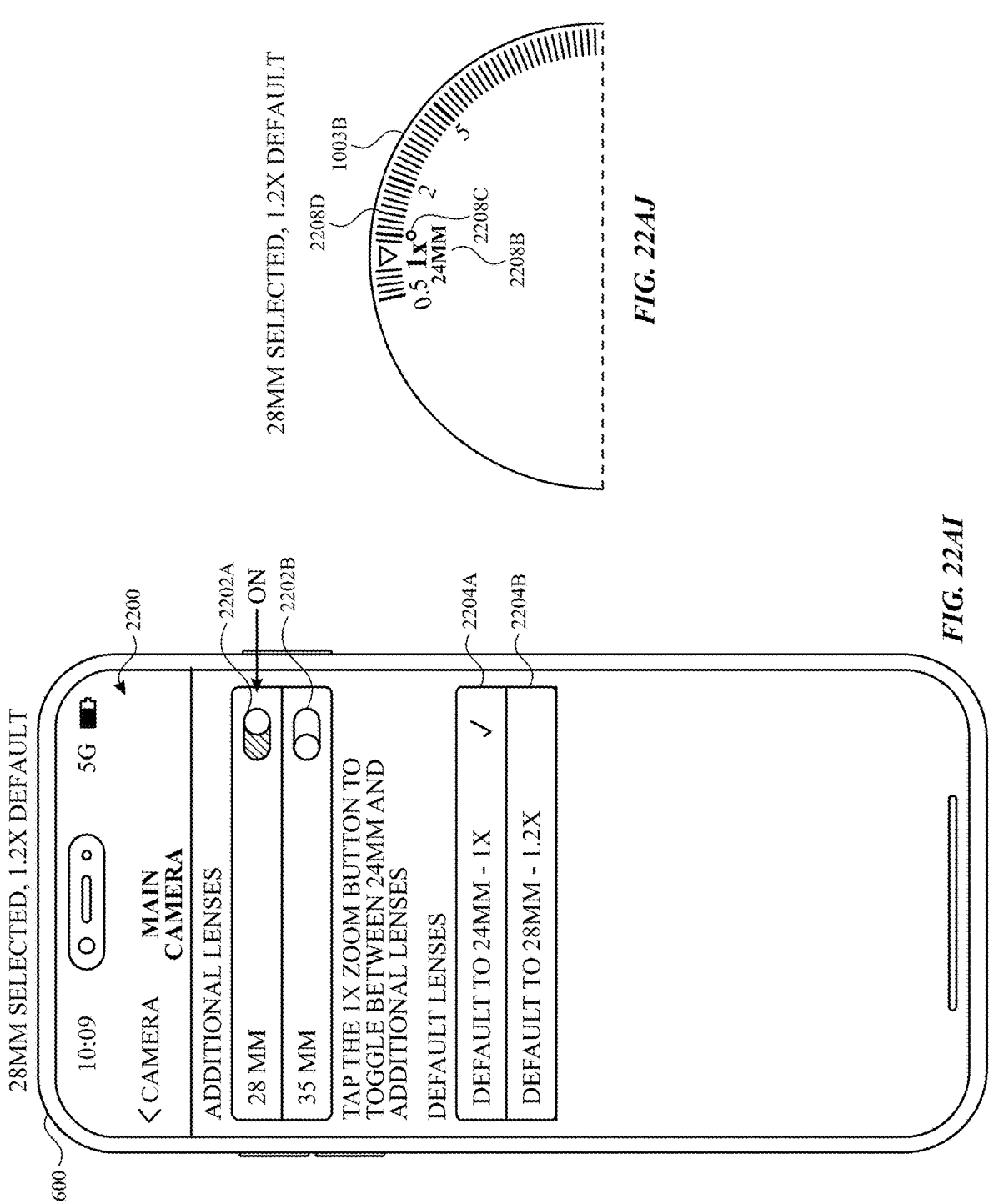
Figure 22A:
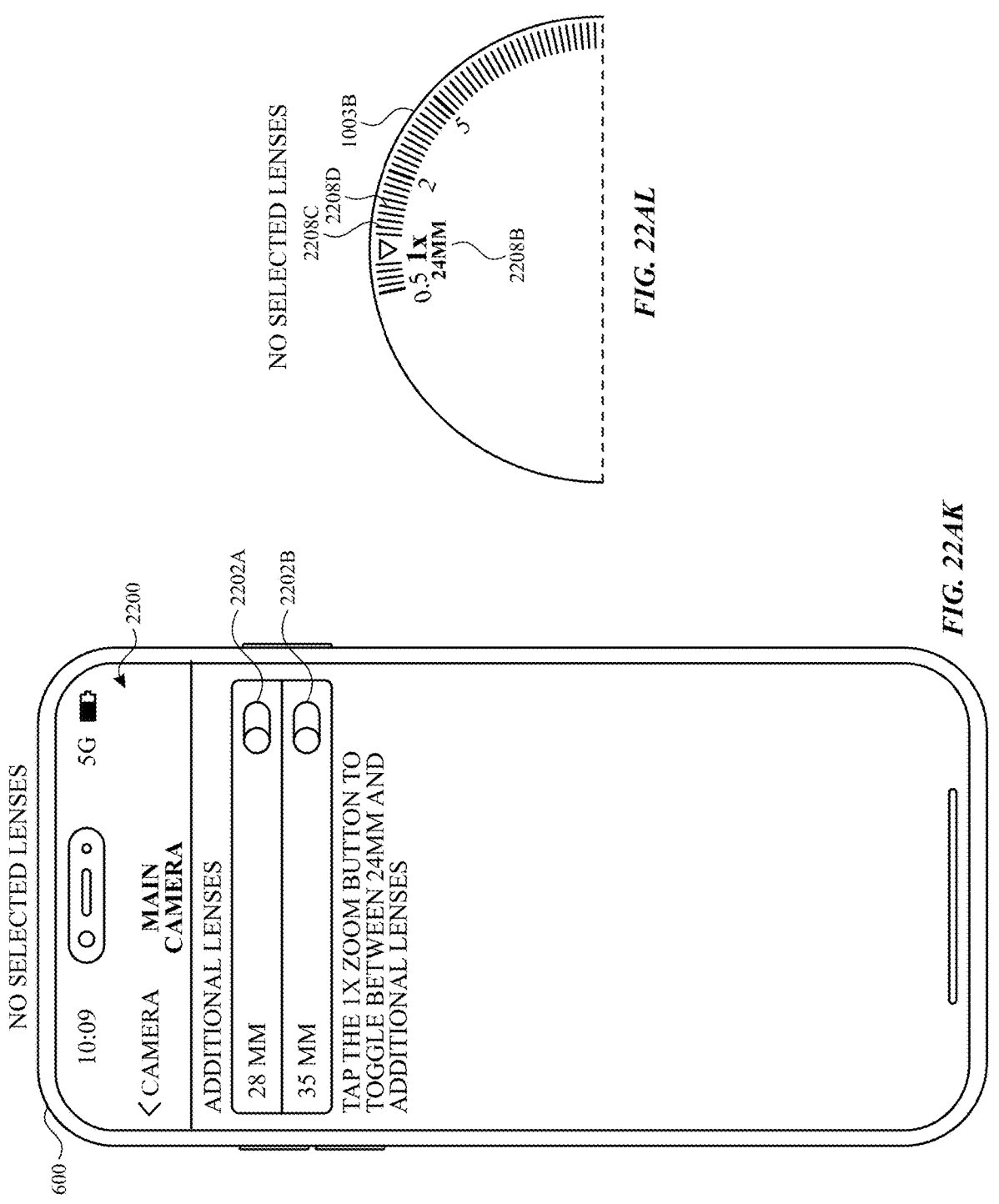

Turning to FIG. 22Z, computer system 600 displays camera settings user interface 2200 with both the 28 mm lens equivalent zoom level selected and the 35 mm lens equivalent zoom level deselected, and the 28 mm lens equivalent zoom level selected as the default zoom level. FIG. 22AA illustrates camera user interface 610 as initially displayed according to the settings in FIG. 22Z. For example, the zoom level is initially set to 1.2× magnification in accordance with the 28 mm lens equivalent zoom level being selected as the default zoom level.

In FIG. 22AA, computer system 600 detects input 2210T (e.g., a tap, swipe, and/or other input) corresponding to a request to display zoom wheel 1003B. In FIG. 22AA, input 2210T includes an upward swipe starting on zoom affordance 620. In some embodiments, input 2210T includes (e.g., is) a horizontal swipe (e.g., in a direction perpendicular to the direction of input 2210T indicated in FIG. 22AA; from left to right; and/or from right to left). In response to detecting input 2210T, computer system 600 displays zoom wheel 1003B in camera user interface 610 as shown in FIG. 22AB. Embodiments and features of zoom wheel 1003B are described with reference to FIG. 10A. In the embodiment illustrated in FIG. 22AB, the operation and appearance of zoom wheel 1003B is based on the settings selected in camera settings user interface 2200 shown in FIG. 22Z. For example, in FIG. 22AB, zoom wheel 1003B includes zoom level indicators 2208A-2208F corresponding to zoom levels (referred to as snapping zoom levels) that computer system 600 will snap to while zoom wheel 1003B is used to navigate through a range of zoom levels. In particular, zoom level indicator 2208C corresponds to the 28 mm lens equivalent zoom level and zoom level indicator 2208D corresponds to the 35 mm lens equivalent zoom level. In some embodiments, snapping to a zoom level refers to setting the zoom level to a snapping zoom level as the zoom level designated by zoom wheel 1003B approaches (e.g., reaches a threshold distance from) the snapping zoom level, but before reaching the snapping zoom level. In some embodiments, changing the zoom level by selecting a zoom level option (e.g., 620A-620D) in zoom affordance 620 is referred to as snapping to a zoom level.

In FIG. 22AB, zoom level indicator 2208C is visually distinguished from other zoom levels because the 28 mm lens equivalent zoom level is selected. Similarly, zoom level indicator 2208D is visually distinguished from other zoom levels because the 35 mm lens equivalent zoom level is selected. In the embodiment illustrated in FIG. 22AB, zoom level indicators are visually distinguished by a numerical indicator (e.g., 0.5, 0.5×, 1, 1×, 1.2, 1.2×, 1.5, 1.5×, 2, 2×, 5, and/or 5×), a dot next to the corresponding zoom level marker (e.g., tick mark), and/or a thicker line weight compared to other zoom level markers. For example, zoom level indicator 2208D is visually distinguished by a relatively thicker line weight and a dot.

In FIG. 22AB, the zoom level is initially set to 1.2× because the 28 mm lens equivalent zoom level is selected as the default zoom level. Computer system 600 detects input 2210U (e.g., a drag gesture to the right and/or clockwise around zoom wheel 1003B) corresponding to a request to change the zoom level. In response to detecting input 2210U, computer system 600 rotates (e.g., navigates) zoom wheel 1003B clockwise and changes the zoom level to 1×, corresponding to the zoom level of the 24 mm lens equivalent zoom level. As shown in FIG. 22AC, computer system 600 zooms out camera preview 612 and sets the position of zoom wheel 1003B to designate the 1× zoom level (e.g., by displaying "1×" and "24 MM" in bold). In some embodiments, computer system 600 snaps the zoom level to 1× magnification as the zoom level designated by zoom wheel 1003B approaches (but before reaching) zoom level indicator 2208B corresponding to the 24 mm lens equivalent zoom level. In some embodiments, because 1.2× is a snapping zoom level, computer system 600 maintains the zoom level at 1.2× until input 2210U moves a threshold amount.

In FIG. 22AC, computer system 600 detects input 2210V (e.g., a drag gesture to the left and/or counterclockwise around zoom wheel 1003B) corresponding to a request to change the zoom level. In response to detecting input 2210V, computer system 600 rotates (e.g., navigates) zoom wheel 1003B counterclockwise and changes the zoom level to 1.5×, corresponding to the zoom level of the 35 mm lens equivalent zoom level. As shown in FIG. 22AD, computer system 600 zooms in camera preview 612 and sets the position of zoom wheel 1003B to designate the 1.5× zoom level. In some embodiments, computer system 600 snaps the zoom level to 1.5× magnification as the zoom level designated by zoom wheel 1003B approaches (but before reaching) zoom level indicator 2208D corresponding to the 24 mm lens equivalent zoom level. In some embodiments, computer system 600 snaps the zoom level to 1.2× while navigating to the zoom level of 1.5×. In some embodiments, when a snapping zoom level is designated, the zoom level (e.g., including camera preview 612 and the position of zoom wheel 1003B) remains at the designated snapping zoom level while the input (e.g., input 2210V) is moving, until the input moves a threshold amount. In FIGS. 22AC-22AF, multiple indicators for snapping zoom levels are displayed in zoom wheel 1003B between 1× and 2× zoom levels, because the 28 mm lens equivalent zoom level and the 35 mm lens equivalent zoom level are both selected, so that zoom wheel 1003B in FIGS. 22AC-22AF includes indicators for snapping zoom levels at 1× (corresponding to zoom level indicator 2208B), 1.2× (corresponding to zoom level indicator 2208C), and 1.5× (corresponding to zoom level indicator 2208D). In contrast, fewer indicators for snapping zoom levels are displayed in zoom wheel 1003B in FIGS. 22AH, 22AJ, and 22AL, where fewer of the lens equivalent zoom levels are selected (e.g., either the 28 mm lens equivalent zoom level as shown in FIGS. 22AI-22AJ, the 35 mm lens equivalent zoom level as shown in FIGS. 22AG-22AH, or neither the 28 mm nor the 35 mm lens equivalent zoom level as shown in FIGS. 22AK-22AL).

In FIG. 22AD, computer system 600 detects input 2210W (e.g., a drag gesture to the left and/or counterclockwise around zoom wheel 1003B) corresponding to a request to change the zoom level. In some embodiments, input 2210W is a continuation of input 2210V. In some embodiments, input 2210W is a separate input from input 2210V. In response to detecting input 2210W, computer system 600 rotates (e.g., navigates) zoom wheel 1003B counterclockwise and changes the zoom level to 2×, corresponding to a preset zoom level represented by zoom level indicator 2208E. As shown in FIG. 22AE, computer system 600 zooms in camera preview 612 and sets the position of zoom wheel 1003B to designate the 2× zoom level. In some embodiments, computer system 600 snaps the zoom level to 2× magnification as the zoom level designated by zoom wheel 1003B approaches (but before reaching) zoom level indicator 2208E. In some embodiments, because 1.5× is a snapping zoom level, computer system 600 maintains the zoom level at 1.5× until input 2210W moves a threshold amount.

In FIG. 22AE, computer system 600 detects input 2210X (e.g., a drag gesture to the left and/or counterclockwise around zoom wheel 1003B) corresponding to a request to change the zoom level. In some embodiments, input 2210X is a continuation of input 2210W. In some embodiments, input 2210X is a separate input from input 2210W. In response to detecting input 2210X, computer system 600 rotates (e.g., navigates) zoom wheel 1003B counterclockwise and changes the zoom level to 5×, corresponding to a preset zoom level represented by zoom level indicator 2208F. As shown in FIG. 22AF, computer system 600 zooms in camera preview 612 and sets the position of zoom wheel 1003B to designate the 5× zoom level. In some embodiments, computer system 600 snaps the zoom level to 5× magnification as the zoom level designated by zoom wheel 1003B approaches (but before reaching) zoom level indicator 2208F. In some embodiments, because 2× is a snapping zoom level, computer system 600 maintains the zoom level at 2× until input 2210X moves a threshold amount. In some embodiments, computer system 600 outputs haptic output 2214 when snapping to a zoom level (e.g., as indicated in FIGS. 22AC-22AF). In some embodiments, computer system 600 ceases display of zoom wheel 1003B (e.g., and re-displays zoom affordance 620 in camera user interface 610) in response to detecting an input (e.g., a touch gesture and/or other input) and/or in response to determining that a threshold amount of time has elapsed since detecting an end of an input.

Turning to FIG. 22AG, computer system 600 displays camera settings user interface 2200 with the 28 mm lens equivalent zoom level deselected, the 35 mm lens equivalent zoom level selected, and the 35 mm lens equivalent zoom level selected as the default zoom level. FIG. 22AH illustrates an example of how zoom wheel 1003B (e.g., as displayed in camera user interface 610) is displayed according to the settings in FIG. 22AG (e.g., when the 28 mm lens equivalent zoom level is deselected, the 35 mm lens equivalent zoom level is selected, and the 35 mm lens equivalent zoom level is the default zoom level). Although zoom wheel 1003B is illustrated in isolation in FIG. 22AH, the instance of zoom wheel 1003B illustrated in FIG. 22AH can be displayed in camera user interface 610, with camera preview 612 and other elements of camera user interface 610. When computer system 600 has the setting shown in FIG. 22AG, zoom wheel 1003B is initially displayed as shown in FIG. 22AH, with the zoom level set to the zoom level of the default zoom level selected in camera settings user interface 2200 (e.g., 1×). Because the 28 mm lens equivalent zoom level is deselected, computer system 600 displays zoom wheel 1003B without visually distinguishing zoom level indicator 2208C (e.g., without displaying a thicker line weight and/or a dot at zoom level indicator 2208C). In some embodiments, when a user-selectable zoom level (e.g., the 28 mm lens equivalent zoom level and/or the 35 mm lens equivalent zoom level) is deselected, computer system 600 displays zoom wheel 1003B without a zoom level indicator corresponding to the deselected zoom level (e.g., without zoom level indicator 2208C and/or zoom level indicator 2208D, respectively). For example, in some embodiments, computer system 600 displays zoom wheel 1033B in FIG. 22AH without zoom level indicator 2208C. In some embodiments, when the 28 mm lens equivalent zoom level is deselected, computer system 600 does not snap to a zoom level of 1.2× when navigating to and/or past a zoom level of 1.2× (e.g., if input 2210V is applied to zoom wheel 1003B in FIG. 22AH). In contrast, because the 35 mm lens equivalent zoom level is selected (e.g., selected as a snapping zoom level), computer system 600 visually distinguishes zoom level indicator 2208D in zoom wheel 1003B and snaps to a zoom level of 1.5× when navigating within a threshold distance of zoom level indicator 2208D.

Turning to FIG. 22AI, computer system 600 displays camera settings user interface 2200 with the 28 mm lens equivalent zoom level selected, the 35 mm lens equivalent zoom level deselected, and the 24 mm lens equivalent zoom level selected as the default zoom level. FIG. 22AJ illustrates an example of how zoom wheel 1003B (e.g., as displayed in camera user interface 610) is displayed according to the settings in FIG. 22AI. Although zoom wheel 1003B is illustrated in isolation in FIG. 22AJ, the instance of zoom wheel 1003B illustrated in FIG. 22AJ can be displayed in camera user interface 610, with camera preview 612 and other elements of camera user interface 610. When computer system 600 has the setting shown in FIG. 22AI, zoom wheel 1003B is initially displayed as shown in FIG. 22AJ, with the zoom level set to the zoom level of the default zoom level selected in camera settings user interface 2200 (e.g., 1×). Because the 35 mm lens equivalent zoom level is deselected, computer system 600 displays zoom wheel 1003B without visually distinguishing zoom level indicator 2208D (e.g., without displaying a thicker line weight and/or a dot at zoom level indicator 2208D). In some embodiments, because the 35 mm lens equivalent zoom level is deselected, computer system 600 displays zoom wheel 1033B in FIG. 22AJ without zoom level indicator 2208D. In some embodiments, when the 35 mm lens equivalent zoom level is deselected, computer system 600 does not snap to a zoom level of 1.5× when navigating to and/or past a zoom level of 1.5× (e.g., if input 2210V is applied to zoom wheel 1003B in FIG. 22AJ). In contrast, because the 28 mm lens equivalent zoom level is selected (e.g., selected as a snapping zoom level), computer system 600 visually distinguishes zoom level indicator 2208C in zoom wheel 1003B and snaps to a zoom level of 1.2× when navigating within a threshold distance of zoom level indicator 2208D.

Turning to FIG. 22AK, computer system 600 displays camera settings user interface 2200 with both the 28 mm lens equivalent zoom level and the 35 mm lens equivalent zoom level deselected. FIG. 22AL illustrates an example of how zoom wheel 1003B (e.g., as displayed in camera user interface 610) is displayed according to the settings in FIG. 22AK. Although zoom wheel 1003B is illustrated in isolation in FIG. 22AL, the instance of zoom wheel 1003B illustrated in FIG. 22AL can be displayed in camera user interface 610, with camera preview 612 and other elements of camera user interface 610. When computer system 600 has the setting shown in FIG. 22AK, zoom wheel 1003B is initially displayed as shown in FIG. 22AL, with the zoom level set to the zoom level of the preset 24 mm lens equivalent zoom level (e.g., 1×, since neither the 28 mm lens equivalent zoom level nor the 35 mm lens equivalent zoom level is selected). Because the 28 mm lens equivalent zoom level is deselected, computer system 600 displays zoom wheel 1003B without visually distinguishing zoom level indicator 2208C (e.g., without displaying a thicker line weight and/or a dot at zoom level indicator 2208C). Because the 35 mm lens equivalent zoom level is deselected, computer system 600 displays zoom wheel 1003B without visually distinguishing zoom level indicator 2208D (e.g., without displaying a thicker line weight and/or a dot at zoom level indicator 2208D). In some embodiments, because the 28 mm lens equivalent zoom level is deselected, computer system 600 displays zoom wheel 1033B in FIG. 22AL without zoom level indicator 2208C. In some embodiments, because the 35 mm lens equivalent zoom level is deselected, computer system 600 displays zoom wheel 1033B in FIG. 22AL without zoom level indicator 2208D. In some embodiments, when the 28 mm lens equivalent zoom level and the 35 mm lens equivalent zoom level are deselected, computer system 600 does not snap to a zoom level of 1.2× or 1.5× when navigating to and/or past a zoom level of 1.2× or 1.5× (e.g., if input 2210V is applied to zoom wheel 1003B in FIG. 22AL).

FIG. 23 is a flow diagram illustrating a method for controlling a zoom level of a camera using a computer system in accordance with some embodiments. Method 2300 is performed at a computer system (e.g., 100, 300, 500, and/or 600) (e.g., a smartwatch, a wearable electronic device, a smartphone, a desktop computer, a laptop computer, and/or a head mounted device (e.g., a head mounted augmented reality and/or extended reality device)) having one or more cameras (e.g., 604A, 604B, 604C, and/or 604D) (e.g., one or more cameras, such as dual cameras, triple camera, or quad cameras, on the same side or different sides of the computer system) (e.g., a front camera and/or a back camera) (e.g., one or more 12 MP-48 MP cameras) (e.g., one or more 13 MM, 24 MM, 28 MM, 32 MM, 38 MM, and/or 77 MM focus cameras) (e.g., one or more fixed focused cameras), wherein the computer system is in communication with (e.g., is connected to and/or includes) a display generation component (e.g., 608; 1800; a display controller, a touch-sensitive display system, and/or a head mounted display system) and one or more input devices (e.g., a touch-sensitive surface and/or a first camera of one or more cameras (e.g., one or more cameras (e.g., dual cameras, triple camera, quad cameras, etc.) on the same side or different sides of the computer system (e.g., a front camera, a back camera))). In some embodiments, the computer system includes and/or includes one or more output devices (e.g., speakers, display generation components, and/or haptic output devices). Some operations in method 2300 are, optionally, combined, the orders of some operations are, optionally, changed, and some operations are, optionally, omitted.

As described below, method 2300 provides an intuitive way for controlling a zoom level of a camera. The method reduces the cognitive burden on a user for controlling a zoom level of a camera, thereby creating a more efficient human-machine interface. For battery-operated computing devices, enabling a user to control a zoom level of a camera faster and more efficiently conserves power and increases the time between battery charges.

According to method 2300, the computer system displays (2302), via the display generation component, a camera user interface (e.g., 610) that includes one or more selectable controls (e.g., 620, 620A, 620B, 620C, 620D, and/or 1003B) for managing zoom levels to capture media (and, in some embodiments, while the computer system is configured to capture media based on a user-configured-default (or user-selected-default) value for a zoom level (e.g., a value that indicates a zoom level) (e.g., 0.1-10× zoom) of the one or more cameras). The computer system detects (2304) a first input (e.g., 2210C, 2210D, 2210E, 2210F, 2210L, 2210M, 2210O, 2210P, 2210R, 2210S, 2210U, 2210V, 2210W, and/or 2210X) (e.g., a tap input, long press input, click input or other selection input) (and, in some embodiments, a non-tap input (e.g., a dragging input, a mouse click, a gaze input, and/or a press-and-hold input)) directed to a respective selectable control (e.g., 1003B, 620, and/or 620B) (e.g., a selectable user interface element, a user-interactive user interface element, and/or an affordance) (e.g., of the one or more selectable controls for managing zoom levels to capture media) that includes movement (e.g., the input includes movement). In some embodiments, the input does not include movement. In response (2306) to detecting the first input directed to the respective selectable control, the computer system navigates (e.g., as shown in FIGS. 22AB-22AE, 22C-22K, 22R, 22U, and/or 22Y) through a plurality of candidate zoom levels (e.g., available zoom levels and/or selectable zoom levels) from a first zoom level (e.g., 0.5× or 1×) to a second zoom level (e.g., 2× or 5×) in accordance with the movement, including snapping to one or more zoom levels (e.g., 1.2×, 1.5×, a zoom level corresponding to 2202A, and/or a zoom level corresponding to 2202B) while navigating through the plurality of candidate zoom levels and: in accordance with a determination (2308) that a third zoom level (e.g., 1.2×, 1.5×, a zoom level corresponding to 2202A, and/or a zoom level corresponding to 2202B) between the first zoom level and the second zoom level has been selected as a snapping zoom level (e.g., based on user input) (e.g., in user interface 2200), snapping to the third zoom level while navigating through the plurality of candidate zoom levels; and in accordance with a determination (2310) that the third zoom level between the first zoom level and the second zoom level has not been selected as a snapping zoom level (e.g., based on user input), forgoing snapping to the third zoom level while navigating through the plurality of candidate zoom levels. In some embodiments, the computer system navigates through the plurality of candidate zoom levels from the first zoom level to the second zoom level without requiring movement of the input directed to the respective selectable control (e.g., navigating through the plurality of candidate zoom levels is not in accordance with movement of the input). In some embodiments, snapping to a zoom level (e.g., a snapping zoom level) includes selecting and/or designating the zoom level in response to the first input directed to the respective selectable control moving within a first threshold distance of a location corresponding to the zoom level (e.g., when the input approaches and/or gets close to the location corresponding to the zoom level but the input is not at and/or has not reached the location corresponding to the zoom level). In some embodiments, in response to the first input directed to the respective selectable control moving within the first threshold distance of the location corresponding to the zoom level, the computer system outputs an audible, visual, and/or haptic output (e.g., to indicate that snapping to the zoom level has occurred). In some embodiments, when the zoom level (e.g., the snapping zoom level) is selected (e.g., snapped to) (e.g., after snapping to the zoom level), the zoom level remains selected unless (or, in some embodiments, until) the first input directed to the respective selectable control moves more than a second threshold distance from the location corresponding to the zoom level. In some embodiments, a snapping zoom level is a zoom level to which the zoom of the one or more cameras is snapped. Snapping to one or more zoom levels while navigating through the plurality of candidate zoom levels enables the user to select a desired zoom level more accurately and efficiently, thereby providing improved visual feedback to the user and/or reducing the number of inputs needed to perform an operation. Snapping to the third zoom level or forgoing snapping to the third zoom level based on whether the third zoom level has been selected as a snapping zoom level enables the user to customize the user interface and make the user interface easier for the user to navigate, thereby providing improved visual feedback to the user, reducing the number of inputs needed to perform an operation, and/or performing an operation when a set of conditions has been met without requiring further user input.

In some embodiments, in response to detecting the first input directed to the respective selectable control: in accordance with a determination that a fourth zoom level (e.g., 1.2×, 1.5×, a zoom level corresponding to 2202A, and/or a zoom level corresponding to 2202B), different from the third zoom level, between the first zoom level and the second zoom level has been selected as a snapping zoom level (e.g., based on user input) (e.g., in user interface 2200), the computer system snaps (e.g., the user interface and/or the respective selectable control) to the fourth zoom level while navigating through the plurality of candidate zoom levels; and in accordance with a determination that the fourth zoom level between the first zoom level and the second zoom level has not been selected as a snapping zoom level (e.g., based on user input), the computer system forgoes snapping (e.g., the user interface and/or the respective selectable control) to the fourth zoom level while navigating through the plurality of candidate zoom levels (e.g., the computer system can snap to multiple user-selectable zoom levels). Snapping to the fourth zoom level or forgoing snapping to the fourth zoom level depending on whether the fourth zoom level has been selected as a snapping zoom level enables the computer system to provide the user with multiple user-selectable zoom levels and making it easier and more efficient to select a zoom level, thereby providing improved visual feedback to the user, reducing the number of inputs needed to perform an operation, and/or performing an operation when a set of conditions has been met without requiring further user input.

In some embodiments, in response to detecting the first input directed to the respective selectable control: in accordance with a determination that a fifth zoom level (e.g., a non-user selected zoom level) between the first zoom level and the second zoom level corresponds to a predefined zoom level (e.g., 0.5×, 1×, 2×, and/or 5×), the computer system snaps (e.g., the user interface and/or the respective selectable control) to the fifth zoom level while navigating through the plurality of candidate zoom levels; and in accordance with a determination that the fifth zoom level between the first zoom level and the second zoom level does not correspond to a predefined zoom level, the computer system forgoes snapping to the fifth zoom level while navigating through the plurality of candidate zoom levels. Snapping the fifth zoom level or forgoing snapping to the fifth zoom level depending on whether the fifth zoom level corresponds to a predefined zoom level enables the user to select commonly used zoom levels more quickly and efficiently, thereby providing improved visual feedback to the user, reducing the number of inputs needed to perform an operation, and/or performing an operation when a set of conditions has been met without requiring further user input.

In some embodiments, the computer system detects, via the one or more input devices, an input (e.g., 2210K) (e.g., a contact on a touch-sensitive surface, a gesture, a touch gesture, an air gesture, a speech input, movement of an input device, and/or activation of a physical button) corresponding to a request (e.g., selection of a user interface element, manipulation of a user interface element, and/or navigation of a user interface) to set (e.g., adjust and/or change) a state of the third zoom level (e.g., selected and/or unselected) (e.g., selection of 2202A); in response to detecting the input corresponding to the request to set the state of the third zoom level, the computer system selects the third zoom level as a snapping zoom level (e.g., in accordance with a determination that the third zoom level is not selected as a snapping zoom level) or de-selecting the third zoom level as a snapping zoom level (e.g., in accordance with a determination that the third zoom level is selected as a snapping zoom level) (e.g., in user interface 2200, selecting or deselecting the additional 28 mm lens equivalent zoom level); the computer system detects, via the one or more input devices, an input (e.g., a contact on a touch-sensitive surface, a gesture, a touch gesture, an air gesture, a speech input, movement of an input device, and/or activation of a physical button) corresponding to a request (e.g., selection of a user interface element, manipulation of a user interface element, and/or navigation of a user interface) to set (e.g., adjust and/or change) a state of a sixth zoom level that is different from the third zoom level (e.g., selection of 2202B); and in response to detecting the input corresponding to the request to set the state of the sixth zoom level, the computer system selects the sixth zoom level as a snapping zoom level (e.g., in accordance with a determination that the sixth zoom level is not selected as a snapping zoom level) or de-selecting the sixth zoom level as a snapping zoom level (e.g., in accordance with a determination that the sixth zoom level is selected as a snapping zoom level) (e.g., in user interface 2200, selecting or deselecting the additional 35 mm lens equivalent zoom level). In some embodiments, the input corresponding to the request to set the state of the third zoom level includes an input directed to a selectable control element corresponding to the third zoom level. In some embodiments, input corresponding to the request to set the state of the third zoom level includes an input directed to a selectable control element corresponding to the third zoom level. Selecting or de-selecting the third zoom level and the sixth zoom level as snapping zoom levels enables the user to customize the user interface and select multiple snapping zoom levels to make selecting a zoom level more efficient, thereby reducing the number of inputs needed to perform an operation.

In some embodiments, the third zoom level (e.g., a value of the third zoom level) is preset (e.g., by a device, application, and/or operating system) (e.g., a user cannot change the value of the third zoom level (e.g., from one magnification or local length to another)) (e.g., 2202A is provided in user interface 2200 without user input and cannot be changed via user input); and the sixth zoom level (e.g., a value of the sixth zoom level) is preset (e.g., by a device, application, and/or operating system) (e.g., a user cannot change the value of the sixth zoom level (e.g., from one magnification or local length to another)) (e.g., 2202B is provided in user interface 2200 without user input and cannot be changed via user input), Providing the third zoom level and sixth zoom level as preset zoom levels enables the user to quickly and efficiently select or de-select the third and sixth zoom levels a snapping zoom levels without having to provide additional inputs, thereby reducing the number of inputs needed to perform an operation.

In some embodiments, the third zoom level (e.g., 1.2×, 1.5×, a zoom level corresponding to 2202A, and/or a zoom level corresponding to 2202B) corresponds to a first digital zoom level and the sixth zoom level (e.g., 1.2×, 1.5×, a zoom level corresponding to 2202A, and/or a zoom level corresponding to 2202B) corresponds to a second digital zoom level that is different from the first digital zoom level. In some embodiments, digital zooming includes electronically increasing or decreasing an angle of view of a digital image without adjusting physical optics of a camera. In some embodiments, digital zooming includes cropping an image (e.g., to an area with the same aspect ratio as an original image) and scaling the image (e.g., to dimensions of the original image). In some embodiments, a digital zoom level is achieved by performing digital zooming. Providing multiple digital zoom levels enables the computer system to digitally adjust the zoom level and provide the user with additional zoom options without requiring additional physical components, thereby providing improved visual feedback to the user and/or reducing the number of inputs needed to perform an operation.

In some embodiments, in response to detecting the first input directed to the respective selectable control: in accordance with a determination that a predefined zoom level (e.g., 0.5×, 1×, 2×, 5×, and/or a zoom level corresponding to 620A, 620C, and/or 620D) between the first zoom level and the second zoom level corresponds to a snapping zoom level, the computer system snaps (e.g., the user interface and/or the respective selectable control) to the predefined zoom level while navigating through the plurality of candidate zoom levels; and in accordance with a determination that the predefined zoom level between the first zoom level and the second zoom level does not correspond to a snapping zoom level, the computer system forgoes snapping to the predefined zoom level while navigating through the plurality of candidate zoom levels, wherein the predefined zoom level cannot be disabled (e.g., de-selected) as a snapping zoom level via user input. Snapping to the predefined zoom level or forgoing snapping to the predefined zoom level depending on whether the predefined zoom level corresponds to a snapping zoom level, where the predefined zoom level cannot be disabled as a snapping zoom level via user input, provides a more consistent user interface that enables the user to select a zoom level more quickly and efficiently with fewer mistakes, thereby providing improved visual feedback to the user, reducing the number of inputs needed to perform an operation, and/or performing an operation when a set of conditions has been met without requiring further user input. In some embodiments, the third zoom level corresponds to a digital zoom level (and, in some embodiments, the sixth zoom level corresponds to a digital zoom level) (e.g., 1.2×, 1.5×, a zoom level corresponding to 2202A, and/or a zoom level corresponding to 2202B), and the predefined zoom level corresponds to an optical zoom level (e.g., zoom levels that can be selected and/or de-selected as snapping zoom levels via user input correspond to digital zoom levels and snapping zoom levels that cannot be selected and/or de-selected as snapping zoom levels correspond to optical zoom levels) (e.g., 0.5×, 1×, 2×, 5×, and/or a zoom level corresponding to 620A, 620C, and/or 620D). Providing a digital zoom level and an optical zoom level increases the number and variety of zoom levels provided to the user, which makes it easier and more efficient for a user to select a desired zoom level for capturing an images, thereby providing improved visual feedback to the user and/or reducing the number of inputs needed to perform an operation.

In some embodiments, the computer system detects, via the one or more input devices, an input (e.g., 2210K) (e.g., a contact on a touch-sensitive surface, a gesture, a touch gesture, an air gesture, a speech input, movement of an input device, and/or activation of a physical button) corresponding to a request (e.g., selection of a user interface element, manipulation of a user interface element, and/or navigation of a user interface) to change how many snapping zoom levels are available (e.g., user-selectable snapping zoom levels) (e.g., selection of 2202A and/or 2202B); and in response to detecting the input corresponding to the request to change how many snapping zoom levels are available, the computer system changes a number of snapping zoom levels from a first number of snapping zoom levels to a second number of snapping zoom levels that is different from the first number of snapping zoom levels (e.g., adding a snapping zoom level or removing a snapping zoom level). Changing the number of snapping zoom levels from a first number of snapping zoom levels to a second number of snapping zoom levels that is different from the first number of snapping zoom levels in response to a request to change how many snapping zoom levels are available enables the user to customize the user interface so that the user can select a zoom level more quickly and efficiently, thereby providing improved visual feedback to the user and/or reducing the number of inputs needed to perform an operation.

In some embodiments, while a first designated zoom level (e.g., 1× and/or a default zoom level for 620B) is selected, the computer system detects, via the one or more input devices, a second input (e.g., 2210C, 2210D, 2210E, 2210F, 2210L, 2210M, 2210O, 2210P, 2210R, 2210S, 2210U, 2210V, 2210W, and/or 2210X) (e.g., a contact on a touch-sensitive surface, a gesture, a touch gesture, an air gesture, a speech input, movement of an input device, and/or activation of a physical button) directed to the respective selectable control; and in response to detecting the second input directed to the respective control, the computer system selects (e.g., snaps to) a respective designated zoom level (e.g., a default snapping zoom level, a zoom level defined by a system, and/or a zoom level that has been selected as a snapping zoom level based on user input) (e.g., 1.2×, 1.5×, a zoom level corresponding to 2202A, and/or a zoom level corresponding to 2202B). Selecting a respective designated zoom level in response to detecting an input directed to the respective control enables the user to quickly and efficiently cycle through multiple zoom levels to select a desired zoom level, thereby providing improved visual feedback to the user and/or reducing the number of inputs needed to perform an operation.

In some embodiments, selecting the respective designated zoom level includes: in accordance with a determination that a second designated zoom level (e.g., 1.2×) has been selected (e.g., in user interface 2200) as a snapping zoom level, selecting the second designated zoom level (e.g., as the respective designated zoom level); and in accordance with a determination that the second designated zoom level has not been selected as a snapping zoom level, selecting a third designated zoom level (e.g., as the respective designated zoom level) that is different from the second designated zoom level. Selecting a second designated zoom level or a third designated zoom level based on whether the second designated zoom level has been selected as a snapping zoom level enables the computer system to snap only to selected snapping zoom levels, which makes the user interface easier and more efficient to navigate, thereby providing improved visual feedback to the user, reducing the number of inputs needed to perform an operation, a performing an operation when a set of conditions has been met without requiring further user input.

In some embodiments, while the respective designated zoom level is selected (e.g., 1.2×), the computer system detects, via the one or more input devices, a third input (e.g., 2210C, 2210D, 2210E, 2210F, 2210L, 2210M, 2210O, 2210P, 2210R, 2210S, 2210U, 2210V, 2210W, and/or 2210X) (e.g., a contact on a touch-sensitive surface, a gesture, a touch gesture, a tap gesture, a gesture with movement, a gesture without movement, an air gesture, a speech input, movement of an input device, and/or activation of a physical button) directed to the respective selectable control; and in response to detecting the third input directed to the respective selectable control, the computer system selects a fourth designated zoom level (e.g., 1.5×) that is different from the first designated zoom level and the respective designated zoom level. Selecting a fourth designated zoom level in response to detecting an input directed to the respective selectable control enables the user to quickly and efficiently cycle through at least three different zoom levels to select a zoom level, thereby providing improved visual feedback to the user and/or reducing the number of inputs needed to perform an operation.

In some embodiments, while a fifth designated zoom level is selected (e.g., 1.5×), the computer system detects, via the one or more input devices, a fourth input (e.g., a contact on a touch-sensitive surface, a gesture, a touch gesture, a tap gesture, a gesture without movement, a gesture with movement, an air gesture, a speech input, movement of an input device, and/or activation of a physical button) directed to the respective selectable control, wherein the fifth designated zoom level is a final designated zoom level in a sequence of designated zoom levels that have been selected (e.g., by a system or by a user) as snapping zoom levels; and in response to detecting the fourth input directed to the respective selectable control, the computer system selects the first designated zoom level (e.g., 1×), wherein the first designated zoom level is a beginning designated zoom level in the sequence of designated zoom levels that have been selected as snapping zoom levels. Selecting the first designated zoom level in response to detecting an input directed to the respective selectable control provides the ability to cycle through zoom level options quickly and efficiently and enables the user to select a zoom level with fewer inputs, thereby providing improved visual feedback to the user and/or reducing the number of inputs needed to perform an operation.

In some embodiments, in response to detecting the second input directed to the respective control: the computer system displays, via the display generation component, a first representation (e.g., an icon, text, one or more alphanumeric characters, a color, and/or an image) of a numerical value of the respective designated zoom level (e.g., 24 mm, 28 mm, or 35 mm); and after displaying the first representation of the numerical value of the respective designated zoom level, the computer system displays (e.g., without detecting further input), via the display generation component, a second representation (e.g., an icon, text, one or more alphanumeric characters, a color, and/or an image) of the numerical value of the respective designated zoom level (e.g., 1×, 1.2×, or 1.5×) that is different from the first representation of the numerical value of the respective designated zoom level. Displaying a first representation and second representation of the numerical value of the respective designated zoom level provides the user with additional information about the selected zoom level Without cluttering the user interface and enables the user to select a zoom level with fewer inputs and mistakes, thereby providing improved visual feedback to the user and/or reducing the number of inputs needed to perform an operation. In some embodiments, the first representation of the numerical value of the respective designated zoom level represents the numerical value in a lens focal length equivalent (e.g., measured in millimeters or inches) (e.g., 24 mm, 28 mm, or 35 mm); and the second representation of the numerical value of the respective designated zoom level represents the numerical value in a percentage of a predefined magnification (e.g., a zoom level corresponding to a default optical zoom of a primary camera lens) (e.g., 0.5×, 1×, 1.5×, or 2×). Providing the numerical value of the zoom level in a lens focal length equivalent and a percentage provides additional information about the selected zoom level without cluttering the user interface and enables the user to select a zoom level with fewer inputs and mistakes, thereby providing improved visual feedback to the user and/or reducing the number of inputs needed to perform an operation.

In some embodiments, the first input directed to the respective selectable control includes a tap gesture on the respective selectable control (e.g., a tap on 620B). Navigating through a plurality of candidate zoom levels in response to a tap gesture on the respective selectable control enables the user to change and select a desired zoom level quickly and efficiently with fewer inputs and mistakes, thereby providing improved visual feedback to the user and/or reducing the number of inputs needed to perform an operation.

In some embodiments, displaying the camera user interface includes: in accordance with a determination that the third zoom level has been selected as a snapping zoom level (e.g., in 2200), displaying a representation (e.g., 2208C and/or 2208D) (e.g., a tic mark, icon, text, one or more alphanumeric characters, a color, and/or an image) of the third zoom level; and in accordance with a determination that a fifth zoom level (e.g., 1.2×, 1.5×, a zoom level corresponding to 2202A, and/or a zoom level corresponding to 2202B) has been selected as a snapping zoom level, displaying a representation (e.g., 2208C and/or 2208D) (e.g., a tic mark, icon, text, one or more alphanumeric characters, a color, and/or an image) of the fifth zoom level. Displaying a representation of the third zoom level and the fifth zoom level depending on whether the respective zoom level has been selected as a snapping zoom level enables the user to customize the user interface and to select a desired zoom level more quickly and efficiently without cluttering the user interface, thereby providing improved visual feedback to the user, reducing the number of inputs needed to perform an operation, and/or performing an operation when a set of conditions has been met without requiring further user input. In some embodiments, displaying the camera user interface includes: in accordance with a determination that the third zoom level has not been selected as a snapping zoom level, forgoing display of the representation of the third zoom level (e.g., 2208C is not bolded or designated with a dot in FIG. 22AH and FIG. 22AL); and in accordance with a determination that the fifth zoom level has not been selected as a snapping zoom level, forgoing display of the representation of the fifth zoom level (e.g., 2208D is not bolded or designated with a dot in FIG. 22AJ and FIG. 22AL). Foregoing display of the representation of the third zoom level and the fifth zoom level if the respective zoom level has not been selected as a snapping zoom level enables the user to customize the user interface and reduce clutter to make it easier and more efficient for the user to select a zoom level, thereby providing improved visual feedback to the user, reducing the number of inputs needed to perform an operation, and/or performing an operation when a set of conditions has been met without requiring further user input.

In some embodiments, the computer system detects, via the one or more input devices, an input (e.g., 2210N) (e.g., a contact on a touch-sensitive surface, a gesture, a touch gesture, an air gesture, a speech input, movement of an input device, and/or activation of a physical button) corresponding to a request (e.g., selection of a user interface element, manipulation of a user interface element, and/or navigation of a user interface) to set a respective snapping zoom level (e.g., an optical zoom level, a digital zoom level, a system-designated zoom level, a user-selectable zoom level, and/or a non-user selectable zoom level) as a default zoom level (e.g., selection of 2204A, 2204B, or 2204C); and in response to detecting the input corresponding to the request to set the respective snapping zoom level as the default zoom level, the computer system sets the respective snapping zoom level as the default zoom level; the computer system detects, via the one or more input devices, an input (e.g., 2210B and/or selection of 2212) (e.g., a contact on a touch-sensitive surface, a gesture, a touch gesture, an air gesture, a speech input, movement of an input device, and/or activation of a physical button) corresponding to a request (e.g., selection of a user interface element, manipulation of a user interface element, and/or navigation of a user interface) to display the camera user interface (in some embodiments, detecting the request to display the camera user interface occurs while the camera user interface is not displayed (e.g., while displaying a home screen user interface, a user interface of a non-camera application, a media item editing user interface in a camera application, and/or a media item viewing user interface (such as a camera roll user interface and/or photo album) in a camera application)); and in response to detecting the input corresponding to the request to display the camera user interface, the computer system displays, via the display generation component, the camera user interface, including displaying a live preview (e.g., 612) of a field of view of the one or more cameras, the live preview displayed with the default zoom level (e.g., the respective snapping zoom level that was set as the default zoom level). In some embodiments, displaying the camera user interface in response to the request to display the camera user interface includes displaying a representation (e.g., a numerical representation) of the default zoom level (e.g., as part of the respective selectable control). In some embodiments, a zoom level that is not selected and/or has not been selected as a snapping zoom level is not available to be used as a default zoom level. Displaying the live preview with the default zoom level in response to detecting the request to display the camera user interface enables the user to customize the user interface and to select a desired zoom level more quickly and efficiently with fewer inputs and mistakes, thereby providing improved visual feedback to the user and/or reducing the number of inputs needed to perform an operation.

In some embodiments, the computer system displays (e.g., in the camera user interface), via the display generation component, a zoom level control element (e.g., 620, 620A, 620B, 620C, 620D, and/or 1003B) (e.g., the respective selectable control) (e.g., a selectable user interface element, a user-interactive user interface element, and/or an affordance); the computer system detects, via the one or more input devices, an input (e.g., 2210C, 2210D, 2210E, 2210F, 2210L, 2210M, 2210O, 2210P, 2210R, 2210S, 2210U, 2210V, 2210W, and/or 2210X) (e.g., a contact on a touch-sensitive surface, a gesture, a touch gesture, an air gesture, a speech input, movement of an input device, and/or activation of a physical button) directed to the zoom level control element; and in response to detecting the input directed to the zoom level control element, the computer system snaps (e.g., the user interface and/or the zoom level control element) to a zoom level in a range of zoom levels (e.g., 0.5×, 1×, 1.2×, 1.5×, 2×, 5×, a zoom level corresponding to 2202A, and/or a zoom level corresponding to 2202B) (e.g., in a set of one or more discrete zoom levels). Snapping to a zoom level in a range of zoom levels in response to detecting an input directed to a zoom level control element enables the user to quickly and efficiently select a zoom level with fewer inputs and mistakes and without cluttering the user interface, thereby providing improved visual feedback to the user and/or reducing the number of inputs needed to perform an operation.

In some embodiments, while the computer system is operating in a first camera mode, the computer system displays, via the display generation component, the zoom level control element (e.g., a selectable user interface element, a user-interactive user interface element, and/or an affordance) with an appearance indicating a current zoom level that is not the default zoom level (e.g., 1.2×, 1.5×, a zoom level corresponding to 2202A, and/or a zoom level corresponding to 2202B); the computer system detects, via the one or more input devices, an input (e.g., 2210G, 2210H, and/or 2210I) (e.g., a contact on a touch-sensitive surface, a gesture, a touch gesture, an air gesture, a speech input, movement of an input device, and/or activation of a physical button) corresponding to a request (e.g., selection of a user interface element, manipulation of a user interface element, and/or navigation of a user interface) to change a mode (e.g., an application, a media capture mode, and/or a zoom level) of the one or more cameras; in response to detecting the input corresponding to the request to change the mode of the one or more cameras, the computer system changes operation of the computer system from the first camera mode to a second camera mode that is different from the first camera mode (e.g., changing from the mode in FIG. 22K to the mode in FIG. 22L, FIG. 22M, or FIG. 22N); and after changing operation of the computer system to the second camera mode (e.g., while the computer system is operating in the second camera mode or when the computer system is switched back to operating in the first camera mode), the computer system displays, via the display generation component, the zoom level control element (e.g., a selectable user interface element, a user-interactive user interface element, and/or an affordance) with an appearance indicating that the current zoom level is the default zoom level (e.g., 1× or a default zoom level designated in 2200) (e.g., displaying 620B as shown in FIGS. 22M and 22O and/or displaying 635 as shown in FIG. 22L). Displaying the zoom level control element with an appearance indicating the default zoom level after changing a camera mode provides a more consistent user interface and enables the user to efficiently revert to the default zoom level and select a zoom level with fewer inputs and mistakes, thereby providing improved visual feedback to the user and/or reducing the number of inputs needed to perform an operation.

In some embodiments, while the one or more cameras are set to a zoom level that corresponds to the zoom level control element, the computer system displays, via the display generation component, the zoom level control element (e.g., a selectable user interface element, a user-interactive user interface element, and/or an affordance) with an appearance indicating a current zoom level that is not the default zoom level (e.g., not the default zoom level selected in 2200); the computer system detects, via the one or more input devices, an input (e.g., 2210H and/or selection of 620A, 620C, and/or 620D) (e.g., a contact on a touch-sensitive surface, a gesture, a touch gesture, an air gesture, a speech input, movement of an input device, and/or activation of a physical button) corresponding to a request (e.g., selection of a user interface element, manipulation of a user interface element, and/or navigation of a user interface) to change the current zoom level to a zoom level that is not associated with the zoom level control element; and in response to detecting the input corresponding to the request to change the current zoom level to a zoom level that is not associated with the zoom level control element: the computer system changes the current zoom level to the zoom level that is not associated with the zoom level control element (e.g., as described with reference to FIG. 22M); and the computer system displays, via the display generation component, the zoom level control element (e.g., 620 and/or 620B) with an appearance indicating the default zoom level (e.g., an appearance indicating that selection of the zoom level control element will set the current zoom level to the default zoom level). Changing the current zoom level to the zoom level that is not associated with the zoom level control element and displaying the zoom level control element with an appearance indicating the default zoom level provides a more consistent user interface and enables the user to efficiently revert to the default zoom level and select a zoom level with fewer inputs and mistakes, thereby providing improved visual feedback to the user and/or reducing the number of inputs needed to perform an operation.

In some embodiments, while the one or more cameras are set to a zoom level that corresponds to the zoom level control element (e.g., and is not the default zoom level) (e.g., FIGS. 22D-22G), the computer system displays, via the display generation component, the zoom level control element (e.g., a selectable user interface element, a user-interactive user interface element, and/or an affordance) with an appearance indicating a current zoom level that is not the default zoom level (e.g., 620B in FIGS. 22D-22G); the computer system detects, via the one or more input devices, an input (e.g., 2210H and/or selection of 620A, 620C, and/or 620D) (e.g., a contact on a touch-sensitive surface, a gesture, a touch gesture, an air gesture, a speech input, movement of an input device, and/or activation of a physical button) corresponding to a request (e.g., selection of a user interface element, manipulation of a user interface element, and/or navigation of a user interface) to change the current zoom level to a zoom level that is outside a predetermined range of zoom levels (e.g., to a zoom level that is not associated with the zoom level control element) (e.g., 0.5×, 2×, or 5×); and in response to detecting the input corresponding to the request to change the current zoom level to a zoom level that is outside the predetermined range of zoom levels: the computer system changes the current zoom level to the zoom level that is outside the predetermined range of zoom levels (e.g., as described with reference to FIG. 22M); and the computer system displays, via the display generation component, the zoom level control element with an appearance indicating the default zoom level (e.g., an appearance indicating that selection of the zoom level control element will set the current zoom level to the default zoom level). Changing the current zoom level to the zoom level that is outside the predetermined range of zoom levels and displaying the zoom level control element with an appearance indicating the default zoom level provides a more consistent user interface and enables the user to efficiently revert to the default zoom level and select a zoom level with fewer inputs and mistakes, thereby providing improved visual feedback to the user and/or reducing the number of inputs needed to perform an operation. In some embodiments, snapping to a zoom level includes outputting a haptic output (e.g., 2214). Outputting a haptic output when snapping to a zoom level provides feedback to the user about the state of the computer system and enables the user to select a zoom level with fewer inputs and mistakes, thereby providing improved feedback to the user and/or reducing the number of inputs needed to perform an operation.

In some embodiments, the computer system displays, via the display generation component, a settings user interface (e.g., 2200), including concurrently displaying a first zoom level selection element (e.g., 2202A) (e.g., a selectable user interface element, a user-interactive user interface element, and/or an affordance) corresponding to a first selectable zoom level (e.g., 28 mm and/or 1.2×) and a second zoom level selection element (e.g., 2202B) (e.g., a selectable user interface element, a user-interactive user interface element, and/or an affordance), different from the first zoom level selection element, corresponding to a second selectable zoom level (e.g., 35 mm and/or 1.5×) that is different from the first selectable zoom level; the computer system detects, via the one or more input devices, an input (e.g., 2210K) (e.g., a contact on a touch-sensitive surface, a gesture, a touch gesture, an air gesture, a speech input, movement of an input device, and/or activation of a physical button) directed to the settings user interface; and in response to detecting the input directed to the settings user interface: in accordance with a determination that the input directed to the settings user interface corresponds to selection of the first zoom level selection element, the computer system changes a state of the first selectable zoom level (e.g., selecting or deselecting the first selectable zoom level as a snapping zoom level); and in accordance with a determination that the input directed to the settings user interface corresponds to selection of the second zoom level selection element, the computer system changes a state of the second selectable zoom level (e.g., selecting or deselecting the second selectable zoom level as a snapping zoom level). Changing the state of the first selectable zoom level or the second selectable zoom level depending on whether the first zoom level selection element or the second zoom level selection element is selected reduces clutter on the user interface and enables the user to quickly and efficiently customize the user interface and to select a zoom level with fewer inputs and mistakes, thereby providing improved visual feedback to the user and/or reducing the number of inputs needed to perform an operation.

In some embodiments, the computer system displays, via the display generation component, a settings user interface (e.g., 2200), including: in accordance with a determination that a first user-selectable zoom level (e.g., the zoom level corresponding to 2202A) is selected (e.g., selected as a snapping zoom level), the computer system displays a first default zoom level selection element (e.g., 2204B) (e.g., a selectable user interface element, a user-interactive user interface element, and/or an affordance) corresponding to the first user-selectable zoom level (e.g., as shown in FIG. 22A); in accordance with a determination that the first user-selectable zoom level is not selected (e.g., not selected as a snapping zoom level), the computer system forgoes display of the first default zoom level selection element corresponding to the first user-selectable zoom level (e.g., as shown in FIG. 22Q and FIG. 22V); in accordance with a determination that a second user-selectable zoom level (e.g., the zoom level corresponding to 2202B) is selected (e.g., selected as a snapping zoom level), the computer system displays a second default zoom level selection element (e.g., 2204C) (e.g., a selectable user interface element, a user-interactive user interface element, and/or an affordance) corresponding to the second user-selectable zoom level (e.g., as shown in FIG. 22A); and in accordance with a determination that the second user-selectable zoom level is not selected (e.g., not selected as a snapping zoom level), the computer system forgoes display of the second default zoom level selection element corresponding to the second user-selectable zoom level (e.g., as shown in FIG. 22V and FIG. 22X); the computer system detects, via the one or more input devices, an input (e.g., a contact on a touch-sensitive surface, a gesture, a touch gesture, an air gesture, a speech input, movement of an input device, and/or activation of a physical button) directed to the settings user interface (e.g., 2210N); and in response to detecting the input directed to the settings user interface: in accordance with a determination that the input directed to the settings user interface corresponds to selection of the first default zoom level selection element, the computer system sets a current default zoom level to the first user-selectable zoom level; and in accordance with a determination that the input directed to the settings user interface corresponds to selection of the second default zoom level selection element, the computer system sets the current default zoom level to the second user-selectable zoom level. Setting the current default zoom level to the first user-selectable zoom level or the second user-selectable zoom level depending on whether the first default zoom level selection element or the second default zoom level selection element is selected enables the user to quickly and efficiently customize the user interface and to select a zoom level with fewer inputs and mistakes, thereby providing improved visual feedback to the user and/or reducing the number of inputs needed to perform an operation.

In some embodiments, the one or more selectable controls includes a respective selectable control (e.g., 620B) that is associated with one or more user selectable zoom levels (e.g., 1.2×, 1.5×, a zoom level corresponding to 2202A, and/or a zoom level corresponding to 2202B) for the one or more cameras; the first input directed to the respective selectable control is detected while displaying the camera user interface and while a first zoom level (e.g., 1×, 1.2×, 1.5×, a zoom level corresponding to 2202A, and/or a zoom level corresponding to 2202B) (e.g., a default zoom level, a user-selectable zoom level, and/or a system zoom level) associated with the respective selectable control is selected as a current zoom level for the one or more cameras; and in response to detecting the first input directed to the respective selectable control, the computer system selects a respective zoom level (e.g., 1.2×, 1.5×, a zoom level corresponding to 2202A, and/or a zoom level corresponding to 2202B) associated with the respective selectable control as the current zoom level for the one or more cameras, including: in accordance with a determination that a user has selected (e.g., in 2200) (e.g., previously selected via an input in a settings user interface) a second zoom level (e.g., 1.2×, 1.5×, a zoom level corresponding to 2202A, and/or a zoom level corresponding to 2202B) associated with the respective selectable control, the computer system selects the second zoom level as the current zoom level for the one or more cameras in response to detecting (e.g., directly in response to detecting) the first input directed to the respective selectable control. In some embodiments, in accordance with a determination that the user has not selected the second zoom level associated with the respective selectable control, forgoing selecting the second zoom level as the current zoom level for the one or more cameras in response to detecting the first input directed to the respective selectable control (e.g., a selecting a different zoom level instead). Selecting the second zoom level as the current zoom level for the one or more cameras enables the user to select a zoom level quickly and efficiently with fewer inputs and errors, thereby providing improved visual feedback to the user and/or reducing the number of inputs needed to perform an operation.

Note that details of the processes described above with respect to method 2300 (e.g., FIG. 23) are also applicable in an analogous manner to the methods described above. For example, methods 700, 900, 1100, 1300, 1500, 1700, 2100, and/or 2100 optionally include one or more of the characteristics of the various methods described above with reference to method 2300.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the control of media capture settings. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to recognize subjects of media capture and determine preferred media capture settings. Accordingly, use of such personal information data enables personalized control of media capture settings. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of media capture functionality, the present technology can be configured to allow users to select to "opt in" or "opt out" of participation in the collection of personal information data during registration for services or anytime thereafter. In another example, users can select not to provide mood-associated data for media capture functionality. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, preferred or appropriate media capture settings can be determined based on non-personal information data or a bare minimum amount of personal information, such as the content being requested by the device associated with a user, other non-personal information available to the media capture functionality, or publicly available information.

What is claimed is:

1. A computer system configured to communicate with a display generation component and one or more input devices, comprising:

one or more processors; and memory storing one or more programs configured to be executed by the one or more processors, the one or more programs including instructions for:

while concurrently displaying, via the display generation component, a representation of a previously-captured media item and a control element for adjusting a simulated depth-of-field effect for the previously-captured media item:

detecting, via the one or more input devices, an input; and in response to detecting the input:

in accordance with a determination that the input includes selection of a respective portion of the representation of the previously-captured media item, changing a focus location of a simulated focal plane for the simulated depth-of-field effect for the representation of the previously-captured media item from an initial location of the representation of the previously-captured media item to a respective location of the representation of the previously-captured media item corresponding to the respective portion of the representation of the previously-captured media item selected by the input; and in accordance with a determination that the input includes selection of the control element:

adjusting the control element; and changing a magnitude of the simulated depth-of-field effect for the representation of the previously-captured media item while maintaining the initial location of the representation of the previously-captured media item as the focus location of the simulated focal plane for the simulated depth-of-field effect for the representation of the previously-captured media item.

2. The computer system of claim 1, wherein:

changing the focus location of the simulated focal plane for the simulated depth-of-field effect for the representation of the previously-captured media item from the initial location of the representation of the previously-captured media item to the respective location of the previously-captured media item corresponding to the respective portion of the representation of the media item selected by the input includes changing an appearance of the representation of the media item so that the respective location of the representation of the previously-captured media item is more in-focus than before detecting the input and the initial location of the representation of the previously-captured media item is less in-focus than before detecting the input.

3. The computer system of claim 1, the one or more programs including instructions for:

in response to detecting the input:

in accordance with a determination that the input includes selection of a first portion of the representation of the previously-captured media item, changing the focus location of the simulated focal plane for the simulated depth-of-field effect for the representation of the previously-captured media item from the initial location of the representation of the previously-captured media item to a first location of the representation of the previously-captured media item corresponding to the first portion of the representation of the previously-captured media item selected by the input; and in accordance with a determination that the input includes selection of a second portion of the representation of the previously-captured media item, changing the focus location of the simulated focal plane for the simulated depth-of-field effect for the representation of the previously-captured media item from the initial location of the representation of the previously-captured media item to a second location of the representation of the previously-captured media item corresponding to the second portion of the representation of the previously-captured media item selected by the input, wherein:

the first portion is different from the second portion, and the first location is different from the second location.

4. The computer system of claim 1, wherein changing the magnitude of the simulated depth-of-field effect includes:

in accordance with a determination that the input has a first characteristic, changing the magnitude of the simulated depth-of-field effect by a first magnitude of change; and in accordance with a determination that the input has a second characteristic that is different from the first characteristic, changing the magnitude of the simulated depth-of-field effect by a second magnitude of change that is different from the first magnitude of change.

5. The computer system of claim 1, wherein changing the magnitude of the simulated depth-of-field effect includes:

in accordance with a determination that the input has a third characteristic, increasing the magnitude of the simulated depth-of-field effect; and in accordance with a determination that the input has a fourth characteristic that is different from the third characteristic, decreasing the magnitude of the simulated depth-of-field effect.

6. The computer system of claim 1, wherein changing the magnitude of the simulated depth-of-field effect includes changing the magnitude of the simulated depth-of-field effect based on a magnitude of the input.

7. The computer system of claim 1, wherein changing the magnitude of the simulated depth-of-field effect includes changing the magnitude of the simulated depth-of-field effect based on a direction of the input.

8. The computer system of claim 1, wherein changing the magnitude of the simulated depth-of-field effect includes:

in accordance with a determination that the selection of the control element includes adjusting the control element to a limit of the control element:

removing the simulated depth-of-field effect; and updating an appearance of a simulated depth-of-field effect indicator to indicate that the simulated depth-of-field effect is off.

9. The computer system of claim 1, the one or more programs including instructions for:

prior to detecting the input, displaying, via the display generation component, the representation of the previously-captured media item without the simulated depth-of-field effect, wherein changing the magnitude of the simulated depth-of-field effect includes displaying the representation of the previously-captured media item with the simulated depth-of-field effect.

10. The computer system of claim 1, the one or more programs including instructions for:

while displaying the representation of the previously-captured media item, displaying, via the display generation component, an indication of the focus location of the simulated focal plane for the simulated depth-of-field effect.

11. The computer system of claim 1, the one or more programs including instructions for:

in response to detecting the input:

in accordance with a determination that the input includes selection of the respective portion of the representation of the previously-captured media item:

ceasing display of an indication of the focus location at the initial location of the representation of the previously-captured media item that is different from the respective location; and displaying, via the display generation component, the indication of the focus location at the respective location of the representation of the previously-captured media item; and in accordance with a determination that the input includes selection of the control element, maintaining display, via the display generation component, of the indication of the focus location at the previous location of the representation of the previously-captured media item.

12. The computer system of claim 1, wherein:

the representation of the previously-captured media item includes a first element corresponding to a first depth and a second element corresponding to a second depth that is different from the first depth; and displaying the representation of the previously-captured media item includes:

displaying the first element with a first amount of blurring; and displaying the second element with a second amount of blurring that is different from the first amount of blurring.

13. A non-transitory computer-readable storage medium storing one or more programs configured to be executed by one or more processors of a computer system that is in communication with a display generation component and one or more input devices, the one or more programs including instructions for:

while concurrently displaying, via the display generation component, a representation of a previously-captured media item and a control element for adjusting a simulated depth-of-field effect for the previously-captured media item:

detecting, via the one or more input devices, an input; and in response to detecting the input:

in accordance with a determination that the input includes selection of a respective portion of the representation of the previously-captured media item, changing a focus location of a simulated focal plane for the simulated depth-of-field effect for the representation of the previously-captured media item from an initial location of the representation of the previously-captured media item to a respective location of the representation of the previously-captured media item corresponding to the respective portion of the representation of the previously-captured media item selected by the input; and in accordance with a determination that the input includes selection of the control element:

adjusting the control element; and changing a magnitude of the simulated depth-of-field effect for the representation of the previously-captured media item while maintaining the initial location of the representation of the previously-captured media item as the focus location of the simulated focal plane for the simulated depth-of-field effect for the representation of the previously-captured media item.

14. The non-transitory computer-readable storage medium of claim 13, wherein:

changing the focus location of the simulated focal plane for the simulated depth-of-field effect for the representation of the previously-captured media item from the initial location of the representation of the previously-captured media item to the respective location of the previously-captured media item corresponding to the respective portion of the representation of the media item selected by the input includes changing an appearance of the representation of the media item so that the respective location of the representation of the previously-captured media item is more in-focus than before detecting the input and the initial location of the representation of the previously-captured media item is less in-focus than before detecting the input.

15. The non-transitory computer-readable storage medium of claim 13, the one or more programs including instructions for:

in response to detecting the input:

in accordance with a determination that the input includes selection of a first portion of the representation of the previously-captured media item, changing the focus location of the simulated focal plane for the simulated depth-of-field effect for the representation of the previously-captured media item from the initial location of the representation of the previously-captured media item to a first location of the representation of the previously-captured media item corresponding to the first portion of the representation of the previously-captured media item selected by the input; and in accordance with a determination that the input includes selection of a second portion of the representation of the previously-captured media item, changing the focus location of the simulated focal plane for the simulated depth-of-field effect for the representation of the previously-captured media item from the initial location of the representation of the previously-captured media item to a second location of the representation of the previously-captured media item corresponding to the second portion of the representation of the previously-captured media item selected by the input, wherein:

the first portion is different from the second portion, and the first location is different from the second location.

16. The non-transitory computer-readable storage medium of claim 13, wherein changing the magnitude of the simulated depth-of-field effect includes:

in accordance with a determination that the input has a first characteristic, changing the magnitude of the simulated depth-of-field effect by a first magnitude of change; and in accordance with a determination that the input has a second characteristic that is different from the first characteristic, changing the magnitude of the simulated depth-of-field effect by a second magnitude of change that is different from the first magnitude of change.

17. The non-transitory computer-readable storage medium of claim 13, wherein changing the magnitude of the simulated depth-of-field effect includes:

in accordance with a determination that the input has a third characteristic, increasing the magnitude of the simulated depth-of-field effect; and in accordance with a determination that the input has a fourth characteristic that is different from the third characteristic, decreasing the magnitude of the simulated depth-of-field effect.

18. The non-transitory computer-readable storage medium of claim 13, wherein changing the magnitude of the simulated depth-of-field effect includes:

in accordance with a determination that the selection of the control element includes adjusting the control element to a limit of the control element:

removing the simulated depth-of-field effect; and updating an appearance of a simulated depth-of-field effect indicator to indicate that the simulated depth-of-field effect is off.

19. The non-transitory computer-readable storage medium of claim 13, the one or more programs including instructions for:

prior to detecting the input, displaying, via the display generation component, the representation of the previously-captured media item without the simulated depth-of-field effect, wherein changing the magnitude of the simulated depth-of-field effect includes displaying the representation of the previously-captured media item with the simulated depth-of-field effect.

20. The non-transitory computer-readable storage medium of claim 13, the one or more programs including instructions for:

while displaying the representation of the previously-captured media item, displaying, via the display generation component, an indication of the focus location of the simulated focal plane for the simulated depth-of-field effect.

21. The non-transitory computer-readable storage medium of claim 13, the one or more programs including instructions for:

in response to detecting the input:

in accordance with a determination that the input includes selection of the respective portion of the representation of the previously-captured media item:

ceasing display of an indication of the focus location at the initial location of the representation of the previously-captured media item that is different from the respective location; and displaying, via the display generation component, the indication of the focus location at the respective location of the representation of the previously-captured media item; and in accordance with a determination that the input includes selection of the control element, maintaining display, via the display generation component, of the indication of the focus location at the previous location of the representation of the previously-captured media item.

22. The non-transitory computer-readable storage medium of claim 13, wherein:

the representation of the previously-captured media item includes a first element corresponding to a first depth and a second element corresponding to a second depth that is different from the first depth; and displaying the representation of the previously-captured media item includes:

displaying the first element with a first amount of blurring; and displaying the second element with a second amount of blurring that is different from the first amount of blurring.

23. A method, comprising:

at a computer system that is in communication with a display generation component and one or more input devices:

while concurrently displaying, via the display generation component, a representation of a previously-captured media item and a control element for adjusting a simulated depth-of-field effect for the previously-captured media item:

detecting, via the one or more input devices, an input; and in response to detecting the input:

in accordance with a determination that the input includes selection of a respective portion of the representation of the previously-captured media item, changing a focus location of a simulated focal plane for the simulated depth-of-field effect for the representation of the previously-captured media item from an initial location of the representation of the previously-captured media item to a respective location of the representation of the previously-captured media item corresponding to the respective portion of the representation of the previously-captured media item selected by the input; and in accordance with a determination that the input includes selection of the control element;

adjusting the control element; and changing a magnitude of the simulated depth-of-field effect for the representation of the previously-captured media item while maintaining the initial location of the representation of the previously-captured media item as the focus location of the simulated focal plane for the simulated depth-of-field effect for the representation of the previously-captured media item.

24. The method of claim 23, wherein:

changing the focus location of the simulated focal plane for the simulated depth-of-field effect for the representation of the previously-captured media item from the initial location of the representation of the previously-captured media item to the respective location of the previously-captured media item corresponding to the respective portion of the representation of the media item selected by the input includes changing an appearance of the representation of the media item so that the respective location of the representation of the previously-captured media item is more in-focus than before detecting the input and the initial location of the representation of the previously-captured media item is less in-focus than before detecting the input.

25. The method of claim 23, further comprising:

in response to detecting the input:

in accordance with a determination that the input includes selection of a first portion of the representation of the previously-captured media item, changing the focus location of the simulated focal plane for the simulated depth-of-field effect for the representation of the previously-captured media item from the initial location of the representation of the previously-captured media item to a first location of the representation of the previously-captured media item corresponding to the first portion of the representation of the previously-captured media item selected by the input; and in accordance with a determination that the input includes selection of a second portion of the representation of the previously-captured media item, changing the focus location of the simulated focal plane for the simulated depth-of-field effect for the representation of the previously-captured media item from the initial location of the representation of the previously-captured media item to a second location of the representation of the previously-captured media item corresponding to the second portion of the representation of the previously-captured media item selected by the input, wherein:

the first portion is different from the second portion, and the first location is different from the second location.

26. The method of claim 23, wherein changing the magnitude of the simulated depth-of-field effect includes:

in accordance with a determination that the input has a first characteristic, changing the magnitude of the simulated depth-of-field effect by a first magnitude of change; and in accordance with a determination that the input has a second characteristic that is different from the first characteristic, changing the magnitude of the simulated depth-of-field effect by a second magnitude of change that is different from the first magnitude of change.

27. The method of claim 23, wherein changing the magnitude of the simulated depth-of-field effect includes:

in accordance with a determination that the input has a third characteristic, increasing the magnitude of the simulated depth-of-field effect; and in accordance with a determination that the input has a fourth characteristic that is different from the third characteristic, decreasing the magnitude of the simulated depth-of-field effect.

28. The method of claim 23, wherein changing the magnitude of the simulated depth-of-field effect includes:

in accordance with a determination that the selection of the control element includes adjusting the control element to a limit of the control element:

removing the simulated depth-of-field effect; and updating an appearance of a simulated depth-of-field effect indicator to indicate that the simulated depth-of-field effect is off.

29. The method of claim 23, further comprising:

prior to detecting the input, displaying, via the display generation component, the representation of the previously-captured media item without the simulated depth-of-field effect, wherein changing the magnitude of the simulated depth-of-field effect includes displaying the representation of the previously-captured media item with the simulated depth-of-field effect.

30. The method of claim 23, further comprising:

while displaying the representation of the previously-captured media item, displaying, via the display generation component, an indication of the focus location of the simulated focal plane for the simulated depth-of-field effect.

31. The method of claim 23, further comprising:

in response to detecting the input:

in accordance with a determination that the input includes selection of the respective portion of the representation of the previously-captured media item:

ceasing display of an indication of the focus location at the initial location of the representation of the previously-captured media item that is different from the respective location; and displaying, via the display generation component, the indication of the focus location at the respective location of the representation of the previously-captured media item; and in accordance with a determination that the input includes selection of the control element, maintaining display, via the display generation component, of the indication of the focus location at the previous location of the representation of the previously-captured media item.

32. The method of claim 23, wherein:

the representation of the previously-captured media item includes a first element corresponding to a first depth and a second element corresponding to a second depth that is different from the first depth; and displaying the representation of the previously-captured media item includes:

displaying the first element with a first amount of blurring; and displaying the second element with a second amount of blurring that is different from the first amount of blurring.

\* \* \* \* \*